US006217234B1

(12) United States Patent
Dewar et al.

(10) Patent No.: US 6,217,234 B1
(45) Date of Patent: Apr. 17, 2001

(54) APPARATUS AND METHOD FOR PROCESSING DATA WITH AN ARITHMETIC UNIT

(75) Inventors: Kevin D. Dewar, Ennis (IE); Anthony Mark Jones, Eigmegen (NL); Martin William Sotheran, Bristol (GB); David Andrew Barnes, Irvine, CA (US)

(73) Assignee: Discovision Associates, Irvine, CA (US)

( * ) Notice: Subject to any disclaimer, the term of this patent is extended or adjusted under 35 U.S.C. 154(b) by 0 days.

(21) Appl. No.: 08/487,356

(22) Filed: Jun. 7, 1995

Related U.S. Application Data

(62) Division of application No. 08/473,813, filed on Jun. 7, 1995.

(30) Foreign Application Priority Data

Jul. 29, 1994 (GB) .................................... 9415413
Jun. 7, 1995 (GB) .................................... 9511569

(51) Int. Cl.[7] .............................. G06F 17/00; G06F 9/38

(52) U.S. Cl. ................................................ 395/200.77

(58) Field of Search .................... 364/514 R; 370/60, 370/94.2, 94.1; 455/4.2; 395/800

(56) References Cited

U.S. PATENT DOCUMENTS

| 3,676,802 | 7/1972 | Murphree et al. ............... 332/9 R |
| 3,893,042 | 7/1975 | Whitman et al. ................. 331/55 |
| 3,962,685 | 6/1976 | Belle Isle ........................ 340/172.5 |
| 4,107,780 | 8/1978 | Grimsdale et al. ............... 364/521 |
| 4,142,205 | 2/1979 | Iinuma ............................. 358/13 |

(List continued on next page.)

FOREIGN PATENT DOCUMENTS 0196911  10/1986  (EP) .

| 0255767 | 2/1988 | (EP) . |
| 0468480 | 1/1992 | (EP) . |

(List continued on next page.)

OTHER PUBLICATIONS

Chong, "A Data Flow Architecture For Digital Image Processing," Wescon Tech. Papers No. 4/6, Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, Jun. 5, 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

(List continued on next page.)

*Primary Examiner*—Ellis B. Ramirez
(74) *Attorney, Agent, or Firm*—Ronald J. Clark; Robert T. Braun; Arthur S. Bickel

(57) ABSTRACT

An MPEG video decompression method and apparatus utilizing a plurality of stages interconnected by a two-wire interface arranged as a pipeline processing machine. Control tokens and DATA Tokens pass over the single two-wire interface for carrying both control and data in token format. A token decode circuit is positioned in certain of the stages for recognizing certain of the tokens as control tokens pertinent to that stage and for passing unrecognized control tokens along the pipeline. Reconfiguration processing circuits are positioned in selected stages and are responsive to a recognized control token for reconfiguring such stage to handle an identified DATA Token. A wide variety of unique supporting subsystem circuitry and processing techniques are disclosed for implementing the system, including memory addressing, transforming data using a common processing block, time synchronization, asynchronous swing buffering, storing of video information, a parallel Huffman decoder, and the like.

6 Claims, 157 Drawing Sheets

U.S. PATENT DOCUMENTS

| | | | |
|---|---|---|---|
| 4,149,242 | 4/1979 | Pirz | 364/200 |
| 4,196,448 | 4/1980 | Whitehouse et al. | 358/135 |
| 4,215,369 | 7/1980 | Iijima | 358/146 |
| 4,302,775 | 11/1981 | Widergren et al. | 358/136 |
| 4,334,246 | 6/1982 | Saran | 358/261 |
| 4,433,308 | 2/1984 | Hirata | 331/17 |
| 4,437,072 | 3/1984 | Asami | 331/1 A |
| 4,495,629 | 1/1985 | Zasio et al. | 377/70 |
| 4,540,903 | 9/1985 | Cooke et al. | 307/465 |
| 4,580,066 | 4/1986 | Berndt | 307/276 |
| 4,630,198 | 12/1986 | I Yuan | 364/200 |
| 4,646,151 | 2/1987 | Welles, II, et al. | 358/149 |
| 4,679,163 | 7/1987 | Arnould et al. | 364/725 |
| 4,726,019 * | 2/1988 | Adelmann et al. | 370/60 |
| 4,747,070 | 5/1988 | Trottier et al. | 364/900 |
| 4,785,349 | 11/1988 | Keith et al. | 358/136 |
| 4,789,927 | 12/1988 | Hannah | 364/200 |
| 4,799,677 | 1/1989 | Frederiksen | 273/1 E |
| 4,823,201 | 4/1989 | Simon et al. | 358/133 |
| 4,829,465 | 5/1989 | Knauer et al. | 364/725 |
| 4,831,321 * | 5/1989 | Rutherford, Jr. | 364/DIG. 1 |
| 4,831,440 | 5/1989 | Borgers et al. | 358/133 |
| 4,849,922 | 7/1989 | Riolfo | 364/725 |
| 4,866,510 | 9/1989 | Goodfellow et al. | 358/13 |
| 4,866,637 | 9/1989 | Gonzalez-Lopez et al. | 364/518 |
| 4,887,224 | 12/1989 | Okano et al. | 364/518 |
| 4,891,784 | 1/1990 | Kato et al. | 364/900 |
| 4,894,823 * | 1/1990 | Adelmann et al. | 370/60 |
| 4,903,018 | 2/1990 | Wiebach et al. | 341/51 |
| 4,912,668 | 3/1990 | Aubie et al. | 364/725 |
| 4,922,341 | 5/1990 | Strobach | 358/136 |
| 4,924,298 | 5/1990 | Kitamura | 358/12 |
| 4,924,308 | 5/1990 | Feuchtwanger | 358/133 |
| 4,975,595 | 12/1990 | Roberts et al. | 307/272.2 |
| 4,991,112 | 2/1991 | Callemyn | 364/518 |
| 5,003,204 | 3/1991 | Cushing et al. | 307/465 |
| 5,027,212 | 6/1991 | Marlton et al. | 358/183 |
| 5,038,209 | 8/1991 | Hang | 358/136 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,091,721 | 2/1992 | Hamori | 340/727 |
| 5,107,345 | 4/1992 | Lee | 358/432 |
| 5,111,292 | 5/1992 | Kuriacose et al. | 358/133 |
| 5,113,255 | 5/1992 | Nagata et al. | 358/136 |
| 5,122,873 | 6/1992 | Golin | 358/133 |
| 5,122,875 | 6/1992 | Raychaudhuri et al. | 358/133 |
| 5,124,790 | 6/1992 | Nakayama | 358/133 |
| 5,126,842 | 6/1992 | Andrews et al. | 358/133 |
| 5,129,059 | 7/1992 | Hannah | 395/166 |
| 5,130,568 | 7/1992 | Miller et al. | 307/272.2 |
| 5,134,487 | 7/1992 | Taguchi et al. | 358/209 |
| 5,134,697 | 7/1992 | Scheffler | 395/425 |
| 5,136,371 | 8/1992 | Savatier et al. | 358/133 |
| 5,142,380 | 8/1992 | Sakagami et al. | 358/432 |
| 5,146,325 | 9/1992 | Ng | 358/135 |
| 5,146,326 | 9/1992 | Hasegawa | 358/135 |
| 5,148,271 | 9/1992 | Kato et al. | 358/133 |
| 5,148,524 | 9/1992 | Harlin et al. | 395/166 |
| 5,151,875 | 9/1992 | Sato | 364/784 |
| 5,159,449 | 10/1992 | Allmendinger | 358/136 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,175,617 | 12/1992 | Wallace et al. | 358/133 |
| 5,179,372 | 1/1993 | West et al. | 340/799 |
| 5,182,642 | 1/1993 | Gersdorff et al. | 358/133 |
| 5,184,124 | 2/1993 | Molpus et al. | 341/50 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,201,056 | 4/1993 | Daniel et al. | 395/800 |
| 5,202,847 | 4/1993 | Bolton et al. | 364/725 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,216,724 | 6/1993 | Suzuki et al. | 382/7 |
| 5,223,926 | 6/1993 | Stone et al. | 358/133 |
| 5,227,878 | 7/1993 | Puri et al. | 358/136 |
| 5,228,098 | 7/1993 | Crinon et al. | 382/56 |
| 5,229,863 | 7/1993 | Kao et al. | 358/426 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,233,690 | 8/1993 | Sherlock et al. | 395/165 |
| 5,237,413 | 8/1993 | Israelsen et al. | 358/160 |
| 5,241,222 | 8/1993 | Small et al. | 307/449 |
| 5,241,383 | 8/1993 | Chen et al. | 358/136 |
| 5,241,658 | 8/1993 | Masterson et al. | 395/162 |
| 5,247,612 | 9/1993 | Quinard | 395/166 |
| 5,249,146 | 9/1993 | Uramoto et al. | 364/725 |
| 5,253,058 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,257,350 | 10/1993 | Howard et al. | 395/162 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,261,047 | 11/1993 | Rivshin | 395/163 |
| 5,263,136 | 11/1993 | DeAguiar et al. | 395/164 |
| 5,267,334 | 11/1993 | Normille et al. | 382/56 |
| 5,276,513 | 1/1994 | van der Wal et al. | 358/136 |
| 5,276,681 | 1/1994 | Tobagi et al. | 370/85.4 |
| 5,276,784 | 1/1994 | Ohki | 395/127 |
| 5,278,520 | 1/1994 | Parker et al. | 331/1 A |
| 5,278,646 | 1/1994 | Civanlar et al. | 358/133 |
| 5,278,647 | 1/1994 | Hingorani et al. | 358/136 |
| 5,283,646 | 2/1994 | Bruder | 348/415 |
| 5,287,178 | 2/1994 | Acampora et al. | 348/384 |
| 5,287,193 | 2/1994 | Lin | 358/261.1 |
| 5,287,420 | 2/1994 | Barrett | 382/56 |
| 5,289,276 | 2/1994 | Siracusa et al. | 348/467 |
| 5,289,577 | 2/1994 | Gonzales et al. | 395/163 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,242 | 4/1994 | Gonzales et al. | 382/56 |
| 5,301,272 | 4/1994 | Atkins | 395/165 |
| 5,303,342 | 4/1994 | Edge | 395/164 |
| 5,304,953 | 4/1994 | Heim et al. | 331/1 A |
| 5,305,438 | 4/1994 | MacKay et al. | 395/164 |
| 5,309,527 | 5/1994 | Ohki | 382/56 |
| 5,311,309 | 5/1994 | Ersoz et al. | 348/409 |
| 5,345,408 | 9/1994 | Hoogenboom | 364/725 |
| 5,351,047 | 9/1994 | Behlen | 341/67 |
| 5,420,801 * | 5/1995 | Docktor et al. | 356/514 R |
| 5,477,263 * | 12/1995 | O'Callaghan et al. | 455/4.2 |
| 5,479,364 | 12/1995 | Jones et al. | 364/725 |
| 5,481,555 | 1/1996 | Wade et al. | 371/57.2 |

5,488,730 * 1/1996 Brown, III et al. .................. 395/800

FOREIGN PATENT DOCUMENTS

| 0572262 | 12/1993 | (EP) . |
| 0572263 | 12/1993 | (EP) . |
| 0576749 | 1/1994  | (EP) . |
| 0589734 | 3/1994  | (EP) . |
| 0618728 | 10/1994 | (EP) . |
| 0624983 | 11/1994 | (EP) . |
| 0639032 | 2/1995  | (EP) . |
| 2045035 | 10/1980 | (GB) . |
| 2059724 | 4/1981  | (GB) . |
| 2171578 | 8/1986  | (GB) . |
| 2194085 | 2/1988  | (GB) . |
| 2268035 | 12/1993 | (GB) . |
| 2269070 | 1/1994  | (GB) . |

OTHER PUBLICATIONS

Komori et al., An Elastic Pipeline Mechanism By Self–Timed Circuits, IEEE Journal Of Solid–State Circuits, vol. 23, No. 1, Feb. 1988, New York, NY, USA, pp. 111–117.

A. Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 553–557.

H.R. Wu, et al., "A Two Dimensional Fast Cosine Transform Algorithm Based on Hou's Approach, " IEEE Transaction on Acoustics, Speech, and Signal Processing, vol. 39, No. 2, Feb. 1991, IEEE Press, New York, US, pp. 544–546.

* cited by examiner

| FIXED WIDTH WORD FOR ADDRESSING | | | | | |
|---|---|---|---|---|---|
| WIDTH DEFINING FIELD | | ADDRESS FIELD | | | SUBSTITUTION INDICATOR |
| | | | SUBSTITUTION FIELD | | |
| CONTINUATION MARKERS | TERMINATION MARKER | | TERMINATION MARKER | CONTINUATION MARKERS | |
| uu. . . . . . . . . .uu | vv. . . . . . . . . .vv | aa. . . . . . . . . .aa | yy. . . . . . . . . .yy | xx. . . . . . . . . .xx | ww. . . . . . . . . .ww |
| 000 | 1 | 1101 | 1 | 000 | 0 |
| 111 | 0 | 1101 | 0 | 111 | 1 |

FIG. 2

| FIXED WIDTH WORD FOR ADDRESSING | | | |
|---|---|---|---|
| ADDRESS FIELD | | | SUBSTITUTION INDICATOR |
| | SUBSTITUTION FIELD | | |
| | TERMINATION MARKER | | |
| aa. . . . . . . . . .aa | yy. . . . . . . . . .yy | xx. . . . . . . . . .xx | ww. . . . . . . . . .ww |

FIG. 7

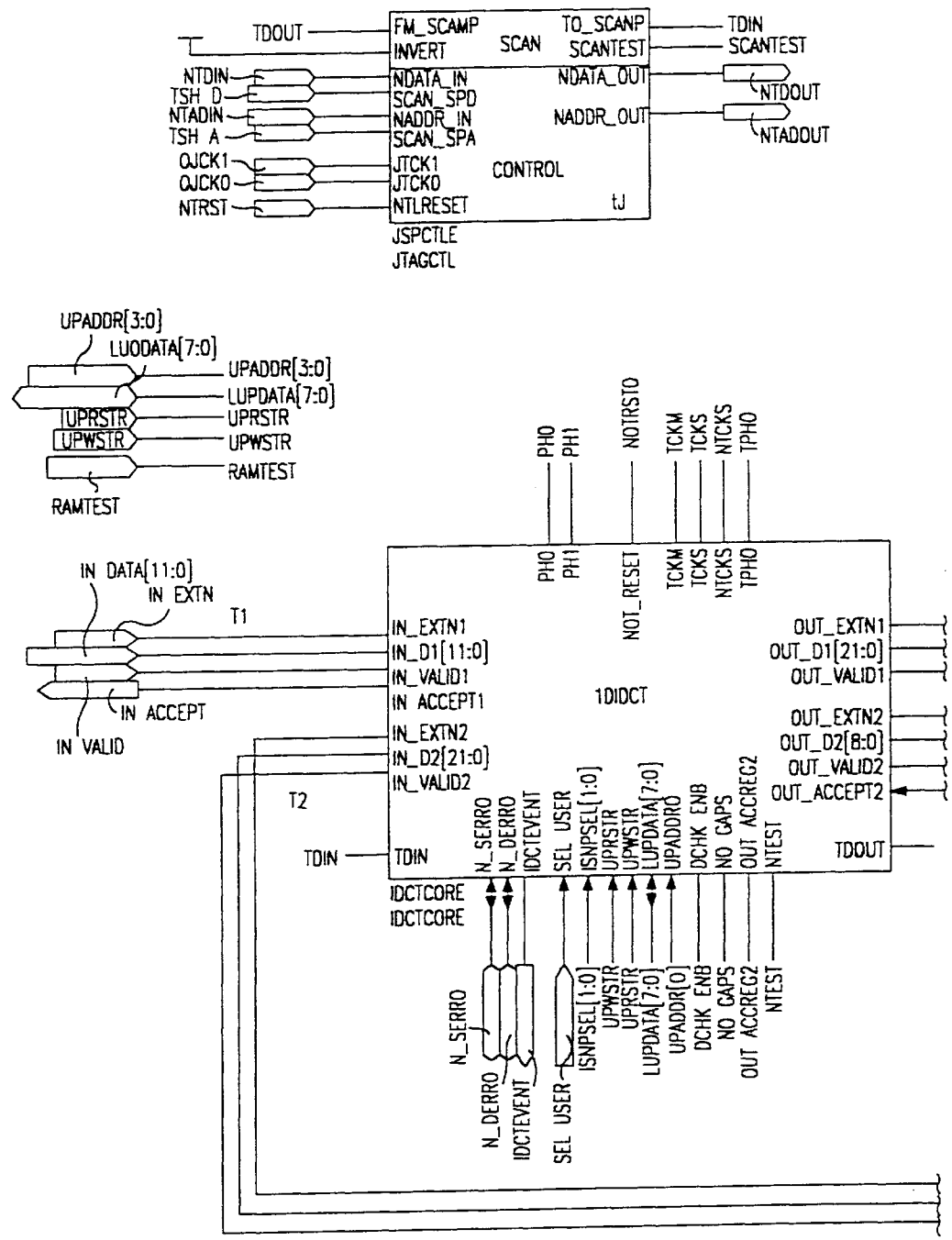
FIG. 16a
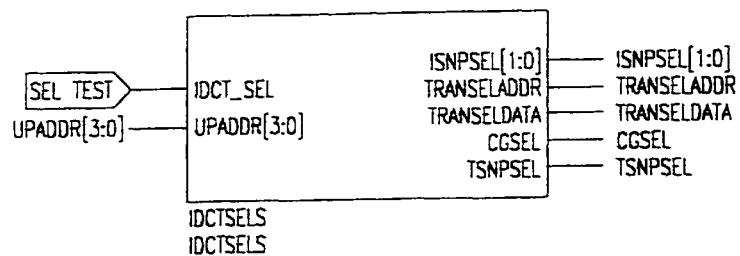

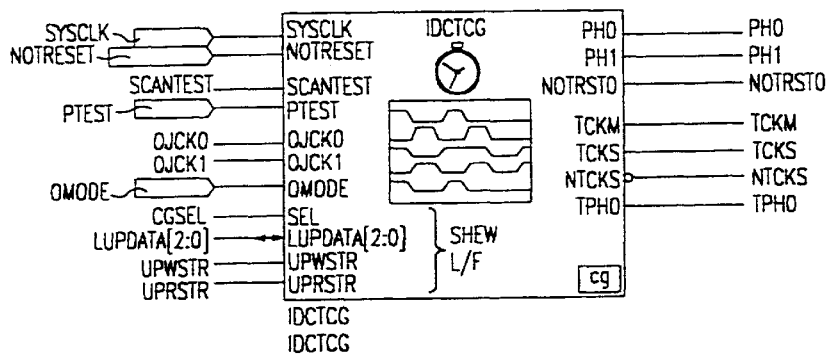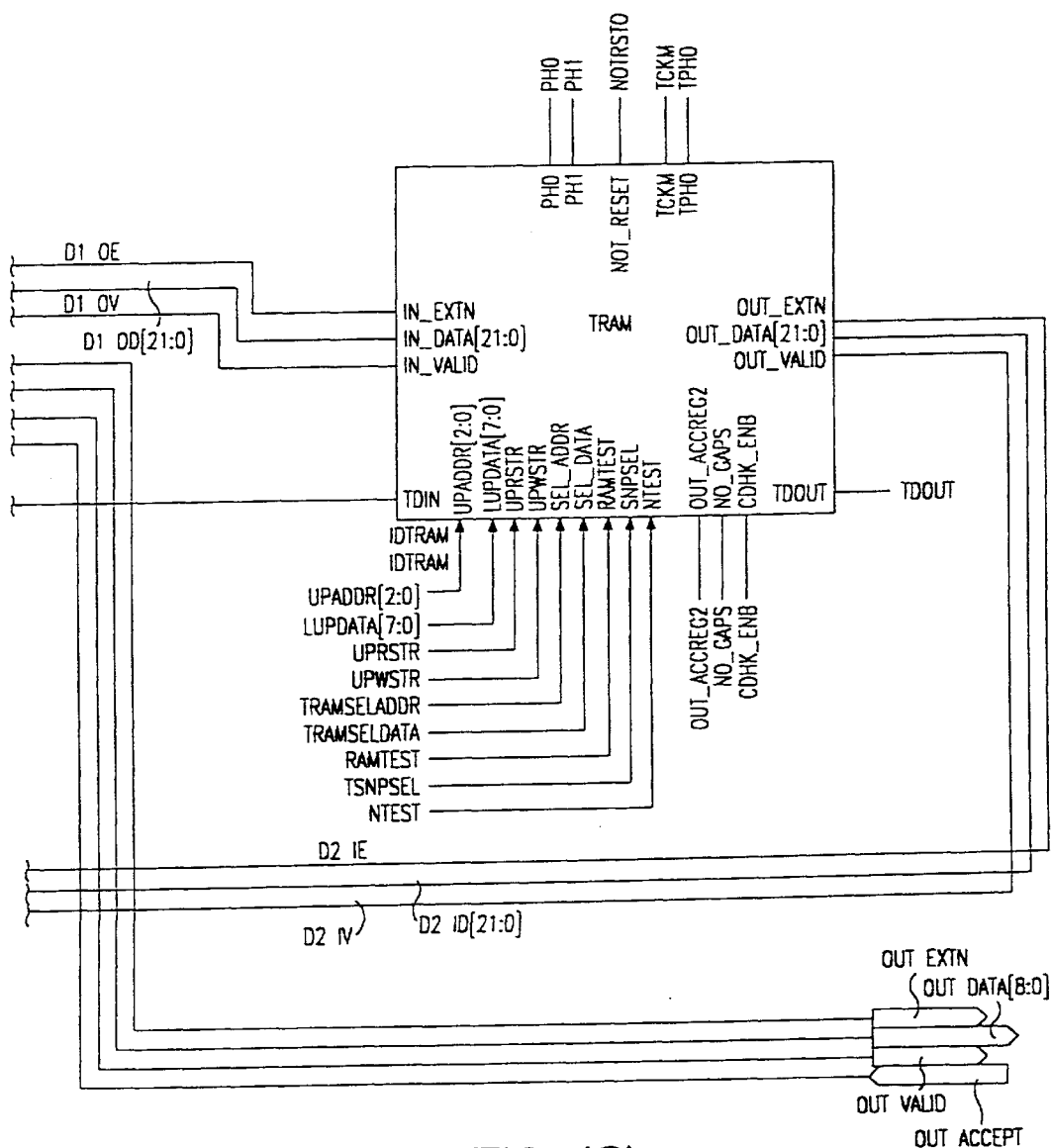
FIG. 16b

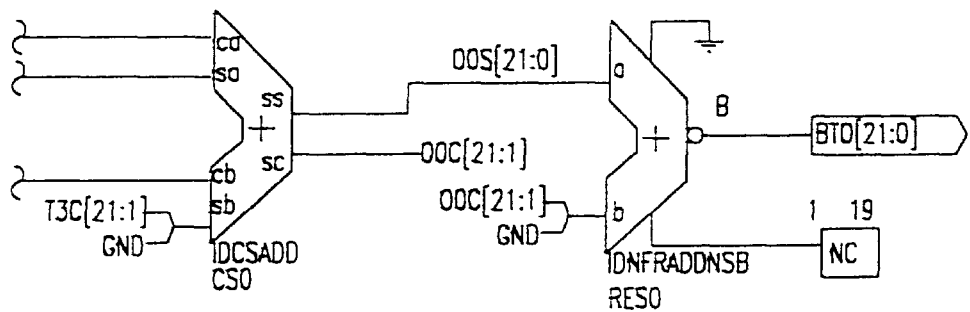
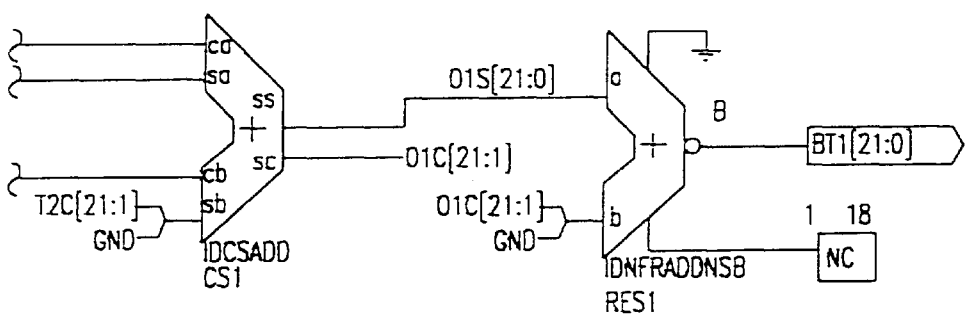
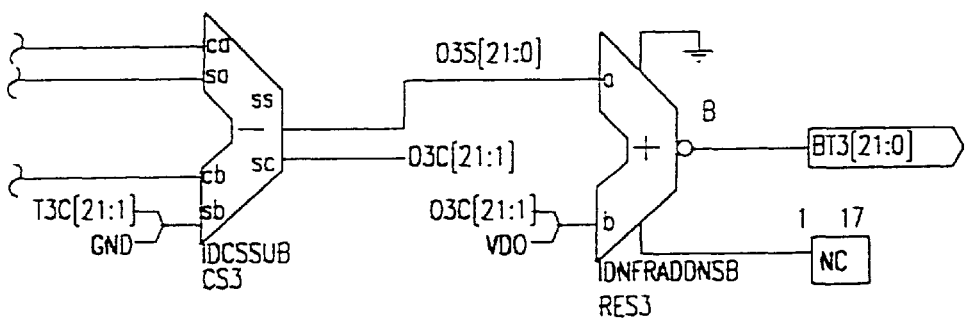
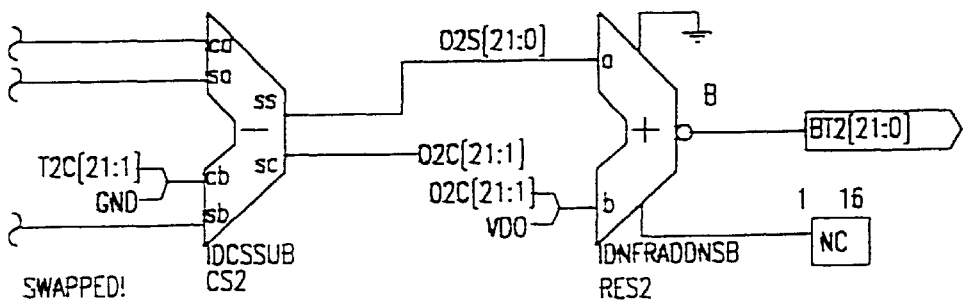
FIG. 21b

STANDARD DATA TELEN DECODER.
WILL RECOGNIZE DATA, NONE, AND OTHER TELENO.
CODING >
| telen[1] | telen[0] | |
|----------|----------|---------|
| 0 | 0 | NONE |
| 0 | 0 | OTHER |
| 1 | 1 | DATA |
| 1 | 1 | illegal |
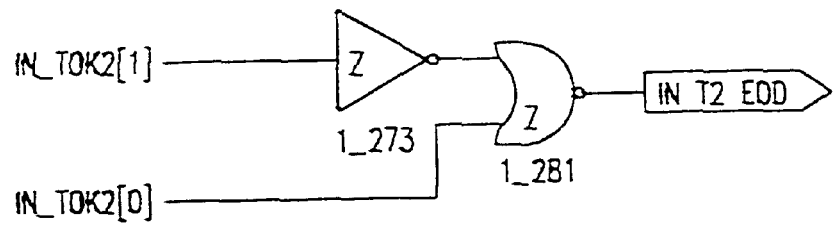
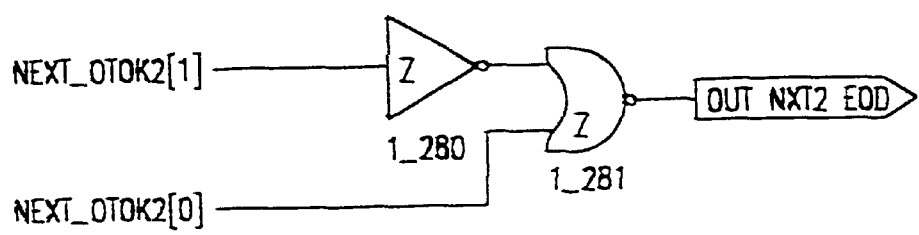
FIG. 31c

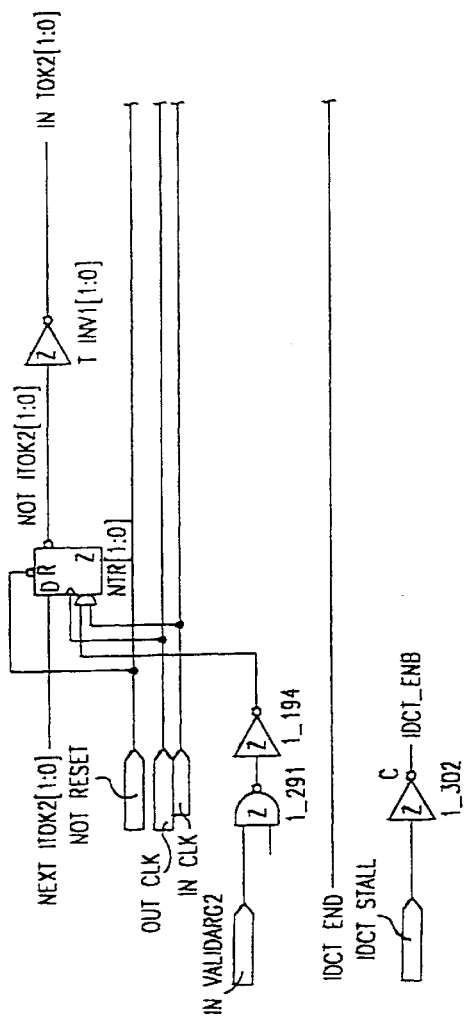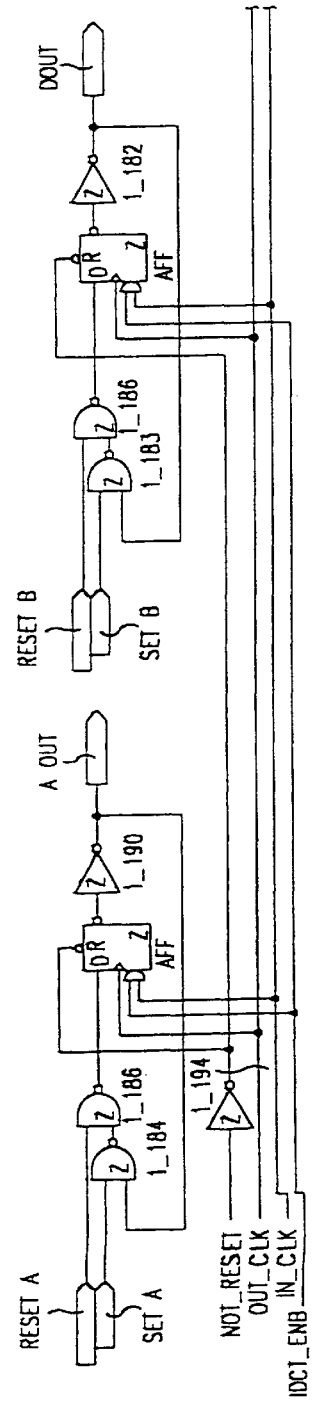
FIG. 3ld

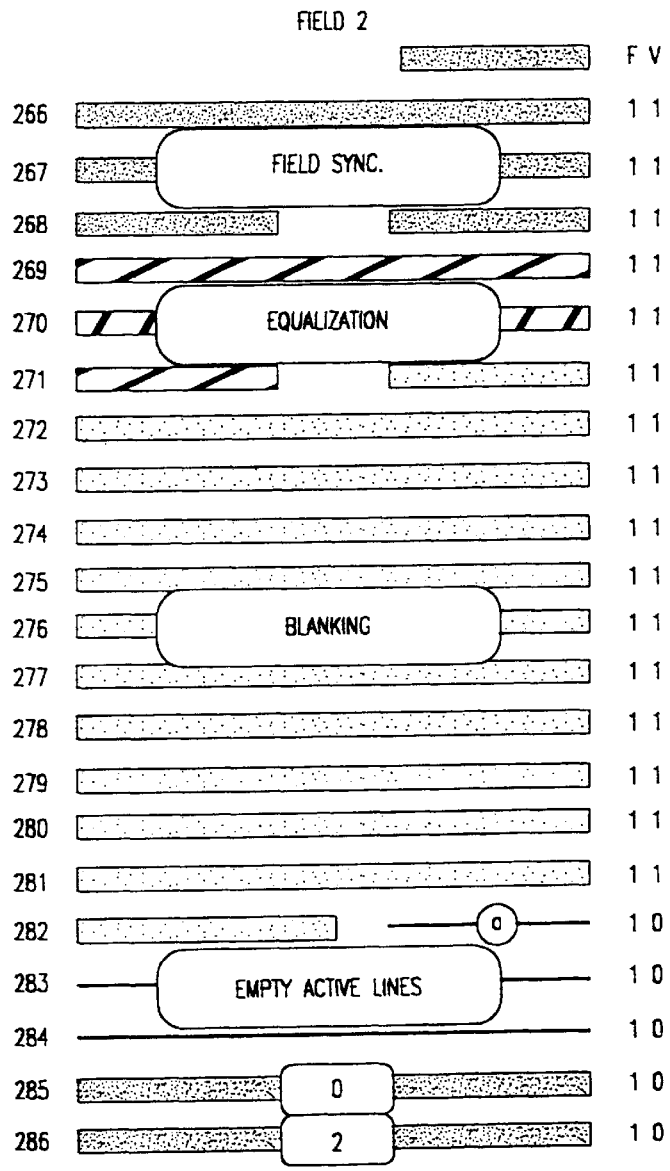
FIG. 112b
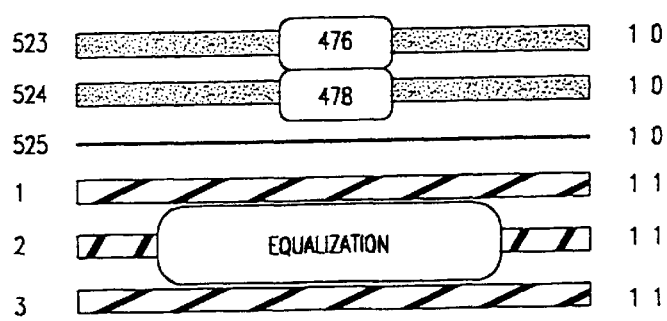
a:CBLANK IS ACTIVE BUT Y[7:0] STILL OUTPUT BLANKING a: CBLANK IS INACTIVE BUT Y[7:0] STILL OUTPUT BLANKING

APPARATUS AND METHOD FOR PROCESSING DATA WITH AN ARITHMETIC UNIT

This application is a division of application Ser. No. 08/473,813, filed Jun. 7, 1995. This application claims priority under British Application Serial No. 9415413.5 filed Jul. 29, 1994.

INTRODUCTION

The present invention relates generally to a new and improved system for decoding a plurality of audio and video signals and, more particularly, to a new and improved system for decoding a plurality of MPEG audio and video signals.

A serial pipeline processing system of the present invention comprises a single two-wire bus used for carrying unique and specialized interactive interfacing tokens, in the form of control tokens and data tokens, to a plurality of adaptive decompression circuits and the like positioned as a reconfigurable pipeline processor.

PRIOR ART

U.S. Pat. No. 5,111,292 discloses an apparatus for encoding/decoding a HDTV signal for e.g. terrestrial transmission includes a priority selection processor for parsing compressed video codewords between high and low priority channels for transmission. A compression circuit responsive to high definition video source signals provides hierarchically layered codewords CW representing compressed video data and associated codewords T, defining the types of data represented by codewords CW. The priority selection processor, responsive to the codewords CW and T, counts the number of bits in predetermined blocks of data and determines the number of bits in each block to be allocated to the respective channels. Thereafter the processor parses the codewords CW into high and low priority codeword sequences wherein the high and low priority codeword sequences correspond to compressed video data of relatively greater and lesser importance to image reproduction respectively.

One prior art system is described in U.S. Pat. No. 5,216,724. The apparatus comprises a plurality of compute modules, in a preferred embodiment, for a total of four compute modules coupled in parallel. Each of the compute modules has a processor, dual port memory, scratch-pad memory, and an arbitration mechanism. A first bus couples the compute modules and a host processor. The device comprises a shared memory which is coupled to the host processor and to the compute modules with a second bus.

U.S. Pat. No. 4,785,349 discloses a full motion color digital video signal that is compressed, formatted for transmission, recorded on compact disc media and decoded at conventional video frame rates. During compression, regions of a frame are individually analyzed to select optimum fill coding methods specific to each region. Region decoding time estimates are made to optimize compression thresholds. Region descriptive codes conveying the size and locations of the regions are grouped together in a first segment of a data stream. Region fill codes conveying pixel amplitude indications for the regions are grouped together according to fill code type and placed in other segments of the data stream. The data stream segments are individually variable length coded according to their respective statistical distributions and formatted to form data frames. The number of bytes per frame is withered by the addition of auxiliary data determined by a reverse frame sequence analysis to provide an average number selected to minimize pauses of the compact disc during playback thereby avoiding unpredictable seek mode latency periods characteristic of compact discs. A decoder includes a variable length decoder responsive to statistical information in the code stream for separately variable length decoding individual segments of the data stream. Region location data is derived from region descriptive data and applied with region fill codes to a plurality of region specific decoders selected by detection of the fill code type (e.g., relative, absolute, dyad and DPCM) and decoded region pixels are stored in a bit map for subsequent display.

U.S. Pat. No. 4,922,341 discloses a method for scene-model-assisted reduction of image data for digital television signals, whereby a picture signal supplied at time is to be coded, whereby a predecessor frame from a scene already coded at time t-1 is present in an image store as a reference, and whereby the frame-to-frame information is composed of an amplification factor, a shift factor, and an adaptively acquired quad-tree division structure. Upon initialization of the system, a uniform, prescribed gray scale value or picture half-tone expressed as a defined luminance value is written into the image store of a coder at the transmitter and in the image store of a decoder at the receiver store, in the same way for all picture elements (pixels). Both the image store in the coder as well as the image store in the decoder are each operated with feed back to themselves in a manner such that the content of the image store in the coder and decoder can be read out in blocks of variable size, can be amplified with a factor greater than or less than 1 of the luminance and can be written back into the image store with shifted addresses, whereby the blocks of variable size are organized according to a known quad tree data structure.

U.S. Pat. No. 5,122,875 discloses an apparatus for encoding/decoding an HDTV signal. The apparatus includes a compression circuit responsive to high definition video source signals for providing hierarchically layered codewords CW representing compressed video data and associated codewords T, defining the types of data represented by the codewords CW. A priority selection circuit, responsive to the codewords CW and T, parses the codewords CW into high and low priority codeword sequences wherein the high and low priority codeword sequences correspond to compressed video data of relatively greater and lesser importance to image reproduction respectively. A transport processor, responsive to the high and low priority codeword sequences, forms high and low priority transport blocks of high and low priority codewords, respectively. Each transport block includes a header, codewords CW and error detection check bits. The respective transport blocks are applied to a forward error check circuit for applying additional error check data. Thereafter, the high and low priority data are applied to a modem wherein quadrature amplitude modulates respective carriers for transmission.

U.S. Pat. No. 5,146,325 discloses a video decompression system for decompressing compressed image data wherein odd and even fields of the video signal are independently compressed in sequences of intraframe and interframe compression modes and then interleaved for transmission. The odd and even fields are independently decompressed. During intervals when valid decompressed odd/even field data is not available, even/odd field data is substituted for the unavailable odd/even field data. Independently decompressing the even and odd fields of data and substituting the opposite field of data for unavailable data may be used to advantage to reduce image display latency during system start-up and channel changes.

U.S. Pat. No. 5,168,356 discloses a video signal encoding system that includes apparatus for segmenting encoded video data into transport blocks for signal transmission. The transport block format enhances signal recovery at the receiver by virtue of providing header data from which a receiver can determine re-entry points into the data stream on the occurrence of a loss or corruption of transmitted data. The re-entry points are maximized by providing secondary transport headers embedded within encoded video data in respective transport blocks.

U.S. Pat. No. 5,168,375 discloses a method for processing a field of image data samples to provide for one or more of the functions of decimation, interpolation, and sharpening. This is accomplished by an array transform processor such as that employed in a JPEG compression system. Blocks of data samples are transformed by the discrete even cosine transform (DECT) in both the decimation and interpolation processes, after which the number of frequency terms is altered. In the case of decimation, the number of frequency terms is reduced, this being followed by inverse transformation to produce a reduced-size matrix of sample points representing the original block of data. In the case of interpolation, additional frequency components of zero value are inserted into the array of frequency components after which inverse transformation produces an enlarged data sampling set without an increase in spectral bandwidth. In the case of sharpening, accomplished by a convolution or filtering operation involving multiplication of transforms of data and filter kernel in the frequency domain, there is provided an inverse transformation resulting in a set of blocks of processed data samples. The blocks are overlapped followed by a savings of designated samples, and a discarding of excess samples from regions of overlap. The spatial representation of the kernel is modified by reduction of the number of components, for a linear-phase filter, and zero-padded to equal the number of samples of a data block, this being followed by forming the discrete odd cosine transform (DOCT) of the padded kernel matrix.

U.S. Pat. No. 5,175,617 discloses a system and method for transmitting logmap video images through telephone line band-limited analog channels. The pixel organization in the logmap image is designed to match the sensor geometry of the human eye with a greater concentration of pixels at the center. The transmitter divides the frequency band into channels, and assigns one or two pixels to each channel, for example a 3 KHz voice quality telephone line is divided into 768 channels spaced about 3.9 Hz apart. Each channel consists of two carrier waves in quadrature, so each channel can carry two pixels. Some channels are reserved for special calibration signals enabling the receiver to detect both the phase and magnitude of the received signal. If the sensor and pixels are connected directly to a bank of oscillators and the receiver can continuously receive each channel, then the receiver need not be synchronized with the transmitter. An FFT algorithm implements a fast discrete approximation to the continuous case in which the receiver synchronizes to the first frame and then acquires subsequent frames every frame period. The frame period is relatively low compared with the sampling period so the receiver is unlikely to lose frame synchrony once the first frame is detected. An experimental video telephone transmitted 4 frames per second, applied quadrature coding to 1440 pixel logmap images and obtained an effective data transfer rate in excess of 40,000 bits per second.

U.S. Pat. No. 5,185,819 discloses a video compression system having odd and even fields of video signal that are independently compressed in sequences of intraframe and interframe compression modes. The odd and even fields of independently compressed data are interleaved for transmission such that the intraframe even field compressed data occurs midway between successive fields of intraframe odd field compressed data. The interleaved sequence provides receivers with twice the number of entry points into the signal for decoding without increasing the amount of data transmitted.

U.S. Pat. No. 5,212,742 discloses an apparatus and method for processing video data for compression/decompression in real-time. The apparatus comprises a plurality of compute modules, in a preferred embodiment, for a total of four compute modules coupled in parallel. Each of the compute modules has a processor, dual port memory, scratch-pad memory, and an arbitration mechanism. A first bus couples the compute modules and host processor. Lastly, the device comprises a shared memory which is coupled to the host processor and to the compute modules with a second bus. The method handles assigning portions of the image for each of the processors to operate upon.

U.S. Pat. No. 5,231,484 discloses a system and method for implementing an encoder suitable for use with the proposed ISO/IEC MPEG standards. Included are three cooperating components or subsystems that operate to variously adaptively pre-process the incoming digital motion video sequences, allocate bits to the pictures in a sequence, and adaptively quantize transform coefficients in different regions of a picture in a video sequence so as to provide optimal visual quality given the number of bits allocated to that picture.

U.S. Pat. No. 5,267,334 discloses a method of removing frame redundancy in a computer system for a sequence of moving images. The method comprises detecting a first scene change in the sequence of moving images and generating a first keyframe containing complete scene information for a first image. The first keyframe is known, in a preferred embodiment, as a "forward-facing" keyframe or intraframe, and it is normally present in CCITT compressed video data. The process then comprises generating at least one intermediate compressed frame, the at least one intermediate compressed frame containing difference information from the first image for at least one image following the first image in time in the sequence of moving images. This at least one frame being known as an interframe. Finally, detecting a second scene change in the sequence of moving images and generating a second keyframe containing complete scene information for an image displayed at the time just prior to the second scene change, known as a "backward-facing" keyframe. The first keyframe and the at least one intermediate compressed frame are linked for forward play, and the second keyframe and the intermediate compressed frames are linked in reverse for reverse play. The intraframe may also be used for generation of complete scene information when the images are played in the forward direction. When this sequence is played in reverse, the backward-facing keyframe is used for the generation of complete scene information.

U.S. Pat. No. 5,276,513 discloses a first circuit apparatus, comprising a given number of prior-art image-pyramid stages, together with a second circuit apparatus, comprising the same given number of novel motion-vector stages, perform cost-effective hierarchical motion analysis (HMA) in real-time, with minimum system processing delay and/or employing minimum system processing delay and/or employing minimum hardware structure. Specifically, the first and second circuit apparatus, in response to relatively high-resolution image data from an ongoing input series of successive given pixel-density image-data frames that occur at a relatively high frame rate (e.g., 30 frames per second), derives, after a certain processing-system delay, an ongoing output series of successive given pixel-density vector-data frames that occur at the same given frame rate. Each vector-data frame is indicative of image motion occurring between each pair of successive image frames.

U.S. Pat. No. 5,283,646 discloses a method and apparatus for enabling a real-time video encoding system to accurately deliver the desired number of bits per frame, while coding the image only once, updates the anqutization step size used to quantize coefficients which describe, for example, an image to be transmitted over a communications channel. The data is divided into sectors, each sector including a plurality of blocks. The blocks are encoded, for example, using DCT coding, to generate a sequence of coefficients for each block. The coefficients can be quantized, and depending upon the quantization step, the number of bits required to describe the data will vary significantly. At the end of the transmission of each sector of data, the accumulated actual number of bits expended is compared with the accumulated desired number of bits expended, for a selected number of sectors associated with the particular group of data. The system then readjusts the quantization step size to target a final desired number of data bits for a plurality of sectors, for example describing an image. Various methods are described for updating the quantization step size and determining desired bit allocations.

U.S. Pat. No. 5,287,420 discloses a method and apparatus for image compression suitable for personal computer applications, which compresses and stores data in two steps. An image is captured in realtime and compressed using an efficient method and stored to a hard-disk. At some later time, the data is further compressed in non-realtime using a computationally more intense algorithm that results in a higher compression ratio. The two-step approach allows the storage reduction benefits of a highly sophisticated compression algorithm to be achieved without requiring the computational resources to perform this algorithm in real-time. A compression algorithm suitable for performing the first compression step on a host processor in a personal computer is also described. The first compression step accepts 4:2:2 YCrCb data from the video digitizer. The two chrominance components are averaged and a pseudo-random number is added to all components. The resulting values are quantized and packed into a single 32-bit word representing a 2×2 array of pixels. The seed value for the pseudo-random number is remembered so that the pseudo-random noise can be removed before performing the second compression step U.S. Pat. No. 5,289,577 discloses a method and apparatus for a sequential process-pipeline which has a first processing stage coupled to a CODEC through a plurality of buffers, including an image data input buffer, an image data output buffer and an address buffer. The address buffer stores addresses, each of which identifies an initial address of a block of addresses within an image memory. Each block of addresses in the image memory stores a block of decompressed image data. A local controller is responsive to the writing of an address into the address buffer to initiate the operation of the CODEC to execute a Discrete Cosine Transformation Process and a Discrete Cosine Transformation Quantization Process.

The article, Chong, Yong M., *A Data-Flow Architecture for Digital Image Processing,* Wescon Technical Papers: No. 2 Oct./Nov. 1984, discloses a real-time signal processing system specifically designed for image processing. More particularly, a token based data-flow architecture is disclosed wherein the tokens are of a fixed one word width having a fixed width address field. The system contains a plurality of identical flow processors connected in a ring fashion. The tokens contain a data field, a control field and a tag. The tag field of the token is further broken down into a processor address field and an identifier field. The processor address field is used to direct the tokens to the correct data-flow processor, and the identifier field is used to label the data such that the data-flow processor knows what to do with the data. In this way, the identifier field acts as an instruction for the data-flow processor. The system directs each token to a specific data-flow processor using a module number (MN). If the MN matches the MN of the particular stage, then the appropriate operations are performed upon the data. If unrecognized, the token is directed to an output data bus.

The article, Kimori, S. et al. *An Elastic Pipeline Mechanism by Self-Timed Circuits,* IEEE J. of Solid-State Circuits, Vol. 23, No1,. February 1988, discloses an elastic pipeline having self-timed circuits. The asynchronous pipeline comprises a plurality of pipeline stages. Each of the pipeline stages consists of a group of input data latches followed by a combinatorial logic circuit that carries out logic operations specific to the pipeline stages. The data latches are simultaneously supplied with a triggering signal generated by a data-transfer control circuit associated with that stage. The data-transfer control circuits are interconnected to form a chain through which send and acknowledge signal lines control a hand-shake mode of data transfer between the successive pipeline stages. Furthermore, a decoder is generally provided in each stage to select operations to be done on the operands in the present stage. It is also possible to locate the decoder in the preceding stage in order to pre-decode complex decoding processing and to alleviate critical path problems in the logic circuit. The elastic nature of the pipeline eliminates any centralized control since all the interworkings between the submodules are determined by a completely localized decision and, in addition, each submodule can autonomously perform data buffering and self-timed data-transfer control at the same time. Finally, to increase the elasticity of the pipeline, empty stages are interleaved between the occupied stages in order to ensure reliable data transfer between the stages.

Accordingly, those skilled in the art have recognized a long felt need for a new and improved video decompression system obviating the deficiencies of the prior art systems. The present invention clearly fulfills this need.

SUMMARY OF INVENTION

Briefly, and in general terms, the present invention provides a new and improved method and apparatus particularly adapted for use in a two-wire pipeline system having various control and DATA tokens. The major elements of the system may include a Start Code Detector, a Video Parser incorporating a Huffman Decoder and a Microprogrammable State Machine (MSM), an Inverse Discrete Cosine Transform (IDCT), a synchronous DRAM controller with an associated address generation unit, appropriate prediction circuitry and display circuitry which includes upsampling and video timing generation.

More importantly, various embodiments of the invention may include an MPEG video decompression method and apparatus utilizing a plurality of stages interconnected by a two-wire interface arranged as a pipeline processing machine. Control tokens and DATA Tokens pass over the single two-wire interface for carrying both control and data in token format. A token decoder circuit is positioned in certain of the stages for recognizing certain of the tokens as control tokens pertinent to that stage and for passing unrecognized control tokens along the pipeline. Reconfiguration processing circuits are positioned in selected stages and are responsive to a recognized control token for reconfiguring such stage to handle an identified DATA Token. A wide variety of unique supporting subsystem circuitry and processing techniques are disclosed for implementing the system, including memory addressing, transforming data using a common processing block, time synchronization, asynchronous swing buffering, storing of video information, a parallel Huffman decoder, and the like.

By way of example, and not necessarily by way of limitation, the present invention may include among its various features an apparatus for synchronizing time having, a time stamp for determining presentation time, a clock reference for initializing system time in a first circuit, a first time counter in communication with the clock reference for keeping system time in a first circuit and a second time counter initialized by the clock reference in a second circuit synchronized with the first time counter, for keeping a local copy of the system time and for determining the presentation timing error between the local copy of system time and system time by comparing the time stamp to the second time counter. It further includes an apparatus for synchronizing a system decoder and a video decoder using a time stamp for determining display time, a clock reference for initializing system time in the system decoder, a first time counter in communication with the clock reference for keeping system time in the system decoder and a second time counter initialized by the clock reference in the video decoder synchronized with the first time counter, for keeping a local copy of system time and for determining the display timing error between the local copy of system time and system time by comparing the time stamp to the second time counter.

Still another embodiment of the invention includes an apparatus for synchronizing a first circuit and a second circuit using a clock reference for initializing system time in the first circuit, a first circuit having a time counter in communication with the clock reference for keeping system time, a first elementary stream time counter in the first circuit for providing elementary stream time. The first circuit is adapted to receive a time stamp, and the first circuit generates synchronization time by adding elementary stream time to the time stamp and subtracting system time. The second circuit is adapted to receive synchronization time from the first circuit and has a second elementary stream time counter in synchronization with the first elementary stream time counter for providing a local copy of the elementary stream time and for determining a timing error between the system time and the time stamp by comparing synchronization time to the local copy of elementary stream time. In this way, the clock reference signal does not have to be passed directly to the second circuit in order to determine the timing error.

In another embodiment of the invention, an apparatus for synchronizing a first circuit and a second circuit has a clock reference for initializing system time in the first circuit. The first circuit has a time counter in communication with the clock reference for keeping system time, and a first video time counter for providing video decoding time. The first circuit is adapted to receive a video time stamp and subtracting system time. The second circuit is adapted to receive synchronization time from the first circuit and has a second video time counter in synchronization with the first video time counter for providing a local copy of video decoding time and for determining a timing error between system time and the video time stamp by comparing synchronization time to the local copy of video decoding time. Accordingly, the clock reference signal does not have to be passed directly to the second circuit in order to determine the timing error.

The present invention also includes a method for providing timing information by providing a video data stream having a time stamp carried in packet header wherein the time stamp refers to the first picture in the packet of data. In the next step a register is provided having a flag used to indicate valid time stamp information which is taken from the packet header and placed into the register. Next, the time stamp is removed from the video data stream and placed in the register. Next, the method encounters a picture start and subsequently examines the status of the register to determine if valid time stamp information is contained in the register by checking the flag status. A time stamp is generated in response to the picture start if the flag indicates valid time stamp information is contained in the register and then the time stamp is inserted back into the data stream.

Another embodiment of the invention includes an apparatus described above wherein the elementary stream time counters are restricted to 16 bits. Likewise, there is an apparatus as described above, wherein the second elementary stream time counter located in the elementary stream decoder is restricted to 16 bits. Furthermore, there is an apparatus as described above wherein the synchronization time is restricted to 16 bits for controlling the elementary stream decoder.

The present invention also has a process for decoding video and for determining display time errors against a threshold value. It then parses video data into tokens for further processing, determining if a time stamp token is indicated, comparing the time stamp token to a video time, and generates a compared value to determine an indicative of timing error. Next, it determines whether the compared value, when compared against a threshold value, is within acceptable parameters when a timing error is indicated and indicates when the compared value is outside acceptable parameters.

An alternative embodiment of the invention includes an apparatus for using a system decoder and a video decoder. The system decoder is adapted to accept MPEG system streams and demultiplexing video data and the video time stamp from the stream. The system decoder has a first time counter representative of system time. The video decoder accepts the video data and the video time stamp, and has a second time counter in synchronization with the first time counter. The video decoder also has a decoder buffer for accepting the video data at a substantially constant rate and outputting the video data at a varying rate and for passing a video time stamp. The video decoder while decoding a picture from the video data also compares the video time stamp for the decoded picture with the second time counter to determine the appropriate display time. There is also a method for determining a timing error between a first circuit and a second circuit by providing the first circuit with a system time (SY), a time stamp (TS), and an elementary stream time (ET), obtaining synchronization time (X) by using the elementary stream time (ET), the time stamp (TS), and the system time (SY), in accordance with the equation X=ET+TS−SY, providing synchronization time (X) to the second circuit and generating a synchronized elementary stream time (ET2) and obtaining a timing error by using synchronized time (X) and in accordance with the equation ET2−X. Hence, the first circuit can be time synchronized with the second circuit without passing system time to the second circuit.

Another method for determining a timing error between a first circuit and a second circuit has the following steps: providing the first circuit with a time stamp (TS), and an initial time (IT), obtaining a synchronization time (X) by using the time stamp (TS) and the initial time (IT), in accordance with the equation X=TS−1, providing synchronization time (X) to the second circuit and generating a synchronized elementary stream time (ET) and obtaining a timing error by using synchronized time (X) and in accordance with the equation ET−X. In this way, the first circuit can be time synchronized with the second circuit without passing system time to the second circuit.

Still another method for determining a timing error between a first circuit and a second circuit includes the following steps: providing the first circuit with a system time (SY), a video time stamp (VTS), and a video decoding time (VT), obtaining synchronization time (X) by using the video decoding time (VT), the video time stamp (VTS) and the system time (SY), in accordance with the equation X=VT+VTS−SY, providing synchronization time (X) to the second circuit and generating a video decoding time (VT2) in the second circuit which is synchronized to the video decoding time (VT) in the first circuit, and obtaining a time error by using synchronized time (X) and in accordance with the equation VT2−X. Accordingly, the first circuit can be time synchronized with the second circuit without passing system time to the second circuit.

In accordance with the present invention, the parallel Huffman decoder block will decode MPEG Huffman coded Variable Length Codes (VLCs) and Fixed Length Codes (FLCs), and pass through tokens under the control of the parser microprogrammable state Machine (MSM), and can sustain a high throughput.

In one embodiment of the invention a code lookup technique is employed to decode Huffman codes to achieve performance requirements and to handle the second MPEG-2 transform coefficient table which is irregular or non-canonical in nature. Practice of the invention also facilitates decoding certain more complex components from the stream in a single cycle without the assistance of an external controller. Examples of such complex components are Escape-coded coefficients, Intra-DC values and Motion Vector deltas, all of which are present in the stream as combined VLC/FLC components.

To decode a VLC, input is first loaded into the two input data registers handling most significant and least significant data. A selector is used to align the beginning of the next VLC with the ROM input. Hence, for a very first VLC, the selector outputs the top 28 bits of its 59-bit input and the top 16 bits of these are passed to a Huffman Code ROM. For subsequent VLCs, the selector effectively shifts the input according to the total count of bits decoded thus far. the count is maintained by adding the size of each VLC, as it is decoded, to a running total. The various word widths are a result of the maximum coded size which can be decoded, which is the 28-bit MPEG-1 Escape Coded Coefficient, and the maximum VLC size which is 16 bits (DCT coefficient tables).

The "table select" input is used to select between the various different Huffman code tables required by MPEG.

The ROM has addresses which are controlled with a selector/shifter. The ROM performs a VLC table index calculation, followed by the index-to-data operation that yields decoded data.

The index calculation is a content addressable memory (CAM) operation with "don't care" matching implemented to handle the Huffman codes which form the presented data. Since the index generation is performed in a look-up manner (rather than algorithmically) there is no restriction to handling tables which are canonical.

The ROM address of the present invention is in two fields. The larger field is the bit-pattern to be decoded, and the smaller field selects which Huffman code table is to be examined. In addition to the complete MPEG code tables, the ROM also has entries to identify illegal VLC patterns, which exist for some code tables.

In another embodiment of the invention, a procedure is used for providing a word with fixed width, having a fixed number of bits to be used for addressing variable width data, and having a width defining field and address field. There is also a procedure for addressing memory with a fixed width word, having a fixed number of bits, to be used for addressing data and having a substitution field and an address field, and an apparatus for addressing memory, including a state machine and an arithmetic core.

The procedure for addressing memory is characterized by providing a fixed width word having a predetermined fixed number of bits to be used for addressing variable width data, defining the fixed width word with a width defining field and an address field, providing the width defining field with at least one bit to serve as the termination marker, defining the address field with a plurality of bits defining the address of data, varying the size of bits in the address field in inverse relation to the size of the variable width data, varying the number of bits in the width defining field in direct relation to the size of the variable width data, and maintaining a fixed width word for addressing variable width data while varying the width of the width defining field and the address field.

The procedure for addressing memory may also include defining the address field with a plurality of bits defining the address of the data, defining a variable width substitution field with a least one substitution bit, the substitution field having at least one bit to serve as a termination marker between the address field and the substitution field, using the substitution field to indicate substituted bits from a separate addressing source, and maintaining a fixed width word for addressing variable width data while inversely varying the width of the address field and the width of the substitution field.

In accordance with the invention, a process for addressing variable width data in a memory may be characterized by providing a memory having words of predetermined width and composed of partial words, rotating the partial word to be accessed to a least significant bit justification, extending the remaining part of the word so that the accessed word will be recognized as a partial word, restoring the remaining part of the word, and rotating the word until the partial word is restored to its original position.

The invention may also include a method and apparatus for addressing memory wherein a word is provided with fixed width, having a fixed number of bits to be used for addressing variable width data, and having a width defining field and address field. In addition, a procedure for addressing memory with a fixed width word, having a fixed number of bits, to be used for addressing data and having a substitution field and an address field, may be used.

The invention may also include a method of accessing from RAM a number M of words that is less than the predetermined fixed burst length N of the RAM, the RAM including an enable line that selectably enables and disables reading from and writing to the RAM, the method comprising the steps of:

ordering N words to be read from or written to the RAM;

determining when M words have been read from or written to the RAM, M being less than N; and disabling the RAM upon determining M words had been read from or written to the RAM.

The invention may also include a method of accessing Dynamic Random Access Memory (DRAM) to store and retrieve data words associated with a two dimensional image, the DRAM including two separate banks, each bank being capable of operating a page mode to read and write the data words, the two dimensional image being organized in a two dimensional grid pattern of cells, each cell containing an M by N matrix of pixels, and the words associated with each cell occupying one page or less of a bank, the method comprising the steps of:

(a) assigning each cell a particular one of the two banks so that all data words associated with that particular cell are read from and written to one particular page of that particular bank, the assignment of banks to cells being done such that each cell is associated with a different bank than any bordering cell which is also either in the same row or in the same column;

(b) reading the data words associated with a cell that is composed of a matrix of pixels, and that is not aligned with the two dimensional grid pattern, but that is aligned with pixels in cells in the two dimensional grid pattern.

(c) identifying which cells in the two dimensional grid pattern contain data words associated with the unaligned cell;

(d) reading, from the first bank of DRAM, the data words associated with one of the cells in the grid pattern identified as containing data words associated with the unaligned cell;

(e) reading, from the second bank of DRAM, the data words associated with another of the cells in the grid pattern identified as containing data words associated with the unaligned cell;

(f) repeating steps (d) and (e) until all the data words associated with the unaligned cell have been read.

The invention may also provide a RAM interface for connecting a bus to RAM wherein a separate address generator generates the addresses the RAM interface needs to address the RAM. The address generator communicates with the RAM interface via a two-wire interface.

The invention may also include a method to control the buffering of encoded video data organized as frames or fields. This method involves determining the picture number of each incoming decoded frame, determining the expected presentation number at any time and marking any buffer as ready when its picture number is on or after the presentation number.

Accordingly, those concerned with the design, development, and utilization of systems for decoding video data have long recognized the need for enhanced performance as accomplished by the various features of the present invention. Other objects and advantages of the present invention will become apparent from the following more detailed description taken in conjunction with the accompanying drawings.

BRIEF DESCRIPTION OF THE DRAWINGS

FIG. 7 shows a fixed width word, in accordance with the present invention, used for addressing and having an address field, a substitution field and a substitution header;

FIG. 16 is a block diagram, in accordance with the present invention illustrating an IDCT having a twin data stream, a transpose RAM and an improved buffer;

FIG. 31 depicts data in a counter for a T2 data stream in the present invention;

FIG. 121 is a flow chart showing the start_code_search operation, in accordance with the present invention;

FIG. 122 shows timestamp modification, in accordance with the present invention

FIG. 123 illustrates the read timing for the microprocessor interface; and

FIG. 124 shows the write timing for the microprocessor interface.

Figure 1:
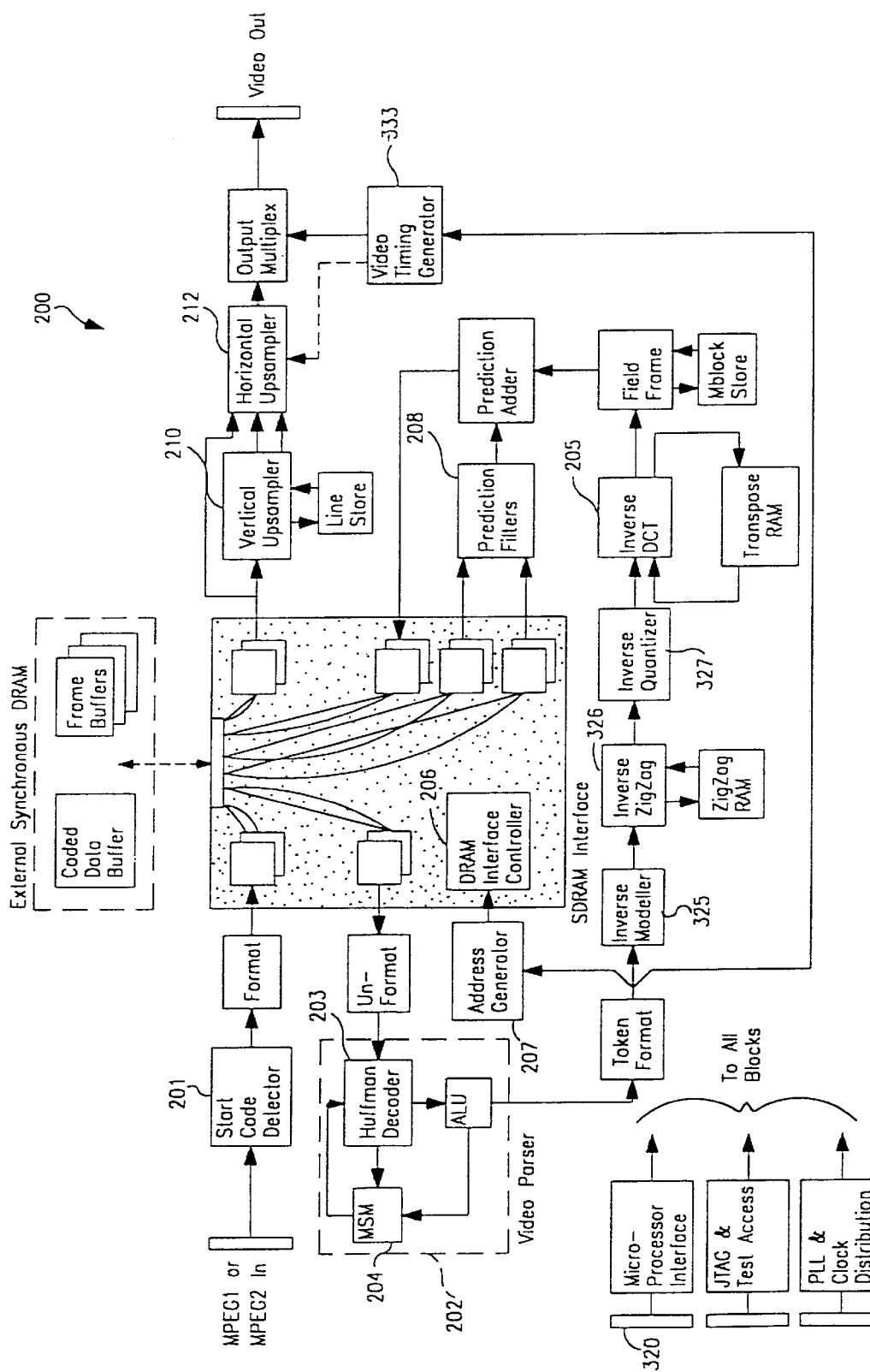
FIG. 1 illustrates data flow through a preferred embodiment in the present invention.

In the ensuing description of the practice of the invention, the following terms are frequently used and are generally defined by the following glossary:

GLOSSARY

BLOCK: An 8row by 8-column matrix of pels, or 64 DCT coefficients (source, quantized or dequantized).

CHROMINANCE (COMPONENT): A matrix, block or single pel representing one of the two color difference signals related to the primary colors in the manner defined in the bit stream. The symbols used for the color difference signals are Cr and Cb.

CODED REPRESENTATION: A data element as represented in its encoded form.

CODED VIDEO BIT STREAM: A coded representation of a series of one or more pictures as defined in this specification.

CODED ORDER: The order in which the pictures are transmitted and decoded. This order is not necessarily the same as the display order.

COMPONENT: A matrix, block or single pel from one of the three matrices (luminance and two chrominance) that make up a picture.

COMPRESSION: Reduction in the number of bits used to represent an item of data.

DECODER: An embodiment of a decoding process.

DECODING (PROCESS): The process defined in this specification that reads an input coded bitstream and produces decoded pictures or audio samples.

DISPLAY ORDER: The order in which the decoded pictures are displayed. Typically, this is the same order in which they were presented at the input of the encoder.

ENCODING (PROCESS): A process, not specified in this specification, that reads a stream of input pictures or audio samples and produces a valid coded bitstream as defined in this specification.

INTRA CODING: Coding of a macroblock or picture that uses information only from that macroblock or picture.

LUMINANCE (COMPONENT): A matrix, block or single pel representing a monochrome representation of the signal and related to the primary colors in the manner defined in the bit stream. The symbol used for luminance is Y.

MACROBLOCK: The four 8 by 8 blocks of luminance data and the two (for 4:2:0 chroma format) four (for 4:2:2 chroma format) or eight (for 4:4:4 chroma format) corresponding 8 by 8 blocks of chrominance data coming from a 16 by 16 section of the luminance component of the picture. Macroblock is sometimes used to refer to the pel data and sometimes to the coded representation of the pel values and other data elements defined in the macroblock header of the syntax defined in this part of this specification. To one of ordinary skill in the art, the usage is clear from the context.

MOTION COMPENSATION: The use of motion vectors to improve the efficiency of the prediction of pel values. The prediction uses motion vectors to provide offsets into the past and/or future reference pictures containing previously decoded pel values that are used to form the prediction error signal.

MOTION VECTOR: A two-dimensional vector used for motion compensation that provides an offset from the coordinate position in the current picture to the coordinates in a reference picture.

NON-INTRA CODING: Coding of a macroblock or picture that uses information both from itself and from macroblocks and pictures occurring at other times.

PEL: Picture element.

PICTURE: Source, coded or reconstructed image data. A source or reconstructed picture consists of three rectangular matrices of 8-bit numbers representing the luminance and two chrominance signals. For progressive video, a picture is identical to a frame, while for interlaced video, a picture can refer to a frame, or the top field or the bottom field of the frame depending on the context.

PREDICTION: The use of a predictor to provide an estimate of the pel value or data element currently being decoded.

RECONFIGURABLE PROCESS STAGE (RPS): A stage, which in response to a recognized token, reconfigures itself to perform various operations.

SLICE: A series of macroblocks.

TOKEN: A universal adaptation unit in the form of an interactive interfacing messenger package for control and/or data functions.

START CODES [SYSTEM AND VIDEO]: 32-bit codes embedded in a coded bitstream that are unique. They are used for several purposes including identifying some of the structures in the coding syntax.

VARIABLE LENGTH CODING; VLC: A reversible procedure for coding that assigns shorter code-words to frequent events and longer code-words to less frequent events.

VIDEO SEQUENCE: A series of one or more pictures.

DETAILED DESCRIPTIONS

The forthcoming "Detailed Description of the Invention" contains the following Sections:

1) Detailed Description of the Invention for Memory Addressing

Variable Length Fields Within a Fixed Width Word

Using Fixed Width Word with Variable Length Fields to Perform Address Substitution Addressing Variable Width Data with a Fixed Width Word Microcodable State Machine Structure Arithmetic Core 2) Detailed Description of the Invention for Transforming Data using a Common Processing Block Theoretical Background of the Invention 3) Detailed Description of Invention for Time Synchronization 4) Detailed Description of the Invention for Asynchronous Swing Buffering 5) Detailed Description of the Invention for Storing Video Information 6) Detailed Description of the Invention for a Parallel Huffman Decoder The Huffman Code ROM Maximizing Throughput FLCs and Tokens Implementation

7) MORE DETAILED DESCRIPTION

DETAILED DESCRIPTION OF THE INVENTION

As an introduction to the illustrative embodiment(s) of the most general features of the invention, and referring more particularly to FIG. 1 of the drawings, the data flow through the preferred embodiment 200 of the invention is shown. The embodiment of the present invention is preferably implemented using a two-wire pipeline system having various control and DATA tokens. The major elements of the system are a Start Code Detector 201, a Video Parser 202 incorporating a Huffman Decoder 203 and a Microprogrammable State Machine (MSM) 204, an Inverse Discrete CosineTransform (IDCT) 205, a synchronous DRAM controller 206 with an associated address generation unit 207, appropriate prediction circuitry 208 and display circuitry 209 which includes upsampling 210 and 211 and video timing generation 212.

This application relates to similar subject matter disclosed in British Patent Application number 9405914.4 entitled "Video Decompression" filed on Mar. 24, 1994, by Discovision Associates, and the latter application is specifically incorporated by reference in this application.

In accordance with the above, specific aspects, features and subsystem areas of the present invention will be referred to in greater detail below. In the drawings, like reference numerals denote like or corresponding parts throughout the various drawings and figures.

Detailed Description of the Invention for Memory Addressing

In accordance with the present invention, a method and apparatus for addressing memory is described herein. In particular, the present invention provides for deferring variable width bit fields with fixed width words. More particularly, the present invention provides a method of addressing variable width data with a fixed width word. In various forms of the embodiment, variable bit field is used to specify bits to be substituted into the word or to specify an unused portion of the word in addressing variable width data with a fixed width word. In addition, the system of the present invention includes a microcodable state machine having an arithmetic core.

The microcodable state machine is intended to be used for solving design problems where there is a need for versatile and/or complicated calculations. Examples of such designs include address generation, stream parsing and decoding, and filter tap coefficient calculations. In this regard, the addressing must cope with two different features: (1) variable length addresses to access varying width portions of words and (2) address substitution. In the present invention, a RAM having a 64×32 bit configuration can be addressed in partial words having 64×32 bit, 128×16 bit, 256×8 bit, 512×4 bit, 1024×2 bit, or 2048×1 bit formats.

Variable Length Fields Within a Fixed Width Word

In many applications, it is useful to define variable portions of a word (to be known as fields) for actions such as substitution, variable width data addressing, or the constriction of other parts of the word. The conventional method for defining variable portions of words is to have an additional word (or words) which specify the width of the field (or fields) within the word. In accordance with the present invention, a method for encoding this information within the word itself is described. The present method has the advantages of savings bits in the overall definition of the word, simplifying decoding of the encoded word and providing a more intuitive view of what has been encoded. Furthermore, this encoding method is applicable if the variable width fields are most or least significant bit justified within the word.

Accordingly, Table 1 shows two examples of variable width fields (marked "F") that are least significant bit justified defined within an eight bit word. A "w" marks other potential fields of these words.

TABLE 1

| Bit number (hex) | 7 | 6 | 5 | 4 | 3 | 2 | 1 | 0 |
|---|---|---|---|---|---|---|---|---|
| Fixed word | w | w | w | F | F | F | F | F |
|  | w | w | w | w | w | w | F | F |

Table 2 shows the conventional method of encoding the fields shown in Table 1 using sufficient additional bits to specify the maximum width of the field in binary. (Bits marked "x" are "don't care", i.e., their value is of no consequence. This method is clearly inefficient in its use of bits and, furthermore, provides a less intuitive form than that described in the present invention.

TABLE 2

| Bit number (hex) | 7 | 6 | 5 | 4 | 3 | 2 | 1 | 0 | Field Define |
|---|---|---|---|---|---|---|---|---|---|
| Fixed word | w | w | w | x | x | x | x | x | 1 0 1 |
|  | w | w | w | w | w | w | x | X | 0 1 0 |

The new method, in accordance with the present invention, defines the field within the word. This method defines the field by using a continuation marker and a termination marker. The field is specified, from one end of the field, as a series of continuation markers followed by a termination marker. In the case of a zero length field, however, only a termination marker is provided at the end of the word. Both the continuation marker and the termination marker are single bits, and they must be complementary. In addition, the field must be justified to either end of the word. Accordingly, the method of the present invention for encoding fields requires a width of only one bit extra over the original word width.

As shown in Table 3, the encoding of the fields shown in the Table 1, in accordance with the new method, is depicted. In this example, the continuation marker is "1" and the termination marker is "0". The field in this example is least significant bit justified.

TABLE 3

| Bit number (hex) | 7 | 6 | 5 | 4 | 3 | 2 | 1 | 0 |
|---|---|---|---|---|---|---|---|---|
| Fixed word | w | w | w | 0 | 1 | 1 | 1 | 1 |
| Continuation marker = 1; Termination marker = 0. | w | w | w | w | w | w | 0 | 1 |

Therefore, the advantages of the encoding method, in accordance with the present invention, are:

1. A reduction in the number of bits needed in the encoding.
2. A simplification in the decoding process is required since the need for a "x to 1 of " decode of the "field define" shown in Table 1–2 that would normally be required is inherent in the encoding which is already in the form of 1 of $2^2$; and
3. The encoding is in a more intuitive form allowing the field defined to be more easily identified.

Furthermore, the use of this encoding method of the present invention can also be used such that the termination marker and the continuation marker are inverted to provide that the encoding of Table 3 resembles that of Table 4. Hence, the use of "1" or "0" is used interchangeably throughout this application.

TABLE 4

| Bit number (hex) | 7 | 6 | 5 | 4 | 3 | 2 | 1 | 0 |
|---|---|---|---|---|---|---|---|---|
| Fixed word | w | w | w | 1 | 0 | 0 | 0 | 0 |
| Continuation marker = 1; Termination marker = 0. | w | w | w | w | w | w | 1 | 0 |

As previously identified, the field encoded must be justified to either end of the word. Table 5 illustrates most significant justified fields, i.e., these are encoded in a similar way to least significant bit justified fields except that the field reaches from the most significant bit (hereinafter MSB) towards the least significant bit (hereinafter "LSB") up to and including the first termination marker. The encoding of the fields shown in Table 5 are shown in Table 6.

TABLE 5

| Bit number (hex) | 7 | 6 | 5 | 4 | 3 | 2 | 1 | 0 |
|---|---|---|---|---|---|---|---|---|
| Fixed word | F | F | F | F | F | w | w | w |
|  | F | F | w | w | w | w | w | w |

TABLE 6

| Bit number (hex) | 7 | 6 | 5 | 4 | 3 | 2 | 1 | 0 |
|---|---|---|---|---|---|---|---|---|
| Fixed word | 1 | 1 | 1 | 1 | 1 | 0 | w | w | w |
| Continuation marker = 1; Termination marker = 0. | 1 | 1 | 0 | w | w | w | w | w | w |

Moreover, fields may be encoded from the least significant and most significant ends of the word simultaneously. For example, the two fields shown in Table 7 may be encoded as in Table 8, with the addition of just one bit for each field as described previously.

TABLE 7

| Bit number (hex) | 7 | 6 | 5 | 4 | 3 | 2 | 1 | 0 |
|---|---|---|---|---|---|---|---|---|
| Fixed word | F | F | F | F | w | w | F | F |
|  | w | w | w | w | F | F | F | F |

TABLE 8

| Bit number (hex) | 7 | 6 | 5 | 4 | 3 | 2 | 1 | 0 |
|---|---|---|---|---|---|---|---|---|
| Fixed word | 1 | 1 | 1 | 1 | 0 | w | w | 0 | 1 | 1 |
| Continuation marker = 1; Termination marker = 0. | 0 | w | w | w | w | 0 | 1 | 1 | 1 |

Using a Fixed Width Word with Variable Length Fields to Perform Address Substitution There are situations in which it is useful to substitute part of a memory address by another value. In this way it is possible to construct a data dependent address. The encoding method of the present invention can be applied to the addresses of a memory to specify what portion of the address is to be substituted. If a least significant bit justified variable length field is used in the address, a substitution field can be defined. For example, a 12 bit address 0baaaaaaaaaaaa encoded to have its five least significant bit substituted by the 12 bit value 0bcccccccccccc would be 0baaaaaaa011111 and produce the address 0baaaaaaaccccc. Table 9 shows the encoding for substitution into a 12 bit address.

TABLE 9

Address substitution

| No. Bits substituted | B | A | 9 | 8 | 7 | 6 | 5 | 4 | 3 | 2 | 1 | 0 |
|---|---|---|---|---|---|---|---|---|---|---|---|---|
| 0  | a | a | a | a | a | a | a | a | a | a | a | a | 1 |
| 1  | a | a | a | a | a | a | a | a | a | a | a | 0 | 1 |
| 2  | a | a | a | a | a | a | a | a | a | a | 0 | 1 | 1 |
| 3  | a | a | a | a | a | a | a | a | a | 0 | 1 | 1 | 1 |
| 4  | a | a | a | a | a | a | a | a | 0 | 1 | 1 | 1 | 1 |
| 5  | a | a | a | a | a | a | a | 0 | 1 | 1 | 1 | 1 | 1 |
| 6  | a | a | a | a | a | a | 0 | 1 | 1 | 1 | 1 | 1 | 1 |
| 7  | a | a | a | a | a | 0 | 1 | 1 | 1 | 1 | 1 | 1 | 1 |
| 8  | a | a | a | a | 0 | 1 | 1 | 1 | 1 | 1 | 1 | 1 | 1 |
| 9  | a | a | a | 0 | 1 | 1 | 1 | 1 | 1 | 1 | 1 | 1 | 1 |
| 10 | a | a | 0 | 1 | 1 | 1 | 1 | 1 | 1 | 1 | 1 | 1 | 1 |
| 11 | a | 0 | 1 | 1 | 1 | 1 | 1 | 1 | 1 | 1 | 1 | 1 | 1 |
| 12 | 0 | 1 | 1 | 1 | 1 | 1 | 1 | 1 | 1 | 1 | 1 | 1 | 1 |

TABLE 10

Variable width addressing

| Data Width | A | 9 | 8 | 7 | 6 | 5 | 4 | 3 | 2 | 1 | 0 |
|---|---|---|---|---|---|---|---|---|---|---|---|
| 1  | 1 | a | a | a | a | a | a | a | a | a | a |
| 2  | 0 | 1 | a | a | a | a | a | a | a | a | a |
| 4  | 0 | 0 | 1 | a | a | a | a | a | a | a | a |
| 8  | 0 | 0 | 0 | 1 | a | a | a | a | a | a | a |
| 16 | 0 | 0 | 0 | 0 | 1 | a | a | a | a | a | a |
| 32 | 0 | 0 | 0 | 0 | 0 | 1 | a | a | a | a | a |

Figures 1, 29A:
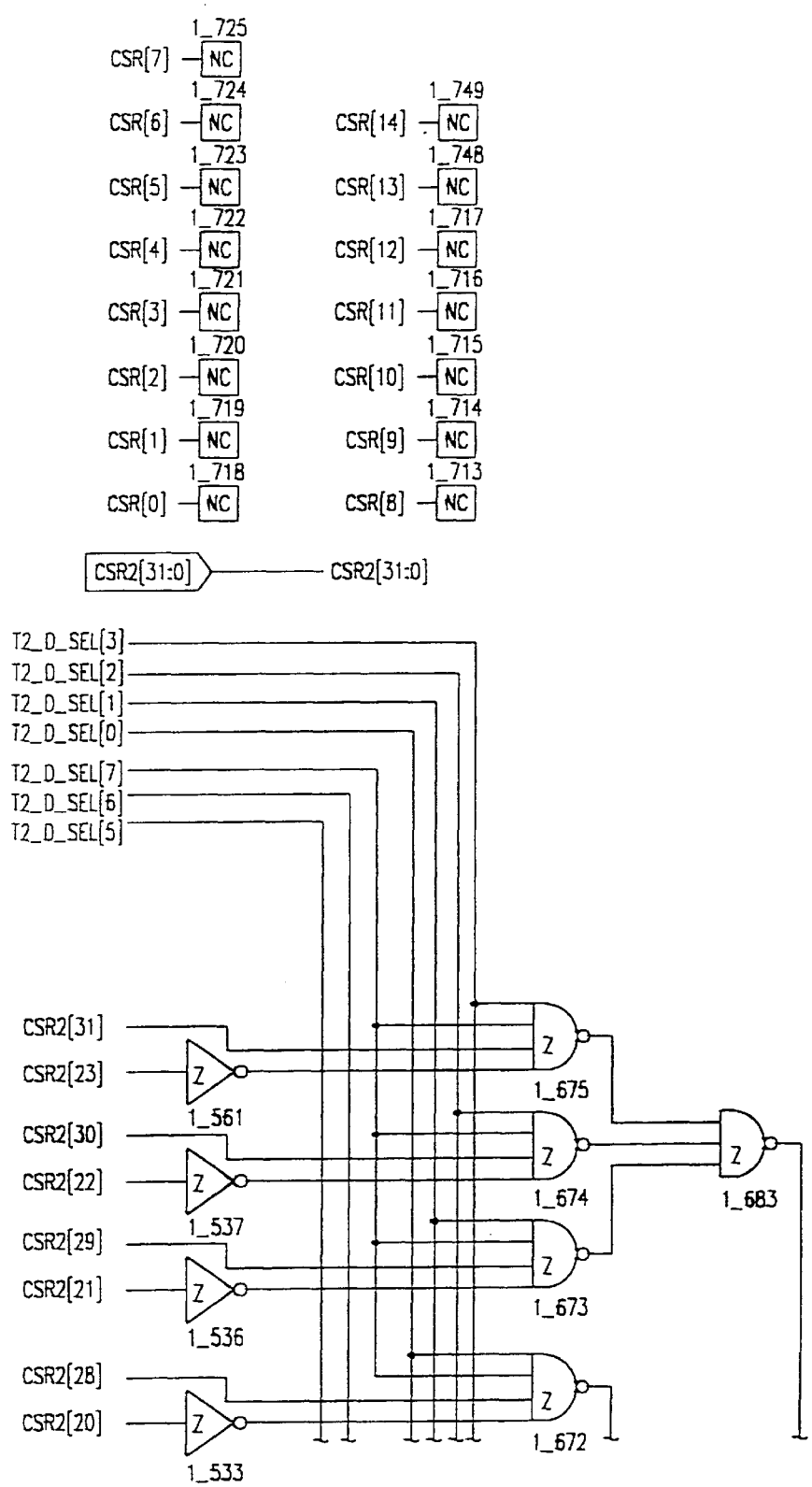
Figures 2, 29A:
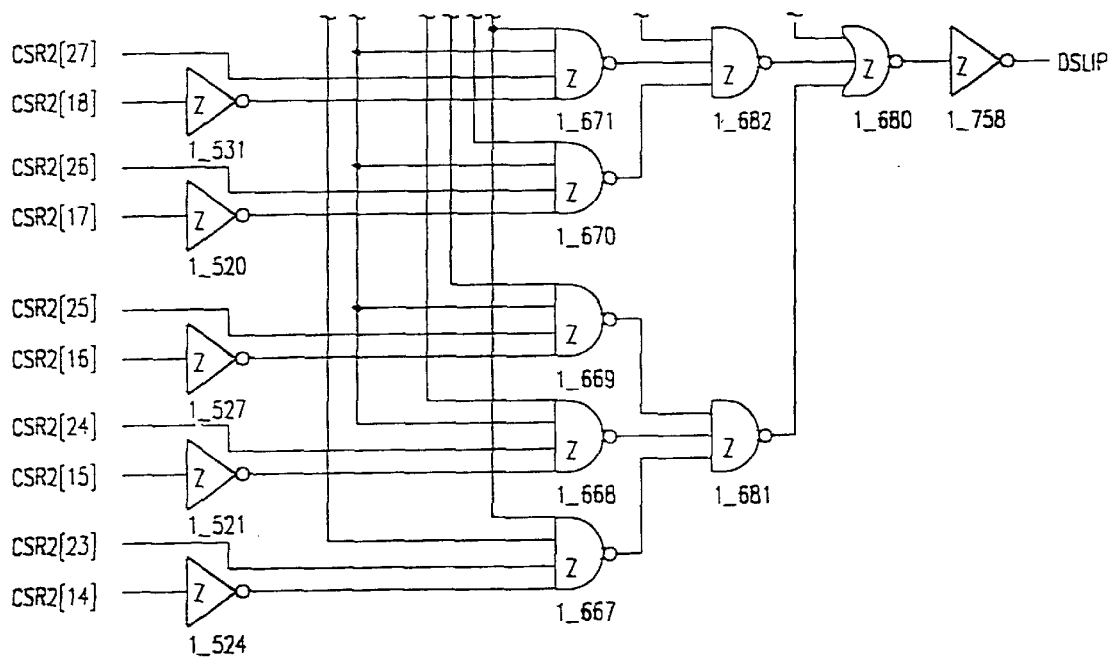
FIG. 2 shows an example of a 13 bit word used to address 8 bit data in a 64×32 RAM.
Figure 29B:
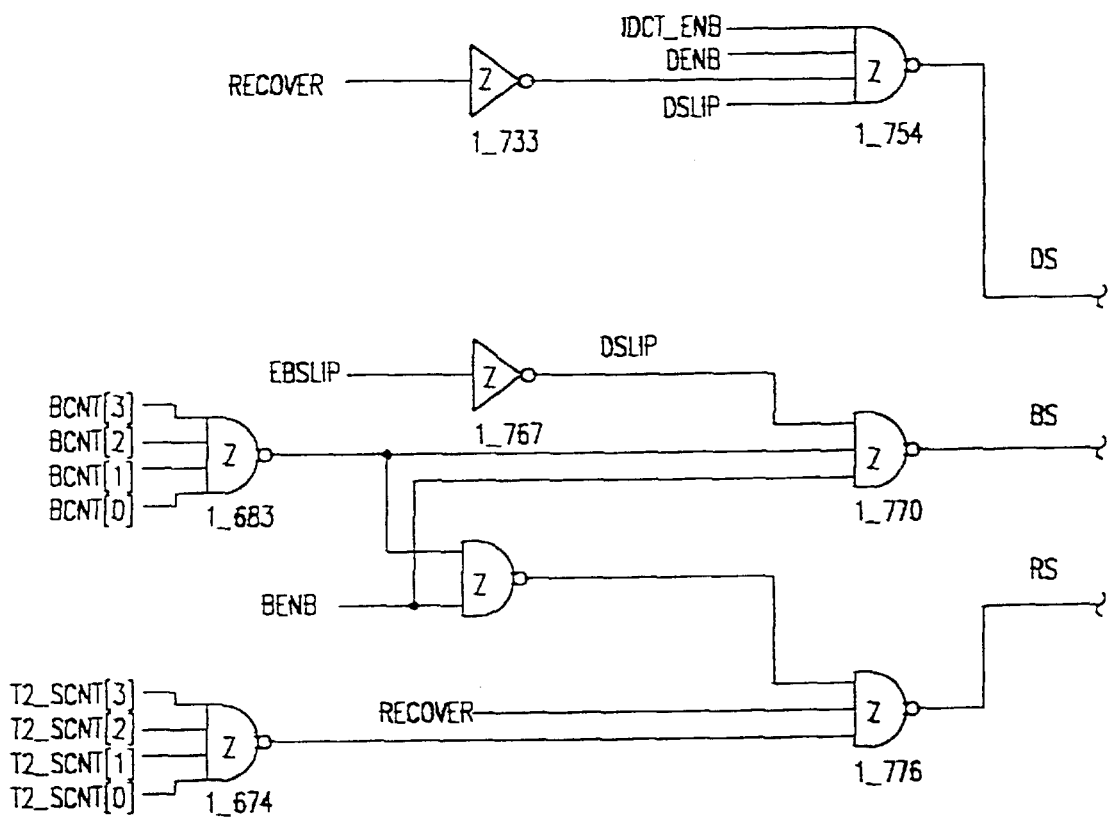
FIG. 29 illustrates a control circuit for a T2 data stream.
Figure 29C:
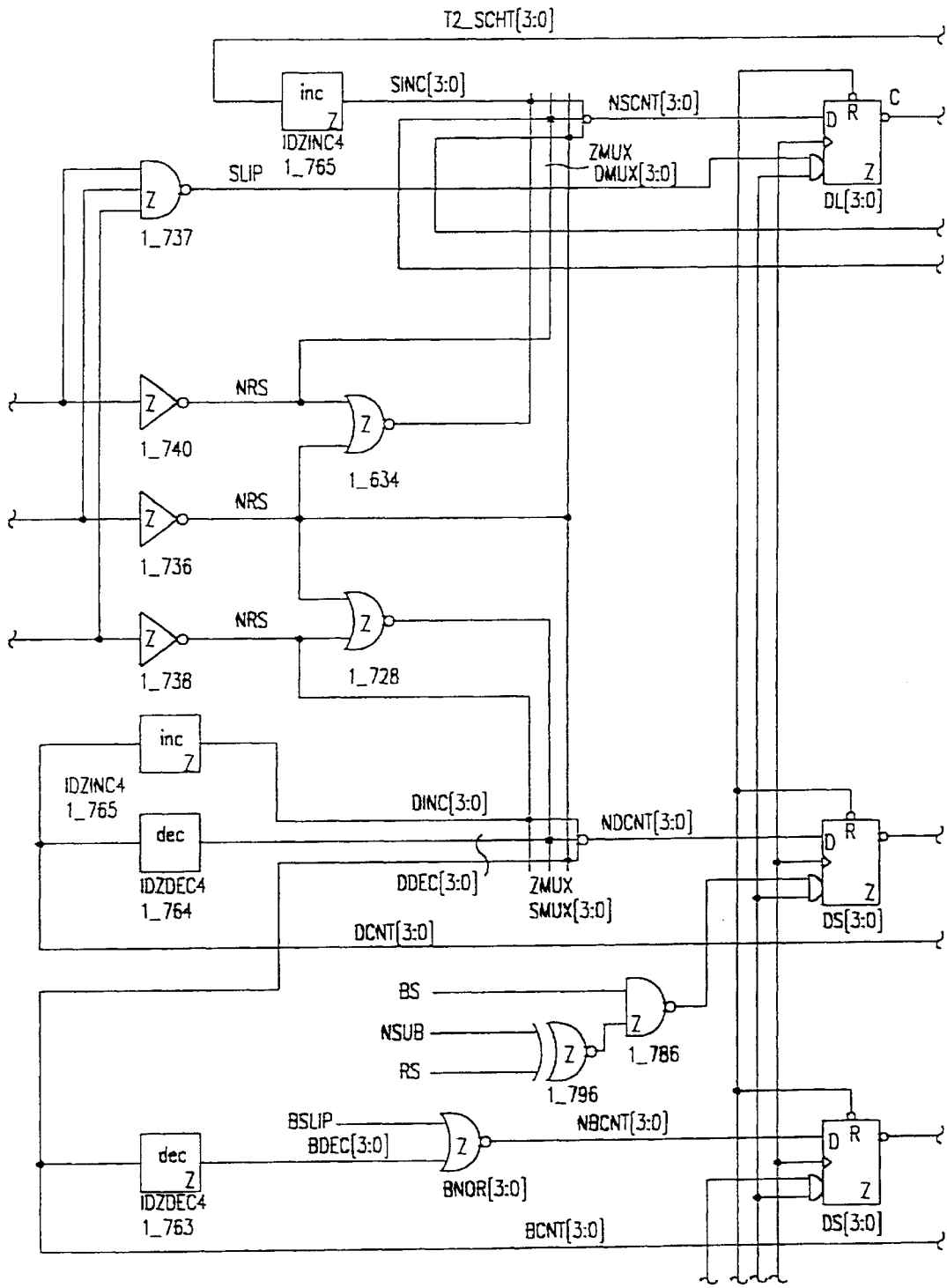
Figure 29D:
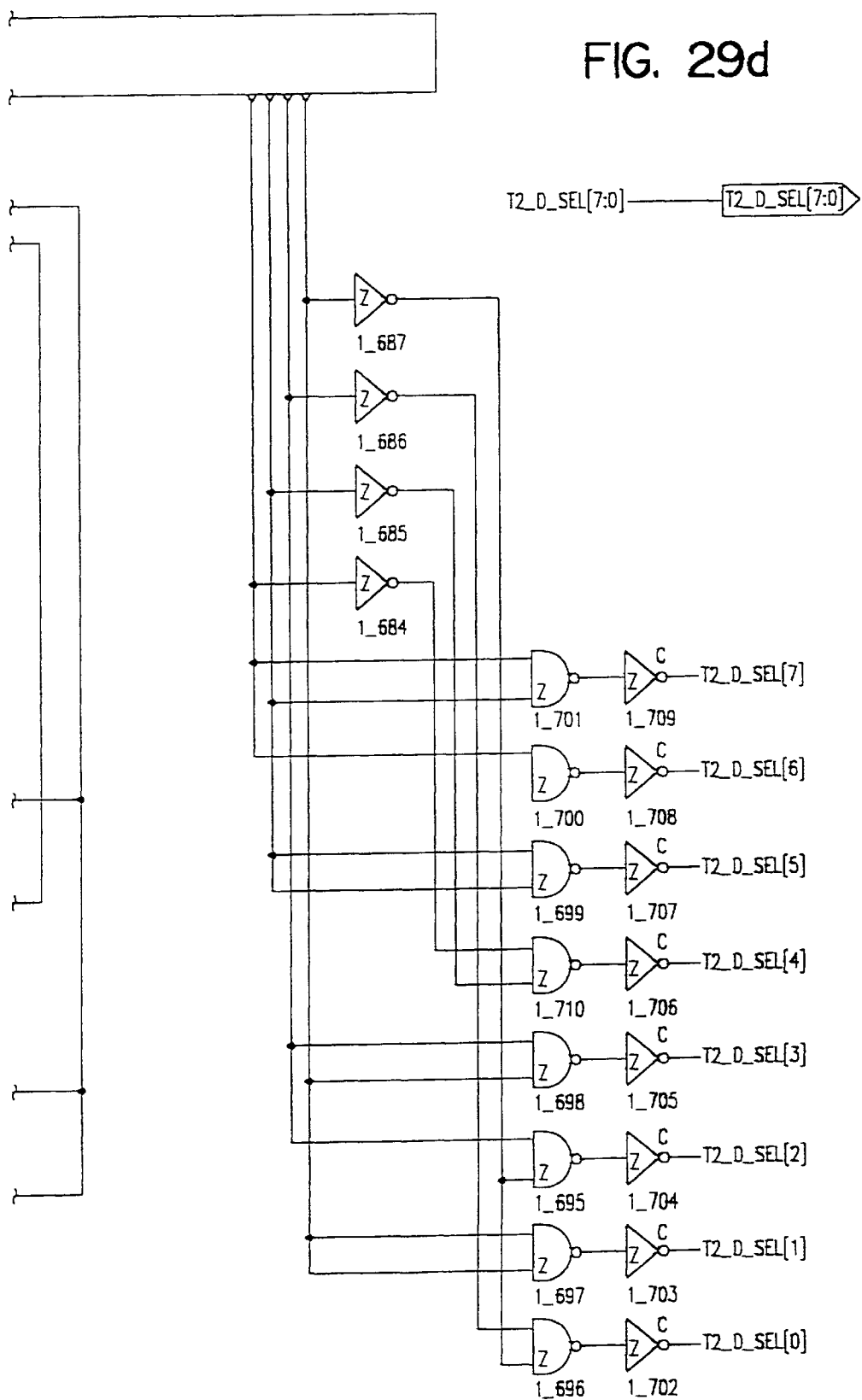
Figure 29E:
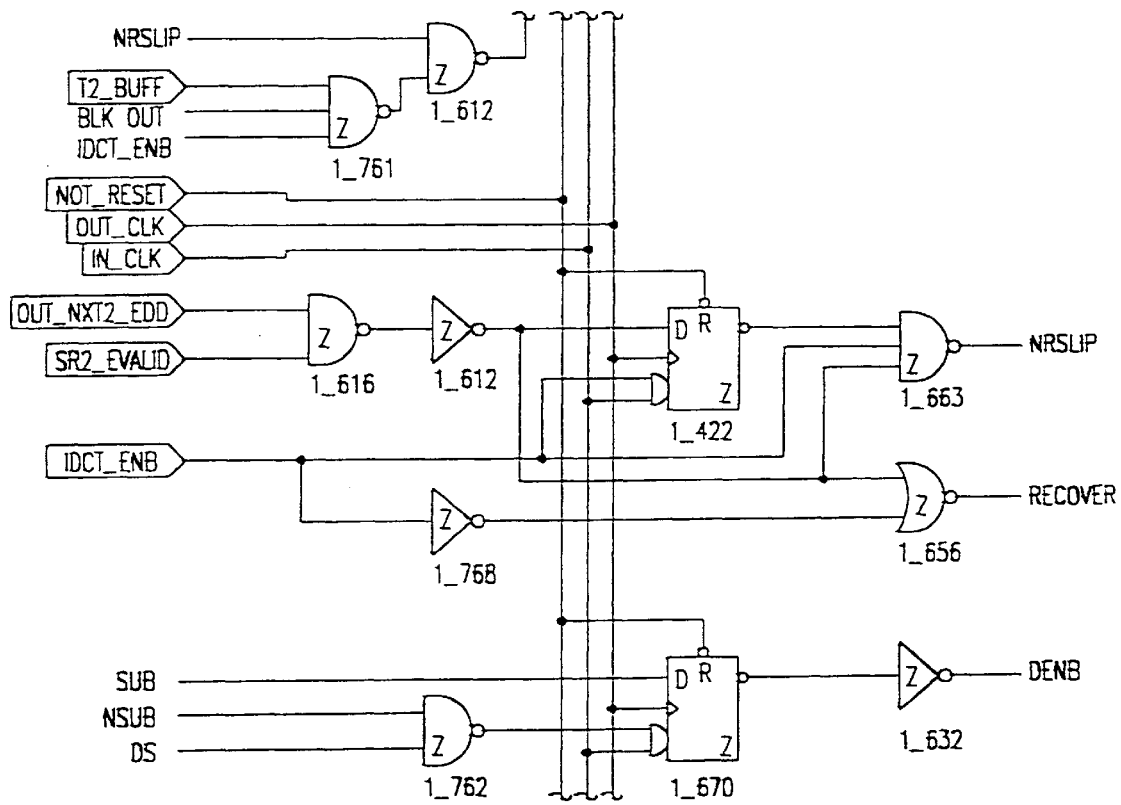
Figure 29F:
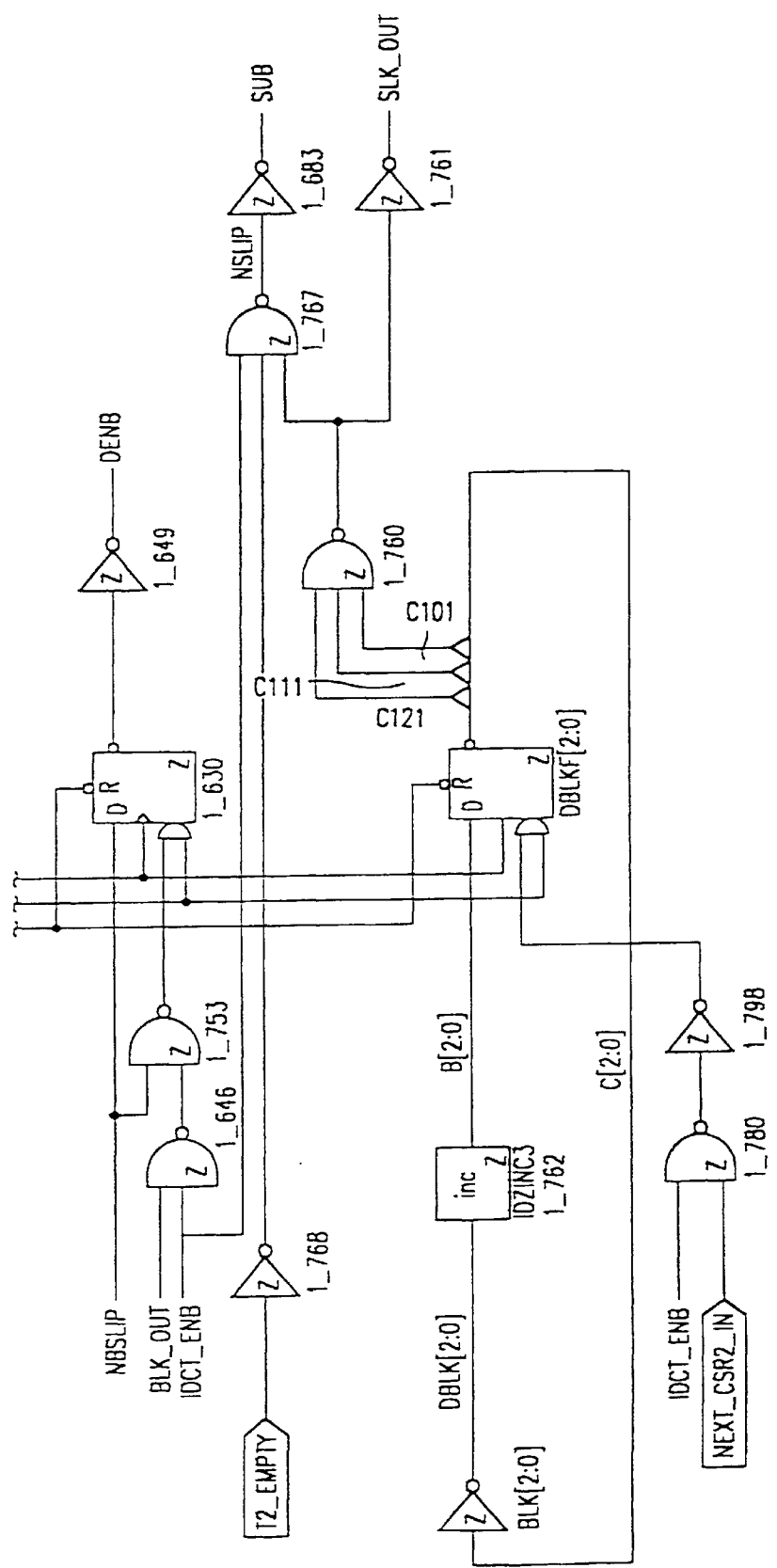
Figure 30A:
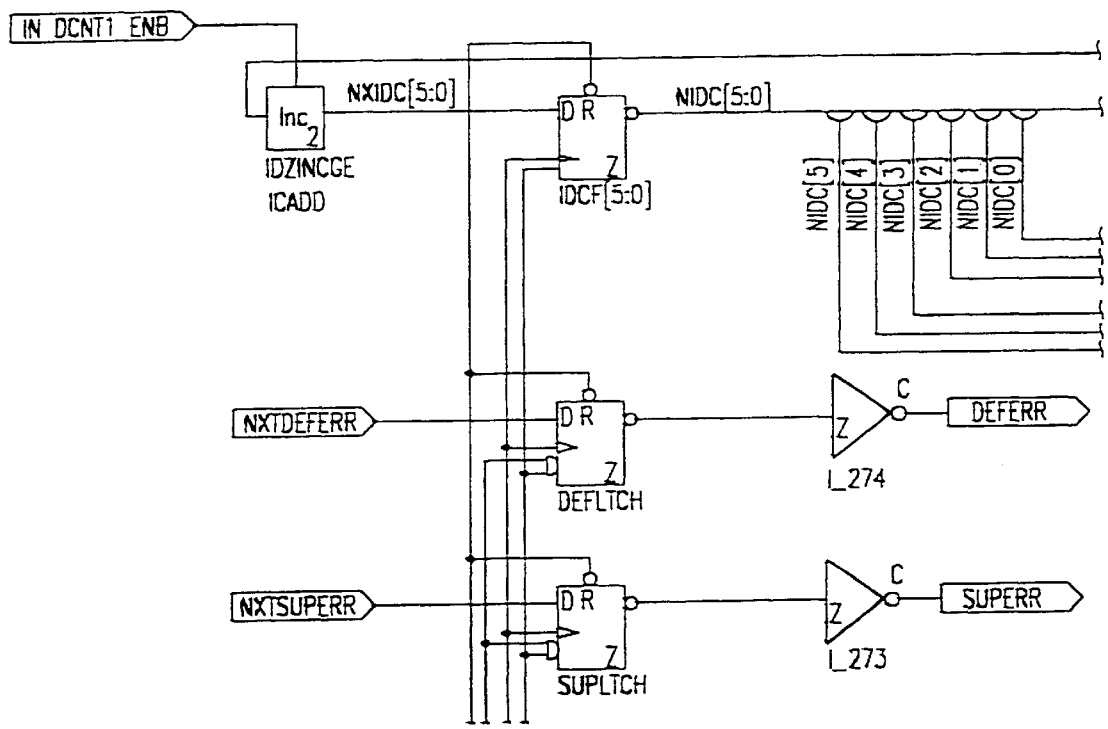
FIG. 30 shows data in a counter for a T1 data stream.
Figure 30B:
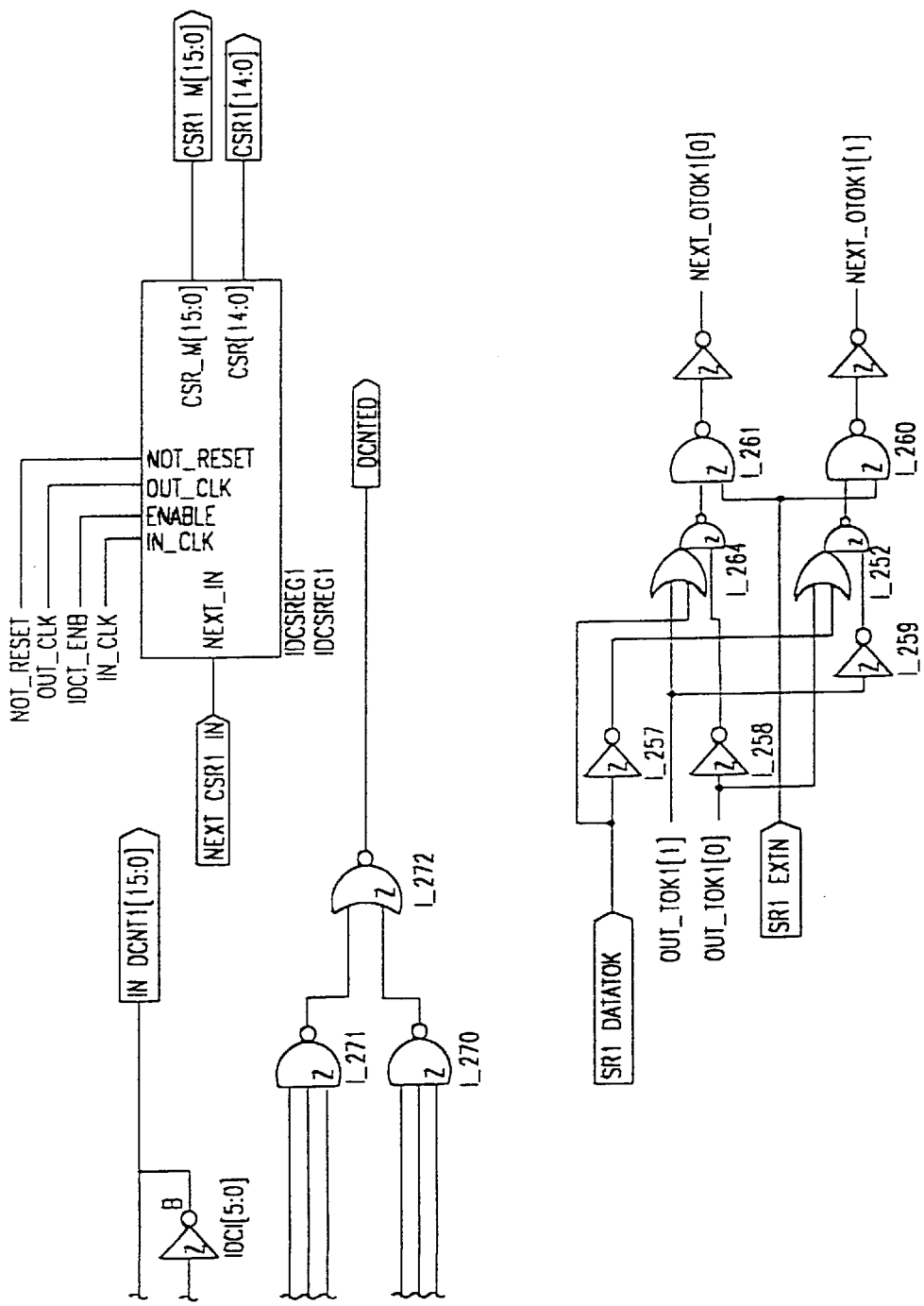
Figure 30C:
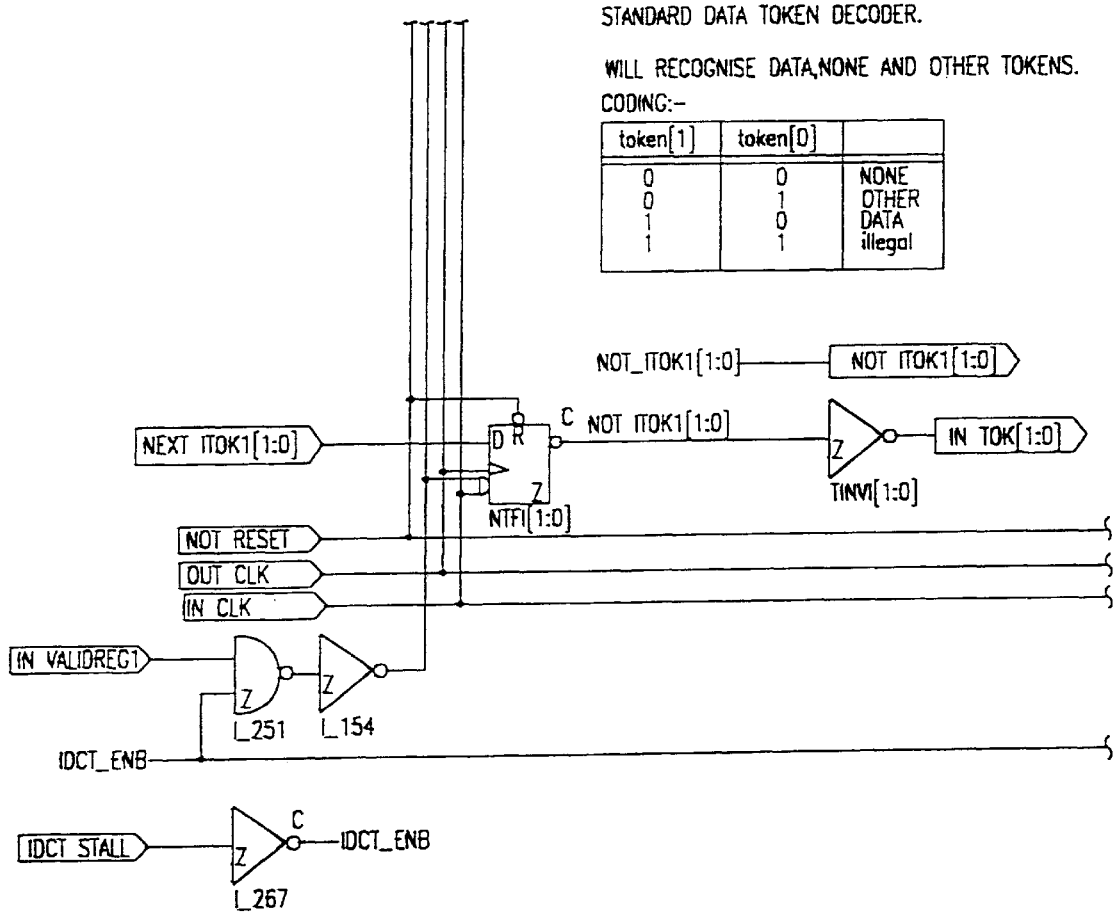
Figure 30D:
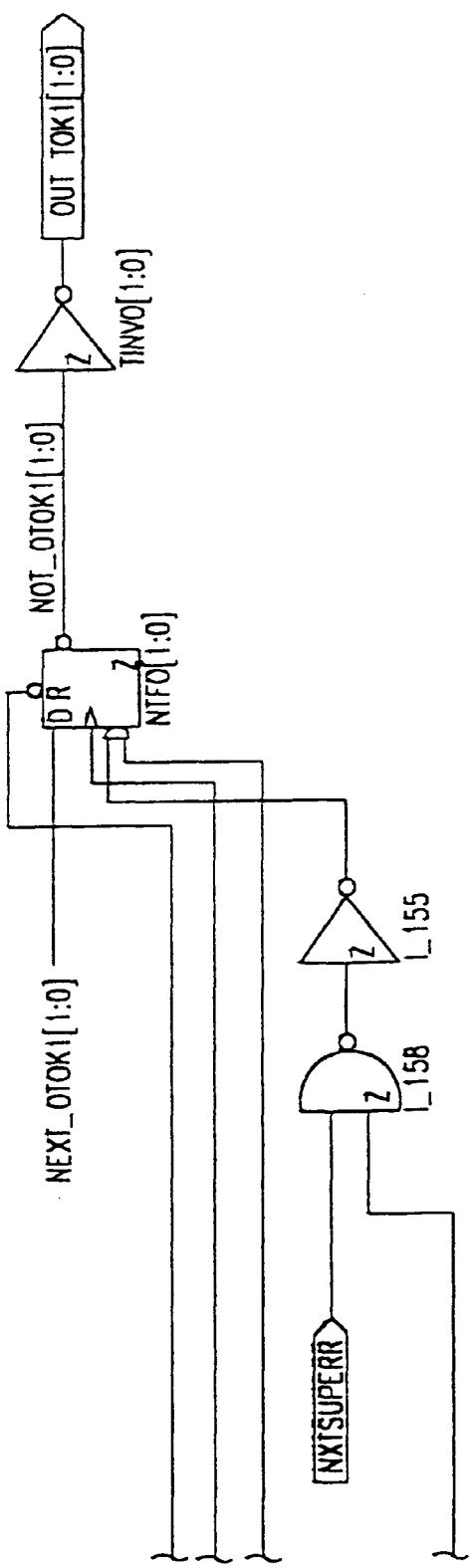
Figure 3I:
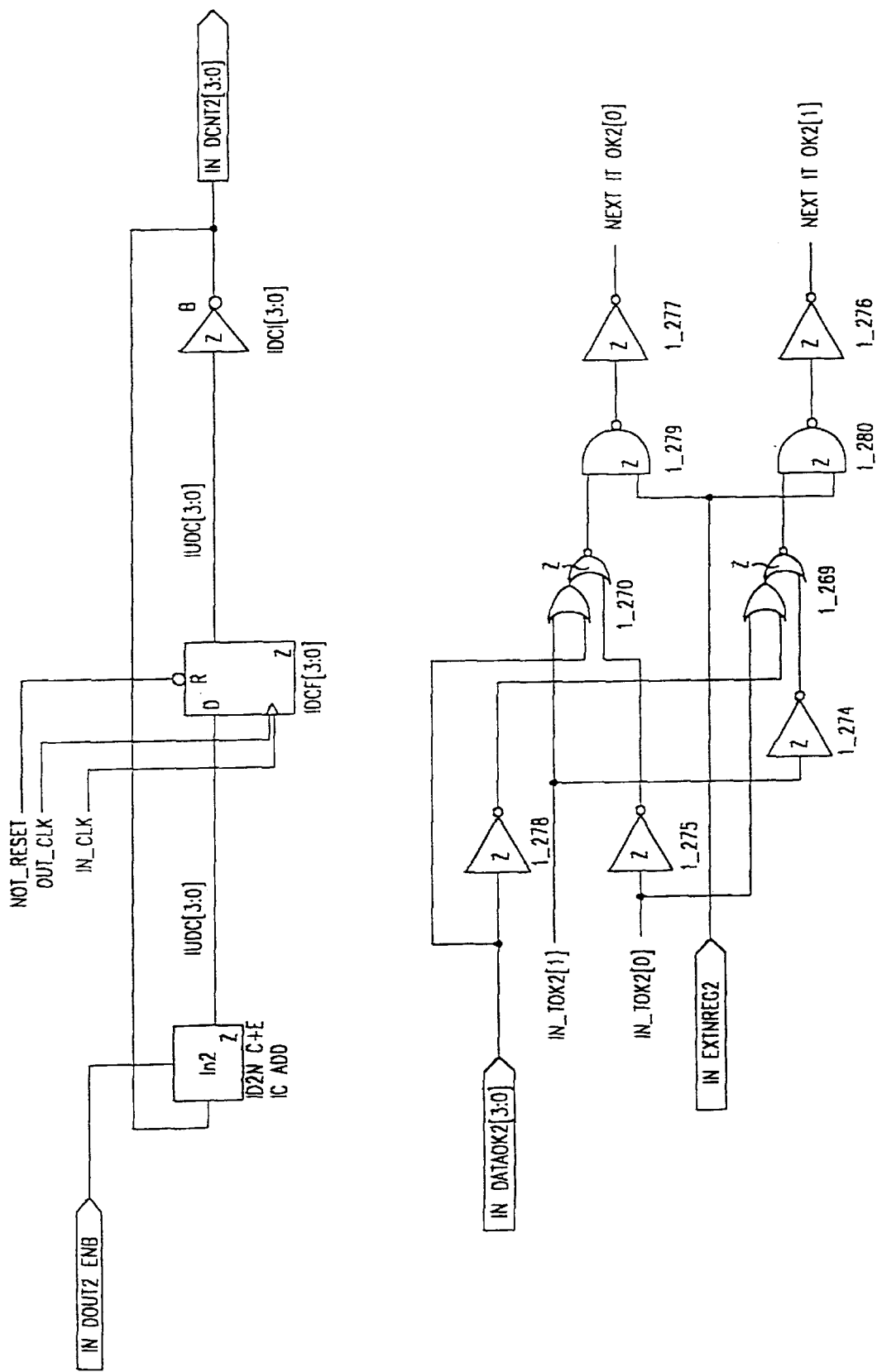
Figure 3L:
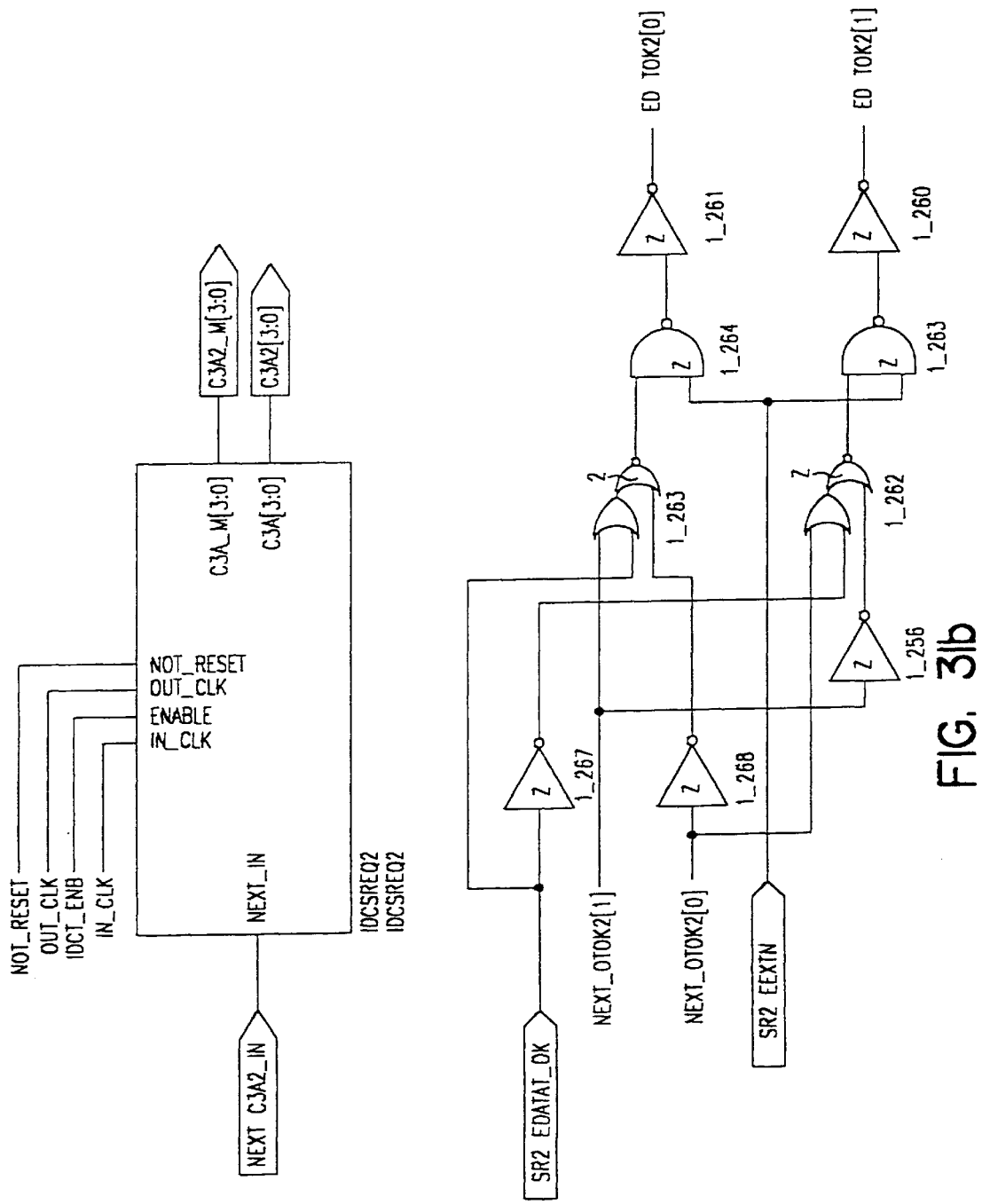
Figure 3I:
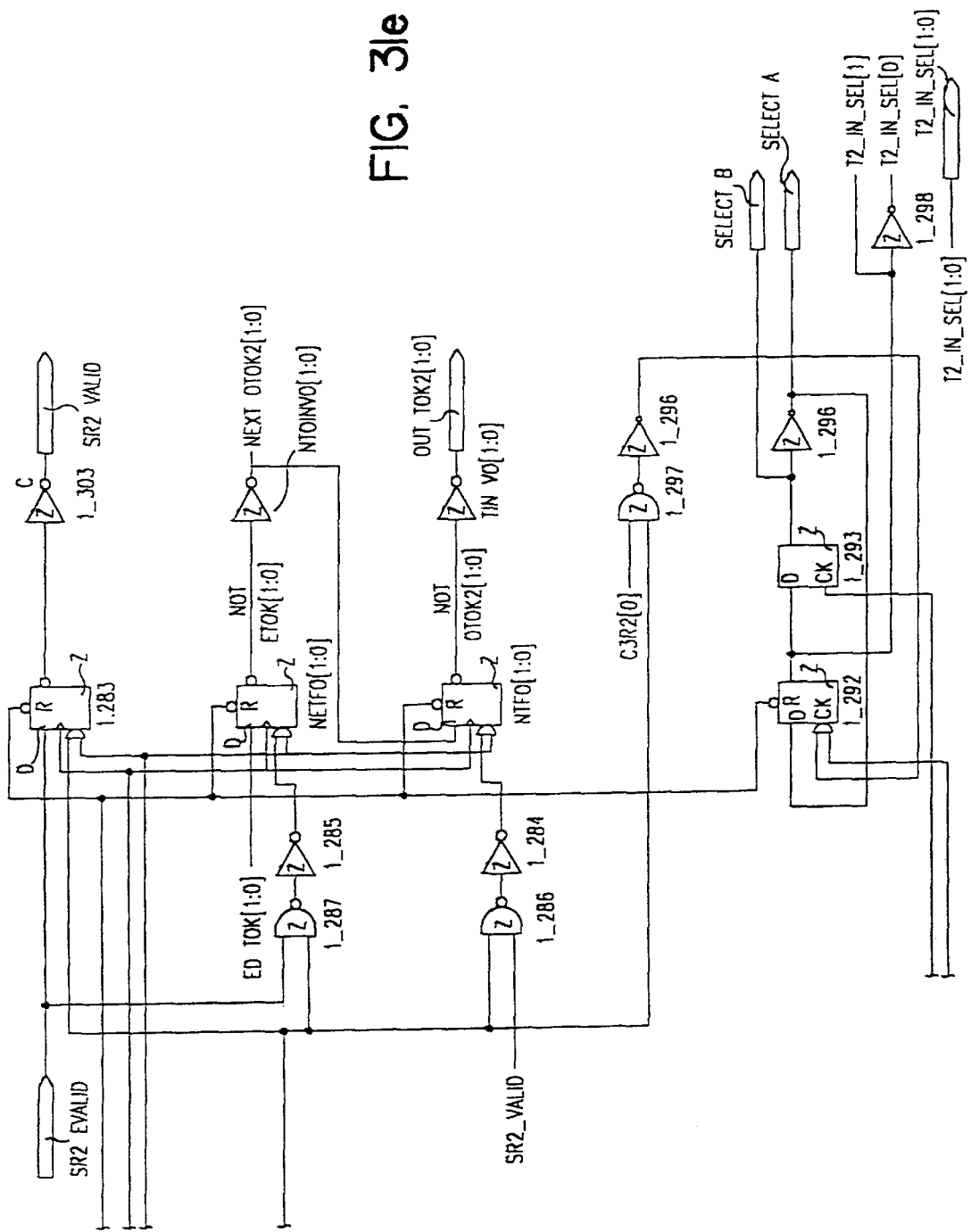
Figure 32:
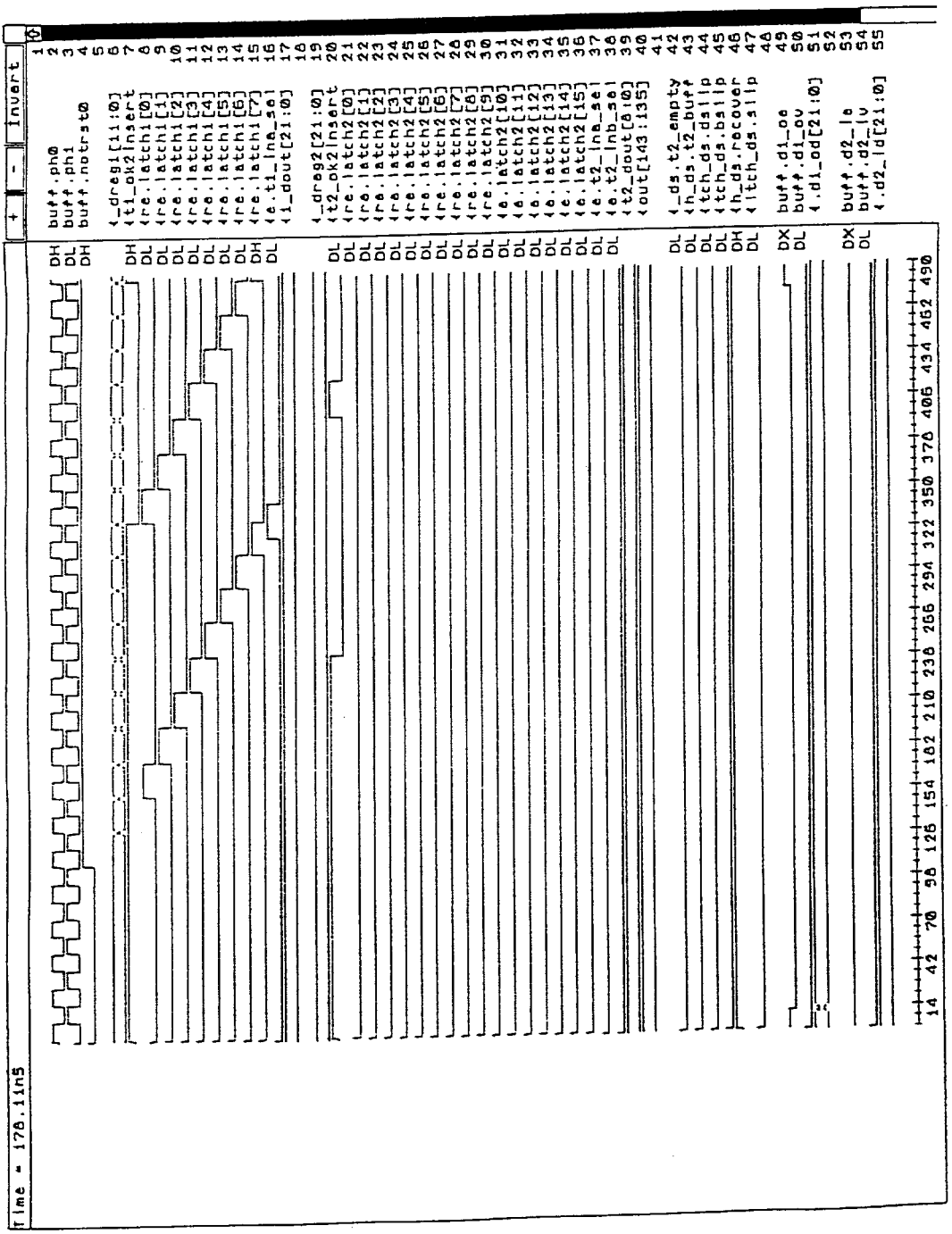
FIG. 32 is a timing diagram showing the initialization of the IDCT and associated circuitry

To allow indexing of the address, a portion of it can be substituted using the same method described previously for address substitution. The substitution portion (or field) of the address can be defined by a least significant bit justified variable length field (The continuation marker "1"; termination marker "0") that is superimposed on top of those shown in Table 10. Using an address of an eight bit word, as an example, Table 11 shows how to define the number of the least significant bits to be substituted. The least significant bit added is the substitution indicator (marked "W"). The general case of a Fixed width word for substitution is shown in FIG. 2.

TABLE 11

Address substitution

| Bits to be substituted | A | 9 | 8 | 7 | 6 | 5 | 4 | 3 | 2 | 1 | 0 | w |
|---|---|---|---|---|---|---|---|---|---|---|---|---|
| 0 | 0 | 0 | 0 | 1 | a | a | a | a | a | a | a | 0 |
| 1 | 0 | 0 | 0 | 1 | a | a | a | a | a | a | 0 | 1 |
| 2 | 0 | 0 | 0 | 1 | a | a | a | a | a | 0 | 1 | 1 |
| 3 | 0 | 0 | 0 | 1 | a | a | a | a | 0 | 1 | 1 | 1 |
| 4 | 0 | 0 | 0 | 1 | a | a | a | 0 | 1 | 1 | 1 | 1 |
| 5 | 0 | 0 | 0 | 1 | a | a | 0 | 1 | 1 | 1 | 1 | 1 |
| 6 | 0 | 0 | 0 | 1 | a | a | 0 | 1 | 1 | 1 | 1 | 1 |
| 7 | 0 | 0 | 0 | 1 | a | 0 | 1 | 1 | 1 | 1 | 1 | 1 |
| 8 | 0 | 0 | 0 | 1 | 0 | 1 | 1 | 1 | 1 | 1 | 1 | 1 |

Addressing Variable Width Data with a Fixed Width Word

One embodiment of the present invention is for addressing a memory which can be accessed at its full width or in $2^n$ widths up to its full width (these smaller words are called partial words). Hence, it will be shown how the variable field encoding of the present invention can be used to address this memory and to index those addresses into the memory.

To access a 64×32 bit Register file in widths of 32, 16, 8, 4, 2 and 1 bit requires different address, i.e., the implementation of this embodiment is a 64×32 bit memory e accessed as 64×32 bits, 128×16 bits, 256×8 bits, 512×4 bits, 1024×2 bits, or 2048×1 bit. It is seen that 5 bits are required to address one of the 64×32 bit locations, while 12 bits are required to address one of the 2048×1 bit locations. Hence, the addresses can be of variable length and, in fact, the width of the address specifies the address format of the memory. Accordingly, the address can be defined within a fixed word width by using a most significant justified variable width field which constricts the address and defines its width. This is illustrated in Table 10.

In effect the substitute code is superimposed on top of the address that is already coded. From this coding, it can be seen that there are illegal addresses, most obviously 0x0000 and 0x3fff. In this case, a "0" must be in the bottom 9 bits to prevent substituting more than 8 bits and a "1" in the top 6 bits specifies an allowable access width. If one of these errors is detected, the access is undefined, but the Register file contents will not be affected.

In accordance with the present invention, the system for addressing and for accessing partial words in a register file is discussed below.

Figure 3:
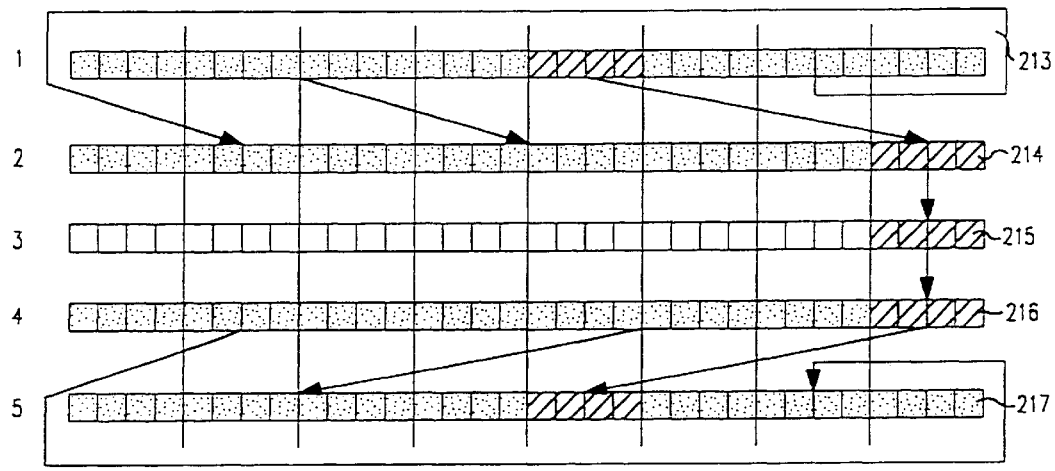
FIG. 3 is a functional block diagram of a Register file in the present invention.

The conventional memory circuitry dictates that the memory must always be accessed at it full width. To achieve variable width accesses, a full (32 bit) width word is read. This full word is rotated until the partial word accessed is justified in the LSB. The upper parts of the word are extended to the full width and then output. Extending may encompass padding with zeros or ones, sign extending, using the sign bit of a sign-magnitude number as the new MSB or any similar conventional method. Extending is dependent on the mode of operation. When the partial word is input to and written back into the memory, it is multiplexed back into the rotated full word, which is then rotated back and written into the array. FIG. 3 shows these steps for the access of a 4 bit partial word in the fourth four bit word of the 32 bit word.

To access or read partial words, such as the highlighted four bit word shown in row "1" 213 of FIG. 3, the full width word must be rotated to place the partial word at the LSB, as shown in row "2" 214. As shown in row "3" 215, the four bit word is extended to create a full 32 bit word. This word can now be accessed.

As shown in FIG. 3, a full width word that has been selected to be written back is truncated to the width of the original partial word which is multiplexed into the word shown in row "2" 214. At the LSB position, this is shown in row "4" 216. The resulting word is rotated back in its original significance in the read word, this is shown in row "5" 217. This full word can now be written back into the register file.

The following list, therefore, summarizes the steps numbered in FIG. 3:

1. Full word read from memory;
2. 12 bit rotated right puts partial word into the LSB;
3. Extended to full word, then passed to output;
4. The inputted partial word is multiplexed into rotated full word from (2); and
5. 12 bit rotated left puts full word back to original state to be written.

Figure 4:
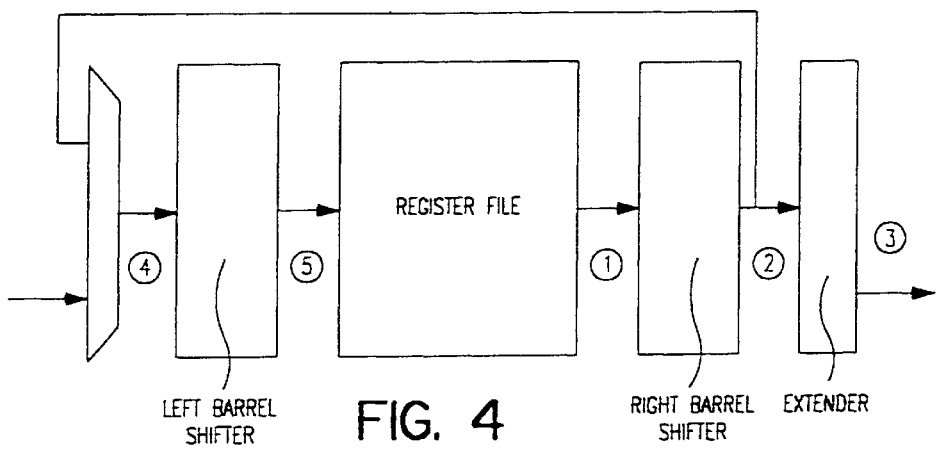
FIG. 4 illustrates data flow in a register file as shown in FIG. 3.

The above accesses suggests the data flow structure of the memory that is shown in FIG. 4. The numbers in the structure refer to the above text and to FIG. 3.

Figure 5:
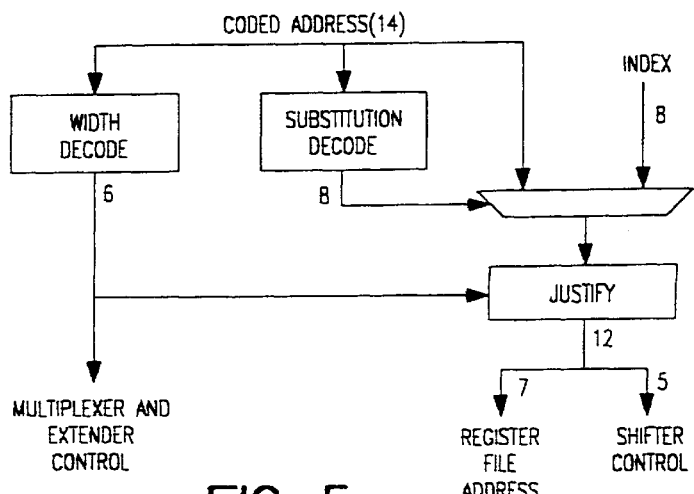
FIG. 5 is a block diagram illustrating register file address decoding, in accordance with the present invention.

The memory address must be decoded to control the above structure. It should be recognized that the MSB of any width of address is at the same significance with reference to the memory. The top six bits of a decoded address are a 32 bit word address, whereas the remainder is a bit address. Therefore, the stage of decoding (in parallel with the substitution) is to decode the address width defining variable field by detecting the position of the most significant termination marker. This allows the address to be MSB justified (shifting in zeros at the LSB). The top six bits can be used directly as a 32 bit word row address of the memory. The bottom five bits can be used to directly control both barrel shifters (as seen in FIG. 4), because, for example, an original 32 bit address will always have a shift of 0b00000 (these having been shifted when the address was MSB justified). Similarly, a 16 bit address can have a shift of 0bx0000, i.e., 0 or 16 bit shift and a 1 bit address can have a shift of 0bxxxxx, i.e., 0 to 31 bit shifts. The extender and input multiplexer are controlled by the access width decode to mask out the output words and multiplex the input words to an appropriate significance, respectively. The block diagram of the decode is shown in FIG. 5. It can be seen that the decode of the two variable width fields for width and substitution can be done in parallel and independently.

FIG. 2 illustrates an example of a fixed width word 13 bits long for addressing variable width data and substitution as shown in the bottom two rows. For these examples, an eight bit word would have been addressed at location 0b110|ssss, where "ssss" is substituted from another address source.

Microcodable State Machine Structure

Figure 6:
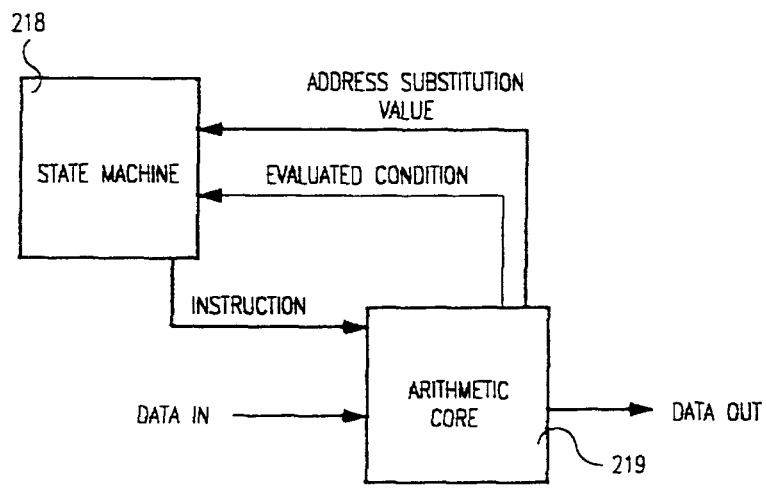
FIG. 6 is a block diagram of a Microcodable State Machine, in accordance with the present invention.

In accordance with the present invention, the substitution into a memory address and the variable width accessing of a memory have been brought together in the implementation of a microcodable state machine the structure of which is shown in FIG. 6. The structure is one of a state machine 218 providing control of an arithmetic core 219 by way of a wide word of control signals called a microcode instruction. The arithmetic core 219, in turn, passes status flags and some data to the state machine 218.

Figure 8:
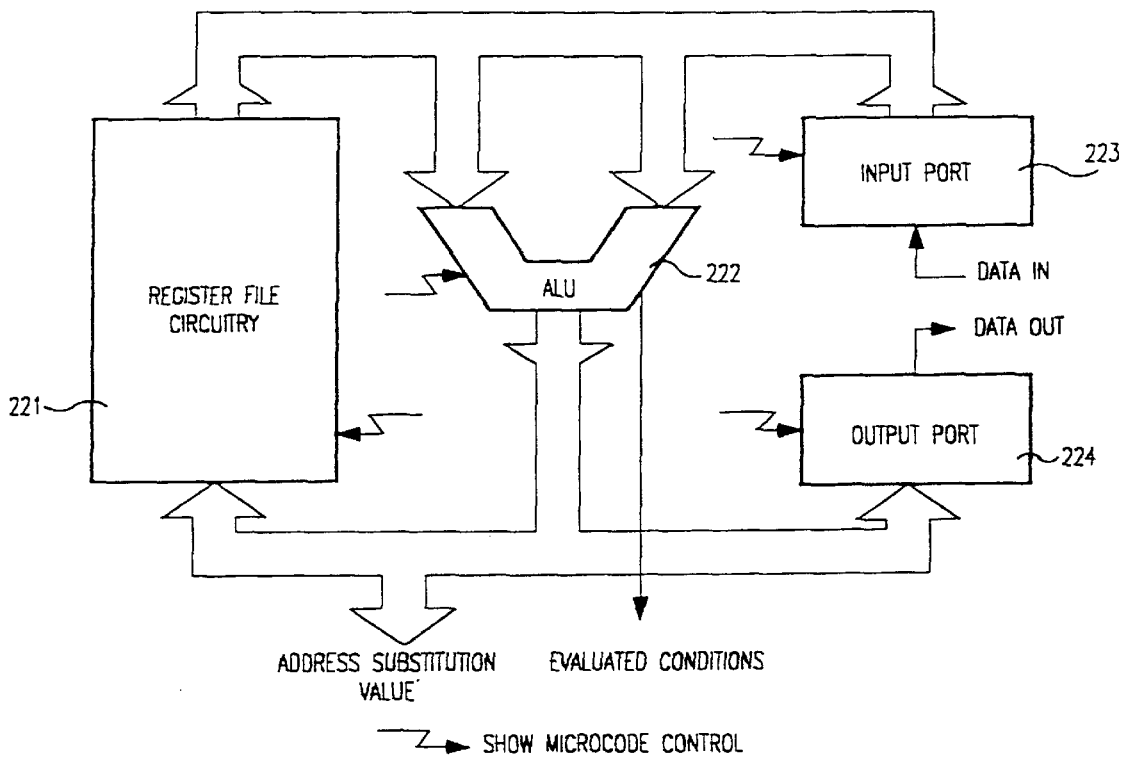
FIG. 8 is a block diagram of one example of an Arithmetic Core in accordance with the present invention.

The state machine 218, in accordance with the present invention, includes a memory containing a list of the microcode instructions. As with conventional microcodable state machines, it is capable of either proceeding through the list of microcode instructions contiguously or a jump can occur from one instruction to another. The jump address is in the form shown in FIG. 7. The substituted value comes from the Arithmetic core 219 as shown in FIGS. 6 and 8. This allows the construction of "jump tables" within the microcode programs. Thus, if a jump is made with 3 bits substituted, for example, there are eight possible contiguous locations that may be jumped to, each dependent on the value from the arithmetic core, i.e., it has so become a programmable jump.

Arithmetic Core

The arithmetic core 219, as shown in FIG. 8, includes a memory called a register file 221, an Arithmetic and Logic unit (ALU) 222, an input port 223 and an output port 224. These components are connected via buses and multiplexers. As previously stated, these components, and the multiplexers defining their connections, are entirely controlled by the microcode instruction issued by the state machine 218. The ALU 222 and the ports 223 and 224 are conventional, however, the register file 221 is a memory which allows variable width indexed accesses. The addresses to the register file 221 is coded directly into the microcode instruction.

There are many advantages of using this method of addressing to the register file. First, many locations in an application do not need to be the full width of the memory (32 bits in this case). Whilst it will cause no effect on the operation of the device to use a full width location, it is very wasteful of memory locations. Minimizing the number of memory locations will minimize the amount of space used by the memory and, therefore, minimize the capacitive loading in the register file. This maximizes the speed of the register file. Second, the indexing combined with the variable width of memory accessing allows the stepping through of locations of variable width. In the one bit case this allows an elegant implementation of long division and multiplication.

In summary, therefore, there is described a procedure for addressing memory having the following steps: (1) providing a fixed width word having a predetermined fixed number of bits to be used for addressing variable width data; (2) defining the fixed width word with a width defining field and an address field providing the width defining field with at least one bit to serve as a termination marker; (3) defining the address field with a plurality of bits defining the address of the data; and (4) varying the size of bits in the address field in inverse relation to the size of the variable width data varying the number of bits in the width defining field in direct relation to the size of the variable width data and maintaining a fixed width word for addressing variable width data while varying the width of the width defining field and the address field. In addition, a procedure for addressing memory having the following steps is described: (1) providing a fixed width word having a predetermined fixed number of bits to be used for addressing data; (2) defining the fixed width word with an address field and a substitution field; (3) defining the address field with a plurality of bits defining the address of the data; (4) defining a variable width substitution field with at least one substitution bit; (5) the substitution field has at least one bit to serve as a termination marker between the address field and the substitution field; and (6) using the substitution field to indicate substituted bits from a separate addressing source and maintaining a fixed width word for addressing variable width data while inversely varying the width of the address field and the width of the substitution field. In addition, a process for addressing variable width data in a memory is described as having the following steps: (1) providing a memory having words of predetermined width and composed of partial words; (2) rotating the partial word to be accessed to a least significant bit justification; (3) extending the remaining part of the word so that the accessed word will be recognized as the partial word; and (4) restoring the remaining part of the word and rotating the word until the partial word is restored to its original position.

Detailed Description of the Invention for Transforming Data Using a Common Processing Block This present embodiment, in accordance with the present invention, relates to a method for the transformation of signals from a frequency to a time representation, as well as a digital circuit arrangement for implementing the transformation.

It is a common goal in the area of telecommunications to increase both information content and transmission speed. Each communications medium, however, imposes a limitation on transmission speed, as does the hardware at the transmitting and receiving end that must process the transmitted signals. A telegraph wire is, for example, typically a much faster medium for transmitting information than the mail is, even though it might be faster to type and read a mailed document than to tap out a telegraph key.

The method of encoding transmitted information also limits the speed at which information can be conveyed. A long-winded telegraph message will, for example, take longer to convey than a succinct message with the same information content. The greatest transmission and reception speed can therefore be obtained by compressing the data to be transmitted as much as possible, and then, using a high-speed transmission medium, to process the data at both ends as fast as possible, which often means the reduction or elimination of 'bottlenecks' in the system.

One application in which it is essential to provide high-speed transmission of large amounts of data is in the field of digital television. Whereas conventional television systems use analog radio and electrical signals to control the luminance and color of picture elements ('pixels') in lines displayed on a television screen, a digital television transmission system generates a digital representation of an image by conveying analog signals into binary 'numbers' corresponding to luminance and color values for the pixels. Modem digital encoding schemes and hardware structures typically enable much higher information transmission rates than do conventional analog transmission systems. As such, digital televisions are able to achieve much higher resolution and much more life-like images than their conventional analog counterparts. It is anticipated that digital television systems including so-called High-Definition TV (HDTV) systems, will replace conventional analog television technology within the next decade in much of in the industrialized world. The conversion from analog to digital imaging, for both transmission and storage will, thus, be similar to the change-over from analog audio records to the now ubiquitous compact discs (CD's).

In order to increase the general usefulness of digital image technology, standardized schemes for encoding digital images have been adopted. Once such standardized scheme is known as the JPEG standard and is used for still pictures. For moving pictures, there are at present two standards, MPEG and H.261, both of which carry out JPEG-like procedures on each of the sequential frames of the moving picture. To gain advantage over using JPEG repeatedly, MPEG and H.261 operate on the differences between subsequent frames, taking advantage of the well-known fact that the difference, that is, the movement between frames, is small. It, therefore, takes less time or space to transmit or store the information corresponding to the changes rather than to transmit or store equivalent still-picture information as if each frame in the sequence were completely unlike the frames closest to it in the sequence.

For convenience, all the current standards operate by breaking an image or picture into tiles or blocks, each block consisting of a piece of the picture eight pixels wide by eight pixels high. Each pixel is then represented by three (or more) digital numbers known as 'components' of that pixel. There are many different ways of breaking a colored pixel into components, for example, using standard notation, e.g., YUV, YCr, Cb, RGB, etc. All the conventional JPEG-like methods operate on each component separately.

It is well known that the eye is insensitive to high-frequency components (or edges) in a picture. Information concerning the highest frequencies can usually be omitted altogether without the human viewer noticing any significant reduction in image quality. In order to achieve this ability to reduce the information content in a picture by eliminating high-frequency information without the eye detecting any loss of information, the 8-by-8 pixel block containing spatial information (for example, the actual values for luminance) must be transformed in some manner to obtain frequency information. The JPEG, MPEG and H.261 standards all use the known Discrete Cosine Transform to operate on the 8-by-8 spatial matrix to obtain an 8-by-8 frequency matrix.

As described above, the input data represents a square area of the picture. In transforming the input data into the frequency representation, the transform that is applied must be two-dimensional, but such two-dimensional transforms are difficult to compute efficiently. The known, two-dimensional Discrete Cosine Transform (DCT) and the associated inverse DCT (IDCT), however, have the property of being "separable". This means that rather than having to operate on all 64 pixels in the eight-by-eight pixel block at one time, the block can first be transformed row-by-row into intermediate values, which are then transformed column-by-column into the final transformed frequency values.

A one-dimensional DCT of order N is mathematically equivalent to multiplying two N-by-N matrices. In order to perform the necessary matrix multiplication for an eight-by-eight pixel block, 512 multiplications and 448 additions are required, so that 1,024 multiplications and 896 additions are needed to perform the full 2 dimensional DCT on the 8-by-8 pixel block. These arithmetic operations, and especially multiplication, are complex and slow and, therefore, limit the achievable transmission rate. They also require considerable space on the silicon chip used to implement the DCT.

The DCT procedure can be rearranged to reduce the amount of computation required. There are, at present, two main methods used for reducing the computation required for the DCT, both of which use "binary decimation". The term "binary decimation" means than an N-by-N transform can be computed by using two N2-by-N2 transformations, plus some computational overhead whilst arranging this. Whereas the eight-by-eight transform requires 512 multiplications and 448 additions, a four-by-four transform requires only 64 multiplications and 48 additions. Binary decimation, thus, saves 284 multiplications and 352 additions and the overhead incurred in performing the decimation is typically insignificant compared to the reduction in computation.

At present, the two main methods for binary decimation were developed by Eong Gi Lee ('A New Algorithm to Compute the DCT') IEEE Transactions on Acoustics, Speech and Signal Processing, Vol. Assp 32, No 6, p 1243 December 1984) and Wen-Hsiung Chen ('A Fast Computational Algorithm for the DCT', Wen-Hsiung Chen, C. Harrison Smith, S C Pralick, IEEE Transactions on Communications, Col. Com 25, No. 9 1004, September 1977). Lee's method makes use of the symmetry inherent in the definition of the inverse DCT and, by using simple cosine identities, it defines a method for recursive binary decimation. The Lee approach is only suitable for the IDCT.

The Chen method uses a recursive matrix identity that reduces the matrices into diagonals only. This method provides easy binary decimation of the DCT using known identities for diagonal matrices.

A serious disadvantage of the Lee and Chen methods is that they are unbalanced in respect of when multiplications and additions must be performed. Essentially, both of these methods require that many additions be followed by many multiplications, or vice versa. When implementing the Lee or Chen methods in hardware, it is, therefore, not possible to have parallel operation of adders and multipliers. This reduces their speed and efficiency since the best utilization of hardware is when all adders and multipliers are used all the time.

An additional disadvantage of such known methods and devises for performing DCT and IDCT operations is that it is usually difficult to handle the so-called normalization coefficient, and known architectures require adding an additional multiplication time when all the multipliers are being used.

Certain known methods for applying the forward and inverse DCT to video data are very simple and highly efficient for a software designer who need not be concerned with the layout of the semiconductor devices which perform the calculations. Such methods, however, often are far too slow or are too complex in semiconductor architecture and hardware interconnections to perform satisfactorily at the transmission rate desired for digital video.

Yet another shortcoming of existing methods and hardware structures for performing DCT and IDCT operations on video data is that they require floating-point internal representation of numerical values. To illustrate this disadvantage, assume that one has a calculator that is only able to deal with three - digit numbers, including digits to the right of the decimal point (if any). Assume further that the calculator is to add the numbers 12.3 and 4.56 (Notice that the decimal point is not fixed relative to the position of the digits in these two numbers. In other words, the decimal point is allowed to 'float'). Since the calculator is not able to store the four digits required to fully represent the answer 16.86, the calculator must reduce the answer to three digits either by truncating the answer by dropping the right-most '6', yielding an answer of 16.8, or it must have the necessary hardware to round the answer up to the closest three-digit approximation 16.9.

As this very simple example illustrates, if floating-point arithmetic is required, one must either accept a loss of precision or include highly complicated and space-wasting circuitry to minimize rounding error. Even with efficient rounding circuitry, however, the accumulation and propagation of rounding or truncation errors may lead to unacceptable distortion in the video signals. This problem is even greater when the methods for processing the video signals require several multiplications, since floating point rounding and truncation errors are typically greater for multiplication than for addition.

A much more efficient DCT/IDCT method and hardware structure would ensure that the numbers used in the method could be represented with a fixed decimal point, but in such a way that the full dynamic range of each number could be used. In such a system, truncation and rounding errors would either be eliminated or, at least, greatly reduced.

In the above example, if the hardware can handle four digits, no number greater than 99.99 were ever needed, and every number had the decimal point between the second and third places, then the presence of the decimal point would not affect calculations at all. Accordingly, the arithmetic could be carried out just as if every number were an integer, e.g., the answer 1230+0456=1686 would be just as clear as 12.30+4.56=16.86, since one would always know that the '1686' should have a decimal point between the middle '6' and '8'. Alternatively, if numbers (constant or otherwise) are selectively scaled or adjusted so that they all fall within the same range, each number in the range couldis ao be accurately and unambiguously represented as a set of integers.

One way of reducing the number of multipliers needed is simply to have a single multiplier that is able to accept input data from different sources. In other words, certain architectures use a single multiplier to perform the multiplications required in different steps of the DCT or IDCT calculations. Although such "crossbar switching" may reduce the number of multipliers required, it means that large complicated multiplexer structures must be included instead to select the inputs to the multiplier, to isolate others from the multiplier, and to switch the appropriate signals from the selected sources to the inputs of the multiplier. Additional large-scale multiplexers are also required to switch the large number of outputs from the shared multipliers to the appropriate subsequent circuitry. Crossbar switching or multiplexing is, therefore, complex, is generally slow (because of the extra storage needed) and costs are significant in a final semiconductor implementation.

Still another drawback of existing architectures, including the "crossbar switching" is that they require general purpose multipliers. In other words, existing systems require multipliers for which both inputs are variable. As is well known, implementations of digital multipliers typically include rows of adders and shifters such that, if the current bit of a multiplier word is a 'one' the value of the multiplicand is added into the partial result, but not if the current bit is a 'zero'. Since a general purpose multiplier must be able to deal with the case in which every bit is a '1', a row of adders must be provided for every bit of the multiplier word.

By way of example, assume that data words are 8 bits wide and that one wishes to multiply single inputs by 5. An 9-bit representation of the number 5 is 00000101. In other words, digital multiplication by 5 requires only that the input value be shifted to the left two places (corresponding to multiplication by 4) and then added to its up-shifted value. The other six positions of the coefficients have bit values of '0', so they would not require any shifting or additional steps.

A fixed-coefficient multiplier, that is, in this case, a multiplier capable of multiplying only by five, would require only a single shifter and a single adder in order to perform the multiplication (disregarding circuitry needed to handle carry bits). A general purpose multiplier, in contrast, would require shifters and adders for each of the eight positions, even though six of them would never need to be used. As the example illustrates, fixed coefficients can simplify the multipliers since they allow the designer to eliminate rows of adders that correspond to zeros in the coefficient, thus saving silicon area.

In an IDCT method, in accordance with the present invention, a one-dimensional IDCT for each N-row and N-column of N-by-N pixel blocks is decimated and a 1-D IDCT is performed separately on the N-2 even-numbered pixel input words and the N-2 odd-numbered pixel input words.

In a preferred embodiment, N=8 according to the JPEG standard. The two-dimensional IDCT result is then obtained by performing two one-dimensional IDCT operations in sequence (with an intermediate reordering-transposition-of data).

In a common processing step, for N=8, a first pair of input values is passed without need for multiplication to output adders and subtractors. Each of a second pair of input values is multiplied by each of two constant-coefficient values corresponding to two scaled cosine values. No other multiplications and only one subtraction and one addition are required in the common processing step. The second pair is then added or differenced pairwise with the first pair of input values to form even or odd resultant values.

In a pre-common processing stage, the lowest order odd input word is pre-multiplied by the square root of two and the odd input words are summed pairwise before processing in the common processing block. In a post-common processing stage, intermediate values corresponding to the processed odd input words are multiplied by predetermined constant coefficients to form odd resultant values.

After calculation of the even and odd resultant values, the N/2 high-order outputs are formed by simple subtraction of the odd resultant values from the even resultant values, and the N/2 low-order outputs are formed by simple addition of the odd resultant values and the even resultant values.

For both the DCT (at the transmission end of a video processing system) and the IDCT (at the receiving end, which incorporates one or more of the various aspects of the present invention), the values are preferably and deliberately scaled downward by a factor of two by a simple binary right shift. This deliberate, balanced, upward scaling eliminates several multiplication steps that are required according to conventional methods.

According to another aspect of the method, in accordance with the present invention, selected bits of constant coefficient or intermediate resulting data words are rounded or adjusted by predetermined setting of selected bits to either '1' or '0'.

Two-dimensional transformation of pixel data is carried out by a second, identical 1-D operation on the output values from the first 1-D IDCT processing steps.

An IDCT system, according to yet another aspect of the present invention, includes a pre-common processing circuit, and a common processing circuit, in which the pre-common, common, and post-common processing calculations are performed on input data words. A supervisory controller generates control signals to control the loading of various system latches; preferably, to serially time-multiplex the application of the N/2 even and N/2 odd-numbered input words to input latches of the pre-common block to direct addition of the even and odd resultant values to form and latch low order output signals and to direct subtraction of the odd resultant values from the even resultant values to form and latch the high-order output signals and to sequentially control internal multiplexers.

In the present invention, even and odd input words are preferably processed in separate passes through the same processing blocks. Input data words are preferably (but not necessarily) latched, not in strictly ascending or descending order, but rather in an order enabling an efficient 'butterfly' structure for the data path.

Furthermore, at least the common processing circuit may be configured as a pre-logic circuit, with no clock or control signals required for its proper operation, as may be other processing blocks, depending on the particular application.

No general-purpose multipliers (with two variable inputs) are required. Rather, constant coefficient multipliers are included throughout the preferred embodiment. Furthermore, fixed-point integer arithmetic devices are included in the preferred embodiment of the invention and can be so designed as to provide a method and system for performing IDCT transformation of video data with one or more of the following features:

1. Constant use of all costly arithmetic operations;
2. In order to reduce the silicon area needed to implement the IDCT, there are a small number of storage elements (such as latches), preferably no more than required for efficient pipelining of the architecture, coupled with a small number of constant coefficient multipliers rather than general purpose multipliers that require extra storage elements;
3. Operations are arranged so that each arithmetic operation does not need to use sophisticated designs, for example, if known 'ripple adders' are used, these would allow sufficient time to 'resolve' (see below) or produce their answers; if operations are arranged in such a way that other devises precede the rearranging operations so as to avoid delay and to allow greater throughput and efficiency;
4. One is able to generate results in a natural order;
5. No costly, complex, crossbar switching is required;
6. The architecture is able to support much faster operations; and
7. The circuitry used to control the flow of data through the transform hardware can be small in area.

Theoretical Background of the Invention

In order to understand the purpose and function of the various components and the advantages of the signal processing method used in the IDCT system according to the present invention, it is helpful to understand the system's theoretical basis.

Separability of a Two-Dimensional IDCT

The mathematical definition of a two-dimensional forward discrete cosine transforms (DCT) for an N×N block of pixels is as follows, where $U(j,k)$ are the pixel frequency values corresponding to the pixel absolute values $X(m,n)$ Equation 1:

$$y(j, k) = \frac{2}{Nc}(j)c(k)\sum_{n=0}^{N-1}\sum_{n=0}^{N-1} X(m, n)\cos\left[\frac{(2m+1)j\pi}{2N}\right]\cos\left[\frac{(2n+1)k\pi}{2N}\right]$$

where, j,k=0,1 . . . , N−1 and $$c(j), c(k) = 1/\sqrt{2} \text{ for } j, k = 0; \text{ otherwise } 1$$

The terms 2N govern the dc level of the transform, and the coefficients c(j), c(k) are known normalization factors.

The expression for the corresponding inverse discrete cosine transform, that is for the IDCT, is as follows:

Equation 2:

$$x(m, n) = \frac{2}{n}\sum_{j=0}^{N-1}\sum_{k=0}^{N-1} c(j)C(k)Y(j, k)\cos\left[\frac{(2m+1)j\pi}{2N}\right]\cos\left[\frac{(2N+1)}{2N}\right]$$

where j,k=0, . . . , N−1 and $$c(j), c(k) = 1/\sqrt{2} \text{ for } j, k = 0; \text{ otherwise } 1$$

The forward DCT is used to transform spatial values (whether representing characteristics such as luminance directly, or representing differences, such as in the MPEG standard) into their frequency representation. The inverse DCT, as its name implies, operates the other 'direction', that is, the IDCT transforms the frequency values back into spatial values.

In the expression, Equation 2, (E2), note that the cosine functions each depend on only one of the summation indices.

The expression E2 can therefore be rewritten as:

Equation 3:

$$x(m, n) = \frac{2}{N}\sum_{j=0}^{N-1} c(j)\cos\left[\frac{(2m+1)j\pi}{2N}\right]\sum_{k=0}^{N-1} c(k)Y(j, k)\cos\left[\frac{(2n+1)k\pi}{2N}\right]$$

This is the equivalent of a first one-dimensional IDCT performed on the product of all terms that depend on k and n, followed, after a straightforward standard data transposition by a second one-dimensional IDCT using as inputs the outputs of the first IDCT operation.

Definition of the 1-D IDCT

A 1-dimensional N-point IDCT (where n is an even number) is defined by the following expression.

Equation 4:

$$X(k) = \sum_{n=0}^{N-1} c(n) \cdot y(n)\cos\left[\frac{\pi(2k+1)n}{2N}\right] \quad k = \{0, 1, \ldots, N-1\}$$

$$c(n) = 1/\left(\sqrt{2}\right) \text{ for } n = 0; \text{ otherwise } 1$$

and where y(n) are the N inputs to the inverse transformation function and x(k) are its N outputs. As in the 2-D case, the formula for the DCT has the same structure under the summation sign, but with the normalization constant outside the summation sign and with the x and y vectors switching places in the equation.

Resolution of a 1-D IDCT

As is shown above, the 2-D IDCT can be calculated using a sequence of 1-D IDCT operations separated by a transpose. In accordance to one embodiment, each of these 1-D operations is in turn, broken down into sub-procedures that are then exploited to reduce even further the required size and complexity of the semiconductor implementation.

Normalization of Coefficients

As is discussed above, an important design goal for IDCT hardware is the reduction of the required number of multipliers that must be included in the circuitry. Most methods for calculating the DCT of IDCT, therefore, attempt to reduce the number of multiplications needed. According to this embodiment, however, all the input values are deliberately scaled upward by a factor of the square root of two. In other words, using the method according to this embodiment of the present invention, the right-hand side of the IDCT expression (E) is deliberately multiplied by the square root of two.

According to this embodiment, two 1-D IDCT operations are performed in series (with an intermediate transpose) to yield the final 2-D IDCT result. Each of these 1-D operations includes a multiplication by the same square root of two factor. Since the intermediate transposition involves no scaling, the result of two multiplications by the square root of two in series is that the final 2-D results will be scaled upward by a factor two. To obtain the unscaled value, the circuitry need then only divide by two. Since the values are all represented digitally, this can be accomplished easily by a simple right shift of the data. As is made clearer below, the upward scaling by the square root of two in each 1-D IDCT stage and final down-scaling by 2 is accomplished by adders, multipliers and shifters all within the system's hardware, so that the system places no requirements for scaled inputs on the other devises to which the system may be connected. Because of this, the system is compatible with other conventional devises that operate according to the JPEG or MPEG standards. Normalization according to this embodiment of the present invention, therefore, eliminates the need for hardware multipliers within the IDCT semiconductor architecture for at least two square root of two multiplication operations. As is explained below in greater detail, the single additional multiplication step (upward scaling by the square root of two) of the input data in each 1-D operation leads to the elimination of still other multiplication steps that are required when using conventional methods.

Separation of the 1-D IDCT into High and Low-Order Outputs

Expression E can now be evaluated separately for the N/2 low-order outputs (k=0,1, . . . , N/2−1) and the N/2 high order outputs (k=N/2, k=N/2+1, . . . N). For N=8, this means that one can first transform the inputs to calculate y(0), y(1), y(2) and y(3), and then transform the inputs to calculate y(4), y(5), y(6) and y(7).

Introduce the variable k"=(N−1−k) for the high-order outputs (k=N/2+1, . . . , N), so that k' varies from (N/2−1) to N as k varies fm ro(N/2+1) to N. For N=8, this means that k'=(3,2,1,0) for k=(4,5,6,7). It can then be shown that expression E can be divided into the following two subexpressions E5 (which is the same as E except for the interval of summation) and E6:

Low order outputs:
Equation 5:

$$X(k) = \sum_{n=0}^{N-1} c(n) \cdot y(n) \cdot \cos\left[\frac{\pi(2k+1)n}{2N}\right]$$

where k={0,1 ..., (N/2−1)}; and $$c(n) = 1/\sqrt{2} \text{ for } n = 0; \text{ otherwise } 1$$

High-order outputs:
Equation 6:

$$x(k) = x(N-1-k'''') = \sum_{n=0}^{N-1} y(n)(-1)^n \cos\left[\frac{\pi(2k'+1)}{2N}\right]$$

where k={N, ... (N/2+1)}Δk'=(N/2−1)

(Since c(n)=1 for all high-order terms, c(n) is not included in this expression)

Note that both E5 and E6 have the same structure under the summation sign except that the term (−1)n changes the sign of the product under the summation sign for the odd-numbered inputs (n odd) for the upper N2 output values and except that the y term will be multiplied by c(O)=1/√2.

Separation of the 1-D IDCT into Even and Odd Inputs

Observe that the single sum in the 1-D IDCT expression E4 can also be separated into two sums: one for the even-numbered inputs (for N=8 y(0), y(2), y(4), and y(6)) and one for the odd-numbered inputs (for n=8, y(1), y(3), y(5), and y(7). Let g(k) represent the partial sum for the even-numbered inputs and h(k) represent the partial sum for the odd-numbered inputs.

Thus:
Equation 7.

$$g(k) = \sum_{n=0}^{(\frac{N}{2})-1} c(2n)y(2n)\cos\left[\frac{\pi(2k+1)2n}{2N}\right] = \sum_{n=0}^{(\frac{N}{2})-1} c(2n)y(2n)\cos\left[\frac{\pi(2k+1)n}{2\left(\frac{N}{2}\right)}\right]$$

Where k={0,1, ..., (N/2−1)}; and

Equation 8.

$$h(k) = \sum_{n=0}^{(\frac{N}{2})-1} y(2n+1)\cos\left[\frac{\pi(2k+1)(2n+1)}{2N}\right]$$

where k=(0,1, ..., (N/2+1)}.

For N=8, observe that the sums in E7 and E8 both are taken over n={0,1,2,3}.

Now recall the known cosine identity:
2.cosA.cosB=cos(A+B)+cos(A−B),
and set A=η(2k+1)/2N and B=η(2k+1)(2N+1)/2N.
One can then multiply both sides of the expression E8 by:
2. cos A=1/{2 cos[η(2k+1)/2N]}=Ck.

Note that, since Ck does not depend on the summation index n, it can be moved within the summation sign. Assume then by definition that y(−1)=0, and note that the cosine function for the input y(7) is equal to zero. The expression for h(k) can then be rewritten in the following form:
Equation 9.

$$h(k) = \frac{1}{2\cos\left(\frac{\pi(2k+1)}{2N}\right)} \sum_{n=0}^{\frac{N}{2}-1} [y(2n+1) + y(2n-1)]\cos\left[\frac{\pi(2K+1)n}{2\left(\frac{N}{2}\right)}\right]$$

Where k=(0,1, ..., (N/2−1)}.

Note that the inputs [y(2n+1)=y(2n−1)] imply that in calculating h(k), the odd input terms are paired to form N/2 paired inputs p(n)=[y(2n+1)=y(2n−1)].

For N=8 the values of p(n) are as follows:

| n | p(n) |
|---|---|
| 0 | y(−1) + Y(1) = Y(1) Y(−1) = 0 by definition |
| 1 | y(1) + y(3) |
| 2 | y(3) + y(5) |
| 3 | y(5) + y(7) |

Expression E9 for h(k) can then be represented by the following:
Equation 10.

$$h(k) = C_k \sum_{n=0}^{\frac{N}{2}-1} p(n)\cos\left[\frac{\pi(2k-1)n}{2\left(\frac{N}{2}\right)}\right]$$

Where k=(0,1, ..., (N/2−1)}.

Observe now that the cosine term under the summation sign is the same for both g(k) and h(k) and that both have the structure of a 1-D IDCT (compared with expression E5). The result of the IDCT for the odd k terms, that is, for h(k), however is multiplied by the factor Ck=1/{2.cos [η(2k+1)/2N.

In other words, g(k) is an n/2-point IDCT operating on even inputs y(2n) and h(k) is an n/2-point IDCT operating on [y(2n+1)=y(2n−1)] where y(−1)=0 by definition.
Now introduce the following identities:

$$c2 = \cos(2\pi 8) = \cos(\pi 4) = 1 \cdot \sqrt{2};$$

Further introduce scaled cosincoe efficients as follows:

$$c1s = \sqrt{2} \cdot \cos(\pi/8);$$

$$c3s = \sqrt{2} \cdot \cos(3\pi 8);$$

Using the evenness (cos (−φ)=cos (φ)) and periodicity (cos (−φ))η(−φ)=−cos (φ) of the cosine function, expressions E7 and E8 can then be expanded for N=8 to yield (recall also (0) is $1/\sqrt{2}$;

$$g(0) = 1/\sqrt{2} \cdot y0 + y2c1 + y4c2 + y6c3 =$$
$$1/\sqrt{2} \cdot (y + y2 \cdot c1s + y4 + y6 \cdot c3s)$$
$$g(1) = 1/\sqrt{2} \cdot y0 + y2c3 - y4c2 - y6c1 =$$
$$1/\sqrt{2} \cdot (y0 + y2 \cdot c3s - y4 - y6 \cdot c1s) + y6 \cdot c1s)$$
$$g(3) = 1/\sqrt{2} \cdot y0 - y2c1 + y4c2 - y6c3 =$$
$$1/\sqrt{2} \cdot (y0 - y2 \cdot c1s + y4 - y6 \cdot c3s)$$

and $$h(0) = d1 \cdot \{y1 + (y1 + y3)c1 + (y3 + y5)c2 + (y5 + y7)c3\} = d1/\sqrt{2} \cdot$$
$$\{\sqrt{2} \cdot y1 + (y1 + y3) \cdot c1s + (y3 + y5) + (y5 + y7) \cdot c3s\}$$
$$h(1) = d3 \cdot \{y1 + (y1 + y3)c3 - (y3 + y5)c2 + (y5 + y7)c1\} =$$
$$d3/\sqrt{2} \cdot \{\sqrt{2} \cdot y1 + (y1 + y3)c3s - (y3 + y5) - (y5 + y7)c1s\}$$
$$h(2) = d5 \cdot \{y1 + y3)c3 - (y3 + y5)c2 + (y5 + y7)c1\} =$$
$$d5/\sqrt{2} \cdot \{\sqrt{2} \cdot y1 - (y1 + y3) \cdot c3ys - (y3 ++ y5) - (y5 + y7)c1s\}$$
$$h(3) = d7 \cdot \{y1 - (y1 + y3)c1 + (y3 + y5)c2 - (y5 + y7)c3\} =$$
$$d7/\sqrt{2} \cdot \{\sqrt{2} \cdot y1 - (y1 + y3) \cdot c1s + (y3 + y5) - (y5 + y7) \cdot c3s\}$$

Now, recall that according to this embodiment of the present invention, all values are scaled upward by a factor of 2 for both the DCT and IDCT operations. In other words, according to the embodiment, both h(k) and g(k) are multiplied by this scaling factor. The g(k) and h(k) expressions, erthefore, become:

Equation 11.
$$g(0)=y0+y2*c1s +y4+y6*c3s$$
$$g(1)=y0+y2*c3s-y4-y6*c3s$$
$$g(2)=y0-y2*c3s-y4+y6*c1s$$
$$g(3)=y0-y2*c1s+y4-y6*c3s$$
and
Equation 12.

$$h(0) = d1[\sqrt{2} * y1 + (y1 + y3)*c1s + (y3 + y5) + (y5 + y7)*c3s]$$
$$h(1) = d3[\sqrt{2} * y1 + (y1 + y3)*c3s - (y3 + y5) - (y5 + y7)*c1s]$$
$$h(2) = d5[\sqrt{2} * y1 - (y1 + y3)*c3s - (y3 + y5) + (y5 + y7)*c1s]$$
$$h(3) = d7[\sqrt{2} * y1 - (y1 + y3)*c1s + (y3 + y5) - (y5 + y7)*c3s]$$

Notice that since c2=cos $(\eta/4)=1/\sqrt{2}$, multiplication $\sqrt{2}$ gives a scaled c2 value =1. By responding to upward scaling of the values of the video absolute and frequency values) according to this embodiment, it is, therefore, possible to eliminate the need to multiply and c3s, both of which are constant coefficients so that general utility multipliers are not needed. This, in turn, eliminates the need for the corresponding hardware multiplier in the semiconductor implementation of the IDCT operations.

The similarity in structure of g(k) and h(k) can be illustrated by expressing these sets of equations in matrix form. Let C be the 4×4 cosine coefficient matrix defined as follows:

Equation 13.

$$C = \begin{vmatrix} 1 & c1s & 1 & c3s \\ 1 & c3s & -1 & -c1s \\ 1 & -c3s & -1 & c1s \\ 1 & -c1s & 1 & -c3s \end{vmatrix}$$

Equation 14

$$\begin{vmatrix} g(0) \\ f(1) \\ g(2) \\ g(3) \end{vmatrix} = \underline{c} * \begin{vmatrix} y0 \\ y2 \\ y4 \\ y6 \end{vmatrix}$$

Equation 15.

$$\begin{vmatrix} h(0) \\ h(1) \\ h(2) \\ h(3) \end{vmatrix} = D * \underline{C} * \begin{vmatrix} \sqrt{2} * y1 \\ y1 + y3 \\ y3 + y5 \\ y5 + y7 \end{vmatrix}$$

Where D=diag[d1, d3, d5, d7]=the 4×4 matrix with dl, d3, d5, and d7 along the diagonal and with other elements equal to zero. As E14 and E15 show, the procedures for operating on even-numbered inputs to get g(k) and for operating on the odd-numbered inputs to get h(k) both have the common step of multiplication by the cosine coefficient matrix C. To get h(k), however, the inputs must first be pairwise summed (recalling that y(-1)=0 by definition), y(1) must be premultiplied by 2, and the result of the multiplication by C must be multiplied by D.

As the expressions above also indicate, the N-point, 1-D IDCT (see E4) can also be split into the two N/2-point, I-D IDCT's each involving common core operations (under the summation sign) on the N/2 odd (grouped) and the N/2 even input values. The expressions above yield the following simple structure for the IDCT as implemented in this embodiment:

Low-order outputs for (N=8, outputs k=}0,1,2,3}):
Equation 16.

$$y(k)=g(k)+h(k)$$

High-order outputs (for N=8, outputs k={4,5,6,7}):
Equation 17.

$$y(k)=y(N-1-k')=g(k')-h(k')$$

Note that g(k) operates directly on even input values to yield output values directly, whereas h(k') involves grouping of input values, as well as multiplication by the values d1, d3, d5 and d7.

As always, thdee signer of an IDCT circuit is faced with a number of trade-offs, such as size versus speed and greater number of implemented devices versus reduced interconnection complexity. For example, it is often possible to improve the speed of computation by including additional, or more complicated devices on the silicon chip, but this obviously makes the implementation bigger or more complex. Also, what is available or desired on the IDCT chip may limit or preclude the use of sophisticated, complicated, designs such as "look-ahead" adders.

Standards of Accuracy

Assuming infinite precision and accuracy of all calculations, and, thus, unlimited storage space and calculation time, the image recreated by performing the IDCT and DCT-transformed image data would reproduce the original image perfectly. Of course, such perfection is not to be had using existing technology.

In order to achieve some standardization, however, IDCT systems are at present measured according to a standardized method put forth by the Comite Consultatif International Telegraphique et Telephonique ('CCIT') in 'Annex 1 of CCITT Recommendations H.261—Inverse Transform Accuracy Specification.' This test specifies that sets of 10,000 8-by-8 Blocks containing random integers be generated. These blocks are then DCT and IDCT transformed (preceded or followed by predefined rounding, clipping and arithmetic operations) using predefined precision to produce 10,000 sets of 8-by-8 'reference' IDCT output data.

When testing an IDCT implementation, the CCITT test blocks are used as inputs. The actual IDCT transformed outputs are then compared statistically with the known 'reference' IDCT output data. Maximum values are specified for the IDCT in terms of peak, mean, mean square, and mean mean error of blocks as a whole and as individual elements. Furthermore, the IDCT must produce all zeros output if the corresponding input block contains all zeros, and the IDCT must meet the same standards when the sign of all input data is changed. Implementations of the IDCT are said to have acceptable accuracy only if their maximum errors do not exceed the specified maximum values when these tests are run.

Other known standards are those of the Institute of Electrical and Electronic Engineers ('IEEE'), in 'IEEE Draft Standard Specification for the Implementation of 8 by 8 Discrete Cosine Transform', P1180/D2, Jul. 18, 1990; and Annex A of '8 by 8 Inverse Discrete Cosine Transform',. ISO committee Draft CD 11172-2. These standards are essentially identical to the CCITT standard described above.

Hardware Implementation

Figure 9:
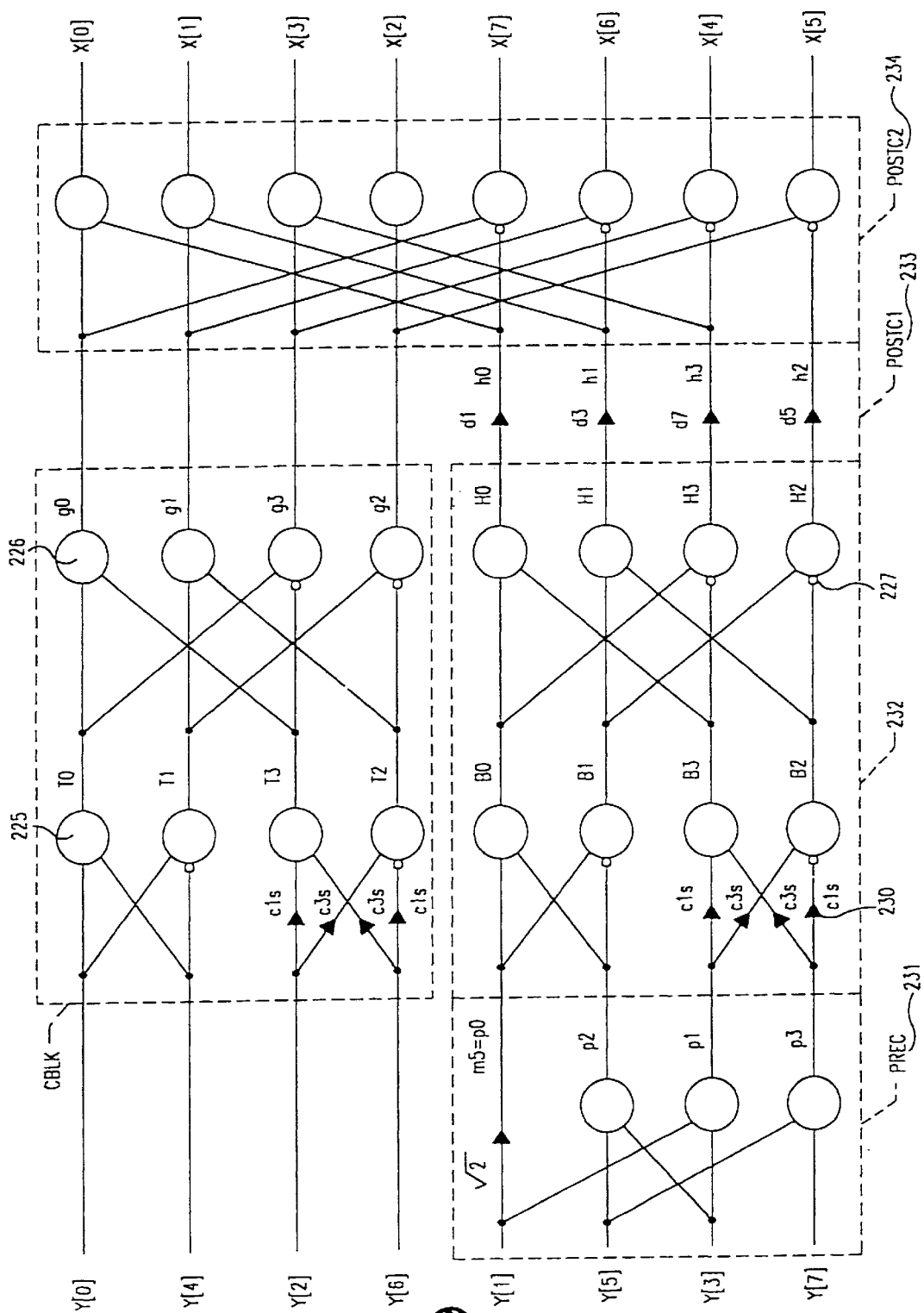
FIG. 9 illustrates the basis steps in a method, in accordance with the present invention, for performing an IDCT on input data.

FIG. 9 is a simplified block diagram illustrating the data flow of the IDCT method according to one embodiment of the present invention (although the hardware structure, as is illustrated and explained below, is made more compact and efficient). In FIG. 9, the inputs to the system such as Y[0] and Y[4], and the outputs from the system, such as X[3] and x[6], are shown as being conveyed on single lines. It is to be understood that each of the single-drawn lines in FIG. 9 represents several conductors in the form of data buses to convey, preferably in parallel, the several-bit wide data words to which each input and output corresponds.

In FIG. 9, the large open circles 225 and 226 represent two-input adders, whereby a small circle 227 at the connection point of an input with the adder indicates that the complement of the corresponding input word is used. Adders with such a complementing input, thus, subtract the complemented input from the non complemented input. For example, although the output T0 from the upper left adder will be equal to Y[0]+Y[4] that its, T0=Y0+Y4, the adder with the output T1 forms the value Y0+(−1),* Y4=Y0−Y4. Adders with a single complementing input can, therefore, be said to be differencing components.

Also in FIG. 9, constant-coefficient multipliers are represented by solid triangles 230 in the data path. For example, the input Y1 passes through a square root of two multiplier before entering the adder to form B0. Consequently, the intermediate value T3=Y2.T3=Y2.c1S+Y6.c3s, and the intermediate value B2 =p1.c3s-p3.cls=(Y1+Y3).c3s−(Y5+Y7).cls. By performing the indicated additions, subtractions, and multiplications, one will see that the illustrated structure implements the expressions E11 and E12 for g(O) to g(3) and h(0) to h(3).

FIG. 9 illustrates an important advantage of the embodiment, in accordance with the present invention. As FIG. 9 shows, the structure is divided into four main regions: a precommon block, PREC 231, that forms the paired inputs p(k) and multiplies the input y(1) by the square root of two; a first post-common block, POSTC1 233, that includes four multipliers for the constants d1, d3, d5, d7 (see expression El 2); a second post-common block, POSTC2 235, that sums the g0 to g3 terms and the h0 to h3 terms for the low order outputs, and forms the difference of the g0 to g3 terms and the h0 to h3 terms for the high-order outputs (See expressions E17 and E17); and a common block, CBLK 232, is included in both the even and odd data paths. In the processing circuitry according to the embodiment of the present invention, the common operations performed on the odd and even numbered inputs are carried out by a single structure, rather than duplicated structure as illustrated in FIG. 9.

To understand the method of operation and the advantages of certain digital structures used in the embodiment, it is helpful to understand what "carry bits". As a simple example, note that the addition of two binary numbers is such that 1+1=0, with a carry of "1", which must be added into the next higher order bit to produce the correct result "10"(the binary representation of the decimal number "2"). In other words, 01+01=00 (the "sum" without carry)+10 (the carry word); adding the "sum" to the "carry word" one gets the correct answer 00+10=10.

As a decimal example, assume that one needs to add the numbers '436' and '825'. The common procedure for adding two numbers by hand typically proceeds as follows:

1. Units '6' plus '5' is '1' with a carry of '1' into the 'tens' position—Sum: 1, Carry-in: 0, Carry-Out: 0.
2. Tens: '3' plus '2' is '5', plus the '1' carried from the preceding step, gives '6' with no carry—Sum: 5, Carry-In: 0, Carry-Out:0.
3. Hundreds: '4' plus '8' is '2' with a carry of 1 into the thousands, but with no carry to be added in from the previous step; Sum: 2, Carry-In:), Carry-Out:1
4. Thousands: '0' plus '0', plus the '1' carried from the hundreds gives, '1' Sum: 0, Carry-in: 1, Carry-Out: 0.

The answer, '1261', is, thus, formed by adding the carry-in sum for each position to the sum for the same position, with the carry-in to each position being the carry-out of the adjacent lower-order position. (Note that this implies that the carry-in to the lowest order position is always a '0'). The problem, of course, is that one must wait to add the '4' and '8' in the hundreds place until one knows whether there will be a carry-in from the tens place. This illustrates a "ripple adder", which operates essentially in this way. A ripple adder, thus, achieves a 'final' answer without needing extra storage elements, but it is slower than some other designs.

One such alternative design is known as 'carry-save', in which the sum of two numbers for each position is formed by storing a partial sum or result word (in this example, 0251) and the carry values in a different word (here, 1010). The full answer is then obtained by 'resolving' the sum and carry words in a following addition step, thus, 0251+1010= 1261. Note that one can perform the addition for every position at the same time, without having to wait to determine whether a carry word can be added to the partial result at any time as long as it is saved.

Since the resolving operations typically require the largest proportion of the time required in each calculation stage, speeding up these operations has a significant effect on the overall operating speed while requiring only a relatively small increase in the size of the transform. Carry-save multipliers, therefore, are usually faster than those that use ripple adders in each row. However, this gain in time comes at the cost of greater complexity, since the carry word for each addition in the multiplier must be either stored or passed down to the next addition. Furthermore, in order to obtain the final product of a multiplication, the final partial sum and final carry word will have to be resolved, normally by addition in a ripple adder. Note, however, that only one ripple adder will be needed, so that the time savings are normally proportional to the size of the multiplication that must be performed. Furthermore, note that a carry word may be treated as any other number to be added in and as long as it is added in at some time before the final multiplication answer is needed, the actual addition can be delayed.

In this embodiment of the present invention, this possibility of delaying resolution is used to simplify the design and to increase the throughout of the IDCT circuitry. Also, certain bits of preselected carry words are, optionally and deliberately forced to predetermined values before resolution in order to provide greater expected accuracy of the IDCT result based on a statistical analysis of test runs of the invention on standard test data sets.

Figure 10:
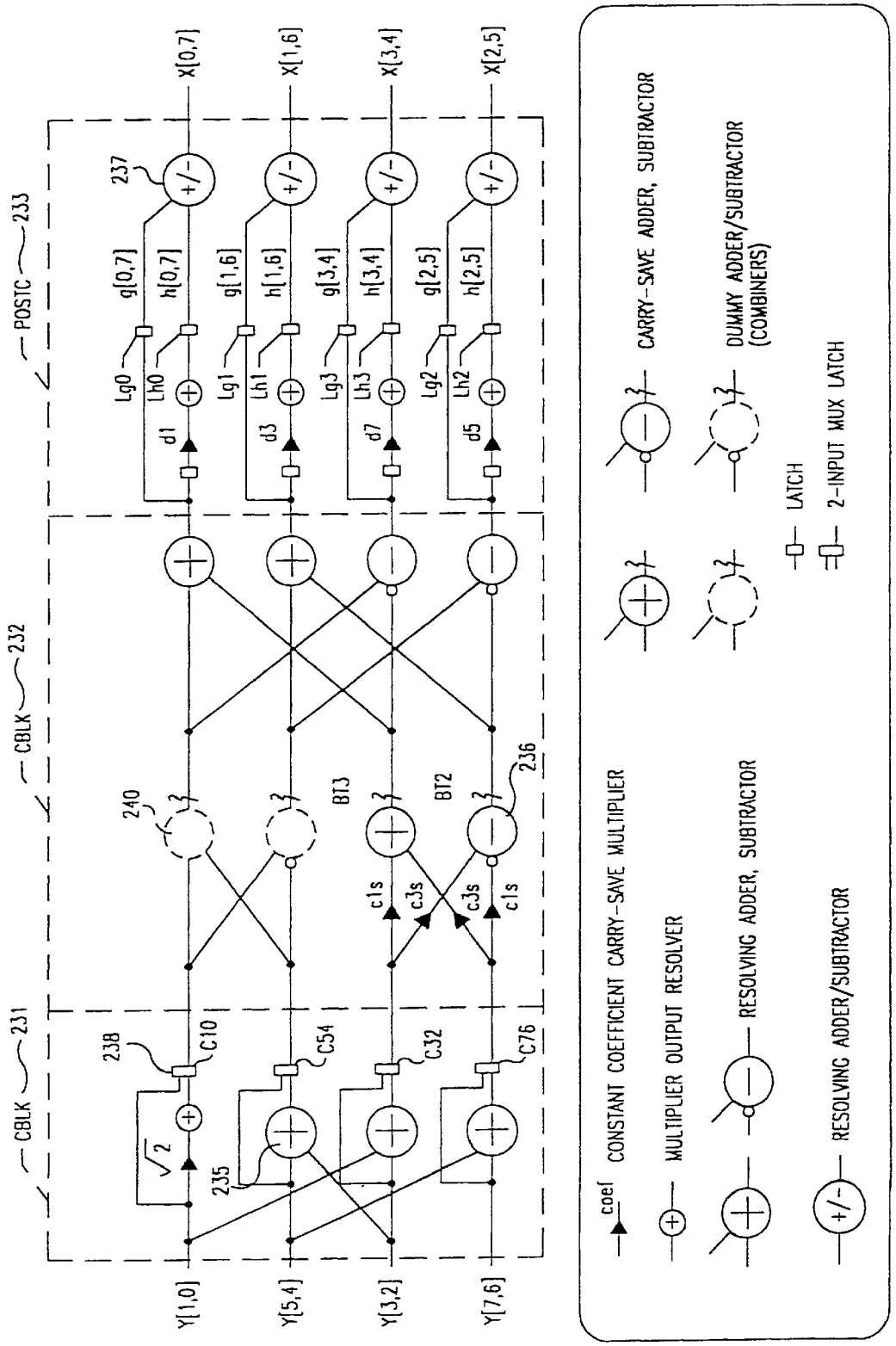
FIG. 10 is a block diagram illustrating the combined, simplified, two-stage architecture of an IDCT system, in accordance with the present invention.

FIG. 10 is a block diagram that illustrates a preferred structure, in accordance with the present invention. In this preferred embodiment of the present invention, the even and odd numbered inputs are time-multiplexed and are processed separately in the common block CBLK 232. The inputs may be processed in either order.

In FIG. 10, the notation Y[1,0], Y[5,4], Y[3,2] and Y[7,6] is used to indicate that the odd numbered inputs Y1, Y3, Y5, Y7 preferably pass through the calculation circuitry first, followed by the even numbered inputs Y0, Y2, Y4, Y6. This order is not essential to the present embodiment; nonetheless, as is explained below, certain downstream arithmetic operations are performed only on the odd numbered inputs, and by entering the odd numbered input values first, these downstream operations can be processing at the same time that arithmetic operations common to all inputs are performed upstream on the even numbered inputs. This reduces the time that several arithmetic devices would otherwise remain idle.

Similarly, the notation X[0,7], X[1,6], X[3,4], X[2,5] is used to indicate that the low order outputs X0, X1, X2, X3 are output first, followed by the high order outputs X4, X5, X6, X7. As FIGS. 9 and 10 illustrate, the inputs are preferably initially not grouped in ascending order, although this is not necessary since to odd numbered inputs are Y1, Y5, Y3, and Y7. Arranging the input signals in this order makes possible the simple 'butterfly' data path structure shown in FIGS. 9 and 10 and greatly increases the interconnection efficiency of the implementation of the present invention in silicon semiconductor devices.

As shown in FIG. 10, adders and subtractors are indicated by circles either a '+' (adder) 235, '−' (subtractor) 236 which is an adder with one complementing input or '±' (resolving adder/subtractor, which is able to switch between addition and subtraction 237). The left most adders and subtractors in the common block 232 of the two m-bit input words is the m-bit partial resulting parallel with the m-bit or (m-1) bit word containing the carry bits of the addition/subtraction. In other words, the first additions and subtractions in the common block CBLK 232 are preferably unresolved, meaning that the addition of the carry bits is delayed until a subsequent processing stage. The advantage of this step is that such carry-save adder/subtractors since they do not need to perform the final addition of the carry-bit word to the result. Resolving adders may, however, also be used in order to reduce the bus width at the outputs of the adders.

FIG. 10 also illustrates the use of one and two input latches in the preferred embodiment of the present invention. In FIG. 10, latches are illustrated as rectangles 238 and are used in both the pre-common block PREC 231 and the post-common block POSTC 233. Single-input latches are used at the inputs of the multipliers D1, D3, D5 and D7, as well as to latch the inputs to the resolving adders/subtractors which are the computed g(k) and h(k) values corresponding to the respective outputs from latches g[0,7], g[1,6], g[3,4] and g[2,5] and h[0,7], h[1,6], h[3,4] and h[2,5]. As such, the resolving adders/ subtractors perform the addition or subtraction indicated in expressions E16 and E17 above.

As described previously, the even-numbered inputs Y0, Y2, Y4 and Y6 do not need to be paired before being processed in the common block CBLK 232. However, not only do the odd-numbered inputs require such pairing, but the input Y12 must also be multiplied by the square root of two in order to ensure that proper input values are presented to the common block CBLK 232. The pre-common block PREC 231, therefore, includes a 2-input multiplexing ('mux') latch C10, C54, C32 and C76 for each input value. One input to the 2-input mux latch is consequently tied directly to the unprocessed input values, whereas the other input is received from the resolving adders and, for the input Y1, the resolving square root of two multiplier. The correct paired or unpaired inputs can, therefore, be easily presented to the common block CBLK 232 easily by simple switching of the multiplexing latches between their two inputs.

As FIG. 10 illustrates, the square root of two multipliers D1, D3, D5, D7 preferably resolve their outputs, that is, they generate results in which the carry bits have been added in to generate a complete sum. This ensures that the outputs from the multipliers have the same bus width as the un-multiplied inputs in the corresponding parallel data paths.

The preferred embodiment of the common block 232, in accordance with the present invention, also includes one 'dummy' subtractor 240 in the forward data path for Y[1,0] and Y[5,4], respectively. These devices act to combine the two inputs (in the case of the dummy subtractor, after 2's-complementing the one input) in such a way that they are passed as parallel outputs. In each case, the one input is manipulated as if it contained carry bits, which are added on in the subsequent processing stage. The corresponding addition and subtraction is, thus, performed, although it is delayed.

This technique reduces the resources required in the upper two data paths since a full-scale adder/subtractor need not be implemented for these devices. Therefore, the 'combiners' act as adders and subtractors and can be implemented for these devices and can be implemented either as simple conductors to the next device (for addition), or as a row of inverters (for subtraction), either of which requires little or no additional circuitry.

The use of such combiners also means that the outputs from the initial adders and subtractors in the common block CBLK 232 will all have the same width and will be compatible with the outputs of the carry-save adder/subtractor found in the bottom two data paths, with which they form inputs to the subsequent resolving adders and subtractors in the common block CBLK.

As described previously, the even-numbered inputs are processed separately from the odd-numbered inputs in this preferred embodiment of the present invention. Assume, further, that the odd-numbered inputs are to be processed first. Supervisory control circuitry (not shown in FIG. 10) applies the odd-numbered input words to the pre-common block PREC, and selects the lower inputs (viewed as in FIG. 10) of the multiplexing latches C10, C54, C32, C76 which then stores the paired values p0 to p3 (see FIG. 9 and the definition of p(n) above). The latches 1h0, 1h1, 1h3 and 1h2 are then activated to latch the values H0, H1, H3 and H2, respectively.

The supervisory control circuitry latches and then selects the upper inputs of the two-input multiplexing latches C10, C54, C32 and C76 in the precommon block PREC 231 and applies the even numbered input words to these latches. Since the even-numbered inputs are used to form the values of g0 to g3, the supervisory control circuitry also opens the latches Lg0 to Lg3 in the post-common block POSTC 233, to store the g(k) values.

Once the g(k) and h(k) values are latched, the post-common block POSTC 233 outputs the high-order signals X7, X6, X5 and X4 by switching the resolving adder subtractors to the subtraction mode. The low order output signals X3, X2, X1 and X0 are then generated by switching the resolving adders/subtractors to the addition mode. Note that the output data can be presented in an arbitrary order, including natural order.

The preferred multiplexed implementation, in accordance with the present invention, is illustrated in greatly simplified, schematic form in FIG. 10, performs the same calculations as the non-multiplexed structure illustrated in FIG. 9. The number of adders, subtractors and multipliers in the common block CBLK 232 is, however, cut in half and the use of dummy adder/subtractors 240 further reduces the complexity of the costly arithmetic circuitry.

Figure 11:
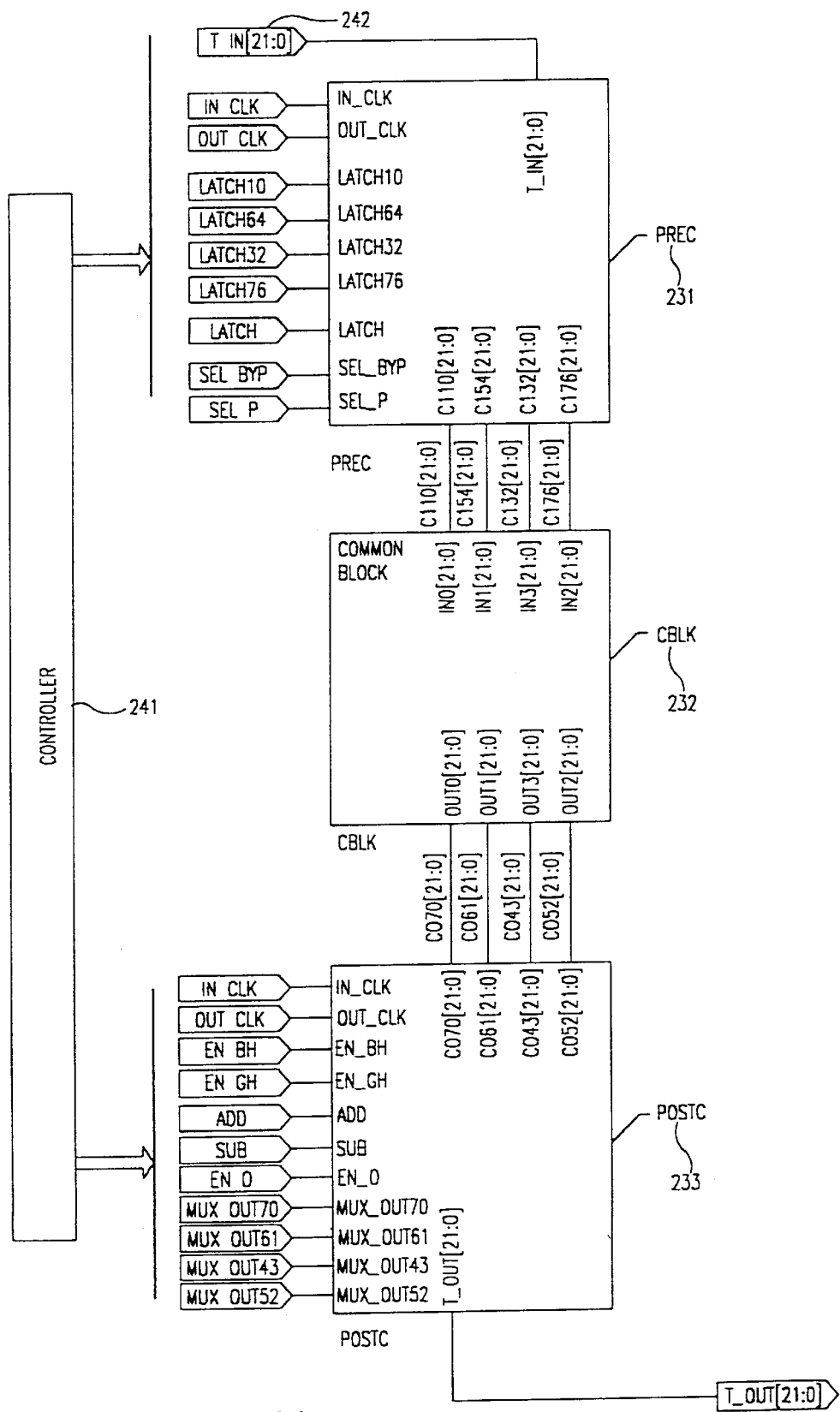
FIG. 11 is a simplified block diagram of an integrated circuit that comprises the main system components of the IDCT shown in FIG. 10.

FIG. 11 illustrates the main components and data lines of an actual implementation of the IDCT circuit according to the embodiment of the present invention. The main components include the precommon block circuit PREC 231, the common block circuit CBLK 232, and the post-common block POSTC 233. The system also includes a controller CNTL 241 that either directly or indirectly applies input, timing and control signals to the precommon block PREC 231 and post-common block POSTC 233.

In the preferred embodiment of the present invention, the input and output signals (Y0 to Y7 and X0 to X7, respectively) are 22 bits wide. Tests have indicated that this is the minimum width that is possible which still yields acceptable accuracy as measured by existing industry standards. As is explained in greater detail below, this minimum width in achieved in part by deliberately forcing certain carry words in selected arithmetic devices to be either a '1' or a '0'. This bit manipulation, corresponding to an adjustment of certain data words, is carried out as the result of a statistical analysis of the results of the IDCT system, in accordance with the present invention, to the after using the IDCT transformation of known input test data. By forcing certain bits to predetermined values, it was discovered that the effects of rounding and truncation errors could be reduced, so that the spatial output data from the IDCT system could be made to deviate less from the known 'correct' spatial data. The present invention is equally applicable, however, to other data word lengths since the components used in the circuit according to the present embodiment can all be adapted to different bus widths using known methods.

Although all four inputs that are processed together could be input simultaneously to the pre-common block PREC along 88 parallel conductors (4×22), pixel words are typically converted one at a time from the transmission data. According to the present embodiment, input data words are, therefore, preferably all conveyed serially over a single 22 bit input bus and each input word is sequentially latched at the proper input point in the data path. As shown in FIG. 11, the 22 bit input data bus is labelled T_IN[21:0]242.

In the Figures and in the discussion below, the widths of multiple-bit signals are indicated in brackets with the high-order bit to the left of a colon ':' and the least significant bit (LSB) to the right of the colon. For example, the input signal T IN[21:0] 242 is 22 bits wide, with the bits being numbered from 0 to 21. A single bit is identified as a single number within square brackets, thus, T_IN[1] indicates the next to least significant bit of the signal T_IN.

The following control signals are used to control the operation of the pre-common block PREC 231 in the preferred embodiment of the present invention.

IN_CLK OUT_CLK: The system, in accordance with the present invention, preferably uses a non-overlapping two phase clock. The signals IN_CLK and OUT_CLK are accordingly columns of latches that hold the values of input, intermediate, and output signals.

LATCH10, LATCH54, LATCH32, LATCH76: Preferably, one 22-bit word is input to the system at a time. On the other hand, four input signals are processed at a time. Each input signal must, therefore, be latched at its appropriate place in the architecture before being processed with three other input words. These latch signals are used to enable the respective input latches. The signal LATCH54, for example, is first used to latch input signal Y5 and later to latch input signal Y4, which enters the pre-common block PREC 231 at the same point as the input signal Y5 (see FIG. 10) but during a subsequent processing stage.

LATCH: Once the four even or odd-numbered input signals are latched into the pre-common block PREC 231, they are preferably shifted at the same time to a subsequent column of latches. The signal LATCH is used to enable a second column of input latches that hold the four input values to be operated on by the arithmetic devices in the pre-common block PREC 231.

SEL_BYP, SEL_P: As FIG. 10 illustrates, the even-numbered input signals that are latched into the latches C10, C54, C32 and C76 should be those that bypass the adders and the square root of two resolving multiplier. The odd-numbered input signals, however, must first be paired to form the paired inputs p(n), and the signal Y1 must be multiplied by the square root of two. The control signal SEL_P is activated in order to select the paired input signals. Hence, these signals are used to control gates that act as multiplexers to let the correct signals pass to the output latches of the precommon block PREC 231.

As discussed previously, not having to arrange the inputs in strictly ascending order leads to a simplified 'butterfly' bus structure with high interconnection efficiency. As also described, the odd inputs are preferably applied as a group to the pre-common block first, followed by the even-numbered inputs, but any order may be used within each odd or even group, i.e., any order of inputs may be used, however, suitable latch arrangements as separately provided to process the odd-numbered inputs, or at least are provided in separate regions of the circuit.

The supervisory control circuitry also generates timing and control signals for the post-common block POSTC 233. These control signals are as follows:

EN_BH, EN_GH: Referring again to FIG. 9, the outputs from the common block CBLK 232, after processing of the odd-numbered inputs, are shown as H0, H1, H3, and H2. These signals are then sent to the coefficient multipliers, d1, d3, d7, d5, respectively, in the first post common block POSTC 1 233. The signal EN_BH is used to enable latches that hold the g0 to g3 values, as well as to enable the latches that hold the h0 to h3 values after they have been multiplied in the coefficient multipliers.

ADD, SUB: As FIG. 10 illustrates, the embodiment includes a bank of resolving adders/subtractors that sum and difference(k) and h(k) values in order to form the low-order outputs, respectively. The signals ADD, SUB are used to set the resolving adders/subtractors in the addition and subtraction modes, respectively.

EN_O: This signal is used to enable output latches that latch the results from the resolving adders/subtractors.

MUX_OUT70, MUX_OUT61, MUX_OUT43, MUX_OUT52: In accordance with the present invention, the output data from the system is preferably transmitted over a single 22-bit output bus, so that only one output value (X0 to X7) is transferred at a time. These signals are activated sequentially to select which of the four latched output values is to be latched into a final output latch. Accordingly, these signals thus act as the control signals for a 4-to-1 multiplexer.

T_OUT[21:0]: This label indicates the 22-bit output signal from the post-common block POSTC 233.

The output signals from the pre-common block PREC 231 are latched to form the input signals to the common block CBLK 232. As shown in FIG. 11, the output signals from the pre-common block PREC 231 are presented as the four 22-bit data words CI10[21:0], CI54[21:0], CI32[21:0], CI76[21:0], which became the input signals IN[0], IN[1], IN[3], IN[29], respectively, to the common block CBLK 232.

As FIG. 11 shows, the four 22-bit results from the common block CBLK 232 are transferred in parallel as output signals OUT0[21:0], OUT1 [21:0], OUT3[21:0], OUT2[21:0], which are then latched as the input signals of the post-common block POSTC 233 as CO70[20:1], CO61[21:0], CO43[21:0], CO52[21:0].

One should take particular note that no control signals are required for the common block CBLK. Because of the unique structure of the IDCT system in this example, the common block of the system's operations can be performed as pure logic operations, with no need for clock, timing or control signals. This further reduces the complexity of the device. One should also note that in certain applications (particularly those in which there is plenty of time to perform all needed arithmetic operations) the pre-common and post-common blocks PREC 231, POSTC 233 may also be arranged to operate without clock timing or control signals.

Figure 12A:
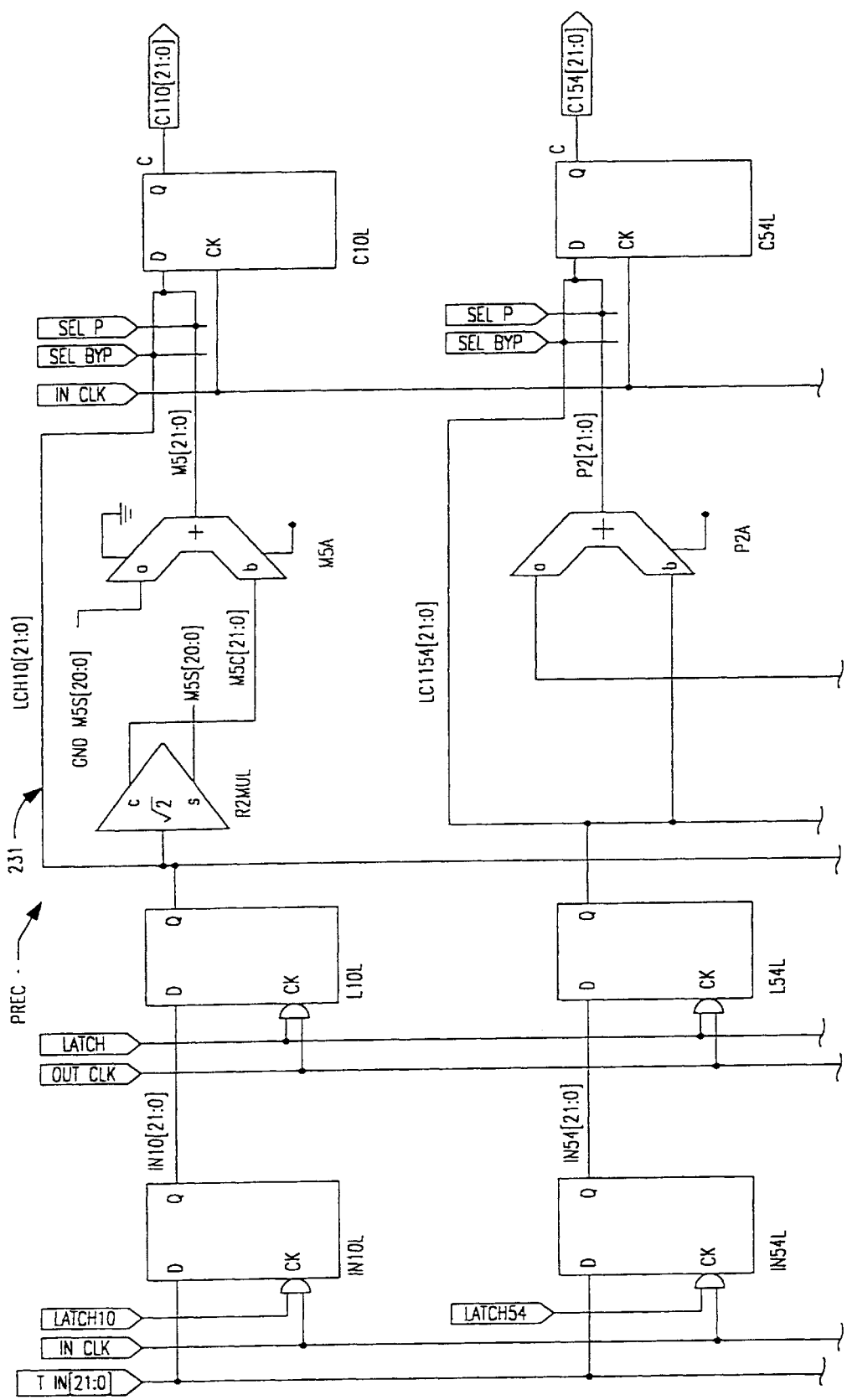
FIG. 12a and FIG. 12b taken together are a block diagram of a pre-processing circuit corresponding to one of the main system component; for ease of explanation, these figures are referred collectively as FIG. 12.
Figure 12B:
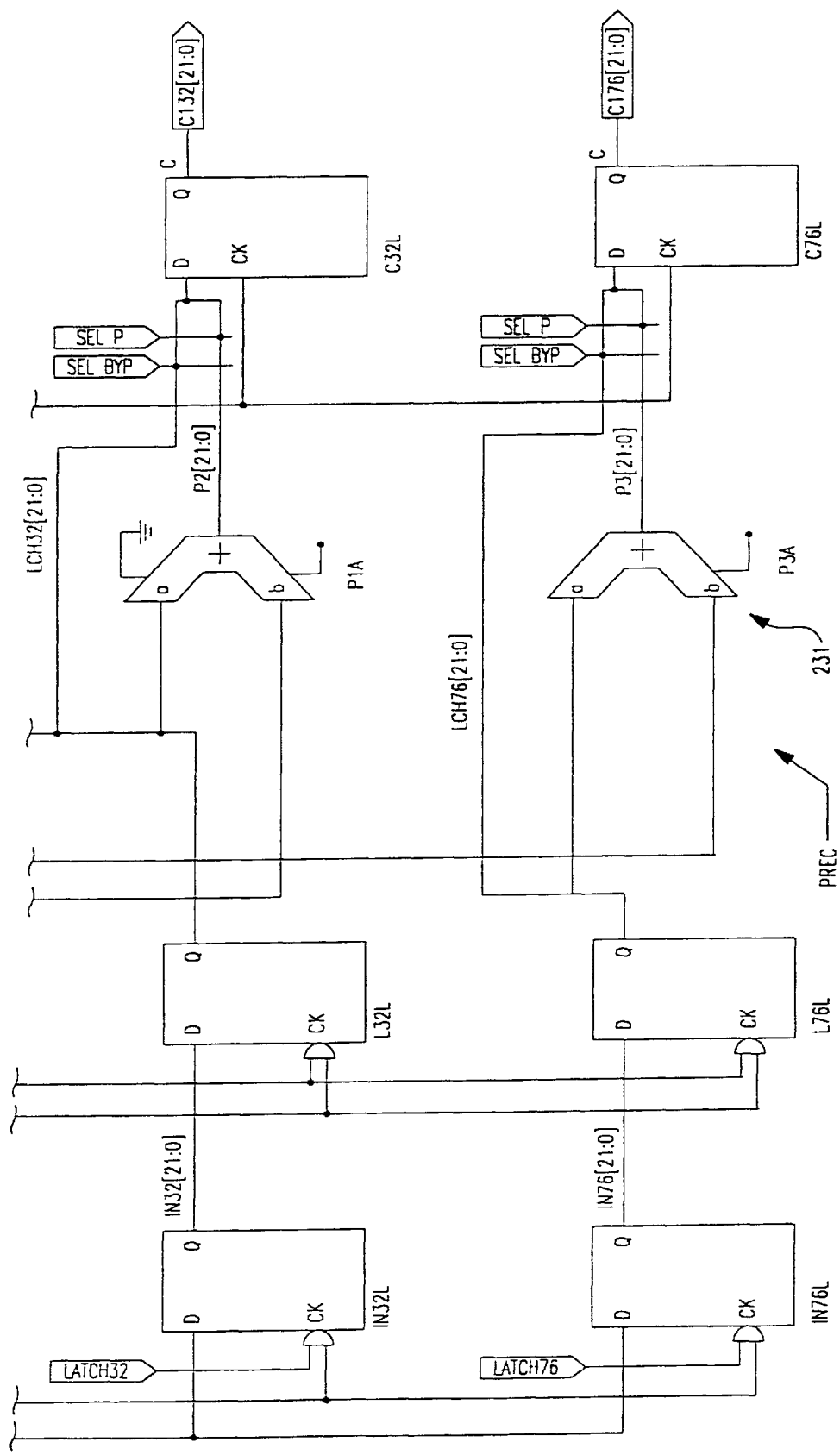

FIG. 12 is a block diagram of the pre-common block PREC 231 of the present invention. In this and following Figures, the notation 'S1[a], S2[b], . . . , SM[Z]', where S is an arbitrary signal label and a,b, . . . , z are integers within the range of the signal's bus width, indicates that the selected bits a, b, . . . , z from the signals S1, S2, . . . , SM are transferred in parallel over the same bus, with the most significant bits (MSBs) being the selected bits 'a' of the signal S1, and the least significant bits (LSBs) being the selected 'z' of signal SM. The selected bits do not have to be individual bits, but rather, entire or partial multi-bit words may also be transmitted along with other single bits or complete or partial multi-bit words. In the Figures, the symbol S will be replaced by the corresponding signal label.

For example, in FIG. 12, a square root of two multiplier is shown as R2MUL. The 'save'; or 'unresolved sum' output from this non-resolving multiplier is indicated as the 21-bit word M5S[20:0], similarly, the 'carry' output from the multiplier R2MUL is shown as the 22-bit word M5C[20:0], which is transferred over the bus to the 'b' input of a carry-save resolving adder M5A. (Recall that a '0' is inserted as an MSB to the least significant 21 bits of the save output, however, this is accomplished before being applied to the 'a' input of the resolving adder M5A. This is indicated in FIG. 12 by the notation GND.M5S[20:0]). In other words the conductor corresponding to the MSB input to the adder M5A is forced to be a '0' by tying it to ground GND.

In order to understand why a '0' is inserted as the 22'nd bit of the 'sum', observe that if the partial sum of a multiplication is n places wide, the carry word is shifted one place to the left relative to the partial sum. The carry word, therefore, extends to n+1 places with a valid data bit in the n+1'th position with an '0' in the least significant position (since there is nothing before this position to produce a carry bit into the units position). If these two words are used as inputs to a resolving binary adder, care must be taken to ensure that the bits (digits) of the carry word are properly aligned with the corresponding bits of the partial sum. This also ensures that the decimal point (even if only implied, as in integer arithmetic) is kept 'aligned' in both words. Assuming the inputs to the adder are n+1 bits wide, a '0' can then be inserted into the highest-order bit of all n-bit positive partial sum words to provide an n+1 bit input that is aligned with the carry word at the other input.

As is described above previously, the four inputs that are processed at a given time in the pre-common block PREC 231 are transferred over the input bus T_IN(21:0). This input bus is connected to the inputs of four input latches IN10L, IN54L, IN32L, AND IN76L. Each respective latch is enabled only when the input clock signal IN_CLK and the corresponding latch selection signal LATCH10, LATCH54, LATCH32, LATCH76 are high. The four inputs can, therefore, be latched into their respective input latches in four periods of the IN_CLK signal by sequential activation of the latch enabling signals LATCH10, LATCH54, LATCH32, and LATCH76. During this time, the LATCH signal should be low (or on a different phase) to enable the input latches IN10L, IN54L, IN32L, and IN76L to stabilize and latch the four input values.

Figure 13A:
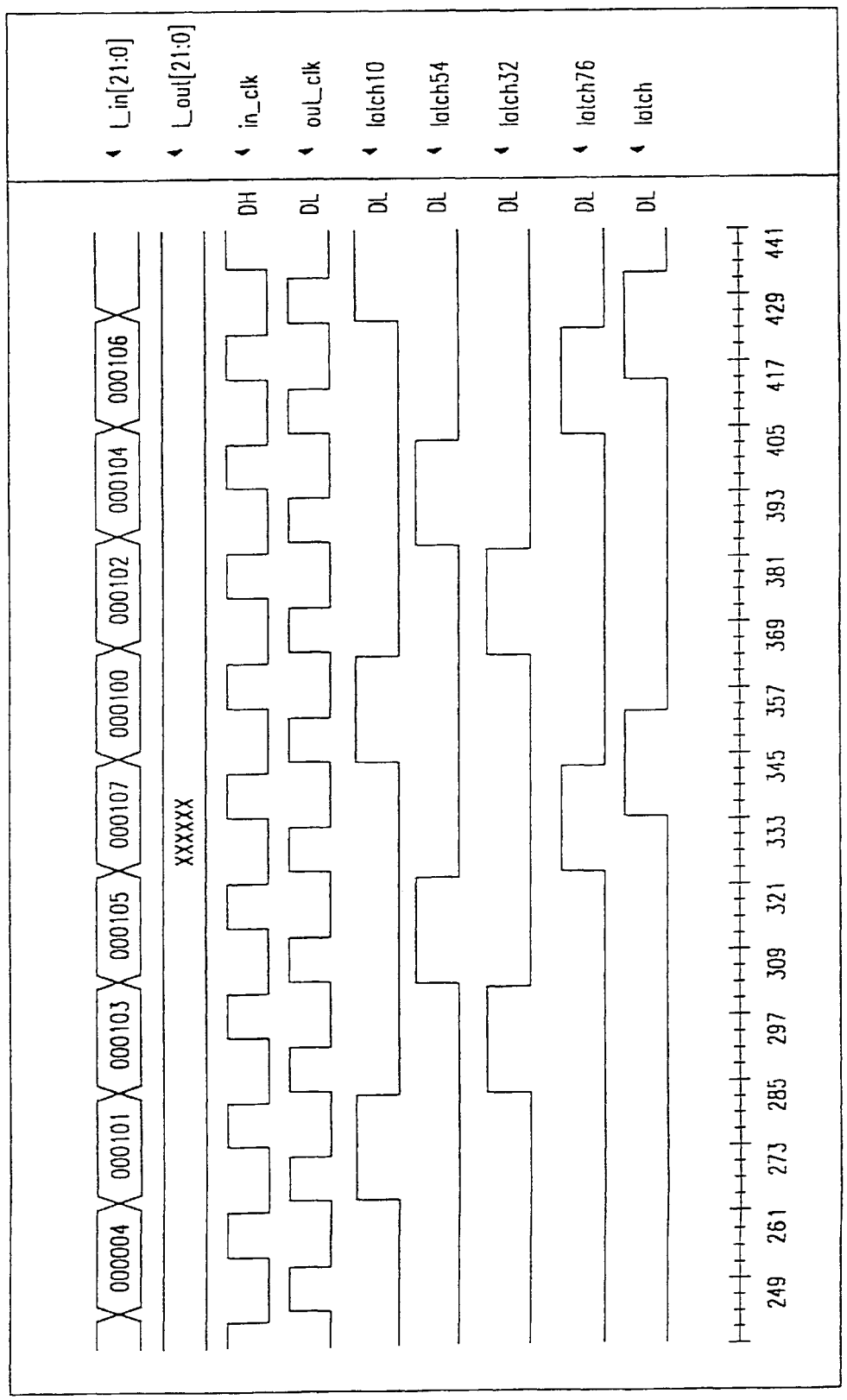
FIG. 13a, FIG. 13b and FIG. 13c depict timing diagrams which illustrate the relationships between timing and control signals in the IDCT system of a preferred embodiment.

An example of the timing of the latches, in accordance with the present invention, is illustrated in FIG. 13. Once the four input signals are latched in the preferred order, they are passed to a second bank of latches L10L, L54L, L32L, L76L. These second bank of latches are enabled when the signals OUT_CLK and LATCH are high. This signal timing is also illustrated in FIG. 13.

Note that the system of the present invention does not have to delay receipt of all eight input words. Once all the even or odd input words are received and latched in IN10L, IN54L, IN32L and L76L, this frees the In latches, which can then begin to receive the other four input signals without delay at the next rising edge of IN_CLK.

The 2-digit suffix notation [10, 54, 32, 76] used for the various components illustrated in the Figures indicates that odd-numbered signals are processed first, followed by the even-numbered signals on a subsequent pass through the structure. As is mentioned above, this order is not required by the present invention, and it will be appreciated by one of ordinary skill in the art that additional orders may be used.

Once the four input signals are latched in proper order in the second set of latches L10L, L54L, L32L, L76L, the corresponding values are either passed as inputs to output latches C10L, C54L, C32L and C76L on activation of the selected bypass signal SEL_BYP, or they are passed as paired and multiplied inputs to the same output latches upon activation of the 'select p' signal SEL_P. In other words, all signals are passed, both directly and indirectly, via arithmetic devices, to the output latches C10L, C54L, C32L, C76L of the pre-common block PREC 231. The proper values, however, are loaded into these latches by activation of the 'select bypass' signal SEL_BYP (for even-numbered inputs Y0, Y2, Y4, and Y6) or the "select p" signal SEL-P (for the odd-numbered inputs Y1, Y3, Y5 and Y7). As will be appreciated by one of ordinary skill in the art, the desired timing and order of these and other control signals is easily accomplished in a known manner by proper configuration and/or [micro-] programming of the controller CNTL 241.

The uppermost input value at the output of latch L10L is passed first to the square root of two-multiplier R2MUL and then to the resolving adder M5A as indicated. The output from the resolving adder M5A is shown as an equivalent of the resolved multiplication of the output from the latch L10L by the square root of two. The outputs from the other three latches L54L, L32L, L76L are also transferred to corresponding output latches C54L, C32L and C76L, respectively, both directly via 22-bit latch buses LCH54 [21:0], LCH32[21:0] LCH76[21:0] and indirectly to the output latches via resolving adders P2A, P1A and P3A, respectively.

In the present invention, each resolving adder P2A, P1A, P3A has two inputs "a" and "b". For adder, P2A, the one input is received from the latch L32L, and the other input is received from the latch L54L. For input values Y5 (latched in L54L) and Y3 (latched in L32L), the output from the adder P2A will, therefore, be equal to Y5+Y3, which, as is shown above, is equal to p(2). Hence, the adders "pair" the odd-numbered inputs to form the paired input values p(1), p(2) and p(3). Of course, the even-numbered input signals latched in L54L, L32L, and L76L will also pass through the resolving adders P2A, P1A and P3A, respectively, however, the resulting p "values" will not be passed to the output latches C54L, C32L and C76L because the "select p" signal SEL_P will not be activated for even-numbered inputs.

The values that are latched in the output latches C10L, C54L, C32L and C76L upon activation of the input clock signal IN_CLK will therefore be equal to either the even-numbered inputs Y0, Y2, Y4, Y6 or the paired input values P0, P1, P2, P3 for the odd-numbered inputs. One should recall that the input Y(1) is "paired" with the value U(−1), which is assumed to be zero. As illustrated in FIG. 12, this assumption is implemented by not adding anything to the value Y1. Instead, Y1 is only multiplied by the square root of two as is shown in FIGS. 9 and 10.

Figure 14A:
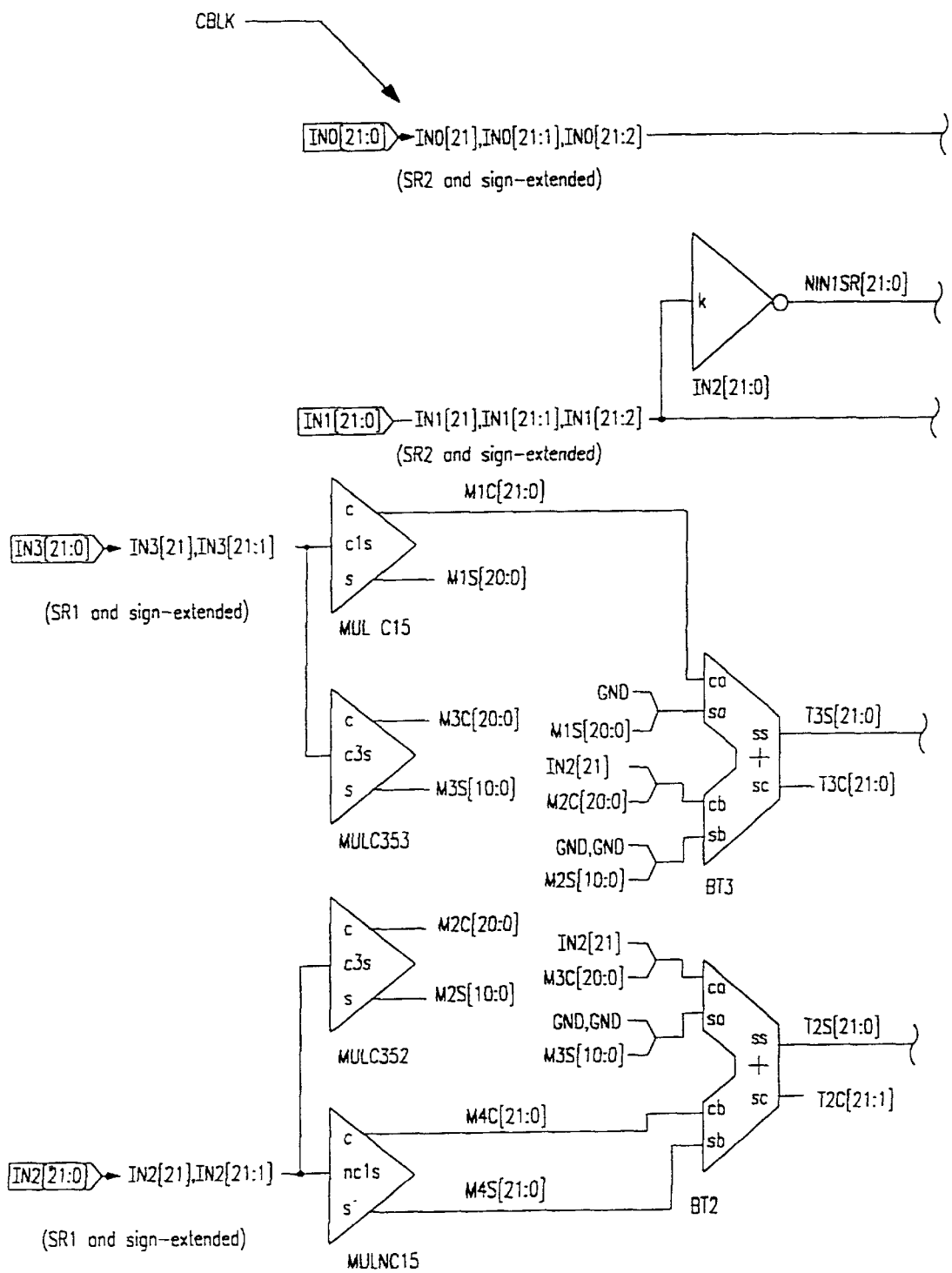
FIG. 14a and FIG. 14b taken together are a block diagram of a common processing circuit in the IDCT system; for ease of explanation, these figures are referred to collectively as FIG. 14.
Figure 14B:
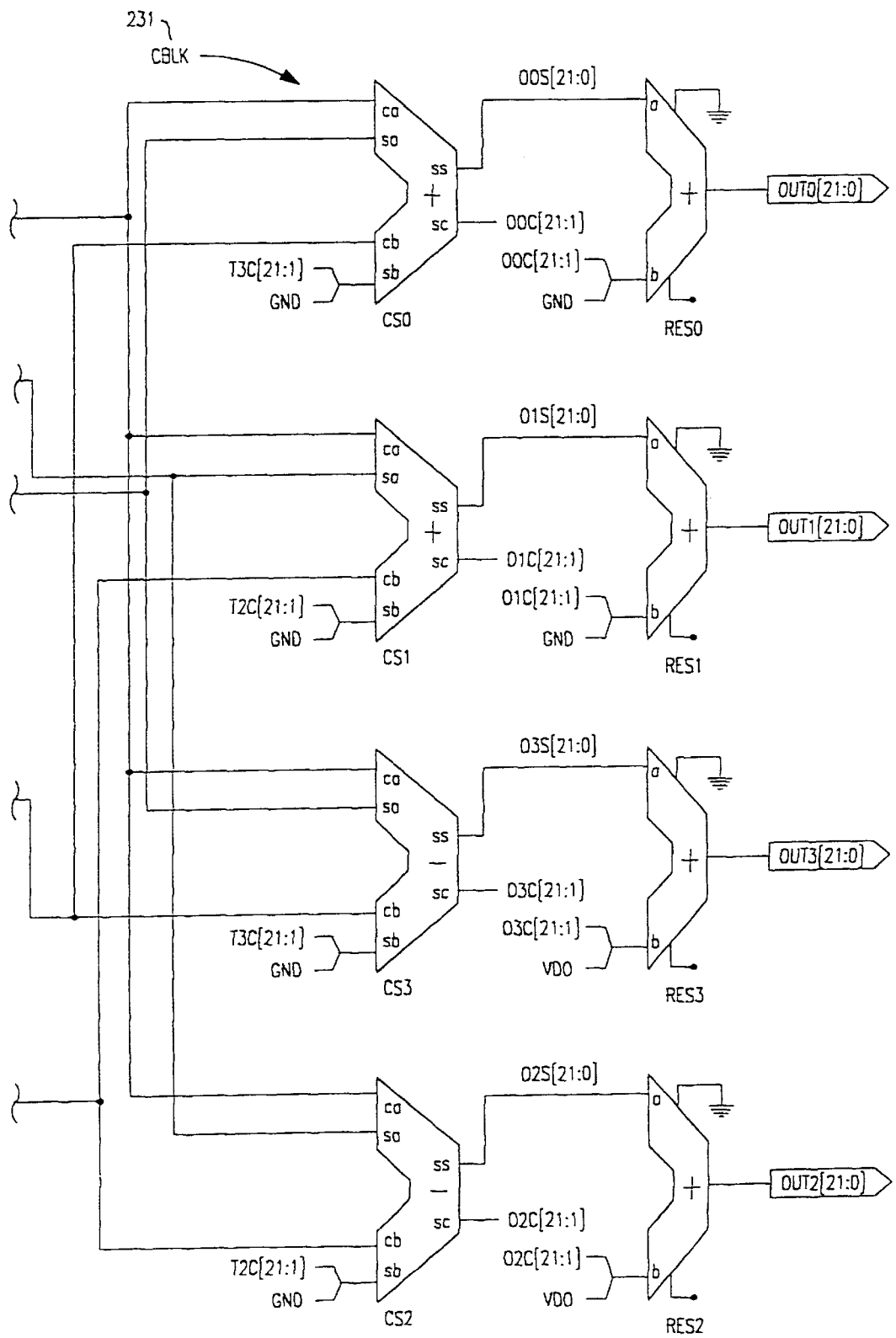

FIG. 14 illustrates the preferred architecture of the common block CBLK 232, in accordance with the present invention. Because of the various multiplications and additions in the different system blocks, it is necessary or advantageous to scale down the input values to the common block before performing the various calculations. This ensures a uniform position for the decimal point (which is implied for integer arithmetic) for corresponding inputs to the various arithmetic devices in the system.

Accordingly, the input values IN0[21:0] AND IN1[21:0] are accordingly scaled down by a factor of four, which corresponds in digital arithmatic to a right shift of two bits. In order to preserve the sign of the number (keep positive values positive and negative values negative) in binary representation, the most significant bit (MSB) must then be replicated in the two most significant bits of the resulting right-shifted word; this process is known as "sign extension". Hence, the input value IN0 is downshifted by two bits with sign extension to form the shifted input value indicated as IN[21], INO[21], IN0[21:2]. The input value IN1[21:0] is similarly sign-extended two places. The input IN2 is also shifted and extended to form IN2[21], IN2[21:1]. These one-position shifts correspond to truncated division by a factor of two.

As shown in FIG. 10, the input IN2, IN3 are those which must be multiplied by the scaled coefficients c1s and c3s. Each input IN3 and IN2 must be multiplied by each of the scaled coefficients. As FIG. 14 illustrates, this is implemented by the four constant-coefficient carry-save multipliers MULC 1S, MULNC1S, MULC3S3, and MULC2S2. One should note that the bottom multiplier for IN2 is an inverting multiplier MULC1S, that is, its output corresponds to the negative of the value of the input multiplied by the constant C1S. Therefore, the value latched in C76 is subtracted from the value lacthed in C32 (after multiplication by C3S). By providing the inverting multiplier MULNC1S, subtraction is implemented by adding the negative of the corresponding value, which is equivalent to forming a difference. This allows the use of identical circuitry for the subsequent adders, while allowing a non-inverting multiplier may be used with a following subtractor.

In the illustrated embodiment of the present invention, four cosine coefficient multpiliers MULC1S, MULNC1S, MULC2S3, and MULC3S2 are included. If arrangements are made for signals to pass separately through the multipliers, however, the necessary multiplications can be implemented using only two multipliers one for the c1s coefficient and one for the c3s coefficient.

In accordance with the present invention, the multipliers for MULC1S, MULNC1S, MUL3S3 and MULC3S2 are preferably of the carry-save type, which means that they produce output words, one corresponding to the result of the various rows of additions performed within a hardware multiplier, and another corresponding to the carry bits generated. The outputs from the multipliers are then connected as inputs to either of two 4-input resolving adders BT2, BT3.

For ease of illustration only, five of the output buses from the multipliers are not drawn connected to the corresponding input buses of the adders, as will be appreciated by one of ordinary skill in the art, these connections are to be understood, and are illustrated by each respective output and input having the same label. Hence, the save output M1S [20:0] of the multiplier MULC1S is connected to the lower 21 bits of the "save-a" of the adder BT3.

As shown in FIG. 14, five of the inputs to the adders BT2 and BT3 are shown as being "split". For example, the "ca" input of the adder BT2 is shown as having IN3[21] over M3C[20:0] being input as the least significant 21 bits. Similarly, the "sa" (the "save-a" input) of the same adder is shown as being GND, GND over M3S[19:0]. This means that two zeros are appended as the two most significant bits of this input word. Such appended bits ensure that the proper 22-bit wide input words are formed with the proper sign.

The carry-save adders BT2 and BT3 add the carry and save words of two different 22-bit inputs to form a 22-bit output save word T3S[21:0] and a 21-bit output carry word T3C[21:1]. Accordingly, the input to each adder is thus 88 bits wide and the output from each adder is 43 bits wide. As FIG. 10 illustrates, the output from the latch C10 is combined with the output from the latch C54 in the upper-most data path before addition with the output from the carry-save adder BT3. The "combination" is not, however, necessary until reaching the following adder in the upper data path.

Consequently, as FIG. 14 shows, the shifted and sign-extended input value IN0 is connected to the upper carry input.

The upper carry input of adder CS0 is connected to the shifted and sign-extended input value IN0, and the shifted and sign-extended input IN1 is connected as the upper save input of the same adder. In other words, IN0 and IN1 are added later in the adder CS0.

The designation "dummy" adder/subtractor 240 used in FIG. 10, therefore, indicates which operation must be performed, although it does not necessarily have to be performed at the point indicated in FIG. 10. Similarly, the lower dummy subtractor 240 shown in FIG. 10 requires that the output from latch C54 be subtracted from the output from latch Cl10. This is the same as adding the output from Cl0 to the complement of the output of C54.

Referring once again to FIG. 14, the complement of the input IN1 (corresponding to the output of latch C54 in FIG. 10) is performed by a 22-bit input inverter IN1[21:0] (which generates the logical inverse of each bit of its input, bit-for-bit). The complement of IN1 value—NIN1[21:0]—is passed to the upper "save" input of the adder CS1, with the corresponding upper "carry" input being the shifted and sign-extended IN0. The upper portion of the adder CS1, therefore, performs the subtraction corresponding to IN0 minus IN1.

In the lower two data paths shown in FIG. 10, resolving subtractors are used instead of the resolving adders shown in the upper two data paths at the output of the common block CBLK 232. Each resolving adder or subtractor is equivalent to a carry-save adder or subtractor followed by a resolving adder. This is shown in FIG. 14. Subtractors CS2 and CS3 have as their inputs the processed values of IN0 to IN3 according to the connection structure shown in FIG. 10.

The 22-bit carry and save outputs from each of the adders/subtractors C20–CS3 are resolved in the resolving adders RES0–RES3. As will be appreciated by one of ordinary skill in the art, resolution of carry and save outputs is well understood in the art of digital design and is, therefore, not described in greater detail here. As FIG. 14 illustrates, the save outputs the carry-save adders/subtractors CS0–CS3 are passed directly as 22-bit inputs to the "a"-input of the corresponding resolving adders RES0–RES3.

As is also well known in the art, the 2's-complement of a binary number is formed by inverting each of its bits (changing all "1's" to "0's" and vice versa) and then adding "1". Note that the "1" can be added immediately after the bit inversion, or later. The LSB of a carry word will always be a "0" which is implemented in the illustrated embodiment of the present invention by tying the LSB of the carry words O0C and O1C to ground GND as they are input to the resolving adders RES0 and RES1, respectively. The addition of "1" to the carry outputs of the subtractors CS2 and CS3 to form 2'S-complemented values, however, is implemented by tying the LSB of these data words O2C and O3C to supply voltage VDD, thus "replacing" the "0" LSB of the carry word by a "1", which is equivalent to addition by "1".

For the reasons provided above, a "0" is appended as the LSB to the 21-bit carry words from the carry-save adders Cs0 and CS1 (by tying the LSB to ground GND) and the LSB of the carry words from the carry-save subtractors CS2 and CS3 is set equal to "one" by tying the corresponding data line to the supply voltage VDD. The resolving adders RES0–RES3, therefore, resolve the outputs from the adder/subtractors CS0–CS3 to form the 22-bit output signals OUT0[21:0]–OUT3[21:0].

Two advantages of the IDCT circuitry according to the embodiment of the present invention can be seen in FIG. 14.

First, no control or timing signals are required for the common block CBLK 232. Rather, the input signals to the common block are already processed in such a way they can be applied immediately to the pure-logic arithmetic devise in the common block 232. Second, by proper scaling of the data words, integer arithmetic can be used throughout (or, at least, decimal point for all values will be fixed). This avoids the complexity and slowness of floating-point devices, with no unacceptable sacrifice of precision.

Yet another advantage of the embodiment of the present invention is that, by ordering the inputs as shown, and by using the balanced decimated method in accordance with the present invention, similar design structures can be used at several points in the silicon implementation. For example, as shown in FIG. 14, the constant coefficient multipliers MULC1S, MULC3S3, MULC3S2 and MULNC1S all have similar structures and receive data at the same point in the data path, so that all four multipliers can be working at the same time. This eliminates "bottlenecks" and the semiconductor implementation is, therefore, able to take full advantage of the duplicative, parallel structure. The carry-save adders BT2 and BT3 similarly will be able to work simultaneously, as will the following carry-save adders and subtractors. This symmetry of design and efficient simultaneous utilization of several devices is common throughout the structure according to the embodiment of the present invention.

FIG. 15 shows the preferred arrangement of the post-common block POSTC 233 in accordance with the present invention. As FIG. 10 shows, the primary functions of the post-common POSTC 233 are to form the h0 to h3 values by multiplying the outputs of the common block by the coefficients d1, d3, d5 and d7; to add the g(k) and h(k) values to form the low order outputs; and to subtract the h(k) values from the corresponding g(k) values to form the high-order outputs. Referring now to both FIG. 10 and FIG. 15, the post-common block POSTC 233 latches the corresponding outputs from the common block CBLK 232 into latches BH0L, BH1L, BH3L and BH2L when the Bh latches are enabled, the control circuitry sets the EN__BH signal high, and the output clock signal OUTC__CLK signal goes high. The g(k), g0 to g3 values are latched into corresponding latches G0L, G1L, G3L and G2L when the control circuitry enables these latches via the signal EN__GH and input clock signal IN__CLK goes high.

The processed odd-numbered inputs, that is, the values h0 to h3, are latched into latches H0L, H1L, H3L and H2L when the EN__GH and IN__CLK signals are high, via the constant coefficient multipliers D1MUL, D3MUL, D5MUL and D7MUL. These multipliers multiply, respectively by d1, d3, d5 and d7. In the preferred embodiment, these constant-coefficient multipliers are preferably carry-save multipliers in order to simplify the design and to increase calculation speed. As FIG. 15 illustrates, the "carry" ("c") outputs from the constant coefficient multipliers are connected, with certain changes described below, to the a inputs of resolving adders H0A, H1A, H3A and H2A. The "save" ("s") outputs from the coefficient multipliers are similarly, with certain forced changes described below, connected to other input of the corresponding resolving adder.

As FIG. 15 further illustrates, the LSB of the H0 signal is preferably forced to be a "1" by tying the corresponding "save" output for H0 is set to 0 (tied to ground GND), and the second bit (corresponding to H0S[1]) is set to "1". The data words from the carry and save outputs of the constant-coefficient multiplier D3MUL are similarly manipulated an input to the resolving adder H1A. The advantage of these manipulations and their input to the resolving adder H1A.

In accordance with the present invention, all 22-bits of the carry output from the coefficient multipliers D7MUL and D5MUL are connected directly to the "a" input of corresponding resolving adders H3A and H2A. The MSB of each multiplier's "save" output, however, is forced to "0" by tying the corresponding data line to ground GND.

The IDCT system described was tested against the CCITT specification described above. Because of the scaling and other well-known properties of digital adders and multipliers, some precision is typically lost in the 10,000 sample, but run that forcing the various bits described above to either "0" or "1" reduced the expected error of the digital transformation. As a result of the bit manipulation of the data words, the embodiment of the present invention achieved acceptable accuracy under the CCITT standard using only 22-bit wide data words, whereas 24 bits would normally be required to produce equivalent accuracy.

Because of limited precision, and truncation and rounding errors, there is typically some inaccuracy in every data word in an IDCT system. However, forcing selected bits of a data word it was discovered that the error thereby systematically introduced into a particular data word at a particular point in the hardware yielded statistically better overall results. Bit-forcing may also be applied "within" a multiplication, for example, by selectively forcing one or more carry bits to predetermined values.

In the present invention, the bit-forcing scheme need not be static, with certain bits always forced to take specified values, but rather a dynamic scheme may also be used. For example, selected bits of a data word may be forced to "1" or "0" depending on whether the word (or even some other data) is even or odd, positive or negative, or above or below a predetermined threshold, and the like.

Normally, only small systematic changes will be needed to improve overall statistical performance. Consequently, according to this embodiment of the present invention, the LSB's of selected data words (preferably one bit and one data word at a time, although this is not necessary) are forced to be a "1" or a "0". The CCITT test is run, and the CCITT statistics for the run are compiled. The bit is then forced to the other of "1" or "0", and the test is rerun. Then the LSB (or LSBs) of other data words are forced to "1" or "0", and similar statistics are compiled. By examining the statistics for various combinations of forced bits in various forced words, a best statistical performance can be determined.

If this statistically based improvement is not required, however, the outputs from the constant-coefficient multipliers D1MUL, D3MUL, D5MUL and D7MUL may be resolved in the conventional manner in the resolving adders H0A–H3A. The lower 21-bits of the input of the corresponding latches H0L–H3L, with the LSB of these inputs tied to ground.

The outputs from the H-latches (H0L–H3L) and the G-latches (G0L–G3L) pairwise form the respective a and b inputs to resolving adder-subtractors S70A, S61A, S43A and S52A. As was indicated above, these devise add their inputs when the ADD signal is high, and subtract the "b" input from the "a" input when the subtraction enable signal SUB is high. The second bits of the upper two latch pairs H0L, G0L, H1L and G1L are manipulated by multiplexing arrangements in a manner described below.

The outputs from the resolving adder-subtractors S70A, S61A, S43A and S52A are latched into result latched R70L, R61L, R43L, R52L.

Figure 15A:
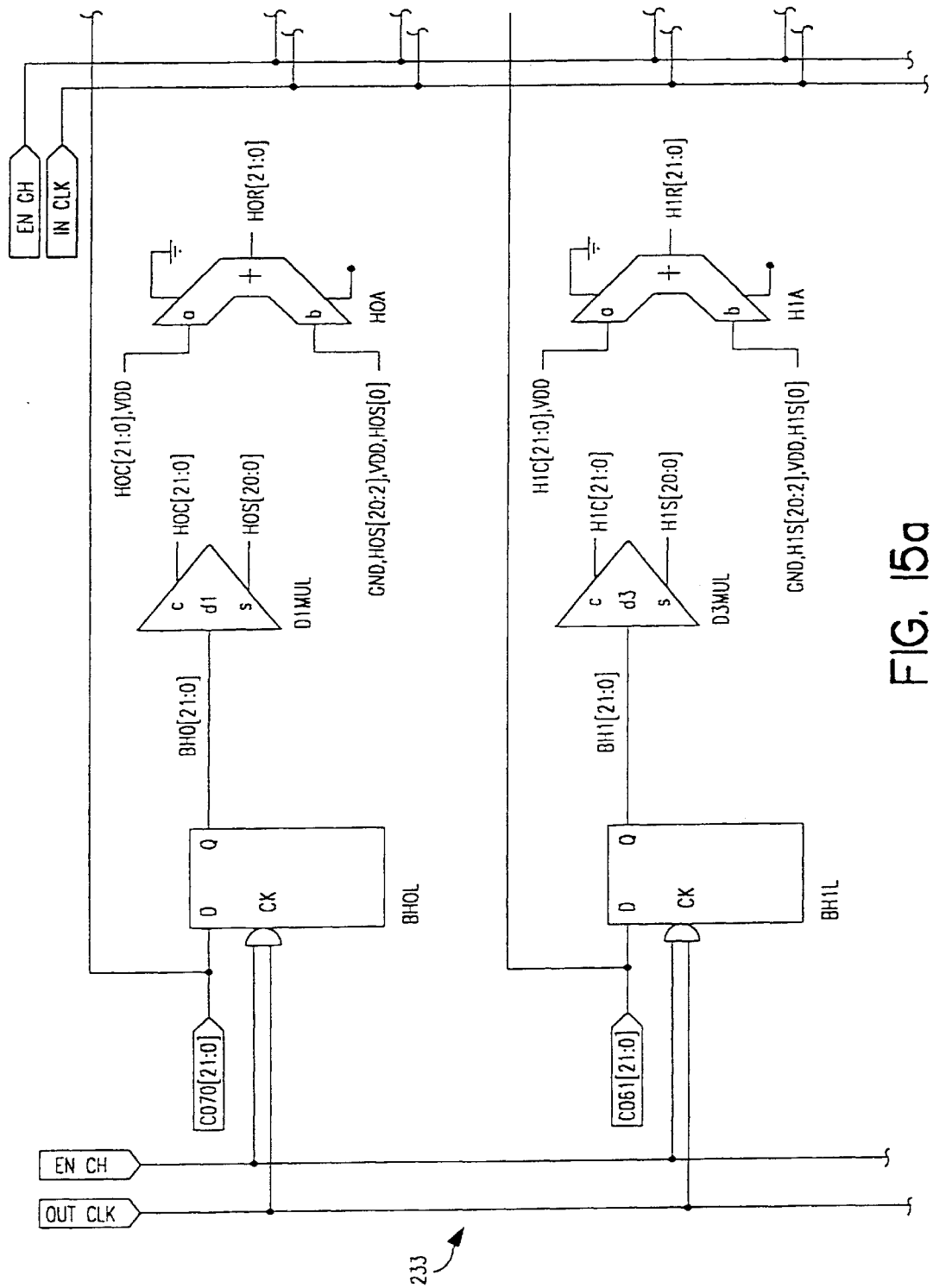
FIG. 15a, FIG. 15b, FIG. 15c and FIG. 15d taken together are a block diagram of a post-processing circuit which corresponds to another main component of the system and are referred collectively as FIG. 15.
Figure 15B:
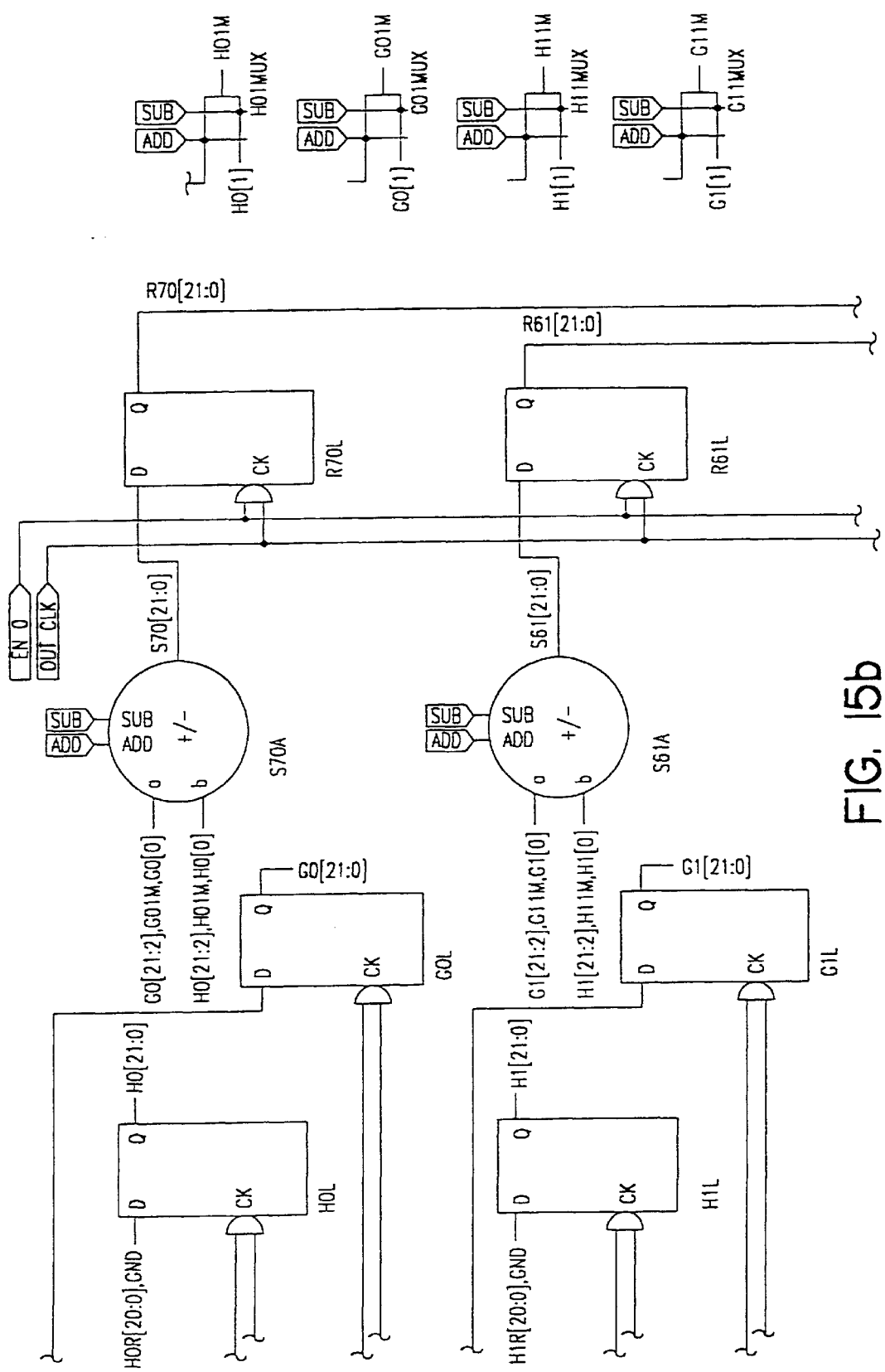
Figure 15C:
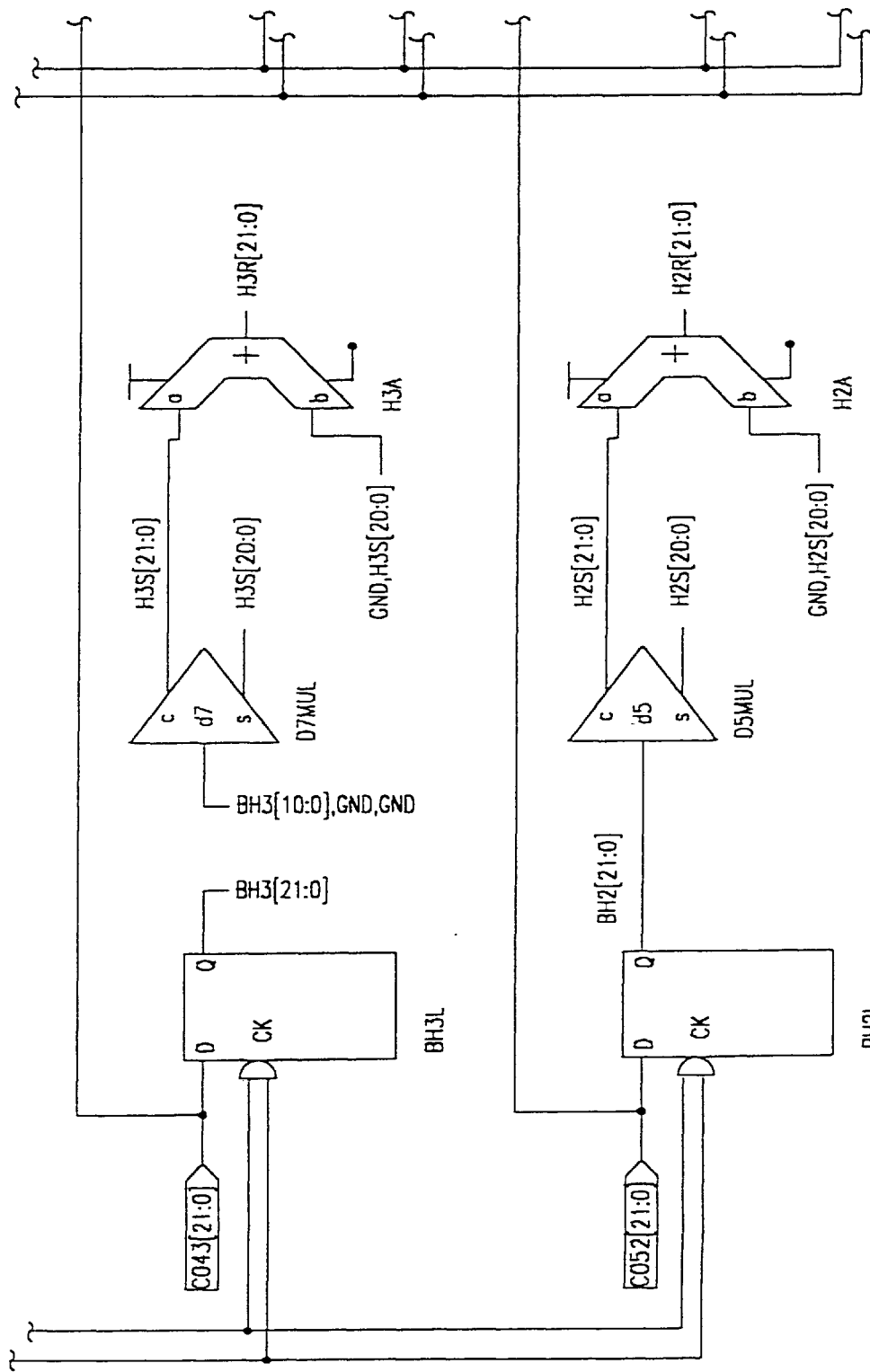
Figure 15D:
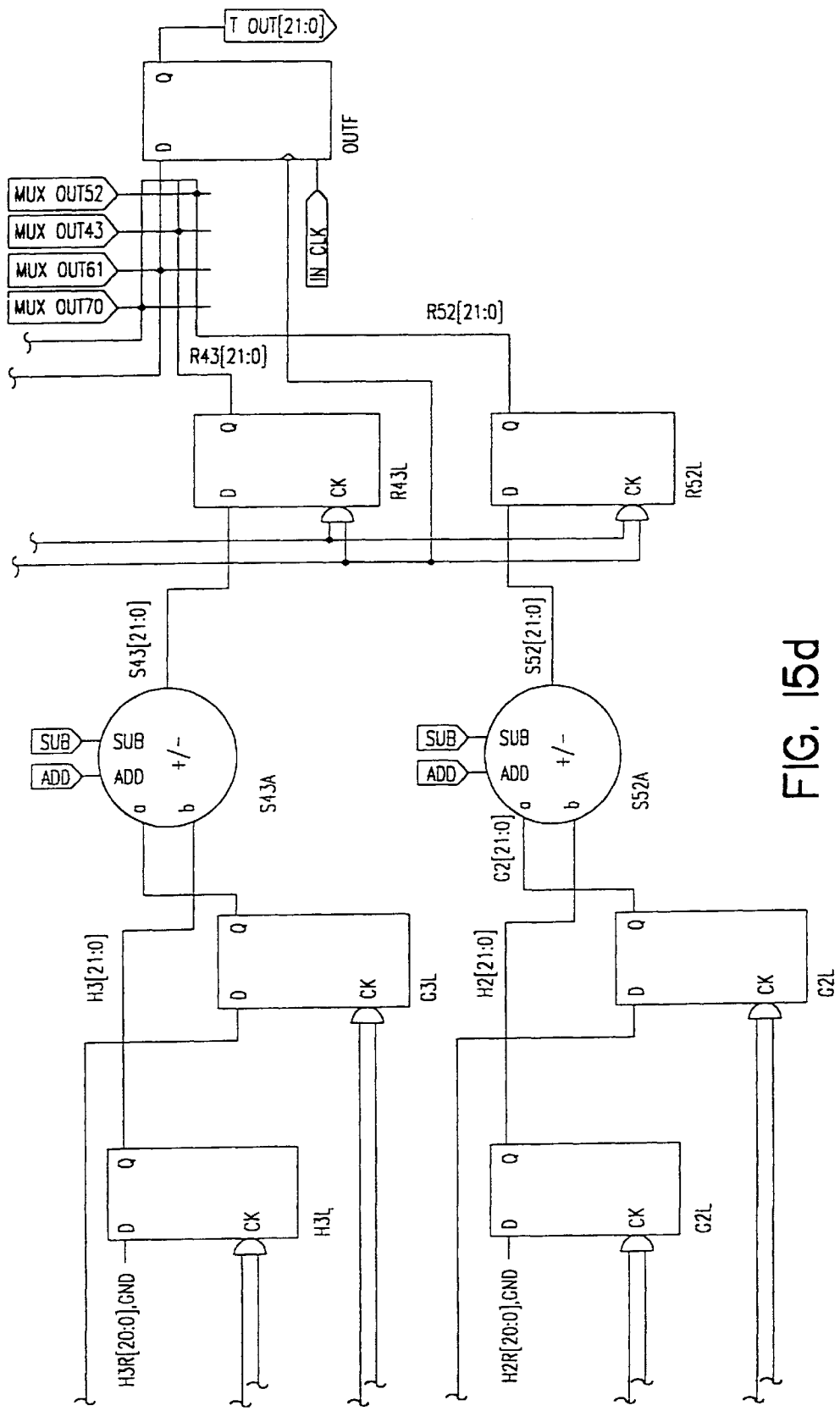
Figure 17A:
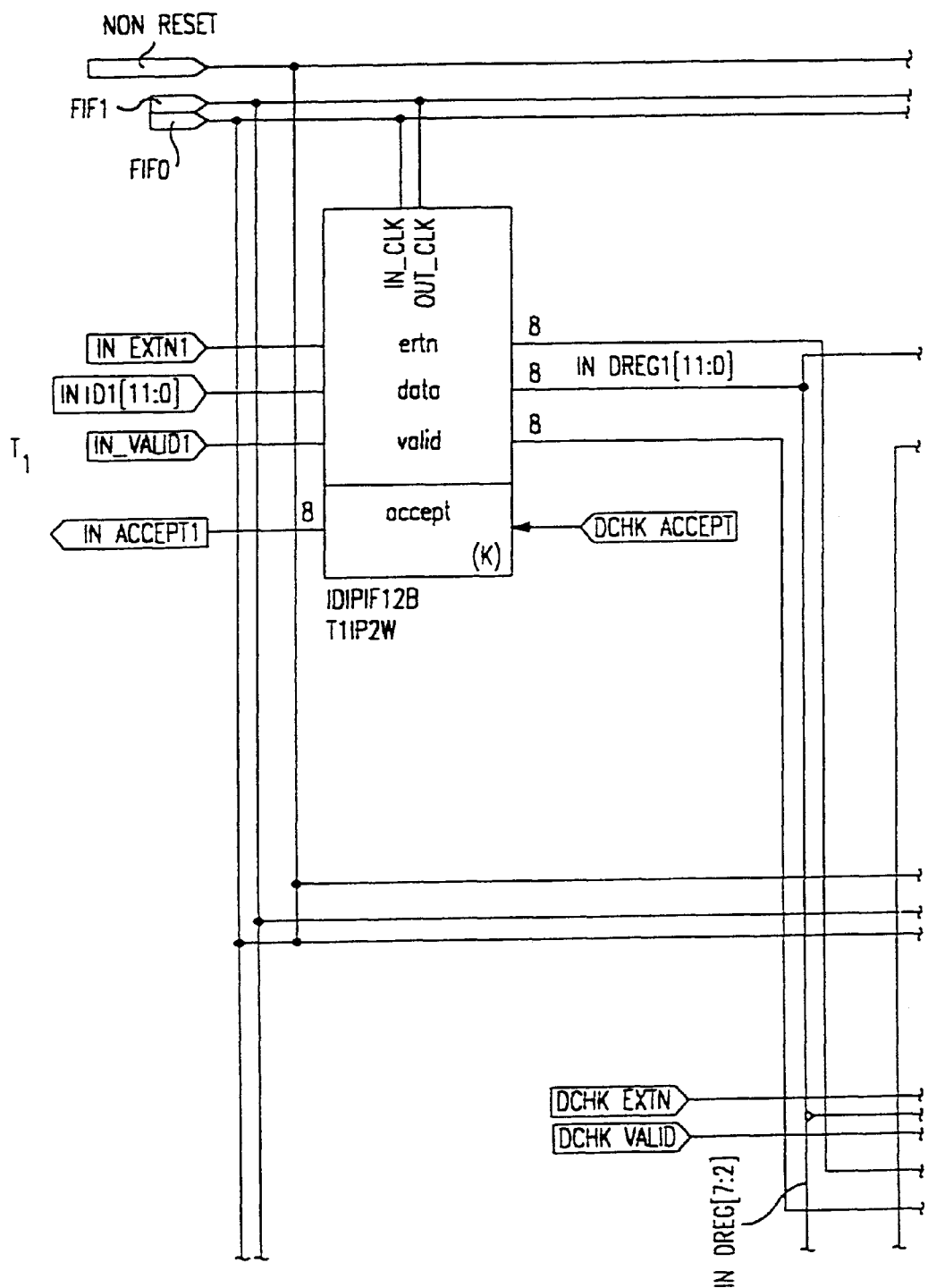
FIG. 17 is a block diagram showing in further detail the 1-D IDCT system shown in FIG. 16.
Figure 17B:
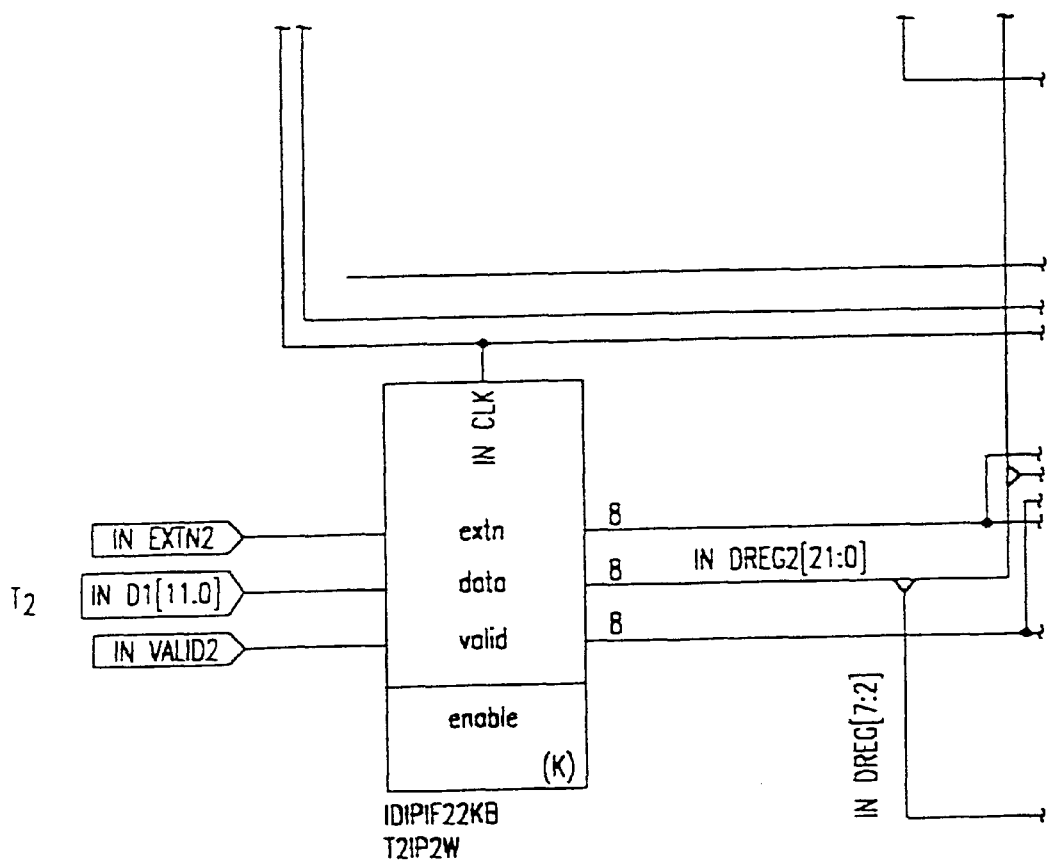
Figure 17C:
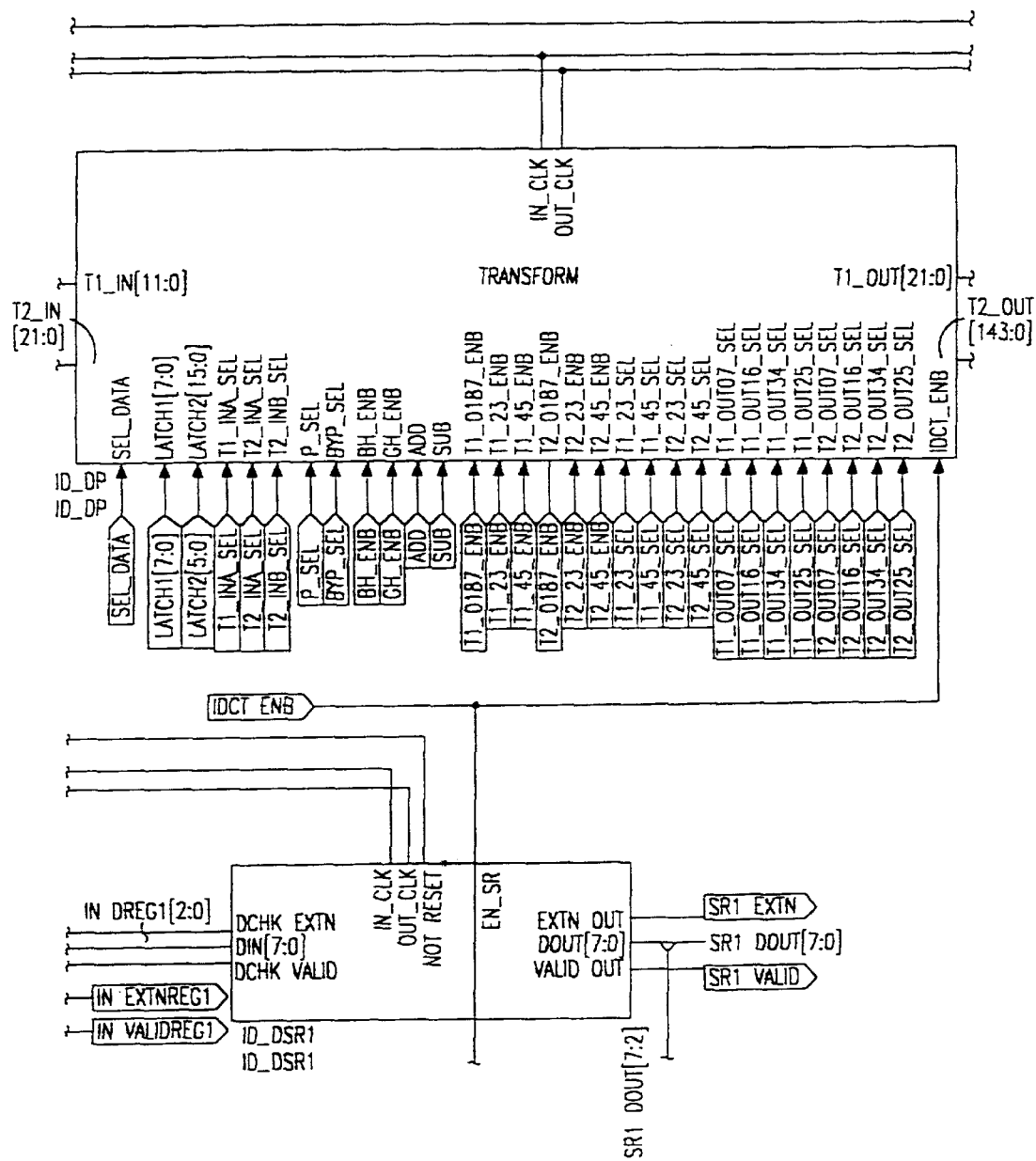
Figure 17D:
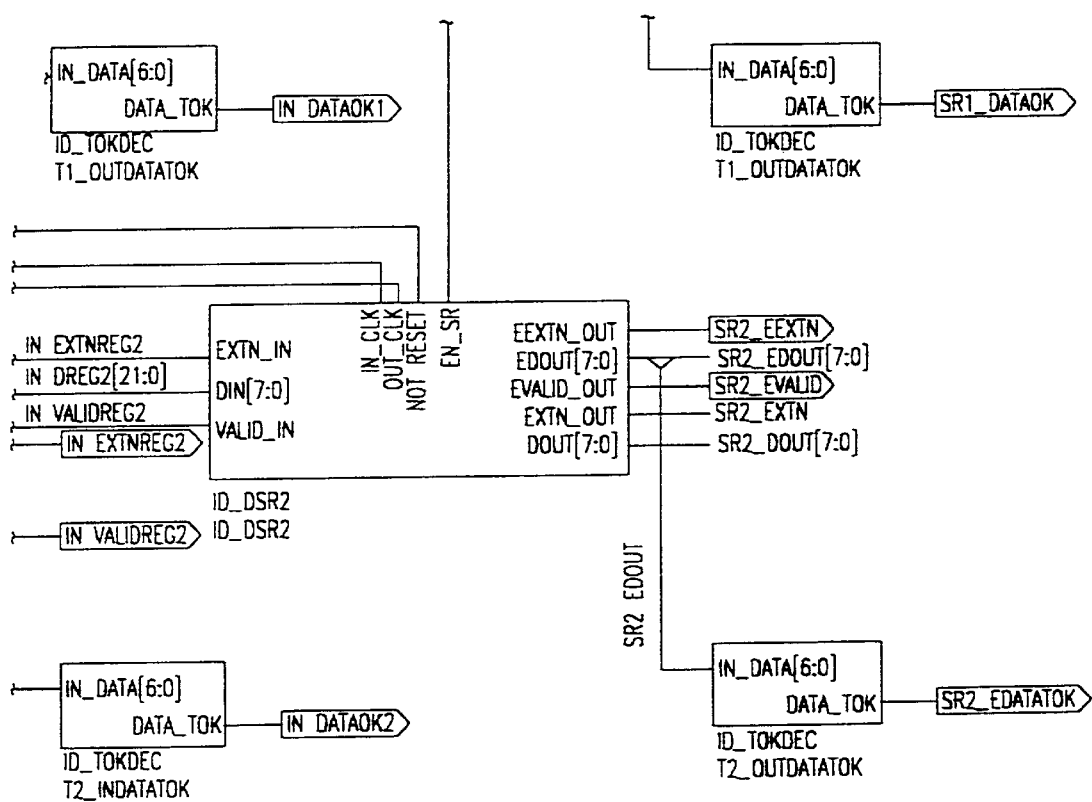
Figure 17E:
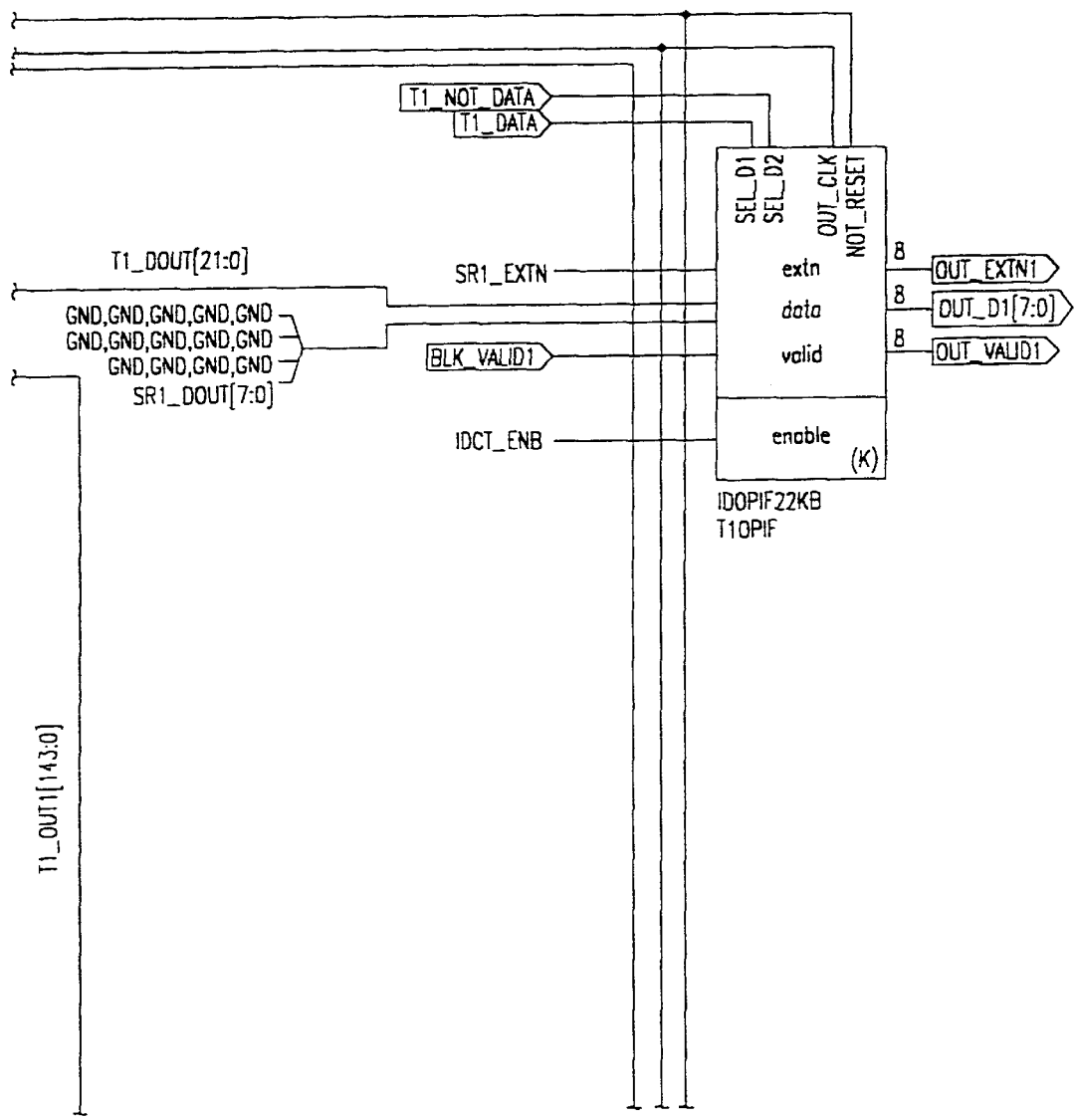
Figure 17F:
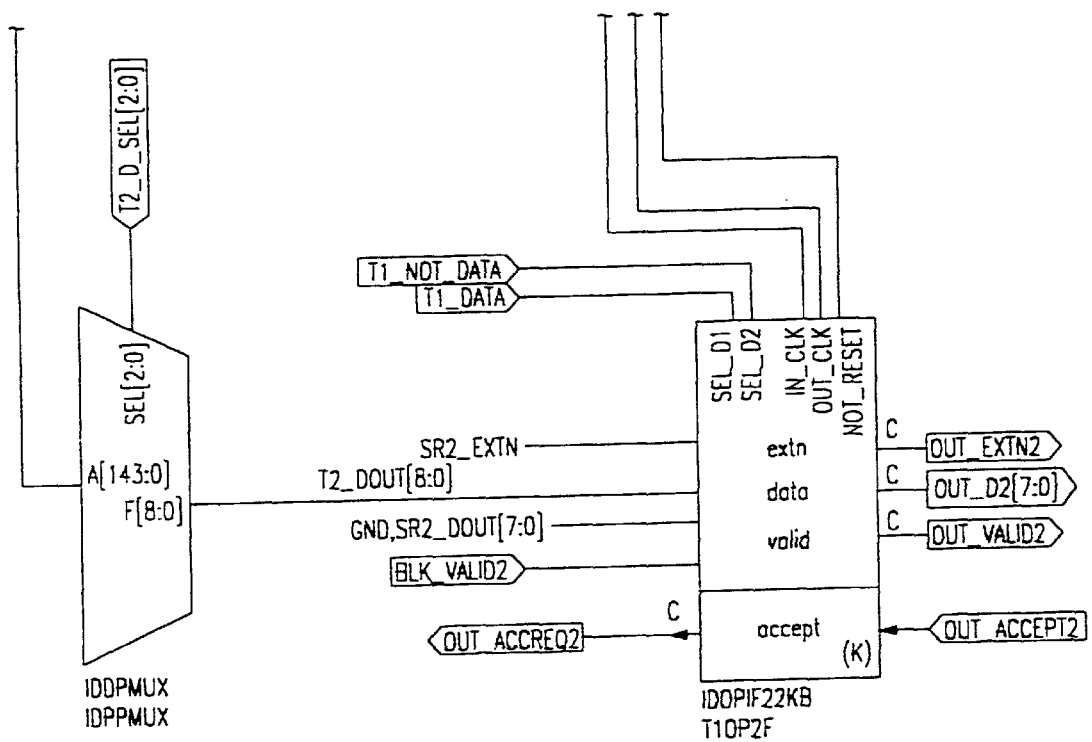

As depicted in FIG. 15b, the input words to the adder/subtractor S70A and dS61A, in accordance with the present invention, have the second bits of each input word manipulated. For example, the second bit of the input word to the "a"-input of the adder subtractor S70A is G0[1M], G0[1M], G0[0]. In other words, the second bit is set to have the value G01M. The second bits of the other inputs to the adder/subtractors S70A and S61A are similarly manipulated. This bit manipulation is accomplished by four 2:1-bit multiplexers H01MUX, G01MUX, H11MUX and G11MUX (shown to the right in FIG. 15b). In the present invention, these multiplexers are controlled by the ADD and SUB signals such that the second bit (H01M, G01M, H11M, and G11M) is set to one if the respective adder subtractor S70A, S61A is set to (ADD is high), and the second bit is set to its actual latch output value if the SUB signal is set too high. Setting of individual bits in this manner is an easily implemented high-speed operation. The preferred embodiment, therefore, includes this bit-forcing arrangement since, as is described above, statistical analysis of a large number of tests pixel words has indicated that more accurate results are thereby obtained. It is not necessary, however, to manipulate the second bits in this manner, although it gives the advantage of smaller word width.

The four high or low-order results are latched in the output latches R70L, R61L, R43L and R52L. The results are sequentially latched into the final output latched OUTF under the control of the multiplexing signals MUX_OUT70, MUX_OUT61, MUX_OUT43, MUX_OUT52. Hence, the order in which resulting signals are output can therefore be controlled simply by changing the sequence with which they are latched into the latch.

Figure 13B:
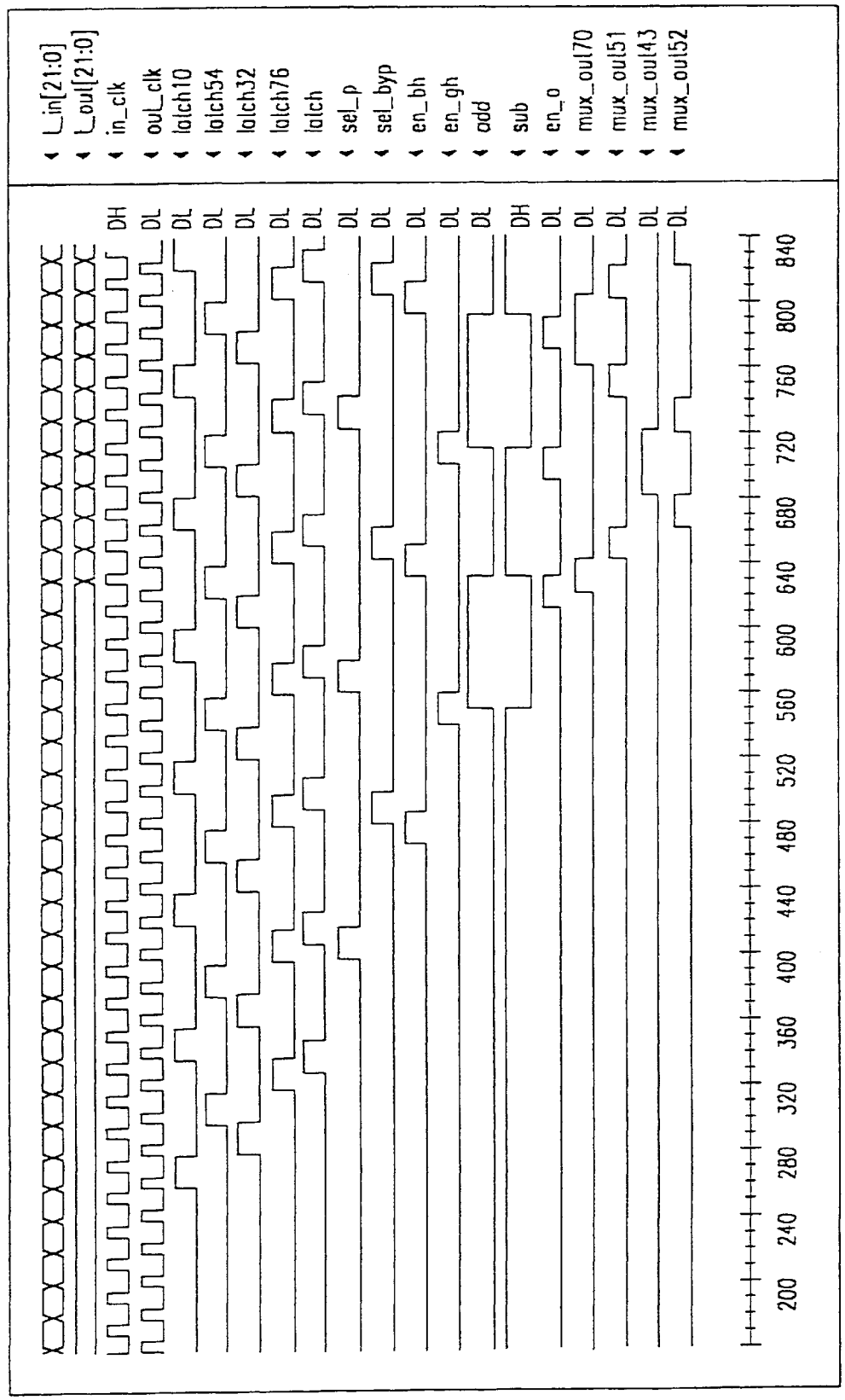
Figure 13C:
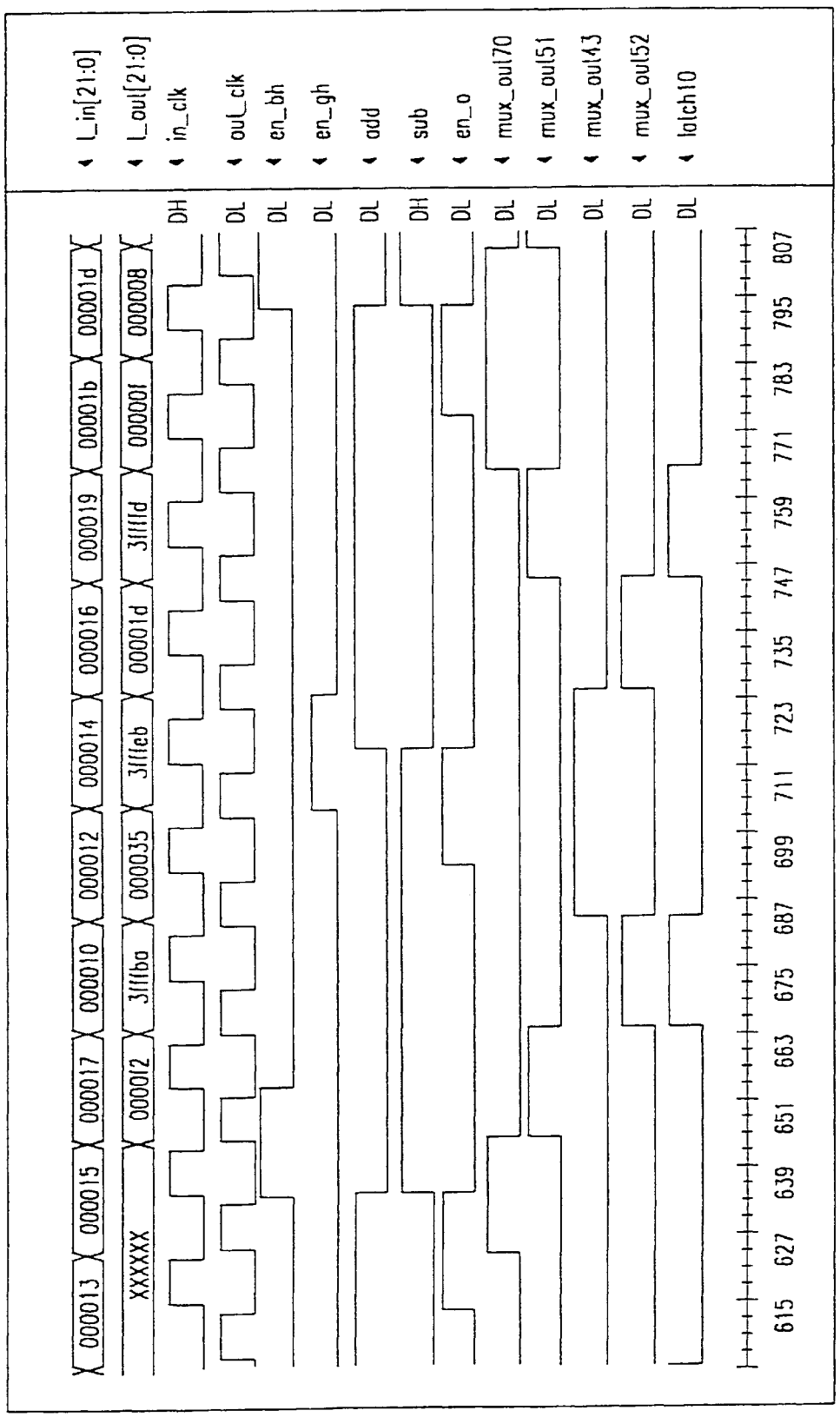

The relationship between the clock and control signals in the post-common block POSTC 233 is shown in FIGS. 13b and 13c.

As was discussed previously, two 1-dimensional IDCT operations may be performed in series, with an intervening transposition of data, in order to perform a 2-D IDCT. The output signals from the post-common block POSTC 233, are therefore, according to this embodiment of the present invention, first sorted in a known manner column-wise (or row-wise) in a conventional storage unit, such as a RAM memory circuit (not shown), and are then read from the storage unit row-wise (column-wise) so as to be passed as inputs to a subsequent pre-common block and for processing as described above in this block, and in a common block CBLK 232, and a post-common block POSTC 233.

Storing by row (column) and reading out by column (row) performs the required operation of transposing the data before the second 1 -D IDCT. The output from the second POSTC 233 will be the desire, 2-D IDCT results and can be scaled in a conventional manner by shifting to offset the scaling shifts carried out in the various processing blocks. In particular, a right shift by one position will perform the division by 2 necessary to offset the two square root of two multiplications performed in the 1 -D IDCT operations.

Depending on the applications, this second IDCT structure (which is preferably identical to that shown FIG. 11) is preferably a separate semiconductor implementation. This avoids the decrease in speed that would arise if the same circuits were used for both transforms, although separate 1-D transform implementations are not necessary if the pixel-clock rate is now sufficient such that a single implementation of the circuit will be able to handle two passes in real time.

As shown in FIGS. 16 through 38, a second preferred embodiment, in accordance with the present invention, uses a single one-dimensional transform. This embodiment does not require a lowering of the pixel-clock rate as discussed previously.

Figure 38:
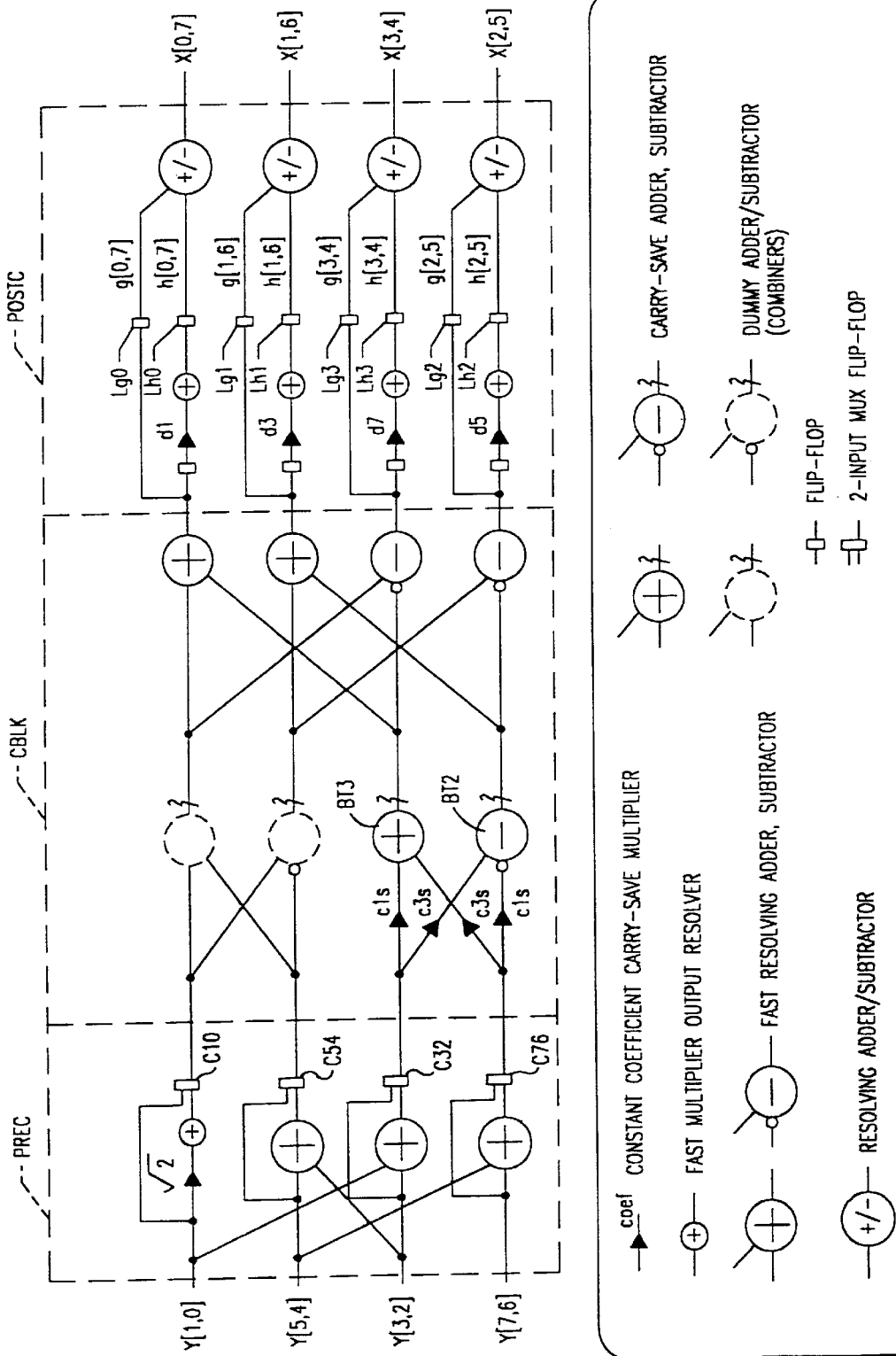
FIG. 38 illustrates another preferred embodiment of the IDCT system shown in FIGS. 16 through 37.

The existing "resolving-adders" in the first preferred embodiment have been changed to "fast-resolving-adders". As seen in FIG. 38, these have been titled, "Fast Resolving Adders". This change has the effect of allowing more time for each datapath arithmetic block to act on its data inputs. The existing "latches" in the first preferred embodiment have been changed to 2-phase "flip-flops" or "registers".

Figure 18A:
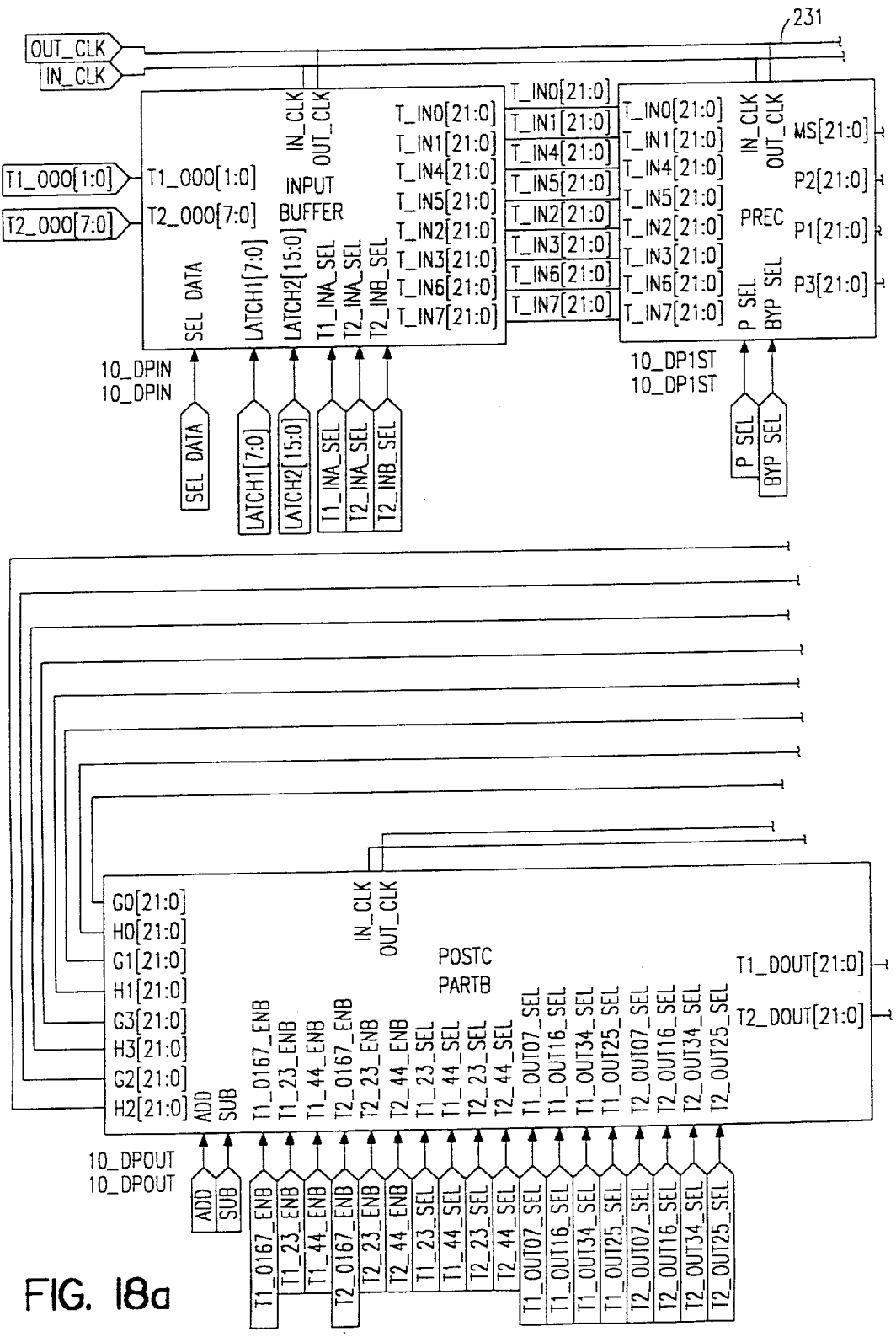
FIG. 18 is a block diagram showing greater detail of the transform system as shown in FIG. 17.
Figure 18B:
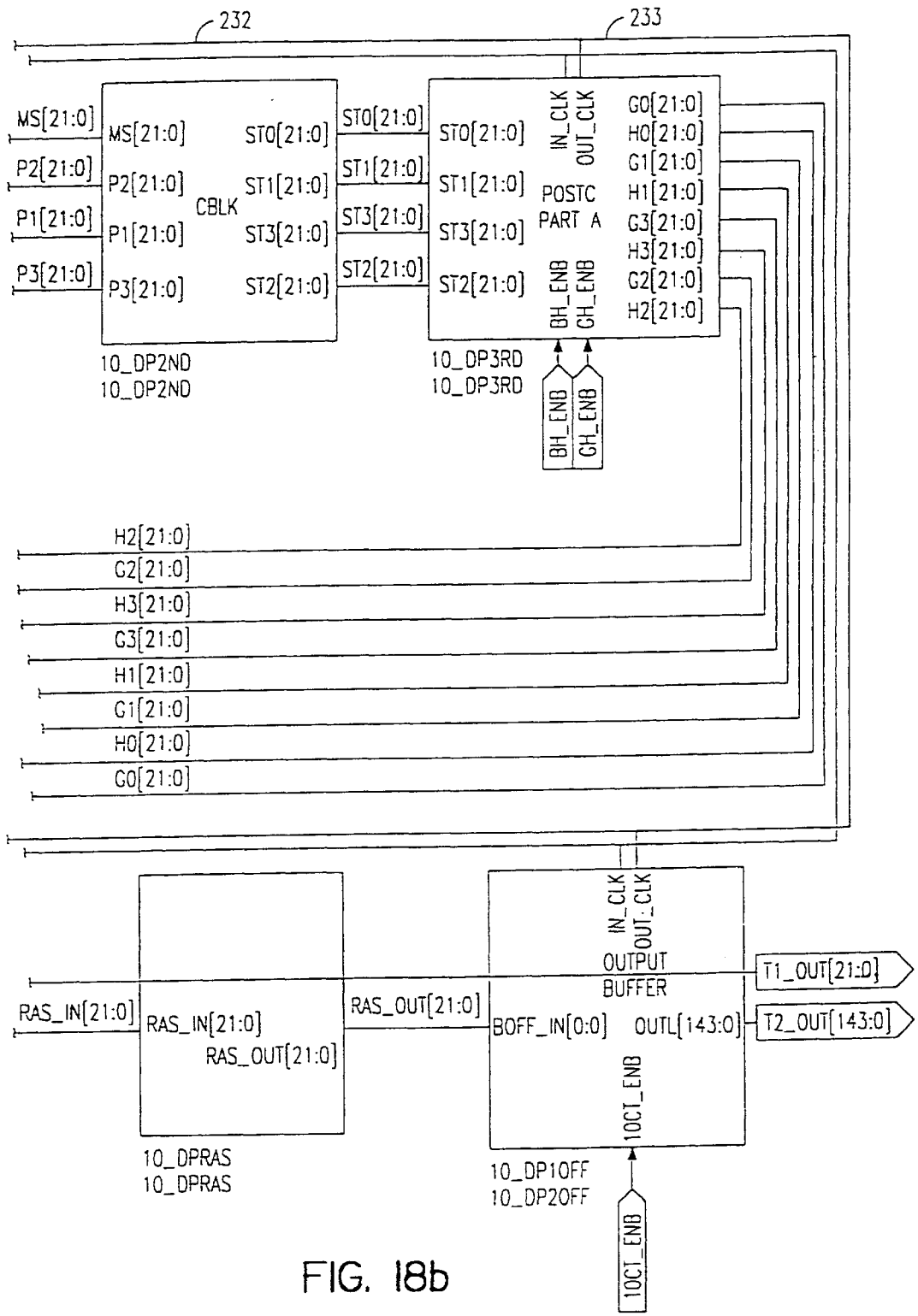

The latching memory elements located on the front and end of the existing 1D IDCT datapath pipelines have been combined into single blocks, as shown particularly in particular in FIG. 18. Additionally, the amount of memory elements present at the input and the output of the second preferred embodiment has been increased to allow variable amounts of T2 data to be buffered.

As shown in FIGS. 16 and 17, the two data streams, stream "T1" (raw unoperated upon data) and stream "T2" (data which has been through the ID IDCT once and has been transposed in the TRAM), are introduced into the datapath pipeline in a time multiplexed fashion.

Figure 33:
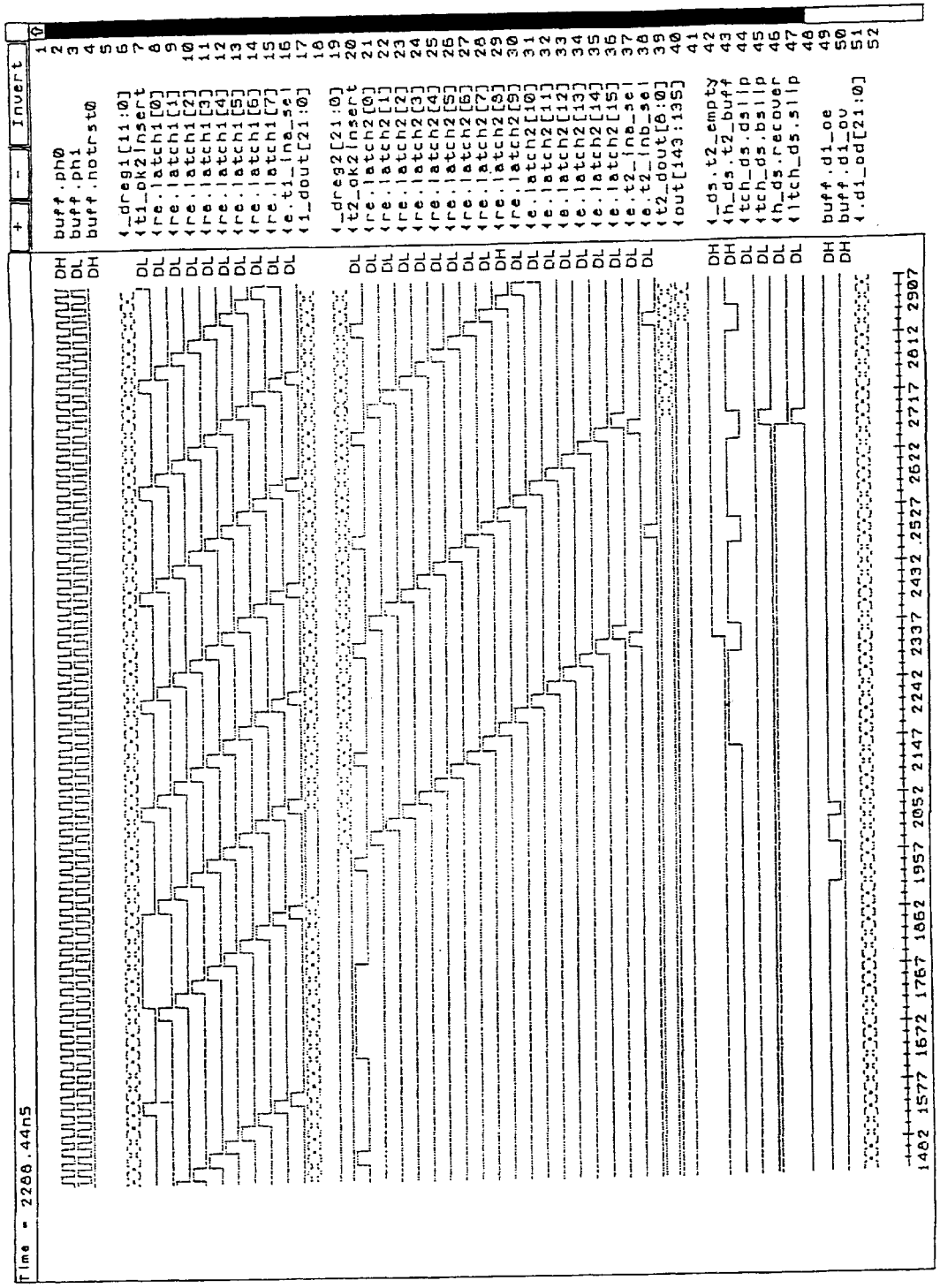
FIG. 33 is a timing diagram showing the interleaving of T1 and T2 data.
Figure 34:
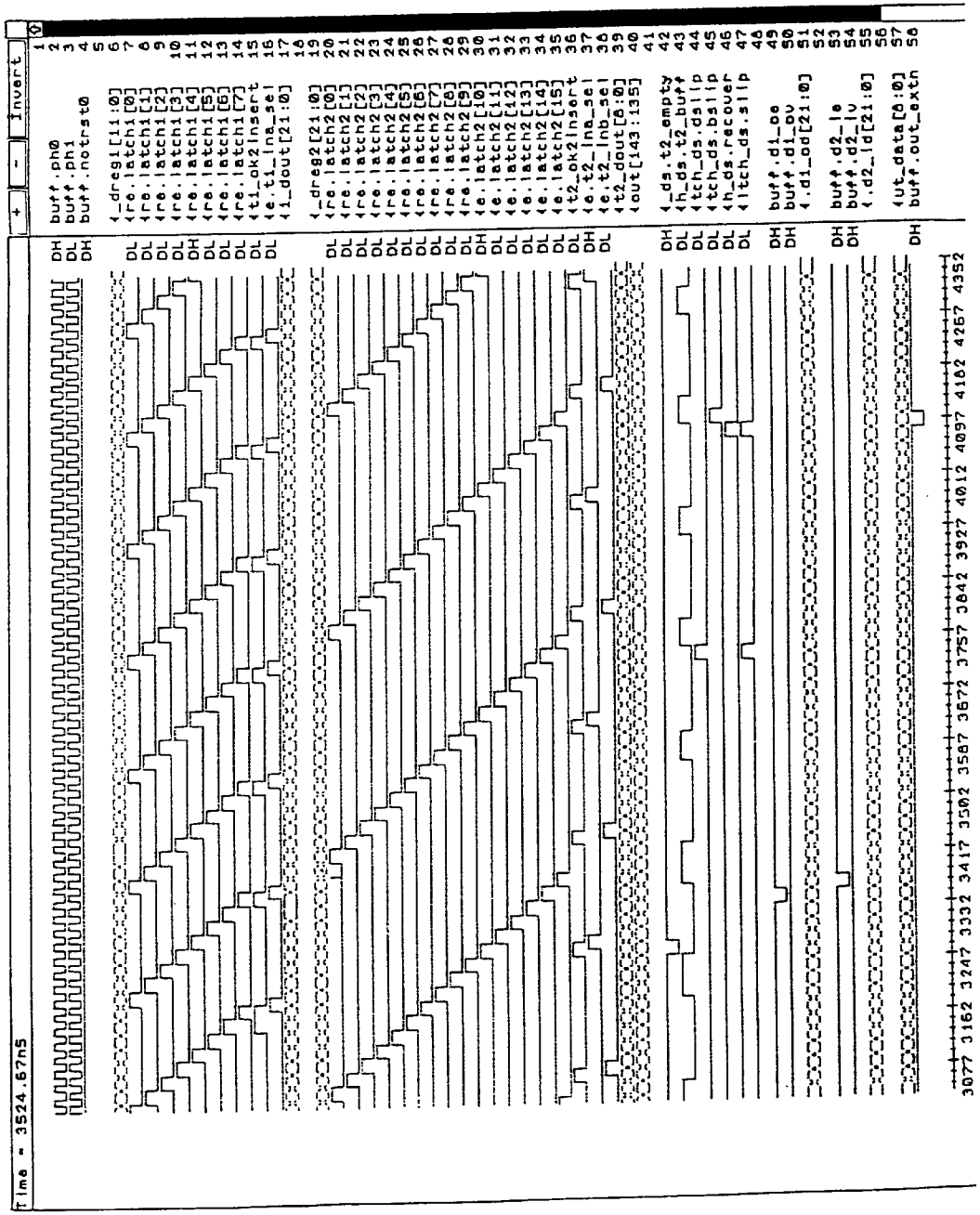
FIG. 34 is a timing diagram illustrating slippage and recovery of T2 data.
Figure 35:
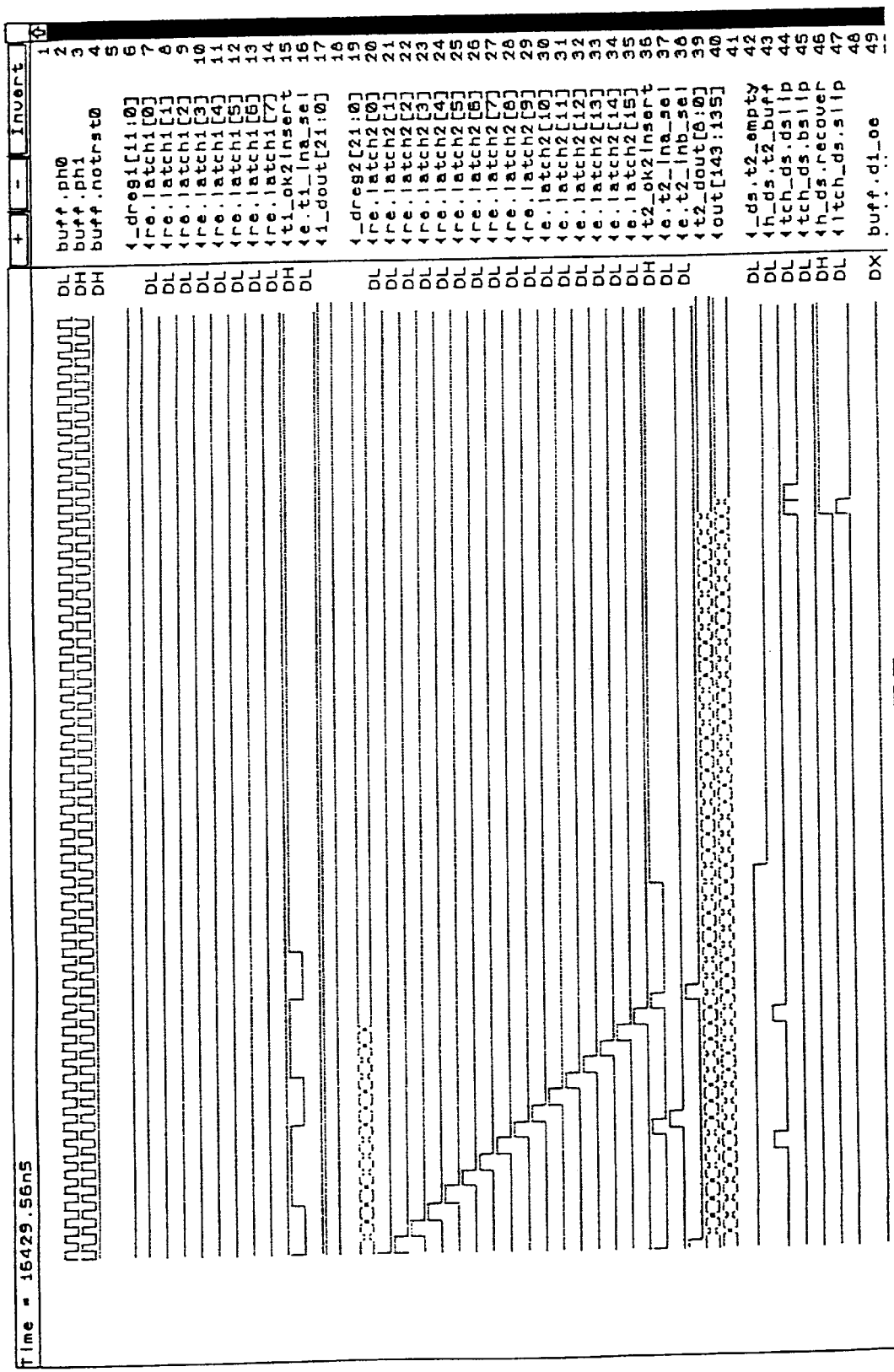
FIG. 35 is a timing diagram depicting a flushing operation of the IDCT and associated circuitry in the present invention.
Figure 36:
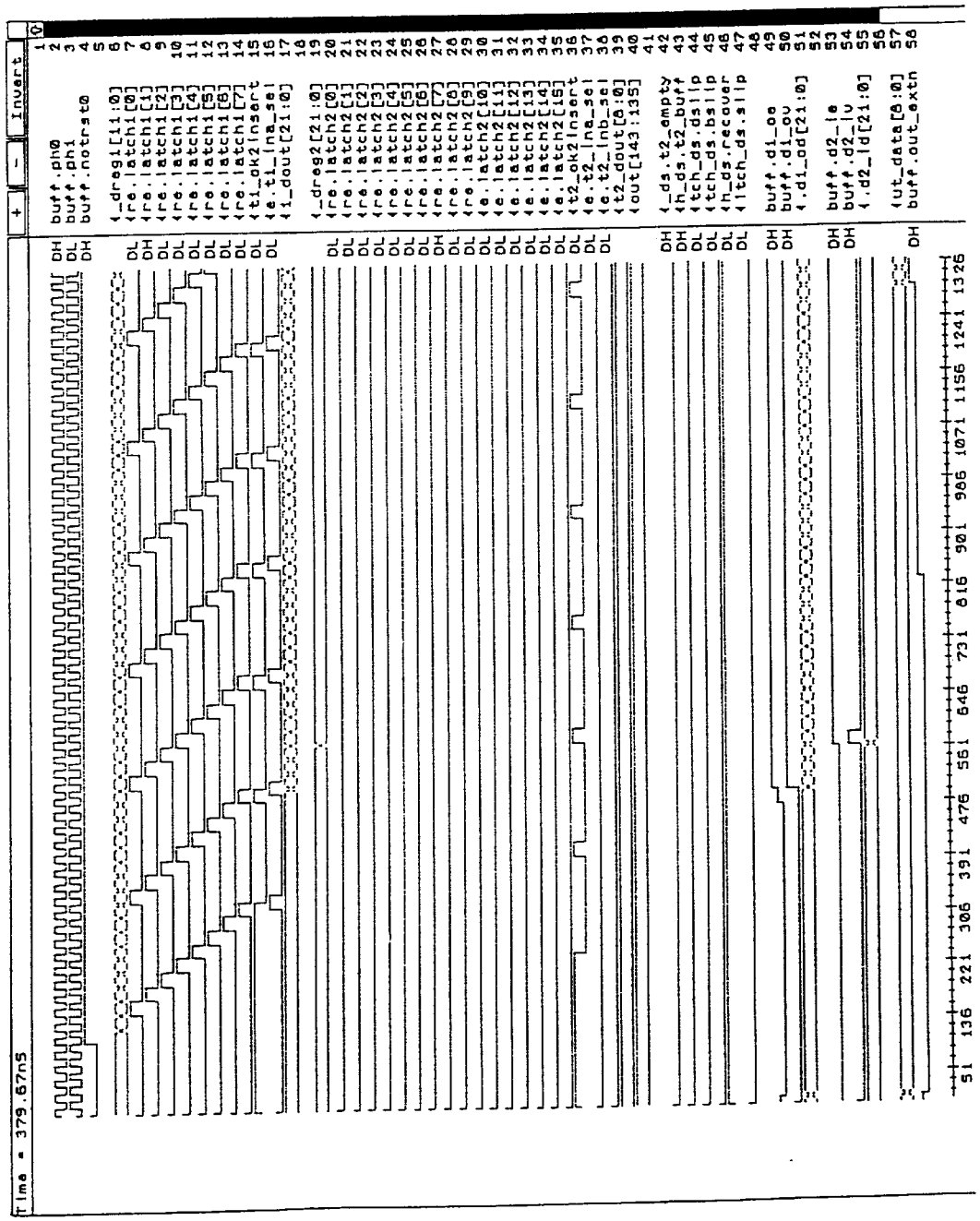
FIG. 36 illustrates start-up of the system, in accordance with the present invention.
Figure 37:
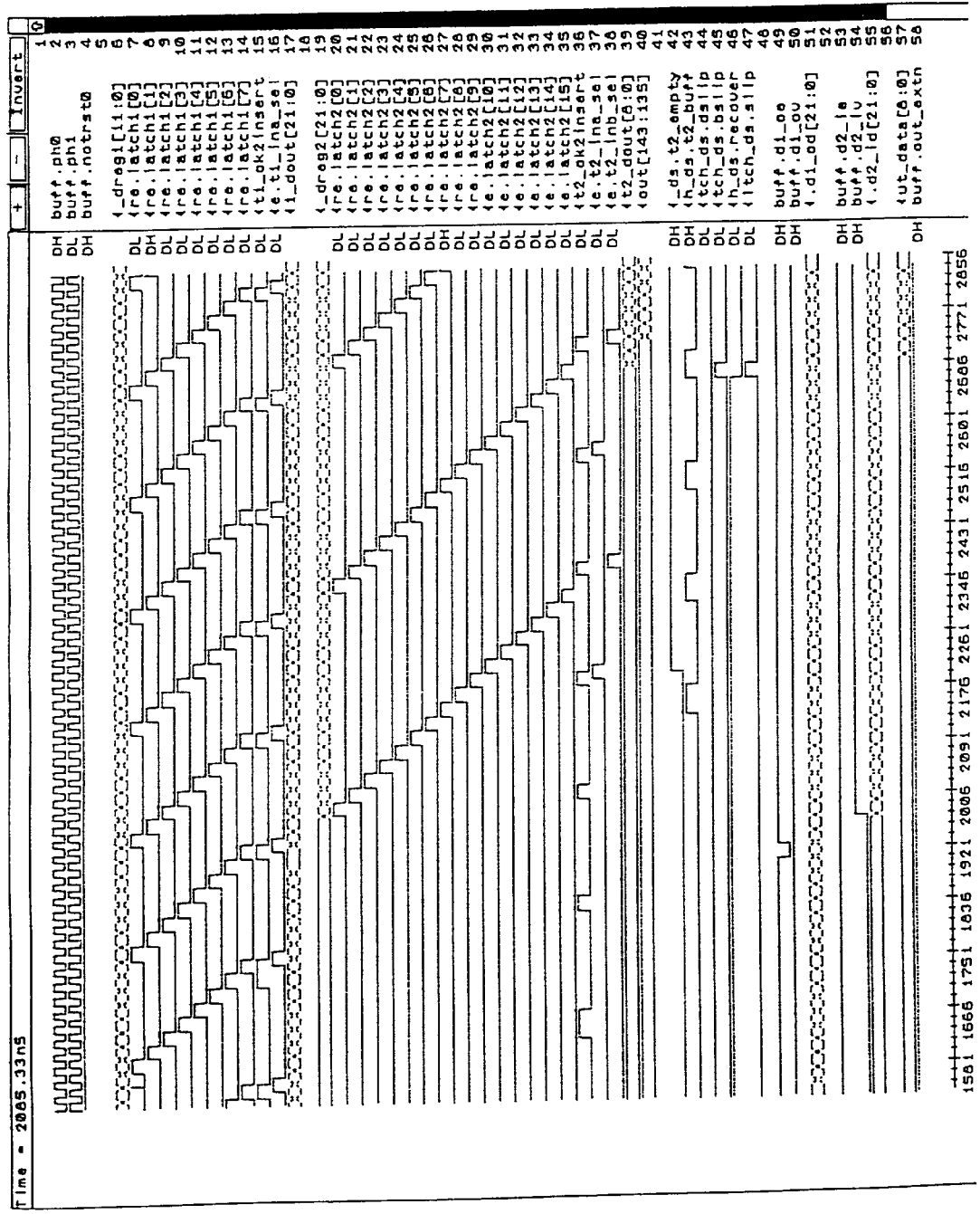
FIG. 37 depicts slippage and recovery in the early stages of interleaving T1 and T2 data.

In the present invention, each stream takes its turn to introduce a group of data items into the datapath pipeline. The data streams are "interleaved" as they pass sequentially down the datapath pipeline and are "de-interleaved" at the datapath output, as shown in FIGS. 17, 18 and 33. A group can vary in number, but in this example, they are eight bits.

Figure 19A:
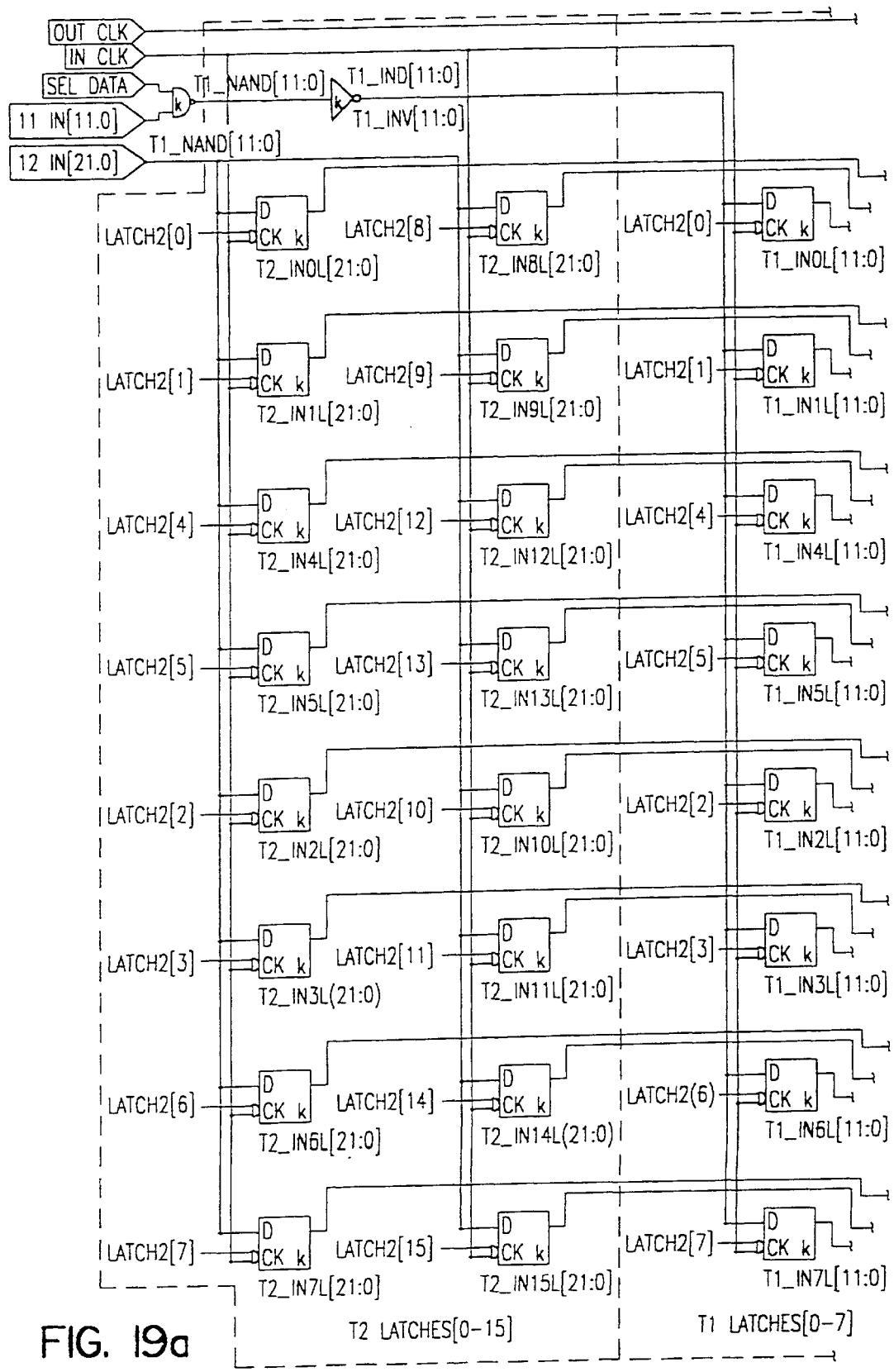
FIG. 19 is a block diagram showing in greater detail the input buffer shown in FIG. 18.
Figure 19B:
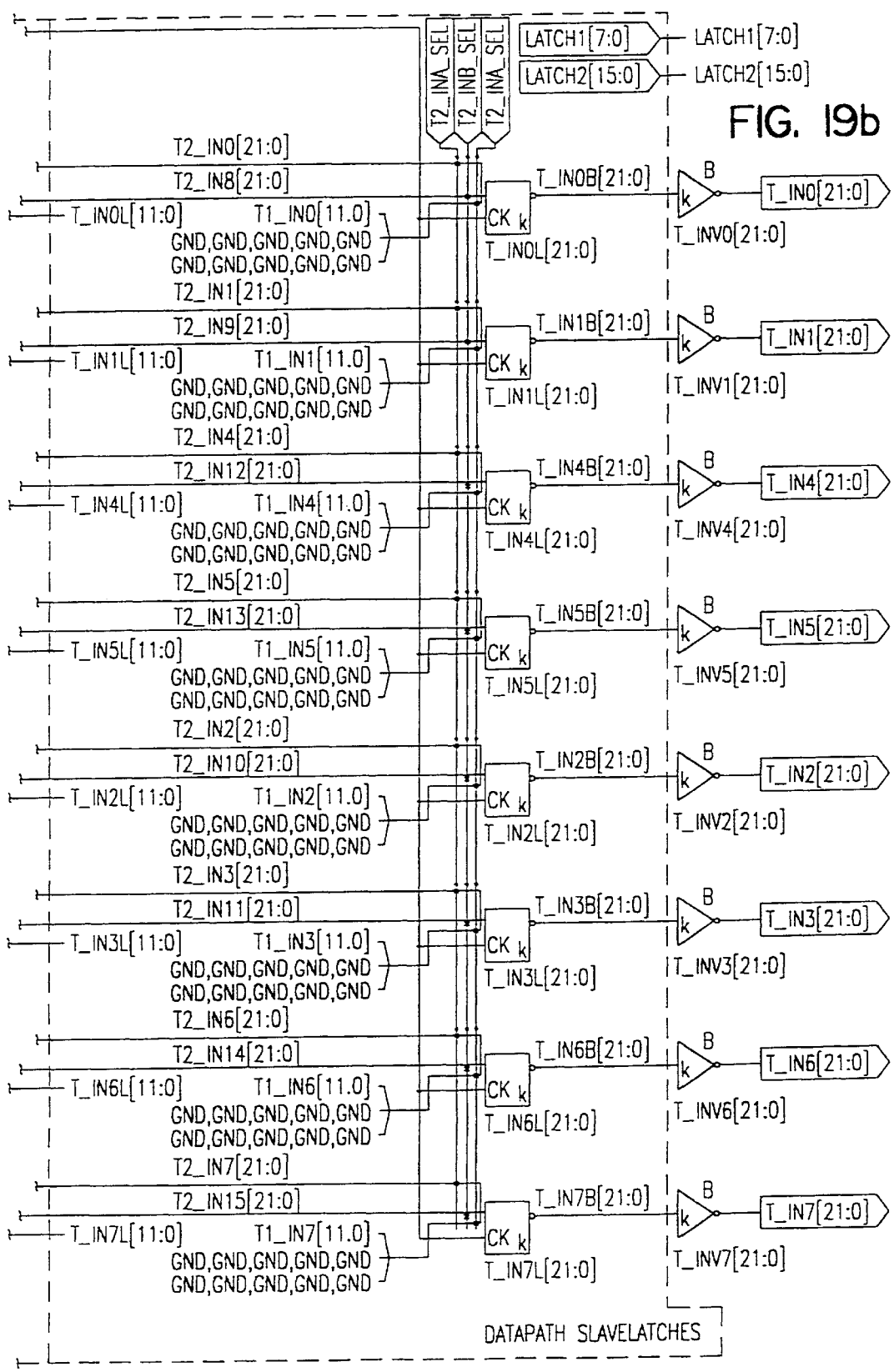
Figure 20A:
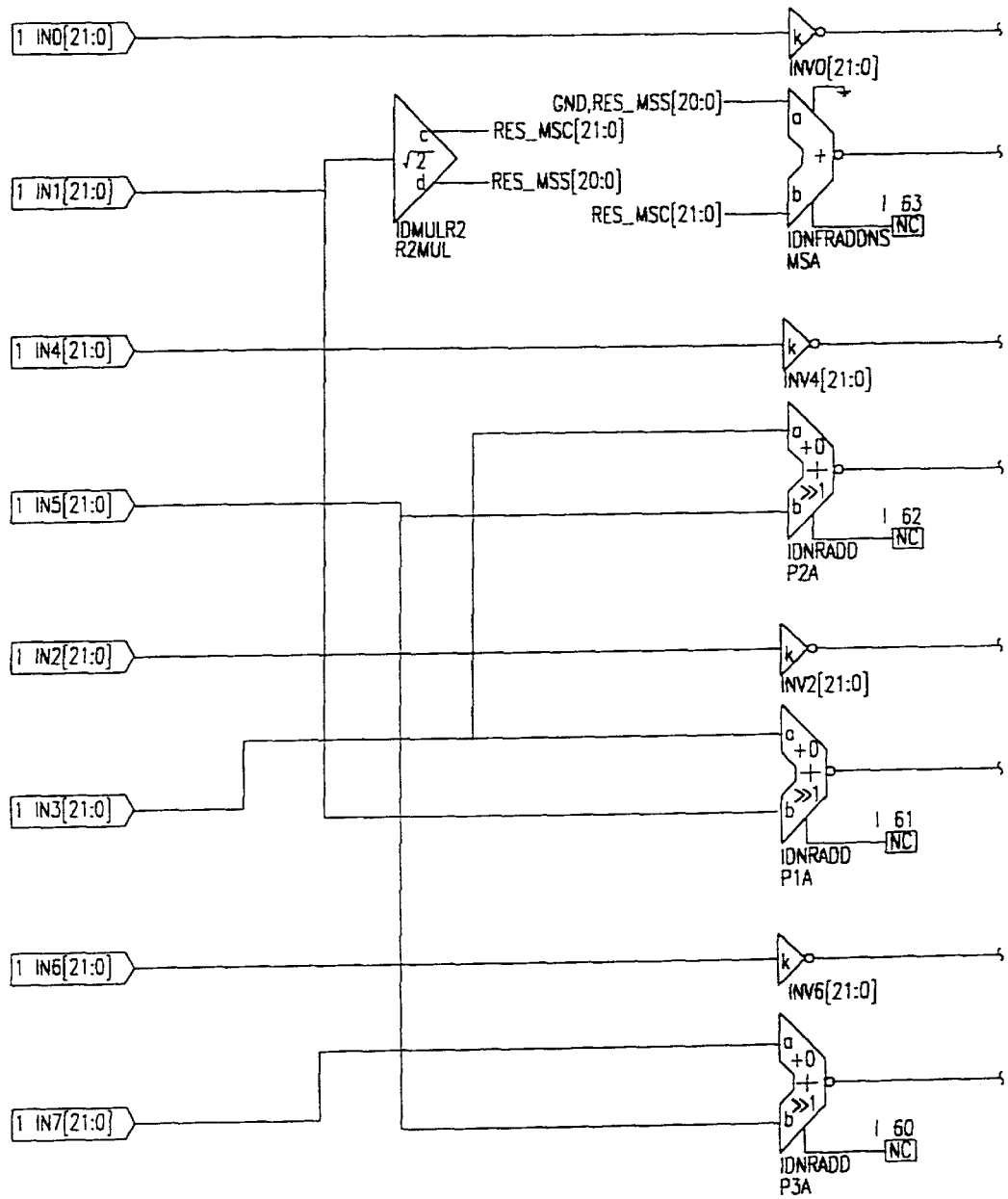
FIG. 20 is a simplified block diagram of a pre-processing circuit "PREC", in accordance with the present invention.
Figure 20B:
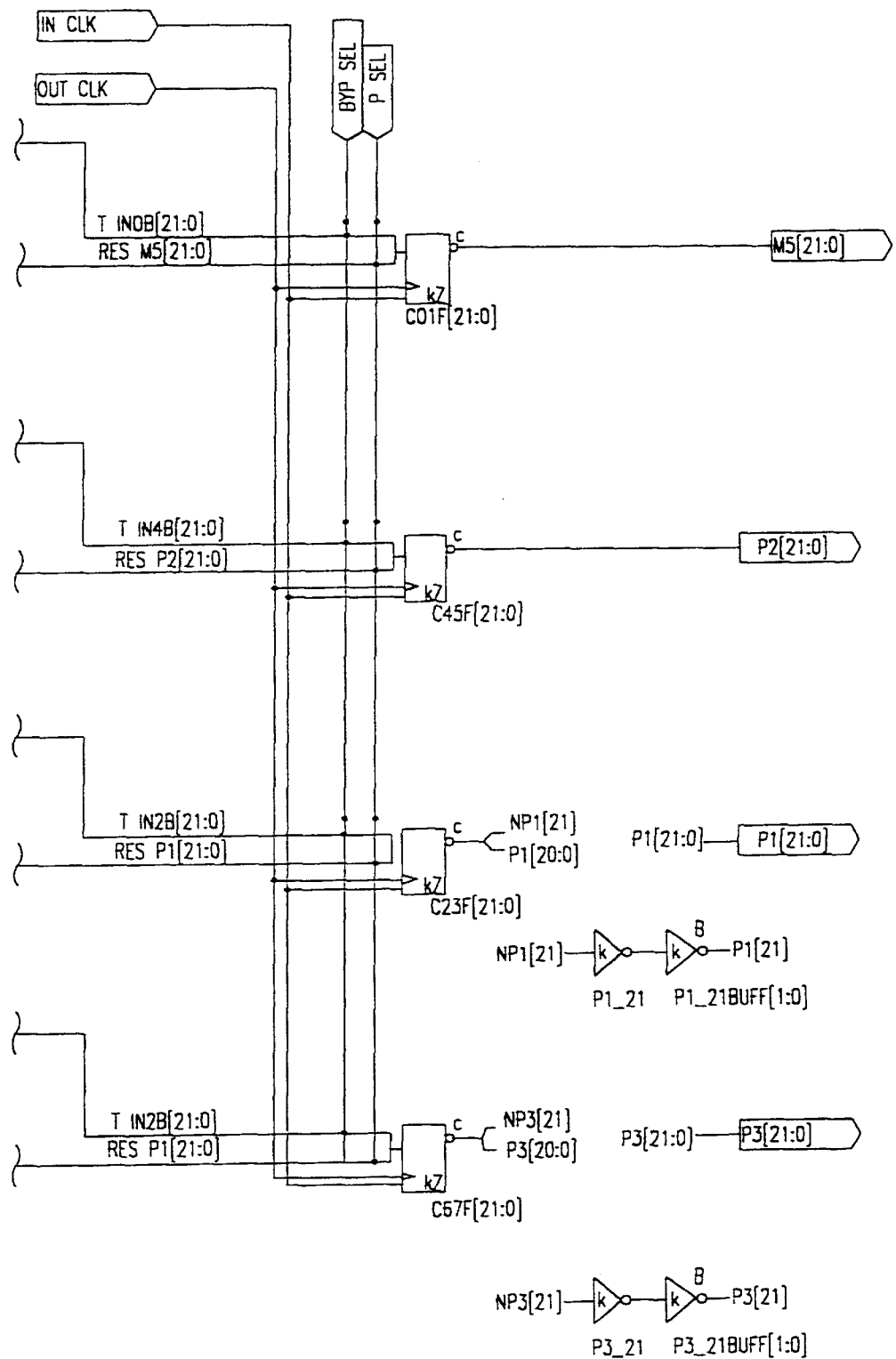
Figure 21A:
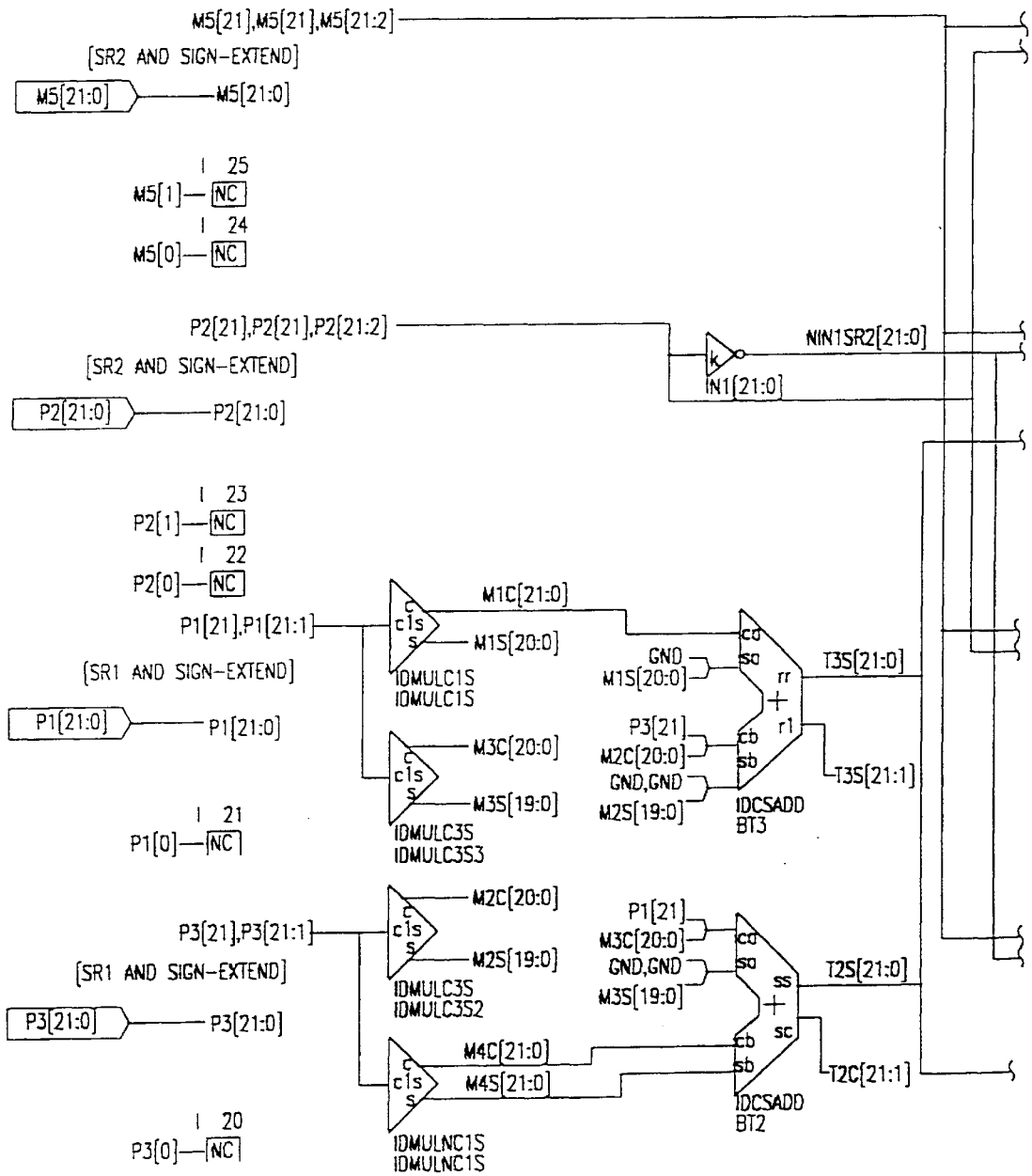
FIG. 21 is a block diagram illustrating a common processing circuit "CBLK" found in the IDCT.
Figure 22A:
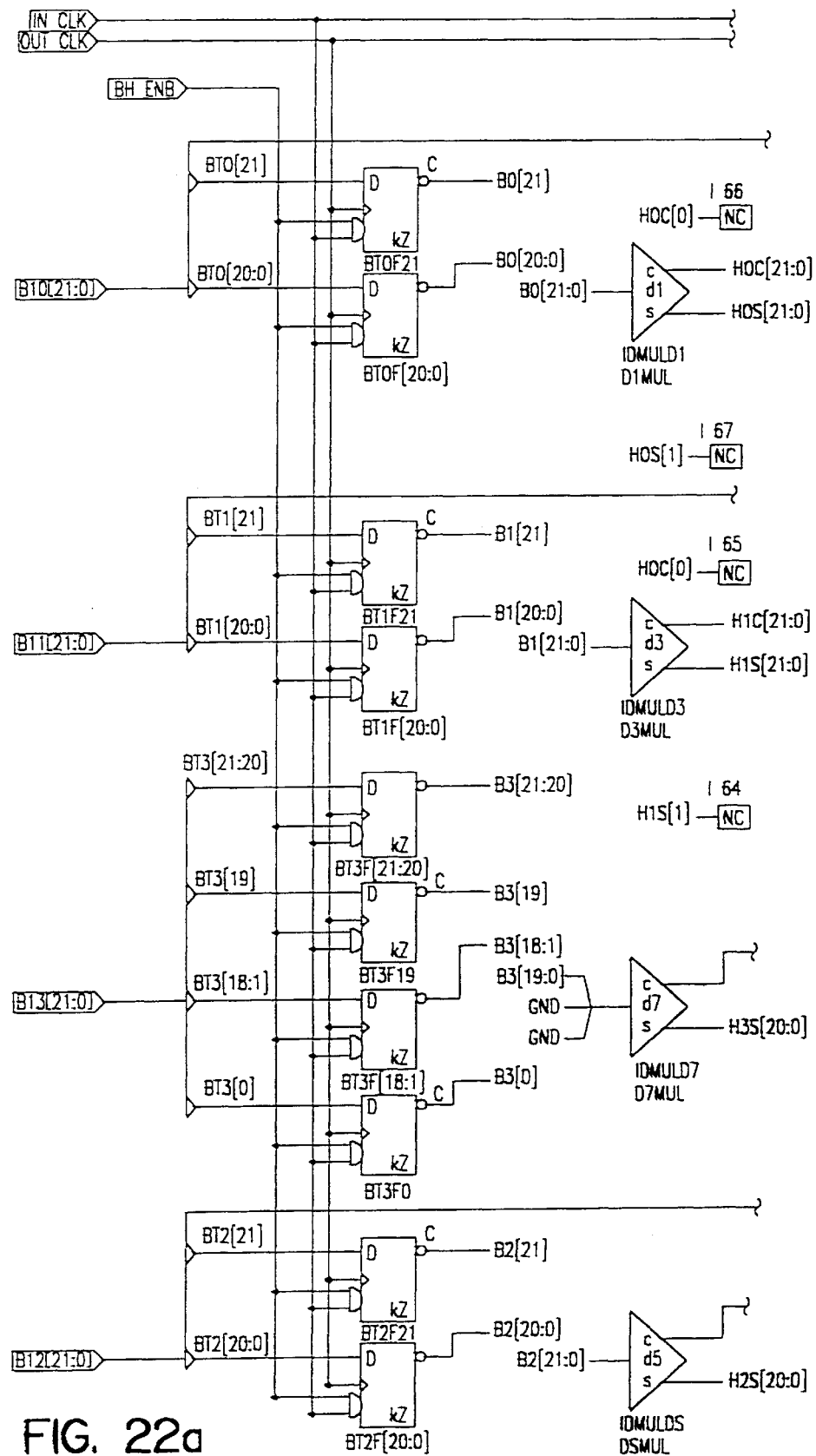
FIG. 22 is a block diagram of a post-processing circuit "POSTC"
Figure 22B:
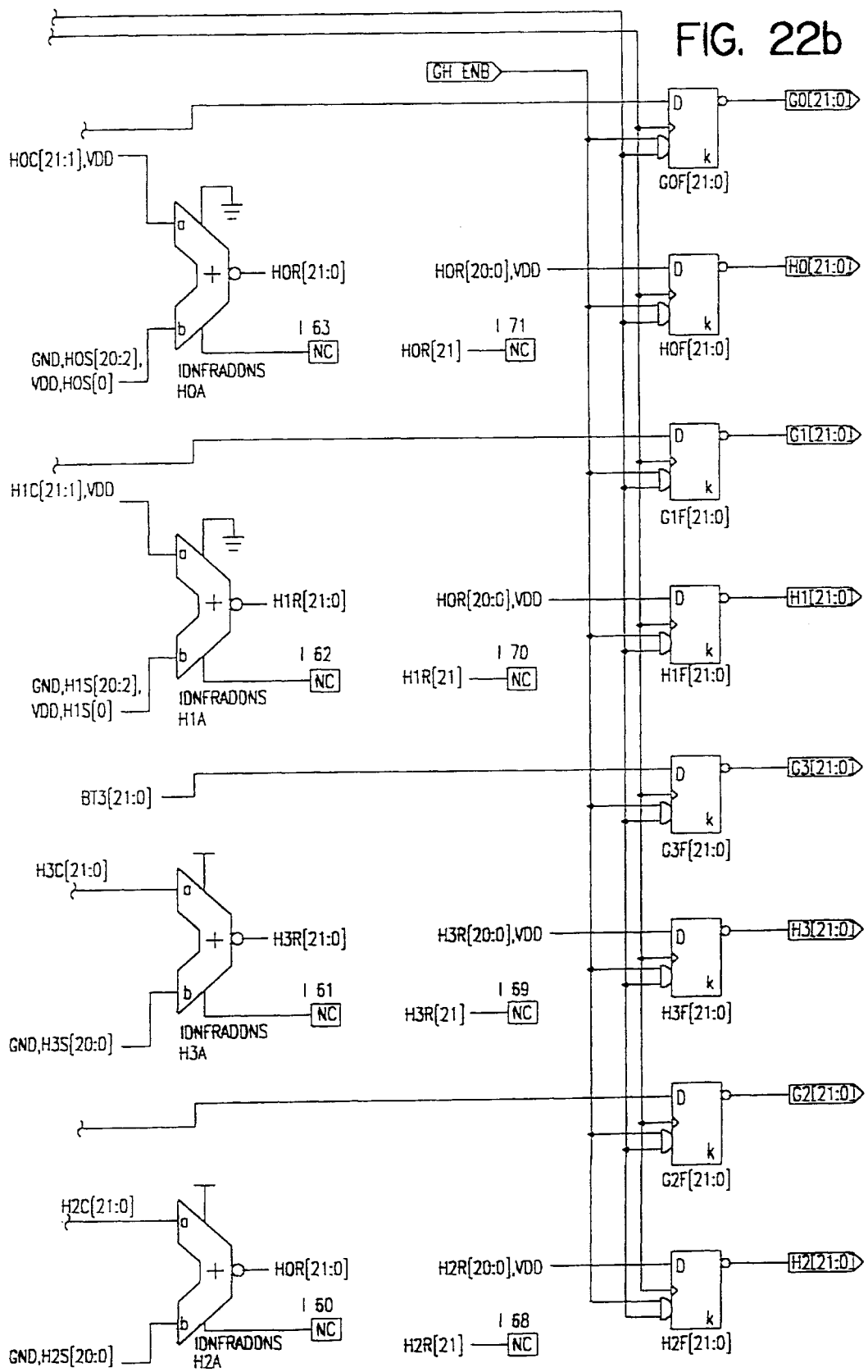
Figure 23A:
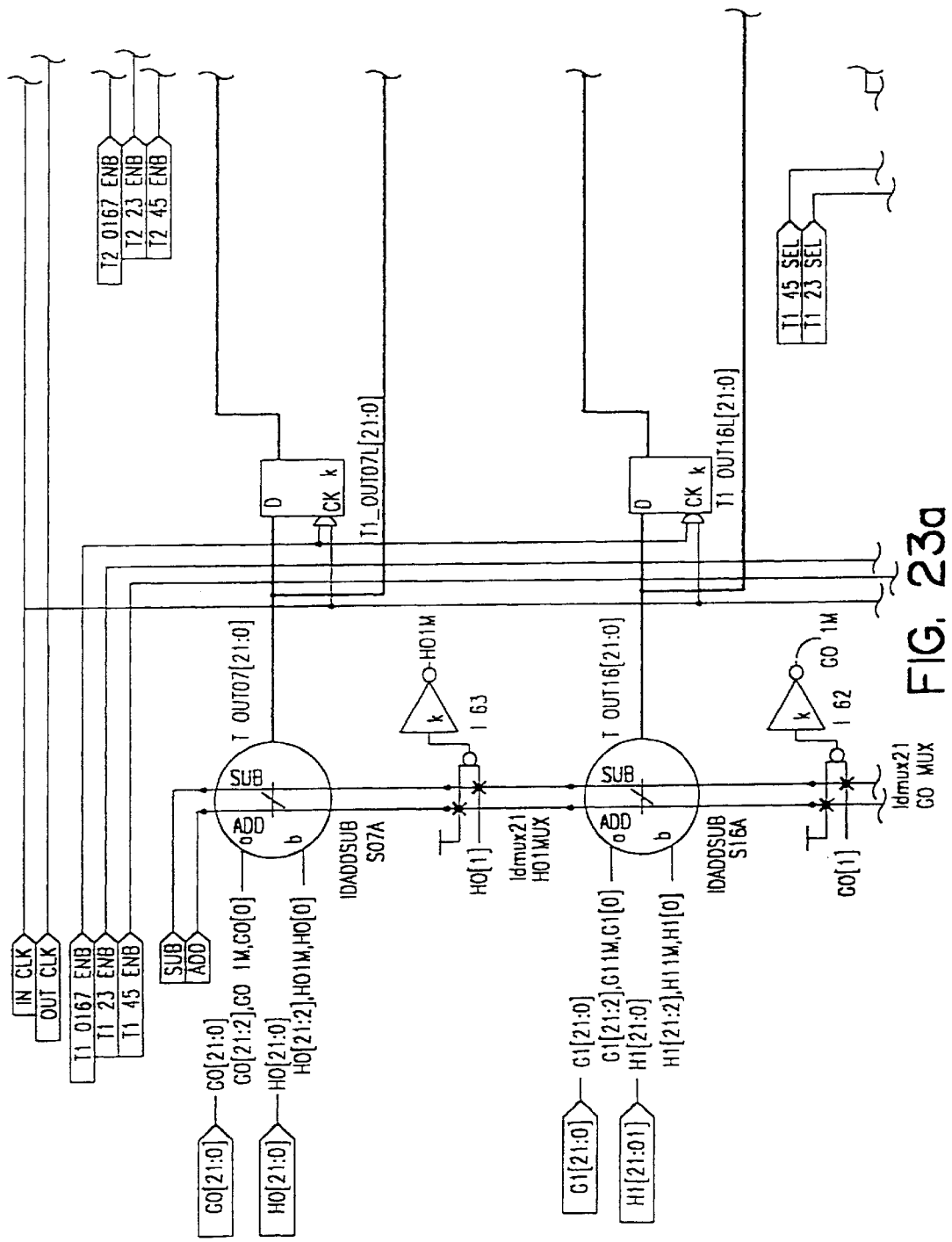
FIG. 23 is another illustration of the post-processing circuit shown in FIG. 22.
Figure 23B:
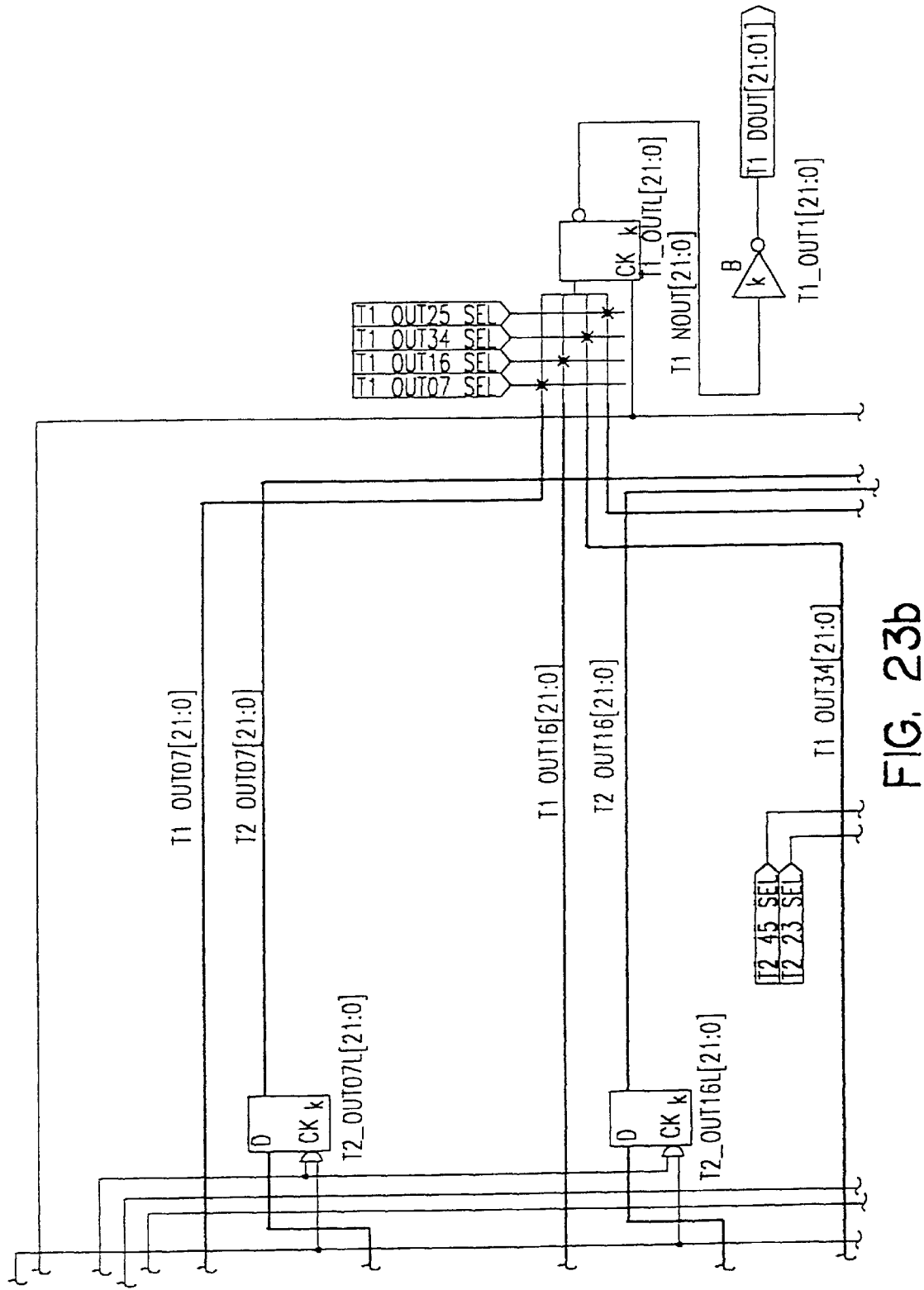
Figure 23C:
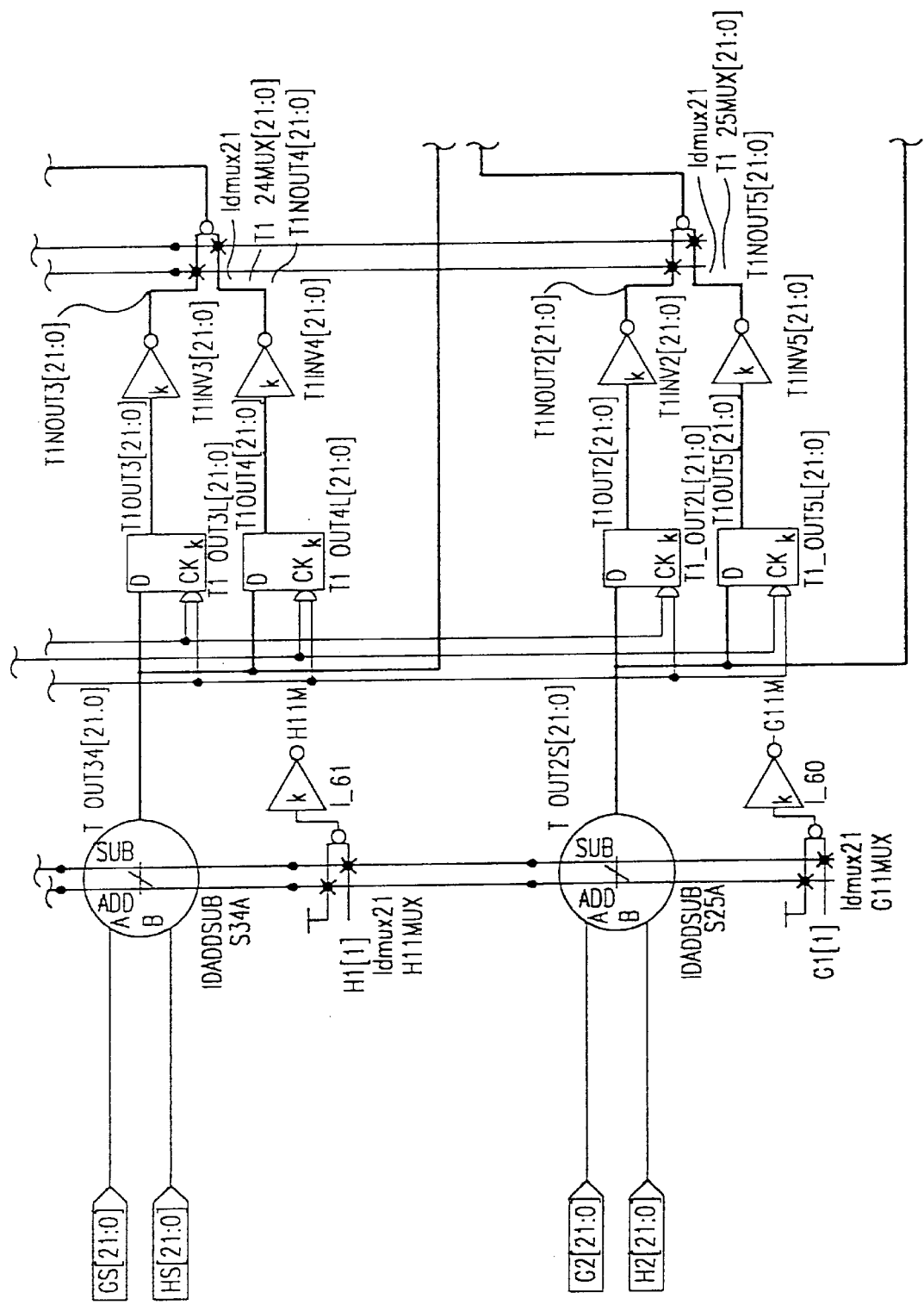
Figure 23D:
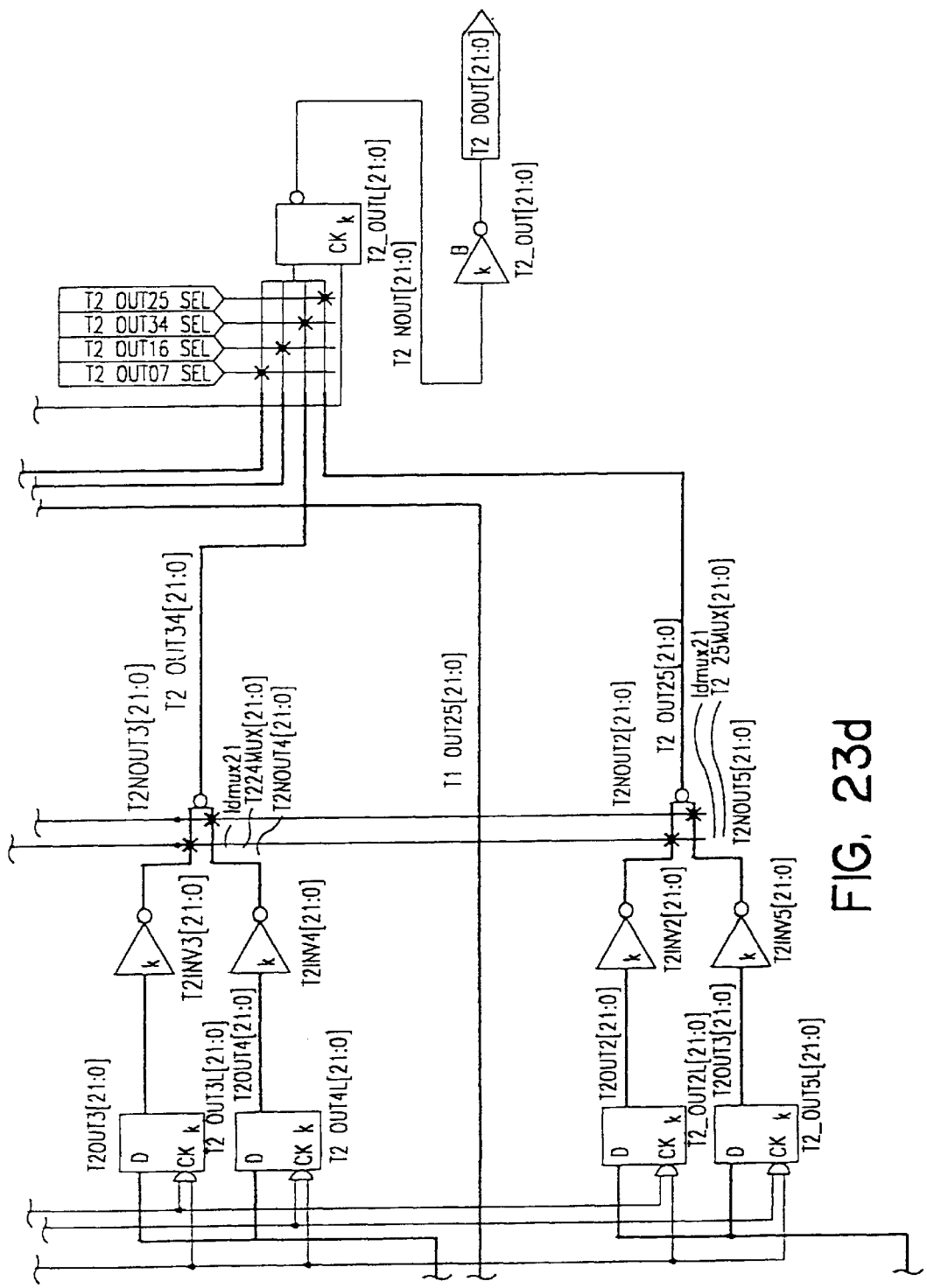
Figure 24:
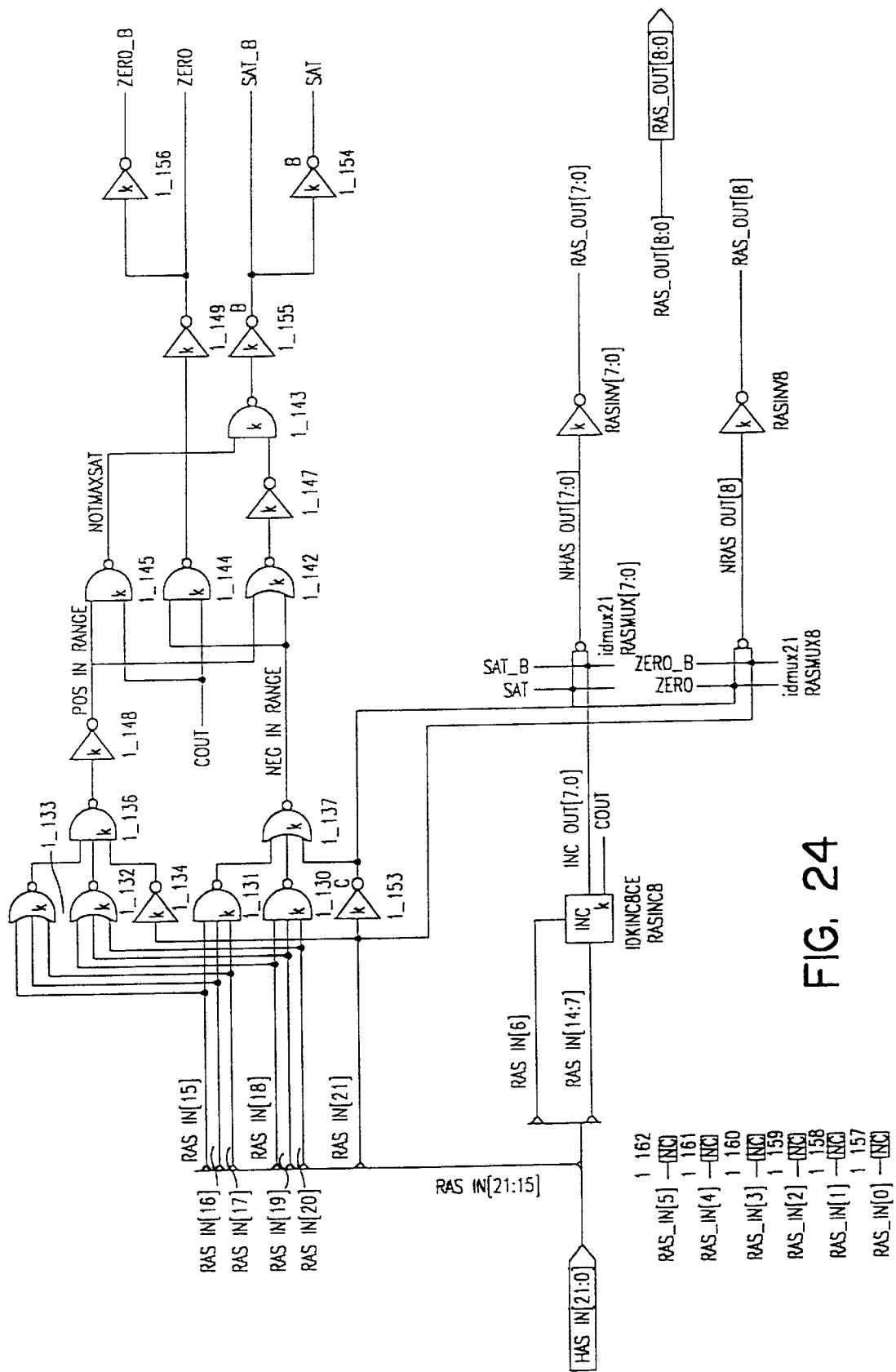
FIG. 24 is a block diagram depicting a round and saturate block, in accordance with the present invention.

In accordance with the present invention, T1 must not be stalled. If T2 arrives at the point of interleaving with T1, but the input buffer should not introduce its data into the pipeline because this would clash with the T1 stream, then stream T2 provides an extra buffering so that T2 does not stall the data stream, but instead will buffer up data from its input stream until such a time as it may safely interleave with stream T1. This is shown in FIGS. 19 and 33 where the data from stream T1 is being loaded into the first transform in latches 0–7, using signals, "Latch 1(0) 'through' Latch 1(7)". Additionally, data from T2 is being loaded in "Latch 2(0) 'through' Latch 2(15)", as shown in FIG. 19, using signals shown in FIG. 33.

The interleaving is controlled by "T1 OK2 insert" and "T2 OK2 insert" signals. Under normal operation, the interleaving will occur when the signals go high. However, if the appropriate amount of data in the latch for T2 has not yet been reached when "T2 OK insert" goes high, then the latch will miss its opportunity and must continue buffering data until the next opportunity to insert data occurs.

In summary, if the above described buffering, in accordance with the present invention, is to occur, comparable "slippage" has to occur at the output of T2. T2 slips when it misses its data insertion point and has to continue buffering in the latches shown in FIG. 19. If T2 slipped and did not introduce data into the pipeline there will be a corresponding gap in the T2 stream output at the datapath output. This gap may be removed or "swallowed up" by use of the extra buffering at the T2 output. This process may be thought of as having a "fixed" T1–1 D IDCT transform with a variable T2–1 D IDCT, where the data streams are interleaved in a time multiplex fashion such that they may use the same piece of arithmetic datapath pipeline.

Figure 25A:
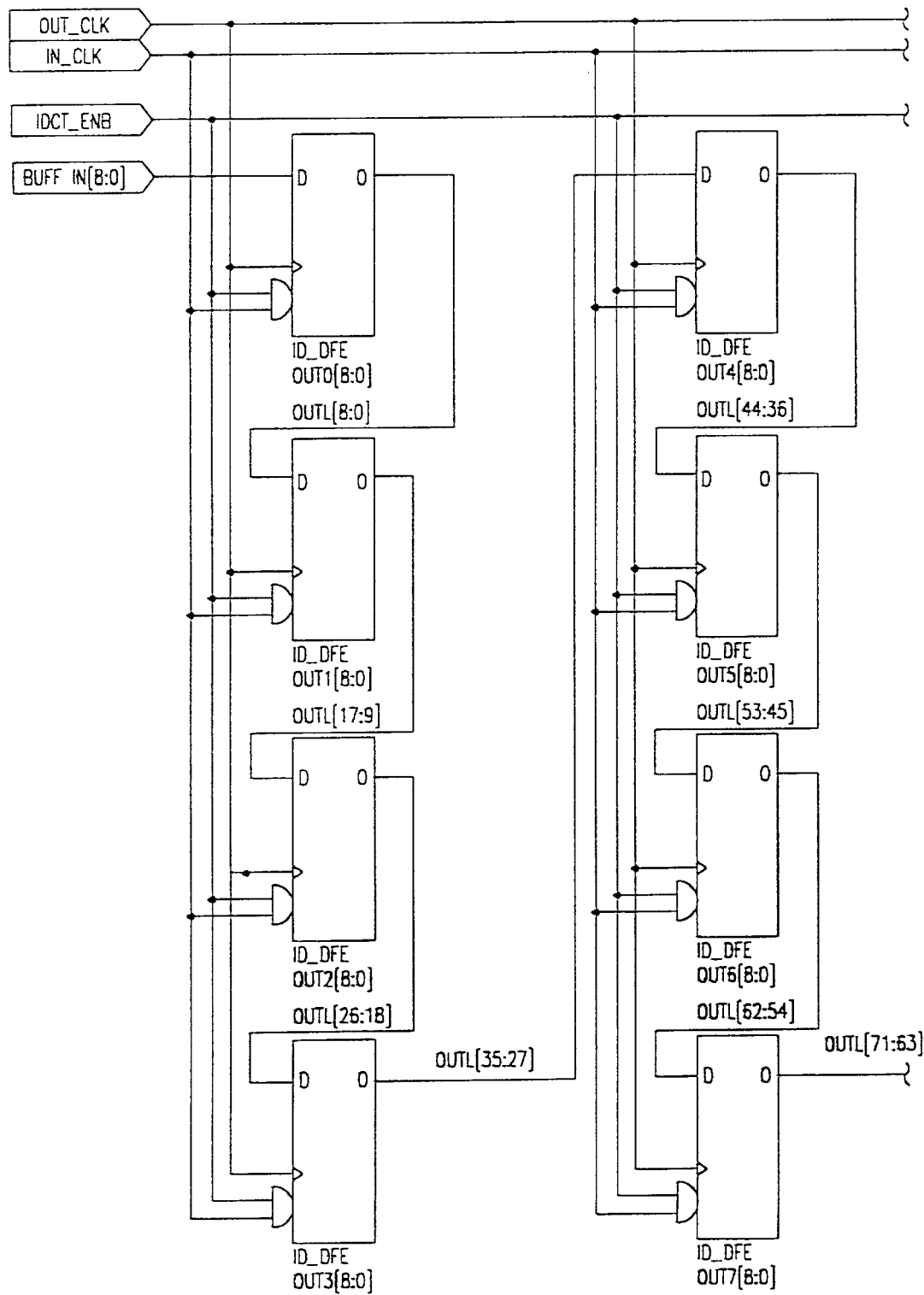
FIG. 25 is a block diagram of an output buffer in the present invention.
Figure 25B:
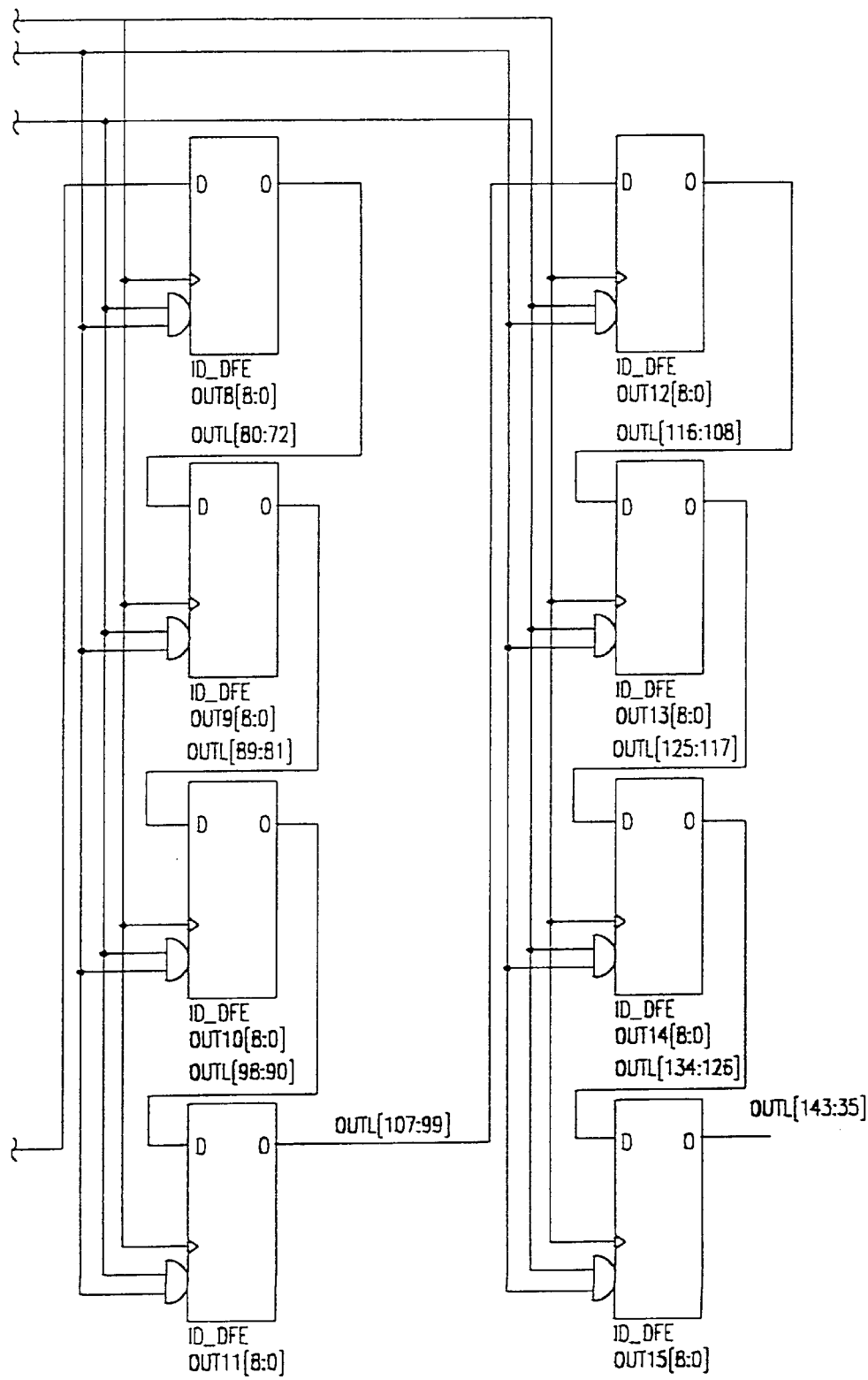
Figure 26A:
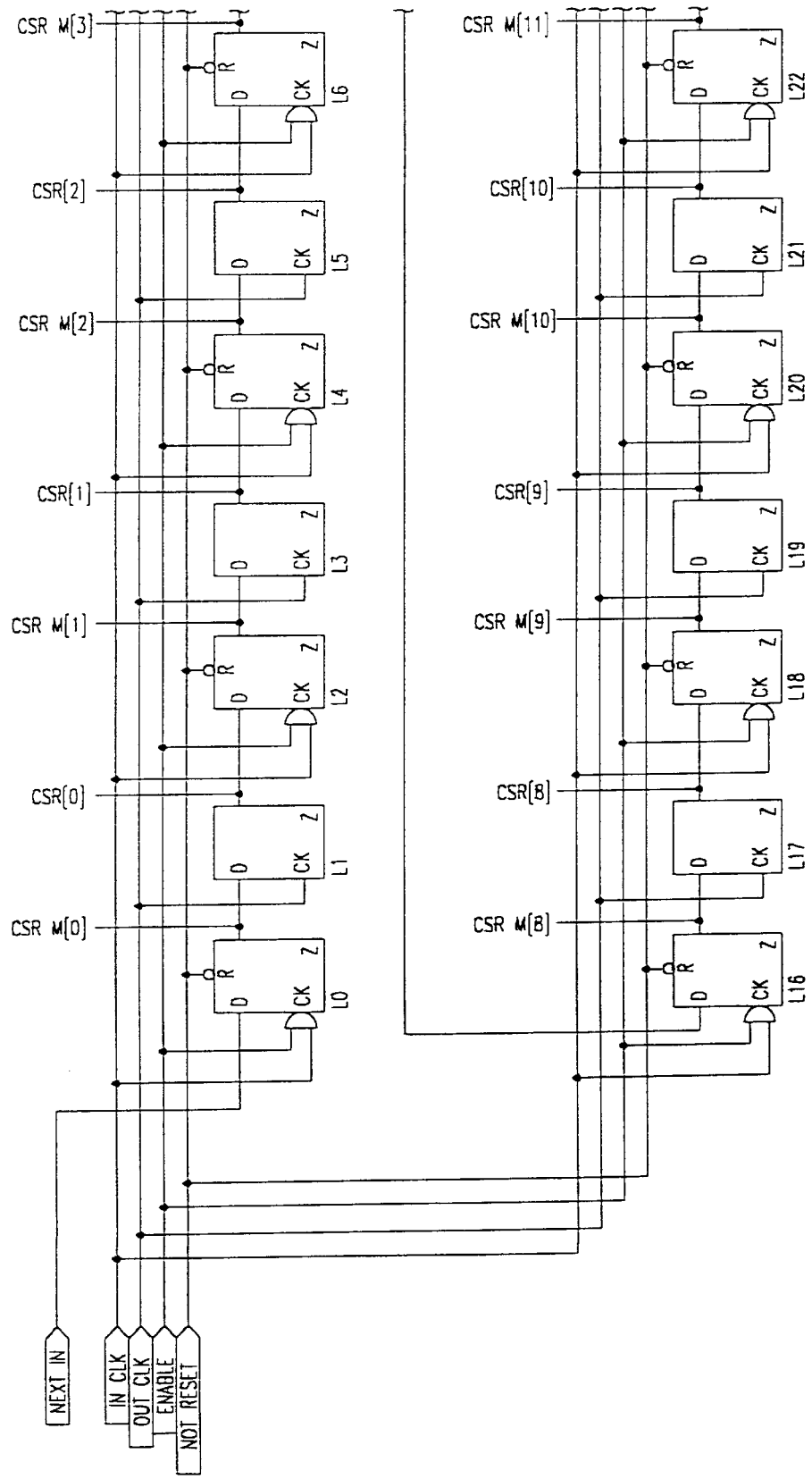
FIG. 26 is a block diagram of a control shift register, in accordance with the present invention.
Figure 26B:
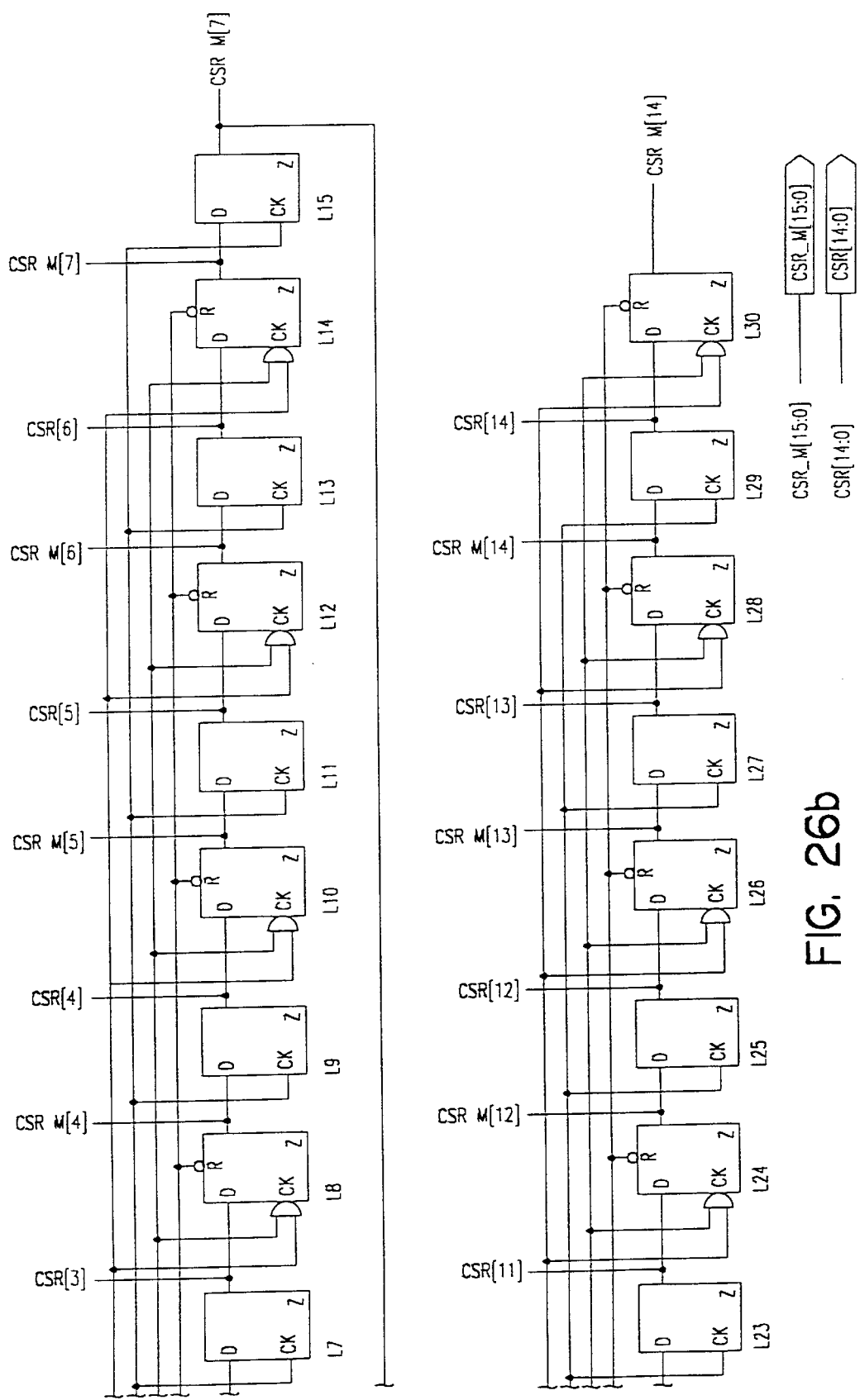
Figure 27A:
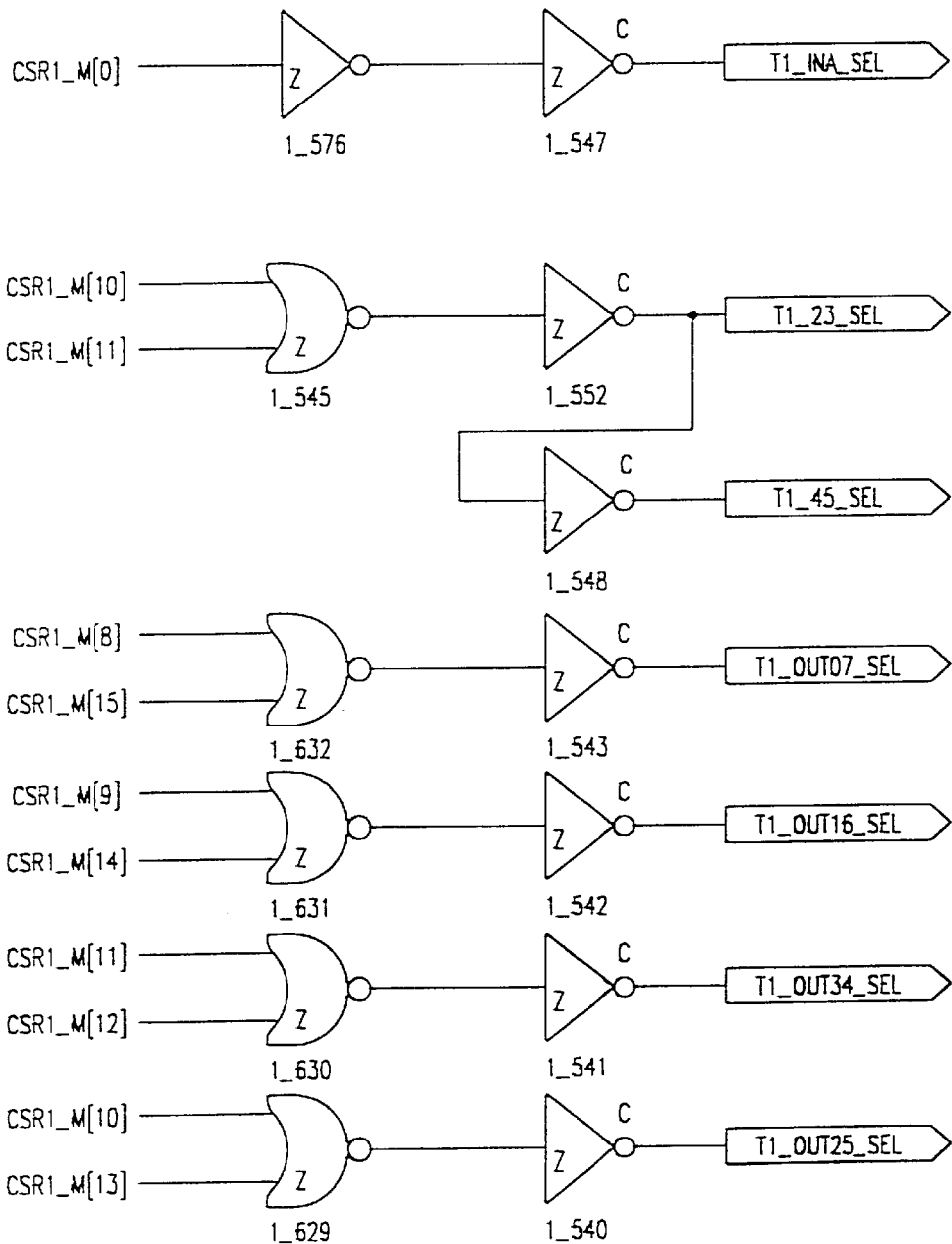
FIG. 27 is a block diagram of a control shift register decode in the present invention.
Figure 27B:
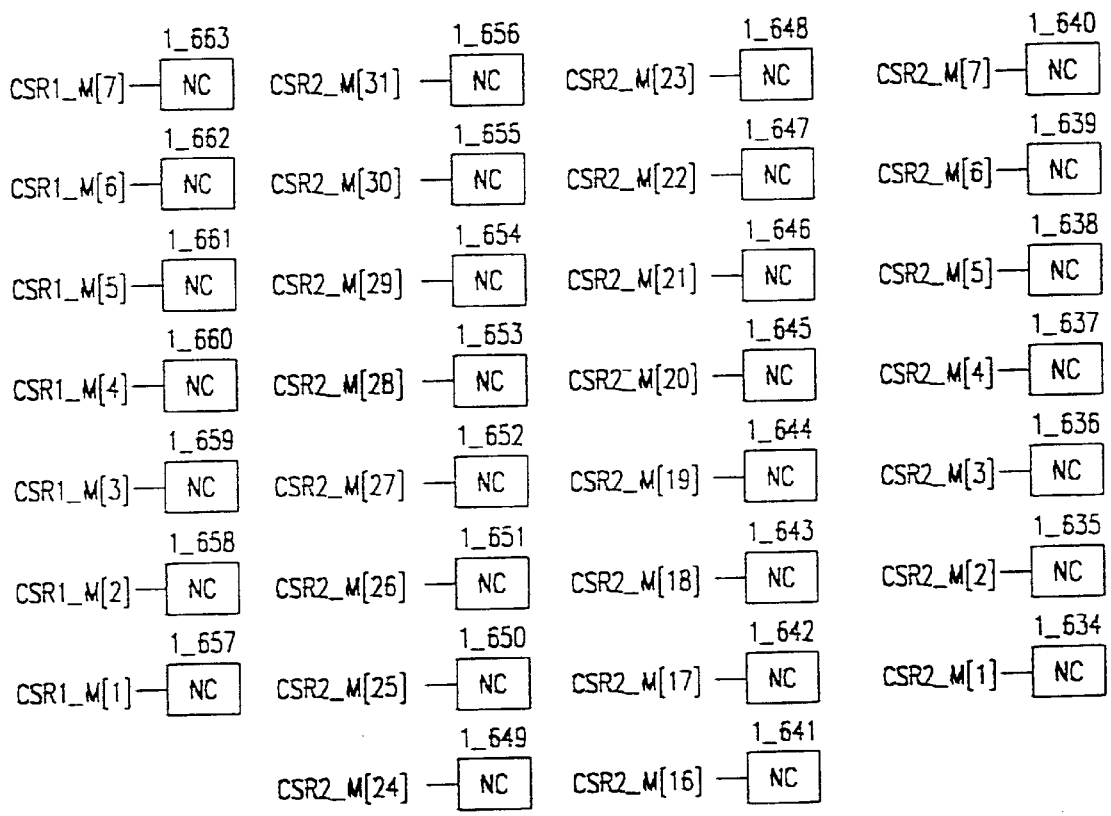
Figure 27C:
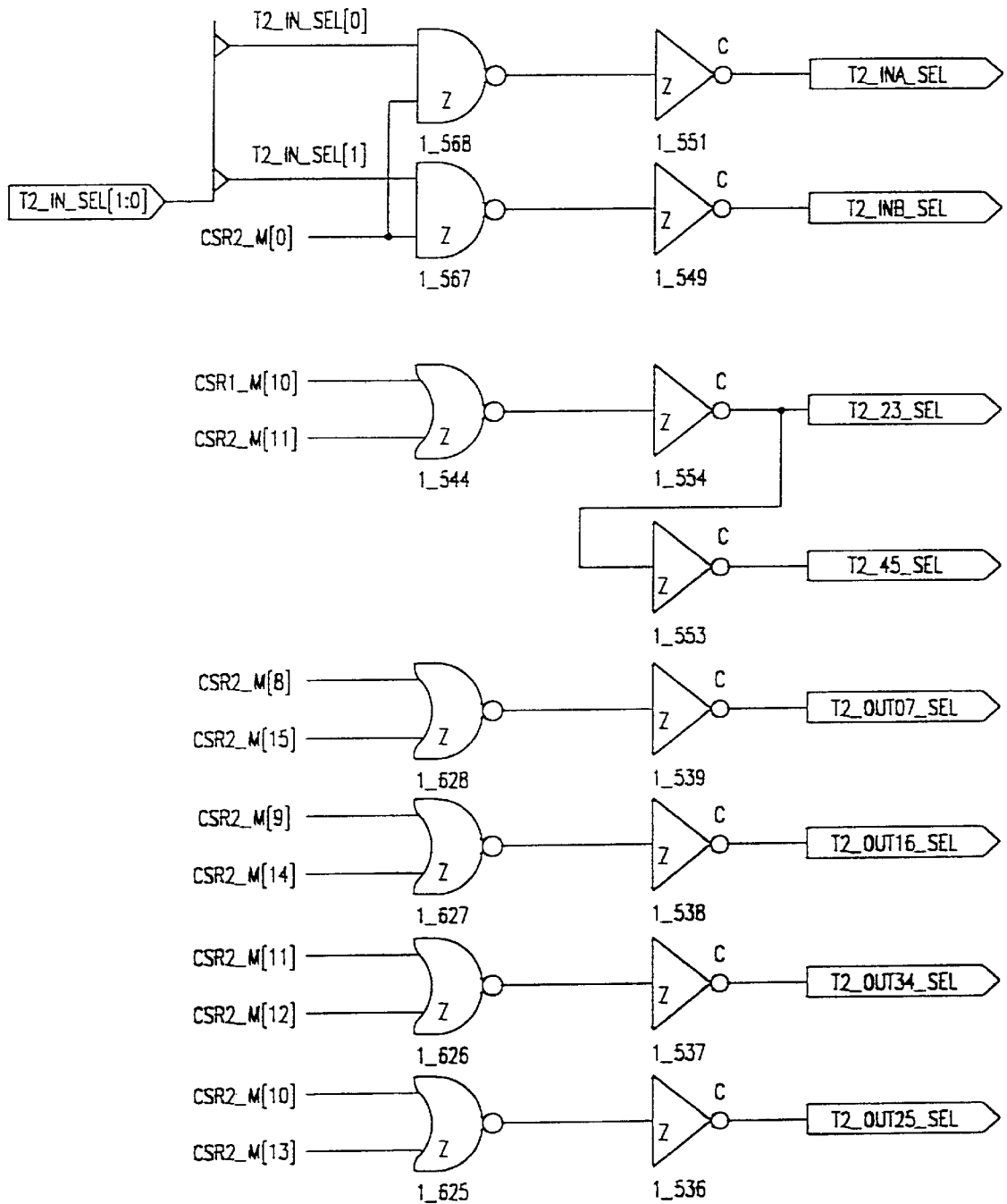
Figure 28A:
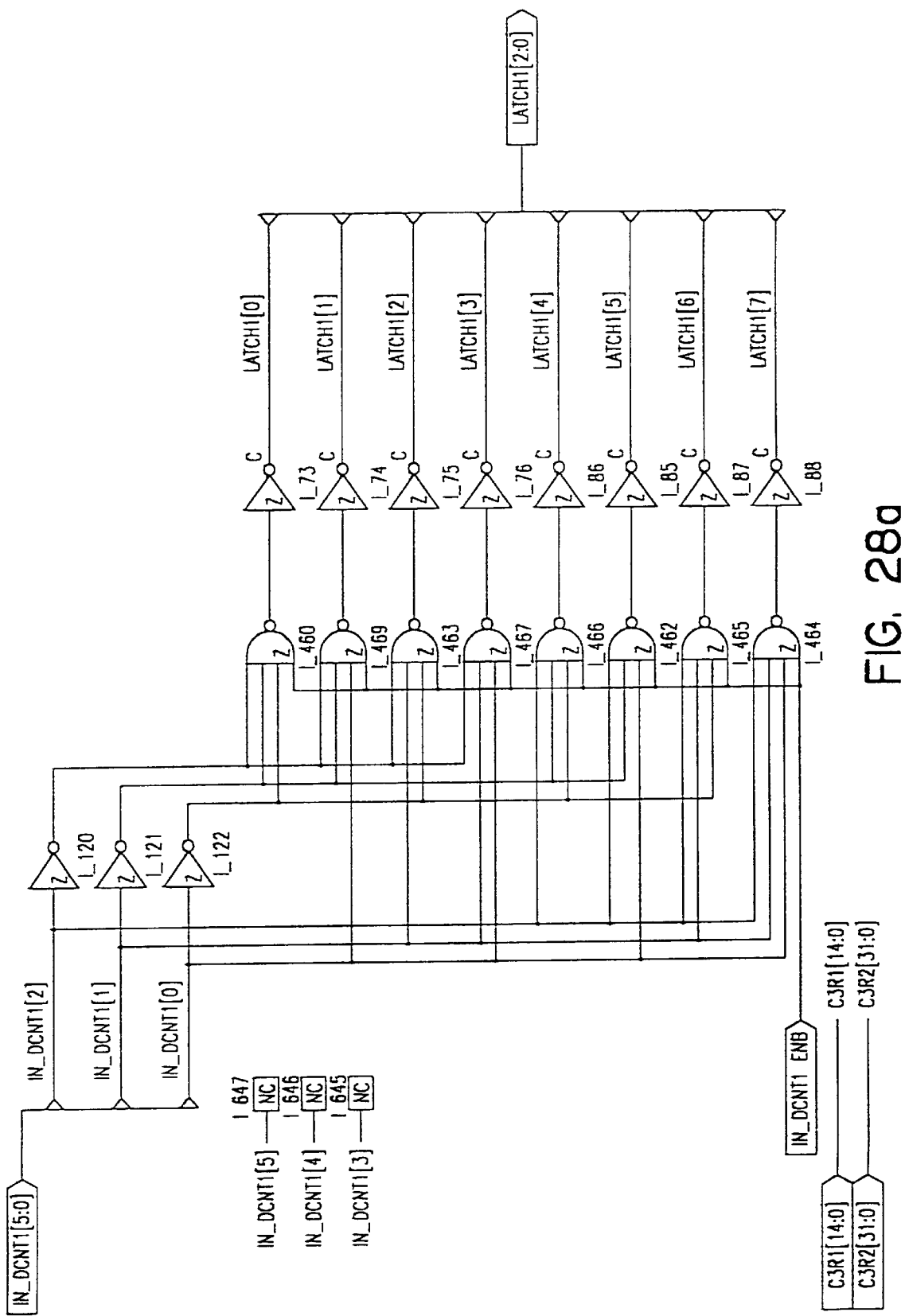
FIG. 28 depicts a control shift register and an input control buffer.
Figure 28B:
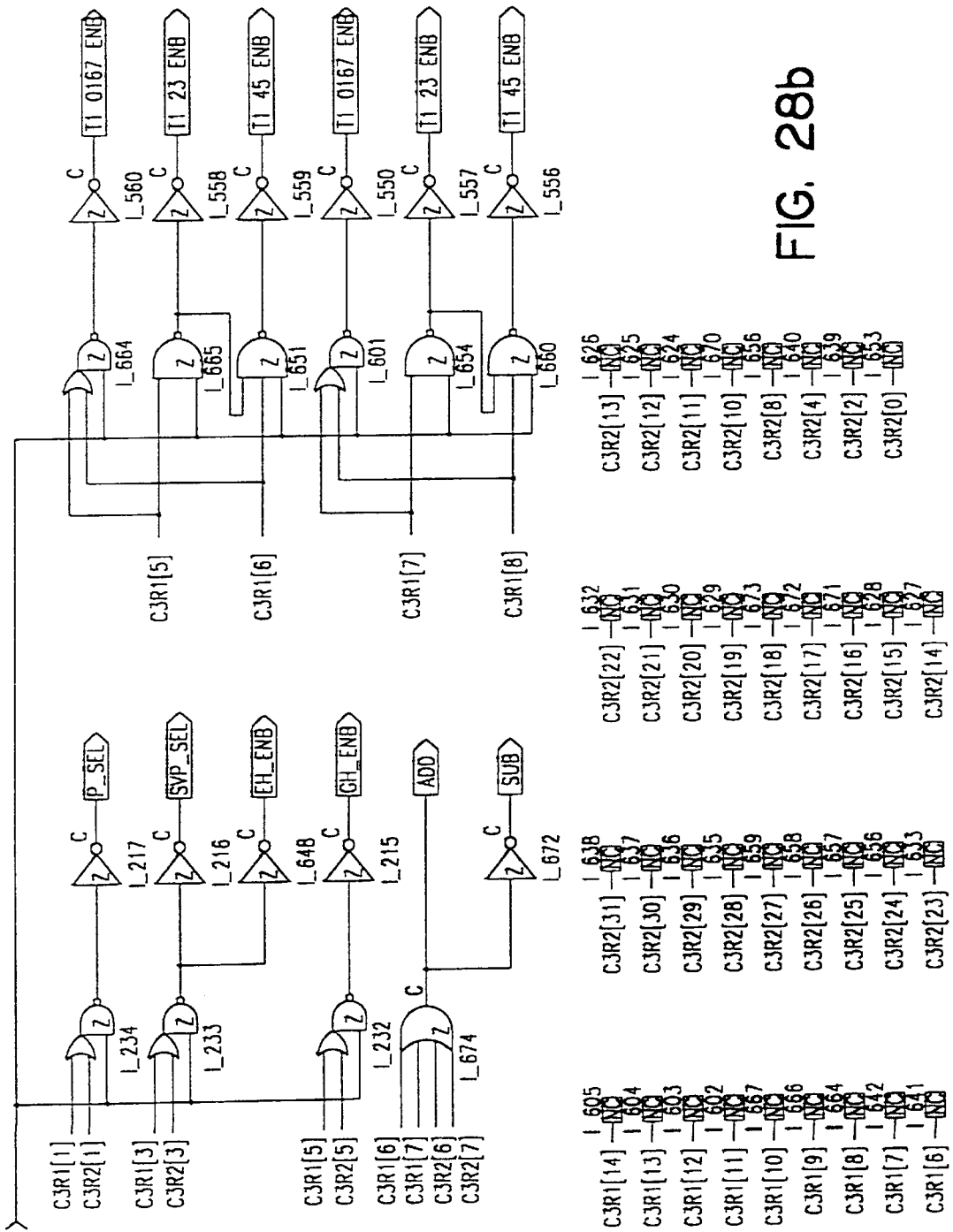
Figure 28C:
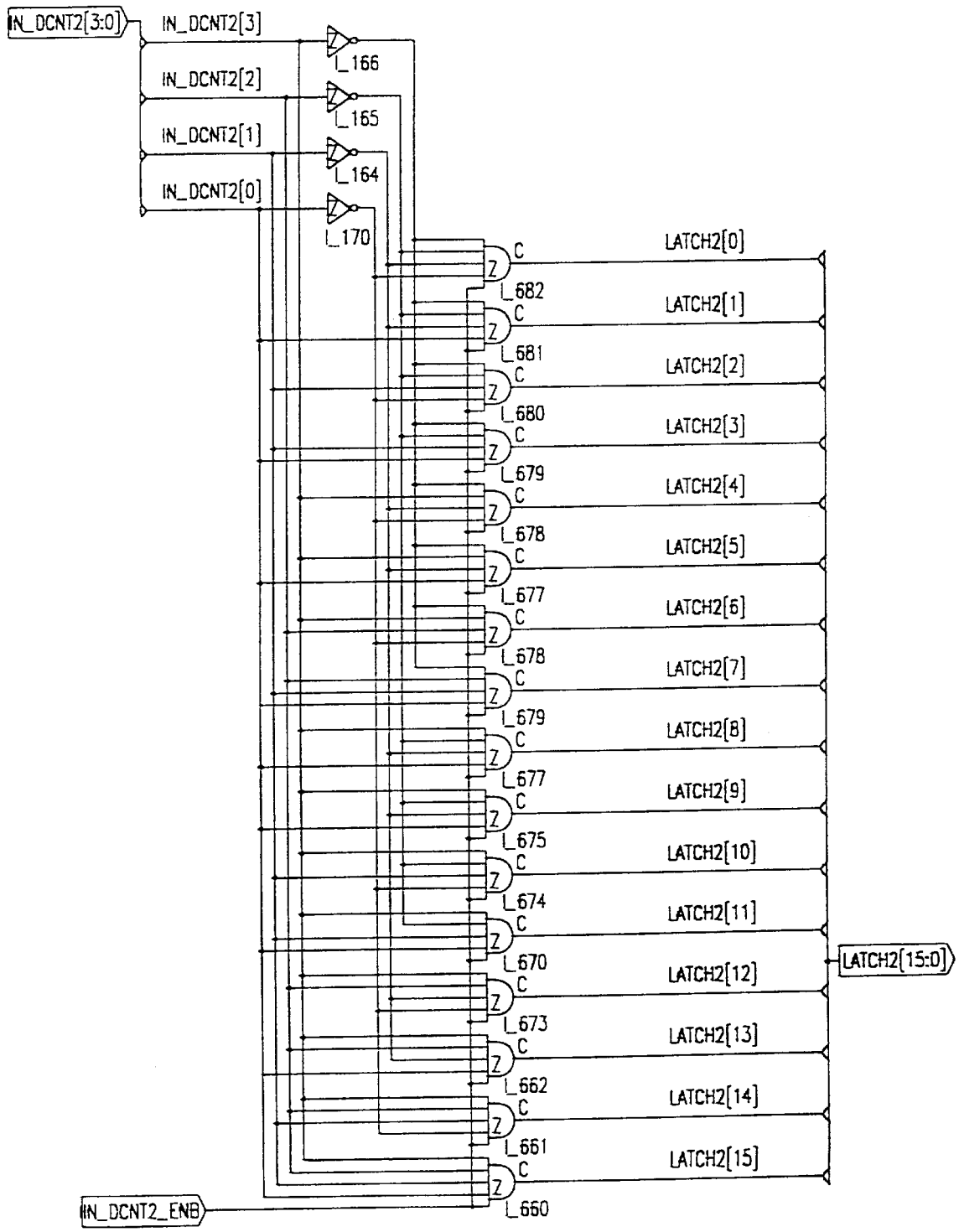

In the present invention, "Recovery" takes place when non-data enters T1. It is an opportunity for the T2 buffer to catch up to T1 and the datastream. Non-ata is a data type that bypasses the IDCT and is shown as a data spike in "Latch 2 [φ]" of FIG. 34. This eventually makes its way to T2 input, which allows the T2 buffering to fill up at the output. Recovery is shown in FIG. 33 and FIG. 25 when the "T2 dout" signal and the "out" signal are gapped by a number of cycles. The gap is used as a reference to fix the data stream.

It should be noted that the gap in cycles between these two signals is the same as the gap of buffering when the latch for T2 was waiting to insert its data.

Following the TRANSFORM in POSTC 233 part B. the interleaved stream is de-interleaved into "T2 out", as shown in FIGS. 18 and 23. The "T2 out" data stream has slip gaps in the data as described above. The T2 out [143: φ], shown in FIG. 17, enters a 16 to 1 multiplexor block, shown as block "IDDPMUX" in FIG. 17. This multiplexor block will select data from one of 16 positions in the output buffer block, as shown in FIG. 25. This position is selected by the control logic, shown in FIG. 29, which uses the gap by which T2 "buffered-up" at its input. This gap is used as a reference. The output stream, T2DOUT, from the multiplexer block is the "fixed" data stream.

In range tests carried out on an embodiment of the present invention for the IDCT arrangement described above, it was found that all intermediate and final values were kept well within a known range at each point while still meeting the CCITT standards. Because of this, it was possible to "adjust" selected values as described above by small amounts (for example, by forcing certain bits of selected data words to desired values) without any fear of overflow or underflow in the arithmetic calculations.

The method and system, in accordance with the present invention, can be varied in numerous ways. For example, the structures used to resolve additions or multiplications may be altered using any known technology. Thus, it is possible to use resolving adders of subtractors where the preferred embodiment uses carry-save devices with separate resolving adders. Also, the preferred embodiment of the present invention uses down-scaling at various points to ensure that all values remain within their acceptable ranges.

Down-scaling is not necessary, however, because other precautions may be taken to avoid overflow or underflow.

In one embodiment of the present invention, certain bits of various data words were manipulated to reduce the required word width within the system. However, the various intermediate values may, of course, be passed without bit manipulation. Furthermore, although only data words were bit-manipulated in the illustrated example of the present invention, it is also possible to manipulate the bits of constant coefficients as well and evaluate the results under the CCITT standard. If a comparison of the results showed that it would be advantageous to force a particular bit to a given value, in some cases, on might then be able to increase the number of "zeros" in the binary representation of these coefficients in order to decrease further the silicon area required to implement the corresponding multiplier. Once again, bit manipulation is not necessary.

In summary of the above aspects of the present invention, the following is disclosed: an apparatus for transforming data having a first latch defining a first data stream source and a second latch defining a second data stream source. The first and second latches are in communication with a single arithmetic unit. The arithmetic unit communicates data to a transpose RAM, the transpose RAM transposes the data and communicates it to the second latch. The second latch is adjustable and can be varied in size to accommodate variable rates of data being received and transmitted. The second latch and first latch communicate 1st and 2nd data stream to the arithmetic unit sequentially, however, the sequential communication of the second latch does not interrupt the communication from the first latch. In this manner, common arithmetic unit is used for a first and second data stream. Furthermore, a process for transforming data using a common arithmetic unit having the following steps is described.

First, loading the data into a first latch and, upon reaching a predefined number of cycles transmitting the data to an arithmetic unit and loading a first marker bit into a control shift register. Next, loading data into a second latch, the second latch is adjustable and can be varied in size to accommodate variable rate of data being received and transmitted at different rates. The next step is to transmit the data in the second latch to the arithmetic unit when the first control shift register reaches a predetermined state and the second latch is filled with a predetermined amount of data. Next, preventing transmission of data from the second latch, if the second latch is not filled with a predetermined amount of data and then recovering the second latch when the first latch is receiving non data.

DETAILED DESCRIPTION OF INVENTION FOR TIME SYNCHRONIZATION

In MPEG-2, video and audio data is synchronized using information carried in the MPEG-2 systems stream. In this regard, there are essentially two types of information that deal with synchronization; clock references and time stamps. Clock references are used to inform the decoder what number is used to represent the time "now". This is used to initialize a counter that is incremented at regular intervals so that the decoder always knows what the current time is.

Time stamps are carried in some of the streams of data that are used to make up the programme (typically video and audio). In the case of video, a time stamp is associated with a picture and tells the decoder at what "time" (defined by the counter that was initialized by the clock reference) a picture should be displayed.

In MPEG, multiplexed into the system stream are a series of clock references. These clock references define the "system time". There are two types of clock reference; Program Clock References (PCRs) and System Clock References (SCRs). In the present invention, the distinction between PCRs and SCRs is not relevant since each of the clock references are used in the same manner by the decoder. PCRs and SCRs have timing information to a resolution of 90 kHz with a further field extending the resolution to 27 MHz (or 1/27×10e6 in seconds). Clock references are included in the data stream fairly often in order that "system time" may be reinitialized after a random access or channel change.

Accordingly, it is important to appreciate that timestamps refer to a hypothetical model of a decoder that can decode pictures instantly. As will be appreciated by one of ordinary skill in the art, any real decoder cannot do this and must take steps to modify the theoretical time in which pictures should be displayed. Furthermore, time stamps and the clock references are used to determine display time and errors in display time. This modification depends upon the details of the architecture of the particular decoder. Clearly any delay introduced by the video decoder must be matched by an equivalent delay in the audio decoder.

When decoding MPEG, discontinuities in the concept of "system time" may occur. For instance in an edited bitstream, each edit point will have discontinuous time. A similar situation occurs at channel change. It will be appreciated that care must be taken when using time stamps, because using a time stamp that was encoded in one time regime with respect to a "system time" defined by a clock reference from another regime will clearly lead to incorrect results.

Figure 39:
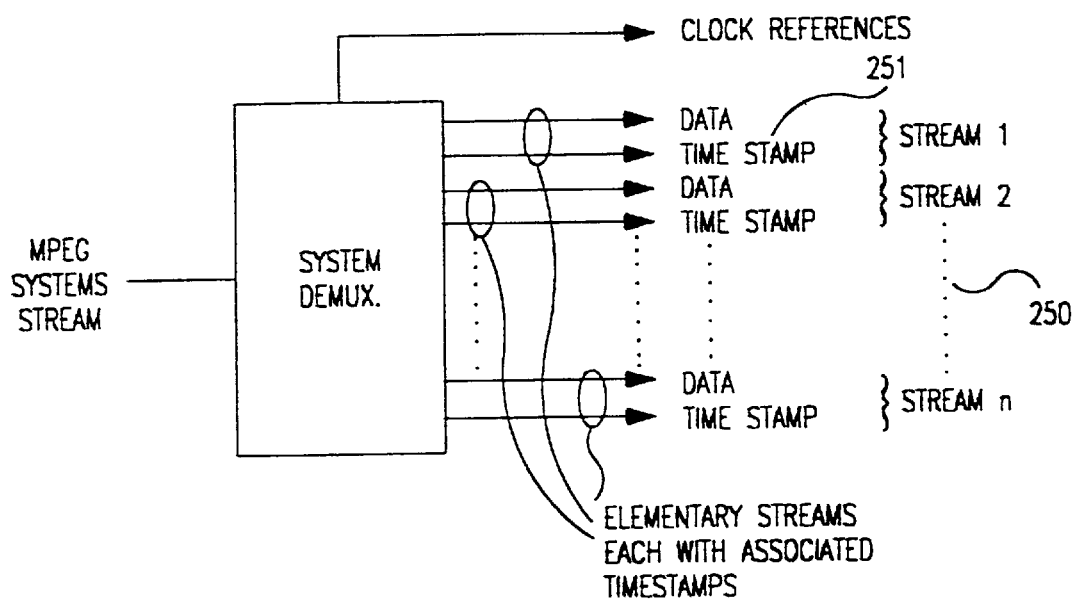
FIG. 39 shows MPEG information streams being demultiplexed, in accordance with the present invention, into elementary streams containing data and timestamp information.

FIG. 39 shows the demultiplexing of the MPEG systems stream into elementary streams 250. Each elementary stream will typically carries either video or audio data although, in general, any form of data may be transported. Each elementary stream is divided into a series of access units. In the case of video, the access unit is a picture. In the case of audio, it is a fixed number of samples of audio data.

Also multiplexed into the systems stream are a series of clock references. These clock references define the "system time".

In accordance with the present invention, associated with each elementary stream is a series of time stamps 251. The time stamps specify the "system time" at which the next access unit for the respective elementary stream is to be presented. These time stamps are referred to as presentation time stamps, "PTS".

In the case of video data, a second type of time stamp is also defined is referred to as a decode time stamp, "DTS". Since the DTS is only present when a PTS is also present and there is a simple relationship between them, the detailed differences between these two types of timestamps can be ignored since PTS/DTS differences have no bearing on the present invention.

The decode time stamps (DTS) define the time at which an access unit (picture in the case of video) is to be decoded. The presentation time stamps (PTS) define the time at which an access unit is to be presented (displayed). However, the timing model used is a hypothetical model in which the decoder is infinitely fast. In this case, the DTS and PTS would be identical to one another.

However, in MPEG video decoding, some of the pictures are reordered. Therefore, after decoding, the pictures are held in storage for a time period, e.g., several frame times, before they are displayed. During this time period, other pictures that are decoded subsequent to the picture in question are displayed. Consequently, for these reordered pictures there is a difference between the DTS and PTS.

In accordance with the present invention, it will be appreciated that to properly synchronize time, it is necessary to be consistent in the use of time stamps. In one preferred embodiment, the time synchronizing circuitry is placed at a point in the decoding pipeline when the pictures occur in their decoded order. Accordingly, this embodiment uses the DTS.

Nevertheless, the circuitry could equally be moved to a point in the decoding pipeline that occurs after the pictures are reordered and, therefore, the pictures would reach the synchronizing circuitry in their display order. Hence, as will be appreciated by one of ordinary skill in the art, PTS would be used in this embodiment.

In the preferred embodiments of the present invention, the information derived from the timestamps is transported through the various circuits by means of tokens. Tokens consist of a series of one or more words of information. The first word of the token contains a code which identifies the type of token and, hence, the type of information carried by that token. Associated with each word of the token is an extension bit which is set to one to indicate that there are more words in the current token. Therefore, the last word of a token is indicated by the extension bit being zero. In the present invention, the code in the first word indicating the type of token may be of a variable number of bits so that some codes use a small number of bits (allowing the remainder of the bits in the first word to be used to represent other information) while other codes use a larger number of bits.

Tokens may be characterized as being either control or DATA tokens. For example, at the interface between the system decoder and the video decoder, there are two types of information: (1) the coded video data and (2) the synchronization time derived from the time stamp information. The coded video data is viewed as data and is carried in a DATA token (e.g., the token called DATA) while the synchronization time is viewed as control information and is carried in a control token (called SYNC_TIME). Additional control tokens may also be used from time to time in the present invention. For example, a FLUSH token that behaves in a manner similar to a reset signal may be required to initialize the video decoding circuitry before attempting to restart decoding because of an error.

In accordance with the present invention, it is an object of one preferred embodiment to time synchronize two circuits and, more particularly, to time synchronize two circuits without directly communicating system time from the first to the second circuit. In accordance with the invention, time synchronization of two circuits is accomplished without passing system time directly to the second circuit by providing synchronized time counters in each circuit.

The present invention also enables the system to time synchronize two circuits without communicating system time from the first to the second circuit by providing an elementary stream time counter in each circuit.

Accordingly, another object of the present invention is to time synchronize two circuits and to determine the presentation time error, if any, of the object being presented by using time stamp information, system time, and elementary stream time from the first circuit to generate synchronization time passed to the second circuit and compared to a copy of elementary stream time in the second circuit which is synchronized with the elementary stream time in the first circuit. The system of the present invention can time synchronize a system decoder and a video decoder without directly communicating system time from the system decoder to the video decoder, without passing system time directly to the video decoder by providing synchronized time counters in each circuit and without communicating system time from the system decoder to the video decoder by providing a video counter in each circuit.

The invention also enables the system to time synchronize a system decoder and a video decoder and to determine the display time error, if any, of the picture being displayed by using video time stamp information, system time, and video decoding time from the system decoder to generate synchronization time which is then passed to the video decoder and compared to a copy of video decoding time in the video decoder which is synchronized with the video decoding time in the system decoder.

In accordance with the present invention, information derived from the timestamps can be transported through the system using a control token as previously described.

Figure 40:
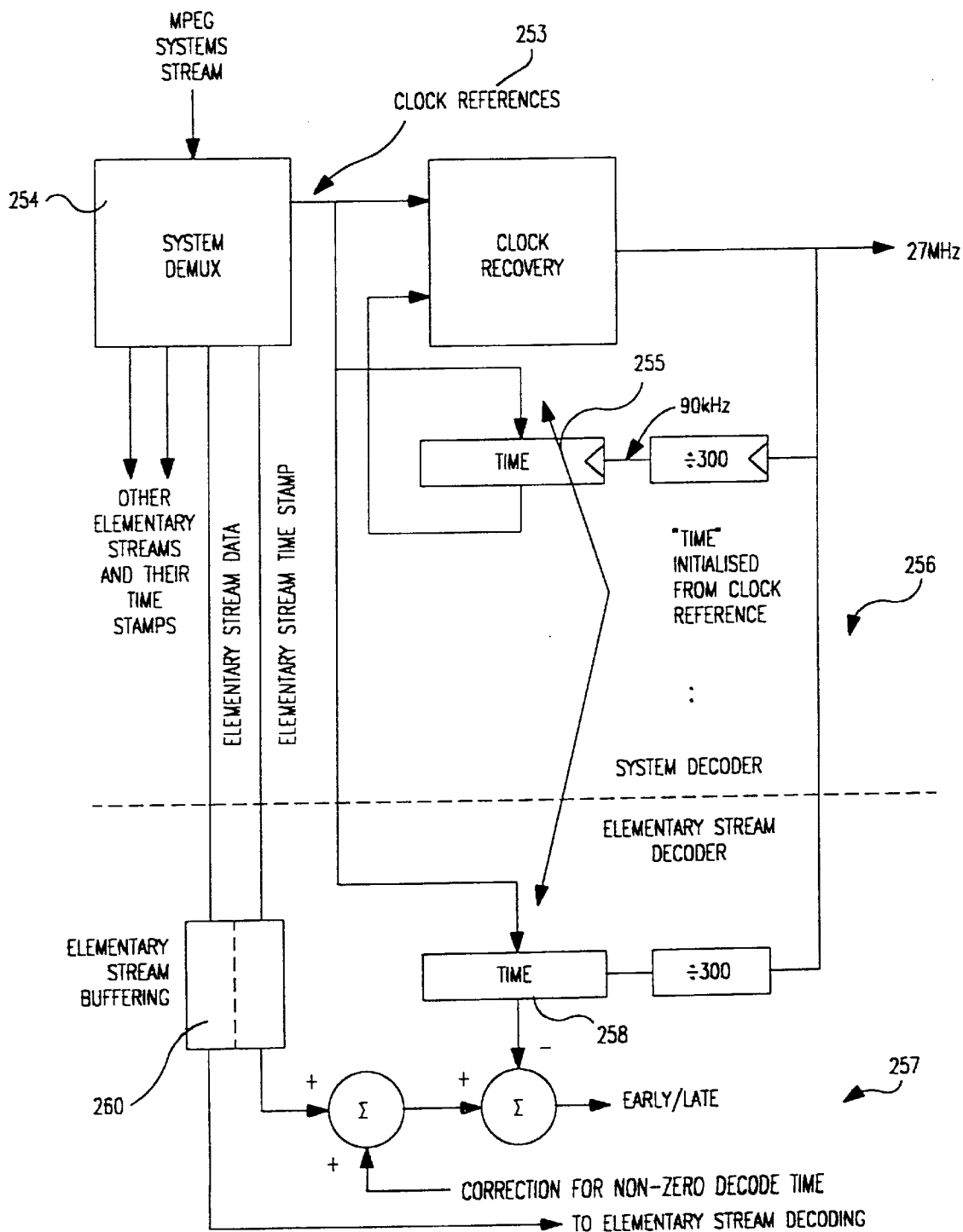
FIG. 40 depicts a first embodiment of an elementary stream timestamp error determination and time synchronization system, in accordance with the present invention.

FIG. 40 shows a first preferred embodiment implementing elementary stream timestamp management, in accordance with the present invention. The clock references 253, which represent system time, are decoded by the system demultiplexer 254 and placed initially, and then as needed, into a time counter 255 within the system decoder 256, and are incremented at 90 kHz. A second copy of the clock reference 253 is simultaneously loaded into the time counter 258 that is inside the elementary stream decoder 257, incremented also at 90 kHz, and synchronized to the time counter 255 in the system decoder 256.

The time stamps 251, in accordance with the present invention, flow from the system demux 254 through the elementary stream buffer 260 so that they are delayed by the same amount as the incoming data. The time stamps 251 may also have a correction added to compensate for the non-zero decode time of the elementary stream decoder 257. The corrected time stamps 251 are then compared with the copy of the time stored in the time counter 258 inside the elementary stream decoder 257 to determine whether the decoded information is presented too early or too late.

The above embodiment is better than merely passing system time directly to the elementary stream decoder 257 from the time counter 255 in the system decoder 256 because the counter in the system decoder changes 90,000 times a second. Therefore, system time would, in all essence, need to be continually passed to the elementary stream decoder 257. Passing system time continually would require dedicated pins or the like. By using a time counter 255 located in the system decoder 256 and a time counter 258 located in the elementary stream decoder 257, system time can be passed in the form of clock references 253 a few times a second.

Figure 41:
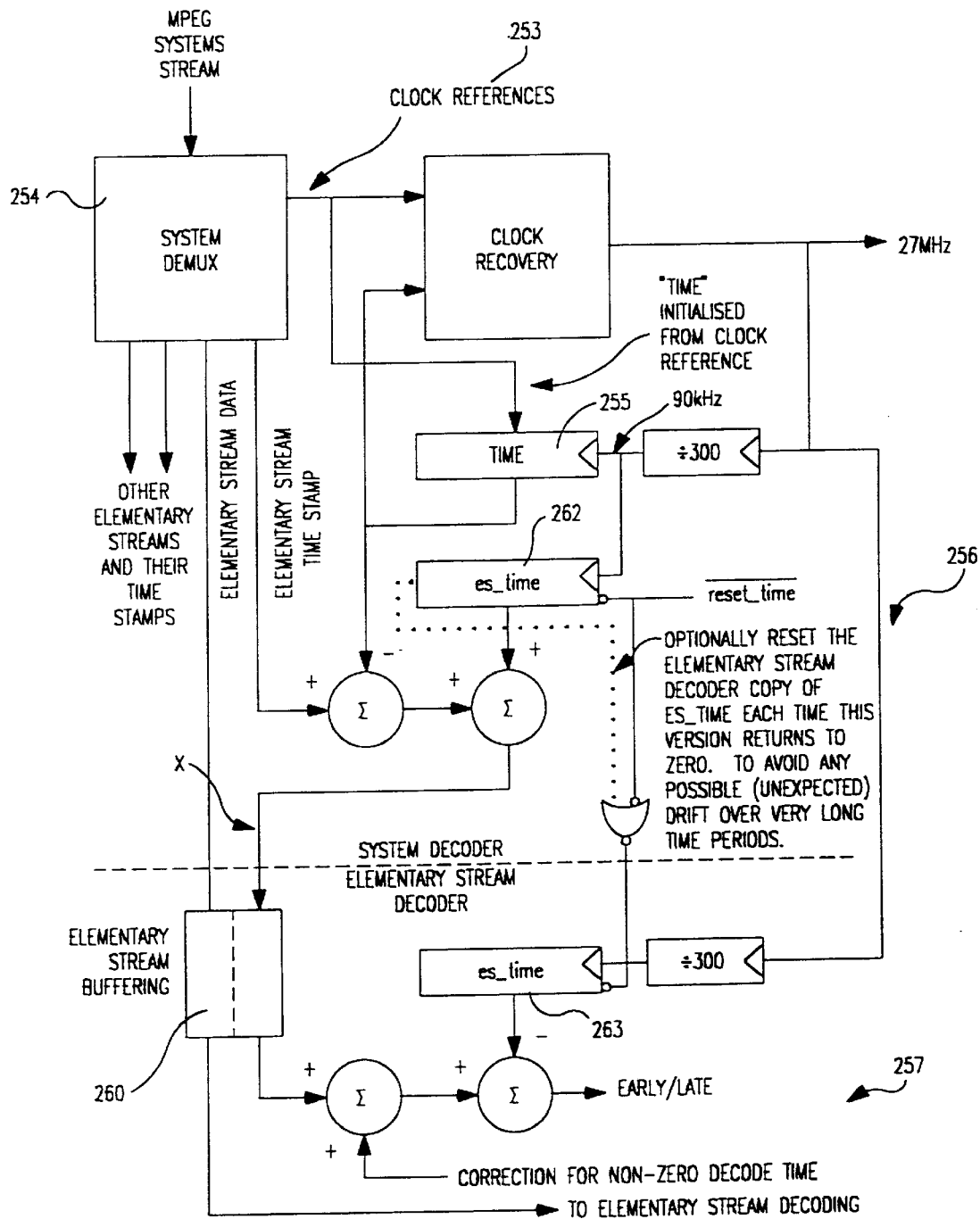
FIG. 41 illustrates a second embodiment of an elementary stream timestamp error determination and time synchronization system, in accordance with the present invention.

Another embodiment is shown in FIG. 41. The embodiment shown in FIG. 41 avoids the need for the clock references 253 to be passed to the elementary stream decoder 257. This is achieved by using a second counter "es_time" 262, containing information on elementary stream time, which is maintained in both the system decoder 256 and the elementary stream decoder 257. The two es_time counters 262 and 263 are reset at power on, and at other times such as channel change, and then they free run from there on. Since this embodiment depends on the two es_time counters 262 and 263 staying in step, it will be appreciated that it is necessary to take measures to ensure the es_time counters do not get out of step. One way to ensure the es_time counters 262 and 263 stay in step is to use carry out of the es_time counter in the system decoder to reset the es_time counter in the elementary stream decoder 257 as shown in FIG. 41.

As further shown in FIG. 41, the clock references 253, which represent system time, are decoded by the system demultiplexer 254 and placed into a time counter 255 within the system decoder 256 and incremented at 90 kHz. The es_time counter 262 in the system decoder 256 of the present invention and the es_time counter 263 in the elementary stream decoder 257 of the present invention are synchronized with each other and incremented at 90 kHz. Elementary stream time stamps are also decoded by the system demultiplexer 254. Accordingly, a synchronization value X is computed using the elementary stream timestamp, the system time contained in the time counter and the elementary stream time contained in the es_time counter 262 contained in the system decoder 256 according to the equations 3-1. The following set of equations 3-1 (a–d) is illustrative of one method in accordance with the present invention, for time synchronization which avoids passing the clock references 253 to the elementary stream decoder 257. Equation 3-1 (a) is the equation required for time synchronization. Since it is undesirable to pass system time directly to the elementary stream decoder circuit 257, as shown in FIG. 41, a synchronization time representation X is generated, using Equation 3-1 (b–d), by the system decoder 256 and this value is passed to the elementary stream decoder. Synchronization time X is then compared to the elementary stream time contained within the es_time counter 263 located within the elementary stream decoder 257. Hence, the compared result is used to determine whether the decoded information is presented too early or too late and then is further used in time synchronizing the system.

Equations 3-1:
 a) Time Synchronization=(Elementary stream timestamp−system time)
 b) Time Synchronization=(X−elementary stream time)
 c) (X−elementary stream time)=(elementary stream timestamp−system time)
 d) X=(elementary stream timestamp−system time+elementary stream time)

In the present invention, the synchronization time, X, may have a correction added to compensate for the non-zero decode time of the elementary stream decoder 257. The corrected synchronization time is then compared with the elementary stream time contained in the es_time counter 263 located inside the elementary stream decoder 257 to determine whether the decoded information is presented too early or too late and is further used to time synchronize the system. Note, the time correction could be subtracted from elementary stream time contained in the es_time counter 263 located inside the elementary stream decoder 257 instead of added to synchronization time X for the same result. The above embodiment is an example of a solution for generating synchronization time X and determining whether the information is presented early or late. It will be apparent to those skilled in the art that there are many other equivalent solutions for accomplishing the above.

Figure 42:
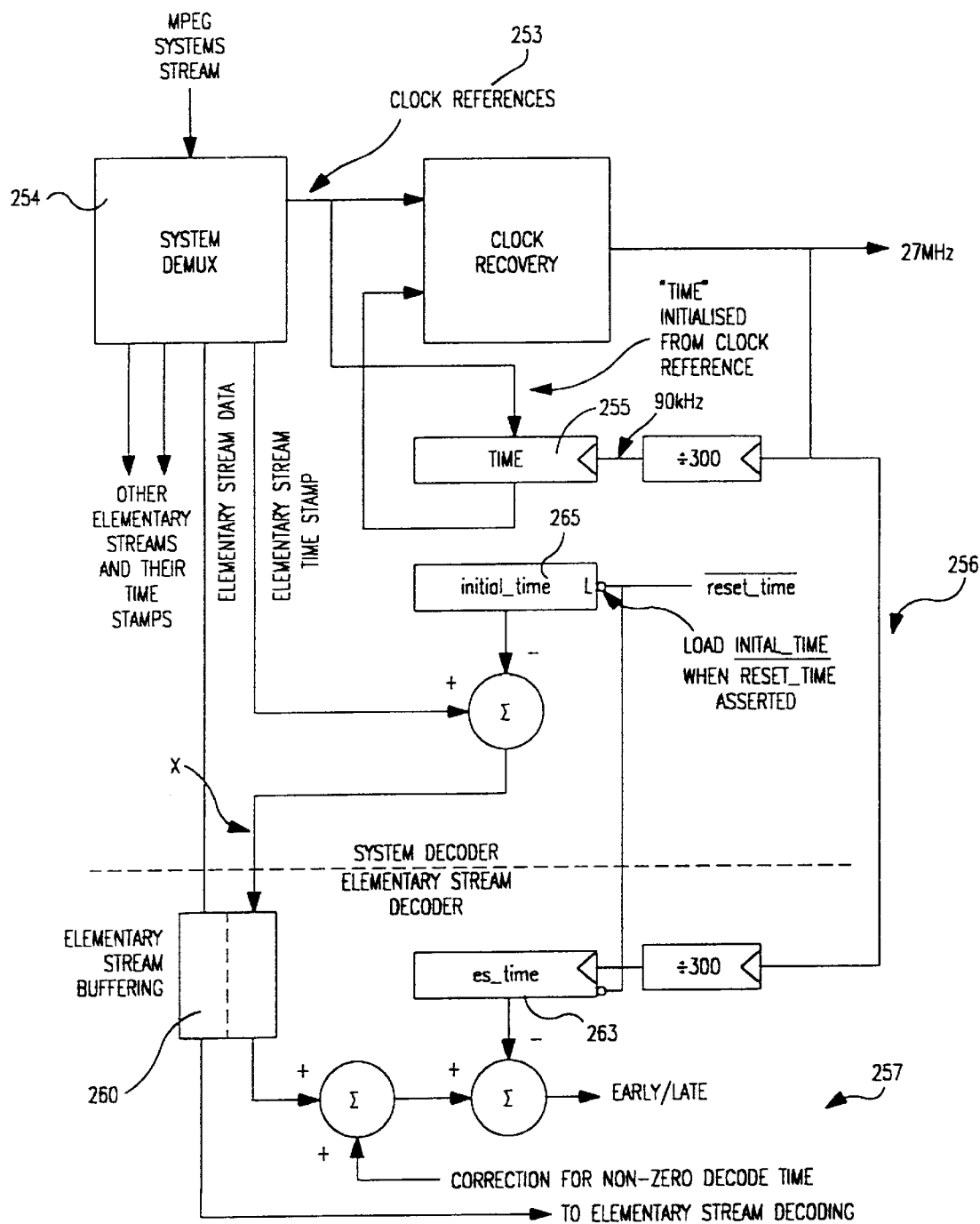
FIG. 42 shows a third embodiment of an elementary stream timestamp error determination and time synchronization system, in accordance with the present invention.

For example, FIG. 42 shows an alternative method for determining the synchronization time, X, in accordance with the present invention. In this arrangement, the system decoder 256 does not maintain an elementary stream time. Instead it records, in the register initial_time 265, the value of system time at the instant that the elementary stream time counter, es_time 263, located in the elementary stream decoder 257 is reset to zero. The value in es_time 263 can be computed by the system decoder 256 because it will be the difference between the current system time and the value recorded in initial_time.

The following equations 3-2 (a–c) is illustrative of this alternative method for time synchronization. Equation 3-2 (a) is the equation representing the value of the elementary stream time stored in es_time 263 located in the elementary stream decoder 257. This is substituted into equation 3-1 (d) to give equation 3-2 (b) which is simplified to derive equation 3-2 (c) providing the synchronization time, X, as a function of the system time and the value stored in the initial-time register 265.

Equations 3-2:
 a) elementary stream time=system time−initial_time
 b) X=(elementary stream timestamp−system time+[system time−initial_time])
 c) X=(elementary stream timestamp−initial_time)

Two solutions for deriving the synchronization time, X, in accordance with the present invention have been illustrated. However, it will be apparent to those skilled in the art that there are many other equivalent solutions.

Figure 43:
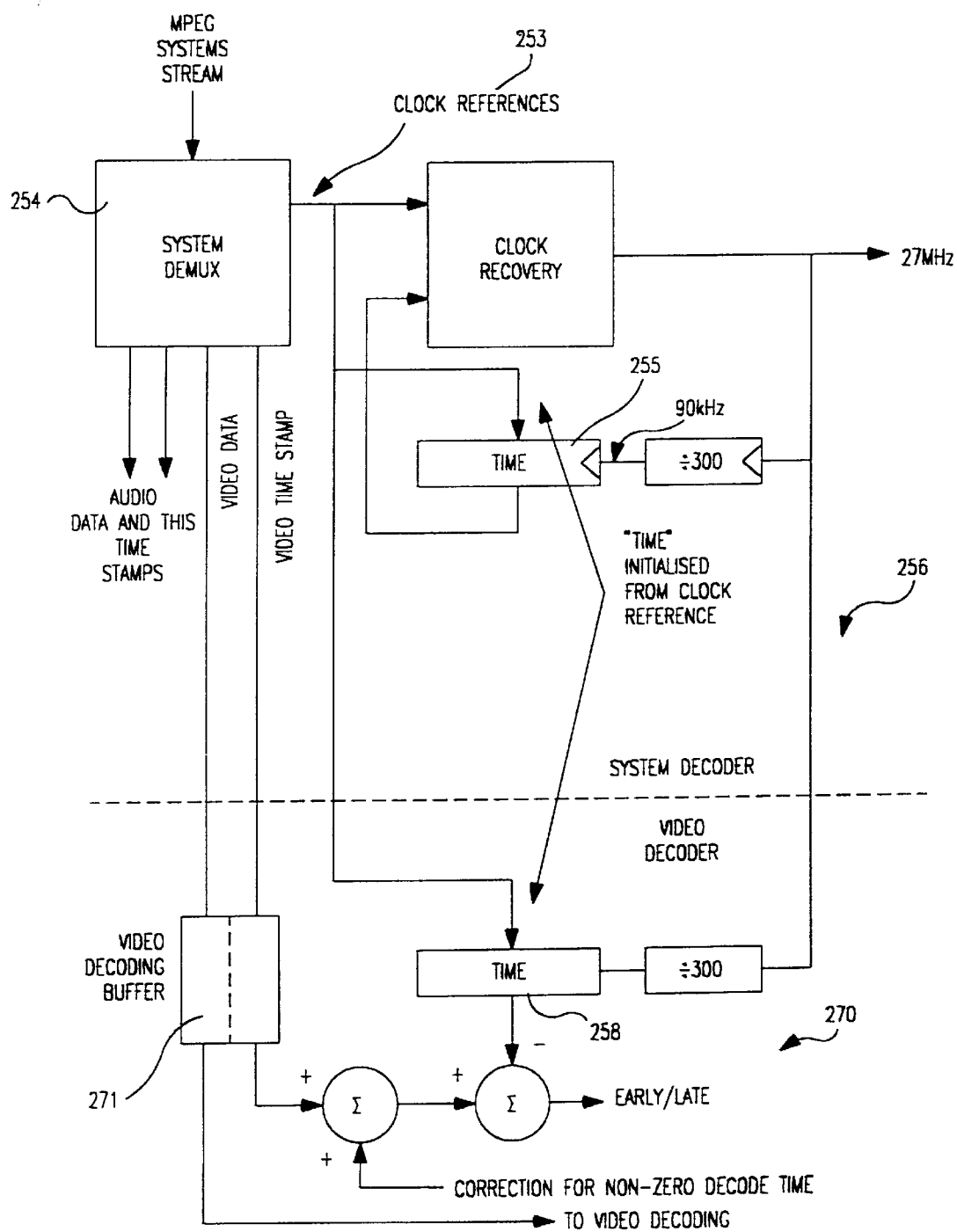
FIG. 43 depicts a first embodiment of a video timestamp error determination and time synchronization system, in accordance with the present invention.

FIG. 43 shows another embodiment of the present invention implementing video timestamp management. The clock references 253, which represent system time, are decoded by the system demultiplexer 254 and placed initially, and then as needed, into a time counter 255 within the system decoder 256 and are incremented at 90 kHz. A second copy of the clock references 253 are simultaneously loaded into the time counter 258 that is inside the video decoder 270 and incremented at 90 kHz, and synchronized to the time counter 255 in the system decoder 256.

The video time stamps flow from the system demux 254 through the video decoding buffer 271 so that they are delayed by the same amount as the incoming video data. The video time stamps may have a correction added to compensate for the non-zero decode time of the video decoder 270. The corrected video time stamps are than compared with the copy of the time in the time counter 258 inside the video decoder 270 to determine whether the decoded picture is displayed too early or too late.

The embodiment shown in FIG. 43 is an improvement over the process of merely passing system time directly to the video decoder from the time counter in the system decoder because the counter in the system decoder changes 90,000 times a second. Therefore, system time would in all essence need to be continually passed to the video decoder. Passing system time continually would require dedicated pins or the like. By using a time counter located in the system decoder and a time counter located in the video decoder system time can be passed in the form of clock references a few times a second.

Figure 44:
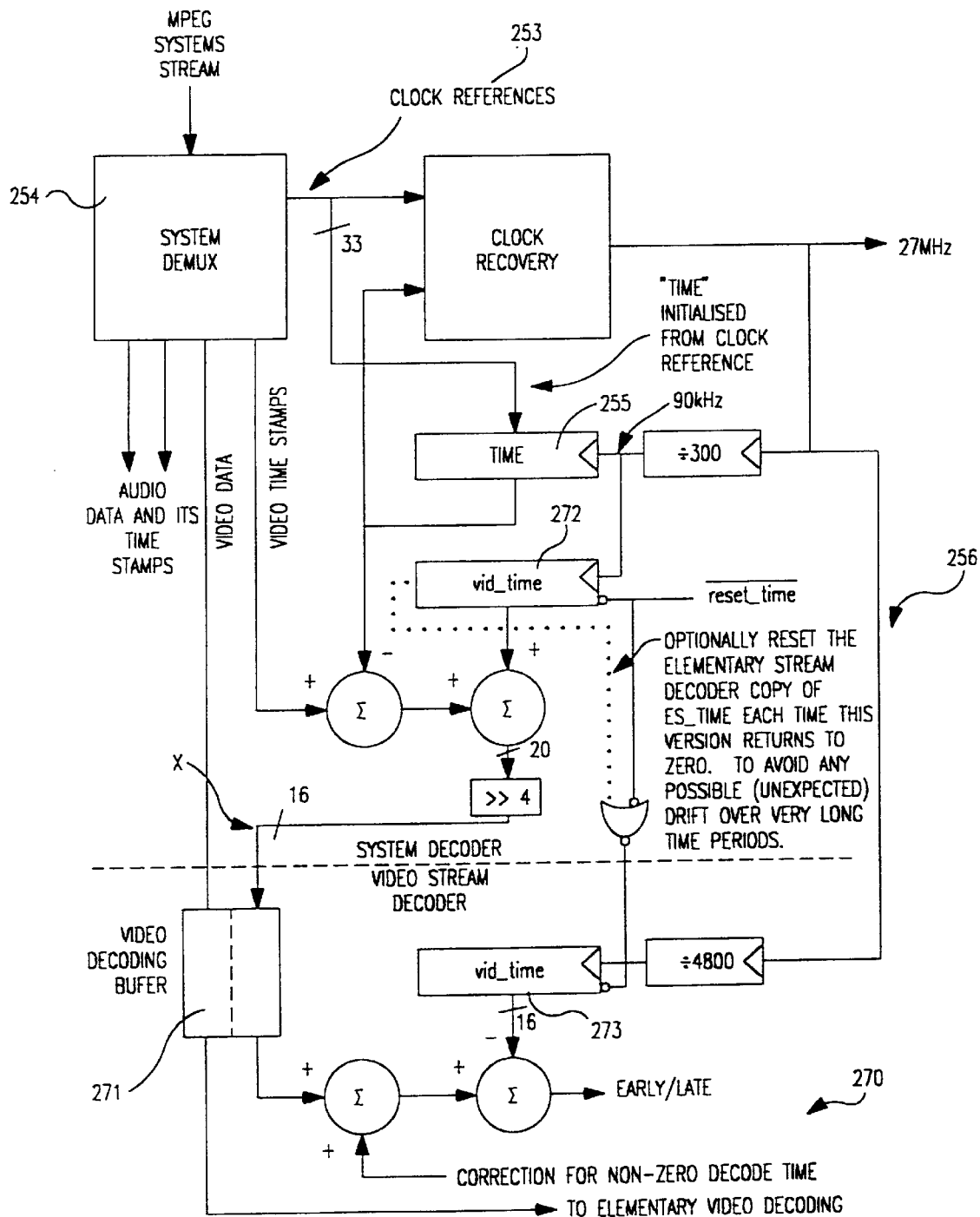
FIG. 44 illustrates a second embodiment of a video timestamp error determination and time synchronization system, in accordance with the present invention.

Referring now to FIG. 44, the clock references, which represent system time, are decoded by the system demultiplexer 254 and placed into a time counter 255 within the system decoder 256 and incremented at 90 kHz. The vid_time counter 272 in the system decoder 256 and the vid_time counter 273 in the video decoder 270 are synchronized with each other and incremented at 90 kHz. Video time stamps are also decoded by the system demultiplexer 254. Accordingly, a synchronization value X is computed using a video timestamp, the system time contained in the time counter 273 and the video decoding time contained in the vid_time counter 272 contained in the system decoder 256 according to the equations 3-3.

The following set of equations 3-3 (a–d) is illustrative of one method in accordance with the present invention, for time synchronization which avoids passing the clock reference 253 to the video decoder 270. Equation 3-3(a) is the equation required for time synchronization. Since it is undesirable to pass system time directly to the video decoder circuit 270 as shown in FIG. 44, a synchronization time representation X is generated, using Equation 3-3 (b–d), by the system decoder 256 and passed to the video decoder 270. Synchronization time, X, is then compared to the video decoding time contained within the vid_time counter 273 located within the video decoder 270. The compared result is used to determine whether the decoded picture is displayed too early or too late and then further used in time synchronizing the system.

Equations 3-3:
 a) Time Synchronization=(Video timestamp−system time)
 b) Time Synchronization=(X−video decoding time)
 c) (X−video decoding time)=(video timestamp−system time)
 d) X=(video timestamp−system time+video decoding time)

In the present invention, the synchronization time, X, may have a correction added to compensate for the non-zero decode time of the video decoder. The corrected synchronization time is then compared with the video decoding time contained in the vid_time counter 273 located inside the video decoder 270 to determine whether the decoded picture is displayed too early or too late and is also used to time synchronize the system. Note, the time correction can be subtracted from the video decoding time contained in the vid_time counter 273 located inside the video decoder 270 instead of added to synchronization time X for the same result. The above embodiment of the present invention is another example of a solution for generating synchronization time X and determining whether the picture is displayed early or late. However, it will be apparent to those skilled in the art that there are many other equivalent solutions for accomplishing the above.

Another nice feature, in accordance with the present invention, is that there is no need to deal with the full 33 bit time stamp number or 42 bit clock reference number. The present invention restricts the counters to 16 bits to allow 16 bit handling on the video decoder 270. At first glance, it would appear that 16 bits cannot represent a sufficient number range at a resolution of 90 kHz (only ⅔ second to be used). However, there is no need for such high precision because the time control on the video decoder 270 is only accurate to a field time (since the video timing generator VTG free-runs or is gen-locked to something that has nothing to do with the MPEG stream being decoded) and, therefore, it is not related to timestamps or presentation time in any way.

Figure 45:
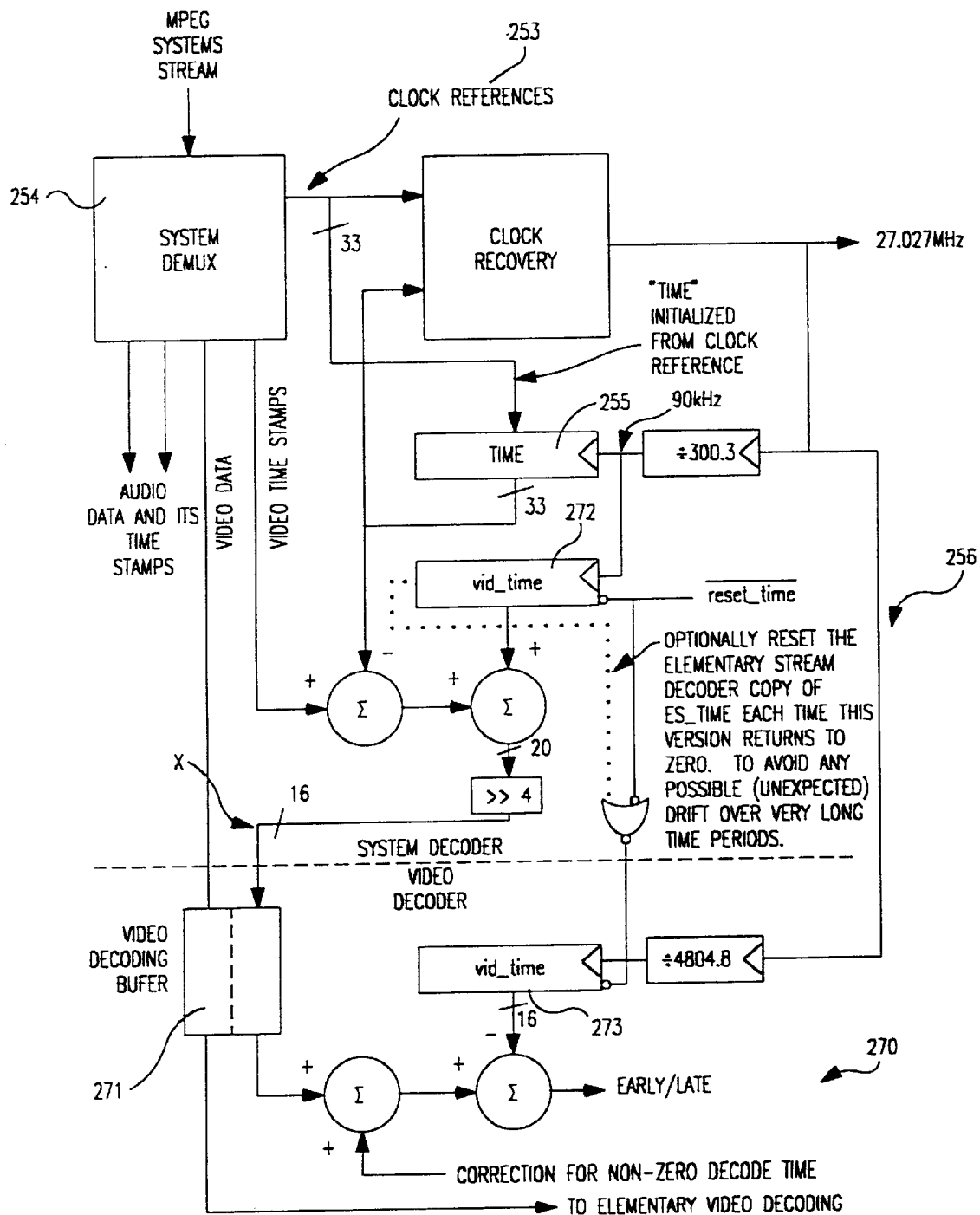
FIG. 45 shows the second embodiment of a video timestamp error determination and time synchronization system as shown in FIG. 44 and operating at 30 Hz.

As shown in FIG. 44 and FIG. 45, the synchronization time X and the vid_time counter 273 within the video decoder 270 use only sixteen bits. This is made possible by two factors. First, the difference between system time and the timestamp (used to derive the synchronization time; see Equation 3-3) should always be small, thus allowing the more significant bits to be discarded. Second, it is only possible to control the presentation of video to the nearest frametime. Therefore, the less significant bits are not required and are discarded by shifting right by four bits.

Thus, the sixteen bits of time information used in the present invention are able to deal with timing errors of up to about 11.5 seconds with an accuracy of about 180 µs (about 1% of a field time). A PAL or SECAM European 625 line TV system is, thus, 112.5 ticks of the 5625 Hz clock; a NTSC 525 line TV system is 93.84 ticks. Hence, using 16 bits allows timing calculations with an accuracy of about 1% of a field time.

Figure 46:
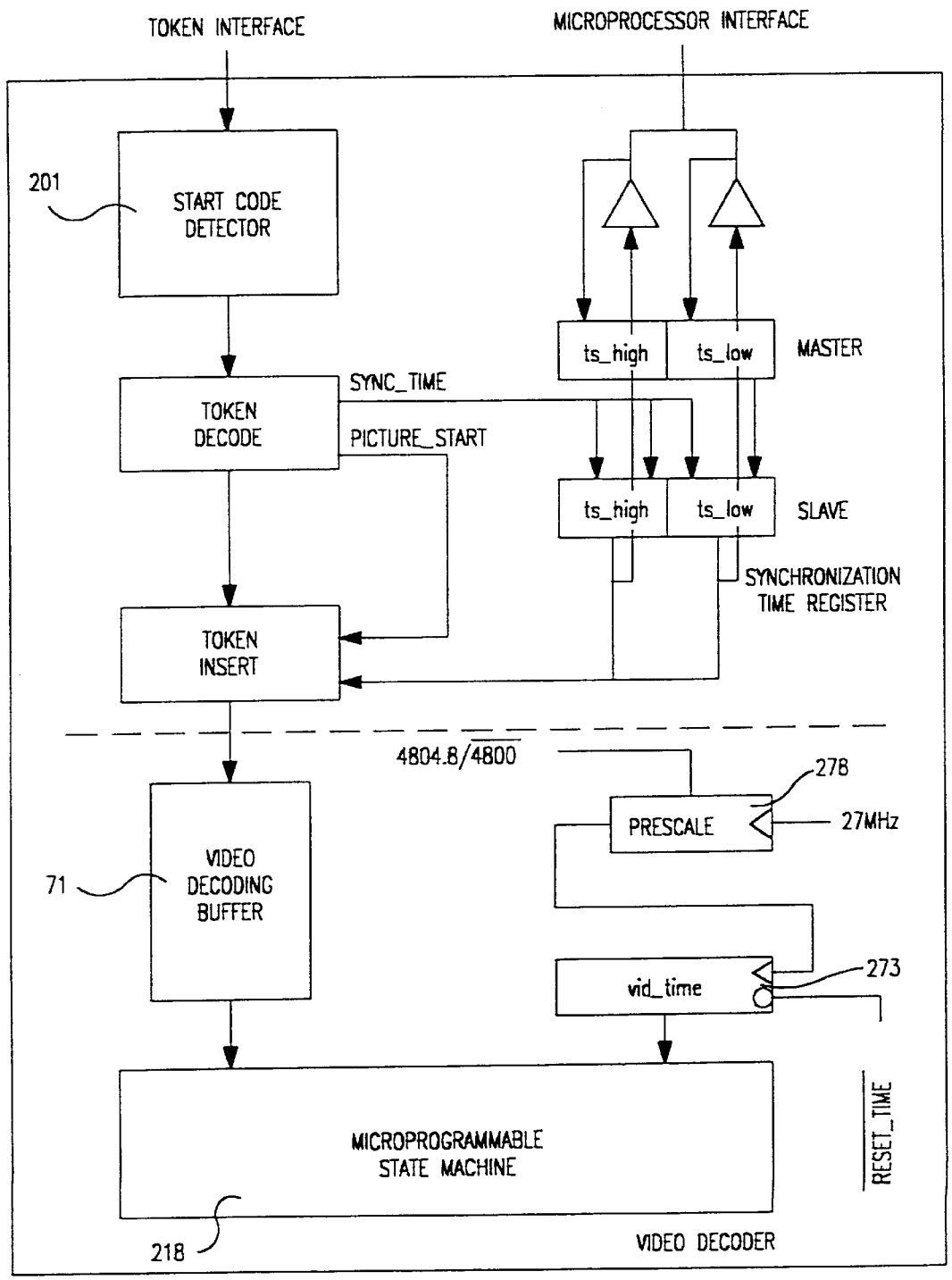
FIG. 46 shows timestamp information flow through the system of the present invention.

FIG. 46 shows the preferred process, in accordance with the present invention, of the moving the time stamp through the hardware. The preferred method for communicating information in this hardware is Tokens, but it will be appreciated that alternative methods may also be employed. The hardware is divided into two modules. The first module is added just after the Start Code Detector 201. This module is responsible for generating a token, SYNC_TIME containing the synchronization time X, as discussed above, and this occurs just before an associated PICTURE_START token. In the MPEG systems stream, the time stamp is carried in a packet header and refers to the first picture in the packet of data. Since the packets do not line up with the video data, there will, in general, be the end of the previous picture before the start of the picture to which the time stamp refers.

The synchronization time information may be supplied to the present invention either via a microprocessor interface or by using a Token. In either case, the synchronization time date (16 bits) is stored in the synchronization time register (divided into two parts to allow access to each byte individually), as further detailed in Table 12.

TABLE 12

Microprocessor registers for handling synchronization time

| Register Name | Size/Dir | Reset State | Description |
| --- | --- | --- | --- |
| ts_low | 8/rw | — | The lower eight bits of the synchronization time value. The ts_low register is slaved so that new values may be written into this register without affecting the value previously written (that will become part of a SYNC_TIME token). Writes to ts_low register affect the master register whilst reads read-back the slave register. Until a master-to-slave transfer has been effected using ts_valid the value written into ts_low cannot be read back. |
| ts_high | 8/rw | — | The upper eight bits of the synchronization time value. Slaved in the same way as ts_low. |
| ts_valid | 1/rw | 0 | This bit controls the master-slave transfer of ts_low and ts_high. When values have been written into ts_low and ts_high the microprocessor should write the value one into this bit. It should then poll the bit unit it reads back the value one. At this point the values written into ts_low and ts_high will have been transferred into the slave registers (and can be read back) and ts_waiting will be set to one. The microprocessor should then write the value zero in preparation for the next access. |
| ts_waiting | 1/ro | 0 | When set to zero the registers ts_low and ts_high do not contain valid synchronization time information. When set to one the registers ts_low and ts_high contain valid synchronization time information. A SYNC_TIME token will be generated before the next PICTURE_START token and ts_waiting will then become zero. This bit should be polled to ensure that it is zero before writing a one into ts_valid to ensure that the previous synchronization time value has been used before it is overwritten by the master-to-slave transfer. |

In the present invention, a flag, ts_waiting, is set to indicate the fact that valid synchronization time information is in the timestamp register. If the data was supplied using the SYNC_TIME token, then that token is removed from the stream of tokens.

When a PICTURE_START token is encountered, the flag that indicates the status of the synchronization time register is examined. If the flag is not set, then no action is taken and the PICTURE_START token and all subsequent data is unaffected. If, however, the flag is set, indicating that valid synchronization time information is available in the register, then a SYNC_TIME token is generated and placed in the data stream before the PICTURE_START token. The flag is then cleared and the synchronization time register is made available for the next time-stamp that occurs.

The second module as shown in FIG. 46, consists of a prescaler clocked at 27 MHz and a vid_time counter clocked by the prescaler 278 which are associated with the microprogrammable state machine, (MSM) 218.

There is a prescaler 278 that divides the clock by 4800, as shown in FIG. 44 and FIG. 46. In other words, 4800 is 300 (27 MHz / 90 kHz) times 16. The 4804.8 option shown in FIG. 45 and FIG. 46 is discussed below.

In the NTSC color television, the frame rate is not 30 Hz but is, in fact, approximately 29.94 Hz (precisely 30000/1001 Hz). [Before the advent of color television 30 Hz precisely was used.] There are precisely 1716, 27 MHz clock periods per NTSC line time (line time is 1/525 of frame time).

The American television standards body has expressed an interest in returning to 30 Hz in the future (or more probably 60 Hz for HDTV). As a result MPEG supports a frame rate of 30 Hz precisely. However, since it is not possible to generate a stable 30 Hz television signal from a 27 MHz clock (there being 1714.29 . . .cycles per line) it is difficult to generate a 30 Hz raster in the MPEG framework.

One possible solution is to "bend" the clock rate at the decoder so that instead of producing a 27 MHz clock, a 27.027 MHz clock is generated. This clock is generated using the MPEG clock references with a divider of 300.3 (rather than 300) to yield the 90 kHz clock. This 27.027 MHz clock when clocking the identical video timing circuitry that provides a 29.94 Hz frame rate from 27 MHz will give a precise 30 Hz rate.

In the framework of the present invention, the 90 kHz is prescaled by a further factor of 16. Accordingly, division of the 27.027 MHz clock by 300.3×16=4804.8.

The Vid_time counter 273 (discussed above) contains the video decoding time and is incremented each time that the prescaler reaches its terminal count. The vid_time counter 273 is reset by the reset-time pin.

The prescaler and vid_time counter of the present invention can be implemented with fully clocked feed-back flip-flops which are much more resistant to α-particle corruption than the resistive-feedback or weak-feedback latches used elsewhere. Using clocked feedback flip-flops for time counters will help ensure that the time counter in the video decoder stays in step with the time counter in the system decoder.

Figure 47:
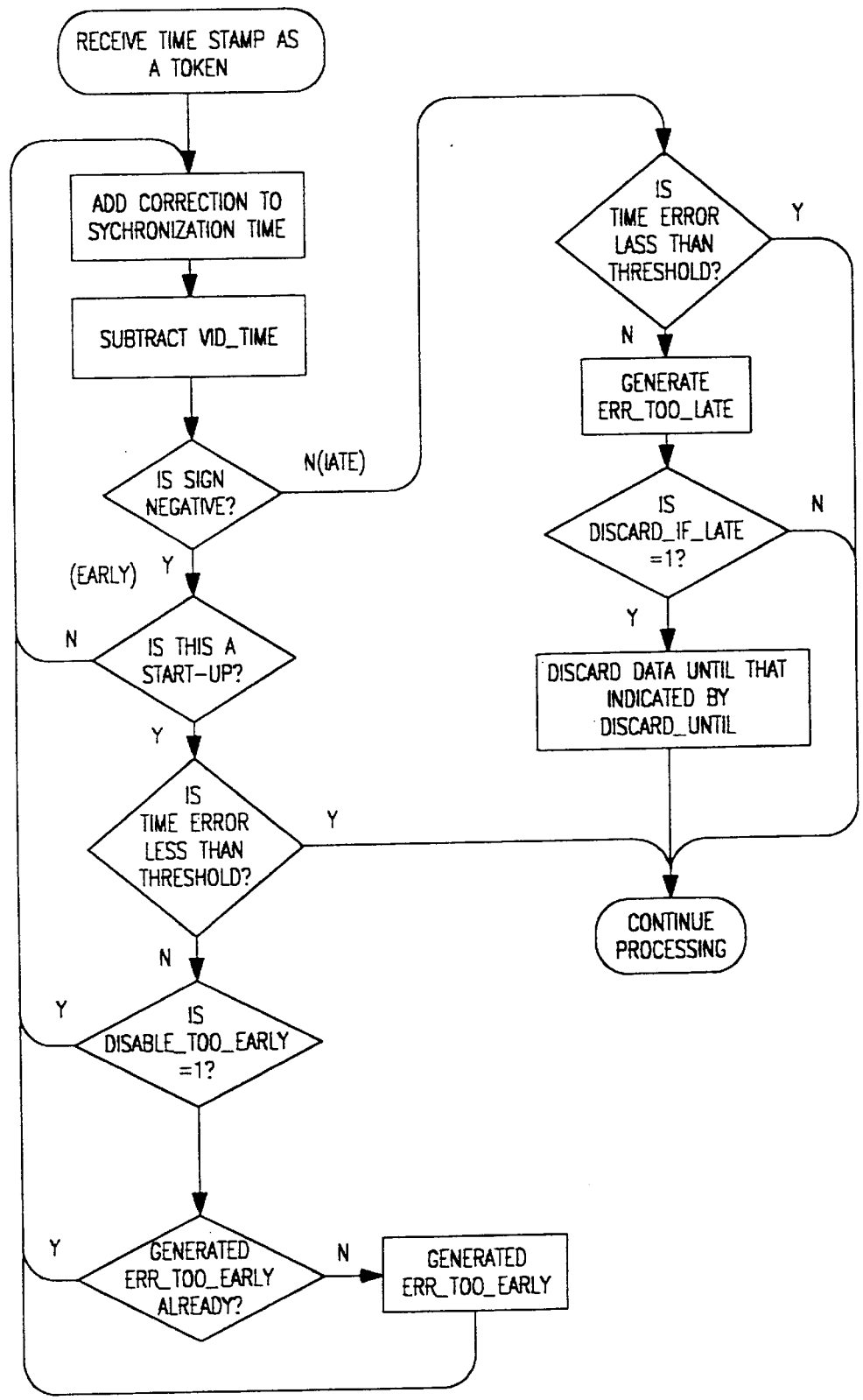
FIG. 47 is a block diagram illustrating synchronization time information being processed by a microprogrammable state machine.

FIG. 47 illustrates the process the MSM 218 performs when it receives the SYNC_TIME token. The MSM 218 is able to read the current time indicated by the video time counter and to then compare it with the value supplied by the video SYNC_TIME token. It can, therefore, determine whether it is early or late, as compared to the time at which it should be decoding the pictures.

In the present invention, a 16 bit signed timestamp correction is added to the synchronization time X (discussed above) that was carried by the video SYNC_TIME token. This correction is reset to zero by the MSM 218 at chip-reset, and if no action is taken, the synchronization time remains be unaltered. The controlling microprocessor can always write value into ts_correction to modify the synchronization time and, therefore, compensate for differential delays through the video and audio decoders.

The current video decoding time contained in the vid_time counter 273 is subtracted from the corrected synchronization time. The sign of value gives the direction of the error (and determines the error code, if any, generated by the MSM 218 ). The absolute value of the difference is then taken and the result is compared to a threshold value to determine whether the timing error is within acceptable limits. Since, at present, the video timing can only be controlled to an accuracy of plus or minus a frame time from the nominal time (because the VTG 333 free-runs) this threshold is set at one frame time.

If the error exceeds a frame-time, then some correction must be made. The MSM 218 of the present invention can correct the situation itself if the decoding is too early since the MSM can simply delay the decoding until the appropriate time. However, if the decoding is later than the intended time, then time correction is more difficult because it is not possible to discard pictures reliably at the output of the coded data buffer. Essentially, the decoding of the sequence is broken and the most reliable way to correct the situation is to restart the decoding process in a manner similar to random-access or channel change. In order to facilitate this process, the control register of the MSM 218 may be programmed to discard all data until a suitable start code or FLUSH token is encountered. In addition, the error "ERR_TOO_EARLY" is not generated during start-up, irrespective of the setting of disable_too_early, because at start up, the first picture is expected to be early.

Table 13 is illustrative of how the MSM 218 registers work and details some of the actions and error messages information placed in the registers can generate.

TABLE 13

Timestamp MSM registers

| Register Name | Size/Dir | Reset State | Description |
| --- | --- | --- | --- |
| ts_correction | 16/rw | zero | Correction added to synchronization time before it is used. |
| frame_time | 16/rw | 226 or 188 | Represents the tolerance on the timing of decoding pictures. Reset state determined by the PAL/NTSC pin. |
| vid_time | 16/ro | zero | Reset by either reset or reset_time. The current value of video decoding time. |
| manual_startup | 1/rw | zero | When set to one the start-up is to be performed manually using |

TABLE 13-continued

Timestamp MSM registers

| Register Name | Size/Dir | Reset State | Description |
| --- | --- | --- | --- |
| | | | decode_disable. In this case SEQUENCE_END and FLUSH tokens at the MSM cause decode_disable to be set to one. |
| decode_disable | 1/rw | zero | When set to zero the decoding proceeds normally. At the start of each picture the MSM checks.the status of decode_disable and will not proceed if it is set to one. Note that if manual start-up is to be performed (i.e. without the time-stamp management hardware) then this bit should be set to one at the same time as manual_startup is set to one. |
| disable_too_early | 1/rw | zero | When set to one the error "ERR_TOO_EARLY" indicating that the decoding is too early is suppressed and the MSM simply waits to correct the situation. |
| NTSC_30 | 1/rw | zero | When set to one the prescaler divides by 4804.8 rather than 4800. Set automatically when decoding 30 Hz frame rates. |
| discard_if_late | 1/rw | zero | This has no effect unless an "ERR_TOO_LATE" is generated (or would be generated if errors were not masked out). If it is set to one then data is discarded until the condition indicated by discard_until. |
| discard_until | 2/rw | zero | Indicate the condition which causes time-stamp triggered discarding to be terminated. 0 - FLUSH 1 - SEQUENCE_START 2 - GROUP_START 3 - NEXT PICTURE Note 1 - that discarding one picture may immediately be un-done if that picture is a field picture by the generation of a dummy field to preserve the alternating top/bottom field structure. As a result if discard_until is set to "Next Picture" but the dummy field would be generated one further picture is discarded. |

As a result of the synchronization time handling of the present invention, it is possible that one of two errors will be generated.

ERR_TOO_EARLY is generated if the decoding is taking place earlier than the time indicated by the timestamp. ERR_TOO_EARLY may be suppressed, but ERR_TOO_LATE will always be generated unless all errors are masked out.

In summary, the present invention includes: an apparatus for synchronizing time having, a timestamp for determining presentation time, a clock reference for initializing system time in a first circuit, a first time counter in communication with the clock reference for keeping system time in a first circuit and a second time counter initialized by the clock reference in a second circuit synchronized with the first time counter, for keeping a local copy of the system time and for determining the presentation timing error between the local copy of system time and system time by comparing the timestamp to the second time counter. It further includes an apparatus for synchronizing a system decoder and a video decoder using a timestamp for determining display time, a clock reference for initializing system time in the system decoder, a first time counter in communication with the clock reference for keeping system time in the system decoder and a second time counter initialized by the clock reference in the video decoder synchronized with the first time counter, for keeping a local copy of system time and for determining the display timing error between the local copy of system time and system time by comparing the timestamp to the second time counter. A still another embodiment includes an apparatus for synchronizing a first circuit and a second circuit using a clock reference for initializing system time in the first circuit, a first circuit having a time counter in communication with the clock reference for keeping system time, a first elementary stream time counter in the first circuit for providing elementary stream time. The first circuit is adapted to receive a time stamp, and the first circuit generates synchronization time by adding elementary stream time to the time stamp and subtracting system time. The second circuit is adapted to receive synchronization time from the first circuit and has a second elementary stream time counter in synchronization with the first elementary stream time counter for providing a local copy of the elementary stream time and for determining a timing error between the system time and the time stamp by comparing synchronization time to the local copy of elementary stream time. In this way, the clock reference signal does not have to be passed directly to the second circuit in order to determine the timing error. In another embodiment, an apparatus for synchronizing a first circuit and a second circuit has a clock reference for initializing system time in the first circuit. The first circuit has a time counter in communication with the clock reference for keeping system time, and a first video time counter for providing video decoding time. The first circuit is adapted to receive a video time stamp and generates synchronization time by adding video decoding time to the video time stamp and subtracting system time. The second circuit is adapted to receive synchronization time from the first circuit and has a second video time counter in synchronization with the first video time counter for providing a local copy of video decoding time and for determining a timing error between system time and the video time stamp by comparing synchronization time to the local copy of video decoding time. Accordingly, the clock reference signal does not have to be passed directly to the second circuit in order to determine the timing error. The present invention also includes a method for providing timing information by providing a video data stream having a time stamp carried in packet header wherein the time stamp refers to the first picture in the packet of data. In the next step a register is provided having a flag used to indicate valid time stamp information which is taken from the packet header and placed into the register. Next, the timestamp is removed from the video data stream and placed in the register. Next, the method encounters a picture start and subsequently examines the status of the register to determine if valid time stamp information is contained in the register by checking the flag status. A time stamp is generated in response to the picture start if the flag indicates valid time stamp information is contained in the register and then the timestamp is inserted back into the data stream. Another embodiment includes an apparatus described above wherein the elementary stream time counters are restricted to 16 bits. Likewise, there is an apparatus as described above, wherein the second elementary stream time counter located in the elementary stream decoder is restricted to 16 bits. Furthermore, there is an apparatus as described above wherein the synchronization time is restricted to 16 bits for controlling the elementary stream decode. The present invention also has a process for decoding video and for determining display time errors against a threshold value. It then parses video data into tokens for further processing, determining if a time stamp token is indicated, comparing the time stamp token to a video time, and generates a compared value to determine an indicative of timing error. Next, it determines whether the compared value, when compared against a threshold value, is within acceptable parameters when a timing error is indicated and indicates when the compared value is outside acceptable parameters. An alternative embodiment includes an apparatus for using a system decoder and a video decoder. The system decoder is adapted to accept MPEG system streams and demultiplexing video data and the video time stamp from the stream. The system decoder has a first time counter representative of system time. The video decoder accepts the video data and the video time stamp, and has a second time counter in synchronization with the first time counter. The video decoder also has a video decoder buffer for accepting the video data at a substantially constant rate and outputting the video data at a varying rate and for passing a video time stamp. The video decoder while decoding a picture from the video data also compares the video time stamp for the decoded picture with the second time counter to determine the appropriate display time. There is also a method for determining a time error between a first circuit and a second circuit by providing the first circuit with a system time (SY), a time stamp (TS), and an elementary stream time (ET), obtaining synchronization time (X) by using the elementary stream time(ET), the time stamp (TS) and the system time (SY), in accordance with the equation; X=ET+TS−SY, providing synchronization time (X) to the second circuit and generating a synchronized elementary stream time (ET2) and obtaining a time error by using synchronized time (X) and in accordance with the equation ET2−X; hence, the first circuit can be time synchronized with the second circuit without passing system time to the second circuit. Another method for determining a time error between a first circuit and a second circuit has the following steps: providing the first circuit with a time stamp (TS), and an initial time(IT), obtaining synchronization time (X) by using the time stamp (TS) and the initial time (IT), in accordance with the equation X=TS−I, providing synchronization time (X) to the second circuit and generating a synchronized elementary stream time (ET) and obtaining a time error by using synchronized time (X) and in accordance with the equation ET−X. In this way, the first circuit can be time synchronized with the second circuit without passing system time to the second circuit. Still another method for determining a time error between a first circuit and a second circuit includes the following steps: providing the first circuit with a system time (SY), a video time stamp (VTS), and a video decoding time (VT), obtaining synchronization time (X) by using the video decoding time (VT), the video time stamp (VTS) and the system time (SY), in accordance with the equation; X=VT+VTS−SY, providing synchronization time (X) to the second circuit and generating a video decoding time (VT2) in the second circuit which is synchronized to the video decoding time (VT) in the first circuit, and obtaining a time error by using synchronized time (X) and in accordance with the equation VT2−X. Accordingly, the first circuit can be time synchronized with the second circuit without passing system time to the second circuit.

Detailed Description of the Invention for Asynchronous Swing Buffering

For asynchronous swing buffering, in accordance with the present invention, two buffers are operated asynchronously; one is written while the other is read. Accordingly, this allows for a data stream having a first rate of through-put to be resynchronized to another rate, while still maintaining a desired rate. In the invention, the write control and read control both have state indicators for communicating which buffer they are using and whether the controls are waiting for access or are, in fact, accessing that buffer. Each side communicates to the other side a single bit to indicate which buffer it is using. This is the only signal that must be synchronized between the two sides of asynchronous circuitry.

When one control circuit (read or write) finishes accessing a buffer, then the invention will allow control to pass to the other circuit. If, after the control has swung, and two control circuits are trying to use the same buffer, then the later control circuit will begin waiting. The control circuit will wait until each side is using alternate buffers, i.e., the other side has swung. If, after it has swung, it finds that it is now using the alternate buffer to the other side, it will not wait, but immediately commence accessing. This system of arbitration between the buffers is started up by both buffers using the same buffer, buffer 0, in this case. The read side starts up by waiting, while the write side is accessing, since there is nothing valid to read out of either buffer.

In one embodiment, in accordance with the present invention, the swing buffers are two discrete RAMS having all signals, such as enabling strobes, addresses and data multiplexed from either the read or write side, dependent on which buffer is being accessed by each side. This structure has been shown to use a lot of area in the busing of a large number of signals between the two buffers.

Combining the two RAMs into a single structure saves much of the busing area while still maintaining performance to the same standard. This structure contains twice as many rows of cells as one of the discrete RAMs found in the first embodiment of the present invention. However, the second embodiment must have two pairs of bit lines since the read and write to the discrete buffers is happening simultaneously and asynchronously. Each row will be of its original width (i.e., have the same number of cells) since accesses are the same width as for the discrete RAMS. Each pair of rows are accessed as if at the same address, but from different buffers, so they connect to a different pair of bitlines. Using the same address, these pair of rows can be readily accessed by one row decoder connected to the read address and one row decoder connected to the write address. Again, the read and write control never access the same buffer at the same time so there is no conflict as to which pair is accessed by which row decoder.

In the same way in which each row decoder can access rows from each buffer, both the read and write circuitry within the structure of the present invention connect to each pair of bitlines, one pair from each buffer. The read and writes are then multiplexed into each of the buffers and, for the same reasons explained above, there will not be conflict.

Figure 48:
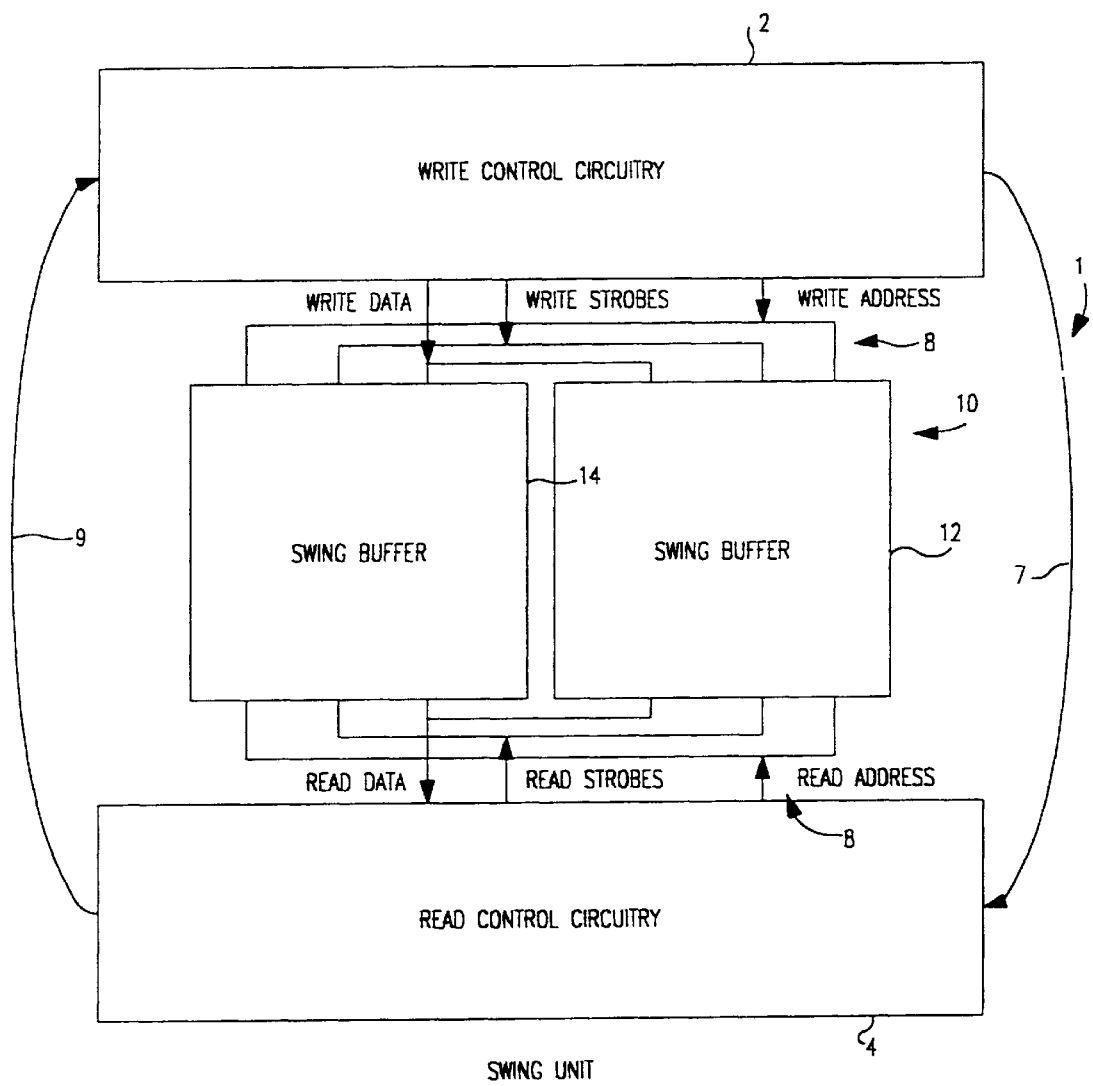
FIG. 48 is a block diagram illustrating a first preferred embodiment of the present invention.

As shown in FIG. 48, a swing unit 1 includes swing buffers 10 with RAM 12 and 14 in accordance with the present invention. The swing unit 1 also includes a write control circuit and a read control circuit, which control the data into and out of the RAM 12 and 14. The read control circuit and the write control circuit accomplish this by use of strobes, data and address control lines, 8. Lines 7 and 9 are control lines to indicate the RAM used by the write control circuit and the RAM used by the read control circuit. Line 7 functions to control the write control circuitry, i.e., when the read control circuitry is using, RAM 12 if low, RAM 14 if high. Similarly, Line 9 functions to inform the read control circuitry that the write control circuitry is using RAM 12 if low, RAM 14 if high.

Figure 49:
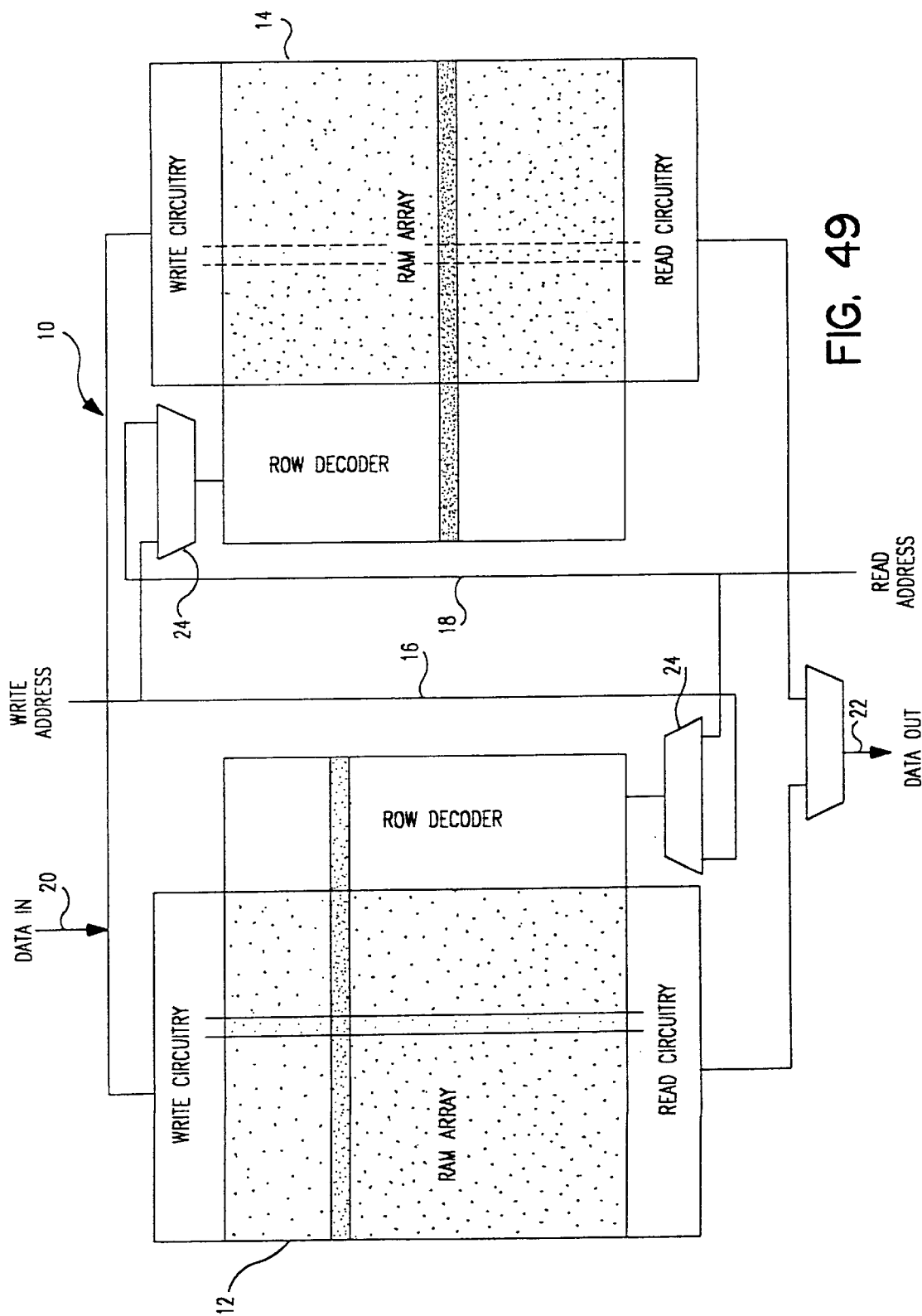
FIG. 49 is another block diagram illustrating the first preferred embodiment of the present invention.

In the present-invention, swing buffer 10 has two RAM arrays, 12 and 14. Swing Buffer 10 is capable of asynchronous, alternative reading and writing to the RAM area which enables the apparatus to achieve the necessary band width for high speed accessing of the memory. The RAMs 12 and 14 require the following signals: write address 16, read address 18, data in 20, data out 22; and a read and write enable signal (not shown). See also FIG. 49.

The write address and read address signals are multiplexed by multiplexers 24. The RAM array 12 and 14 operate with the write circuitry, row decoder and read circuitry in a conventional sense.

In the first embodiment of the present invention, during initiation of the swing buffer 10, RAM 12 will be written to until the control circuitry switches a write enable single to RAM 14.

Once the RAM array 12 has been written, it falls under the control of the read circuitry 4, to be read. During this time, the RAM array 14 is also being written. It is important to note when the RAM array falls under the control of the read array control 2, or the write control circuit 4, the control is established until reading or writing is completed and then control is turned over. In the situation where the read control circuit 4 is accessing the RAM array, such as 12, and the write control circuitry 2 needs to access the same RAM array 12, then the write control circuit will begin waiting.

Therefore, in accordance with the present invention, two control events are created. When a write control circuit or a read control circuit swings to a different RAM, it will either begin immediately accessing the RAM since the RAM is free and not under control of the alternative circuit, or it will begin to wait. During start up, the read side defers to the write side, since there is nothing valid to be read out of either buffer.

Figure 50:
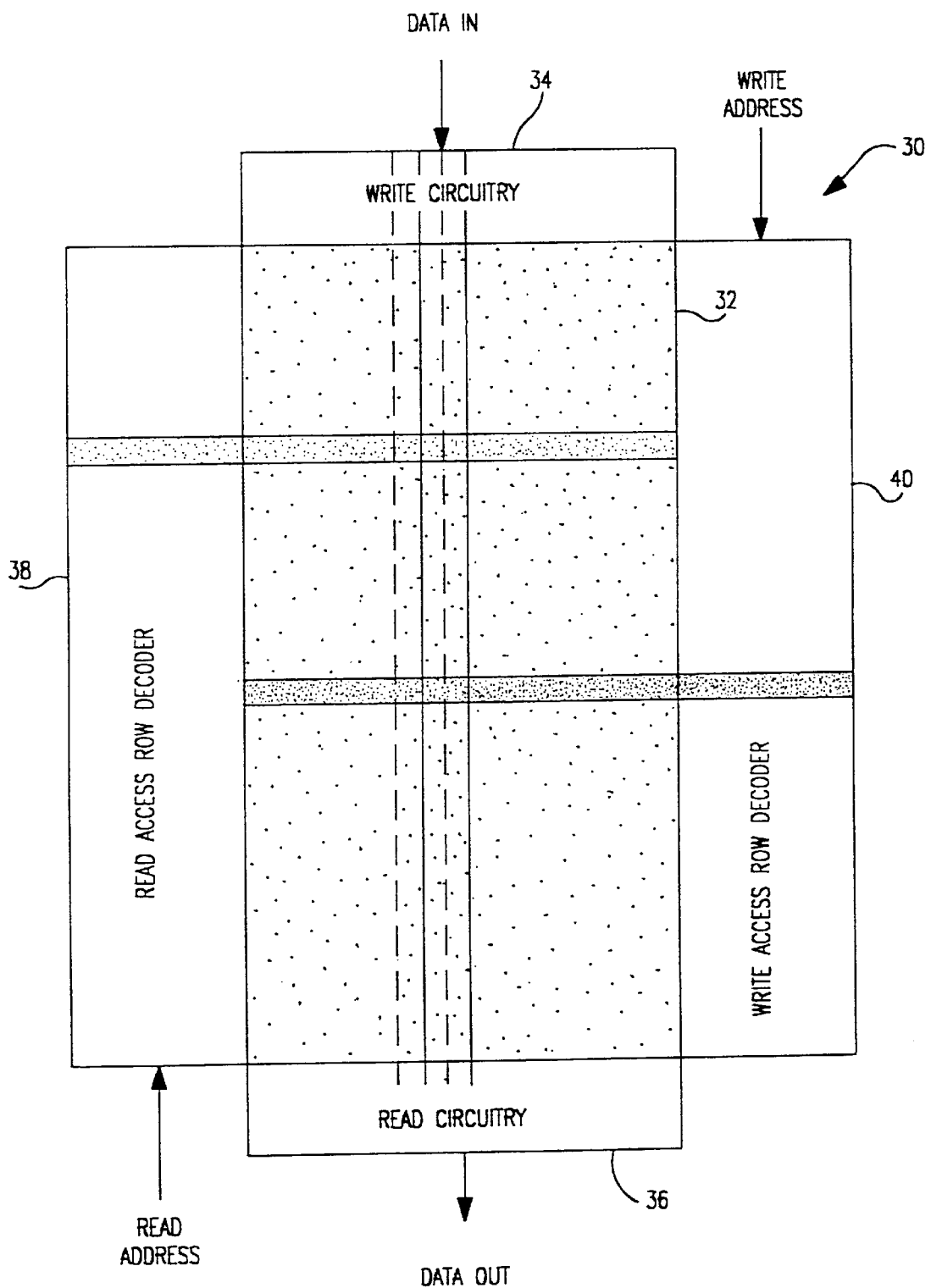
FIG. 50 depicts a second preferred embodiment of the present invention.

The second embodiment of the present invention is shown in FIG. 50. An integrated swing buffer 30 includes a RAM array 32 having the logical size of RAM array 12 combined with RAM array 14. In other words, there is the same amount of RAM in both the first and second embodiments, however, it is combined in the second embodiment. Accordingly, the integrated swing buffer has the advantage of saving much of the busing area while still performing the same swing buffer function.

In the second embodiment of the present invention, the write circuit and read circuit 34 and 36 respectively, are similar to those used in the swing buffer 10. However, these circuits now include selectors which choose from the pairs of bit lines described hereinafter. Likewise, the read access row decoder 38 and the write access row decoder 40 are similar to those contained in swing buffer 10, however, they are able to access a pair of rows as described hereinafter in FIG. 51.

Figure 51:
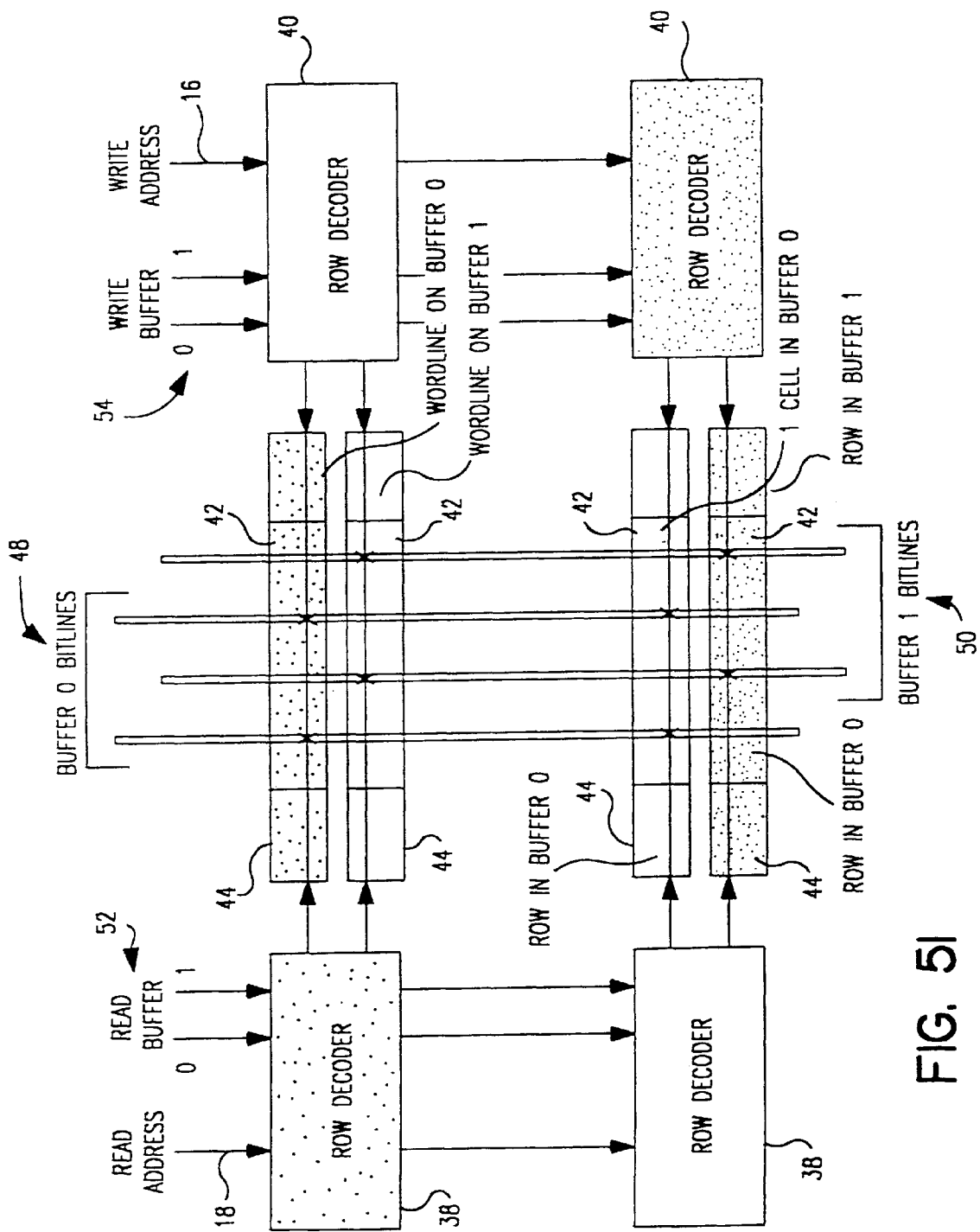
FIG. 51 illustrates a detailed method of addressing used by the second preferred embodiment, in accordance with the present invention.

As shown in FIG. 51, the particular structure of the integrated swing buffer 30, in accordance with the present invention, is detailed. Individual cells 42 are contained in rows 44. The read row decoder 38 and write row decoder 40 access the rows 44 in pairs. A pair of rows have the same address provided by the address lines 16 and 18. The read buffer line 52 and write buffer line 54 provide the control information for selecting one of the paired rows 42. The buffer 0 bitlines 48 and buffer 1 bitlines 50 connect to alternative rows of cells and to the read and write circuitry 34 and 36. For clarity in depicting the addressing, the lighter shading illustrates the read row decoder 38 accessing a row in buffer 0. Similarly, the darker shading illustrates the write row decoder 40 accessing a row in buffer 1.

In summary, the present invention includes a swing buffer apparatus having at least two RAM arrays, a write control circuit in communication with the RAM arrays for controlling data input into the RAM array, and a read control circuit in communication with the RAM arrays for controlling data output from the RAM arrays. Furthermore, the write control circuit and read control circuit are in communication with one another to allow a synchronized control of the RAM arrays. There is also a swing buffer apparatus having a RAM array, a write control circuit in communication with the RAM array through a pair of bit lines, a read control circuit in communication with the RAM array through another pair of bit lines and a read row decoder and a write row decoder for addressing the RAM through a pair of rows so that individual cells are read. The present invention also provides a method of asynchronously addressing RAM, by decoding at least a pair of cells in the RAM, using a row decoder to decode at least a pair of rows and selecting one of the rows to be assessed, using at least two pairs of bitlines connected to a read circuit and a write circuit and selecting the pair of bitlines to be used.

DETAILED DESCRIPTION OF THE INVENTION FOR STORING VIDEO INFORMATION

Video decompression systems contains three basic parts used to decode and display picture information. The three main parts of a video decompression system are the spatial decoder, temporal decoder and the video formatter. The present invention involves the temporal decoder and video formatter and the way in which the temporal decoder and video formatter manage their respective picture buffers, hereinafter the frame store buffer. In MPEG systems, the temporal decoder contains two frame store buffers and the video formatter contains two frame store buffers.

MPEG uses three different picture types: Intra (I), Predicted (P) and Bidirectionally interpolated (B). B pictures are based on predictions from two other pictures; one picture is from the future and one from the past. The I pictures require no further decoding by the temporal decoder, but must be stored in one of the two frame store buffers for later use in decoding P and B pictures. Decoding a P picture requires forming predictions from a previously decoded P or I picture. The decoded P picture is stored in a frame store buffer for use in decoding further P and B pictures. B pictures can require predictions from both of the frame store buffers. However, B pictures are not stored in the frame store buffers.

It will be appreciated that I and P pictures are not output from the temporal decoder as they are decoded. Instead, I and P pictures are written into one of the frame store buffers, and they are read out only when a subsequent I or P picture arrives for decoding. In other words, the temporal decoder relies on subsequent P or I pictures to flush previous pictures out of the two picture buffers. Accordingly, the spatial decoder of the present invention can provide a fake I or P picture when it is necessary to flush the temporal decoder's two frame store buffers In turn, this fake picture is flushed when a subsequent video sequence begins. As shown in Table 14, the picture frames are displayed in numerical order.

TABLE 14

| | Frame Stores | | | | | | | | |
|---|---|---|---|---|---|---|---|---|---|
| Display Order | I1 | Be | B3 | P4 | B5 | B6 | P7 | B8 | B9 | I10 |
| Transmit Order | I | P4 | Be | | B3 | P7 | B5 | B6 | I10 | B8 | B9 |

However, in order to reduce the number of frames that must be stored in memory by the temporal decoder, the frames are transmitted in a different order. It is useful to begin the analysis from an intra frame (I frame). The I frame is transmitted in the order it is to be displayed. The next predicted frame (P frame), P4 is then transmitted. Then, any bi-directionally interpolated frames (B frames) to be displayed between the I frame and P4 frame are transmitted, represented by Be and B3. This allows the transmitted B frames to reference a previous frame (forward prediction) or a future frame (backward prediction).

After transmitting all the B frames to be displayed between I and P4, the P7 frame is transmitted. Next, all the B frames to be displayed between the P4 and P7 frames are transmitted, i.e., corresponding to B5 and B6. Then, the next I frame, I10, is transmitted. Finally, all the B frames to be displayed between the P7 and I10 frames are transmitted, corresponding to B8 and B9. This ordering of transmitted frames requires only 2 frames to be kept in memory by the temporal decoder at any one time, and does not require the decoder to wait for the transmission of the next P frame or I frame to display an interjecting B frame. As described above and shown in Table 14, the temporal decoder of the present invention can be configured to provide MPEG picture reordering. With this picture reordering, the output of P and I pictures is delayed until the next P or I picture in the data stream starts to be decoded by the temporal decoder.

As the P and I pictures are reordered, certain tokens, i.e. Picture_Start, Picture_Type, and Temporal_Reference, are stored temporarily on the chip as the picture is written into the picture buffers. When the picture is read out for display, these stored tokens are retrieved. At the output of the temporal decoder, the DATA tokens of the newly decoded P or I picture are replaced with DATA tokens for the older P or I picture, and they are then sent to the video formatter. Note that the output from the temporal decoder is in tokenized macroblock format and there is no block-to-raster conversion.

In brief, the video formatter of the present invention stores two framestores or pictures. In some video formatters three pictures or framestores are used to accommodate such features as repeating or skipping pictures. The video formatter's off-chip DRAM holds three framestores. The use of three framestores here allows frames to be either repeated or skipped in situations where the frame rates of the decoded video and the display are different.

All I, B and P frames are stored in the framestores of the video formatter. At any one time, there may be one frame store from which data is being displayed, one frame store into which data is being written, and in video formatters with three framestores, one other frame may be being stored in the third frame store.

The present embodiment performs all the prediction, reordering and block-to-raster tasks MPEG normally handles by using a temporal decoder with two framestores and a video formatter with two framestores, i.e., for a total of four framestores. This is accomplished in the present invention by using a frame store sharing scheme that only uses three framestores. The present embodiment cannot, however, handle the repeat and skip frame tasks of a video formatter with only the three framestores.

The present invention stores I pictures in a first frame store and P pictures in a second frame store. Because of the need to perform the block-to-raster conversion, B frames are stored in the manner detailed below in a third frame store. In order to minimize the amount of external DRAM required, a scheme is used where successive B frames share the same third frame store.

When a B frame is decoded, it may refer to the two previously decoded I or P frames occupying the first and second framestores. The decoded B frame is written into the third frame store. The present embodiment allows the raster to commence prior to a frame store being completely filled. The raster is allowed to start before the frame store is filled so that the next B frame can be written into the same frame store to occupy the space vacated by the raster at the top of the previous frame.

In order to keep a record of which parts of the frame store are occupied with picture data, and which are available for new data, each frame store is split into sectors. In the present invention, each frame store is first split into two field stores, each of which comprises N sectors, where N is the number of block rows in the field.

Frames coded as field pictures are straightforward. Each successive macroblock row occupies two sectors in a field store. Once the write back has progressed far enough down the frame, the raster starts reading out each sector from the top. Once the write back of the first frame has been completed, the start of the next frame is written into the space left by the raster. Checks on the status of each of the sectors ensures that the sector to be rastered is indeed full, and that for write back, the two sectors required are empty.

Frames coded as frame pictures are more difficult. Unlike field pictures, the macroblock rows of data are not written to the DRAM in the same order as they are to be rastered. The field stores are written to in parallel, whereas the fields are rastered in turn.

Consider a picture with 8 sectors per field store. That is, Field store 0 consists of 8 sectors numbered 0 to 7, each of which contains one row of blocks (i.e., each 8 pixels deep by the width of the picture). Field store 1 consists of 8 sectors, numbered 8 to 15, each of which contains one row of blocks (i.e., each 8 pixels deep by the width of the picture).

The first macroblock row is written back into sector 0 in field store 0 and to sector 8 in field store 1. The field stores continue to be filed in parallel. At some point, the raster beings displaying sectors from field store 0, that point being chosen so that the raster of field store 0 does not catch up with the write back. However, the second frame cannot be written back in the same manner as the first. Because the sectors are written and read in a different order, waiting for the same two sectors to be free at the start of a frame would mean that write and read could not run continuously. This must be achieved in order to maintain the display and to maintain decoding at the necessary rate.

Accordingly, the second frame must be written into sectors of the frame store already freed by the raster. This is implemented by dividing the framestores in two. Hence, for the second frame, the meanings of the half field stores change. Sectors 4–7 become the upper part of the second field store and sectors 8–11 become the lower part of the first field store, i.e., they swap over. The first macroblock row is written to sectors 0 and 4, once they are freed, with subsequent rows written to 1 and 5, then 2 and 6, and then 3 and 7. The next row is written to sectors 8 and 12, and so on through to 11 and 15. This reallocation to the memory is sufficient to allow the write back and raster to continue at the appropriate rate.

Should a third successive B frame arrive, the write back order reverts to that of the first frame.

In the shared B frame store, with FRAME pictures:
The FIRST picture is written back to -
Sectors 0 and 8 [1 st macroblock row=2 block rows]
Then 1 and 9, 2 and 10, 3 and 11, . . . 7 and 15.
The FIRST picture is rastered from -
Sector 0,
Then 1, 2, 3, 4, 5, 6, 7, 8, 9, 10, 11, 12, 13, 14, 15.
The SECOND frame is written to -
Sectors 0 and 4,
Then 1 and 5, 2 and 6, 3 and 7, 8 and 12, 9 and 13, 10 and 14, 11 and 15.
The SECOND frame is rastered from -
Sector 0,
Then 1, 2,3 8, 9, 10, 11, 4, 5, 6, 7, 12, 13, 14, 15.

Note that, in accordance with the present invention, the second frame, the first macroblock row is not written into sectors 0 and 1, which are, after all, the first two sectors to be freed by the raster. Instead, it waits for sector 4 to clear. This is done for two reasons: First, waiting for sector 4 to clear does not affect the system's ability to maintain continuous decoding and display, even in the situation of worst-case coded data, and it is easier to implement. Secondly, with picture sizes which divide into a number of sectors that are not a power of two, the sequence for writing to and reading from sectors of memory does not repeat often (for example, NTSC format has 30 sectors per field and the sequence would repeat every 58 frames). This makes testability and recovery difficult.

As far as implementation is concerned in the present invention, rather than keep a record of the status of each individual sector, each half field store is effectively implemented as a fifo, with pointers to the next location to be written and to be read. Thus, each fifo being full or empty causes write back and raster, respectively to be disabled. This makes use of the knowledge that each half field store is itself written and read only one way, just like a fifo.

In summary, the present invention, provides method for storing video information by providing video information in the form of an I Frame, a P Frame, a $B_1$ Frame and a B2 Frame, storing the I Frame in a first Frame store, storing the P frame in a second frame store; providing a third Frame store having a first and second field store, the first and second field store being split into at least two memory areas respectively, storing the $B_1$ Frame in the third register, reading the $B_1$ Frame from a selected portion of the memory area in the first or second field store; writing a portion of the B2 Frame into the selected portion of the memory area from which the $B_1$ Frame was read; whereby a reduced amount of memory can be used to store video information.

The two programs found herein below contain code to be used in the preferred embodiment of the invention.

Detailed Description of the Invention for a Parallel Huffman Decoder

In accordance with the present invention, the Parallel Huffman Decoder block will decode Huffman coded Variable Length Codes (VLCs) and Fixed Length Codes (FLCs), and pass through tokens under the control of the parser microprogrammable state machine (MSM).

This embodiment of the present invention handles both MPEG-2 as well as MPEG-1 Huffman codes. An important aspect of this embodiment of the invention is that it can sustain a high through-put due to the fact that it is a parallel decoder rather than a serial one.

This embodiment of the present invention uses a code lookup technique to decode Huffman codes. This is done to achieve the performance requirements and also to handle the second MPEG-2 transform coefficient table which is irregular or non-canonical in nature.

Furthermore, this embodiment of the invention has some features that allow it to decode certain more complex components from the stream in a single cycle without the assistance of an external controller. Examples of such complex components are Escape-coded coefficients, Intra-DC values and Motion Vector deltas, all of which are present in the stream as combined VLC/FLC components.

Figure 52:
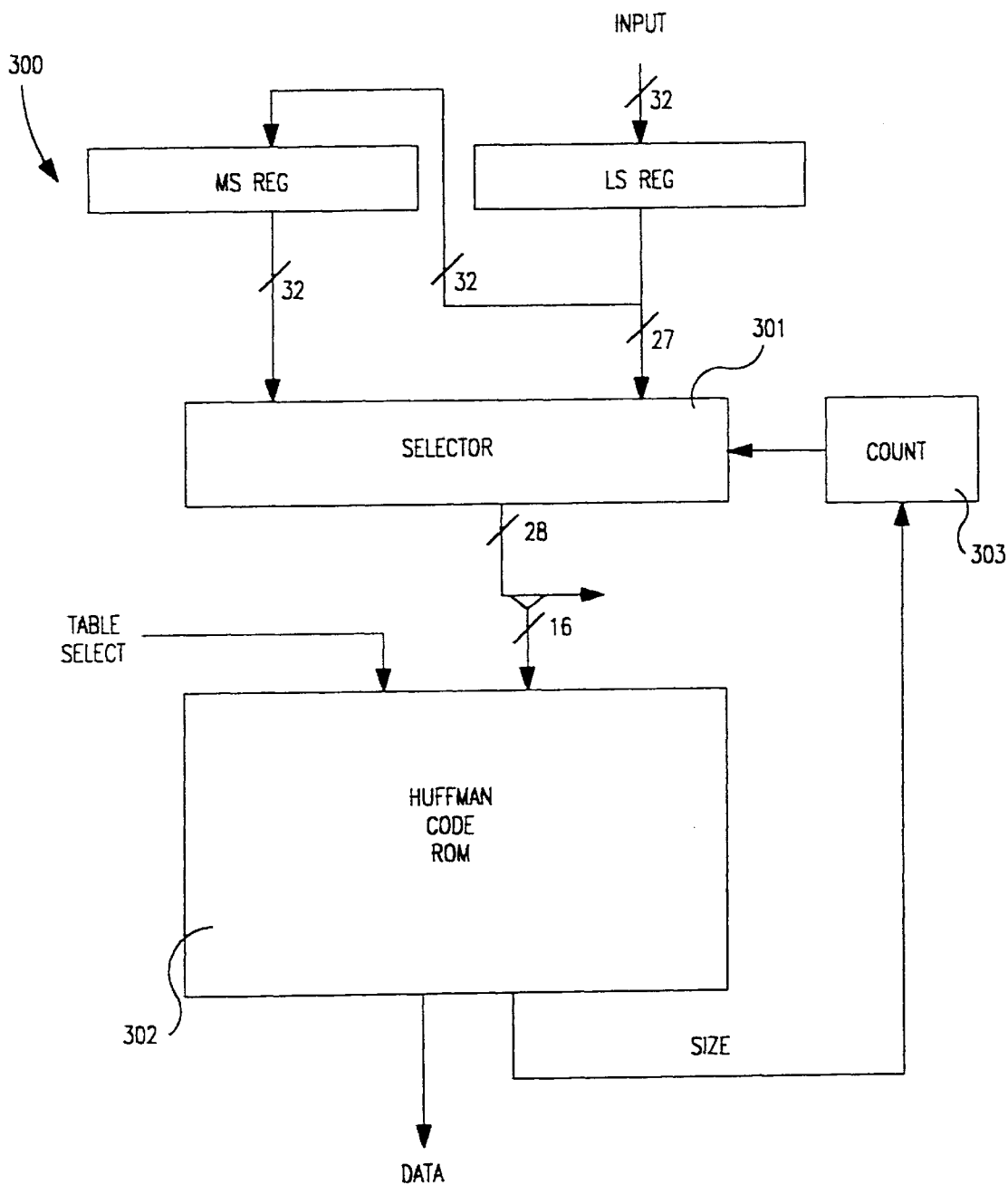
FIG. 52 is a block diagram showing an apparatus for decoding Huffman VLCs, in accordance with the present invention.
Figure 53A:
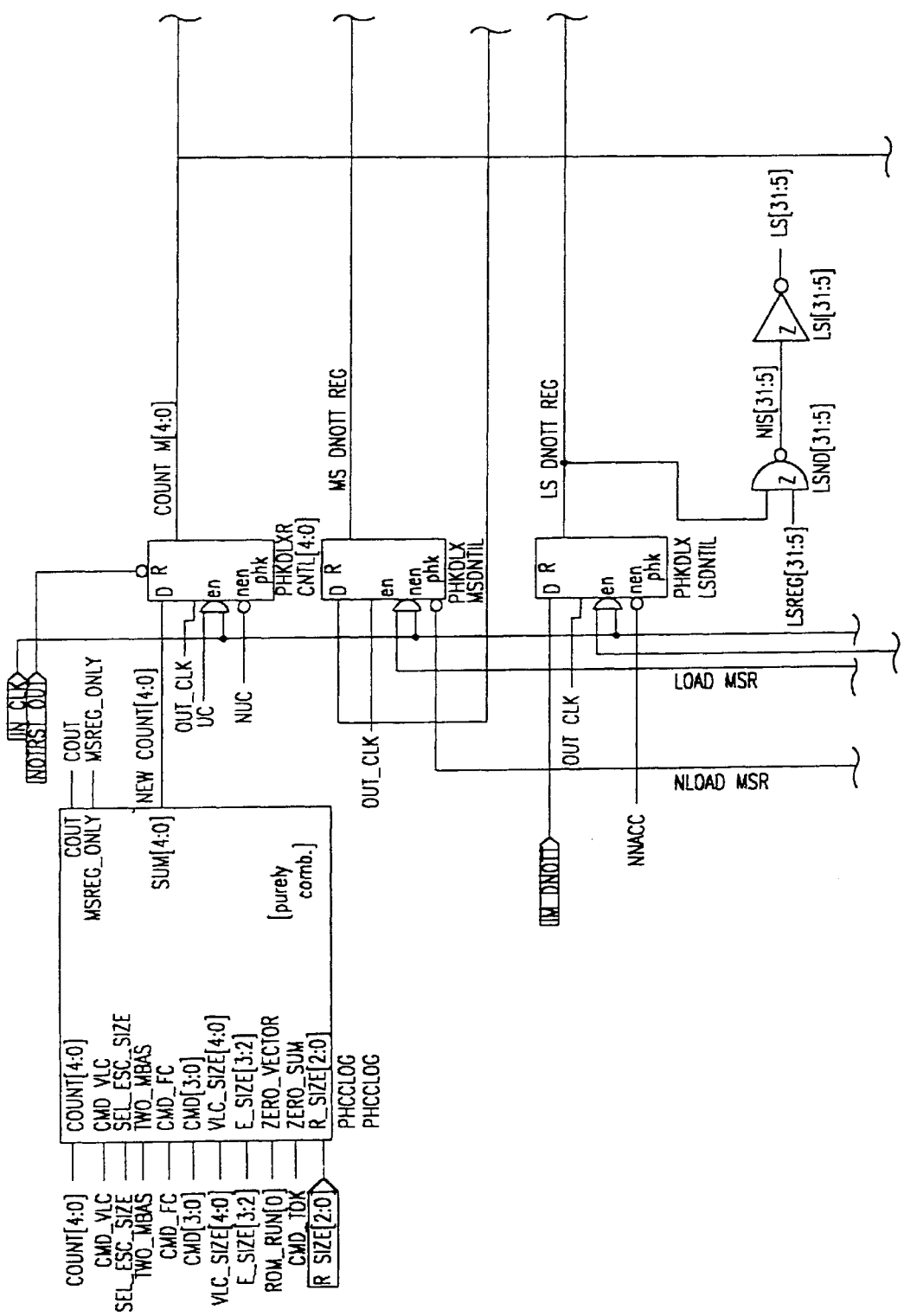
FIG. 53 is a schematic diagram showing the overall structure of the parallel huffman decoder of the present invention.
Figure 53B:
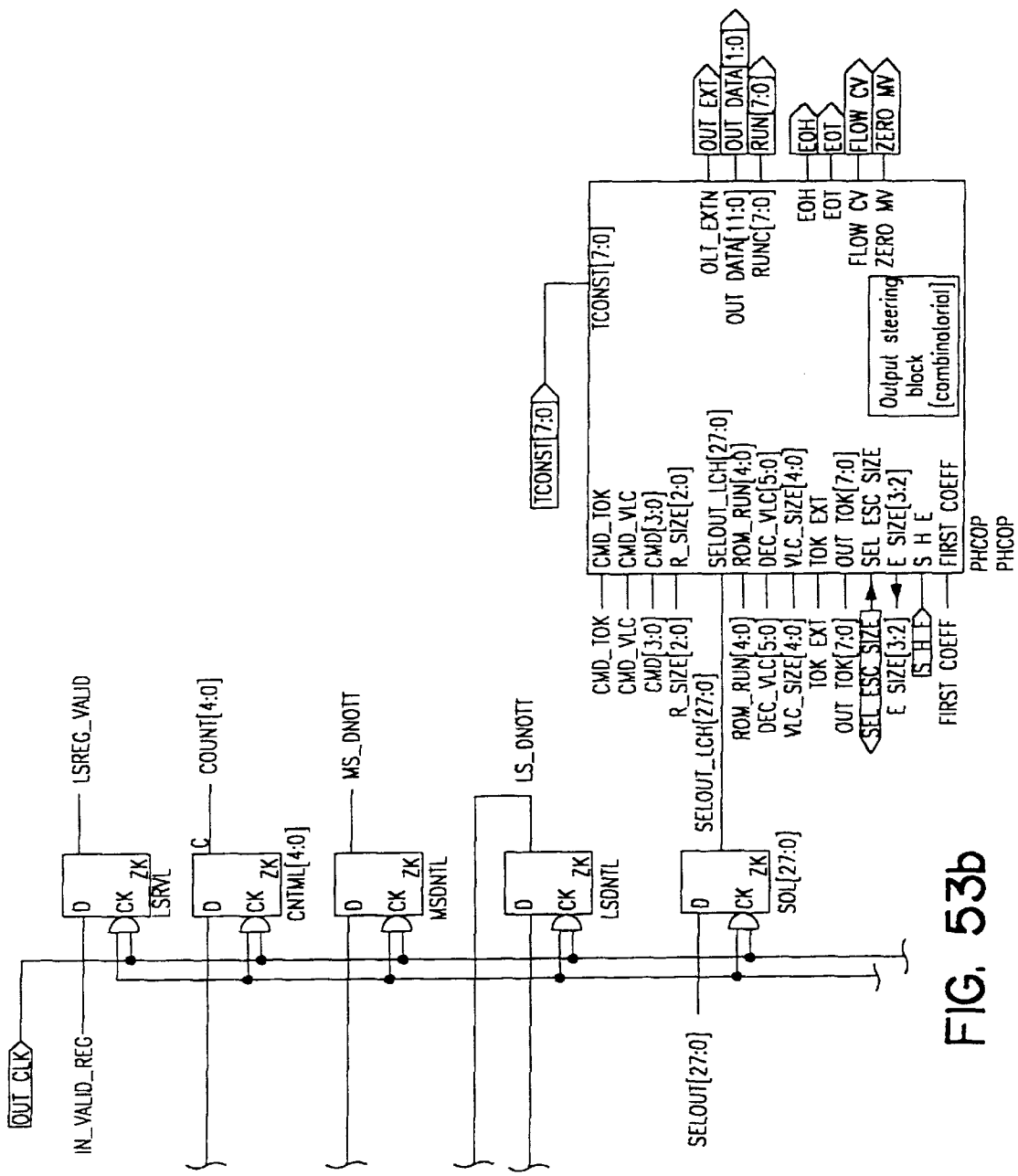
Figure 53C:
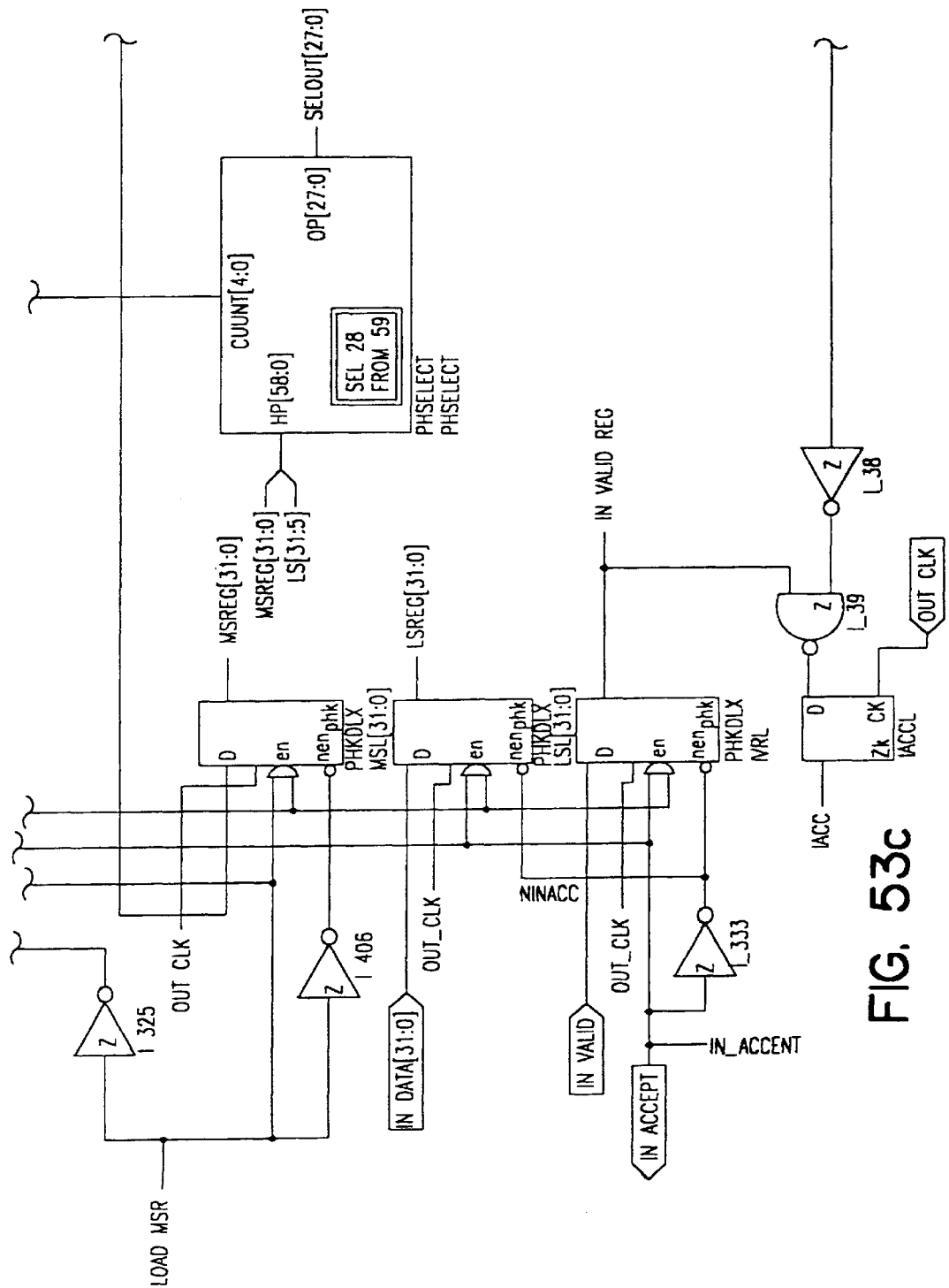
Figure 53D:
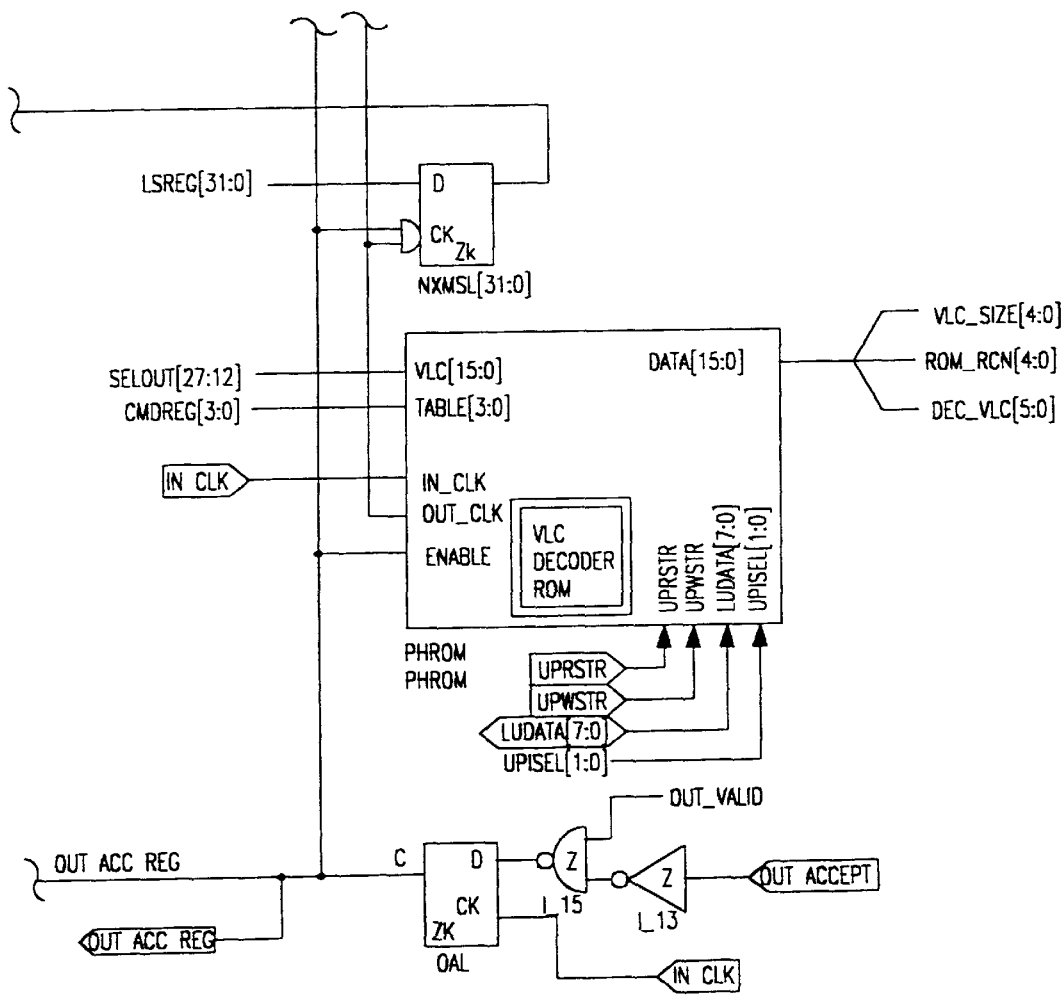

Referring now to FIG. 52, there is shown how the Parallel Huffman Decoder 300 deals with variable length codes (VLCs). FLCs require a bypass mechanism which uses the selector 301 output to generate data and an input field to specify the length of the FLC. Thus, the ROM 302 is not required at all during FLC decoding.

However, to decode a VLC, input is first loaded into the two input data registers, 'MSReg' and 'LSReg' as shown in FIG. 52. As the names imply, the "earlier" or most significant data is stored in MSReg. The selector is used to align the beginning of the next VLC with the ROM input. Thus, to decode the very first VLC, the selector outputs the top 28 bits of its 59-bit input and the top 16 bits of these are passed to the Huffman Code ROM 302. For subsequent VLCs, the selector effectively shifts the input according to the total count of bits decoded thus far. The count is maintained by adding the size of each VLC, as it is decoded, to a running total. The various word widths are a result of the maximum coded size which can be decoded, which is the 28-bit MPEG-1 Escape Coded Coefficient, and the maximum VLC size which is 16 bits (DCT coefficient tables).

The "table select" input is used to select between the various different Huffman code tables required by MPEG.

The Huffman Code ROM

The core of the implementation of the present invention, used to decode all the VLCs is a special ROM 302 whose addresses are controlled with a selector/shifter 301 as shown in FIGS. 52 and 53. The ROM 302 has the job of performing a VLC table index calculation, followed by the index-to-data operation that yields decoded data.

The index calculation can be thought of as a content addressable memory (CAM) operation with "don't care" matching implemented to handle the Huffman codes which form the presented data. Since all the VLC code tables are fixed, a CAM-ROM will suffice and this is the job of the ROM AND-plane shown in FIGS. 54 through 57. Since the index generation is performed in a look-up manner (rather than algorithmically) there is no restriction to handling tables which are canonical.

The ROM Or-plane converts the "index" (an activated word-line) into the decoded data and the size (or length) of the code. The data forms the decoded output (subject to error checking) and the size information is fed back to allow a calculation to be performed which controls the selector and, thus, presents the decoder ROM 302 with the correct data to perform the decoding of the next VLC in the subsequent cycle.

The ROM 302 address of the present invention is in two fields. The larger field is the bit-pattern to be decoded and the smaller field selects which Huffman code table is to be examined. The bit-pattern which must be examined is quite long, 16 bits, corresponding to the longest VLC code and there is an additional 4 bits of table select. Thus, there is a total address space of 20 bits (approximately one million addresses) although there are only in 450 entries in the ROM 302. The reason for the difference is due to the existence of "don't care" bits.

In order to decode VLCs, the AND-plane must be able to decode "don't care" bits in the VLC bit-pattern. This is because all VLCs which are shorter than the maximum 18 bits will be followed by additional bits which form no part of the decoding of that VLC. Because of the wide address, the AND-plane is predecoded (2–>4), and the ROM 302 must combine "don't care" handling with this predecode. Furthermore, in addition to the complete MPEG code tables, the ROM 302 also has entries to identify illegal VLC patterns, which exist for some code tables.

Maximizing Throughput

In order to sustain output of one decoded item every cycle, some care must be taken to control the decoder input and special handling must be used for some "complex" symbols (i.e., ones which are not single FLCs or VLCs).

In order to sustain peak throughput of Escape-coded coefficients it must be possible to input at least one complete code per cycle. Since the maximum length required is 28 bits in MPEG-1 this dictates the input word width of 32 bits (being the next sensible size greater than 28).

Normal transform coefficients are also "complex" symbols, in the sense that they consist of a VLC followed by a 1 -bit FLC which gives the sign of the level value and are handled in a similar manner to the other complex symbols (e.g. motion Vectors, Intra DC and Escape coded coefficients). Peak throughput cannot be achieved if coefficients are decoded as a VLC followed by an FLC (in separate cycles) and the alternative of allowing the ROM 302 to decode the sign bit would double the size of the two largest tables in the ROM. Thus in the present invention, special handling is used for various symbols so that a single cycle can produce the "final" required result.

FLCs and Tokens

The basis of FLC handling is to control the selector with the required length of the FLC and to bypass the ROM 302 and simply output the correctly selected FLC. Thus, simple FLCs are handled fairly naturally by the decoder, without significant extra hardware. Furthermore, tokens are not manipulated, but simply passed directly to the output of the decoder.

Implementation

This section describes several important features of the implementation of the decoder., in accordance with the present invention. The implementation includes the arrangement of registers with the counter 303 and selector 301, as shown in FIG. 52, and the actual code ROM.

The schematic of FIG. 53 shows how the core components are interconnected to implement the main Huffman decoding core section of the present invention. The registers ms[31 :0] and ls[31 :0] are MSReg and LSReg, respectively, and the block phselect is the selector. The counter logic is contained in the block phcclog (together with various other logic) and the count latch is called cntl[4:0]. The other logic on this schematic deals with handling commands, data and command dynamics, tokens, and the manipulation of the more "complex" symbols (performed in block phcop).

Figure 54A:
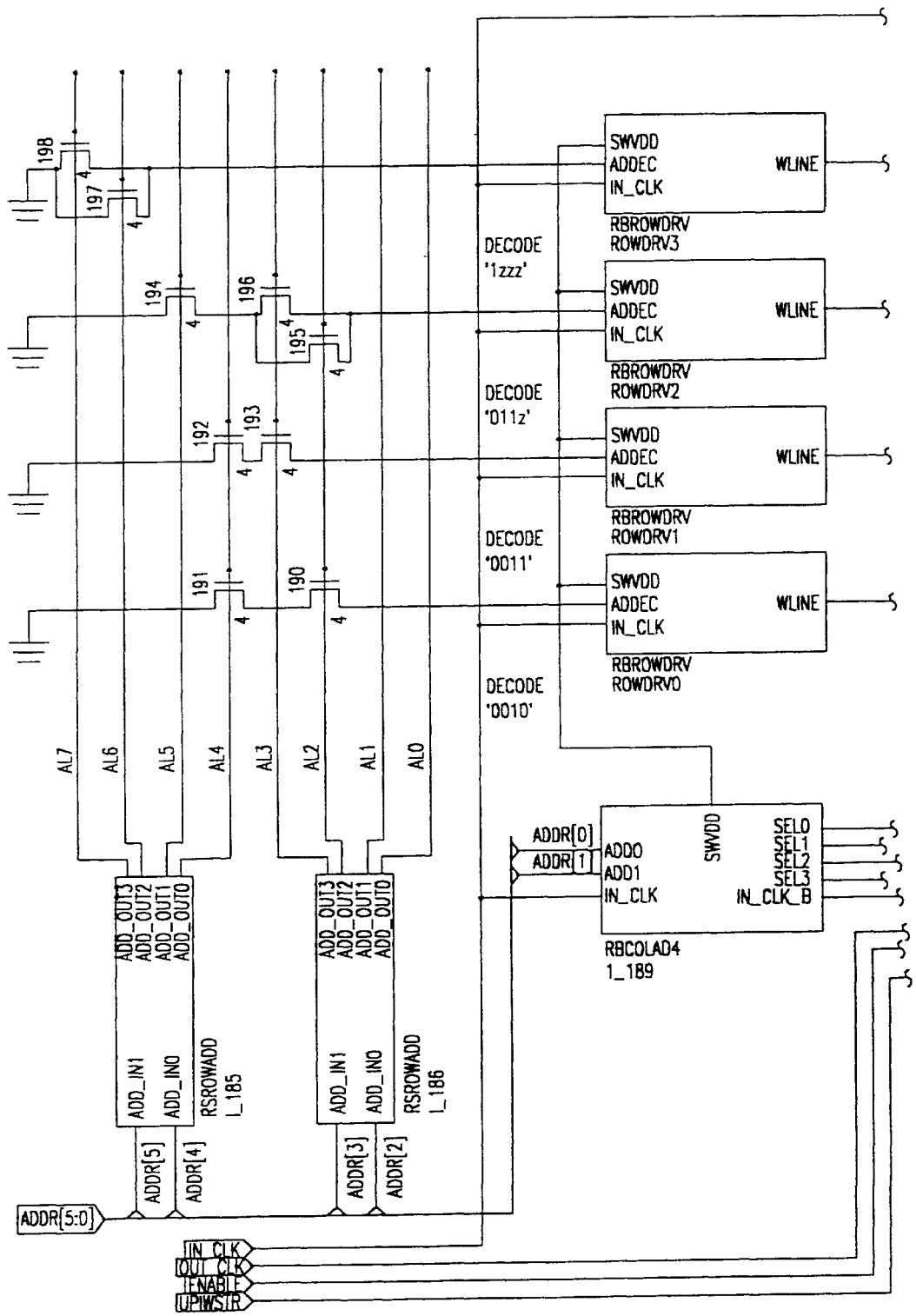
FIG. 54 is a schematic diagram illustrating a ROM adapted for decoding parallel huffman codes.
Figure 54B:
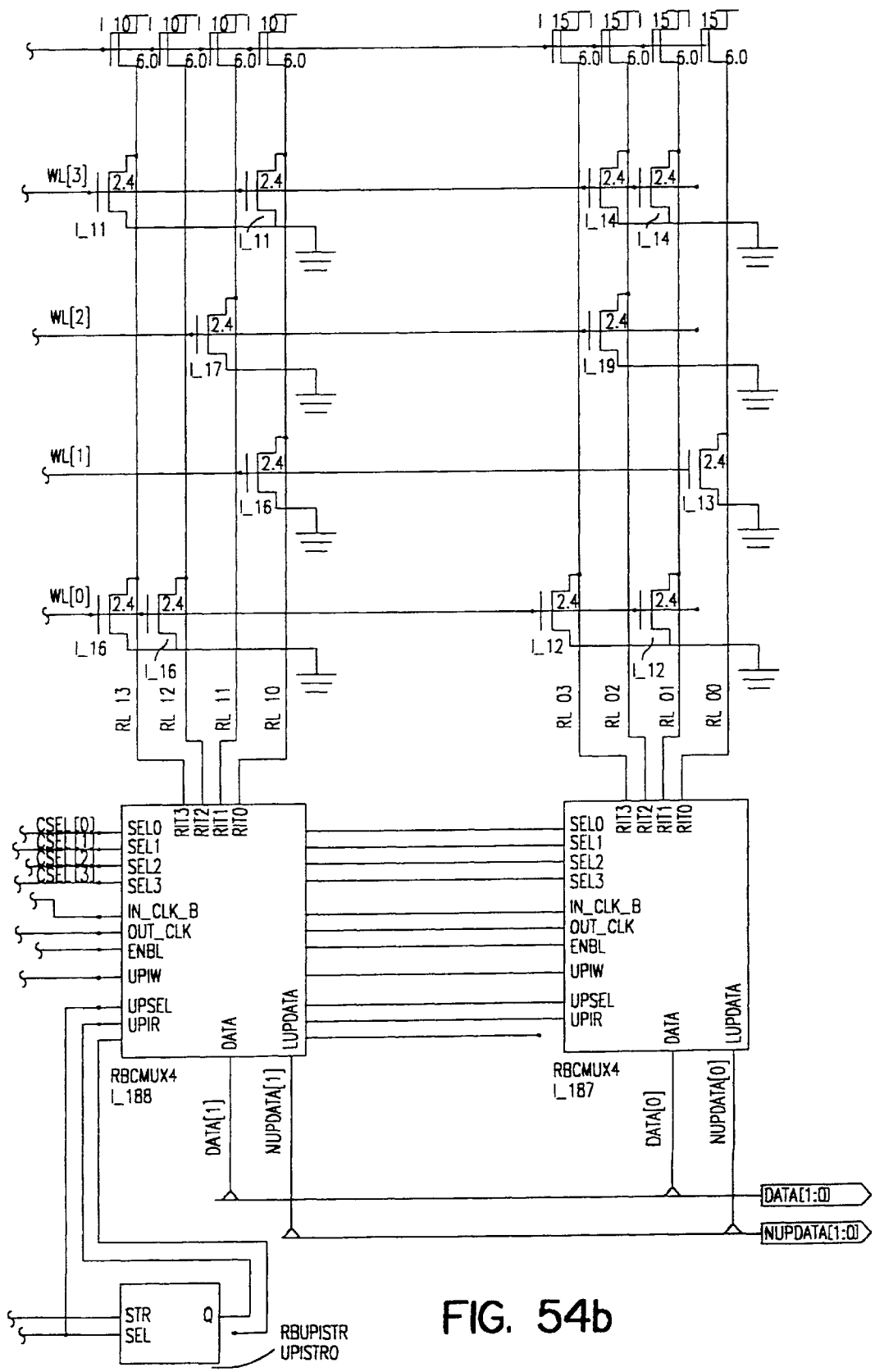

The schematic shown in FIG. 54 illustrates a very small sample ROM design of the type used to implement the Huffman code ROM 302 in accordance with the present invention. The unusual features of this ROM 302 lie in the AND-plane where predecode and "don't care" handling are used to implement a method of decoding variable length Huffman codes.

Figure 55:
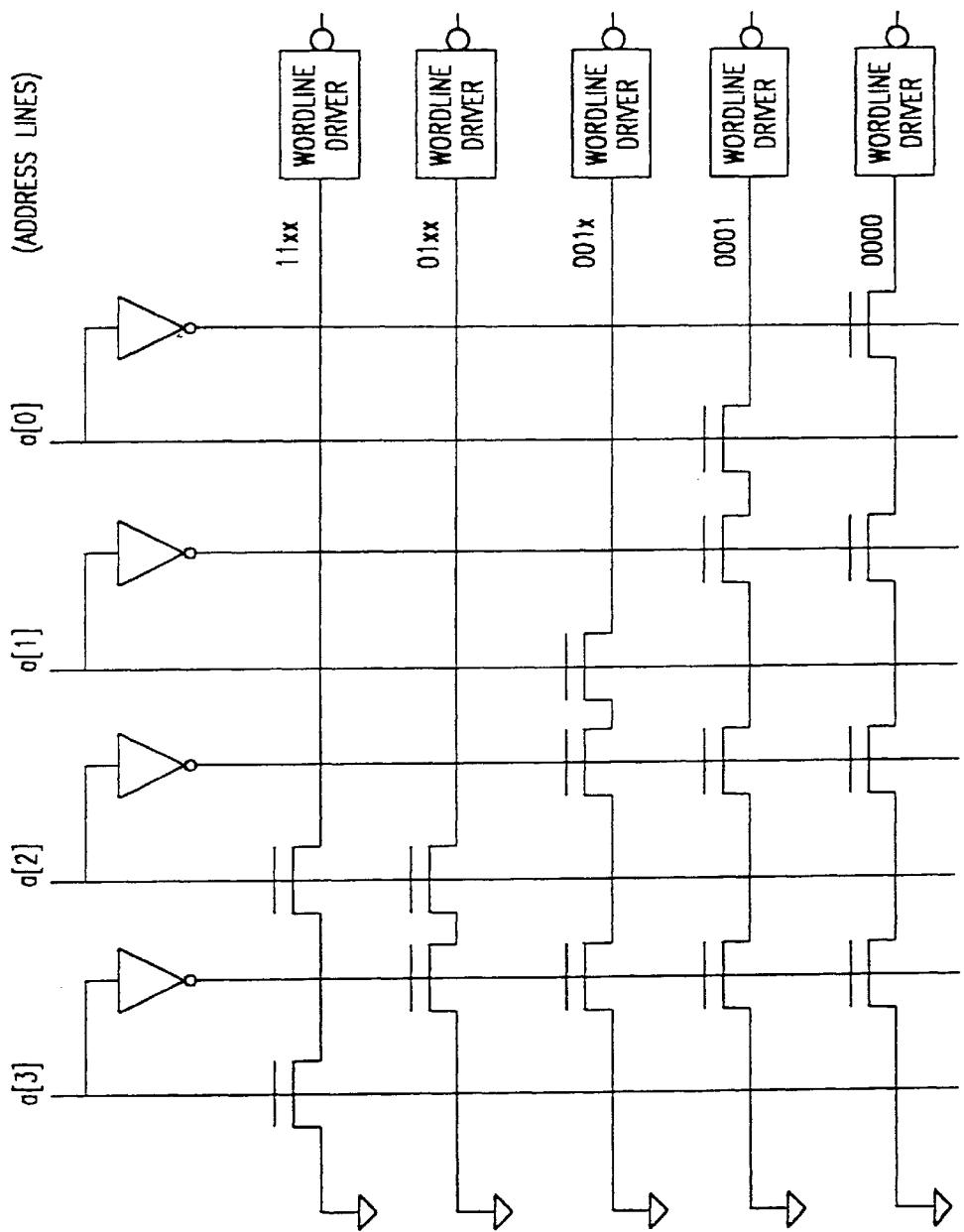
FIG. 55 illustrates a first embodiment of a ROM adapted for decoding parallel huffman codes.
Figure 56:
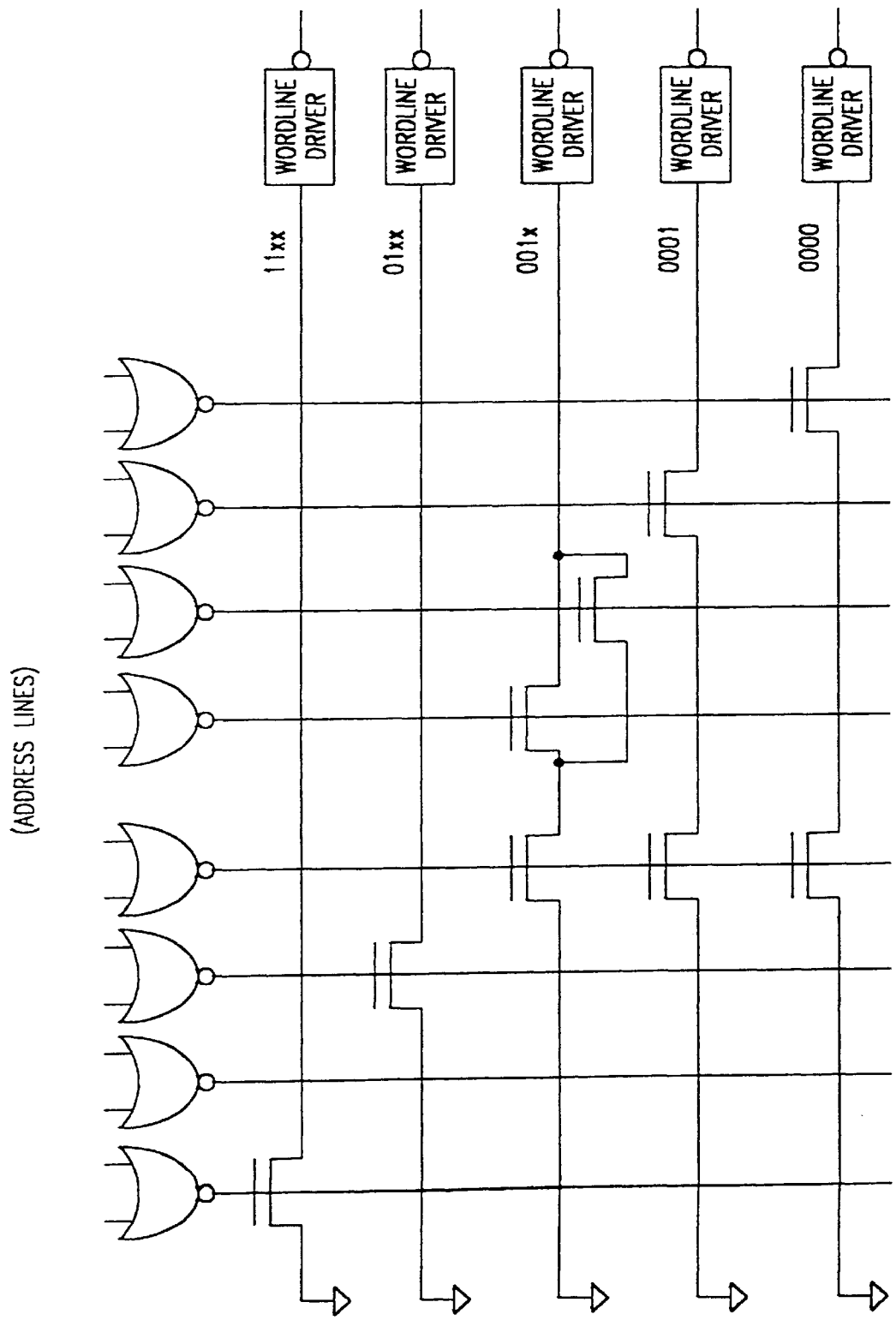
FIG. 56 illustrates a second embodiment of a ROM adapted for decoding parallel huffman codes.
Figure 57:
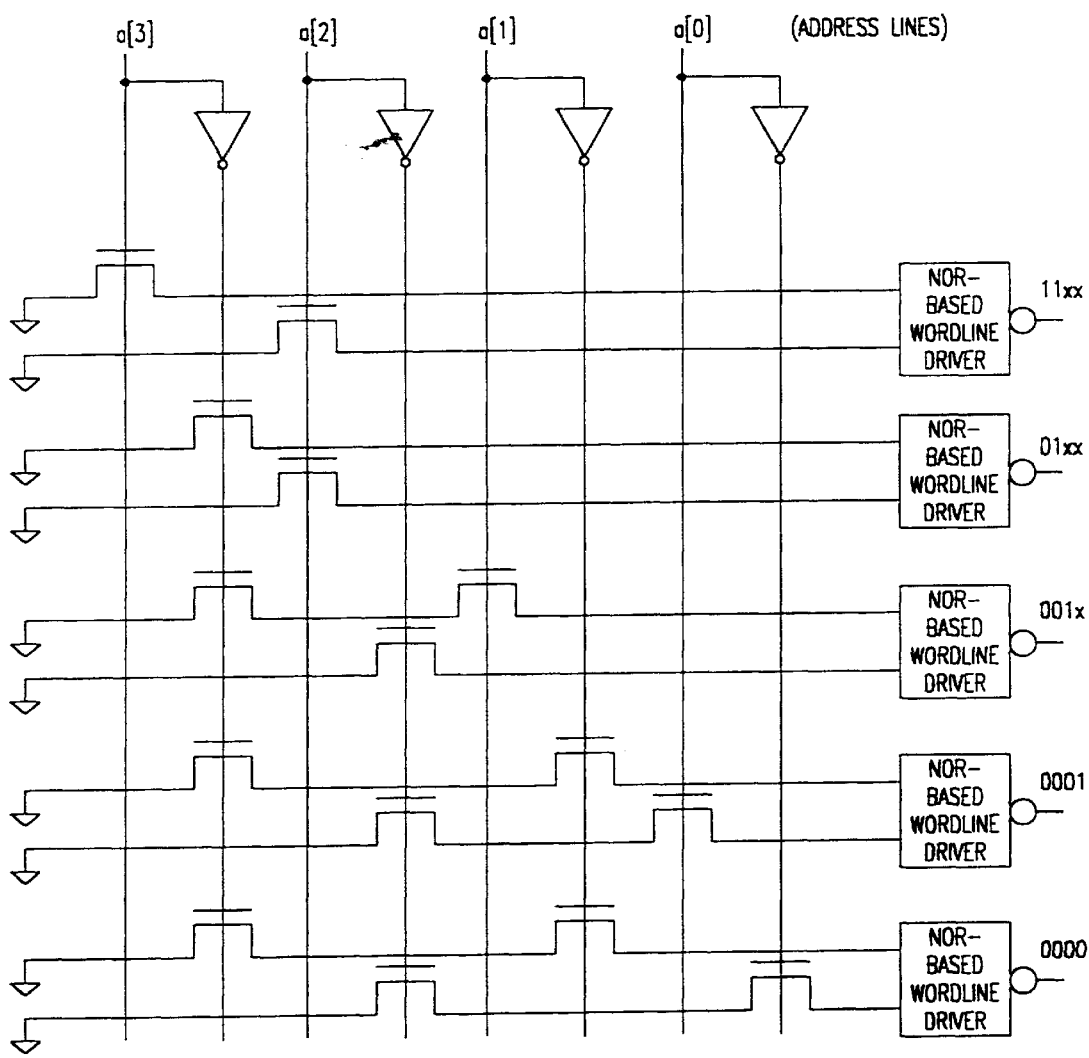
FIG. 57 depicts a third embodiment of a ROM adapted for decoding parallel huffman codes.

Referring now to FIGS. 55, 56 and 57 and, more particularly to FIG. 55, there is shown a first embodiment of a ROM AND-plane capable of "don't care" handling. In this embodiment, each address line (a[3], a[2], a[1 ] and a[0]) is driven across the AND-plane in both its true and inverted directions. To decode a "one" or a "zero" on a given address line, a transistor is connected to either the true or inverted address line in the conventional manner. In order to decode a "don't care" (denoted by x) a transistor is not connected to either the true or the inverted line.

FIGS. 56 and 57 show alternative embodiments that utilize pre-decoding to reduce worst-case number of series transistors in the decoding logic. In these examples, two address bits are combined together in predecoding such that one of four lines is driven high for each of the four possible numbers that can be represented with the two address bits. It will be appreciated by one of ordinary skill in the art that the present invention would work equally well with higher levels of predecoding in which more than two bits are combined together. If the two address bits that are grouped together in the predecoding have defined values (either 1 or zero, but not the "don't care") then a transistor is connected to the appropriate predecoded address line in the conventional manner. Similarly, if both of the address bits have a "don't care", then no transistor is used as before. However, if one of the address bits needs to have a defined value (1 or zero) whilst the other address bit requires "don't care", then the decoding requires that the wordline driven across the Or-plane be selected when either of two of the predecoded address lines is active. In the embodiment shown in FIG. 56, this is achieved by placing two transistors, one on each of the relevant predecoded address lines, in parallel as shown in the case for the code; 001x. In the embodiment shown in FIG. 57 the required decoding is achieved without using a parallel connection of transistors. In this case, two separate decodes are performed both of which must be selected. They are combined together using a NOR gate in the wordline driver such that the wordline is only activated if both of the selects are active.

The foregoing description is believed to adequately describe the overall concepts, system implementation and operation of the various aspects of the invention in sufficient detail to enable one of ordinary skill in the art to make and practice the invention with all of its attendant features, objects and advantages. However, in order to facilitate a further, more detailed in depth understanding of the invention, and additional details in connection with even more specific, commercial implementation of various embodiments of the invention, the following further description and explanation is proffered.

The following more detailed description of the system of the present invention is set forth for purposes of organization, clarity and convenience of explanation under the headings listed below:

Overview
Start Code Detector
Parser
Spatial Processing
Predictions
Display Circuitry
Parallel Start Code Detector (scdp)
Input Fifo
Input Circuit
Start Codes
Removal of bit stuffing
Search modes
Non-aligned start codes
Overlapping Start Codes
Unrecognized Start Codes
Extension and User Data
Insertion of PICTURE_END Tokens
Stop After Picture Interrupt
discard_all
Access Bit
Tokens Recognized by scdp
Scdp Memory Map
Implementation
DataFlow Around the Coded Data Buffer
Theory of Operation
Discontinuities
Start-up
Embodiment
Hardware
MSM handling of Time-Stamp Information
Start-Up
MSM Time-stamp error codes
Support for 30 Hz
Introduction
State Machine
Jumps and Calls
Interrupts and errors
Jump addresses
State Machine internal instructions
State Machine testing
State Machine ucode map
State Machine ucode word
Arithmetic Core
ALU
Shift block
Carry block
Condition block
ALU core
ALU ucode word
Use of the ALU
Register File
Register file addressing
Register file register types
Register file address map
Register file ucode word
Token Port
Token Port ucode word
Multiplexers
UPI Memory Map
Introduction
Interfaces
Functional Description
Timing requirements
Microprocessor Interface Access
Introduction
Interfaces
Functional description
Mal-formed tokens
Zig-zag scan paths
Raster scan order
Microprocessor Interface Access
Introduction
Prediction in frame pictures
Frame-based prediction
Field-based prediction (in a frame picture)
Dual prime (in frame pictures)
Prediction in field pictures
Field-based prediction
16×8 MC
Dual prime in field pictures
Overall organization
Horizontal Upsampler
Introduction
4:3 Upsampling
3:2 Upsampling
2:1 Upsampling
Boundary Effects
The number of output pels
Position signals
Multiplexed data
Horizontal Alignment
Upsampling ratio
Video Timing Generator
Introduction
Horizontal Timing
Vertical Timing - PAL
Vertical Timing - NTSC
VTG Structure
Horizontal Machine
Vertical Machine
Hardwired Comparator Design
Output multiplex
Border generation
Vertical Border
UPI controls
Output multiplex

Overview

Figure 58:
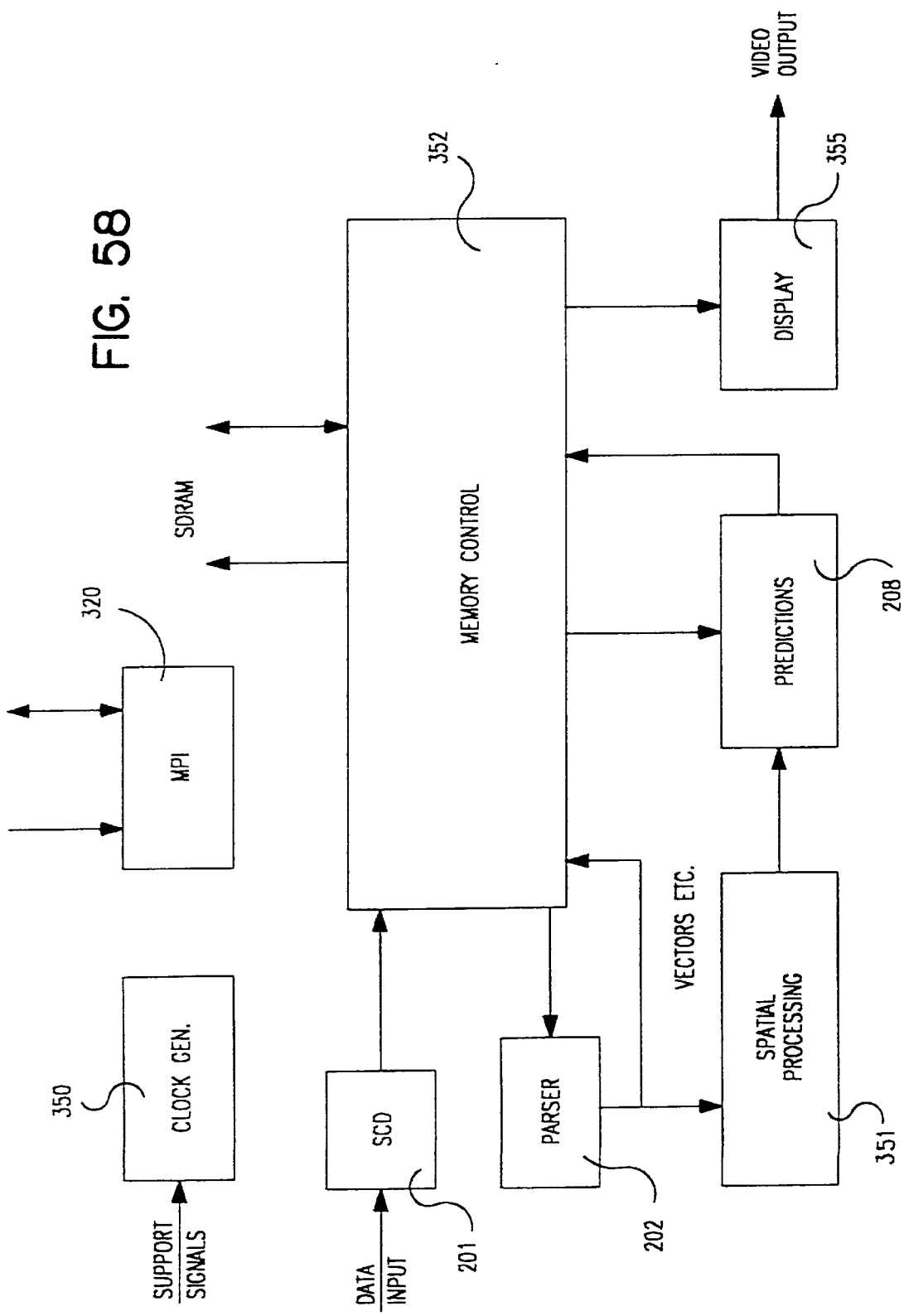
FIG. 58 is a block diagram illustrating the primary system component of one embodiment of the present invention.

This detailed description deals with the present invention as an entire chip. Referring now to FIG. 58, there is shown a very high level block diagram of the system. In subsequent sections, each block is expanded to provide a more detailed block diagram.

This description accurately documents all of the interfaces between the various functional blocks of circuitry. This should allow each block to be designed with a complete knowledge of the interfaces that it is expected to provide.

As shown in FIG. 58, the primary system components include clock generator 350, a start code detector 201, a parser 202, a microprocessor interface 320, a memory control subsystem 352, a spatial processing subsystem 351, a predictions subsystem 208 and a display 355. FIG. 58 further illustrates the interfacing that occurs between the various system components.

Start Code Detector

Figure 59:
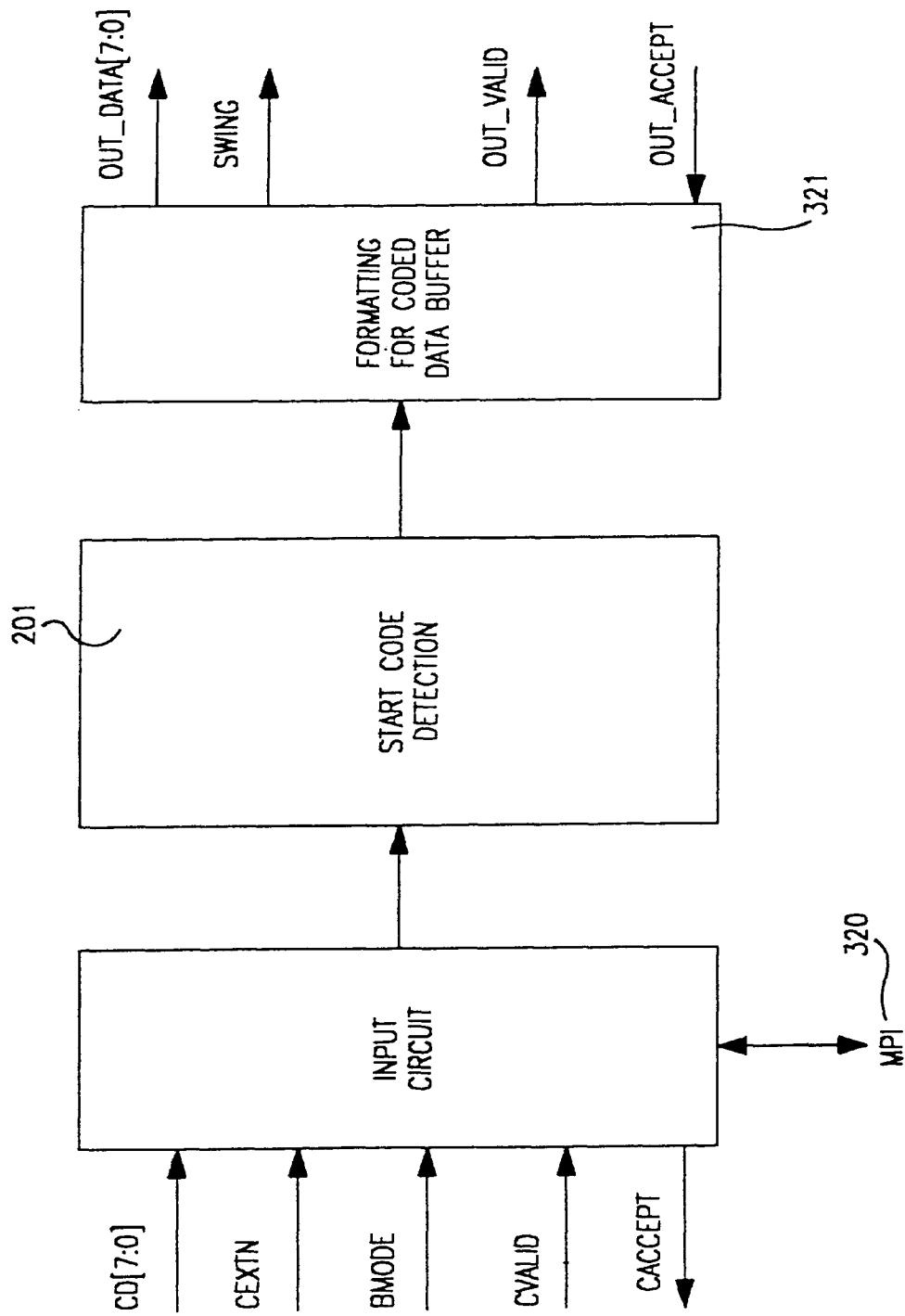
FIG. 59 is a block diagram depicting the start code detector of the present invention.

FIG. 59 shows the start code detector 201 (SCD) interfaces with other blocks of circuitry of the system in accordance with the present invention.

The SCD 201 can be thought of as providing three distinct functions. First, the SCD 201 provides an input circuit that receives data either from dedicated pins or from the MPI 320. Second, the SCD 201 detects start codes in the data, and third, the SCD provides the necessary circuitry to assemble the incoming data into a format to be used internally within the coded data buffer (CDB) 321.

Parser

Figure 60:
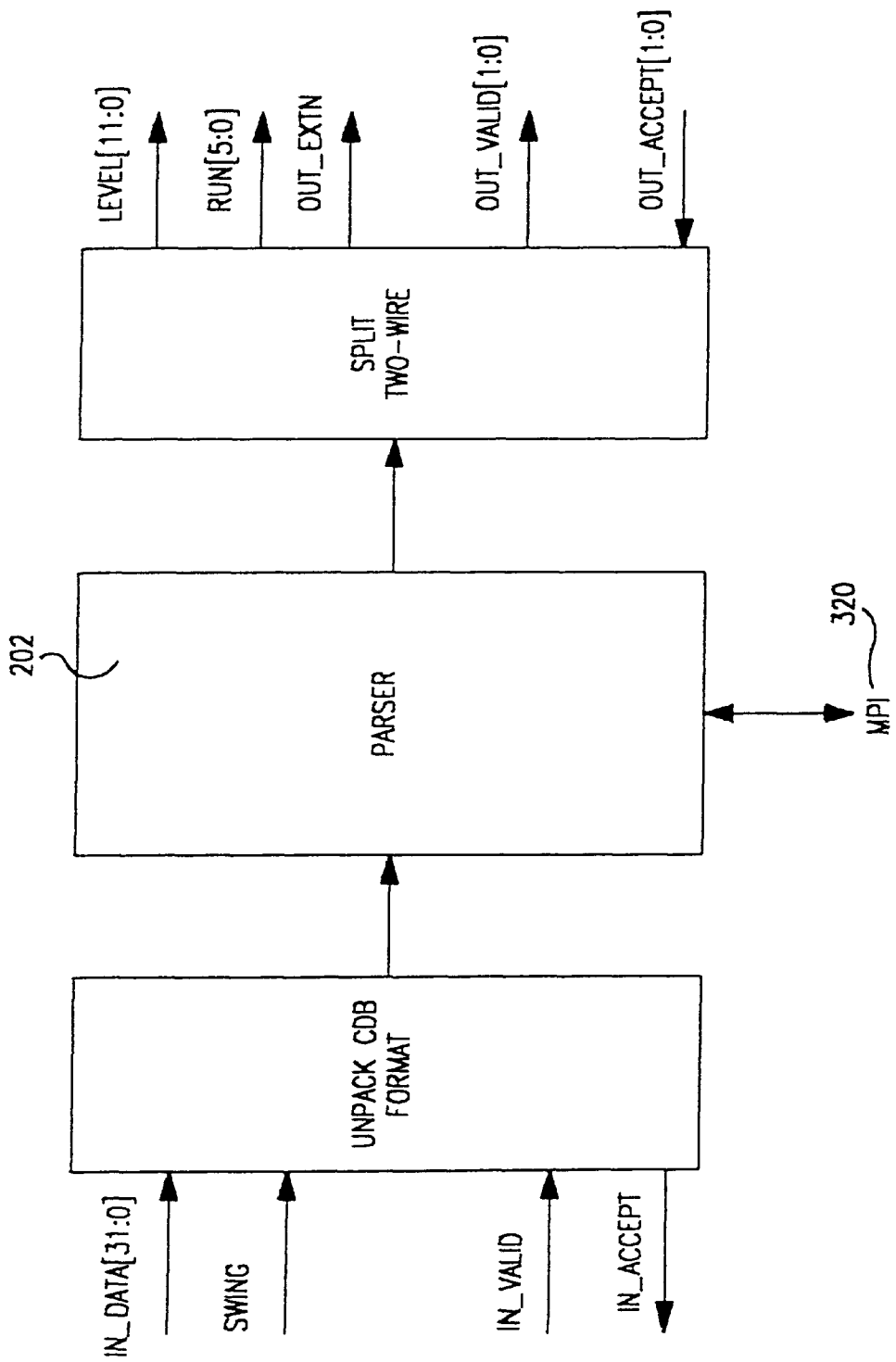
FIG. 60 is a block diagram showing the parser of the present invention.

FIG. 60 illustrates the parser subsystem. in accordance with the present invention. Data which was formatted for the CDB 321 is unpacked and passed to the parser which receives instructions from the MPI 320. Thereafter, the data is passed via a two-wire interface to the rest of the system.

Spatial Processing

Figure 61:
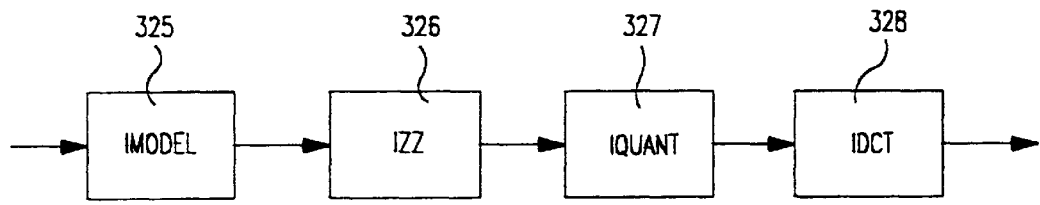
FIG. 61 is a block diagram depicting the primary components of the spatial processing circuitry of the present invention.

FIG. 61 illustrates the components of the spatial processing circuitry. These components include an inverse modeler (Imodel) 325, an inverse zig-zag (IZZ) 326 and inverse quantizer (Iquant) 327 and an inverse discrete cosine transfer (IDCT) 328. The data passes into the Imodel 325. then to the IZZ 326, next to the Iquant 327 and then to the IDCT 328.

Display Circuitry

Figure 62:
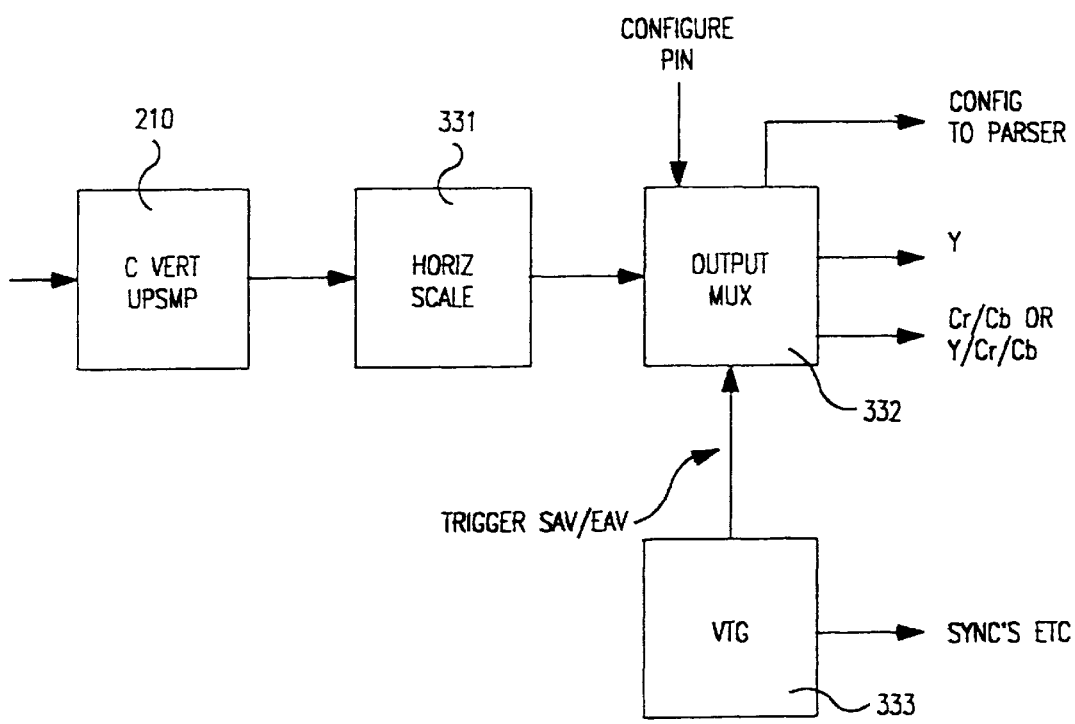
FIG. 62 is a block diagram illustrating the display circuitry, in accordance with the present invention.

The display circuitry of the present invention is shown in FIG. 62. This system includes a vertical upsampler 210, a horizontal scale subsystem 331, an output multiplexer 332 and a video timing generator 333.

Parallel Start Code Detector (scdp)

The start code detector 201, in accordance with the present invention, is a parallel start code detector, i.e., it passes data in parallel. This system is similar to that previously disclosed in British Application Serial No. 9405914.4 filed Mar. 24, 1994, and EPO Applicaation Serial no. 92306038.8 filed Jun. 30, 1992, (hereinafter "Brolly"). However, several major differences exist between the two start code detectors. First, byte alignment is assumed. There is no shifting of the data in order to find start codes in the present invention. Second, the present invention operates primarily with MPEG data.

An MPEG (1 and 2) start code consists of a unique bit (byte pattern) in the bit stream known as the start_code_ prefix. The pattern is 23 zeros followed by a one. The 8 bits immediately following the start_code_prefix is known as the start_code_value. This indicates the type of the start code. Start codes arriving at the SCD of the present invention are required to be byte aligned. Accordingly, the above data can be specified as a byte sequence. For example:

0x00

0x00

0x01

0xb8 is a group_start code.

Input Fifo

The present invention is designed such that given a peak data rate of 250 Kbytes/s and assuming that the coded data buffer does not overflow, the in_accept pin will never be pulled low. Hence, to calculate the length of the input fifo, it is necessary to know: 1) the worst case wait time for a swing buffer, and 2) the worst case data expansion through the SCD.

With the input data arriving at the coded data clock rate, in accordance with the present invention, sodp will generate two stalls per start code (having removed three bytes from the data stream).

Input Circuit

The input circuit of the present invention performs exactly the same way as is disclosed in Brolly. However, there are a few differences of note between the two circuits. First, the upi won't be made to wait until a valid end of a token ('cause this may never set). Instead, it will be made to wait until a signal in_token is low. Second, generation of the DATA header, when entering byte mode, depends on there being some byte mode data.

Start Codes

In the present invention, the MPEG start codes are recognized and converted to tokens by the SCD. These are shown in Table 15.

TABLE 15

| Start Code Values | |
|---|---|
| Start Code Type | Start Code Value |
| picture_start_code | 0 × 00 |
| slice_start_code | 0 × 01 to 0 × af |
| reserved | 0 × b0 |
| reserved | 0 × b1 |
| user_data_start_code | 0 × b2 |
| sequence_start_code | 0 × b3 |
| sequence_error code | 0 × b4 |
| extension_start_code | 0 × b5 |
| reserved | 0 × b6 |
| sequence_end_code | 0 × b7 |
| group_start_code | 0 × b8 |

Removal of Bit Stuffing

Any zero bits preceding a start_code_prefix are stuffing and can safely be removed. In the present invention, only complete bytes of stuffing are removed.

For example, in the byte sequence shown below there are 13 stuffing bits, only 8 of which are actually removed.

0x20 //5 stuffing bits

0x00 //8 stuffing bits

0x00

0x00

0x01 //start_code_prefix

Search Modes

The search_modes, in accordance with the present invention, are described as follows in Table 16:

TABLE 16

| Search Modes | |
|---|---|
| Search_mode | Operation |
| 0 | Normal Operation |
| 1 | Search for picture_start or higher |
| 2 | Search for group_start or higher |
| 3 | Search for sequence_start or higher |

Any non-zero search mode causes all arriving data to be discarded until the desired class of start code is found. At this point, the search mode is reset to zero, and a start_code_search interrupt may be generated. A new control bit, stop_on_search, determines whether the SCD actually stops after generating the interrupt (the interrupt is also masked in the usual way, but stopping is not mandatory).

In the present invention, search_mode is also set to zero if the SCD receives a FLUSH token. However, when the FLUSH token terminates discard_all, search_mode is completely reset, i.e., search_mode is reset by the combination of a FLUSH token and discard_all.

Non-aligned Start Codes

Any run of more than one zero bytes followed by a 0x01 is a start code. Furthermore, any run of greater than 23 zeros NOT followed by a one is a non-aligned start code. In the byte aligned world, this translates to: If, after removal of bit stuffing, 0x01 is not received, then the start code was non-aligned. Note that this statement actually misses some non-aligned start codes (where less than a byte of stuffing was involved).

Rather than going to the effort of describing in the data sheet which classes of non-aligned start codes are detected, the scdp of the present invention ignores them. In other words, stuffing is still removed.

Overlapping Start Codes

It is possible for the "value" part of a start code to form part of the "prefix" of a subsequent start code. This typically occurs for two reasons: 1) the standard allows system level start codes to occur anywhere in the stream—including directly in the middle of a video level start code, and 2) errors. Removing all erroneous looking start codes until the last one provides a better chance of error recovery.

In the byte aligned environment, in accordance with the present invention, the only way an overlapping start can happen is if a picture_start (value=0x00) forms part of another start code. In this scenario, the picture_start is removed from the data, and the second start code is decoded. If this, in turn, is overlapped then the same procedure applies until a non-overlapping start code is detected..

Unrecognized Start Codes

In the present invention, the reserved values (0xb0, 0xb1, 0xb6), all system start codes (0xb9 to 0xff), and the sequence_error code (0xb4) are each treated as unrecognized start codes. After removing the unrecognized start code, the SCD discards all incoming data until the next valid start code is found. It will also set the unrecognized_start error register and, depending on the unrecognized_start mask, will generate an interrupt.

Extension and User Data

Two configuration bits are used in the present invention:
1) Discard_user (or not)
2) Disscard_extn (beyond MPEG2 main profile, main level)

Both of these configuration bits are reset to ONE.

MPEG2 start codes are different. The four bits following the extension_start_value are now an extension_start_code_identifier and must be decoded by the SCD. Four new tokens are generated to flag these. The allowed extension_start_code_identifiers and their respective tokens are shown in Table 17. However, reserved extension_start_code identifiers are not recognized. Unrecognized extension$_{613}$ start_codes are either discarded (depending on Discard_extn), or replaced with the (old) extension$_{613}$ data token.

TABLE 17

MPEG2 extension_start code_identifiers

| extension_start code_identifier | Name | New Token | Head |
|---|---|---|---|
| 0000 | reserved | | |
| 0001 | Sequence Extension ID | SEQUENCE_EXTN | 0 × e8 |
| 0010 | Sequence Display Extension ID | SEQUENCE_DIS-PLAY_EXTN | 0 × e9 |
| 0011 | Quant Matrix Extension ID | QUANT_MATRIX_EXTN | 0 × ea |
| 0100 | reserved | | |
| 0010 | Sequence Scalable Extension ID | | |
| 0110 | reserved | | |
| 0111 | Picture Pan Scan Extension ID | | |
| 1000 | Picture Coding Extension ID | PICTURE_CODING_EXTN | 0 × eb |
| 1001 | Picture Spatial Scalable Extension ID | | |
| 1010 | Picture Temporal Scalable Extension ID | | |
| 1011 to 1111 | reserved | | |

Insertion of PICTURE_END Tokens

None of the current standards (MPEG1,2, JPEG, or H.261) specify a way of ending a current picture.

However, in the present invention, the SCD 201 maintains a piece of state called in_picture. This state is set whenever a PICTURE_START token is output by the SCD 201. Any subsequent start code that is higher in the syntax than picture start (or a FLUSH token) causes the generation of a PICTURE_END token. The PICTURE_END token is generated and output before any tokens associated with the new start code. in_picture is reset when the PICTURE_END token leaves the SCD 201. If the SCD 201 receives tokens in the input data stream, the action is logically identical—including receiving a PICTURE_END token. In summary, the start codes (and tokens) which may cause a PICTURE_END to be generated, in accordance with the present invention, are:

picture_start_code OR token group_start_code OR token sequence_start_code OR token sequence_end_code OR token FLUSH token

Stop After Picture Interrupt

The stop after picture (sap) feature is of the present invention functions to facilitate a clean way of finishing off a current sequence, e.g., channel change. It is necessary to accomplish this function as automatically as possible and without the need for external real time software.

The sap control bit is referred to as a flag_picture_end.

There are two control bits in addition to the flag_picture_end, mask, and error bits:

1) after_picture_stop: Determines whether, after generating the interrupt, the SCD stops.
2) after_picture_discard: Having generated a flag_picture_end interrupt, this bit determines whether scdp automatically goes into discard_all mode.

In this way, discard_all mode doesn't need to know what event called it and it is possible to leave the discard_all mode and to proceed to a search mode quickly and cleanly.

In accordance with the invention, whenever a PICTURE_END token is output by the SCD, the flag_picture_end bit determines whether any action is taken. If flag_picture_end is set, a FLUSH is generated after the PICTURE_END, and the event is generated. Interrupting depends on the flag_picture_end_mask, and (having interrupted) stopping depends on after_picture_stop.

By way of example, for a channel change, the sequence of events is as follows:
1) Set flag_picture_end with after_picture_stop=0 and after_picture_discard=1.
2) Respond to flag_picture_end_event.
   a) Set search mode to sequence (for example).
   b) Retune, etc.
3) Either FLUSH or s/w resets discard_all.
4) scdp searches for the start of the next sequence.

discard_all

An R/W control bit, discard_all, causes the scdp of the invention to discard all input up to and including a FLUSH token. This bit is automatically reset by a FLUSH token and may be set by the flag_picture_end function.

Tokens Recognized by scdp

While the primary function of most of the scdp of the present invention is related to actual token generation, there are, several tokens which when applied to the coded data port (or via the input circuit) are decoded and acted upon by the scdp. Table 18 illustrates and defines these tokens.

TABLE 18

Recognized Input Tokens

| Token | Header | Action | Comments |
|---|---|---|---|
| FLUSH | 0 × 17 | Flushes scdp | These tokens may cause the generation of a PICTURE_END. In this case, they would reset in_picture and may cause a flag_picture_end event and a FLUSH to be generated. |
| PICTURE_START | 0 × 12 | Sets in_picture | |
| PICTURE_END | 0 × 16 | Resets in_picture | |
| GROUP_START | 0 × 11 | | |
| SEQUENCE_START | 0 × 10 | | |
| SEQUENCE_END | 0 × 14 | | |
| DATA | 0 × 04 etc. | Data is searched for start codes | |
| Other | — | Unrecognized tokens are passed through scdp unchanged | |

Scdp Memory Map

The various registers and their associated addresses for the scdp of the present invention are described in Table 19.

TABLE 19

Parallel Start Code Detector Memory Map

| Register Name | Bits | Reset | Comments | Address |
|---|---|---|---|---|
| scdp_access | | 0 | | 0 × 0 |
| scdp_access | [0] | 0 | Access bit | |
| scdipc_cd0[7:0] | | | | 0 × 1 |
| CD0[7:0] | [7:0] | | upi coded data port | |
| scdipc_cd1[7:0] | | | | 0 × 2 |
| coded_busy | [7] | 1 | Read Only | |
| enable_coded | [6] | 0 | | |
| coded_extn | [7] | | Read Only | |
| scdp_ctl0[7:0] | | 0 × 30 | | 0 × 03 |
| discard_extn | [5] | 1 | | |
| discard_user | [4] | 1 | | |
| discard_all | [3] | 0 | Reset by FLUSH | |
| flag_picture_end | [2] | 0 | Enables event | |
| after_picture_stop | [1] | 0 | Only if event enabled | |
| after_picture_discard | [0] | 0 | Only if event enabled | |
| scdp_ctl1[7:0] | | 0 | | 0 × 4 |
| stop_after_search | [2] | 0 | Only if event enabled | |
| start_code_search[2:0] | [1:0] | 0 | | |
| scdp_event[7:0] | | 0 | | 0 × 5 |
| end_search_event | [0] | 0 | | |
| unrecognized_start_error | [1] | 0 | | |
| flag_end_lof_picture_event | [0] | 0 | | |
| scdp_mask[7:0] | | 0 | | 0 × 6 |
| end_search_mask | [2] | 0 | | |
| unrecognized_start_mask | [1] | 0 | | |
| flag_end_lof_picture_mask | [0] | 0 | | |

DataFlow Around the Coded Data Buffer

The present invention provides the following advantages:
1) A method of forcing the buffer to swing.
2) A way of avoiding having to pack bytes into an odd number of bits.
3) Reducing the width of the (potentially long) bus of the SCD down to 8 bits.

4) The SCD does its own packaging into 32 bit data. To avoid a large bus, this bit of the SCD sits inside the dramif. In the present invention, it is referred to as sccdbin. This module packs all DATA into 32 bit words, dead-reckoning in between non-DATA tokens.
5) The swing buffers do their own counting and swinging. The buffers flush in response to a signal, fill_and_ swing, from sccdbin in response to a PICTURE_END or a FLUSH token (or signal).
6) The unpacking module, sccdbout, which sits prior to the Huffman Decoder, deletes all data following a FLUSH or PICTURE_END until it receives a buffer_ start signal provided by the output swing buffer.

Introduction

This section defines the handling of time_stamp information, in accordance with the present invention.

Theory of Operation

In MPEG-2 video and audio, data is synchronized using information carried in the MPEG-2 systems stream. There are essentially two types of information that deal with synchronization; clock references and time-stamps.

Clock references are used to inform the decoder what number is used to represent the time "now". This is used to initialize a counter that is incremented at regular intervals so that the decoder has, at all times, a notion of what the current time is.

Time-stamps are carried for each of the streams of data that are used to make up the program (typically video and audio). In the case of video, a time-stamp is associated with a picture and it tells the decoder at what "time" (defined by the counter that was initialized by the clock reference) it should display the picture.

However, as with all things in MPEG, the situation is rather more complicated than this. There are two types of clock references; Program Clock References (PCRs) and System Clock References (SCRs). Clock has information to a resolution of 90 kHz while the other clock has additional information to extend the resolution to 27 MHZ. Clock references are included in the data stream fairly often in order that "time" may be reinitialized after a random access or channel change.

There are also two types of time-stamps: Presentation Time-Stamps (PTSs) and Decoder Time Stamps (DTSs). These only differ for I-pictures and P-pictures which have to be reordered (not B-pictures). The DTS tells you when to decode the picture, whereas the PTS tells you when to display it. In the simple case of frame pictures with no 2–3 pull-down effects, the diffrence between DTS and PTS of an I-picture or P-picture will be one more than the number of B-pictures that follow that picture frame periods.

The important complication to appreciate is that the DTS and PTS refer to a hypothetical model of a decoder that can decode pictures instantly. Any real decoder cannot do this and must take steps to modify the theoretical time that it should display pictures (defined by the time-stamps and the clock references). This modification will depend on the details of the architecture of the decoder. Clearly any delay introduced by the video decoder must be matched by an equivalent delay in the audio decoder.

Discontinuities

Discontinuities in the concept "time" may occur. For instance, in an edited bitstream each edit point will have discontinuous time. A similar situation occurs at a channel change. Care must be taken because using a time-stamp that was encoded in one time regime with respect to a "time" defined by a clock reference from another regime will clearly lead to incorrect results.

Start-up

A particular problem occurs at start-up (or channel change) because there are two potentially competing requirements for starting to decode correctly. For video considerations, it, is now necessary to start decoding with an I-picture that follows a system header (this may not be true in all situations, but is largely a correct statement) but for system considerations the first decoded picture ought to carry a time-stamp. However, there is no requirement that every picture carry a time stamp and, therefore, it is possible that one may wait for ever if they try and look for a picture that is both an I-picture and carries a time-stamp.

One might think of calculating what the time-stamp would have been for an I-picture from a picture that precedes it that does have a time-stamp. Unfortunately this is very difficult to do because it would be necessary to partially decode the intervening pictures to determine whether they are field or frame pictures (and whether repeat_first_field is set). This requires that the data go through the coded data buffer and be discarded by the Huffman Decoder.

Embodiment

Figure 63:
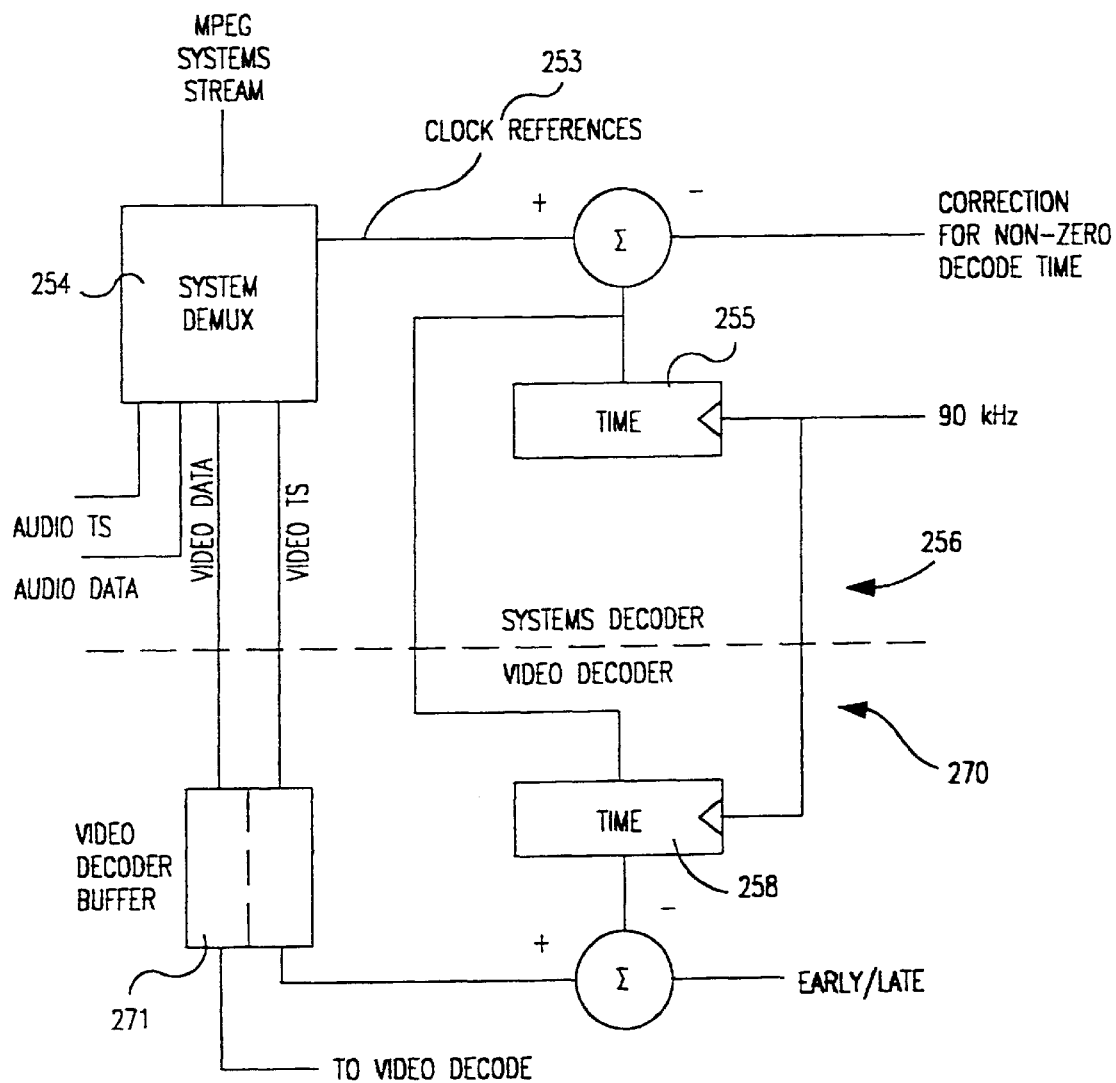
FIG. 63 illustrates one embodiment of timestamp management, in accordance with the present invention.

FIG. 63 shows a first embodiment for implementing time-stamp management. The clock references 253 are decoded by the system demultiplex 254 of the present invention and placed into a counter 255, incremented at 90 kHz, that represents time. They are also loaded into a second copy of the counter 258 that is located inside the video decoder 270.

The time-stamps flow through the video buffer 271 so that they are delayed by the same amount as the video data. These are then compared with the local copy of time to determine whether the picture is too early or too late.

Figure 64:
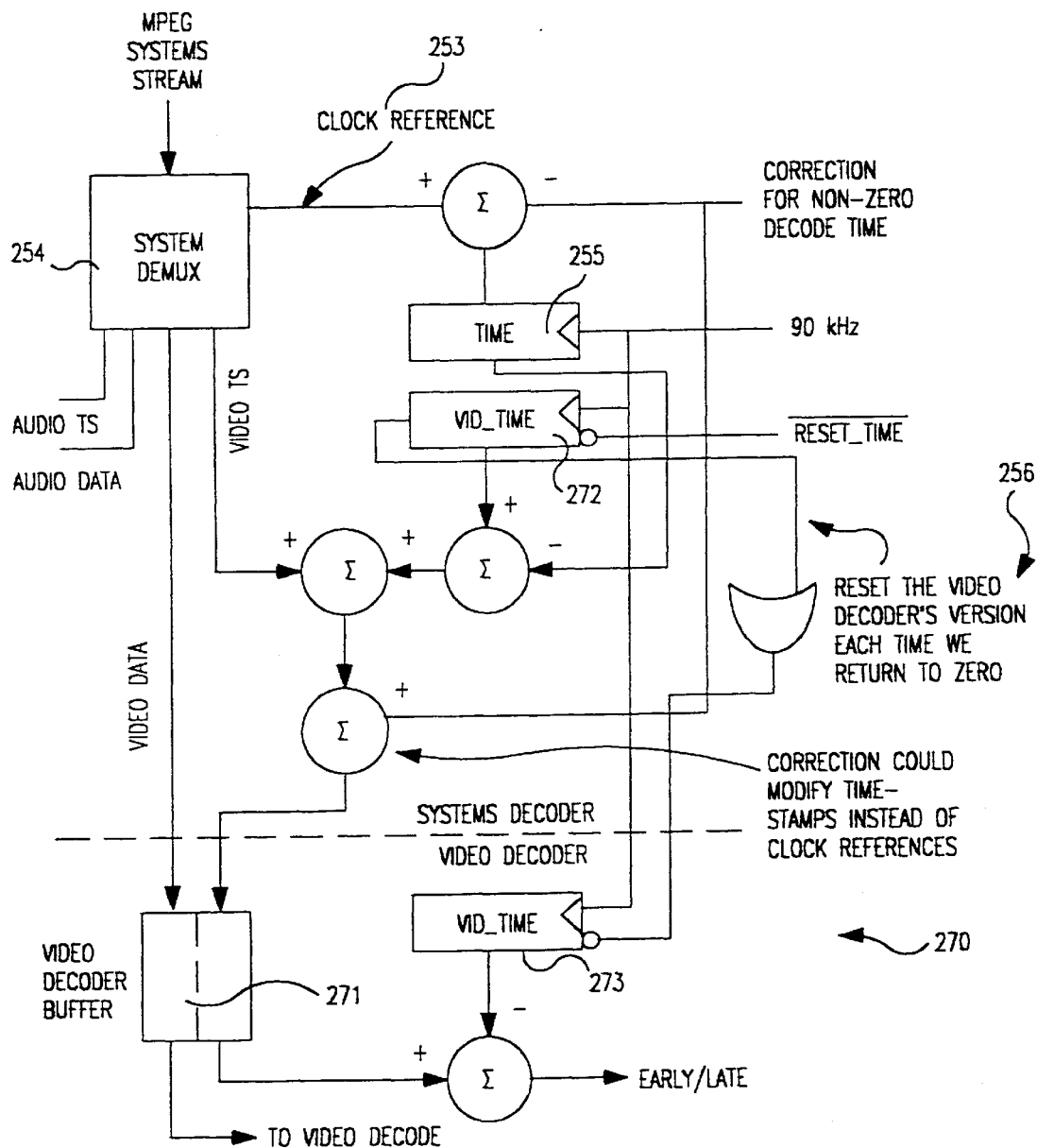
FIG. 64 shows another embodiment of timestamp management in the present invention.

Another embodiment, in accordance with the present invention, is shown in FIG. 64. This avoids the need for the clock references 253 to be passed to the video decoder 270. This is achieved by using a second counter "vid_time" 272, 273 which is maintained both in the video decoder 270 and the system decoder 256. They are reset at power on and then free run from there on. Since this embodiment requires that the two counters stay in step, it is necessary to take steps to ensure they do not get out of step. This can be accomplished using carry out of the counter in the system demux to reset the one in the video decoder (as shown).

Another advantage of this embodiment is that there is no need for the full 33 bits of the number to be dealt with. The ideal would be to restrict the counters to 16 bits to allow 16 bit handling on the video decoder 270. Although this would appear to represent an insufficient number range at a resolution of 90 kHz (only ⅔ second), there is no need for such high precision because on the video decoder, the time control is only accurate to a field time either way since the VTG free-runs (or is gen-locked to something that has nothing to do with the MPEG stream being decoded).

As a result, it seems that the lower order few bits of the time-stamp going to the decoder can be discarded. In the present invention, four bits are discarded. This means that the video decoder uses 16 bits of a 20 bit number. The resolution is, thus, 5625 Hz and can represent a time difference of 11.65 seconds.

Therefore, a PAL field is 112.5 ticks of the 5625 Hz clock. An NTSC field 93.84 ticks. Hence, it is still possible to achieve timing calculations to an accuracy of about 1% of a field time which is adequate for the present invention.

Hardware

Figure 65:
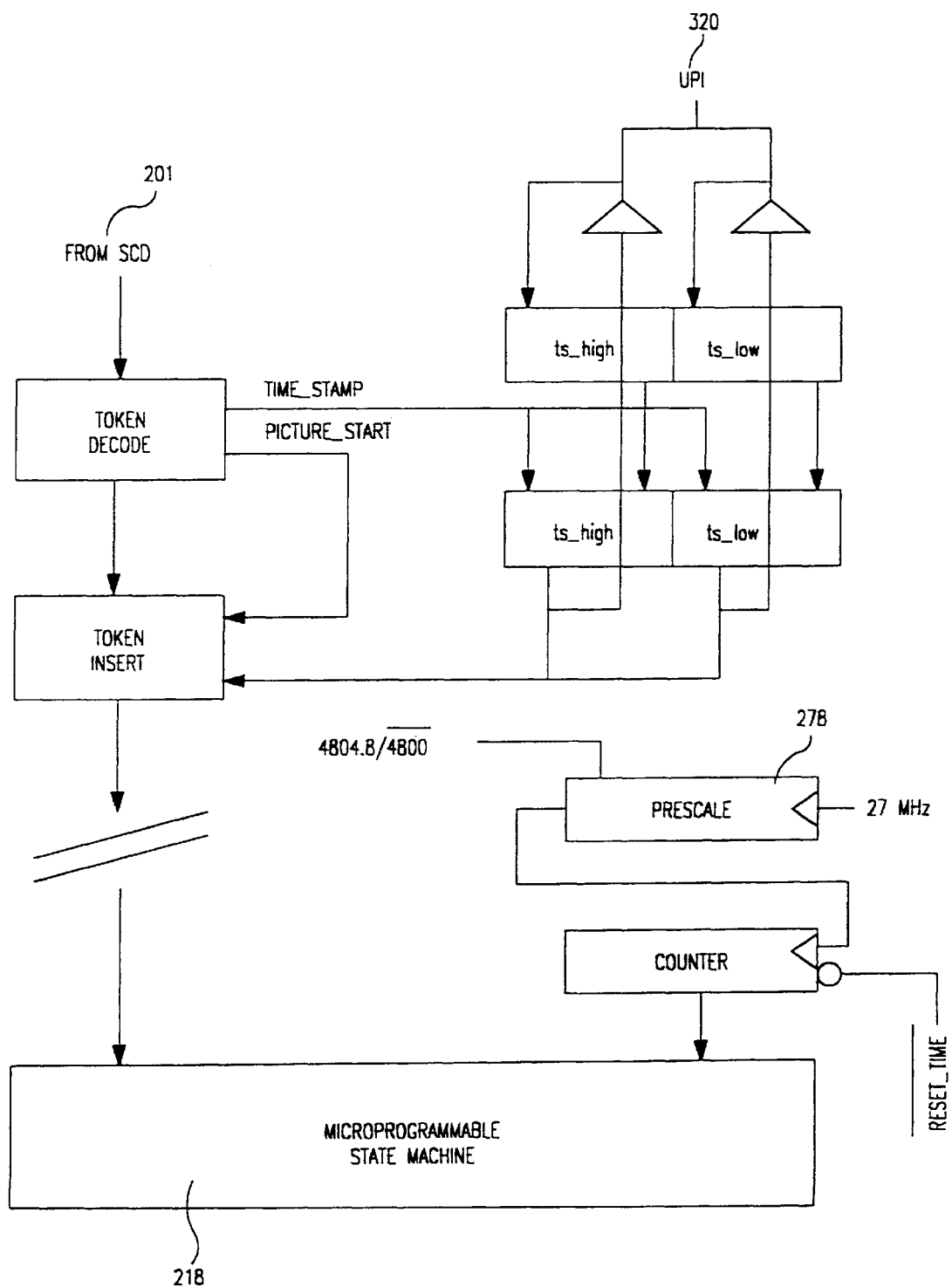
FIG. 65 is a block diagram depicting the hardware components of the system of the present invention.

FIG. 65 shows the hardware in accordance with the present invention. There are two modules in addition to those disclosed in Brolly. The first is added just after the start code detector 201. It is responsible for generating a token. A TIME_STAMP token occurs just before a PICTURE_START token. In the MPEG systems stream, the time-stamp is carried in a packet header and refers to the first picture in the packet of data. Since the packets do not line up with the video data there will, in general, be the end of the previous picture before the start of the picture to which the time-stamp refers.

The time-stamp information may be supplied to the system of the present invention either via the microprocessor interface or by using a Token. In either case, the time-stamp data (16 bits) is stored in a register. A flag is set to indicate the fact that valid time-stamp information is in the register. If the data was supplied using the TIME_STAMP token then that token is removed from the stream of tokens.

When a PICTURE_START token is encountered, the flag that indicates the status of the register is examined. If it is clear, then no action is taken and the PICTURE_START token and all subsequent data is unaffected. If, however, the flag indicates that valid time-stamp information is available in the register, then a TIME_STAMP token is generated before the PICTURE_START token. The flag is then cleared and is available for the next time-stamp that occurs.

The second hardware module is associated with the microprogrammable State Machine 218. This is simply a series of counters clocked from the 27 MHz decoder clock. The first is a prescaler that divides the clock by 4800 (the 4804.8 option shown in the diagram is discussed later). 4800 is simply 300 (27 MHz/90 kHz) times 16.

The second counter is the time counter and is incremented each time that the prescaler 278 output clock. It is reset by the reset_time pin.

The counters in this section should probably be implemented with fully clocked feed-back flip-flops (SYNC's) which are much more resistant to a-particle corruption than the weak-feedback latches used elsewhere. (This is because of concern that the time counter in Brian might get out of step with that in the system decoder).

The microprogrammable State Machine 218 is able to read the current time indicated by the time counter and compare it with the value supplied by the TIME_STAMP token. It can therefore determine whether it is early or late compared to the time at which it should be decoding the pictures.

The registers for use in the SCD 201 relating to time stamps are shown in Table 20.

TABLE 20

Time-stamp "SCD" registers

| Register name | Size/ Dir. | Reset State | Description |
|---|---|---|---|
| ts_low | 8/rw | — | The lower eight bits of the time-stamp value. This register is slaved so that new values may be written into this register wthout affecting the value previously written (that will become part of a TIME_STAMP token). Writes to this register affect the master register whilst reads read-back the slave register. Until a master-to-slave transfer has been effected using ts_valid, the value written into ts_low cannot be read back. |
| ts_high | 8/rw | — | The upper eight bits of the time-stamp value. Slaved in the same way as ts_low. |
| ts_valid | 1/rw | 0 | This bit controls the master-slave transfer of ts_low and ts_high. When values have been written into ts_low and ts_high the microprocessor should write the value one into this bit. It should then poll the bit until it reads back the value one. At this point, the values written into ts_low and ts_high will have been transferred into the slave registers (and can be read back) and ts_waiting will be set to one. The microprocessor should then write the value zero in preparation for the next access. |
| ts_waiting | 1/ro | 0 | When set to zero the registers ts_low and ts_high do not contain valid time-stamp information. When set to one the registers ts_low and ts_high contain valid time-stamp information. A TIME_STAMP token will be generated before the next PICTURE_START token and ts_waiting will then become zero. This bit should be polled to ensure that it is zero before writing a one into ts_valid to ensure that the previous time-stamp value has been used before it is over-written by the master-to-slave transfer. |

MSM Handling of Time-Stamp Information

This section details the function of the MSM 218, in accordance with the present invention, when it receives the TIME_STAMP token.

First, a 16-bit signed time-stamp correction is added to the time-stamp that was carried by the TIME_STAMP token. This correction is reset to zero by the MSM 218 at chip-reset and, if no action is taken, the time-stamps are unaltered. The controlling microprocessor may, however, write any value into this register to modify the time-stamp and, therefore, compensate for differential delays through the video and audio decoders.

Next, the corrected time-stamp is subtracted from the current time. The sign of this gives the direction of the error (and determines the error code, if any, generated by the MSM 218). The absolute value of the difference is then taken and the result is compared to the frame time. If the result is less than the frame time, no action is taken. As previously discussed, time can only be controlled to an accuracy of plus or minus a frame time from the nominal time because the VTG free-runs.

In the present invention, if the error exceeds a frame-time, then some correction must be made. The MSM 218 can correct the situation itself if the decoding is too early since it can simply delay the decoding until the appropriate time. However, if the decoding is later than the intended time, then this is more difficult because it is not possible to discard pictures reliably at the output of the coded data buffer. Essentially, the decoding of the sequence is broken and the most reliable way to correct the situation is to restart the decoding process in a manner similar to random-access or channel change. In order to facilitate this procedure, the control register of the MSM 218 may be programmed to discard all data until a FLUSH token is encountered.

Start-up

If the MSM 218, in accordance with the present invention, receives a time-stamp at a time which it recognizes as a start-up situation (e.g., after reset, following a SEQUENCE_END token or FLUSH token and it is still before the first PICTURE_START) then the action of the MSM 218 may be modified. If the time-stamp indicates that decoding should have occurred earlier than the current time, then the situation is handled in the same way as detailed above. However, if the time-stamp indicates that the decoding still remains to take place after the current time (which is the normal situation on start-up), then the decoder will wait until the correct time even if the error is less than one frame-time. In this way, it is possible to set the nominal decoding time as accurately as possible to the correct time. Subsequent pictures may then be decoded, up to one frame-time before or after their nominal time, without any error situation being triggered.

In addition, in the present invention the error "ERR_TOO_EARLY" is not generated during start-up (since it is expected that decoding would be early) irrespective of the setting of disable_too_early.

MSM Time-stamp error codes

As a result of the time-stamp handling, it is possible that one of two errors will be generated.

ERR_TOO_EARLY is generated if the decoding is taking place earlier than the time indicated by the time-stamp.

ERR_TOO_LATE is generated if the decoding is taking place later than the time indicated by the time-stamp.

ERR_TOO_EARLY may be suppressed, but ERR_TOO_LATE will always be generated unless all errors are masked out.

Table 21 describes the various time-stamp registers associated with the Microprogrammable State Machine, in accordance with the present invention.

TABLE 21

Time-stamp "MSM" registers

| Register name | Size/Dir. | Reset State | Description |
|---|---|---|---|
| ts_correction | 16/rw | — | Correction added to each time-stamp before it is used. |
| frame_time | 16/rw | 226 or 188 | Represents the tolerance on the timing of decoding pictures. Reset state determined by the PAL/NTSC pin. |
| time | 16/ro | zero | Reset by either reset or time_reset. The current value of time. |
| manual_startup | 1/rw | zero | When set to one, the startup is to be performed manually using decode_disable. In this case, SEQUENCE_END and FLUSH tokens at the MSM cause decode_disable to be set to one. When set to zero, startup is performed using the time-stamp management hardware. Decode-disable is never automatically set to one. |
| decode_disable | 1/rw | zero | When set to zero, the decoding proceeds normally. At the start of each picture, the MSM checks the status of decode_disable and will not proceed if it is set to one. Note that if manual start-up is to be performed (i.e., without the time-stamp management hardware) this bit should be set to one at the same time as manual-startup is set to one. |
| disable_too_early | 1/rw | zero | When set to one, the error "ERR_TOO_EARLY" indicating that the decoding is too early is suppressed and the MSM simply waits to correct the situation. |
| NTSC_30 | 1/rw | zero | When set to one, the prescaler divides by 4804.8 rather than 4800. Set automatically when decoding 30 Hz frame rates. |
| discard_if_late | 1/rw | zero | This has no effect unless an "ERR_TOO_LATE" is generated (or would be generated if errors were not masked out). If it is set to one then data is discarded until the condition indicated by discard_until. |
| discard_until | 2/rw | 0 | Indicate the condition which causes time-stamp triggered discarding to be terminated.<br>0 - FLUSH<br>1 - SEQUENCE_START<br>2 - GROUP_START<br>3 - Next Picture.<br>Note 1 - that discarding one picture may immediately be un-done if that picture is a field picture by the generation of a dummy field to preserve the alternating top/bottom field structure. As a result if discard_until is set to "Next Picture" but the dummy field would be generated one further picture is discarded. |

Support for 30 Hz

The present invention does not support a 30 Hz frame rate properly. However, it will be appreciated by one of ordinary skill in the art, that the invention may decode 30 Hz data if the clock generation circuitry is modified appropriately. In this case, the system is clocked with a 27.027 MHz clock so that the typical "CCIR-601" raster produces pictures at precisely 30 Hz. In order to accommodate the 27.027 MHz clock, it must be divided by 300.3 to provide the 90 kHz clock. Since the present invention scales this value by a factor of sixteen, it is necessary to divide the clock by 4804.8.

Introduction

This section details a Micro-codeable State Machine (MSM), in accordance with the present invention. The aim of building the MSM was to produce a machine that with small amendments can be used in a number of applications such as a VLC decoder and address generators.

The MSM of the present invention is of a general purpose nature providing support to a wide range of features. However, the underlying structure of the MSM is modular, allowing flexibility in building. Accordingly, those of ordinary skill in the art will appreciate that the present invention can be used with a variety of applications.

Figure 66:
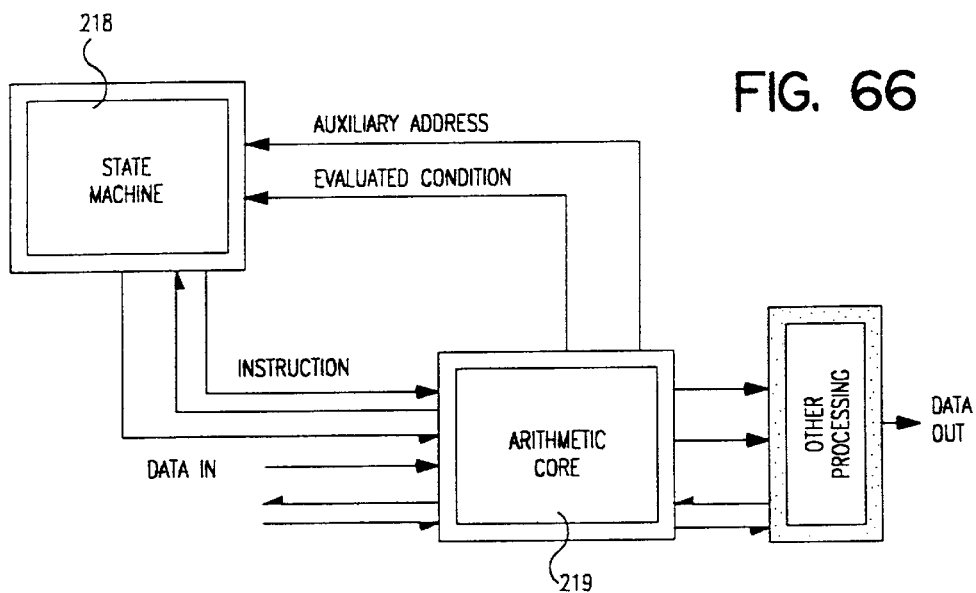
FIG. 66 is a block diagram providing an overview of the system components of the microcontroller of the present invention.

As shown in FIG. 66, the system design is segmented into two sections. The first is a State Machine 218. This generates instructions that are passed to a data processing pipeline under the control of a two-wire interface as previously disclosed in the Brolly application and incorporated by reference herein. The second section is an Arithmetic Core 219, comprising an ALU 222 and associated register file 221. This Arithmetic Core 219 is part of the data processing pipeline. It accepts data and instructions under the control of two 2-wire interfaces.[1] It generates data at its output under the control of a two-wire interface. Bringing these two components together allows the definition of the complete ucode word.

[1] If the State Machine is also controlling upstream blocks, these two 2-wire interfaces may be combined.

State Machine

The State Machine 218, in accordance with the present invention, provides instructions to the Arithmetic Core 219. It also provides instructions to control itself in the progression through the instructions.

The address of the instruction being passed to the Arithmetic Core 219 is held in the Program Counter. The program counter resets to 0x00 and proceeds continuously through the address. However, "jump" or "call" instructions and/or "interrupt/error" events can cause the Program Counter to reload, hence altering the order of instruction execution.

The State Machine 218 allows for up to 4096 instructions in the present invention. However, it will be appreciated by those skilled in the art that other amounts of instructions may also be used and this is not intended to act as a limitation.

Jumps and Calls

In this implementation, all instructions are conditional jump instructions. A condition is evaluated for every instruction to determine whether or not to jump (i.e., reload the Program Counter). The two conditions "True" and "False" are provided to unconditionally jump or not jump respectively. The remainder of the conditions (sixteen in total) are based on tests on the Status bus. If the condition is not "true" or "false," the State Machine 218 will wait until the Arithmetic Core 219 has executed the instruction and fed the status bus back to the State Machine for testing against the condition. These conditions are shown belo in Table 22.

TABLE 22

State Machine conditions

| Code | Condition | |
|---|---|---|
| 0001 | F | False - never jump |
| 0010 | C | Carry set |
| 0011 | NC | Carry clear |
| 0100 | Z | Zero |
| 0101 | NZ | Non-zero |
| 0110 | AN | ALU result Negative |
| 0111 | AP | ALU result Positive |
| 1000 | F | False - spare conditions |
| 1001 | F | |
| 1010 | LT | (S^V) [I–J indicates I < J] |

TABLE 22-continued

State Machine conditions

| Code | Condition | |
|---|---|---|
| 1011 | GE | ~(S^V) [I–J indicates I J] |
| 1100 | I | An index Register Incr. stepped past terminal |
| 1101 | NI | An index Register Incr. did not step past terminal |
| 1110 | V | Overflow |
| 1111 | NE | Extn bit is low |

If a jump is taken on an instruction with the call bit set, the next address, had the jump not been taken, will be stored as the return address. Accordingly, this forms a mechanism for routine calling. To return from the routine to the stored address, a call is made to address 0x001. Calling is only supported to a depth of one call, i.e., only one return address can be stored. Nevertheless, calling from calls, although erroneous, is not checked for in the hardware.

Interrupts and Errors

In the present invention, if the interrupt/error wire sampled high, an unconditional jump is made to the interrupt/error address (address 0x001). The next address that was to have been taken without the interrupt/error is stored. To return from the interrupt/error routine, is a jump to the interrupt address (0x001) is performed.

The State Machine 218, in accordance with the present invention, is hardwired to execute as either an interrupt or error routine. The difference is that interrupt routines mask out other interrupts while executing, whereas error routines do not. The State Machine 218 is currently wired as an interrupt rather than an error pin.

Jump Addresses

The address loaded into the Program Counter is the Jump address. The twelve bits of this address are contained in a ucode field. It can either be an absolute address or it may have portions substituted into it from the output of the ALU 222. If an address is to be substituted, the State Machine 218 will wait until the Arithmetic Core 219 has executed the instruction and fed the ALU 222 output to the State Machine for the substitution.

The format of the address, in accordance with the present invention, is shown in Table 23, "Jump Address substitution". The bits marked "a" indicate absolute address bits. The remaining address bits of lesser significance will be substituted. The LSB marked "s" is the substitute bit.

TABLE 23

Jump Address substiution

| No. Bits Replaced | B | A | 9 | 8 | 7 | 6 | 5 | 4 | 3 | 2 | 1 | 0 | s |
|---|---|---|---|---|---|---|---|---|---|---|---|---|---|
| 0 | a | a | a | a | a | a | a | a | a | a | a | a | 0 |
| 1 | a | a | a | a | a | a | a | a | a | a | a | 0 | 1 |
| 2 | a | a | a | a | a | a | a | a | a | a | 0 | 1 | 1 |
| 3 | a | a | a | a | a | a | a | a | a | 0 | 1 | 1 | 1 |
| 4 | a | a | a | a | a | a | a | a | 0 | 1 | 1 | 1 | 1 |
| 5 | a | a | a | a | a | a | a | 0 | 1 | 1 | 1 | 1 | 1 |
| 6 | a | a | a | a | a | a | 0 | 1 | 1 | 1 | 1 | 1 | 1 |
| 7 | a | a | a | a | a | 0 | 1 | 1 | 1 | 1 | 1 | 1 | 1 |
| 8 | a | a | a | a | 0 | 1 | 1 | 1 | 1 | 1 | 1 | 1 | 1 |
| 9 | a | a | a | 0 | 1 | 1 | 1 | 1 | 1 | 1 | 1 | 1 | 1 |
| 10 | a | a | 0 | 1 | 1 | 1 | 1 | 1 | 1 | 1 | 1 | 1 | 1 |
| 11 | a | 0 | 1 | 1 | 1 | 1 | 1 | 1 | 1 | 1 | 1 | 1 | 1 |

TABLE 23-continued

Jump Address substiution

| No. Bits Replaced | B | A | 9 | 8 | 7 | 6 | 5 | 4 | 3 | 2 | 1 | 0 | s |
|---|---|---|---|---|---|---|---|---|---|---|---|---|---|
| 12 | 0 | 1 | 1 | 1 | 1 | 1 | 1 | 1 | 1 | 1 | 1 | 1 | 1 |
| Load Return Addr. | 1 | 1 | 1 | 1 | 1 | 1 | 1 | 1 | 1 | 1 | 1 | 1 | |

The address substitution feature of the present invention allows the construction of jump tables.

State Machine Internal Instructions

It may be desired to perform repeated conditional tests on the status bus. These instructions are internal to the State Machine 218 and require stable feedback from the Arithmetic Core 219. Therefore, these type of instructions can be marked as non-valid for the Arithmetic Core 219, which will then fail to execute them. Accordingly, a "valid" bit is provided to mark instructions as valid for the Arithmetic Core 219.

State Machine Testing

In the present invention to enable the State Machine's 218 operation to be verified, a number of registers will be accessible to the microprocessor bus. Access may be gained by setting the "access" register to one and then polling the register until it reads back this value. The State Machine is then halted and it is safe to access. The machine can be restarted by writing zero to the "access" register.

When the microprocessor has access, it can read and write to the following registers:
- the program counter
- the call return address
- the interrupt return address
- the interrupt status bit (i.e. stating whether a interrupt is in progress)
- all bits of the ucode Table 24 describes the various addresses of these registers.

The State Machine 218 can also stop itself by generating a microprocessor event. Only if the event's mask bit is set will the machine halt. Access should then be gained in the normal way when servicing this event. An event can be brought about by a call to the reset address (0x00). The call will not actually be taken, but simply generate the event after the instruction is executed. It will, nevertheless, remain at the output of the instruction ROM for inspection.

The State Machine 218 of the present invention possess a mode in which it will single step through its instructions. Single stepping is initiated by setting bit 0 of the MSSR register. The machine will then stop before each instruction. The stopped state is indicated by "1"=Stopped. The instruction about to be executed will then be at the output of the instruction ROM and is able to be changed via microprocessor access. To restart the machine, write "1" to bit 1 of the MSSR register. Both of these bit registers are synchronized and, therefore, require microprocessor access before they can be accessed.

State Machine Ucode Map

Table 25 shows the microcode map for the State machine of the present invention.

TABLE 25

State Machine Ucode Map

| Address | Use |
|---|---|
| 0 × 000 | reset address |
| 0 × 001 | interrupt/error address |
| 0 × 002 | ucode program |
| –0 × fff | addresses |

State Machine ucode word

Similarly, Table 26 depicts the State machine microcode word, in accordance with the present invention.

TABLE 26

State Machine Ucode Word

Figure 67:
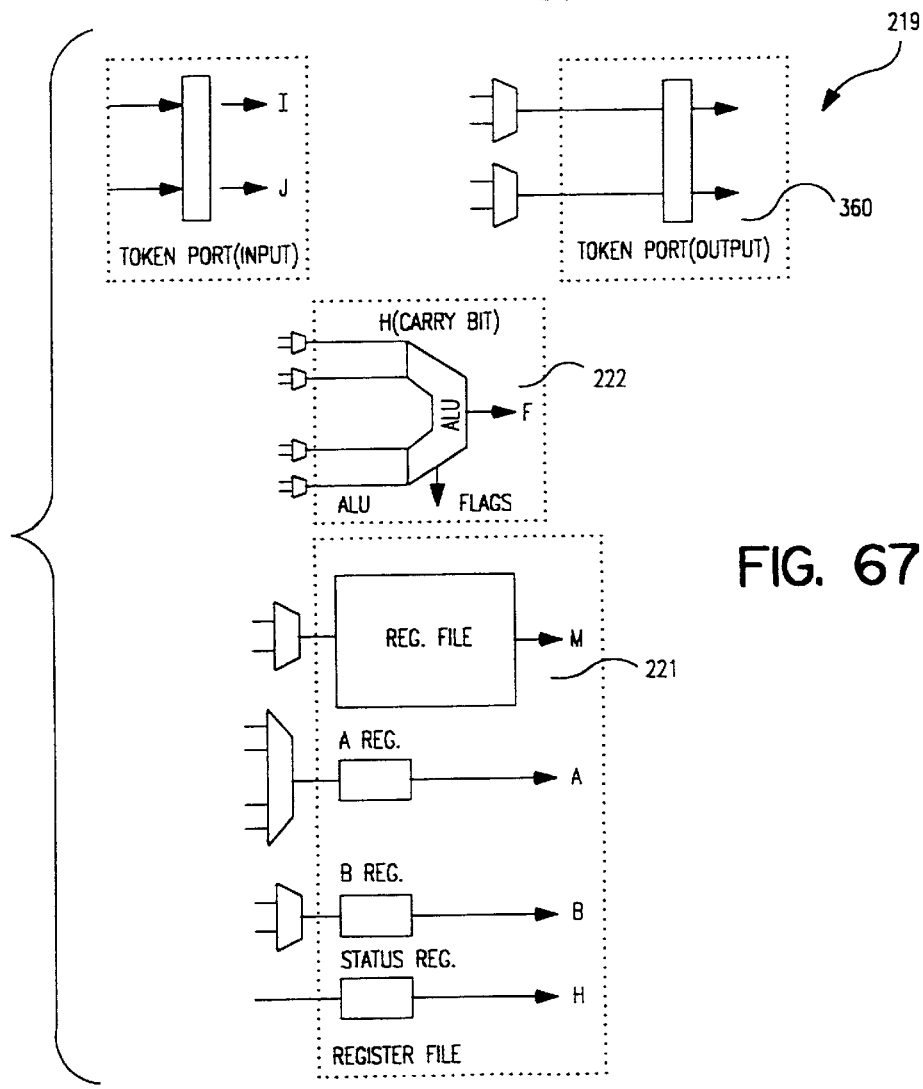
FIG. 67 is a simplified diagram illustrating the Arithmetic core of the present invention.

| Bit number | 2 | 1 | 0 | f | e | d | c | b | a | 9 | 8 | 7 | 6 | 5 | 4 | 3 | 2 | 1 | 0 |
|---|---|---|---|---|---|---|---|---|---|---|---|---|---|---|---|---|---|---|---|
| Bit use | a | a | a | a | a | a | a | a | a | a | a | a | a | s | c | Condition | | | v | where:
- a=address;
- s=substitute an address;
- c=call or jump;
- condition=jump condition code; and
- v=instruction valid for Arithmetic Core Arithmetic Core In the present invention, the Arithmetic Core 219 performs all the data manipulation within the MSM 218. As shown in FIG. 67, the general structure of the Arithmetic Core 219 includes functional blocks which select their inputs from the available buses and provide a bus as output.

The Arithmetic Core 219 is 32 bits wide, and is built from bit-slices which allows 8, 16, 24 or 32 bit data paths to be constructed in other implementations.

Figure 68:
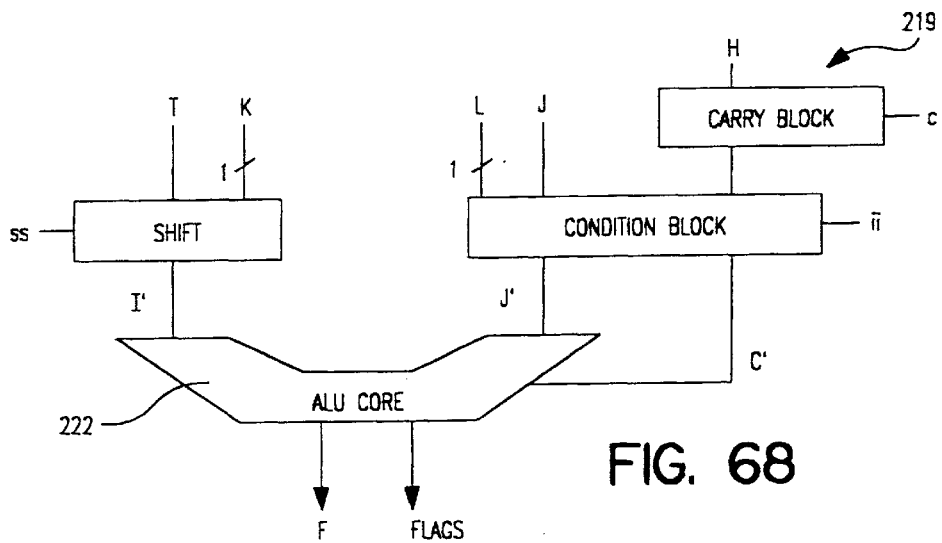
FIG. 68 illustrates the ALU of the present invention.

As depicted in FIG. 68, the Arithmetic Core 219 of the invention has three main functional blocks: the token port 360, for communicating with the data stream; the ALU 222 (and possibly other functions) for executing computations; and the Register File 221 which contains all the registers. All output buses are labeled in FIG. 68. Inputs to blocks are selected from these buses. The size of these selectors and their inputs can vary and are under ucode control.

ALU The ALU block 222, in accordance with the present invention, is responsible for all the computations and number manipulations in the arithmetic core. It allows quite complicated computations (such as recirculating, multiplication and division) to be performed by a combination of relatively simply operations (i.e., shifting, conditional inversion and addition). Each of these blocks is described below. Examples are then provided as to how these may be used in the Arithmetic Core 219, as a whole, to perform the more complicated computations.

ShiftBlock In the present invention, the "shift"block allows for a 1 bit left shift, a right shift, or no shift. The 1 bit bus K is rotated into the word as if it were an extra bit. This is shown in Table 27.

TABLE 27

Shift Block

| ss | shift function |
|---|---|
| 00 | I' = I |
| 01 | I' = I; NOP |
| 10 | I' = (I << 1) + K |
| 11 | I' = (I >> 1) + (K << 32) |

If ss=0b01 a "NOP" is signaled to the ALU 222 as a whole. This is a No Operation and will prevent any status flags begin altered from the last operation.

Carry Block

The Carry block either takes the carry bit from status registers or clears it. In single word addition and subtraction operations, the carry bit will be cleared, while in multiple word operations, the carry generated by the previous operation (and stored in the status flags) will be used as the carry. This is depicted in Table 28.

TABLE 28

Carry Block

| c | carry function |
|---|---|
| 0 | C = 0 |
| 1 | C = H from status flag |

Condition Block

In accordance with the present invention, the block conditions, the Augend and the Carry to the ALU core functions are defined in Table 29.

TABLE 29

Condition Block

| ii | invert function |
|---|---|
| 00 | J' = J<br>C' = C |
| 01 | J' = ~J<br>C' = ~C |
| 10 | J' = J & L<br>C' = C & L |
| 11 | J' = (L ? J~J)<br>C' = (L ? C~C) |

ALU Core

The ALU core 222 of the present invention performs a simple set of logic and arithmetic functions using two's complement arithmetic. These are defined in Table 30.

TABLE 30

ALU Core

| ff | ALU core functions | |
|---|---|---|
| 0 | I' + J' + C' | Add |
| 1 | I' ^ J' | XOR |
| 10 | I' & J' | AND |
| 11 | I' \| J' | OR |

From the result of the ALU core 222, four status flags are generated. (See Table 31.) These are both stored in the Register File 221 (as shown in Table 36) and are sent back to the State Machine 218 for comparison with condition codes.

TABLE 31

Status Flags generated by the ALU core

| Meaning | invert function |
|---|---|
| Carry | Carry Out from ALU operation |
| Zero | ALU result is zero |
| Negative | MSB of ALU result = 1 |
| Overflow | ALU operation overflows |

ALU Ucode Word

Table 32 illustrates the ALU microcode word.

TABLE 32

ALU microde word

| Bit number | 6 | 5 | 4 | 3 | 2 | 1 | 0 |
|---|---|---|---|---|---|---|---|
| Bit use | s | s | I | I | f | f | c | where
ss is the shift block controls
ii is the condition block controls
ff is the ALU core controls
c is the carry block controls Use of the ALU Table 33 describes the bits patterns for the various functions of the ALU, in accordance with the present invention.

TABLE 33

| Bit number | 6 | 5 | 4 | 3 | 2 | 1 | 0 |
|---|---|---|---|---|---|---|---|
| Addition (I + J) | 0 | 0 | 0 | 0 | 0 | 0 | 0 |
| Subtraction (I − J) | 0 | 0 | 0 | 1 | 0 | 0 | 0 |
| Multiplication | 1 | 0 | 1 | 0 | 0 | 0 | 0 |
| Division | 1 | 0 | 1 | 1 | 0 | 0 | 0 |

Register File

Figure 69:
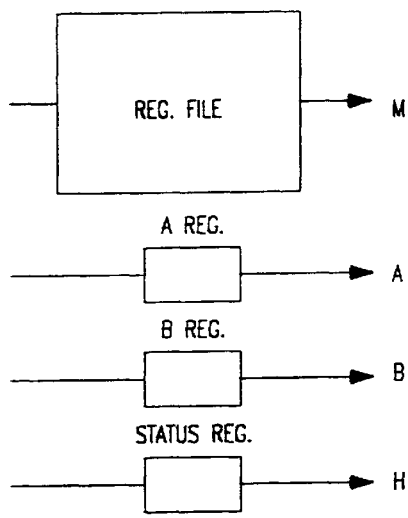
FIG. 69 depicts a register file, in accordance with the present invention.

FIG. 69 illustrates the register file 221 of the present invention. The register file 221 contains 64 thirty-two bit word registers. The register file 221 can address partial words, i.e., the file can be addressed as 64×32 bit, 128×16 bit, 256×8 bit, 512×4 bit, 1024×2 bit, or 2048×1 bit formats. The address is provided directly from the ucode or the address may have portions of it substituted into from special registers. This allows indexed access of the register.

At each instruction, a read-modify-write will be done on a single register. The read-modify-write facilitates the writing of partial words back into the file. The source of the write is determined by an external multiplexer with its own independent ucode. If no write is desired, the output of the register file 221 should be selected by the multiplexer.

Partial words will be treated as signed or unsigned numbers dependent on bit 0 of the mode register. If the partial word is negative (i.e., it has its MSB set) it will be sign extended up the full width of the bus. This allows the easy use of partial words in arithmetic.

Three locations in the register file 221 of the present invention are also connected to a dedicated bus, but they are still allowed to be used in parallel with other register file locations. These are the A and B registers and the status register shown in FIG. 69. The register file also contains the index registers for address substitution with accompanying terminal count registers, constant registers and a mode register specifying modes of the register file.

Register File Addressing

The addressing, in accordance with the present invention, must cope with two different features: variable length addresses for accessing varying width portions of words, and address substitution.

To address partial words requires a longer address. Therefore, all addresses are of variable length and they are encoded as follows: where "a" is an address bit, the least significant of the address bits is "S", the substitution bit.

TABLE 34

Variable width addressing

| Data Width | B | A | 9 | 8 | 7 | 6 | 5 | 4 | 3 | 2 | 1 | 0 | S |
|---|---|---|---|---|---|---|---|---|---|---|---|---|---|
| 1 | 1 | a | a | a | a | a | a | a | a | a | a | a | a |
| 2 | 0 | 1 | a | a | a | a | a | a | a | a | a | a | a |
| 4 | 0 | 0 | 1 | a | a | a | a | a | a | a | a | a | a |
| 8 | 0 | 0 | 0 | 1 | a | a | a | a | a | a | a | a | a |
| 16 | 0 | 0 | 0 | 0 | 1 | a | a | a | a | a | a | a | a |
| 32 (24) | 0 | 0 | 0 | 0 | 0 | 1 | a | a | a | a | a | a | a |

The addressing is big endian. That is to say the higher, more significant portions of the words are addressed with lower addresses.

Portions of the addresses "a . . . a" can be substituted with one of the index registers. Using an address of an eight word as defined in Table 34 as an example, Table 35 shows how to define the number of least significant bits which are to be substituted. All trailing zeros are substituted.

TABLE 35

Address substitution

| Bits to be substituted | C | B | A | 9 | 8 | 7 | 6 | 5 | 4 | 3 | 2 | 1 | 0 | S |
|---|---|---|---|---|---|---|---|---|---|---|---|---|---|---|
| 0 | 0 | 0 | 0 | 1 | a | a | a | a | a | a | a | a | a | 0 |
| 1 | 0 | 0 | 0 | 1 | a | a | a | a | a | a | a | a | 0 | 1 |
| 2 | 0 | 0 | 0 | 1 | a | a | a | a | a | a | a | 0 | 1 | 1 |
| 3 | 0 | 0 | 0 | 1 | a | a | a | a | a | a | 0 | 1 | 1 | 1 |
| 4 | 0 | 0 | 0 | 1 | a | a | a | a | a | 0 | 1 | 1 | 1 | 1 |
| 5 | 0 | 0 | 0 | 1 | a | a | a | a | 0 | 1 | 1 | 1 | 1 | 1 |
| 6 | 0 | 0 | 0 | 1 | a | a | a | 0 | 1 | 1 | 1 | 1 | 1 | 1 |
| 7 | 0 | 0 | 0 | 1 | a | a | 0 | 1 | 1 | 1 | 1 | 1 | 1 | 1 |
| 8 | 0 | 0 | 0 | 1 | a | 0 | 1 | 1 | 1 | 1 | 1 | 1 | 1 | 1 |

For example, substituting 4 bits into a thirty-two bit address would have the form 0b00001aaa01111 or substituting zero bits into a one bit address 0b1aaaaaaaaaaaa0.

In the invention, the substitution will come from one of the two eight bit index registers, which is specified in the register files ucode word. It can, therefore, be seen that a maximum of eight bits can be substituted into an address.

It can also be seen that with the above scheme, it is possible to use illegal addresses, such as 0b0000000000000 or 0b1111111111111. Illegal addresses will result in no address being accessed, leaving the output bus of the register file unknown.

Register File Register Types

In the present invention, there are a plurality of register file register types. Each is described as follows:

Independently bused registers

Three registers (A, B, and Status register) have their own dedicated buses, as well as being accessible in the normal way in the register file. This allows the registers to be connected to more places in the arithmetic core 219 and to be accessible in parallel to others in the register file. The independent buses can only access the registers in their full width, i.e., 32 bits wide.

Figure 70:
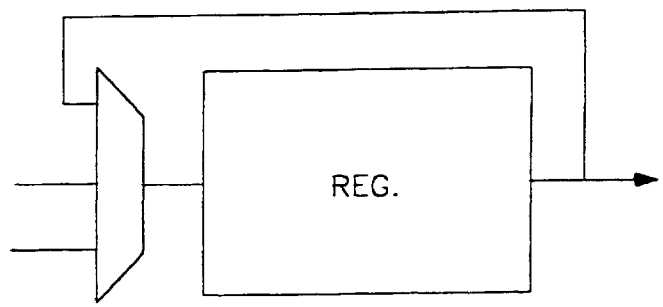
FIG. 70 illustrates the writing to independent bus registers in the present invention.

There is no ucode write enable to these registers. Writing to them is only by way of an external multiplexer which has its own ucode control word. To prevent a write, they must be written to with their own value as shown in FIG. 70.

When the independent bus registers are written to as if in the register file, the independent bus write is suppressed.

The Status register is implemented as an independent bus register. The bits of the register are defined in Table 36.

TABLE 36

Definition of the Status register

| Bit | | Meaning | Comment |
|---|---|---|---|
| 0 | 1 | Index Reg | An index register increments passed its terminal count |
| 1 | E | Extn | Extension bit from input |
| 2 | V | Overflow | ALU operation overflows |
| 3 | N | Negative | MSB of ALU result = 1 |
| 4 | Z | Zero | ALU result is zero |
| 5 | C | Carry | Carry from ALU operation |
| 6 | | Gnd | Unused |
| 7 | | Gnd | Unused |

Index and terminal count registers

Two eight bit Index registers are provided for substituting into addresses. One of these can be incremented per instruction under the control of the ucode. Furthermore, each is accompanied by a terminal count register. When the register incremented is passed, its terminal count will be reset to zero.

The index registers are called Y and Z which have terminal count registers U and V, respectively. All of these can be accessed in the register file.

Index register Z has a predefined decoder attached to its output (at present this decode is an inversion). Dependent on the Index_Mode in the mode register (bit 1), this decoder rather than the index registers, will be used in address substitution and read from Z in the register file. (Index_Mode=1 read decode, Index_Mode=0 read count)

Constant registers

In the present invention, sixteen of the register file's 32 bit locations will be predefined constants. These may be read out as normal registers. Writing to these locations will have no effect. (The constants selected for the current embodiment are 0–7. However, it will be appreciated that other numbers of constants may be used.)

This implementation of constants in accordance with the present invention, does away with the need for a constant field in the ucode and for a constant bus in the arithmetic core. It does, however, limit the number of constants useable in the program. (The number 16 is negotiable.) These constants are programmed on a per instance basis. Furthermore, very frequently used values could be connected to multiplexers, if necessary.

Register File Address Map

Table 37 shows the Register File address map for the present invention.

TABLE 37

Register File Address Map

| 32 Bit Location | Bits | Register |
|---|---|---|
| 0 × 00 | All | A register |
| 0 × 01 | All | B register |
| 0 × 02 | 7:0 | Status register |
| 0 × 02 | 8 | Sign Extend mode |
| 0 × 02 | 9 | Index Decode mode |
| 0 × 02 | 31:10 | Normal register |
| 0 × 03 | 7:0 | Y index register |
| 0 × 03 | 15:8 | Z index register |
| 0 × 03 | 31:16 | Normal register |
| 0 × 04 | 7:0 | U terminal count register |
| 0 × 04 | 15:8 | V terminal count register |
| 0 × 04 | 31:16 | Normal register |
| 0 × 05 – 0 × 37 | All | Normal registers |
| 0 × 37 – 0 × 3F | All | Constants |

Register File Ucode Word

Table 38 shows the Register File microcode word for the present invention.

TABLE 38

Register File Ucode Word

| Bit No. | d | c | b | a | 9 | 8 | 7 | 6 | 5 | 4 | 3 | 2 | 1 | 0 |
|---|---|---|---|---|---|---|---|---|---|---|---|---|---|---|
| Bit use | a | a | a | a | a | a | a | a | a | a | a | a | s | r | I | where a=whole register file address (always 12 bits)

s=substitute bit r=index register to use for substitution; select Y, Z index registers if n=0, 1 respectively I=increment index register specified by r Token Port The Token Port of the present invention is the arithmetic core's connection to the data stream. It is a two-wire interface connection.

The data at the Token Port input is only defined during a Token Port reading cycle. It should, therefore, be used during read cycles only.

If the input port does not contain valid data during a read cycle or the output port is not accepting during a write cycle, the Arithmetic Core will stall. Accordingly, it will perform no operation, read no new ucode word, and write no registers. It will only restart when these conditions do not exist.

Token Port Ucode Word

Table 39 depicts the Token Port microcode word.

TABLE 39

Token Port Ucode Word

| Bit No. | 1 | 0 |
|---|---|---|
| Bit use | I | O | where

I=read into input port

O=write from output port

Multiplexers

The selection of sources for blocks is done by the use of multiplexers. Almost all combinations of bus are allowed (with the exception that the input to functional blocks, e.g., the ALU must be from storage blocks, e.g., Token Port or Register File).

The multiplexers are either 2, 4 or 8 input. They, therefore, use 1, 2, or 3 bits of ucode word, respectively, to control their selection of inputs.

UPI Memory Map

Table 40 shows the MSM address map, in accordance with the present invention.

TABLE 40

MSM Address Map

| Address | Bits | Location |
|---|---|---|
| 0 × 000 | 0 | MSM Event bit |
| 0 × 001 | 0 | MSM Mask bit |
| 0 × 100 | 7 | Access bit |
| 0 × 101 | 0 | MSSR Set single stepping |
| 0 × 101 | 1 | MSSR Monitor Single Stepping |
| 0 × 101 | 2 | MSSR Interrupt status register (Read Only) |
| 0 × 102 | 3:0 | Program Counter MSB |
| 0 × 103 | 7:0 | Program Counter LSB |
| 0 × 104 | 3;0 | Call Return Address MSB |
| 0 × 105 | 7:0 | Call Return Address LSB |
| 0 × 106 | 3:0 | Interrupt Return Address |
| 0 × 107 | 7:0 | Interrupt Return Address |
| 0 × 200–0 × 2ff | 7:0 | Register File |

Introduction

In the MPEG coding standards (both EGMP-1 and MPEG-2) the quantized coefficients are coded as "events". Each event is coded as a RUN and a LEVEL. The RUN is the number of zero coefficients that precede a given non-zero coefficient. The LEVEL is the value of that coefficient. In addition, one special event, End-of-block, is used after the last non-zero coefficient to indicate that the remainder of the block is all-zeros.

For example, assume the following sequence of coefficients:

1, –7, 0, 3, 0, 0, 0, –1, 0, 0, 0, 0 . . . 0 (total of 64 coefficients)

These would be modeled by the following events represented as (RUN, LEVEL):

(0, 1) (0, –7) (1, 3) (3, –1) (EOB)

It is the task of the inverse modeler to reverse the modeling process such that each of the 64 coefficients is represented as a simple number for subsequent processing.

Interfaces

The following signal pins are used to transfer data into the inverse modeler of the present invention:

level [11:0]
run[5:0]
in_extn
in_valid
in_accept

Tokens are transferred on the level[11:0] bus (in the lower order eight bits; level[7:0]). run[5:0] serves as an auxiliary bus to carry the RUN information. It has no meaning except in the data words of a DATA token.

The following signals are used at the output of the inverse modeler:

out-data[11:0]

out_extn
out_valid
out_accept

Functional Description

Data in DATA tokens is expanded so that there is always 64 coefficients in the DATA token presented at the output of the inverse modeller. In most cases, the last data word of the DATA token will not cause the $64^{th}$ coefficient to be generated. This is not an error, it is just that at this point the EOB event would have been coded in the bitstream. Therefore, in this situation the inverse modeller must continue to output zero data token words until a total of 64 coefficients have been produced at the output.

In certain circumstances (e.g., when a data error occurs) it is possible for the DATA token at the input to the inverse modeller to represent more than 64 coefficients. In this situation, the modeller must discard all the extra data and produce a token at its output that contains just 64 coefficients.

All non-DATA tokens that appear at the input are simply transferred, unmodified, to the output of the inverse modeller.

Timing Requirements

It is a requirement of the present invention that data flow through the inverse modeller at the clock rate.

In the situation where there are no gaps at the input to the Imodel and the circuity connected to the output does not cause the Imodel to stall (i.e., in_valid=1, out_accept=1) then a new data word will appear at the output of the Imodel every clock cycle. Note, however, that in this situation, the Imodel may not accept new data at its input on every single dock cycle because a non-zero RUN (in a DATA token) will cause more than one data word to be produced for each input.

Microprocessor Interface Access

The inverse modeller circuitry of the present invention is not required to be connected to the MPI in its normal mode of operation. Note that the error condition (too many coefficients) should not produce a microprocessor interrupt. It is simply dealt with internally by discarding the extra data.

However, microprocessor access will be required for the snooper (test) circuitry at the input of the block.

Introduction

In the MPEG coding standards, the coefficients are "zig-zag" scanned so that the lower frequency coefficients are transmitted before the higher frequency coefficients.

It is the function of the inverse zig-zag, in accordance with the present invention, to convert the one-dimensional stream of coefficients it receives from the inverse modeller into a two-dimensional array of coefficients that can be processed by the IDCT.

In MPEG-1, only one scan path was used, this was literally a zig-zag (hence, the name). MPEG-2, however, uses two scan paths. The first is the original MPEG-1 path, the second is optimized for use in interlaced coding where there tends to be unusually large vertical frequency components.

In addition to the coefficients which are obviously transmitted in zig-zag scan order, the quantization matrices are downloaded in zig-zag scan order as well. This occurs in MPEG-1, H.261 and JPEG. As a result, the present invention has its quantizer before the inverse zig-zag (which was implemented as part of the IDCT). The quantizer, therefore, operates on a one-dimensional stream of coefficients which arrive in the same order as the downloaded quantization matrix coefficients. Hence, the quantizer simply has to associate the first coefficient with the first matrix element, the second coefficient with the second matrix element, and so forth.

However, since there are now two scan paths in MPEG-2, a new approach was taken on the present invention in which the inverse zig-zag precedes the inverse quantizer. Both the coefficients and the downloaded matrices are inverse scanned and the inverse quantizer now operates on the two dimensional data. It should be noted that this is only possible because in all three representations of the data (two zig-zag scans and the raster-scan order at the output of the IZZ) the first coefficient is always first and the last coefficient is always last. The first coefficient is specially treated in the Iquant because it is the DC term. The last coefficient is specially treated because it may need to be modified as a result of mismatch control as a function of the values of all the other coefficients (so it must be last!). The 62 remaining coefficients are all handled in the same manner (excepting that each has its own quantization matrix element).

Interfaces

The following signals are used at the input of the inverse zig-zag of the invention:

in_data[11:0]
in_extn
in-valid
in-accept

The following signals are used at the output of the inverse zig-zag:

out_data[11:0]
out_extn
in_valid
out_accept

Functional Description

The IZZ responds to the following tokens:

PICTURE_START
ALTERNATE_SCAN
DATA
QUANT_TABLE

All other tokens are passed, unmodified, through the IZZ.

The PICTURE_START token causes the IZZ to reset its internal state which represents which of the two scan paths is in force (e.g., alternate_scan) to zero (indicating the MPEG-1 scan).

ALTERNATE_SCAN is a token which can be allocated the value 0xe6 with a mask 0xfe. The ALTERNATE_SCAN token is shown in Table 41.

TABLE 41

Alternate_Scan Token

| E | 7 | 6 | 5 | 4 | 3 | 2 | 1 | 0 |
|---|---|---|---|---|---|---|---|---|
| 0 | 1 | 1 | 1 | 0 | 0 | 1 | 1 | s |

"s" is the indication of which scan to use for subsequent DATA tokens and is, therefore, loaded into the IZZ register "alternate_scan".

DATA tokens are re-ordered according to scan path zero (the MPEG-1 scan path) irrespective of the setting of alternate_scan. Note that alternate_scan must retain whatever value it had (i.e., must not be set to zero) so that subsequent DATA tokens are correctly handled.

QUANT_TABLE tokens are re-ordered according to scan path zero (the MPEG-1 scan path) irrespective of the setting of alternate_scan. Note that alternate_scan must retain whatever value it had (i.e., it must not be set to zero) so that subsequent DATA tokens are correctly handled.

Mal-formed Tokens

Both the DATA and QUANT_TABLE tokens may be mal-formed. Clearly, the DATA token should be correct since the Imodel should have ensured that it is correctly formed. However, no such assurance is available for QUANT_TABLE. Since handling the mal-formed QUANT_TABLE tokens must be implemented, it should also be implemented for DATA tokens as well.

In accordance with the present invention, DATA and QUANT_TABLE tokens are too short when they appear at the input to the IZZ should result in a token at the output with the correct number (64) of data words. The data contained in those words is unimportant and will probably be whatever junk happened to be in the re-ordering RAM before the start of the token. Similarly, DATA and QUANT_TABLE tokens that are too long should also result in correctly formed tokens at the output. The first 64 coefficients (matrix elements) should be used, the remainder should be discarded.

Following a mal-formed token, all subsequent (correctly formed) tokens should be handled properly.

There is no requirement for a microprocessor interface error (interrupt) to be generated.

Raster Scan Order

At the output of the IZZ, the DATA and QUANT_TABLE tokens of the present invention represent two-dimensional data. However, the coefficients are still actually transferred as a one-dimensional series of numbers. The question arises whether the data should be transferred as rows or as columns.

The prediction circuitry will require the pel-domain data to be organized in raster-scan order. Since the IDCT transposes the data it follows that the data going into the IDCT must be the other way around. Table 42 illustrates the order of the coefficients transferred at the output of the IZZ for DATA and QUANT_TABLE tokens.

TABLE 42

IZZ Output Coefficients increasing horizontal frequency → u

| | 0 | 1 | 2 | 3 | 4 | 5 | 6 | 7 |
|---|---|---|---|---|---|---|---|---|
| 0 | 0 | 8 | 16 | 24 | 32 | 40 | 48 | 56 |
| 1 | 1 | 9 | 17 | 25 | 33 | 41 | 49 | 57 |
| 2 | 2 | 10 | 18 | 26 | 34 | 42 | 50 | 58 |
| 3 | 3 | 11 | 19 | 27 | 35 | 43 | 51 | 59 |
| 4 | 4 | 12 | 20 | 28 | 36 | 44 | 52 | 60 |
| 5 | 5 | 13 | 21 | 29 | 37 | 45 | 53 | 61 |
| 6 | 6 | 14 | 22 | 30 | 38 | 46 | 54 | 62 |
| 7 | 7 | 15 | 23 | 31 | 39 | 47 | 55 | 63 |

Microprocessor Interface Access

There is no requirement for microprocessor access in the normal functioning of the IZZ. However, access will probably be required so that the reordering RAM can be tested. It is also expected that there will be no requirement for a snooper. The one at the start of the Imodel is sufficient for both blocks.

Introduction

This section deal with predictions. In this introductory section, all possible prediction modes are enumerated and diagrams are provided for each one to explain exactly what must be done.

Throughout this section no special attention is given to operations, such as half-pel filtering, that occur in the horizontal dimension. This is because these operations are the same as those on Brolly. In the vertical dimension, however, things are very different because of the interlaced picture format.

Prediction in Frame Pictures
  Frame-based Prediction
  In this mode, a prediction is formed from a reference frame. The result is as if the two reference fields were first combined into a frame and then a prediction were made from that frame. Note that this is precisely the situation as described in Brolly.

Half-pel filtering may be made in the vertical direction and this is triggered by the least significant bit of the vector. In addition to the least significant bit, the next most significant bit (bit 1) has special significance since this will determine whether the top line of the prediction comes from the top reference field or the bottom reference field.

Thus, four cases have to be considered, each dependant upon the binary value of the least significant two bits of the vertical vector vector [1]=0 vector [0]=0

Figure 71:
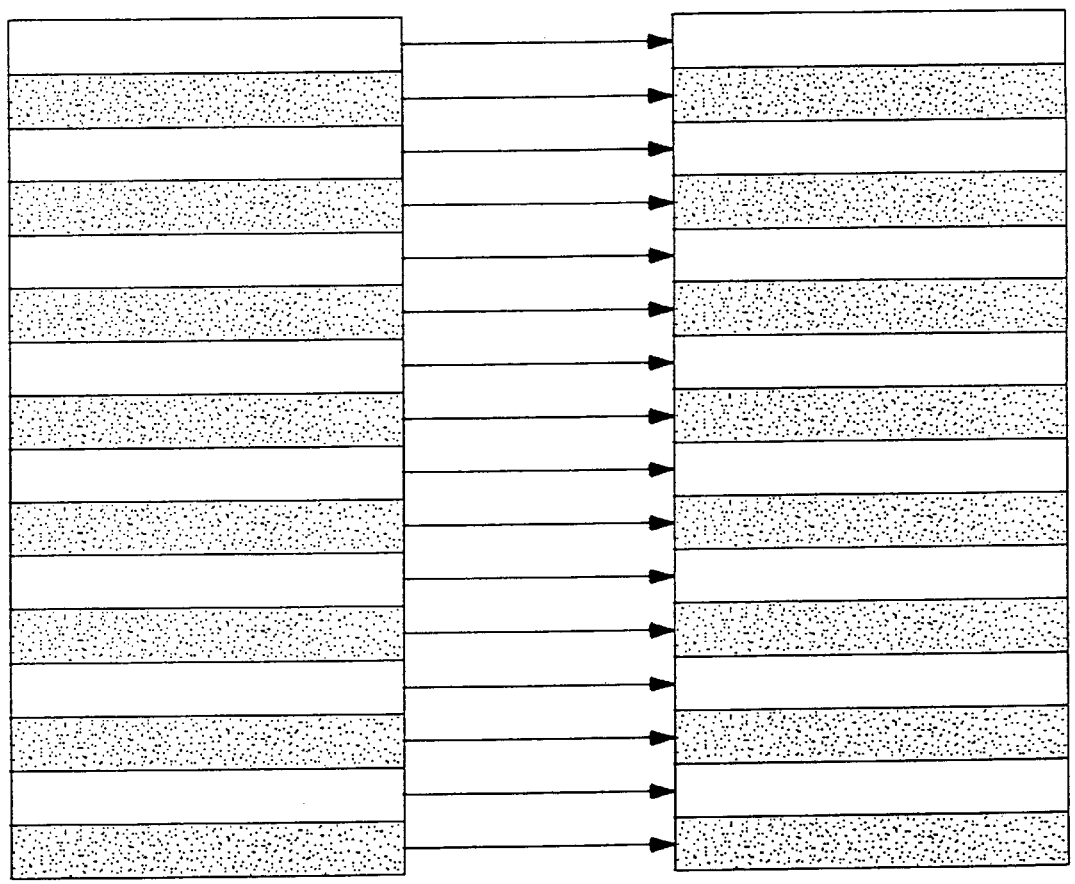
FIG. 71 illustrates frame-based prediction wherein vector [1]=0 and vector[0]=0.

As shown in FIG. 71, just 16 lines (8 for the chroma) are read (since there is no half pel filtering. 8(4) lines from each reference field.

vector[1]=0 vector[0]=1

Figure 72:
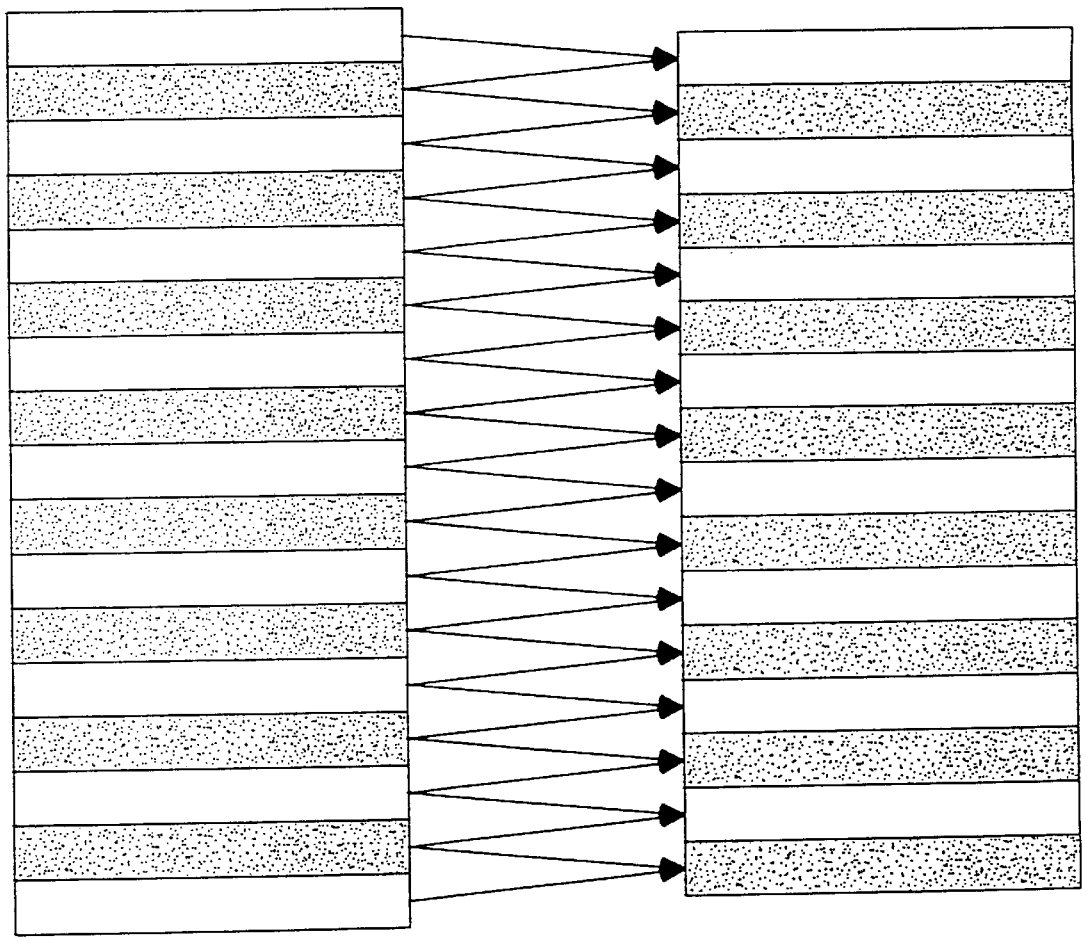
FIG. 72 depicts frame-based prediction wherein vector [1]=0 and vector[0]=1.

Likewise, as shown in FIG. 72, 17(9) lines are read, 9(5) lines are read from the top reference field, 8(4) lines from the bottom reference field.

vector[1]=1, vector[0]=0

Figure 73:
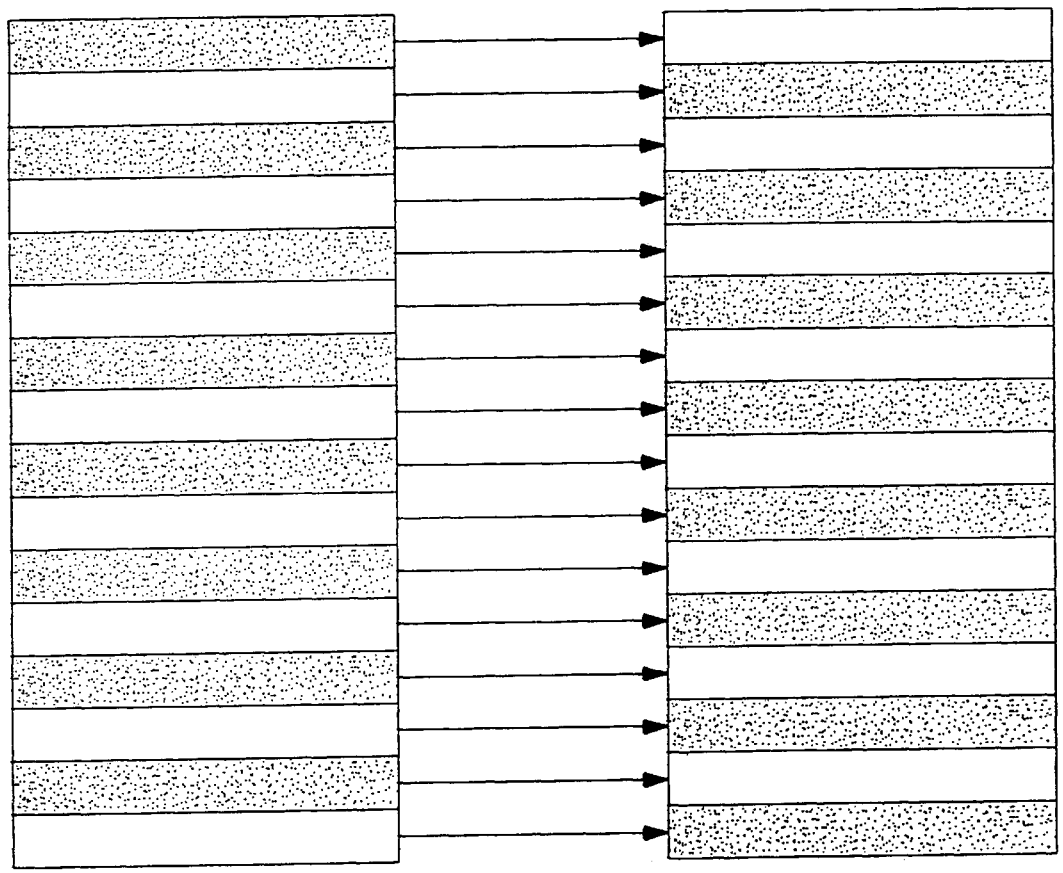
FIG. 73 shows frame-based prediction wherein vector [1]=1 and vector[0]=0.

Again, as shown in FIG. 73, just 16(8) lines are read but note that now the top line of the prediction has been read from the bottom reference field.

vector[1]=1, vector[0]=1

Figure 74:
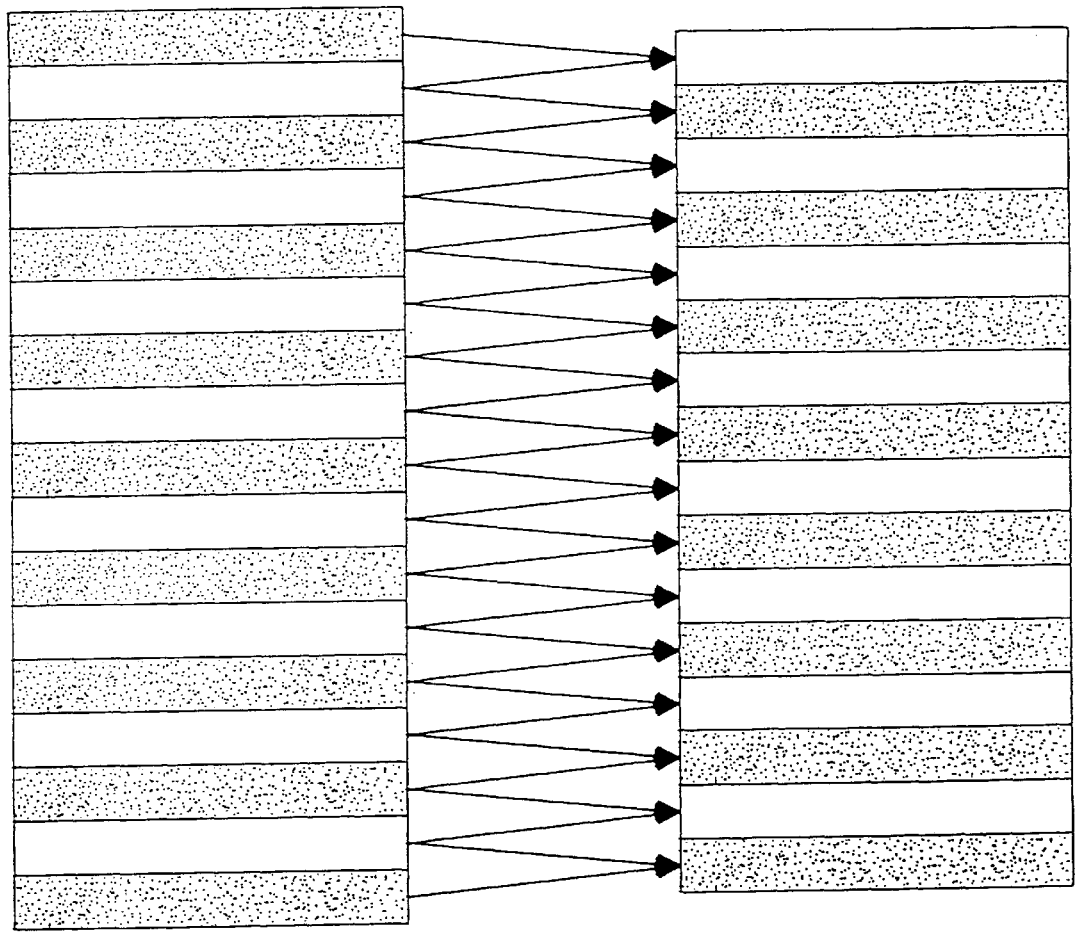
FIG. 74 illustrates frame-based prediction wherein vector [1]=1 and vector[0]=1.

And, FIG. 74 shows 17(9) lines are read, 8(4) lines are read from the top reference field, 9(5) lines from the bottom reference field.

Accordingly, bit 1 indicates which reference field holds the top-most line that must be read to produce the prediction. In addition, if bit 0 is also set, it indicates which reference field has the extra line to enable half-pel filtering to be performed.

It is clear that half-pel prediction cannot be performed until both fields have been read from DRAM.

Great care must also be taken when scaling vertical motion vectors to obtain offsets in the field store. The following table, Table 43, illustrates the effect:

TABLE 43

| Vector | Bit pattern | Offset in field top field | Offset in field bottom field |
|---|---|---|---|
| −2 | ...11100 | ...11110 (−2) | ...1111 (−2) |
| −1.5 | ...11101 | ...11111 (−1) | ...11110 (−2) |
| −1 | ...11110 | ...1111 (−1) | ...11111 (−1) |
| −0.5 | ...11111 | ...00000 (0( | ...11111 (−1) |
| 0 | ...00000 | ...00000(0) | ...00000 (0) |
| 0.5 | ...00001 | ...00001 (1) | ...00000 (0) |
| 1 | ...00010 | ...00001 (1) | ...00001 (1) |
| 1.5 | ...00011 | ...00010 (2) | ...00001 (1) |
| 2 | ...00100 | ...00010 (2) | ...00010 (2) |

Field-based Prediction (in a frame picture)

In this mode, each field is treated independently. A separate vector is used for each of the two fields. Associated with each vector is an additional single bit flag (motion_vertical_field_select) that indicates whether prediction should be made from the top reference field or the bottom reference field. The bottom bit of the vector still indicates the need for half-pel filtering, but bit 1 has no special significance. Note that a field vector measures different units of a frame vector; a field vector with the value n represents the same actual displacement (on the glass) as a frame vector with the value 2n.

This time, however, there are sixteen cases to consider (since there are four binary variables; motion_vertical_field_select for each of the two vectors and bit 0 for each of the two vectors). There are too many cases to draw, hence, the following figures only deal with the prediction of the top field. The bottom field is obtained in an analogous manner.

Figure 75:
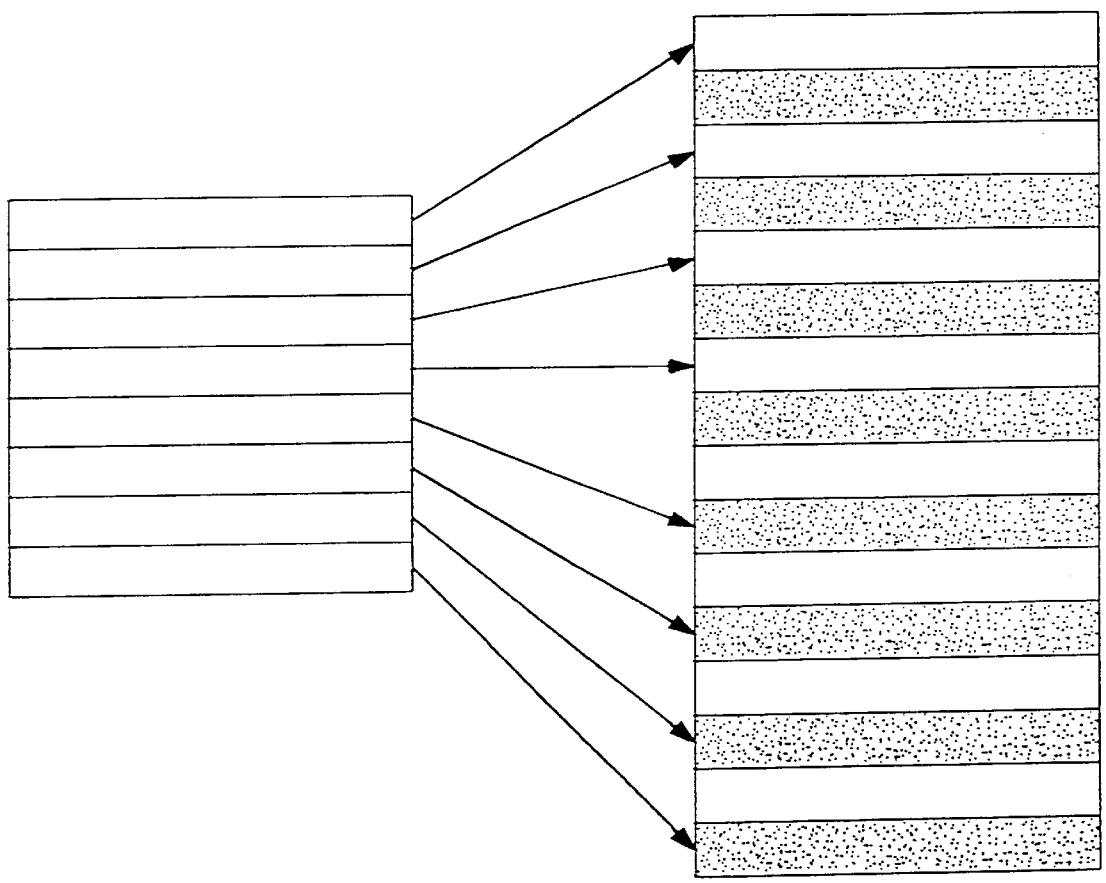
FIG. 75 depicts field-based prediction wherein motion_vertical_field_select=0 and vector[0]=0.

As depicted in FIG. 75, motion_vertical_field_select=0, vector[0]=0

8(4) lines are read from the top reference field to form the top field of the prediction.

Figure 76:
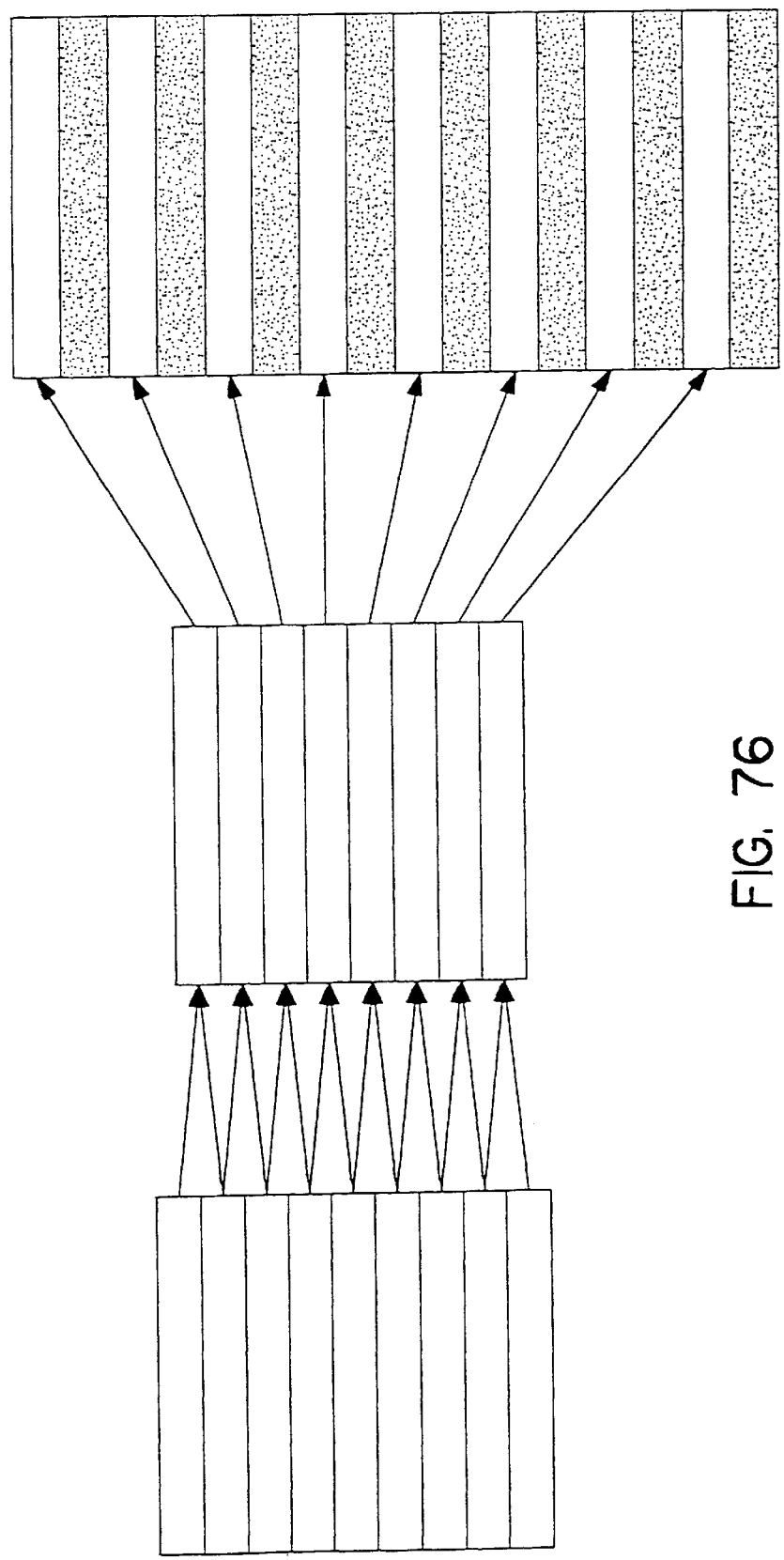
FIG. 76 illustrates field-based prediction wherein motion_vertical_field_select=0 and vector[0]=1.

FIG. 76 shows motion_vertical_field_select=0, vector [0]=1

9(5) lines are read from the top reference field which are then half-pel filtered to form the top field of the prediction.

Figure 77:
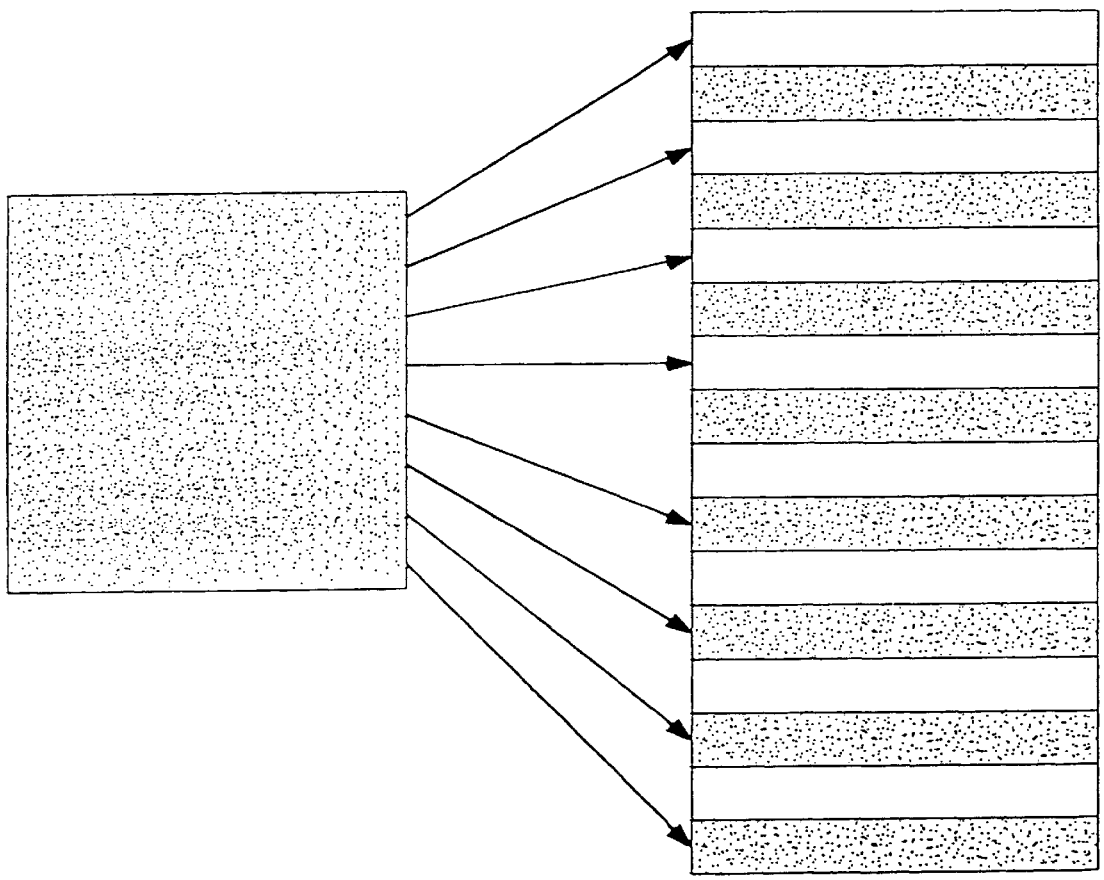
FIG. 77 similarly illustrates field-based prediction wherein motion_vertical_field_select=1 and vector[0]=0.

Likewise, FIG. 77 depicts motion_vertical_field_select=1, vector [0]=0

8(4) lines are read from the bottom reference field to form the top field of the prediction.

Figure 78:
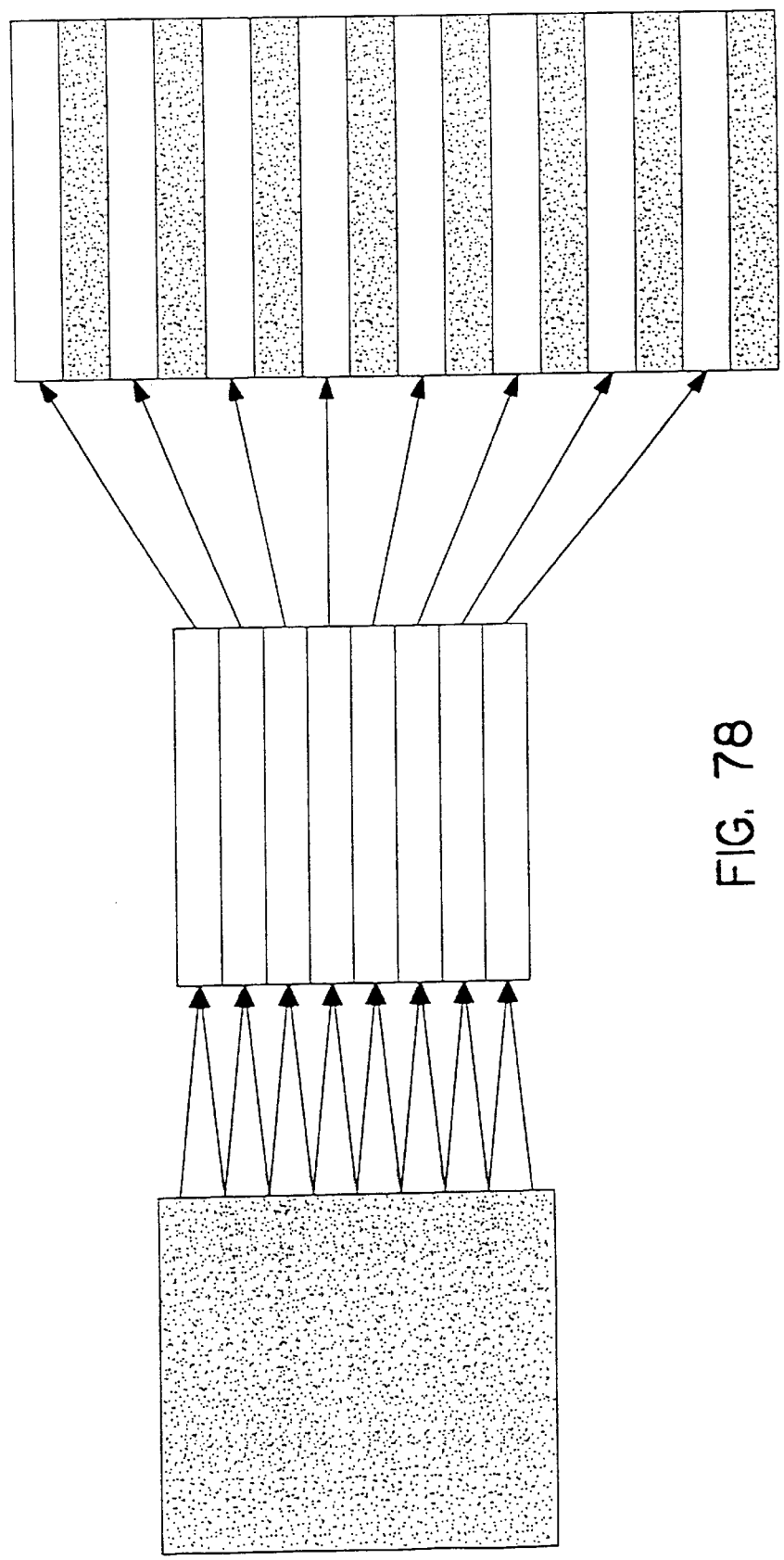
FIG. 78 shows field-based prediction wherein motion_vertical_field_select=1 and vector[0]=1.

And, FIG. 78 illustrates motion_vertical_field_select=1, vector[0]=1

9(5) lines are read from the bottom reference field which are then half-pel filtered to form the top field of the prediction.

Dual Prime (in frame pictures)

Dual prime is a special case of the Field-based prediction of the previous section. Essentially, dual-prime combines two features:

A special method of coding the vectors so that despite the fact that four independent field predictions are formed (independent in the sense that they each have a distinct vector) effectively only one motion vector is transmitted. Thus, the vector overhead is dramatically reduced.

For each field, the prediction information is read from each of the reference fields. This is then averaged to form the final prediction. This is very similar to the B-picture case when a separate forward and backward prediction is made and then averaged.

In the present invention, the vector decoding will all be performed in the parser. Accordingly, when the prediction circuitry receives data, there really will be four separate vectors.

The dual-prime averaging will be performed by re-using the B-frame averaging circuitry (dual-prime cannot itself be used in a B-frame). Hence, the only associated complication for the prediction circuitry is involved in the signaling that indicates that the backwards predictions (using backwards vector tokens etc.) should be performed from the forward reference fields (as opposed to the backward reference fields). Since a P-picture should never normally request a backward prediction, the prediction circuity merely needs to keep a record of the picture type (P or B) in order to be able to decide which reference store to use for a "backward" prediction.

Prediction in Field Pictures

Field-based Prediction

This is very similar to field-based prediction in frame pictures. There are four cases depending on motion_vertical_field_select and the least significant bit of the motion vector. Note that it is not really relevant to discuss top-fields and bottom-fields in the prediction that is formed, since the prediction is simply for the picture being decoded (which is either all top-field or all bottom-field).

Figure 79:
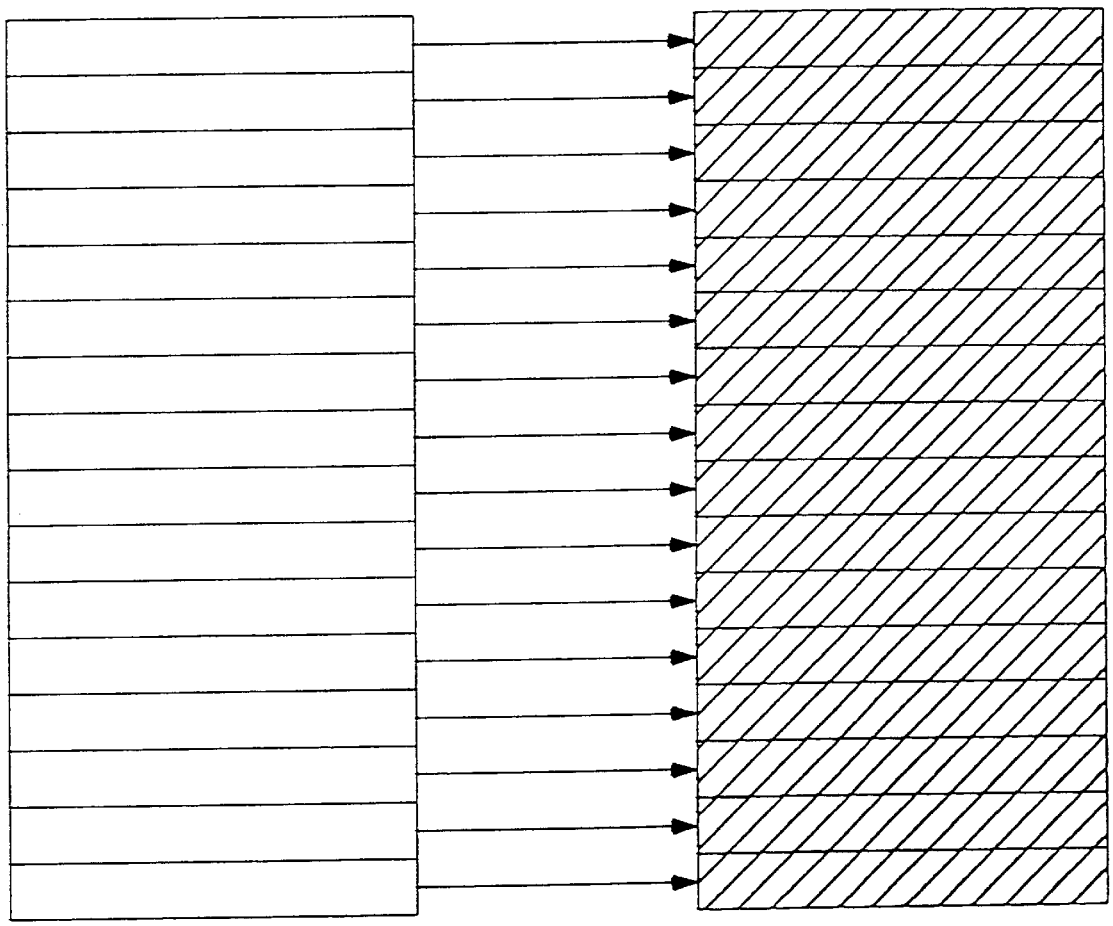
FIG. 79 shows field-based prediction in frame pictures wherein motion_vertical_field_select=0 and vector[0]=0.

FIG. 79 illustrates motion_vertical_field_select=0, vector[0]=0

16(8) lines are read from the top reference field to form the prediction.

Figure 80:
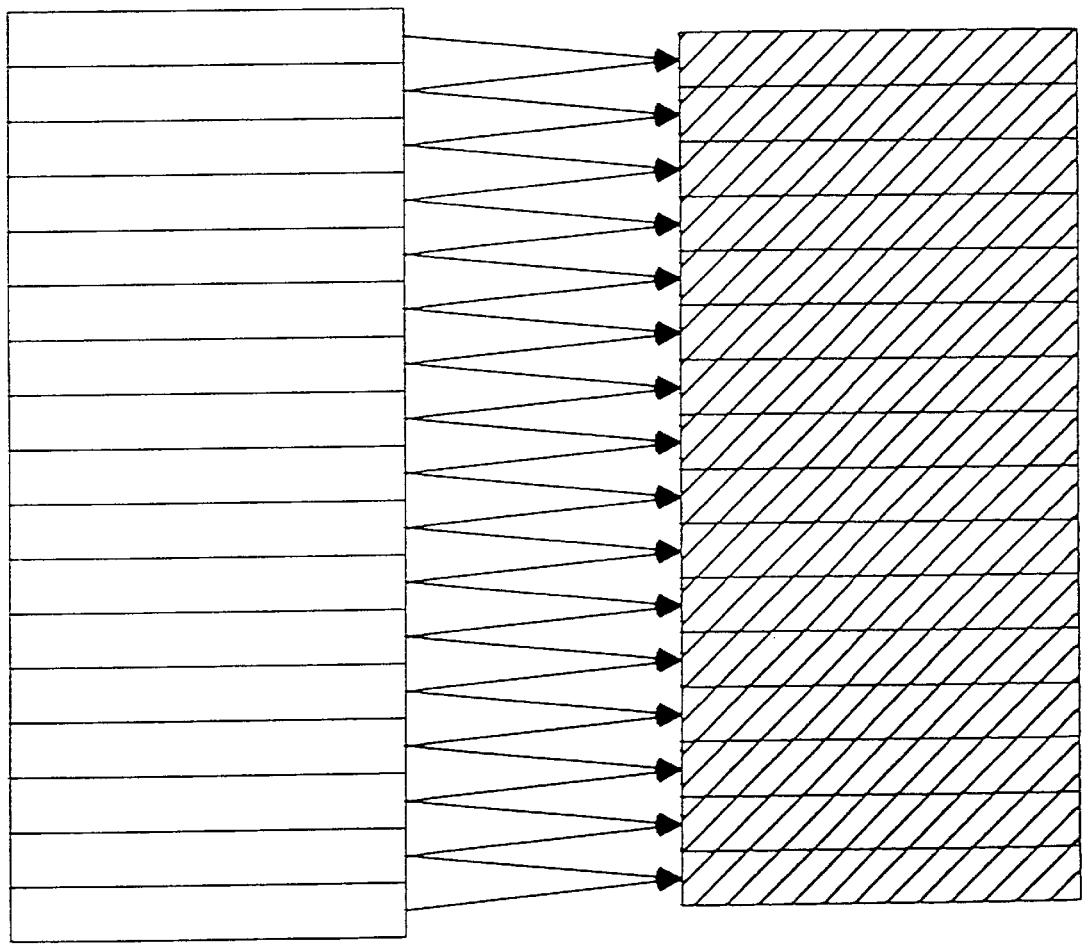
FIG. 80 illustrates the prediction of FIG. 79 wherein motion_vertical_field_select=0 and vector[0]=1.

FIG. 80 shows motion_vertical_field_select=0, vector [0]=1

17(9) lines are read from the top reference field and half-pel filtered to give the prediction.

Figure 81:
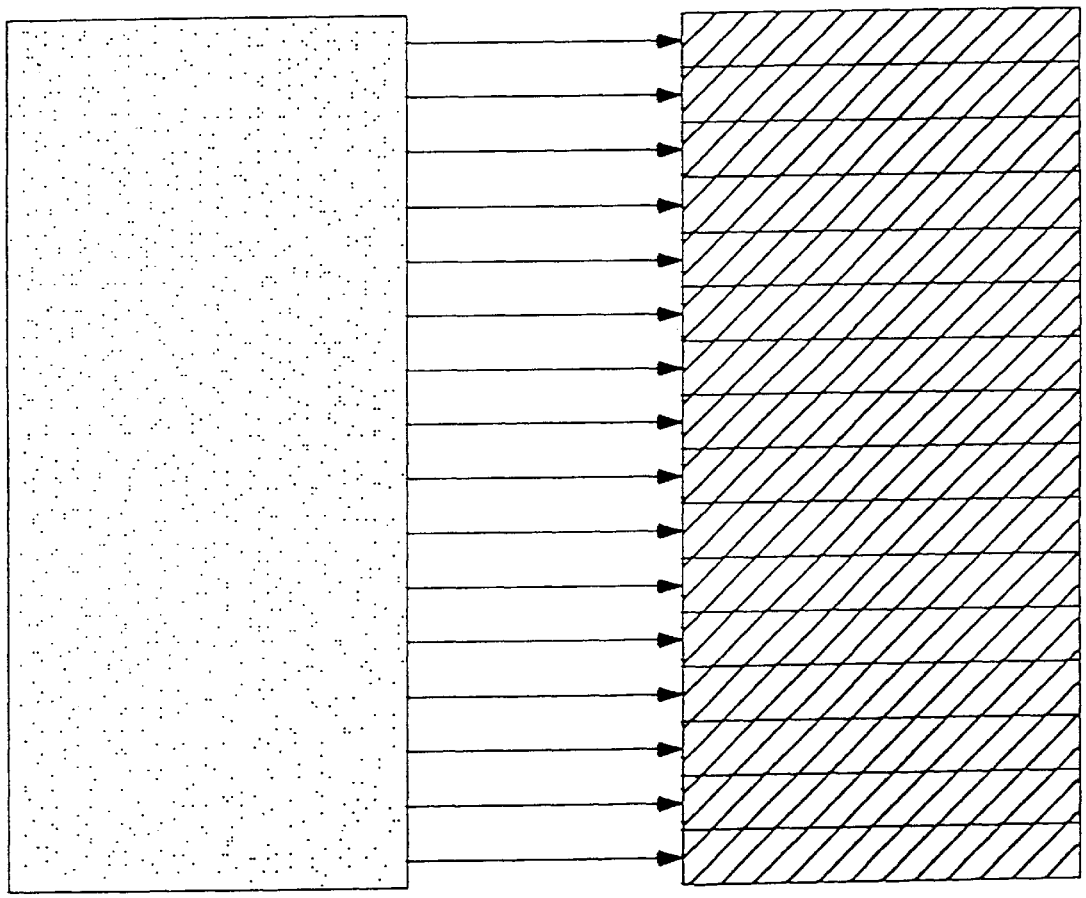
FIG. 81 shows the prediction mode of FIG. 79 wherein motion_vertical_field_select=1 and vector[0]=0.

FIG. 81 depicts motion_vertical_field_select=1, vector [0]=0

16(8) lines are read from the bottom reference field to form the prediction.

Figure 82:
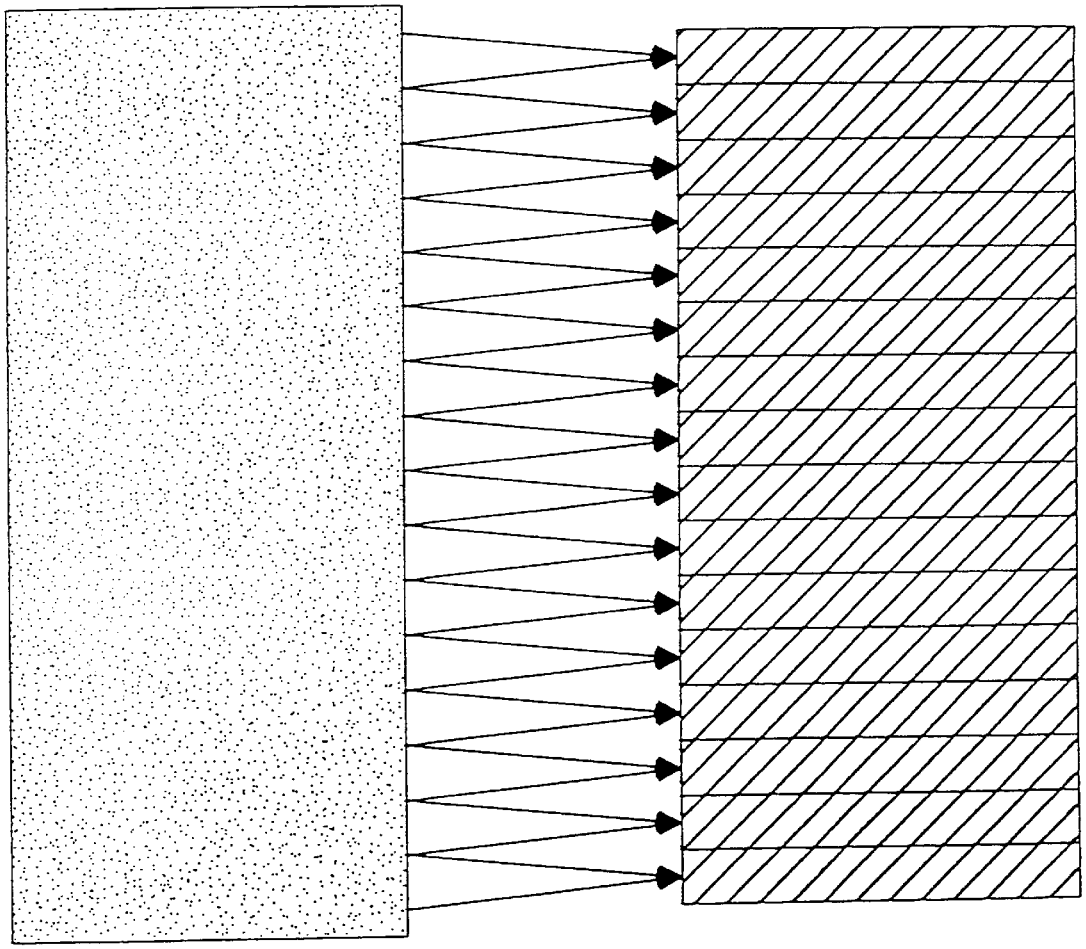
FIG. 82 shows the prediction mode of FIG. 79 wherein both motion_vertical_field_select and vector[0]=1.

FIG. 82 shows motion_vertical_field_select=0, vector [0]=1

17(9) lines are read from the bottom reference field and half-pel filtered to give the prediction.

16×8 MC

In this mode, the macroblock is divided into two 16×8 regions, one above the other. For each region, a separate field vector is transmitted. Again, there are sixteen cases to consider (since there are four binary variables; motion_vertical_field_select for each of the two vectors and bit 0 for each of the two vectors). Again, these are too many cases to illustrate so the following figures need only deal with the upper 16×8 region. The lower region is obtained in an analogous manner.

Figure 83:
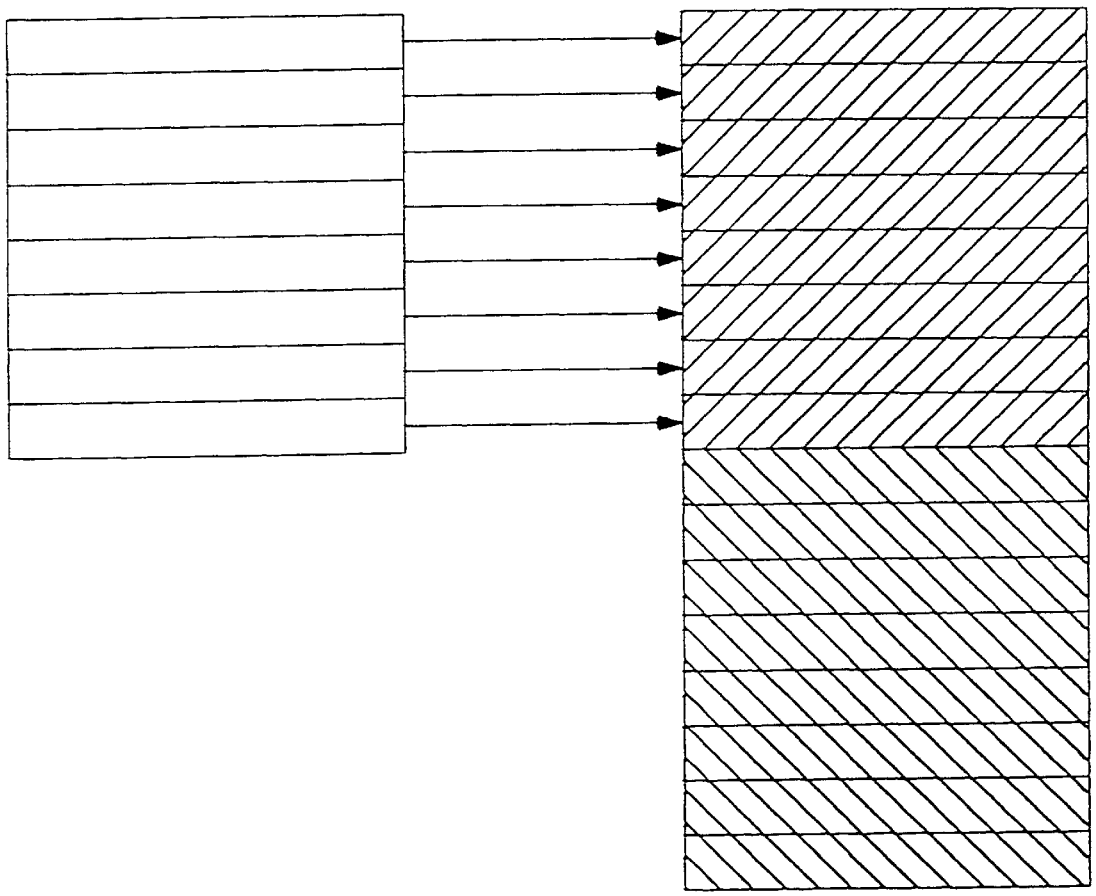
FIG. 83 illustrates an additional mode of prediction filtering.

FIG. 83 shows motion_vertical_field_select=0, vector [0]=0

8(4) lines are read from the top reference field to form the prediction of the upper 16×8 region.

Figure 84:
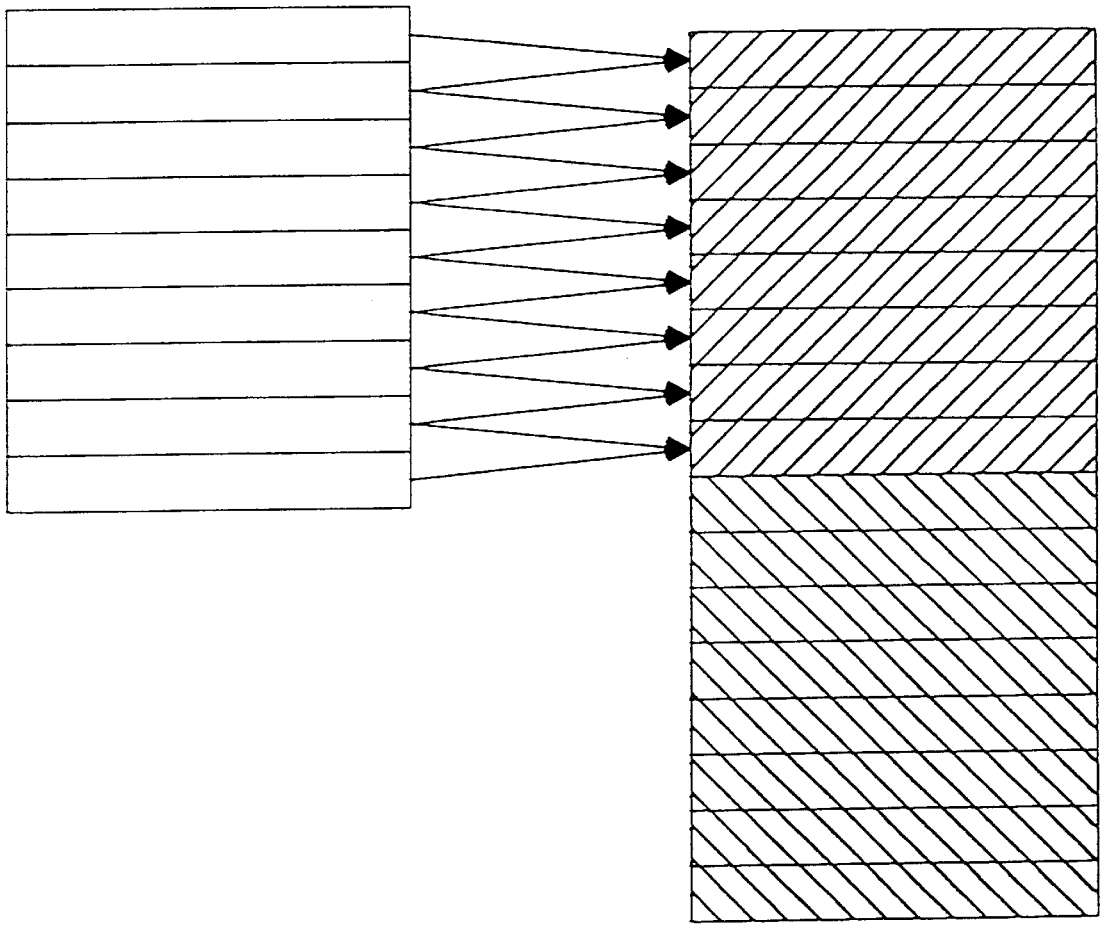
FIG. 84 shows still another prediction mode.

FIG. 84 depicts motion_vertical_field_select=0, vector [0]=1

9(5) lines are read from the top reference field and half-pel filtered to form the prediction of the upper 16×8 region.

Figure 85:
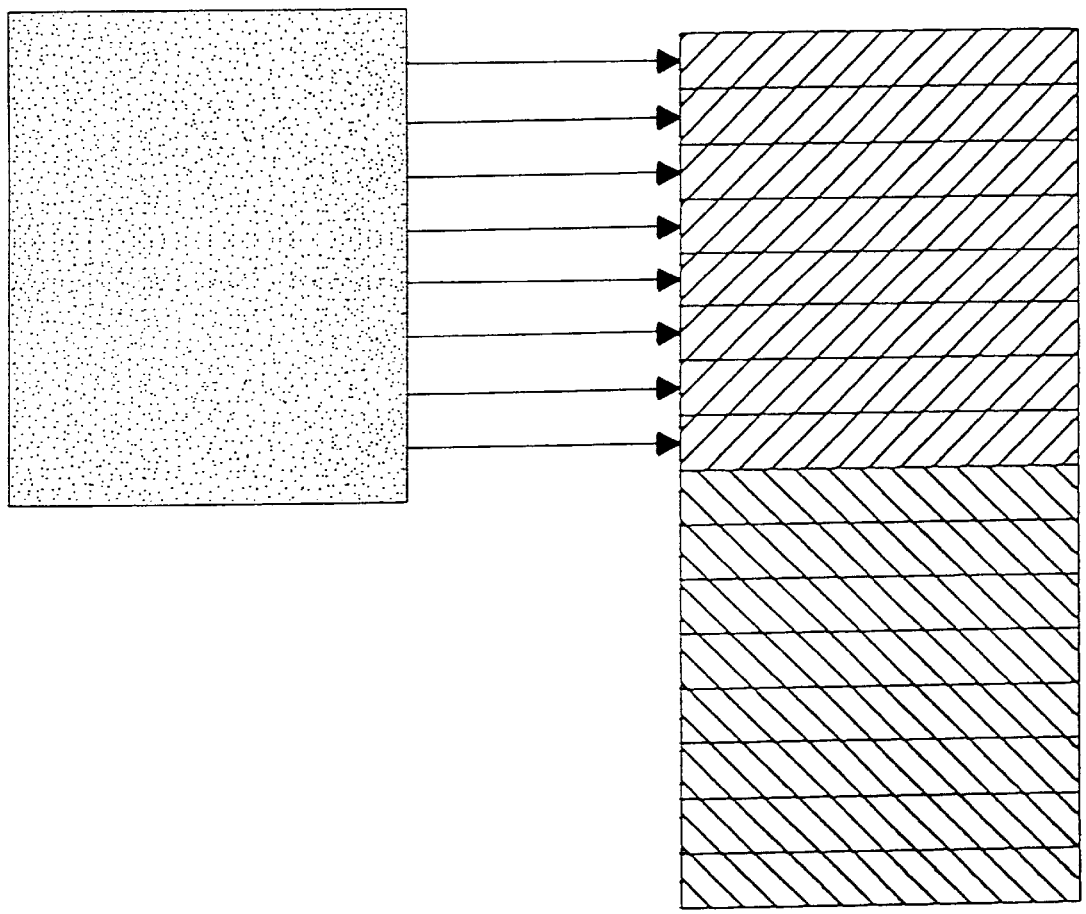
FIG. 85 illustrates yet another prediction mode, in accordance with the present invention.

FIG. 85 illustrates motion_vertical_field_select=1, vector[0]=0

8(4) Lines are read from the bottom reference field to form the prediction of the upper 16×8 region.

Figure 86:
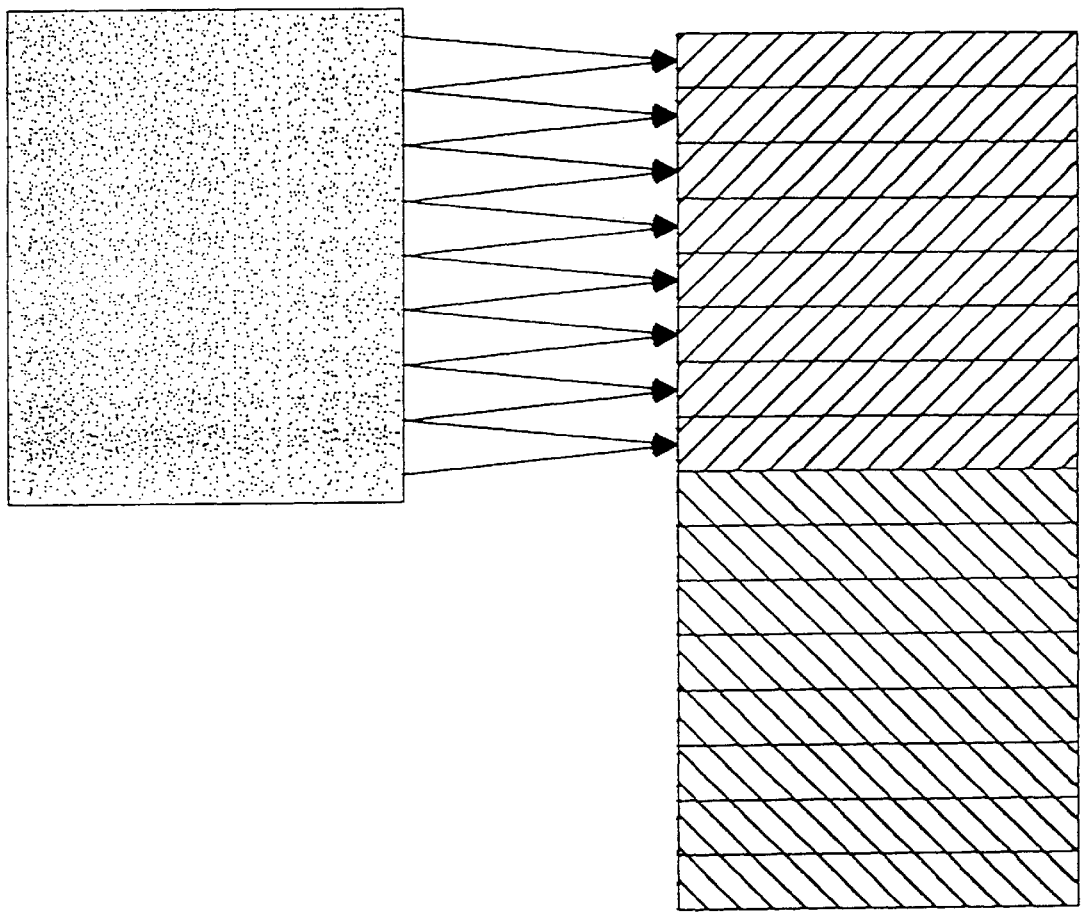
FIG. 86 shows another prediction mode of the present invention.

FIG. 86 depicts motion_vertical_field_select=1, vector [0]=1

9(5) lines are read from the bottom reference field and half-pel filtered to form the prediction of the upper 16×8 region.

Dual Prime in Field Pictures

Dual prime in a field picture is simply a special case of field prediction in a field picture. Two field vectors will be used (one will refer to the top reference field, on to the bottom reference field and the Parser will ensure this). One of the predictions will appear to be making a backwards prediction, but because this is a P-picture, the prediction circuitry will interpret this as a second forward prediction. The two resulting predictions will then be averaged using the same circuitry as that used for B-frame averaging.

Overall organization

Figure 87:
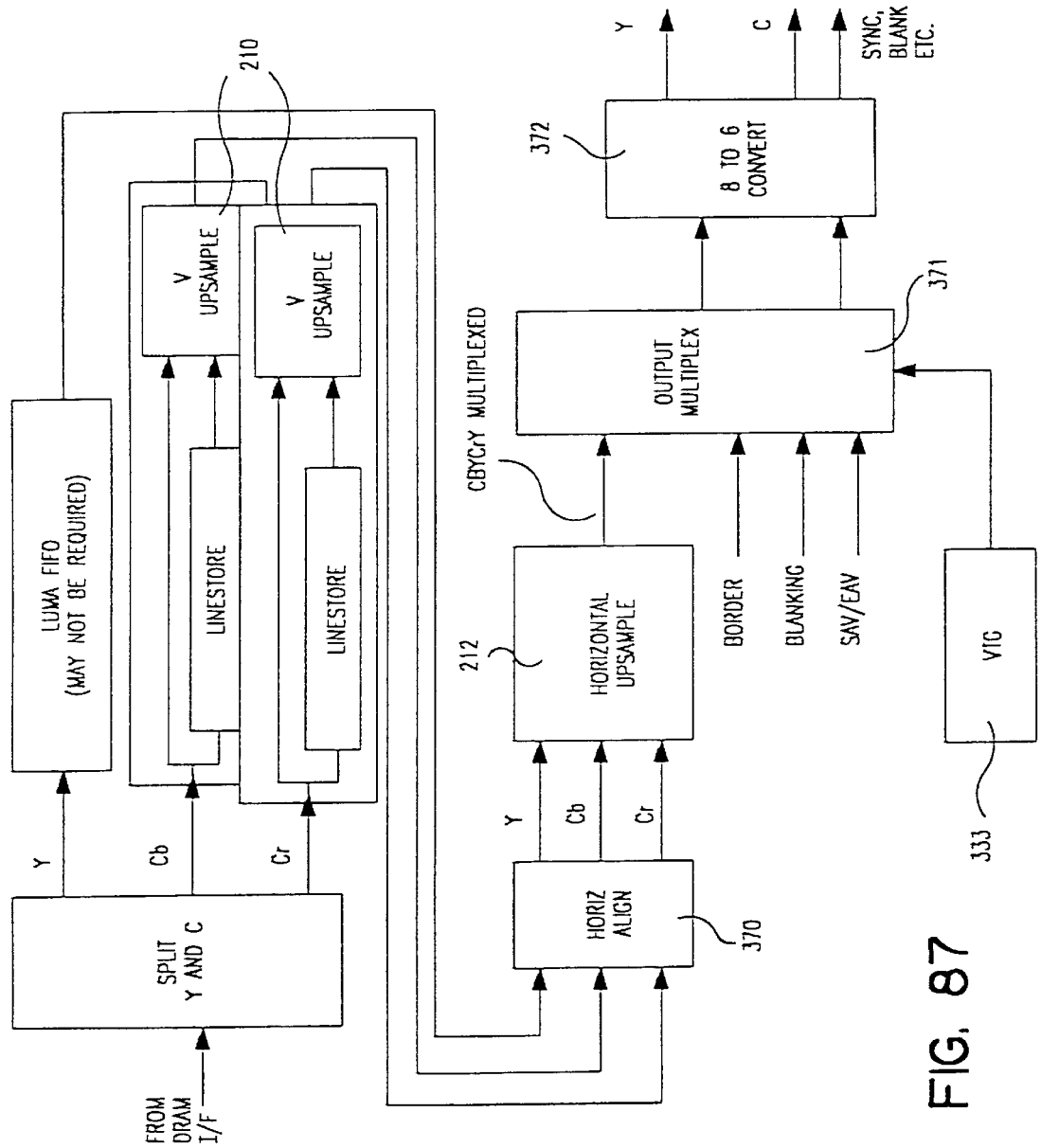
FIG. 87 is a block diagram illustrating the organization of the various system components of the display system of the present invention.

FIG. 87 shows the overall organization of the display pipeline, in accordance with the present invention. Data arrives from the DRAM interface on a single multiplexed interface. Moreover, the DRAM interface will supply data in lines that are rounded up to the next 32 byte boundary above the correct number of bytes. However, the pels toward the end of the line that may lie outside the intended display area.

In addition to the data, the DRAM interface will supply one bit for each channel (Y, Cr and Cb). that indicates whether the byte is the last in the current display line. A further bit is supplied that indicates which field the data comes from.

The first block in the display pipeline of the present invention splits apart the three channels. Chrominance (Cr and Cb) data is supplied to the vertical upsamplers 210. Luminance (Y) data can be delayed in a FIFO if desired.

The vertical upsamplers 210 have the task of upsampling the chrominance data by a 2:1 factor so that there are as many lines of chrominance data as there are of luminance data. In order to do this the vertical upsamplers store each line of chrominance data and produce output pels that are interpolated between this line and the subsequent line.

The next stage in the display pipeline is labeled "Horizontal Align 370". This is implemented as part of the horizontal upsampler 212. Its task is to align the data so that at the start of each line, the first pel of each of the three channels is supplied to the horizontal upsampler 212 correctly. At the end of each line, it is expected that, in general, the channels will "run out of data" at different times. The "Horizontal Align" block 370 has the job of discarding this extra data from the channels that have too much data while stalling the other channels so that they wait until all three channels are aligned and ready to commence the next display line.

In the invention, the horizontal upsamplers 212 upsample the data horizontally to stretch the data to fill the glass of a TV screen. In order to save silicon area, the filter is shared between the three channels. This can be done because the total output rate of the filter must be 27 Mbytes/s (the clock rate). The data is multiplexed in the CCIR 601 order so that the data stream produced is simply multiplexed into the final data stream.

Note that the horizontal upsamplers 212 merely take the amount of data supplied by the DRAM interface and scale it by a selected factor. In general, they will produce too little or too much data for the actual line length in the raster. This is handled in the output multiplex.

Also, note that the "Horizontal Align" block 370 does not need to know how many pels of each channel will be required to complete the line. It is very difficult to calculate this number because the relation between the number of input pels to output pels for the upsampling filter is not very simple. The Horizontal Align block 370 simply supplies data to the horizontal upsampler 212 on each of its three channels "on demand," i.e., the horizontal upsampler "pulls" the required number of pels into it in the required order. At the end of the display line, one of the channels will run out of data first and this indicates that the remaining data for the other channels (if any) should be discarded.

The VTG 333 simply counts through the raster and produces a series of timing signals that are supplied to the output multiplex 371. Some of these signals are internal signals which tell the output multiplex 371 how to build the final raster. Other signals are "external" signals, such as sync and blanking, and these are also supplied to the output multiplex 371 circuitry so that they are delayed by the same number of clock cycles as the data.

The output multiplex 371 block has several tasks. The most interesting of these is probably the task of removing the two wire "interfaceness" from the data. Data supplied from the horizontal upsampler 212 still has an associated valid signal (and the output multiplex provides an accept signal). Data at the output of the multiplex has no two-wire interface, it is simply clocked out, one byte per clock cycle.

The output multiplex 371 also has the job of painting a border around the picture. The top and left borders are painted under the control of the VTG 333, The VTG 333 simply tells the output multiplex 371 to produce the requisite number of pels of border color. At the right and bottom of the picture, the output multiplex 371 paints its own border, i.e., it knows to do this because it runs out of picture data.

The final block in the display pipeline is the 8-bit to 16-bit output mode converter 372. This is quite simply a flip-flop and a multiplexer. It is intended that this be implemented at the output PAD itself. By doing this, it is possible to simply route an 8-bit bus, rather than a 16-bit bus. Each bit will go to two output pads.

Horizontal Upsampler

Introduction

In accordance with the invention, the Horizontal Upsampler 212 performs the task of upsampling or interpolating the decoded picture in order to stretch it to fit the display raster.

The upsampler 212 of the present invention can operate in four modes:

1) 1:1—Output is the same as the input 2) 2:1

3) 3:2

4) 4:3

After some picture simulations and consideration of likely implementation costs, it has been decided to use a three tap filter to perform the interpolation.

The filter is a "polyphase" filter in the sense that each successive output is generated using a different set of filter coefficients. The number of phases is always equal to the numerator of the upsampling ratio. Thus, the 4:3 upsampler has four phases, every fourth output sample being generated using the same filter coefficients.

Since the upsampler 212 is generating more output data than it accepts as input data, it is clear that a new input sample is not accepted on every clock cycle. In fact, the number of phases on which the filter does not accept new input is the difference between the numerator and the denominator of the upsampling ratio. In each of the ratios (except 1:1) this is one. Therefore, for each complete cycle around the phases, on one of the phases no new input data is accepted. In this case the data is the same as for the previous phase. The filter coefficients are, however, different to the previous phase.

4:3 Upsampling

Figure 88:
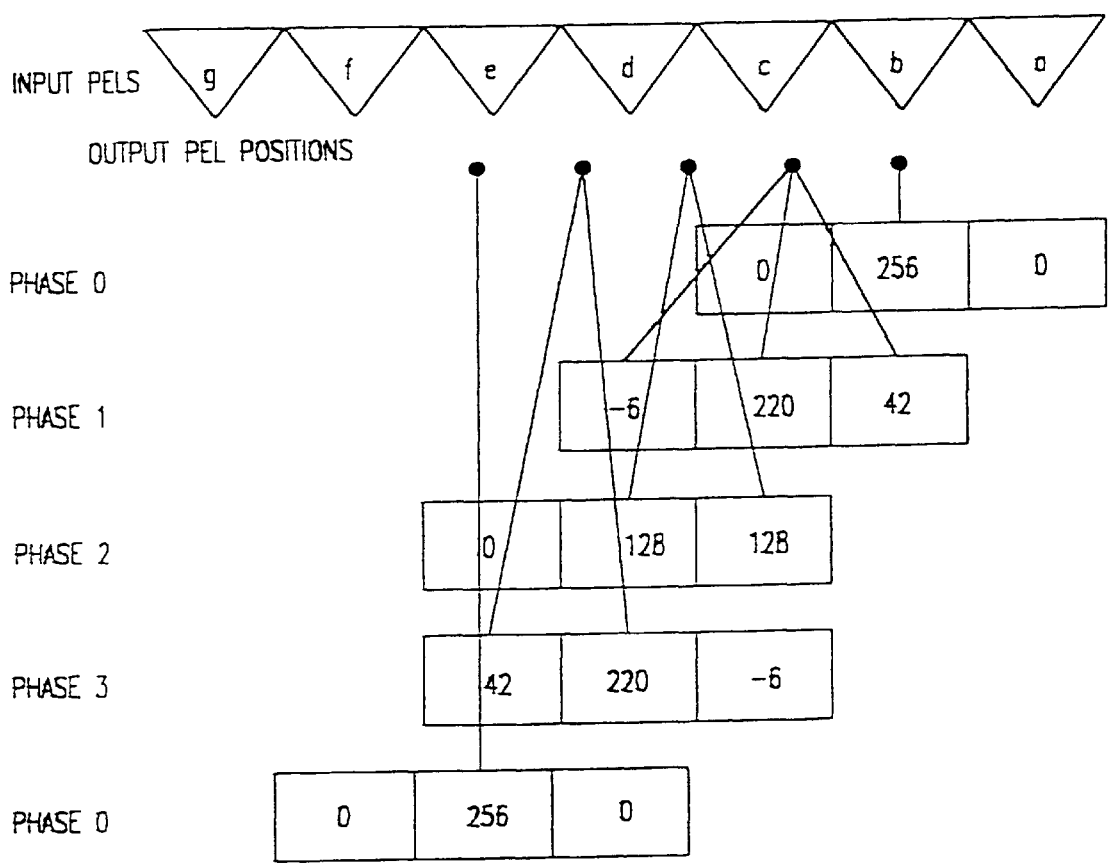
FIG. 88 depicts a 4:3 filtering operation.

In 4:3 Upsampling, the filter coefficients are shown in Table 44 while FIG. 88 shows the filter in operation. The output pels are essentially formed as weighted averages of the input pels.

TABLE 44

4:3 Filter Coefficients

| Phase | C[0] | C[1] | C[2] |
|---|---|---|---|
| 0 | 0 | 356 | 0 |
| 1 | 42 | 220 | −6 |
| 2 | 128 | 128 | 0 |
| 3 | −6 | 220 | 42 |

Note that no new accepted before the final phase (phase 3) is calculated.

3:2 Upsampling

Figure 89:
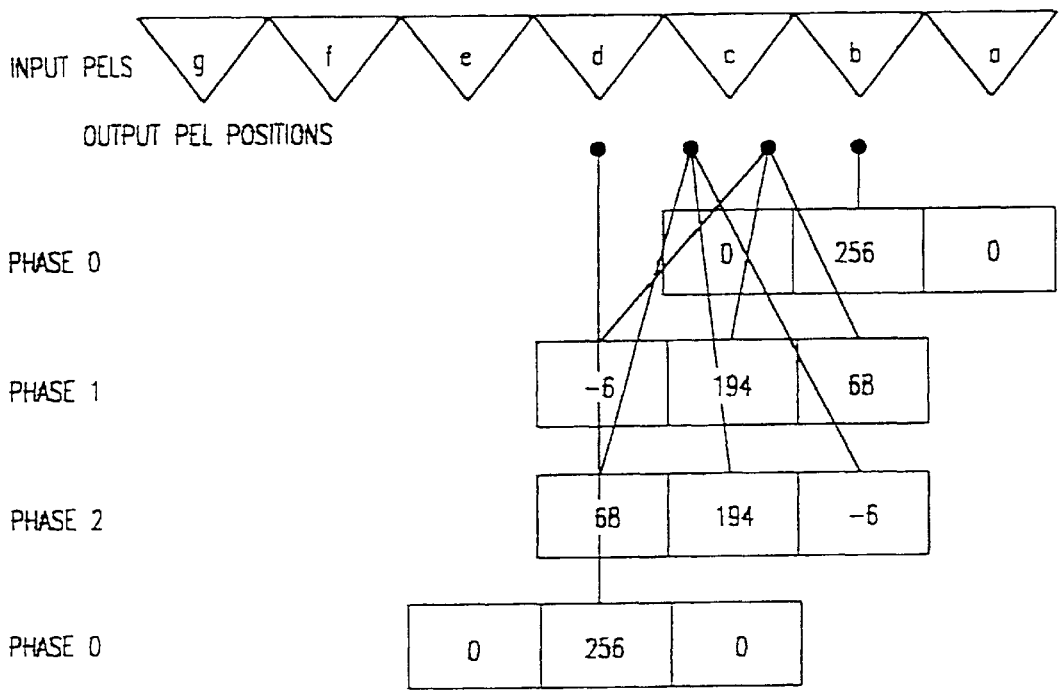
FIG. 89 depicts a 3:2 filtering operation.

Table 45 illustrates 3:2 upsampling, while FIG. 89 illustrates filter operation.

TABLE 45

3:2 Filter Coefficients

| Phase | C[0] | C[1] | C[2] |
|---|---|---|---|
| 0 | 0 | 256 | 0 |
| 1 | 68 | 194 | −6 |
| 2 | −6 | 194 | 68 |

2:1 Upsampling

Figure 90:
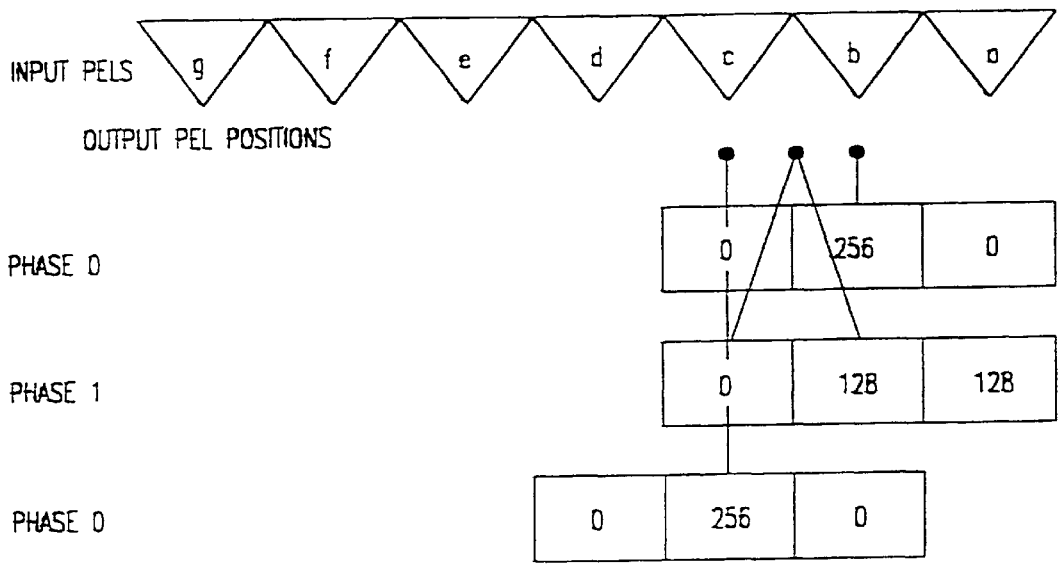
FIG. 90 illustrates a 2:1 filtering operation of the present invention.

Likewise, Table 46 illustrates 2:1 upsampling and FIG. 90 shows filtering thereof.

TABLE 46

2:1 Filter Coefficients

| Phase | C[0] | C[1] | C[2] |
|---|---|---|---|
| 0 | 0 | 256 | 0 |
| 1 | 0 | 128 | 128 |

Note that Phase 1 could equally well have been described as having filter coefficients, 128, 128, 0. This has the advantage that the filter coefficients would then be the same as for Phase 2 of the 4:3 upsampler. However, it has the disadvantage that the rule "no new input is accepted when computing the last phase" would not be true.

Boundary Effects

At the edge of the picture, it is necessary to produce output pels that are formed from pels that lie outside the picture area. In order to avoid this problem, it is necessary to pixel-repeat edge pels so that the filter may proceed without realizing that it is at the edge of the picture.

Figure 91:
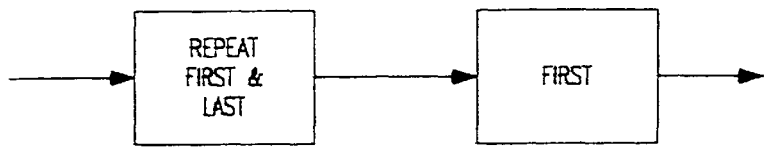
FIG. 91 shows a three tap filter used in the present invention.

In the case of a three tap filter, as in the present invention, it is necessary to repeat just one pel at the left of the image and one at the right. (A five tap filter would have required 2 at he left, 2 at the right). This is shown in FIG. 91.

Conceptually, therefore, the implementation could be viewed as being formed of two boxes:

Note the scheme doesn't really work properly in the case that the picture is not a multiple of 16 pels wide because the DRAM interface will always supply data that is a multiple of 16 pels wide.

Figure 92:
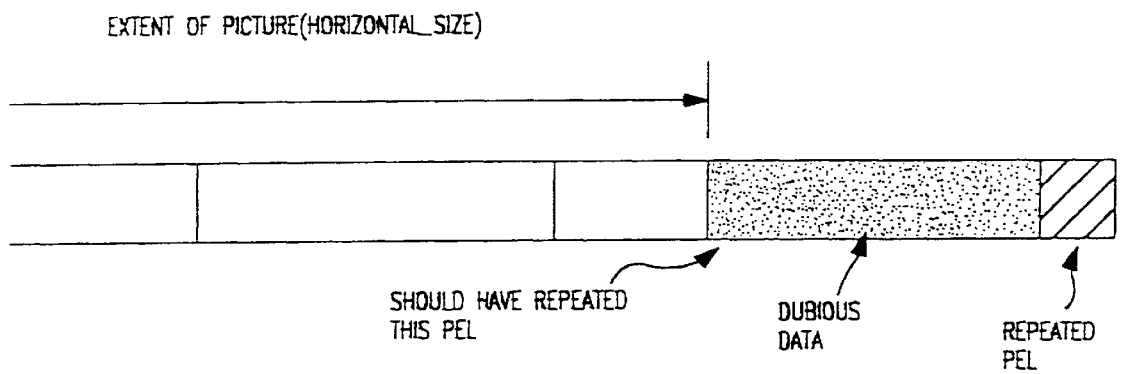
FIG. 92 illustrates the repetition of erroneous pels.

However, although this problem is known, we are not going to do anything about it. Most picture are multiples of 16 pels wide anyway, and in any case it is only the very last pel of the line that can be affected by the boundary effect. This is illustrated in FIG. 92.

The Number of Output Pels

In the present invention, the upsampler will produce a defined number of output pels for a given number of input pels. This is important because this allows the parser State Machine to decide how many pels will be produced at the output of the upsampler and, hence, how many pels need to be cropped (or border pels added) in order for the picture to fit into the raster.

The first valid output from the horizontal upsampler should occur in response to the third pel being input to the upsampler (since this is a three tap filter). Since one pel is repeated, this will occur when the second actual pel is input to the upsampler.

The last valid output should occur when all of the possible output samples have been produced in response to the last (i.e., repeated) pel being input. Since the last phase of the poly-phase filters is computed using the same input data as the second-last phase, it is possible that either one or two output pels are produced as a result of this last repeated pel entering the upsampler.

If this is done, the upsampler will produce "q" output samples:

$$q = N(pDIVM) + (pREMM) \qquad \text{EQ 1.}$$

in response to "p" input samples for an N:M upsampler.

For example, for a 4:3 upsampler. Table 47 could be drawn up as follows:

TABLE 47

Number of Output Pels for 4:3 Upsampler

| p (input pels) | q (output pels) |
|---|---|
| 1 | 1 |
| 2 | 2 |
| 3 | 4 |
| 4 | 5 |
| 5 | 6 |
| 6 | 8 |

Position Signals

Figure 93:
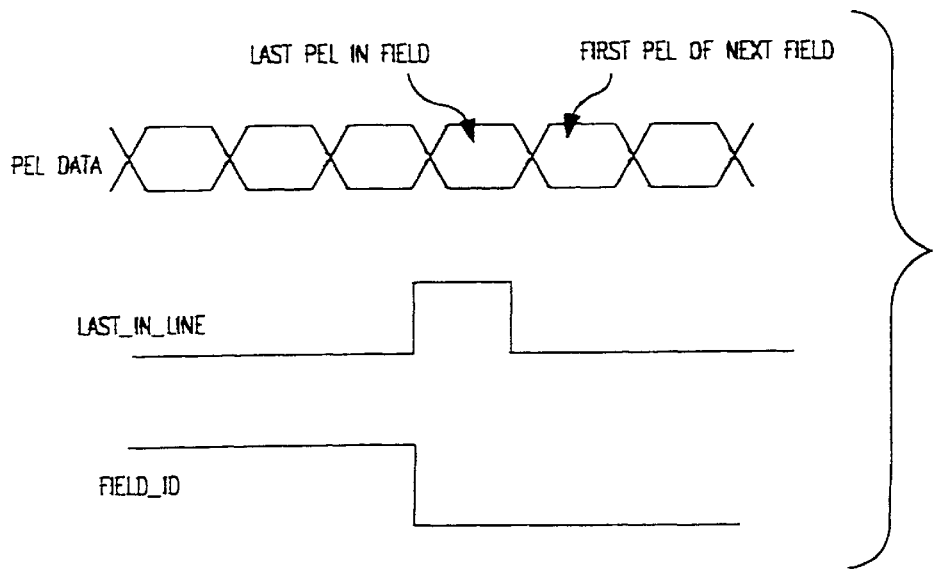
FIG. 93 depicts the filed_id signal of the present invention.

Two signals are transferred along with the video data in the present invention. They allow the output multiplex to ensure that the data is painted into the appropriate position in the output raster. These are:

---
last_in_line
field_id
--- last_in_line is active for one pel time and signals that the associated pel is the last pel in a scan line.

field_id indicates which field the data belongs to. "0" indicates the spatially upper field. "1" indicates the spatially lower field. Note that this designation applies before any border lines and the like, are applied to the decoded image. field_id changes state one pel too early, i.e., between the second to last and the last pel of the field. This allows the last pel of the field to be identified without waiting for the first pel of the next field. However, there may be no "next field" if decoding stops for some reason. The field_id signal is shown in FIG. 93.

If a true field indicator is required, it can be obtained by delaying field_id by one pel time.

Since these signals work their way along side the data through the entire display pipeline, it is important to use two signals, not three (which would allow a last pel in field signal) because it saves many flip-flops.

Multiplexed data

When position signals are applied to multiplexed data, care needs to be taken.

The data is multiplexed in the order; $C_b \, Y \, C_r \, Y$.

In the present invention, the three samples ($C_b \, Y \, C_r$) are co-incident in time and should, therefore, be viewed as indivisible. The remaining byte ($Y$) is positioned between the preceding ($C_b \, Y \, C_r$) pel and the subsequent ($C_b \, Y \, C_r$) pel.

As a result, the last byte in the line will either be the $C_r$ or $Y$. (Note that upsampling by 3:2 may produce an odd number of Y pels.) If the last byte in the lines is $C_r$, then, there should be a discontinuity in the multiplex signal because the first byte of a line is always $C_b$:

$$(C_b Y_1 C_r)(Y)(C_b Y_1 C_r)\backslash(C_b Y_1 C_r)(Y)(C_b Y_1 C_r)$$

Horizontal Alignment

At the input of the upsampler, there is no guarantee that the three different channels will line up.

In order to achieve alignment, in the present invention, a "protocol" between the horizontal upsampler and the horizontal alignment blocks needs to be agreed. In accordance with the present invention, the protocol performs as follows:

---
The horizontal block supplies pels, on demand, to the horizontal upsampler. When it runs out of data for a given channel, it will signal this to the filter using a signal marking the last pel of the line. This will only happen for the repeated pel.
The horizontal upsampler ensures that once it has been supplied the last pel from a given channel it will not ask for another pel from that channel in the current line. However, the filter continues to operate, taking any necessary pels from other channels, until just before it will demand a pel from the channel that it knows has run out of data. The filter marks the last pel it can produce at the output as the last in the line. At this point, it resets itself as ready for the next line of data.
When the horizontal upsampler sees the filter accept data for a channel that has already been exhausted, it knows that the filter is asking for the first pel of the next line. At this point, any remaining pels on the other two channels are discarded. The next pel that will be supplied on each of these channels will be the first pel of the line.
---

Although it is convenient to think of two separate blocks (the horizontal alignment block and the horizontal upsampler filter) it is likely that the two will be implemented together, in order to explain the operation.

Upsampling Ratio

The upsampling ratio will be supplied to the filter as a two bit binary number. In order that the filter operates in a sensible manner, the upsampling ratio should be sampled, by the upsampler itself, once per field time. The circuitry supplying the ratio is then free to update the sampling ratio, in readiness for the next field, at any time during the current field.

The ratio should be sampled as the first pel of each field is actually accepted (rather than just after the last pel of the previous field). In this way, the very first field after reset (or after some pause in decoding) is upsampled with the correct ratio.

Video Timing Generator

Introduction

This section describes the video timing generator circuit (VTG 333) in accordance with the present invention. The VTG is primarily responsible for generating the various analogue video synchronizing signals, and also for maintaining knowledge of the display system's current raster position. This enables the VTG to provide controlling signals for the output multiplexer, which selects between active video, border and blanking sources for output. Both analogue and digital standards are supported, with two frame sizes (PAL and NTSC), and associated synchronizing behavior, selectable at setup. Border or cropping width will be specified in a token which will load a hardwired input to the VTG.

Horizontal Timing

Figure 94:
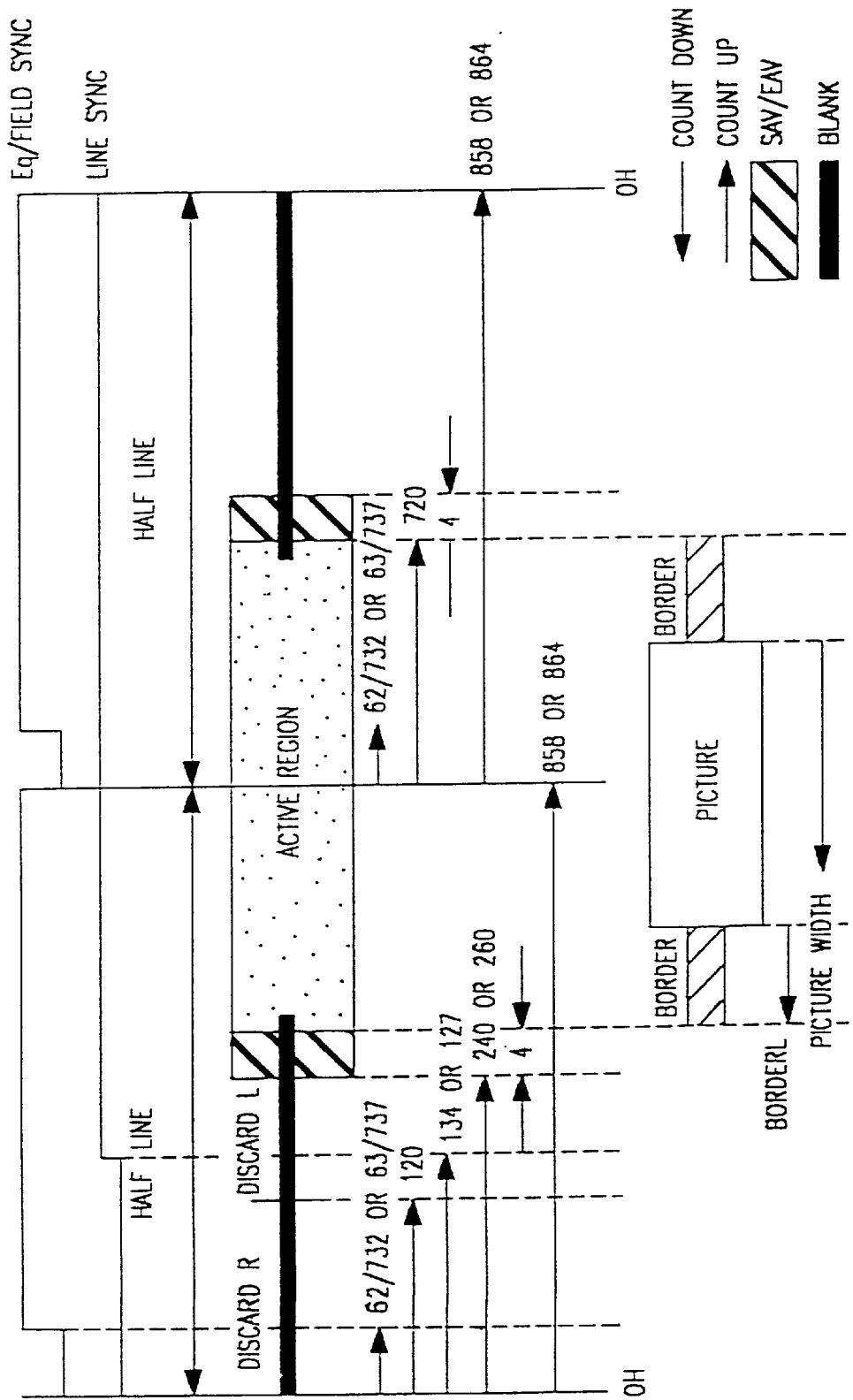
FIG. 94 shows the horizontal timing points (cycles), in accordance with the present invention.

The horizontal timing parameters are illustrated in FIG. 94. These are split into those that are fixed (for either PAL or NTSC) and those that are variable (i.e., the parameters associated with any borders or cropping that may be specified.

The interlaced nature of the video being displayed imposes a requirement for half-line based counting, so than various timing points are shown separately for each half of the line.

A line comprises an initial blanking period, the insertion of a SAV token, an active period, the insertion of an EAV token, and the trailing blanking period. During blanking lines, the active area-will have blank values inserted rather than border and data.

A line sync pulse appears at the beginning of every line (HSYNC). On certain blanking lines, two sync pulses appear, one at the beginning and the other after the first half line. The width of these is dependent on which vertical region is active: equalization or serration (field sync).

During the initial horizontal blanking period, pels are discarded according to the cropping value (if the crop bit is set)—a fixed period of 120 cycles is allowed to discard the RHS cropped pels from the preceding line. The LHS pels for the current line are then discarded, and pels are stalled until the start of the active region. It is essential that there are no gaps in the data stream from which pels are being discarded, otherwise distortions will occur.

If the crop bit is not set, however, a border is constructed by inserting border value for a period of borderL; followed by data for picture width, and then border again until the end of the active region. Note that it is not necessary to calculate the borderR value.

The total horizontal border or crop width is specified in pels. The LHS border/crop value must be a multiple of 2 pels in order for the sampling to remain consistent. Consequently, it must be a multiple of 4 in terms of clock cycles. This can be achieved by masking out the least significant 2 bits from the original total border value in pels.

For example, if the specified border is 91 pels, the left border will be 88 cycles long, and the picture width will be (720−91)*2 cycles.

Streams of pels arriving at the output max are padded to give blocks of 32 pels. Considering this, together with the scaling factors to be supported, the maximum number of pels to be received for a line will be 832. This means that the maximum crop value will be 112 pels, giving 112 cycles of cropping at the LHS and the RHS.

Vertical Timing—PAL

Figure 95:
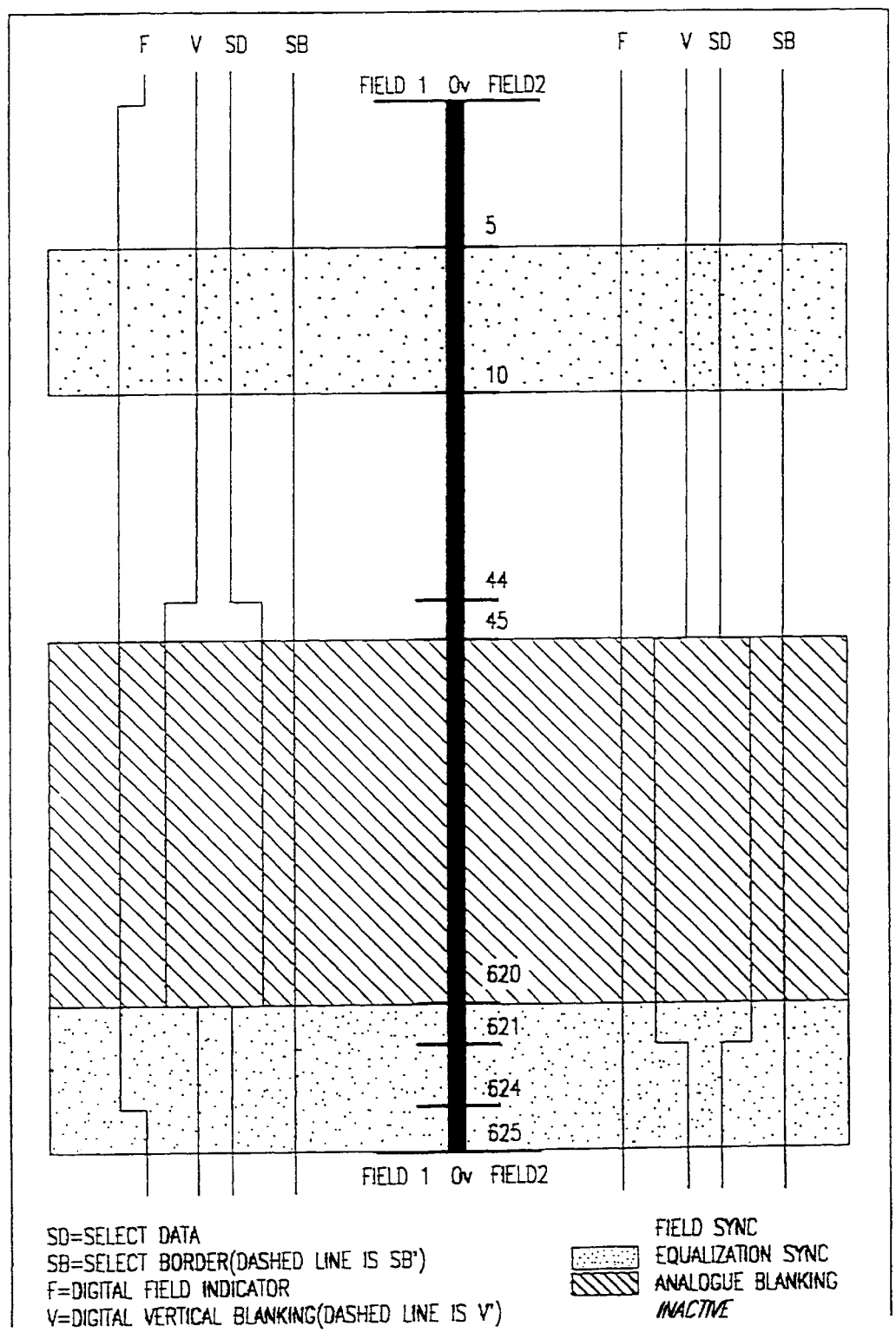
FIG. 95 illustrates the PAL vertical timing at 625 lines per field, in accordance with the present invention.

The vertical timing parameters for PAL in accordance with the present invention, are illustrated in FIG. 95. Two fields are shown separately, as they have slightly different timing. Analogue parameters are indicated by the shaded regions, being identical for each field, and digital parameters are shown by the waveforms. For simplicity, the zero-border case is shown. If a non-zero vertical border is specified, border is inserted for a period of borderT, then data for picture height, then border again until the end of the active region (fixed). BorderT and picture height are calculated in a way analogous to borderL and picture width (in horizontal timing) respectively. Once again, the initial border (borderT) must be a multiple of 4, this time in terms of half lines because the top border must be a multiple of 2.

Note that MPEG codes 576 lines of video for PAL, whereas the analogue standard specifies only 525. This difference is accommodated by selecting data for output for 576 half-lines per field, but only asserting the analogue blanking signal for the requisite 575 lines.

Vertical Timing—NTSC

Figure 96:
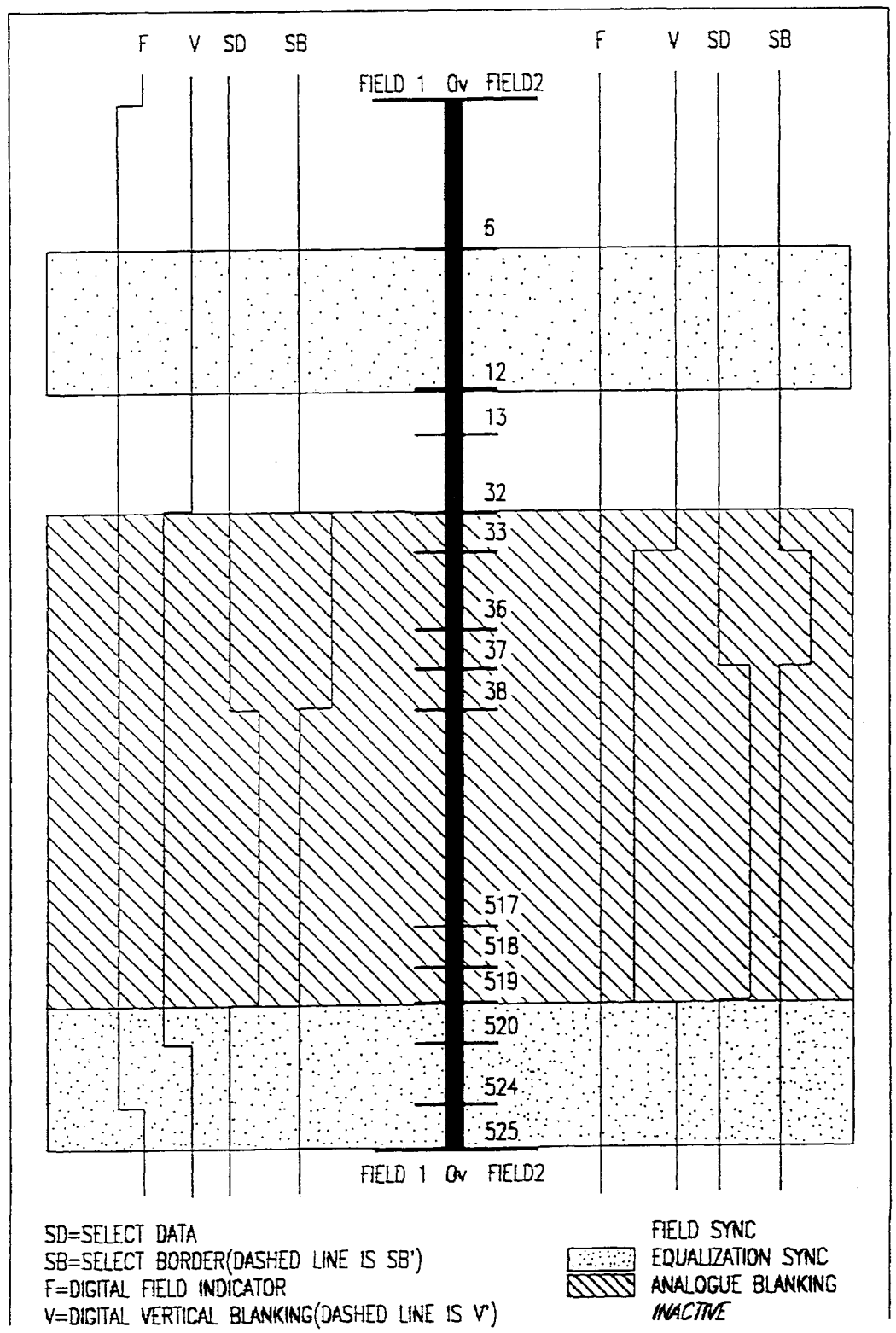
FIG. 96 illustrates the NTSCV vertical timing at 525 lines per field, in accordance with the present invention.

Next, NTSC vertical timing, in accordance with the present invention, is illustrated in FIG. 96. It is similar in principle to the PAL timing, although slightly more complex. MPEG codes 480 lines of video for NTSC, whereas the analogue standard specifies 483. This means that 3 lines of border must be inserted per frame to fill the gap (3 half lines per field). In addition, the judicial vertical blanking indicator, V, is specified in such a way that additional border lines are required to be inserted as padding before the active video lines. Non-zero vertical borders will be inserted in addition to those lines already indicated, as described in the previous section. Furthermore, note that vertical cropping is not allowed in either standard.

There is, at present, some uncertainty about the digital blank signal, V, since various reference sources give conflicting information. There are two main timing possibilities, illustrated by V and V', with the associated border select signals SB and SB', respectively.

VTG Structure

The video timing generator of the present invention comprises separate machines for the horizontal and vertical timing domains. The vertical machine provides control signals for the horizontal machine, which, in turn, provides the half-line increment signal for the vertical counters.

Inputs to the VTG are:

clocks and reset
PAL not NTSC
horizontal border value with crop indicator
vertical border value
Outputs are:

horizontal, vertical and composite sync and blanking signals
select signals for data, border, blanking
a discard data bit for cropping Inputs to the VTG are:

insert SAV and EAV
F and V values for construction of SAV and EAV
a 2-bit YUV position counter for SAV/EAV insertion
a firstline bit to indicate the start of a picture at startup All of the outputs go to the output multiplexer block, including the sync signals which can then remain in synchronization with the data.

Horizontal Machine

Figure 97:
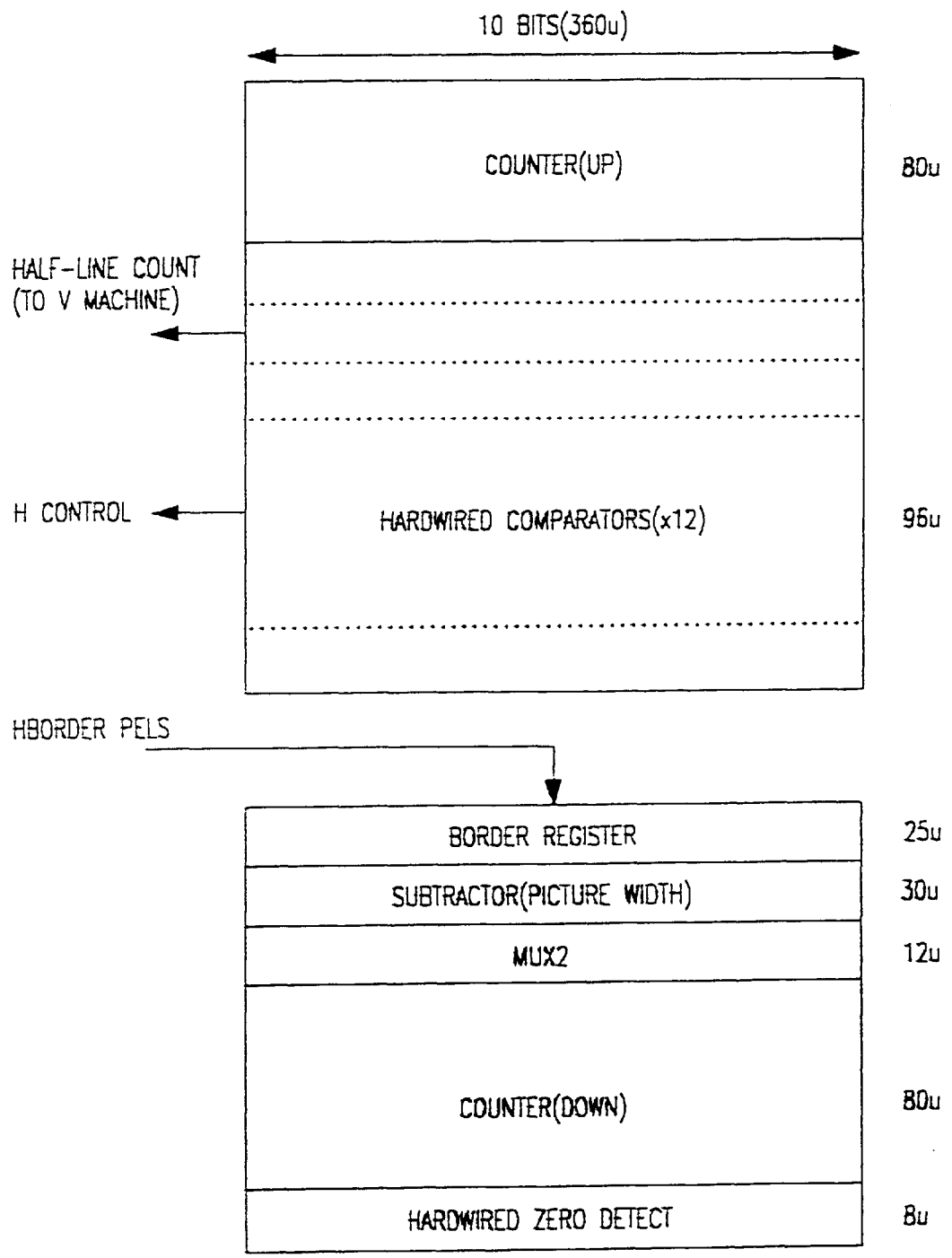
FIG. 97 shows a horizontal counting machine, in accordance with the present invention.

The horizontal machine is essentially a counter with hardware to detect the arrival of the various timing points as shown in FIG. 94. The count goes from zero to half line length (which is different for PAL and NTSC) and is repeated for each half line. A hardwired comparator exists for each of the fixed timing points, these being activated according to the standard. In addition, there is a register for the border value (which is polled once per field), a subtractor to determine the picture width, and an auxiliary counter for counting down from the border value to zero. This procedure occurs in parallel with the main half-line coining. The datapath is 10 bits wide, and 15 hardwired comparators are required to implement both PAL and NTSC. The structure of this current embodiment is shown in FIG. 97, together with approximate sizes. The datapath is estimated to be 360 u×330 u.

In addition to the datapath, most of the control logic in the VTG of the present invention will be associated with the horizontal machine. This will probably amount to 100–200 gates.

Inputs to the horizontal machine are:

clocks and reset
horizontal border value and crop bit
line, equalization or field sync indicators
PAL not NTSC
vertical blank
insert vertical border
Outputs from the horizontal machine are:

horizontal and composite blanks
insert data
insert border
insert blank values
discard input
insert SAV or EAV, with YUV count
hsync
composite sync
start of line
half-line increment Vertical Machine The vertical datapath has essentially the same structure as the horizontal datapath, but with 22 hardware comparators (8 for PAL, 14 for NTSC). The principal counter increments each half line, counting the half-lines through each half line, and counting the half-lines through each field, in turn. It is also 10 bits wide.

Moreover, it is advantageous for test purposes to multiplex the half-line pulse input with another, more frequent clock, so that the vertical machine can be run independently of the horizontal machine.

The estimated size is 360 u×420 u.

| Inputs to the vertical machine are: |
| --- |
| clocks and reset |
| PAL not NTSC |
| vertical border value |
| half-kline increment |
| Outputs from the vertical machine are: |
| select equalization, field or line sync |
| vertical blank (analogue) |
| vertical sync |
| F, V and V bits for SAV/EAV construction |
| insert vertical border |
| insert data |
| insert blank value |
| start of frame |

Hardwired Comparator Design

In the present invention, the hardwired comparator design is based on a string of series n-type transistors, either pre-charged or with pull-up, organized in a similar style to memory row decoders. Typically, these comparators will be about 8 u high in the area estimates given.

Output Multiplex

The output multiplex of the invention has the task of putting together the data for display. It combines data arriving from the earlier sections of the display pipeline with timing information obtained from the VTG.

The other input task of the output multiplex is to remove the two-wire interfacing. All the pipeline stages up to the output multiplex have a two-wire interface, indeed the data arriving at the input of the output multiplex will always arrive too early and will be stalled by taking accept low. However, there is no two-wire interface at the output of the device.

In order to achieve the above removal of the two-wire interfacing, the dynamics of the supply of data need to be sorted out so that the DRAM interface never stalls the data arriving at the output of the horizontal upsampler.

Basically, the output multiplex is making a decision on a field by field basis as to whether to output a field of data or not. At some point, close to the start of the first active line of the field, the output multiplex makes a decision. If there is valid data waiting at its input (i.e., in_accept is low) then it will start to output the data. If, on the other hand, there is no valid data (for example, before the first picture has been decoded) then it will paint border color through the entire picture.

Actually, this procedure is slightly more complicated because the output multiplex must also ensure that the data is painted into the correct field. That is, there must be valid data waiting that belongs to the correct field before the display commences.

If at some point the data ceases to be valid, at a time that the output multiplex expects to have valid data available to paint into the display (which should never happen) then the output multiplex reverts to outputting border color which it continues to do for the remainder of the field.

Border Generation

Figure 98:
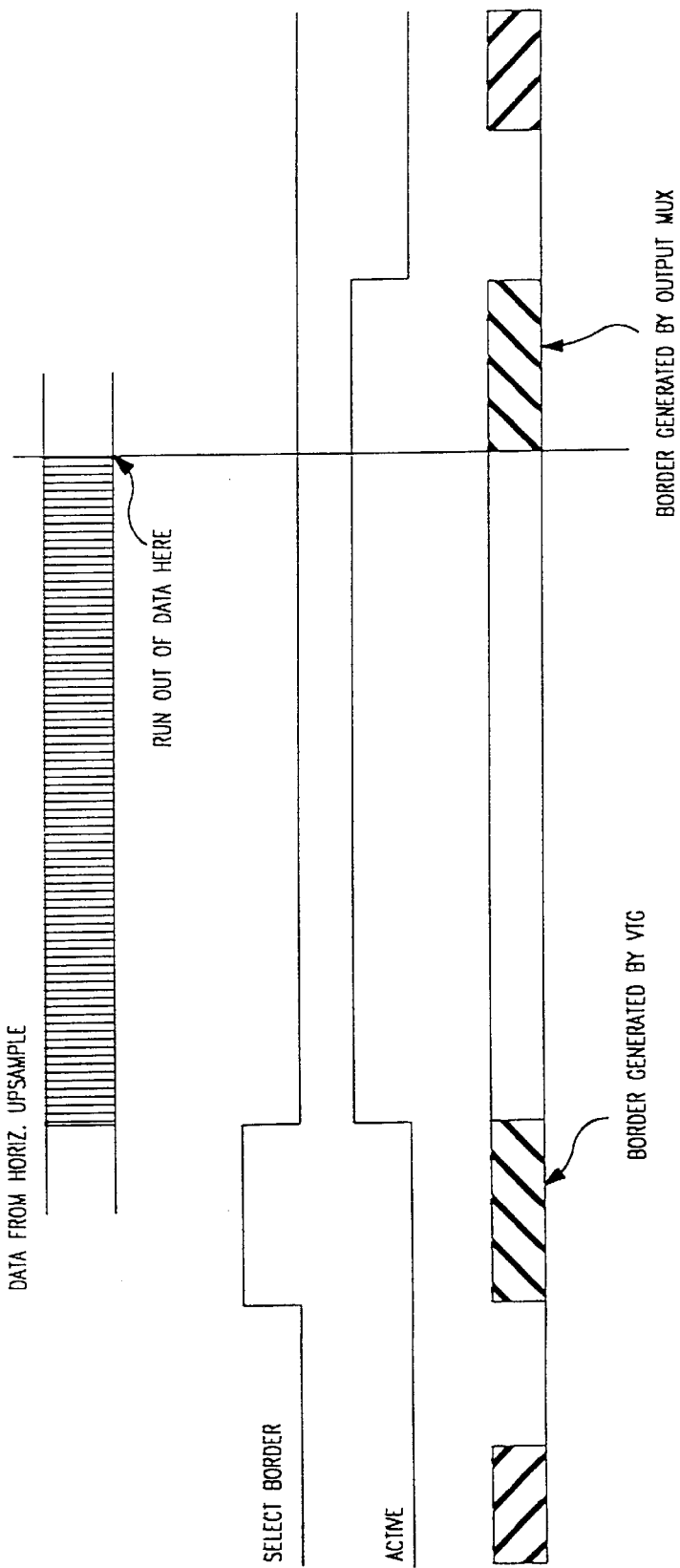
FIG. 98 illustrates border generation in the present invention.

FIG. 98 shows the generation of border color to the left and right of the picture display in accordance with the present invention.

As shown, the VTG generates the border region at the left of the picture by asserting a signal that selects border color in the output multiplex. However, at the right hand side of the picture, the border color is generated by the output multiplex itself. It does this by recognizing that it has "run out" of data and paints the remainder of the width of the picture in border color.

Figure 99:
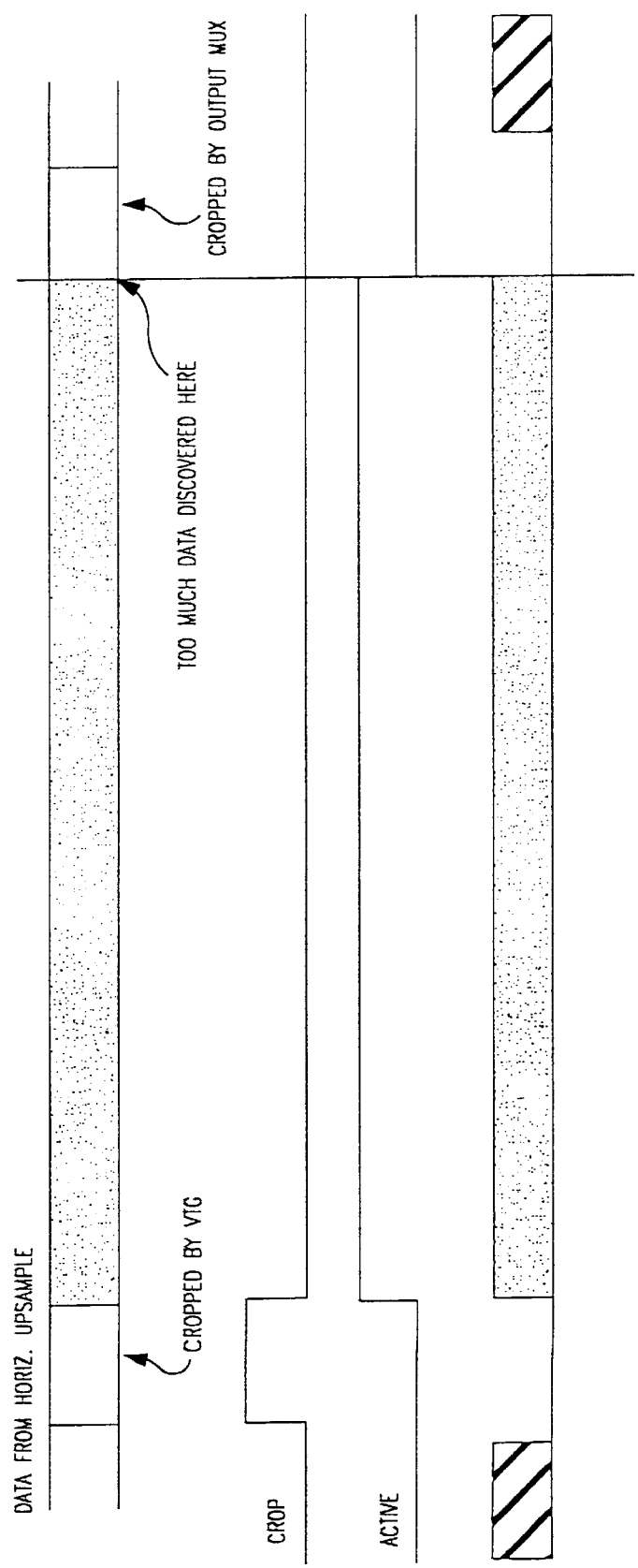
FIG. 99 depicts picture cropping, in accordance with the present invention.

It must be understood that there are two possible interpretations of "run out" of data. One is that the output data from horizontal upsampler is not valid. However, this is not what is meant here. In this case, one runs out of data after the pel that is marked by the last_in_line signal as going the last one in the line has been included in the output stream. FIG. 99 shows the equivalent action when clipping of the picture occurs.

As shown, the VTG signals to the output multiplex to clip pels to the left of the picture by asserting a signal to tell the output multiplex to discard input pels. Once this has occurred, the VTG will signal that the output multiplex should start to output the remaining pels. At the end of the active line (i.e., 720 pels later) the VTG de-asserts the signal and the output multiplex discards any remaining pels in the data on its input. Note that, in general, there will be a gap (in time) between the time when the VTG indicates that cropping should occur and the start of the active line. This significantly simplifies the design of the VTG. The output multiplex discards pels when the crop signal is asserted and then waits until the start of the active line period.

Output multiplex

The output multiplex controls the multiplexing of various sources of data together to form a CCIR 601 8 bit multiplexed data stream.

The timing (i.e., what is multiplexed in and when) is largely controlled by the VTG. The output multiplex is concerned with higher level issues. For example, at the start of decoding, when no pictures are available for display, the output multiplex will be painting border color throughout the entire image. Eventually, the first decoded picture will arrive at the output of the horizontal upsampler. Typically, this will not occur conveniently at the start of the field. The output multiplex asks once per field time "is there valid data ready for display?". If not, it waits for the next field to occur (and any valid data that happens to turn up in the meantime has to wait for the start of the next field).

The output multiplex also ensures that the correct field of data arriving from the SDRAM interface is painted into the correct field of the PAL or NTSC raster.

In addition, to dealing with the data, the output multiplex also selects the correct sync and blanking signals for outputting to the pins. This facilitates easy connection to a wide range of composite encoders, DAC's, and the like. The registers for the output multiplex are as shown in Table 48. The bits for the output multiplex control are illustrated in Table 49.

There are four bytes of MPI registers associated with the output multiplex:

TABLE 48

Outmux registers

| Register Name | Size/ Dir. | Reset State | Description |
| --- | --- | --- | --- |
| border_cb | 8 | 0 × C0 | Cb component of border color |
| border_y | 8 | 0 × 80 | Y component of border color |
| border_cr | 8 | 0 × 40 | Cr component of border color |
| outmux_ctrlL | 8 | zero | |

TABLE 49

Bits from Outmux_Ctrl

| Register Name | Bit | Reset State | Description |
|---|---|---|---|
| hs/cs | 0 | 0 | Controls whether horizontal sync or composite sync is present on the hcsync pin. 0 selects composite sync 1 selects horizontal sync |
| hcsync_ah | 1 | 0 | Controls the parity of the hcsync pin. 0 selects active low 1 selects active high |
| vsync_ah | 2 | 0 | Controls the parity of the vsync pin. 0 selects active low 1 selects active high |
| cblank_ah | 3 | 0 | Controls the parity of the cblank pin. 0 selects active low 1 selects active high |
| blanking601 | 4 | 0 | Controls and value of $^{luminance}$ data that is output during blanking. 0 selects the value zero1 selects the vaue 0 × 10 (sixteen) For CCIR 601 data this pin must be set to 1. |
| enbl_sav_eav | 5 | 0 | Controls the generation of SAV and EAV control words in the output stream. 0 suppresses SAV and EAV, in which case, blanking values are output at the times when SAV and EAV would otherwise be generated. 1 enable SAV and EAV. Note that blanking601 should also be set to 1 to avoid the value zero appearing at the output except during SAV and EAV. For CCIR 601 data this pin must be set to 1. |
| blank_screen | 6 | 0 | When set to 1, this bit causes border color to be painted over the entire screen, thereby blanking the screen. Note that decoding continues as normal, but the decoded pictures are rendered invisible. |
| vblank | 7 | — | This is a read-only bit (data written to this bit is ignored). It indicates vertical blanking. | a. Irrespective of the setting of this bit, chrominance data (both Cb and Cr) will be 0 × 80 (128 decimal) during blanking.

Video Decoder Specifications and Features

In addition to the aforementioned detailed description, the following disclosure is also provided regarding a preferred embodiment of a video decoder suitable for practice of the invention.

| | |
|---|---|
| MPEG-2 MP @ ML | 2/3 and 1/1 pull down |
| Single 16 Mbit SDRAM | Video scaling |
| High resolution MPEG-1 | Power including SDRAM ≈ 2.5 W |
| α Vision compatible | Self configuring |
| Automatic error concealment | Small board area |
| Channel change support | QuietPad ™ outputs |
| Time stamp management | On-chip video timing generator |

The present invention includes a highly integrated, easy to use, MPEG-2 video decoder. It fully supports all the requirements of MPEG-2 Main Profile at Main Level.

The system of present invention is also self configuring (a single pin selects between PAL and NTSC operation) and, in many applications, can start-up and maintain video decoding with no external software support. Error concealment and recovery is fully automatic. More demanding applications may utilize the advanced features controlled by software running on an external microprocessor.

Figure 100:
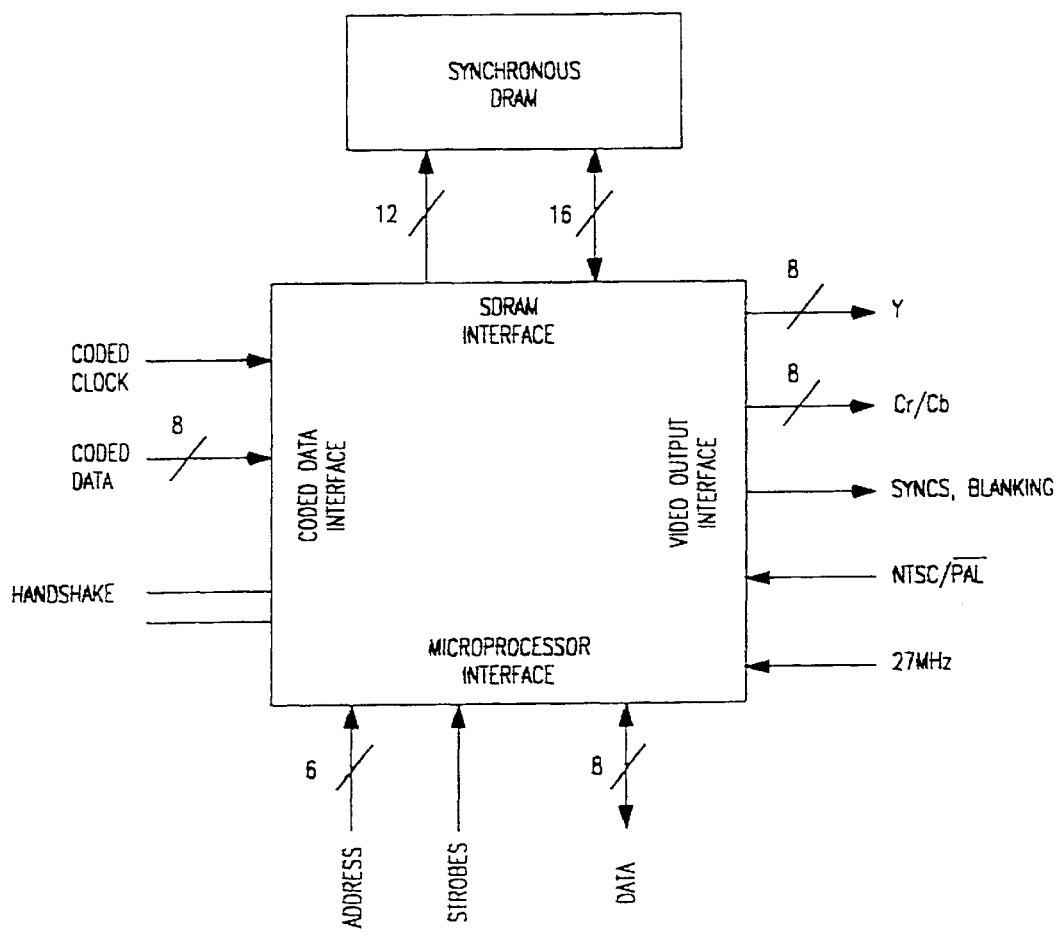
FIG. 100 is a block diagram illustrating the present invention as a chip.

The present invention stores its own microcode in an on-chip ROM, thus avoiding the need to use an external ROM or download microcode before decoding can commence. See FIG. 100.

The following more detailed description of the system of the present invention is set forth for purposes of organization, clarity and convenience of explanation under the headings listed below:

Signals
Register map
Power supplies
Logic levels
Clock signals
Reset signals
Coded data interface signals
Supply data via the microprocessor interface
Switching between input modes
Rate of accepting coded data
Coded data interface timing
CDCLOCK
Video output signals
Video output control registers
Borders, scaling and cropping
Video output control registers
Video signal timing
MPI signals
MPI electrical specifications
Interrupts
Page register
SDRAM interface signals
SDRAM configurations
Connection of JTAG pins in non-JTAG systems
Supported Instructions
Characteristics
Level of Conformance to IEEE 1149.1
Start code detector registers
Detection of start codes
discard_all facility
flag_picture_end facility
start_code_search facility
SCD example—channel change
Parser registers
Error codes
Dealing with user data System organization
Signals and registers
Electrical specifications
Coded data interface
Video output interface
Microprocessor interface
Synchronous DRAM interface
JTAG interface
Start code detector
Video parser
Timestamp management
Address generator configuration
Mechanical information This section includes a listing of all the signals (pins) used, in accordance with the present invention, and a listing of all the registers available through the microprocessor interface. (See Tables 50 and 51.)

TABLE 50

Signals

| Signal Name | I/O | Pin Number | Description |
|---|---|---|---|
| CDCLOCK | I | 137 | Coded Data Interface. |
| CD[7:0] | I | 133,132,130,129,128, 127,125,124 | Used to supply coded data or Tokens |
| CDEXTN | I | 134 | to the system. |
| CDVALID | I | 123 | |
| CCDACCEPT | O | 122 | |
| BMODE | I | 135 | |
| ME[1:0] | I | 99,98 | Micro Processor |
| MR/W | I | 97 | Interface (MPI) |
| MA[5:0] | I | 107,106,104,103,102,101 | |
| MD[7:0] | O | 119,118,117,116,114,113, 112,111 | |
| $\overline{IRQ}$ | O | 96 | |
| DD[15:0] | I/O | 36,35,33,32,30,29,27,26, 21,20,18,17,15,14,12,11 | SDRAM Interface |
| DA[10.0] | O | 152,153,143,144,146,147, 149,150,159,158,156,153 | |
| BS | O | | |
| DCKE | O | 39 | |
| DCLKOUT | O | 38 | |
| DCLKIN | I | 23 | |
| $\overline{DWE}$ | O | 9 | |
| $\overline{DCAS}$ | O | 8 | |
| $\overline{DRAS}$ | O | 6 | |
| $\overline{DCS[1:0]}$ | O | 3,2 | |
| y[7:0] | O | 52,53,54,55,57,58,59,60 | Video output interface |
| C[7:0] | O | 42,43,44,45,47,48,49,50 | |
| HCSYNC | O | 62 | |
| VSYNC | O | 63 | |
| YE | O | 64 | |
| CB/CR | O | 65 | |
| V16/8 | I | 67 | |
| NTSC/$\overline{PAL}$ | I | 68 | |
| CBLANK | O | 69 | |
| $\overline{VTGRESET}$ | I | 70 | |
| TCK | I | 74 | JTAG port. |
| TDI | I | 73 | |
| TDO | O | 72 | |
| TMS | I | 75 | |
| $\overline{TRST}$ | I | 79 | |
| SYSCLOCK | I | 139 | |
| $\overline{RESET}$ | I | 138 | |
| $\overline{TIMERESET}$ | I | 82 | |
| VCC | — | 1,7,13,19,25,31,37,142, 148,154,160 | |
| VDD | — | 46,56,76,86,95,105,115, 126,136 | |
| VDD | — | 4,10,16,22,28,34,40,41,51, 61,71,80,81,91,100,110, 120,121,131,140,145,151, 157 | |

TABLE 51

Test Signals

| Signal Name | I/O | Pin Number | Description |
|---|---|---|---|
| TPH0ISH | I | 87 | |
| TPH1ISH | I | 88 | |
| TSTRSTCTRL | I | 77 | |
| TLOOP | I | 78 | Connect to GND or VDD during normal operation |
| PLLSELECT | I | 83 | If PLLSELECT = 0 the on-chip phase locked loops are disabled. Set PLLSELECT = 1 for normal operation. |
| PLLLOCK | O | 84 | |
| TDCLK | I | 85 | |

Register Map

The register map of the present invention is divided into areas. The first 32 locations are required for the normal operation of the system. There is only five bits of address.

The next set of 32 locations are those in the address generation circuitry that are required to setup a non-default SDRAM memory map.

The remainder of the register map are registers that are only used for test and diagnostic purposes. These can be paged in instead of the address generator registers.

Table 52 illustrates the register map of the present invention.

TABLE 52

Overview of Register Map of Present Invention

| Address (hex) | Interrupt Service | See |
|---|---|---|
| 0 × 00 ... 0 × 03 | Interrupt service | |
| 0 × 04 ... 0 × 05 | Input circuit | |
| 0 × 06 ... 0 × 07 | Start code detector | |
| 0 × 08 ... 0 × 0a | Timestamp insertion | |
| 0 × 0b ... 0 × 0f | (not used) | |
| 0 × 10 ... 0 × 17 | Parser | |
| 0 × 18 ... 0 × 1c | Output control | |
| 0 × 1d | PLL control | |
| 0 × 1e | DRAM PAD drive strength | |
| 0 × 1f | page_select[a] | Table 3–4 |
| 0 × 20 ... 0 × 3f | paged register access | |

[a] In normal operation, page_select should hold the value zero. In this case, locations 0 × 20 ... 0 × 3f will contain the address generationuser registers.

Table 53 depicts the page select register.

TABLE 53

Page Select Register

| page-select | Registers Selected | See |
|---|---|---|
| 0 | Addrgen user configuration registers | Table 3–5 |
| 1 | Built in self test and IDCT test registers | Table 3–11 Table 3–12 |
| 2 | IM_plus test registers and SCD test registers | Table 3–13 Table 3–14 |
| 3 | Parser test registers | Table 3–15 |
| 4 | Field/Frame test registers | Table 3–16 |
| 5 | BOB test registers | Table 3–17 |
| 6 | more BOB test registers | Table 3–17 |
| 7 | Addrgen test registers | Table 3–18 |
| 8 | DRAMIF test registers | Table 3–19 |

Table 54 illustrates the interrupt service area.

TABLE 54

Interrupt Service Area

| Address (hex) | Bit No. | Register Name | See Page |
|---|---|---|---|
| 0 × 00 | 7 | chip_event | |
| | 6 | end_search_event | |
| | 5 | unrecognized_start_event | |
| | 4 | flag_picture_end_event | |
| | 3 | parser_event | |
| | 2 | | |
| | 1 | | |
| | 0 | | |
| 0 × 01 | 7 | chip_mask | |
| | 6 | end_search_mask | |

TABLE 54-continued

Interrupt Service Area

| Address (hex) | Bit No. | Register Name | See Page |
|---|---|---|---|
| | 5 | unrecognized_start_mask | |
| | 4 | flag_picture_end_mask | |
| | 3 | parser_mask | |
| | 2 | | |
| | 1 | | |
| | 0 | | |
| 0 × 02 | 7 | idct_too_few_event | |
| | 6 | idct_too_many_event | |
| | 5 | | |
| | 4 | | |
| | 3 | | |
| | 2 | | |
| | 1 | | |
| | 0 | watchdog_event | |
| 0 × 03 | 7 | idct_too_few_mask | |
| | 6 | idct_too_many_mask | |
| | 5 | | |
| | 4 | | |
| | 3 | | |
| | 2 | | |
| | 1 | | |
| | 0 | watchdog_mask | |

Table 55 shows the input circuit registers of the present invention.

TABLE 55

Input Circuit Registers

| Address (hex) | Bit No. | Register Name | See Page |
|---|---|---|---|
| 0 × 04 | 7 | coded_busy | |
| | 6 | enable_mpi_input | |
| | 5 | coded_extn | |
| | 4:0 | (not used) | |
| 0 × 05 | 7:0 | coded_data | |

Table 56 shows the start code detector register of the present invention.

TABLE 56

Start Code Detector Registers

| Address (hex) | Bit No. | Register Name | See Page |
|---|---|---|---|
| 0 × 06 | 7 | scdp_access | |
| | 6 | (not used) | |
| | 5 | discard_extension | |
| | 4 | discard_user | |
| | 3 | after_search_stop | |
| | 2 | flag_picture_end | |
| | 1 | after_picture_stop | |
| | 0 | after_picture_discard | |
| 0 × 07 | 7:3 | (not used) | |
| | 2 | discard_all | |
| | 1:0 | start_code_search | |

In accordance with the present invention, Table 57 shows the timestamp insertion registers.

TABLE 57

Timestamp Insertion Registers

| Address (hex) | Bit No. | Register Name | See Page |
|---|---|---|---|
| 0x08 | 7:0 | ts_high | |
| 0x09 | 7:0 | ts_low | |
| 0x0a | 7 | ts_valid | |
| | 6 | ts_waiting | |
| | 5:0 | (not used) | |

Likewise, Table 58 illustrates the video parser registers.

TABLE 58

Video Parser Registers

| Address (hex) | Bit No. | Register Name | See Page |
|---|---|---|---|
| 0x10 | 7:0 | parser_ctrl0 (actually a reg file location - bits TBD) | |
| 0x11 | 7:0 | parser_ctrl1 (actually a reg file location - bits TBD) | |
| 0x12 | 7:0 | parser_error_code (actually const. field of MSM) | |
| 0x13 | 7 | parser_access | |
| | 6:0 | reg_keyhole_addr | |
| 0x14 | 7:0 | reg_keyhole_data | |
| 0x15 | 7:0 | (not used) | |
| 0c16 | 7:0 | user_keyhole_addr | |
| 0x17 | 7:0 | user_keyhole_data | |

The output control registers are shown in Table 59.

TABLE 59

Output Control Registers

| Address (hex) | Bit No. | Register Name | See Page |
|---|---|---|---|
| 0x18 | 7:0 | border_cb | |
| 0x19 | 7:0 | border_y | |
| 0x1a | 7:0 | border_cr | |
| 0x1b | 7 | vblank | |
| | 6 | blank_screen | |
| | 5 | enbl_sav_eav | |
| | 4 | blanking601 | |
| | 3 | cblank_ah | |
| | 2 | vsync_ah | |
| | 1 | hcsync_ah | |
| | | hs_not_cs | |
| 0x1c | 7:2 | (not used) | |
| | 1:0 | vertical upsample control | |

Test Registers

The complete register map is shown in Table 60 through Table 69.

TABLE 60

Built-in Self Test Registers

| Address (hex) | Bit No. | Register Name | See Page |
|---|---|---|---|
| P1+00 | | test_mode | |
| P1+01...P1+03 | | (not used) | |
| P1+04 | | misr_mask | |
| P1+05 | | (not used) | |
| P1+06 | | misr[1] | |
| P1+07 | | misr[0] | |
| P1+08 | | psrg_bit_select | |
| P1+09 | | psrg_constant | |
| P1+0a...P1+0c | | (not used) | |
| P1+0d | | psrg[2] | |

TABLE 60-continued

Built-in Self Test Registers

| Address (hex) | Bit No. | Register Name | See Page |
|---|---|---|---|
| P1+0e | | psrg[1] | |
| P1+0f | | psrg[0] | |

TABLE 61

IDCT Test Registers

| Address (hex) | Bit No. | Register Name | See Page |
|---|---|---|---|
| P1+10 | | idct_clkgen | |
| P1+11 | | (not used) | |
| P1+12 | | snp_idct[1] | |
| P1+13 | | snp_idct[0] | |
| P1+14...P1+17 | | not used | |
| P1+18 | | snp_tram[7] | |
| P1+19 | | snp_tram[6] | |
| P1+1a | | snp_tram[5] | |
| P1+1b | | snp_tram[4] | |
| P1+1c | | snp_tram[3] | |
| P1+1d | | snp_tram[2] | |
| P1+1e | | snp_tram[1] | |
| P1+1f | | snp_tram[0] | |

TABLE 62

IM_plus Test Registers

| Address (hex) | Bit No. | Register Name | See Page |
|---|---|---|---|
| P2+00 | | imp_clkgen | |
| P2+01 | | (not used) | |
| P2+02 | | snp_iquant[1] | |
| P2+03 | | snp_iquant[0] | |
| P2+04 | | (not used) | |
| P2+05 | | snp_imode[1] | |
| P2+06 | | snp_imode[1] | |
| P2+07 | | snp_imode[0] | |
| P2+08 | | snp_iquant_ram[3] | |
| P2+09 | | snp_iquant_ram[2] | |
| P2+0a | | snp_iquant_ram[1] | |
| P2+0b | | snp_iquant_ram[0] | |
| P2+0c | | iquant_keyhole_data | |
| P2+0d | | iquant_keyhole_addr | |
| P2+0e...P2+0f | | (not used) | |
| P2+10 | | snp_izz_ram[3] | |
| P2+11 | | snp_izz_ram[2] | |
| P2+12 | | snp_izz_ram[1] | |
| P2+13 | | snp_izz_ram[0] | |
| P2+04 | | izz_keyhole_data | |
| P2+15 | | izz_keyhole_addr | |
| P2+16...P2+17 | | (not used) | |

TABLE 63

SCD Test Registers

| Address (hex) | Bit No. | Register Name | See Page |
|---|---|---|---|
| P2+18 | | scd_clkgen | |
| P2+19 | | (not used) | |
| P2+1a | | snp_incrct[1] | |
| P2+1b | | snp_incrct[0] | |
| P2+1c | | snp_cdbin[1] | |
| P2+1d | | snp_cdbin[0] | |
| P2+1e...P2+1f | | (not used) | |

TABLE 64

Parser Test Registers

| Address (hex) | Bit no. | Register name | See page |
|---|---|---|---|
| P3+00 | | parser_clkgen | |
| P3+01...P3+02 | | (not used) | |
| P3+03 | | snp_cdbout[4] | |
| P3+04 | | snp_cdbout[3] | |
| P3+05 | | snp_cdbout[2] | |
| P3+06 | | snp_cdbout[1] | |
| P3+07 | | snp_cdbout[0] | |
| P3+08 | | (not used) | |
| P3+09 | | snp-aluin[2] | |
| P3+0a | | snp-aluin[1] | |
| P3+0b | | snp-aluin[0] | |
| P3+0c...P3+0f | | (not used) | |
| P3+10 | 7 | msm_access | |
| | 6:0 | (not used) | |
| P3+11 | 7:3 | (not used) | |
| | 2 | mssr_intr_status | |
| | 1 | mssr_ss_monitor | |
| | 0 | mssr_ss_select | |
| P3+12 | 7:4 | (not used) | |
| | 3:0 | msm_pc | |
| P3+13 | 7:0 | | |
| P3+14 | 7:4 | (not used) | |
| | 3:0 | msm_call_return | |
| P3+15 | 7:0 | | |
| P3+16 | 7:4 | (not used) | |
| | 3:0 | msm_intr_return | |
| P3+17 | 7:0 | | |
| P3+18 | | snp_user_ram[7] | |
| P3+19 | | snp_user_ram[6] | |
| P3+1a | | snp_user_ram[5] | |
| P3+1b | | snp_user_ram[4] | |
| P3+1c | | snp_user_ram[3] | |
| P3+1d | | snp_user_ram[2] | |
| P3+1e | | snp_user_ram[1] | |
| P3+1f | | snp_user_ram[0] | |

TABLE 65

Field/Frame Test Registers

| Address (hex) | Bit No. | Register Name | See Page |
|---|---|---|---|
| P4+00 | | ff_clkgen | |
| P4+01 | | (not used) | |
| P4+02 | | snp_fld_frm[1] | |
| P4+03 | | snp_fld_frm[0] | |
| P4+04 | | snp_padder_data[1] | |
| P4+05 | | snp_padder_data[0] | |
| P4+06 | | snp_padder_pf[1] | |
| P4+07 | | snp_padder_pf[0] | |
| P4+08 | | snp_pf_master[3] (snpsel[3]) | |
| P4+09 | | snp_pf_master[2] (snpsel[2]) | |
| P4+0a | | snp_pf_master[1] (snpsel[1]) | |
| P4+0b | | snp_pf_master[0] (snpsel[0]) | |
| P4+0c | | snp_pf_slave[3] (snpsel[7]) | |
| P4+0d | | snp_pf_slave[2] (snpsel[6]) | |
| P4+0e | | snp_pf_slave[1] (snpsel[5]) | |
| P4+0f | | snp_pf_slave[0] (snpsel[4]) | |
| P4+10 | | (not used) | |
| P4+11 | | snp_pf_pipe[2] (snpsel[10]) | |
| P4+12 | | snp_pf_pipe[1] (snpsel[9]) | |
| P4+13 | | snp_pf_pipe[0] | |

TABLE 65-continued

Field/Frame Test Registers

| Address (hex) | Bit No. | Register Name | See Page |
|---|---|---|---|
| | | (snpsel[8]) | |
| P4+14 | | ff_keyhole_data | |
| P4+15 | | ff_keyhole_addr | |
| P4+16 | | snp_dec_data[1] | |
| P4+17 | | snp_dec_data[0] | |
| P4+18 | | snp_ff_ram[7] | |
| P4+19 | | snp_ff_ram[6] | |
| P4+1a | | snp_ff_ram[5] | |
| P4+1b | | snp_ff_ram[4] | |
| P4+1c | | snp_ff_ram[3] | |
| P4+1d | | snp_ff_ram[2] | |
| P4+1e | | snp_ff_ram[1] | |
| P4+1f | | snp_ff_ram[0] | |

TABLE 66

BOB Test Registers

| Address (hex) | Bit No. | Register Name | See Page |
|---|---|---|---|
| P5+00 | | bob_clkgen | |
| P5+01 | | (not used) | |
| P5+02 | | snp_vup_cb[1] | |
| P5+03 | | snp_vup_cb[0] | |
| P5+04 | | snp_vup_cr[1] | |
| P5+05 | | snp_vup_cr[0] | |
| P5+06 | | snp_hup_y[1] | |
| P5+07 | | snp_hup_y[0] | |
| P5+08 | | snp_hup_cb[1] | |
| P5+09 | | snp_hup_cb[0] | |
| P5+0a | | snp_hup_cr[1] | |
| P5+0b | | snp_hup_cr[0] | |
| P5+0c | | (not used) | |
| P5+0d | | snp_outmux[2] | |
| P5+0e | | snp_outmux[1] | |
| P5+0f | | snp_outmux[0] | |
| P5+10 | | (not used) | |
| P5+11 | | snp_vtg[2] | |
| P5+12 | | snp_vtg[1] | |
| P5+13 | | snp_vtg[0] | |
| P5+14 | | snp_outiface[1] | |
| P5+15 | | snp_outiface[0] | |
| P5+16...P5+1f | | (not used) | |
| P6+00...P6+07 | | snp_vupram_cb1[7:0] (bobupram) | |
| P6+08...P6+09 | | snp_vupram_cb0[7:0] | |
| PG+10...P6+17 | | snp_vupram_cr1[7:0] | |
| P6+18...P6+1f | | snp_vupram_cr0[7:0] | |

TABLE 67

Addrgen Test Registers

| Address (hex) | Bit No. | Register Name | See Page |
|---|---|---|---|
| P7+0 | | addrgen_clkgen | |
| P7+1 | | snoopers | |

TABLE 68

DRAMIF Test Registers

| Address (hex) | Bit no. | Register Name | See Page |
|---|---|---|---|
| P8+0 | | dram_clkgen | |

Summary of Test Register Locations

TABLE 69

Snooper Registers

| Address (hex) | Data Bits | Register Name | Location |
|---|---|---|---|
| P2+1a...P2+1b | 10 | snp_incrct[1:0] | The input of the chip (before the input circuit) |
| P2+1c...P2+1c | 10 | snp_cdbin[1:0] | Input of cdbin |
| P3+03...P3+07 | 33 | snp_cdbout[4:0] | Input of cdbout |
| P3+09...P3+0b | 19 | snp_aluin[2:0] | Input of the ALU in the MSM |
| P2+05...P2+07 | 19 | snp_imodel[2:0] | Input of the inverse modeler |
| P2+02...P2+03 | 13 | snp_iquant[1:0] | Input of the inverse quantizer |
| P1+12...P1+13 | 13 | snp_idct[1:0] | Input of the IDCT |
| P4+02...P4+03 | 10 | snp_fld_frm[1:0] | Input of field-frame |
| P4+04...P4+05 | 10 | snp_padder_data[1:0] | Transform data input of pfadder |
| P4+06...P4+07 | 8 | snp_padder_pf[1:0] | Pred. filter data input of pfadder |
| P4+08...P4+0b | 23 | snp_padder_master[3:0] | Master input of predflt |
| P4+0c...P4+0f | 23 | snp_padder_master[3:0] | Slave input of predflt |
| P4+11...P4+13 | | snp_pf_pipe[2:0] | Half way through predflt |
| P4+16...P4+17 | 8 | snp_dec_data[1:0] | Output of prediction adder |
| P5+02...P5+03 | 10 | snp_vup_cb[1:0] | Input of chroma upsample Cb |
| P5+04...P5+05 | | snp_vup_cr[1:0] | Input of chroma upsample Cr |
| P5+06...P5+07 | 12 | snp_hup_y[1:0] | Input of horizontal upsampler y |
| P5+08...P5+09 | 10 | snp_hup_cb[1:0] | Input of horizontal upsampler Cb |
| P5+0a...P5+0b | 10 | snp_hup_cr[1:0] | Input of horizontal upsampler Cr |
| P5+0d...P5+0f | 10 + strobes from vtg | snp_outmux[2:0] | Input of outmux |
| P5+11...P5+13 | | snp_vtg_[2:0] | All control inputs for VTG |
| P5+14...P5+15 | 13 | snp_outiface[1:0] | Just before 8 to 16 converter and retiming for the pins |

Power Supplies

The present invention essentially operates from a single 5V supply. However, in order to enable simple connection to synchronous DRAM, a 3.3V supply is also provided.

TABLE 70

Suggested Specification Ratings[b]

| Symbol | Parameter | Min. | Max. | Units |
|---|---|---|---|---|
| VDD | Nominal 5 V supply voltage relative to GND | −0.5 | 6.5 | V |
| VCC | Nominal 3.3 V Supply voltage relative to GND | −0.5 | 6.5 | V |
| VIN | Input voltage on any pin except SDRAM interface pins | GND − 0.5 | VDD + 0.5 | V |
| $V_{INsdram}$ | Input voltage on any SDRAM interface pin.[a] | GND − 0.5 | VCC + 0.5 | |

TABLE 70-continued

Suggested Specification Ratings[b]

| Symbol | Parameter | Min. | Max. | Units |
|---|---|---|---|---|
| $T_A$ | Operating temperature | −40 | +85 | ° C. |
| $T_S$ | Storage temperature | −55 | +150 | ° C. |

[a]D[15:0], DA[11:0], DCKE, DCLKOUT, DCLKIN, $\overline{\text{DWE}}$, $\overline{\text{DCAS}}$, $\overline{\text{DRAS}}$, $\overline{\text{DCS}}$[1:0] and TDCLK.
[b]Stresses greater than those listed here may cause permanent damage to the device. This is a stress rating only and functional operation of the device at these, or any other conditions above those indicated in the operational sections of this specification, is not implied. Exposure to absolute maximum rating conditions for extended periods may affect reliability.

TABLE 71

DC Operating Conditions

| Symbol | Parameter | Min. | Max. | Units |
|---|---|---|---|---|
| VDD | Nominal 5 V supply voltage relative to GND | 4.75 | 5.25 | V |
| VCC | Nominal 3.3 V Supply voltage relative to GND | 3.00 | 3.60 | V |
| GND | Ground | 0 | 0 | V |
| $T_A$ | Operating temperature | 0 | 70 | ° C[a] |
| $I_{DD}$ | RMS power supply current |  |  | mA |

Logic Levels

Three different signal interface types are implemented in accordance with the present invention. Standard (5 V) TTL levels are employed by the microprocessor interface. In addition, 5 V CMOS levels are used by the coded data interface and the video output interface. 3 V LVTTL levels are also employed by the SDRAM interface.

TTL (5 V) Levels

TABLE 72

TTL (5 V) DC Characteristics

| Symbol | Parameter | Min. | Max. | Units |
|---|---|---|---|---|
| V | Input logic '1' voltage | 2.0 | VDD + 0.5 | V[a] |
| $V_{IL}$ | Input logic '0' voltage | GND − 0.5 | 0.8 | V |
| $V_{OL}$ | Output logic '0' voltage |  | 0.4 | V |
| $V_{OLOC}$ | Open collector output logic '0' voltage |  | 0.4 | V[b] |
| $V_{OL}$ | Output logic '1' voltage | 2.4 |  | V |
| $I_O$ | Output current | ±100 |  | μA[c] |
| $I_{OOC}$ | Open collector output current | 4.0 | 8.0 | μA |
| $I_{OZ}$ | Output off state leakage current |  | ±20 | μA |
| $I_{IN}$ | Input leakage current |  | ±10 | μA |
| $C_{IN}$ | Input capacitance |  | 5 | pF |
| $C_{OUT}$ | Output/IO capacitance |  | 5 | pF |

[a]AC input parameters are measured at a 1.4 V measurement level
[b]$I_O \leq I_{OOC\,min}$.
[c]This is the steady state drive capability of the interface. Transient currents may be much greater.
[d]When asserted the open collector $\overline{\text{IRQ}}$ output pulls down with an impedance of 100 Ω or less.

CMOS (5 V) Levels

For CMOS inputs $V_{IHmin}$ is approximately 70% of $V_{DD}$ and $V_{ILmax}$ is approximately 30% of $V_{DD}$. The values shown in Table 73 are those for $V_{IH}$ and $V_{IL}$ at their respective extreme limits of operation.

TABLE 73

CMOS (5 V) DC Characteristics

| Symbol | Parameter | Min. | Max. | Units |
|---|---|---|---|---|
| $V_{IHcmos}$ | Input logic '1' voltage | 3.68 | VDD + 0.5 | V |
| $V_{ILcmos}$ | Input logic '0' voltage | GND − 0.5 | 1.43 | V |
| $V_{OHcmos}$ | Output logic '1' voltage | $V_{DD}$ − 0.1 |  | V[a] |
|  |  | $V_{DD}$ − 0.4 |  | V[b] |
| $V_{OLcmos}$ | Output logic '0' voltage |  | 0.1 | V[c] |
|  |  |  | 0.4 | V[d] |
| $I_{INcmos}$ | Input leakage current |  | ±10 | μA |
| $C_{INcmos}$ | Input capacitance |  | 5 | pF |
| $C_{OUTNcmos}$ | Output/IO capacitance |  | 5 | pF |

[a]$I_{oh} \leq 1$ mA
[b]$I_{OH} \leq 4$ mA
[c]$I_{OL} \leq 1$ mA
[d]$I_{OL} \leq 4$ mA

LVTTL (3.3 V) Levels

TABLE 74

LVTTL (3.3 V) DC Characteristics

| Symbol | Parameter | Min. | Max. | Units |
|---|---|---|---|---|
| $V_{IHsdram}$ | Input logic '1' voltage |  | VCC + 0.5 | V[a] |
| $V_{ILsdram}$ | Input logic '0' voltage | GND − 0.5 | 0.8 | V |
| $V_{OLsdram}$ | Output logic '0' voltage |  |  | V |
| $V_{OHsdram}$ | Output logic '1' voltage |  |  | V |
| $I_{Osdram}$ | Output current | ±100 |  | μA[b] |
| $I_{OZsdram}$ | Output off state leakage current |  | ±20 | μA |
| $I_{INsdram}$ | Input leakage current |  | ±10 | μA |
| $C_{INsdram}$ | Input capacitance |  | 5 | pF |
| $C_{OUTsdram}$ | Output/IO capacitance |  | 5 | pF |

[a]AC input parameters are measured at a V measurement level
[b]This is the steady state drive capability of the interface Transient currents ma be much greater

Clock Signals

The present invention uses one clock (SYSCLOCK) for almost all on-chip functions. Since this clock is used by the video output circuitry, it is assumed that a 27 MHz clock will be used so that the VTG (Video Timing Generator) will produce pictures at the correct rate.

A second clock (CDCLOCK) may be used to clock coded data into the present invention. This clock may be synchronous to SYSCLOCK and this allows data to be transferred into the system from circuitry that is not operating on the 27 MHz clock (perhaps a clock derived from a disk or network interface circuit).

Figure 101:
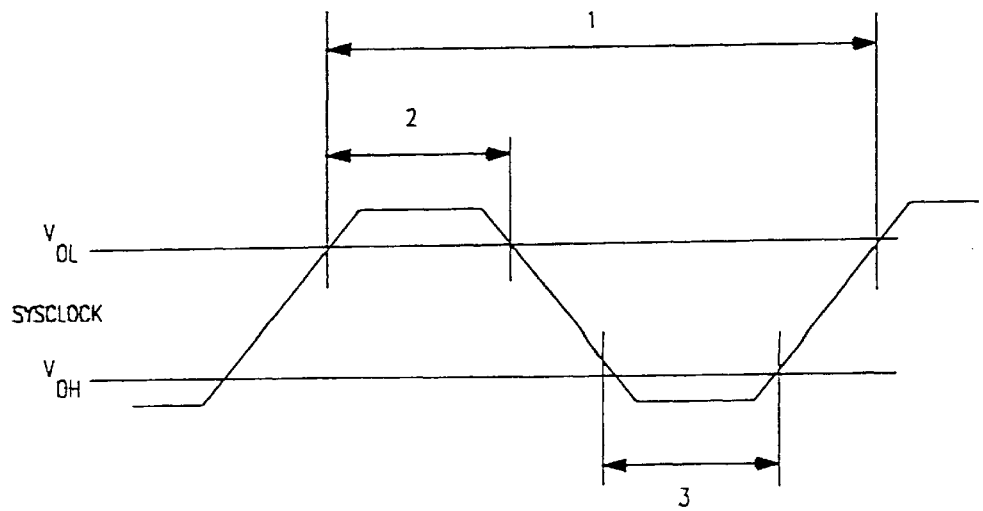
FIG. 101 illustrates the sysclock requirements of the present invention.

Internally, the invention derives high speed clocks for driving the SDRAM interface using a phase locked loop (PLL). This clock is output ot the SDRAM as DCLKOUT. An on-chip PLL is also used to derive an even mark-space ratio. The requirements for the SYSCLOCK are shown in FIG. 101.

TABLE 75

Input Clock Requirements

| | | 27 MHz | | | |
|---|---|---|---|---|---|
| Num. | Characteristic | Min. | Max. | Unit | Note |
| 1 | Clock period | 37 | | ns | a |
| 2 | Clock high period | 10 | | ns | |
| 3 | Clock low period | 10 | | ns | |

<sup>a</sup>Note that the tolerance and stability of the clock must be adequate to comply with the line frequency of the appropriate video standard.

Reset Signals

The present invention uses three reset signals:

1) RESET
2) VTGRESET
3) TIMERESET

RESET is the main chip reset signal. All circuitry is reset and adopts the reset state indicated in the various tables as described herein. RESET must be asserted (LOW) for at least four clock cycles after the power and clocks are stable to ensure a correct reset.

VTGRESET is used to reset the video timing generator of the present invention without affecting other aspects of the present invention.

TIMERESET is used by the timestamp handling circuitry in accordance with the present invention.

Introduction

The coded data interface, in accordance with the present invention, provides a dedicated set of pins that may be used to supply the coded video data to system. Alternatively, coded data may be written via the microprocessor interface. This section discusses both of these methods.

If the dedicated pins are used, coded data may be supplied either as a simple stream of bytes or as "Tokens." The Tokens allow other types of information to be supplied in addition to the coded data. For example, time stamp information may be transferred using this mechanism.

If the microprocessor interface is used for coded data, then Tokens are always used. Furthermore, this is quite simple. Once a "Token Head" has been written to declare that subsequent data is coded data (requiring just two registers to be written) coded data may, thereafter, be simply written into a register.

Coded Data Interface Signals

Table 76 defines the coded data interface signals used in the present invention.

TABLE 76

Coded Data Interface Signals

| Signal Name | Type | Description |
|---|---|---|
| CD[7:0] | I | Coded data is supplied to the present invention one byte at a time. Data is sampled at the rising edge of CDCLOCK. Data is assumed to be byte-aligned. |
| CDEXTN | I | When the coded data interface is used to transfer Tokens, this signal is the extension bit. This signal is sampled at the same time as CD[7:0]. |
| CDVALID | I | CDVALID is sampled at the same time as CD[7:0]. When it is HIGH, the data is valid and is used as coded data. When it is LOW, the data is not valid and is ignored by the system. |
| CDACCEPT | O | CDACCEPT indicates the readiness of the system to accept data. When it is HIGH, at the rising edge of CDCLOCK data will be latched as expected. When it is LOW, the system cannot accept the data (presumably because its internal buffers are full) and, therefore, the data should be presented again. |
| BMODE | I | When this signal is HIGH, data is interpreted as a simple stream of coded data bytes (and CDEXTN is ignored). When it is low data is interpreted as Tokens. This signal is sampled at the same time as CD[7:0]. |
| CDCLOCK | I | This clock is used to control the transfer of data into the system. CD[7:0] CDEXTN BMODE and CDVALID are sampled at the rising edge of CDCLOCK and external circuitry should sample CDACCEPT at the same time. Note that in the default (reset) condition, CDCLOCK and SYSCLOCK must be connected to the same signal. |

Figure 102:
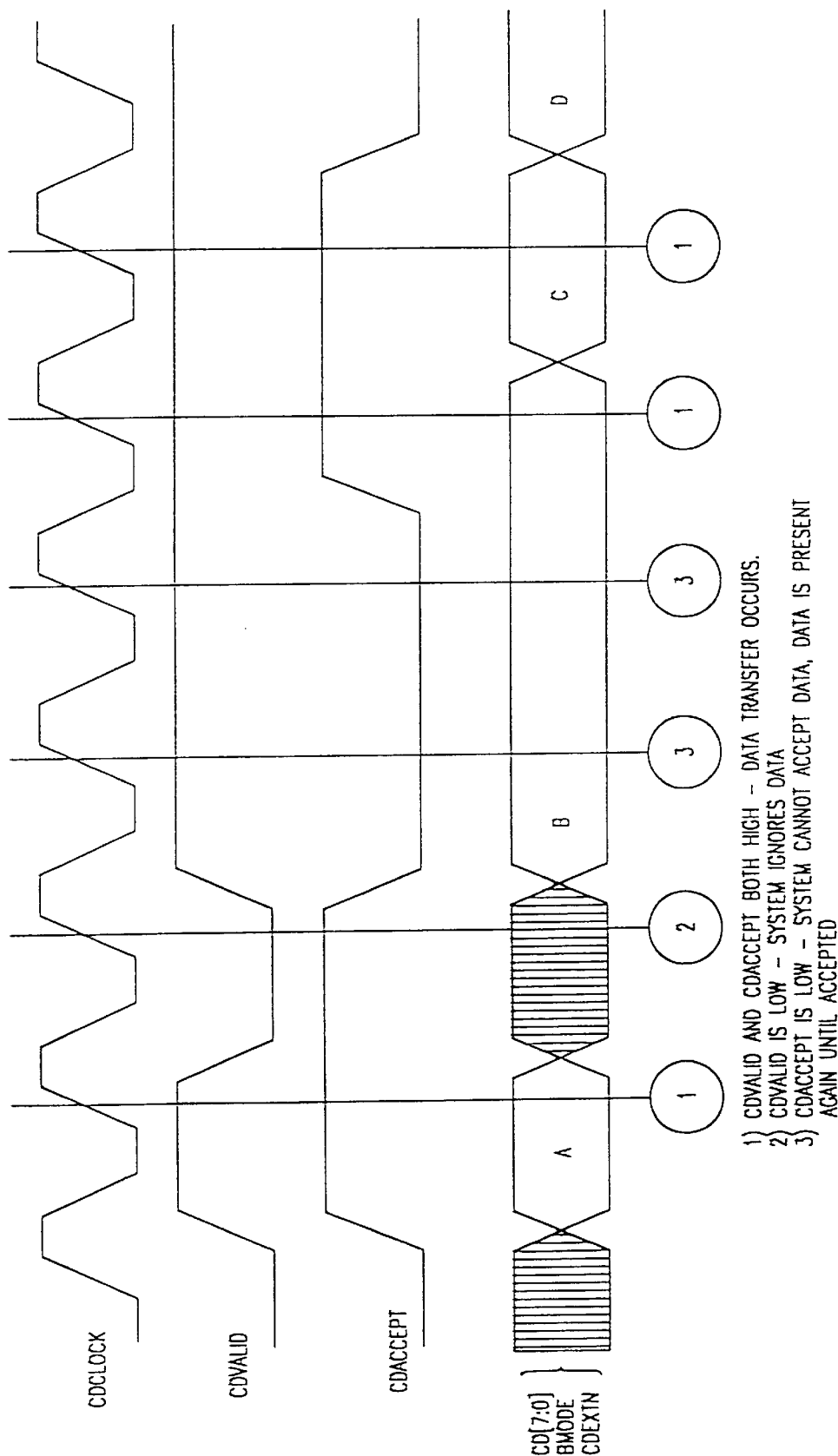
FIG. 102 depicts the two-wire protocol on a coded data interface, in accordance with the present invention.

CDVALID and CDACCEPT are used to control the transfer of data in accordance with the present invention. This type of protocol is referred to as a "two-wire" interface. Both signals must be high at the rising edge of CDCLOCK in order for a data transfer to occur. FIG. 102 shows the relationship between the data (CD[7:0], CDEXTN and BMODE) and CDVALID and CDACCEPT.

Note: If data is to be supplied via the coded data interface pins, the micropocessor interface register "enable_mpi_input" must be zero (this is its reset state).

Byte Mode

In the present invention, if BMODE is sampled HIGH at the rising edge of CDCLOCK (and CDVALID and CDACCEPT are both high), then the data is treated as simple coded data. In fact, the data is immediately built into a DATA. In this case, CDEXTN is ignored.

Token Mode

If BMODE is sampled LOW, at the rising edge of CDCLOCK (and CDVALID and CDACCEPT a re both high), then the data is treated as Tokens.

Tokens are used extensively in accordance with the present invention, to control the flow of data and control signals throughout the system. Theoretically, it is possible to supply any Token at the coded data input.

All Tokens, in accordance with the present invention, consist of a series of bytes (CD[7:0]), each of which has associated with it an extension bit (CDEXTN). The first byte of the Token indicates the type of information carried by the Token. The last byte of the Token is indicated by the extension bit being LOW.

Figure 103:
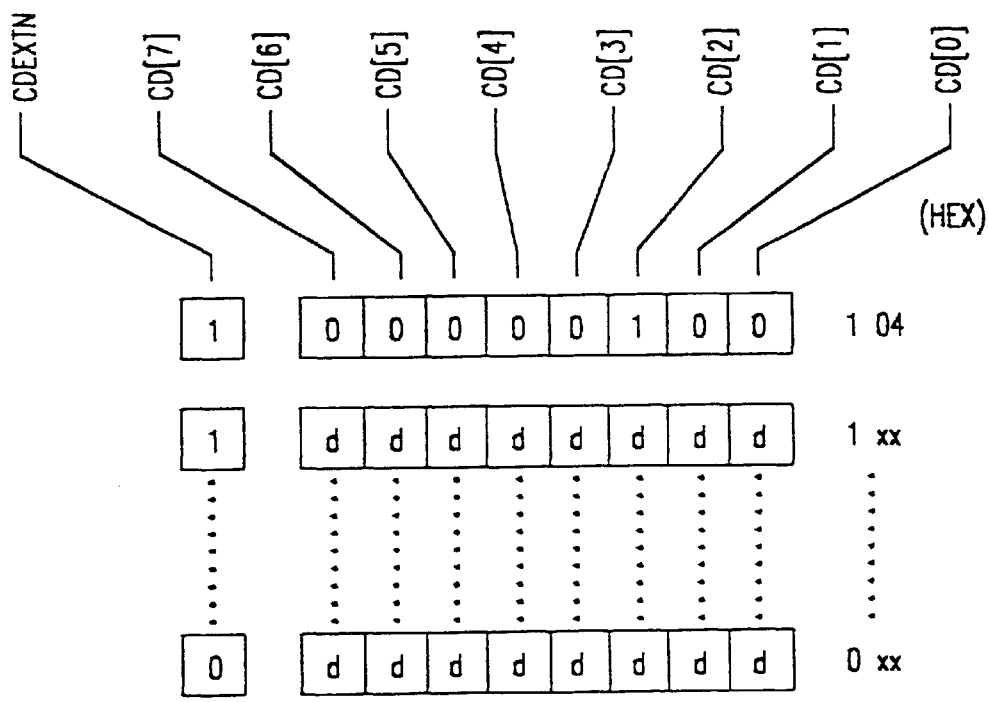
FIG. 103 shows a DATA token of the present invention.

For example, coded data is supplied using the DATA Token. This is illustrated in FIG. 103. As shown, the first byte is 0x04 (indicating that this is a DATA Token). This information is followed by bytes of coded data that extend until CDEXTN is sampled LOW. The next data that is sampled will be interpreted as the first byte of a new Token (assuming that BMODE is still LOW).

Figure 104:
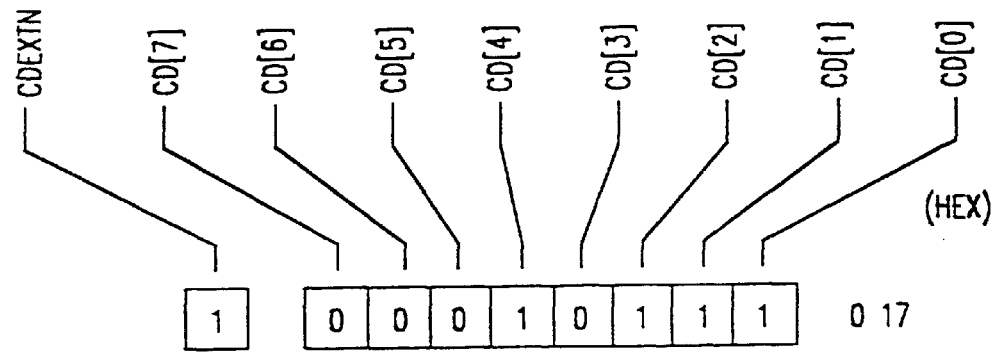
FIG. 104 shows a FLUSH token of the present invention.

Another Token that is particularly useful is the FLUSH Token. This Token acts like a "reset" and it may be used after the end of one video stream in order to ready the system for the next video stream. The FLUSH Token is illustrated in FIG. 104.

Supply Data via the Microprocessor Interface

In the present invention, tokens can be supplied to the system via the microprocessor interface (MPI) by accessing the coded data input registers. Table 77 defines the coded data input registers.

TABLE 77

Coded Data Input Registers

| Addr. (Hex) | Bit No. | Dir/Reset | Register Name | Description |
|---|---|---|---|---|
| 04 | 7 | RO/1 | coded_busy | The state of this registers indicates if the system is able to accept Tokens written into coded_data[7:0]. The value 1 indicates that the interface is busy and unable to accept data. Behavior is undefined if the user tries to write to coded_data when coded_busy = 1. |
| | 6 | RW/0 | enable_mpi_input | Controls whether coded data input to the system is via the coded data port (0) or via the MPI (1). |
| | 5 | RW/x | coded_extn | The extension bit of the token data written into coded_data. |
| | 4:0 | (not used) | | |
| 05 | 7:0 | RW/x | coded_data | Token data is written into this location. |

Writing Tokens vis the MPI

The coded data registers are grouped into two bytes within the memory map to allow for efficient data transfer. The 8 data bits, coded_data[7:0], are in one location and the control registers, coded_busy, enable_mpi-input and coded_extn are in a second location. (See Table 56.)

When configured for Token input via the MPI, the current Token is extended with the current value of coded_extn each time a value is written into coded data[7:0]. Software is responsible for setting coded_extn to 0 before the last word of any Token is written to coded_data[7:0].

For example, a DATA Token is started by writing 1 into coded_extn and then 0x04 into coded_data[7:0]. The start of this new DATA Token then passes into the system for processing.

Each time a new 8 bit value is written to coded_data[7:0], the current Token is extended. coded_extn need only be accessed again when terminating the current Token (for example, to introduce another Token). The last word of the current Token is indicated by writing 0 to coded_extn followed by writing the last word of the current Token into coded_data[7:0].

Moreover, each time before writing to coded_data[7:0]. coded_busy should be inspected to see if the interface is ready to accept more data.

Switching between Input Modes

Provided suitable precautions are observed, it is practical to dynamically change the data input mode. In general, the transfer of a Token via any one route should be completed before switching modes. These switching modes are shown in Table 78.

TABLE 78

Switching Data Input Modes

| Previous Mode | Next Mode | Behavior |
|---|---|---|
| Byte | Token MPI input | The on-chip circuitry will use the last byte supplied in byte mode as the last byte of the DATA Token that it was constructing (i.e., the extension bit will be set to 0). Before accepting the next Token. |
| Token | Byte | The off-circuitry supplying the Token in Token mode is rresponsible for completing the Token (i.e., with the extn bit of the last byte of information set to 0). Before selecting byte mode. |

TABLE 78-continued

Switching Data Input Modes

| Previous Mode | Next Mode | Behavior |
|---|---|---|
| | MPI input | Access to input via the MPI will not be granted (i.e., coded_busy will remain set to 1) until the off chip circuitry supplying the Token in Token mode has completed the Token (i.e.. with the extension bit of the last byte of information set to 0). |
| MPI input | Byte MPI input | The control software must have completed the Token (i.e.. with the extension bit of the last byte of information set to 0) before enable_mpi_input is set to 0. |

The first byte supplied in byte mode causes a DATA Token header to be generated on-chip. Any further bytes transferred in byte mode are appended to this DATA Token until the input mode changes. The MPI register bit coded_busy and the signal coded_accept indicated on which interface the system is willing to accept data. Correct observation of these signals should ensure that no data is lost.

Rate of Accepting Coded Data

The input circuit of the present invention passes Tokens to the start coded detector. This analyses data in the DATA Tokens and its normal rate of processing is one byte per clock (of CDCLOCK). However, extra processing cycles are occasionally required. For example, when a start code is encountered in the coded data. When this occurs, CDACCEPT will go low to indicate that data cannot be accepted.

Figure 105:
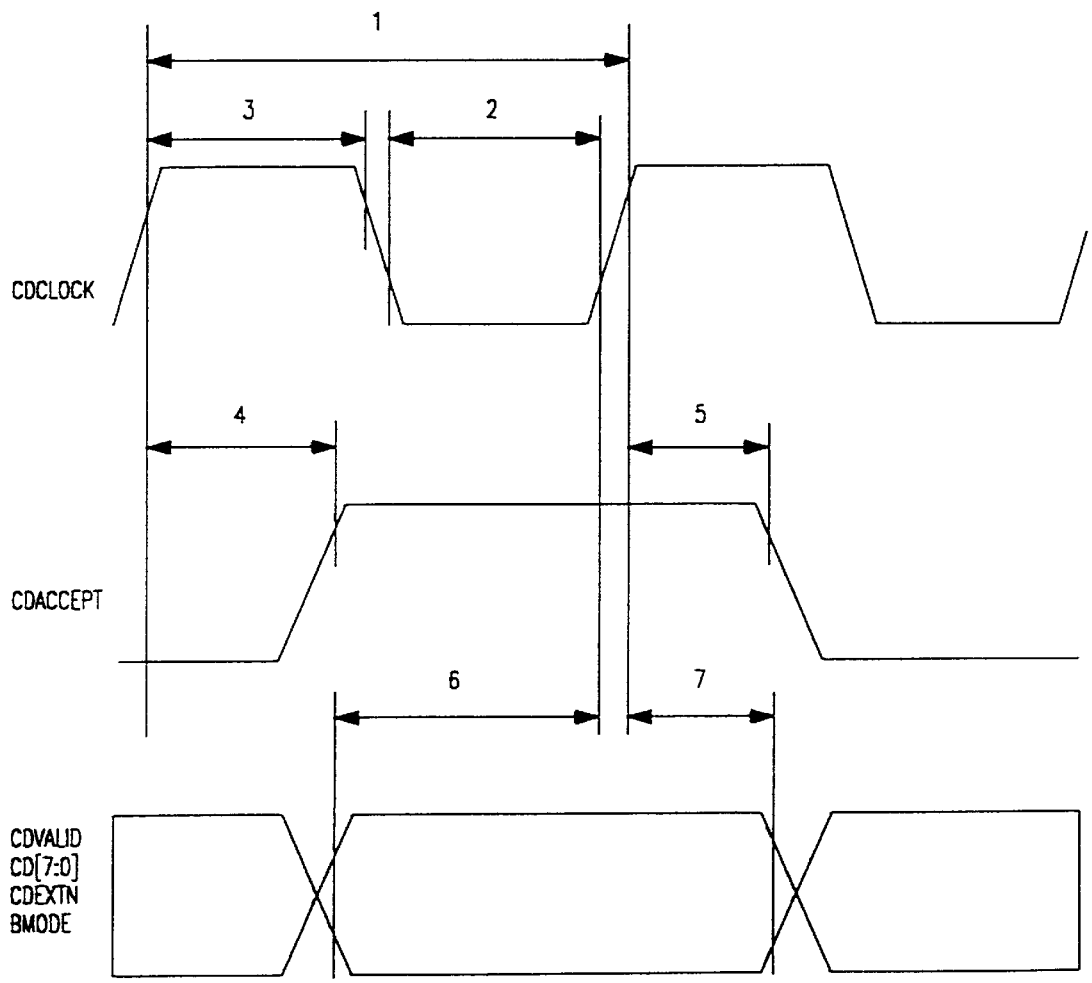
FIG. 105 illustrates the timing of the coded data interface.

It follows that CDCLOCK must have a higher clock frequency than the rate at which bytes of data are to be supplied to the system. In many applications, it will be appropriate to use the same clock (typically 27 MHz) for both SYSCLOCK and CDCLOCK. One example is shown in FIG. 105.

Coded Data Interface Timing

Similarly, Table 79 shows the coded data interface timing for the present invention.

TABLE 79

Coded Data Interface Timing

27 MHz

| Num. | Characteristic | Min. | Max. | Unit | Note |
|---|---|---|---|---|---|
| 1 | CDCLOCK cycle time | 37 | | ns | |
| 2 | CDCLOCK low time | 17 | | ns | a |
| 3 | CDCLOCK high time | 17 | | ns | |
| 4 | CDACCEPT drive time | | 23 | ns | b |
| 5 | CDACCEPT hold time | 2 | | ns | |
| 6 | Input signal set-up time | 5 | | ns | |
| 7 | Input signal hold time | 0 | | ns | |

<sup>a</sup>These timings need not be observed in some circumstances.
<sup>b</sup>Maximum signal loading is 20 pF.

The coded data interface uses CMOS levels.

CDCLOCK

The transfer of data across the coded data interface is controlled by CDCLOCK which may be synchronous to the main video decoder clock (SYSCLOCK). This facility may be useful in allowing the system decoder to operate on a different clock to the video clock.

However, CDCLOCK is also used internally in the present invention to clock circuitry such as the start code detector. Since CDCLOCK does not have the benefit of a Phase Locked Loop (PLL) to ensure even mark-space ratio, external circuitry must be used to ensure this or the timing parameters 2 and 3 shown in FIG. 105.

In situations where CDCLOCK and SYSCLOCK do not need to be synchronous, the facility exists to drive the internal circuitry such as the start code detector from the PLL rather than CDCLOCK. This frees the external circuitry from the need to guarantee the even marked-spaced ratio.

Figure 106:
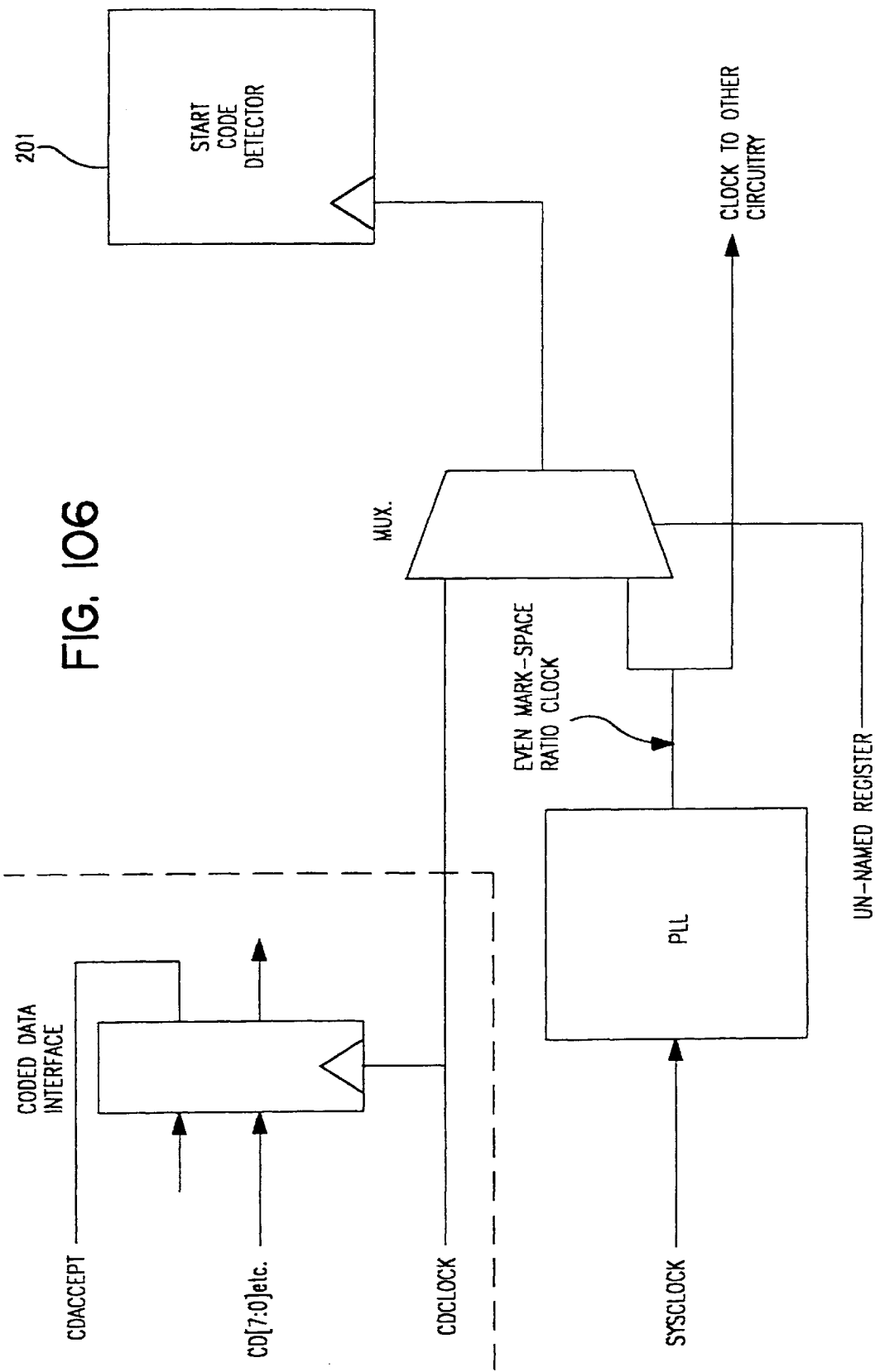
FIG. 106 depicts using non-even mark-space ratio CDCLOCK, in accordance with the present invention.

FIG. 106 shows the internal arrangement which allows the even mark-space ratio clock generated by the PLL to be routed to the start code detector in place of CDCLOCK.

If un_named_register is 0 (reset condition), the start code detector is clocked from the PLL. In this case, both CDCLOCK and SYSCLOCK must be connected to the same signal. The AC timing requirements for SYSCLOCK.

If un_named_register is 1, the start code detector is clocked using CDCLOCK. In this case, CDCLOCK may be synchronous to SYSCLOCK. CDCLOCK must obey the timings as specified in FIG. 105.

Introduction

The video output interface of the invention implements a digital output interface that complies to CCIR Recommendations 601 and 656. All of the synchronization and blanking information is included, in the form of special code words (SAV and EAV), in the same byte-wide stream of data as the video information.

In addition, separate sync and blanking pins are provided so that the system may be connected directly to a wide range of devices (such as video DACs or NTSC encoders). The timing of these signals is suitable for the generation of a video signal that complies with CCIR Recommendation 624.

The video data may be time-multiplexed on a single byte-wide bus. Alternatively, a sixteen bit output mode is provided, in which case, the luminance data is output on one byte wide bus while the two color difference signals are time multiplexed on a second byte wide bus.

Video Output Signals

Table 80 provides the signals for the video output interface, in accordance with the present invention.

TABLE 80

Video Output Interface Signals

| Name | Type | Description |
|---|---|---|
| Y[7:0] | O | Luminance output data |
| C[7:0] | O | Cr/Cb output data |
| HCSYNC | O | Horizontal or composite sync. The microprocessor register hs_not_cs controls which sync is present on this pin. The register hcsync_ah controls the polarity of this signal. |
| VSYNC | O | Vertical sync. The register vsync_ah controls the polarity of this signal. |
| CBLANK | O | Composite blanking. The register cblank_ah controls the polarity of this signal. |
| YE | O | When sampled high at the rising edge of SYSCLOCK, the Y (and in 16 bit mode the Cr or Cb) data is valid. |
| CB/CR | O | in 16 bit mode this signal indicates which color component (Cr or Cb) is present on the C[7:0] pins when YE is sampled high. In 8 bit mode the signal indicates which color component (Cr or Cb) is present on the Y[7:0] pins when YE is sampled low. |
| V16/8 | I | Used to select the 16 or 8 bit output modes. 16 bit mode is selected when V16/8 is HIGH. 8 bit mode is selected when it is LOW. |
| NTSC/PAL | I | Selects which of two standard rasters are to be produced. When NTSC/PAL is HIGH, a 525-line master is produced. When it is low, a 625 line raster is produced. Note that this pin also affects other aspects of the operation of the present invention. |
| VTGRESET | I | This signal may be asserted to reset the on-chip Video Timing Generator. This may be used to lock the video timing to some external constraint. |

Figure 107:
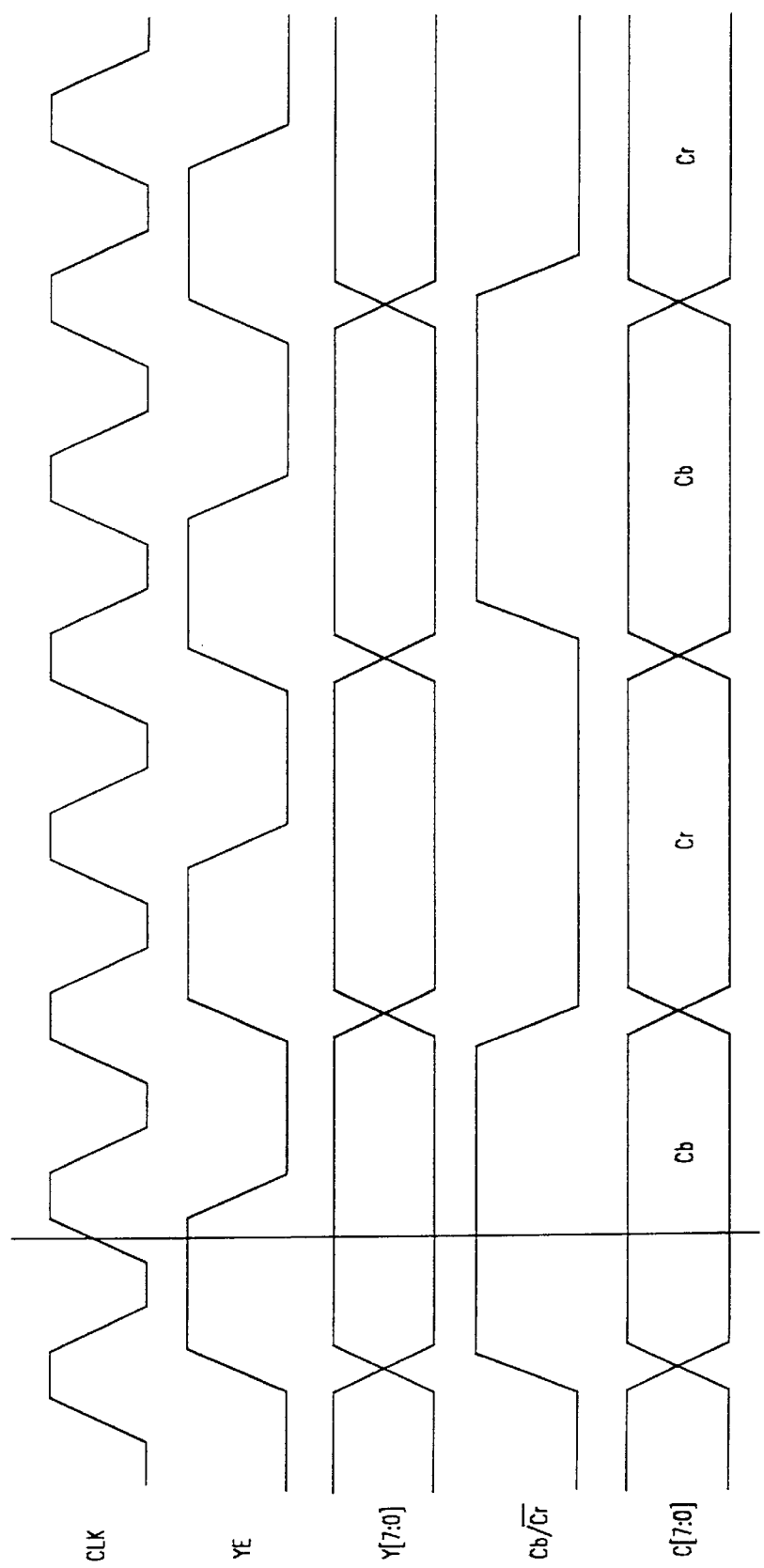
FIG. 107 shows output timing in 16 bit mode in the present invention.
Figure 108:
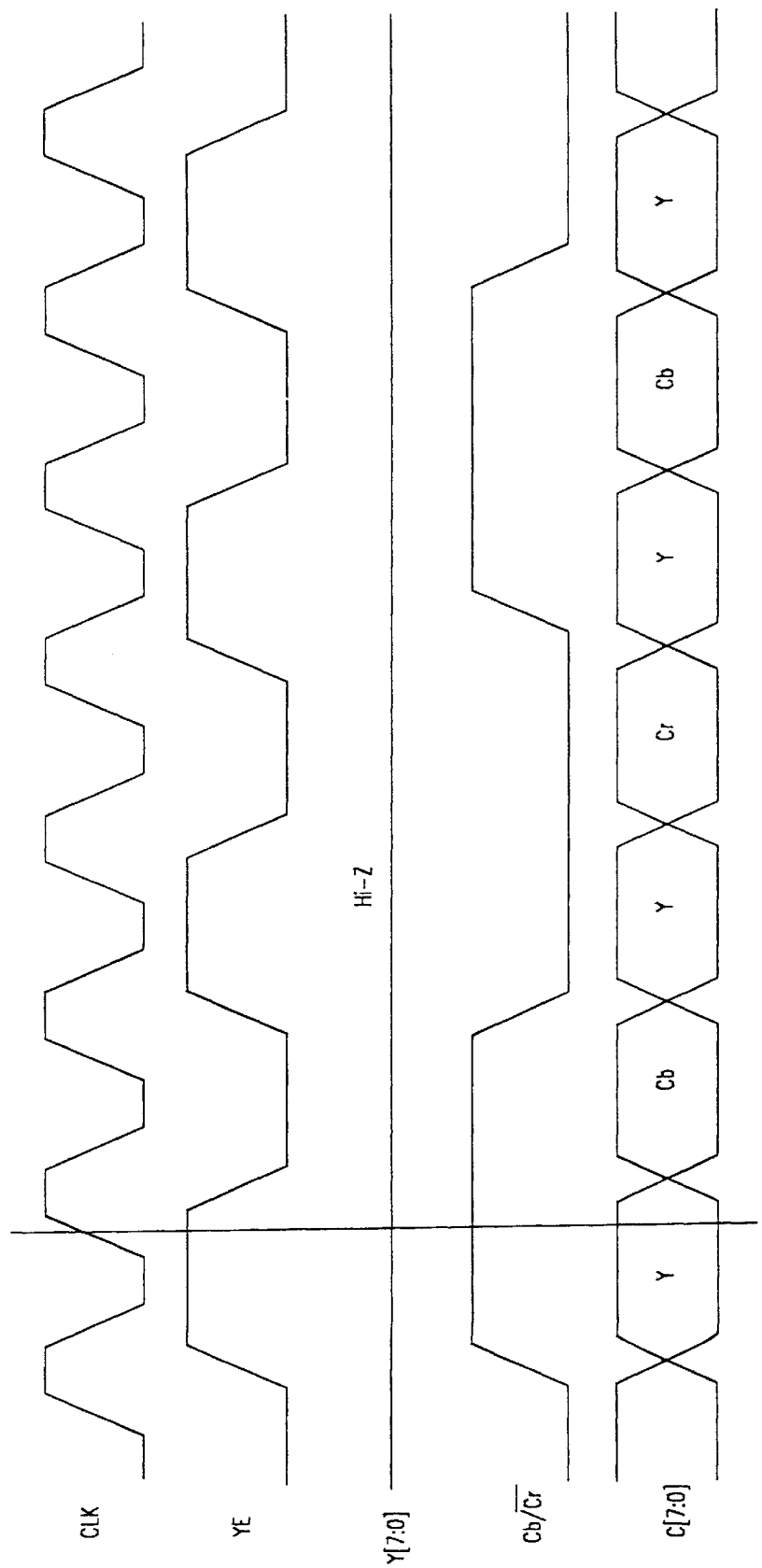
FIG. 108 illustrates output timing in 8 bit mode in the present invention.

FIG. 107 shows the output timing in 16 bit mode. FIG. 108 shows the output timing in 8 bit mode.

Video Output Control Registers

Video output control registers, in accordance with the present invention as shown in Table 81.

TABLE 81

Video Output Control Registers

| Addr (Hex) | Bit no. | dir/reset | Register name | Description |
|---|---|---|---|---|
| 18 | 7:0 | RW/ 0xC0 | border_cb | Cb component of border color |
| 19 | 7:0 | RW/ 0x80 | border_y | Y component of border color |

TABLE 81-continued

Video Output Control Registers

| Addr (Hex) | Bit no. | dir/reset | Register name | Description |
|---|---|---|---|---|
| 1A | 7:0 | RW/0x40 | border_cr | Cr component of border color |
| 1B | 7 | RO/x | vblank | This is a read-only bit (data written to this bit is ignored). It indicates vertical blanking. |
|  | 6 | RW/0 | blank_screen | When set to 1 this bit causes border color to be painted over the entire screen, thereby blanking the screen. Note that decoding continues as normal, but the decoded pictures are rendered invisible. |
|  | 5 | RW/0 | enbl_sav_eav | Controls the generation of SAV and EAV control words in the output stream. 0 suppresses SAV and EAV, in which case, blanking values are output at the times when SAV and EAV would otherwise be generated. 1 enables SAV and EAV. Note that blanking601 should also be set to 1 to avoid the value zero appearing at the output, except during SAV and EAV. For CCIR 601 data, this pin must be set to 1. |
|  | 4 | RW/0 | blanking601 | Controls the value of luminance[a] data that is output during blanking. 0 selects the value zero. 1 selects the value 0x10 (sixteen). For CCIR 601 data, this pin must be set to 1. |
| IB | 3 | RW/0 | cblank_ah | Controls the polarity of the CBLANK pin. 0 selects active low 1 selects active high |
|  | 2 | RW/0 | vsync_ah | Controls the polarity of the VSYNC pin. 0 selects active low 1 selects active high |
|  | 1 | RW/0 | hcsync_ah | Controls the polarity of the HCSYNC pin. 0 selects active low 1 selects active high |
|  | 0 | RW/0 | hs_not_cs | Controls whether horizontal sync or composite sync is present on the HCSYNC pin. 0 selects composite sync 1 selects horizontal sync |
| 1C |  |  |  | (VUP sample mode) |

[a]Irrespective of the setting of this bit chrominance data (both Cb and Cr) will be 0x80 (128 decimal) during blanking.

Borders, Scaling and Cropping

The present invention attempts to always produce a picture for display that is 720 pels by either 480 lines (525 line raster) or 576 lines (625 line raster). The invention automatically scales the decoded picture in order to attempt to fill this area.

Since only a limited number of scale factors are supported, it will not always be possible to fill this area precisely. If the resulting picture is too small, then a border will be painted around the decoded picture. This border will be such that the decoded picture is in the center of the screen.

Conversely, if the scaling produces a picture that is too big, then the picture is cropped to enable it to be displayed properly. The displayed region is the center of the decoded picture. This cropping is limited so that not more than approximately 10% of the decoded picture is cropped. If more than this would be lost, then a smaller scaling factor is used.

The order color may be selected by writing to the registers border_cb, border_y and border_cr. After the device is reset and before any pictures have been decoded, the entire screen will be filled with the border color. In addition, it is possible to paint border color over the entire screen by writing to blank_screen. This may be used to hide the video during, for instance, a channel change.

Video Output Characteristics

Characteristics

Figure 109:
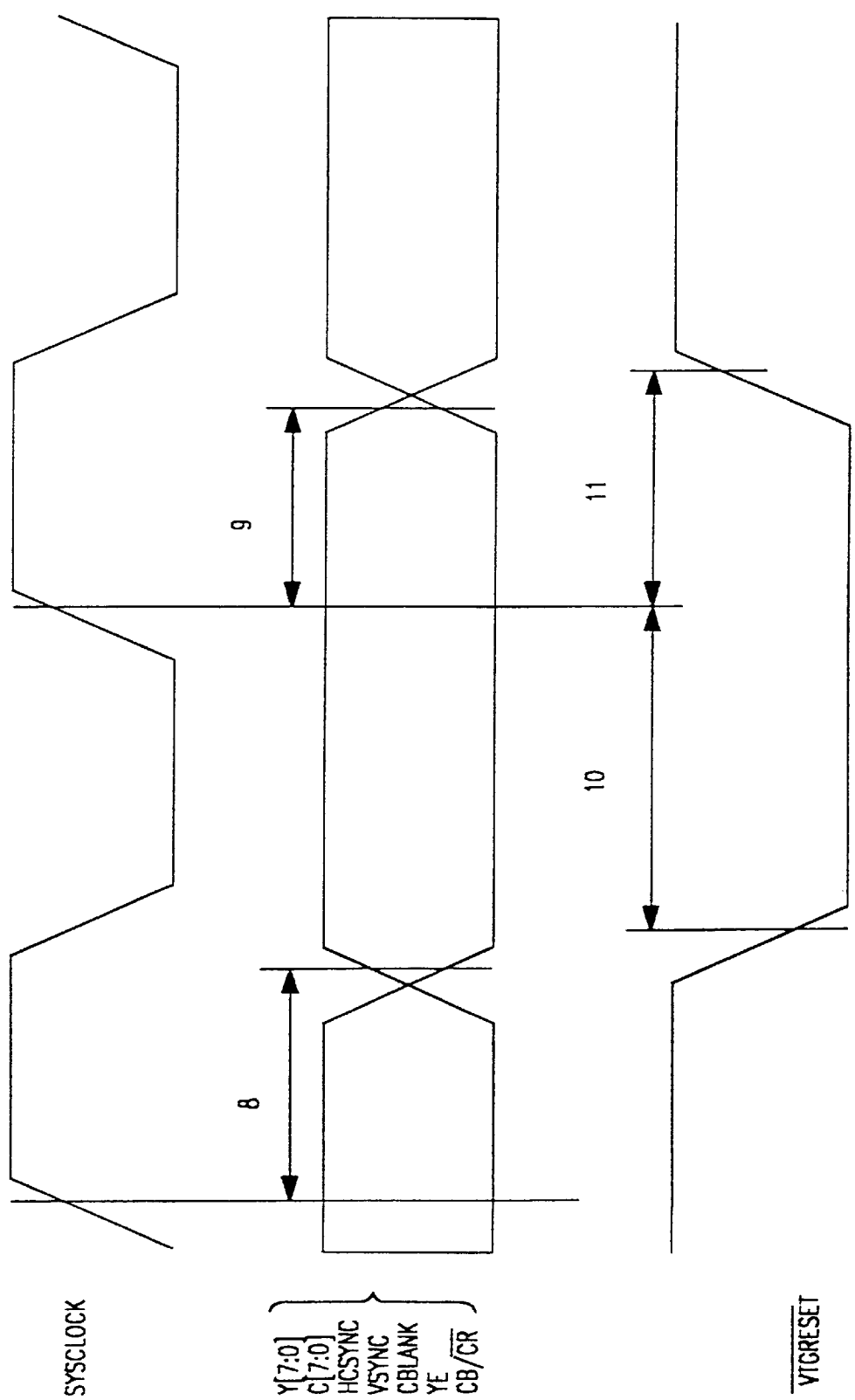
FIG. 109 shows the timing of the video output interface in the present invention.

FIG. 109 illustrates, in accordance with the present invention, the timing of the video output interface. Similarly, Table 82 illustrates the video output interface timing.

TABLE 82

Video output interface timing

| | | 27 MHz | | | |
|---|---|---|---|---|---|
| Num. | Characteristic | Min. | Max. | Unit | Note |
| 8 | Output drive time |  | 23 | ns | a |
| 9 | Output hold time | 2 |  | ns |  |
| 10 | $\overline{\text{VTGRESET}}$ set-up time | 5 |  | ns | b |
| 11 | $\overline{\text{VTGRESET}}$ hold time | 0 |  | ns |  |

[a]Maximum signal loading is 50 pF
[b]Failure to meet this timing parameter will simply lead to uncertainty in the precise clock cycle on which the reset will occur. $\overline{\text{VTGRESET}}$ is provided with an on-chip synchronizer that will guard against metastability problems in the event that this timing parameter is not observed.

Figure 110:
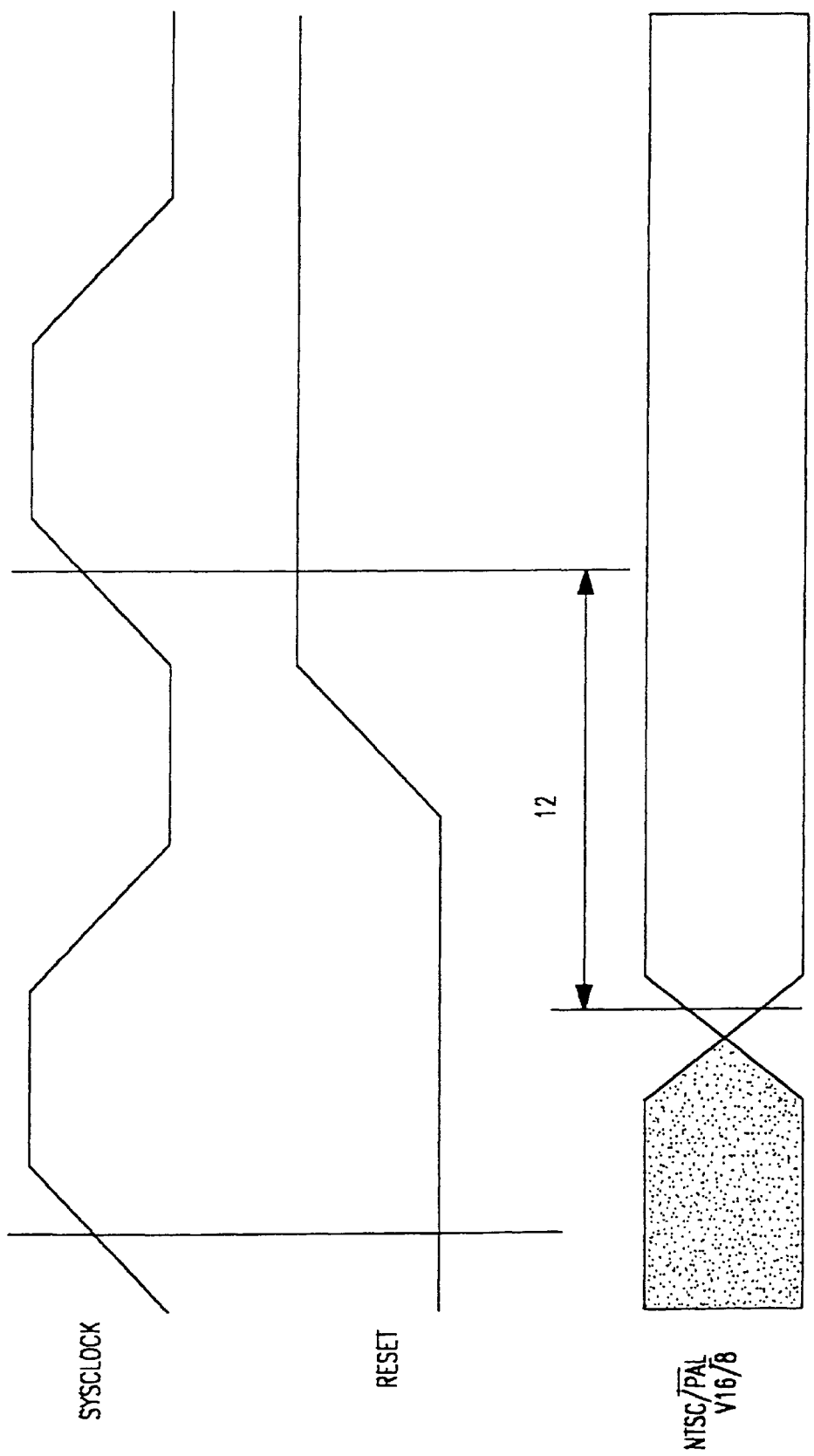
FIG. 110 depicts video output mode signals, in accordance with the present invention.

Table 83 defines video output mode signals. FIG. 110 shows the video output mode signals.

TABLE 83

Video Output Mode Signals

| | | 27 MHz | | | |
|---|---|---|---|---|---|
| Num. | Characteristic | Min. | Max. | Unit | Note |
| 12 | Setup before first clock after reset | 5 | | ns | a |

[a]Operation is undefined if NTSC/PAL or V16/8 change state after reset.

Video Signal Timing

The video timing of the present invention is such that the resulting video output complies with the following CCIR recommendations.

CCIR Recommendation 601
CCIR Recommendation 656
CCIR Recommendation 624

Horizontal Timing

Figure 111:
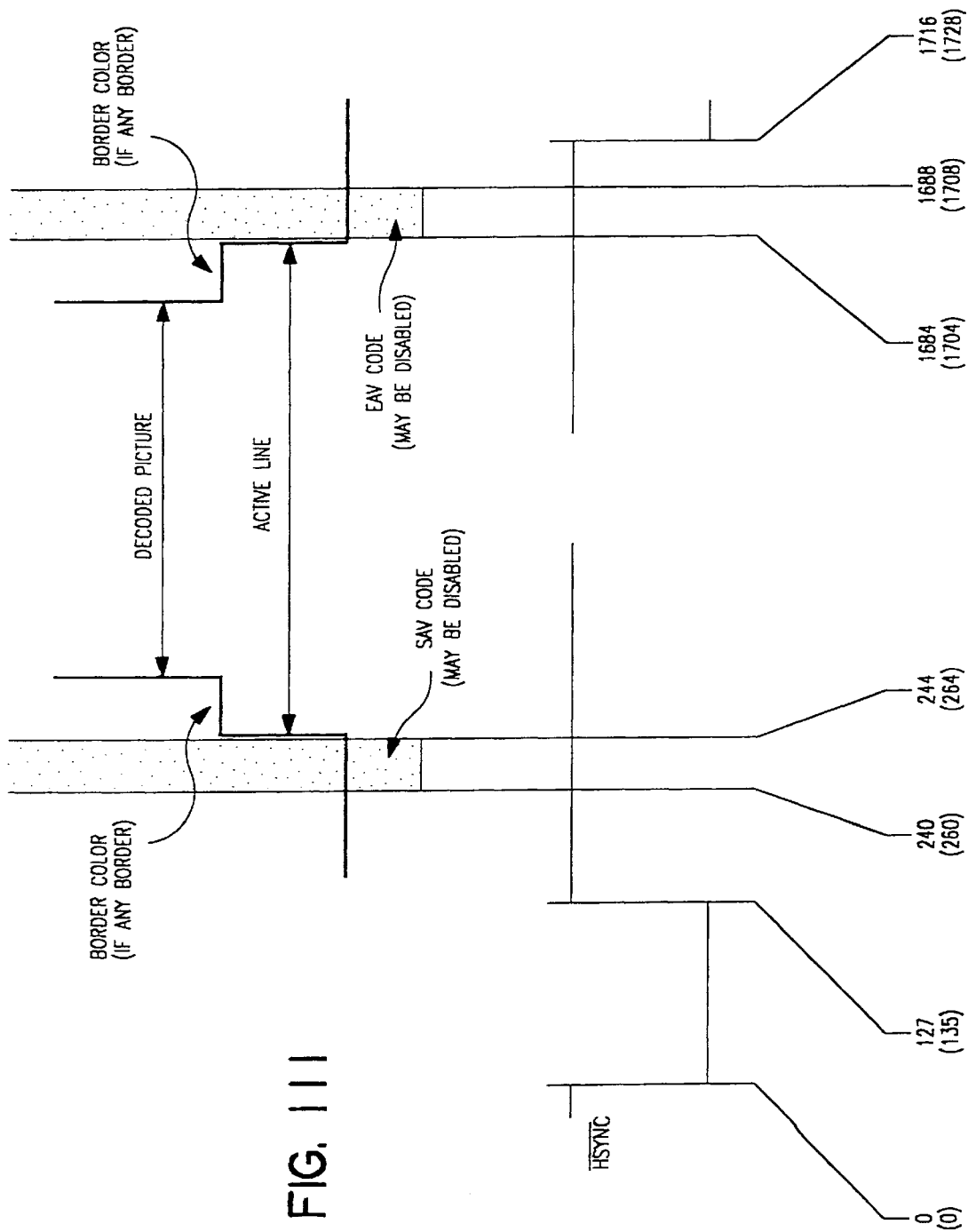
FIG. 111 shows horizontal timing in the present invention.

The horizontal timing is shown in FIG. 111. The numbers are in SYSCLOCK cycles for the 525 line system (625 line system (625 line system in parentheses).

During equalization, the $\overline{HSYNC}$ signal is LOW for 62 cycles (66 cycles in the 625 line system).

During field synchronization, the $\overline{HSYNC}$ signal is LOW for 732 cycles (738 cycles in the 625 line system).

Vertical Timing

Figure 112A:
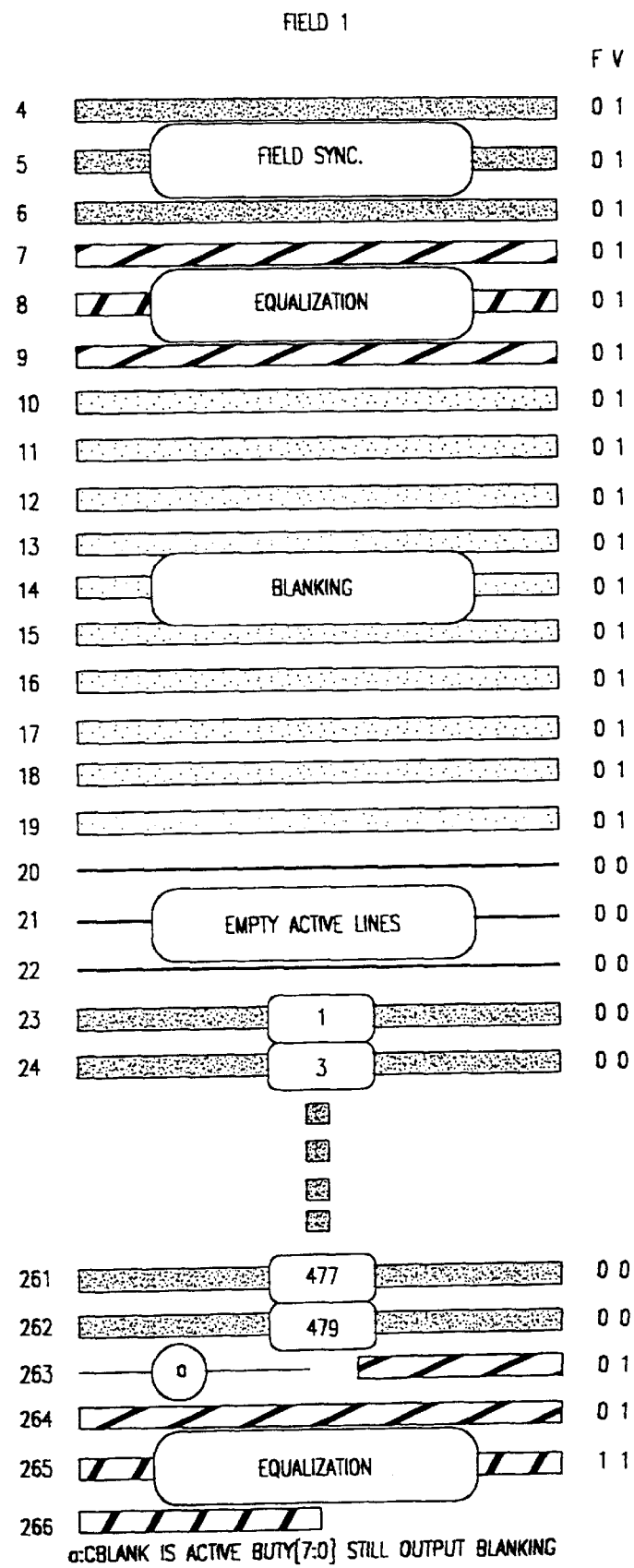
FIG. 112 shows the vertical timing for a 525 line system.
Figure 113A:
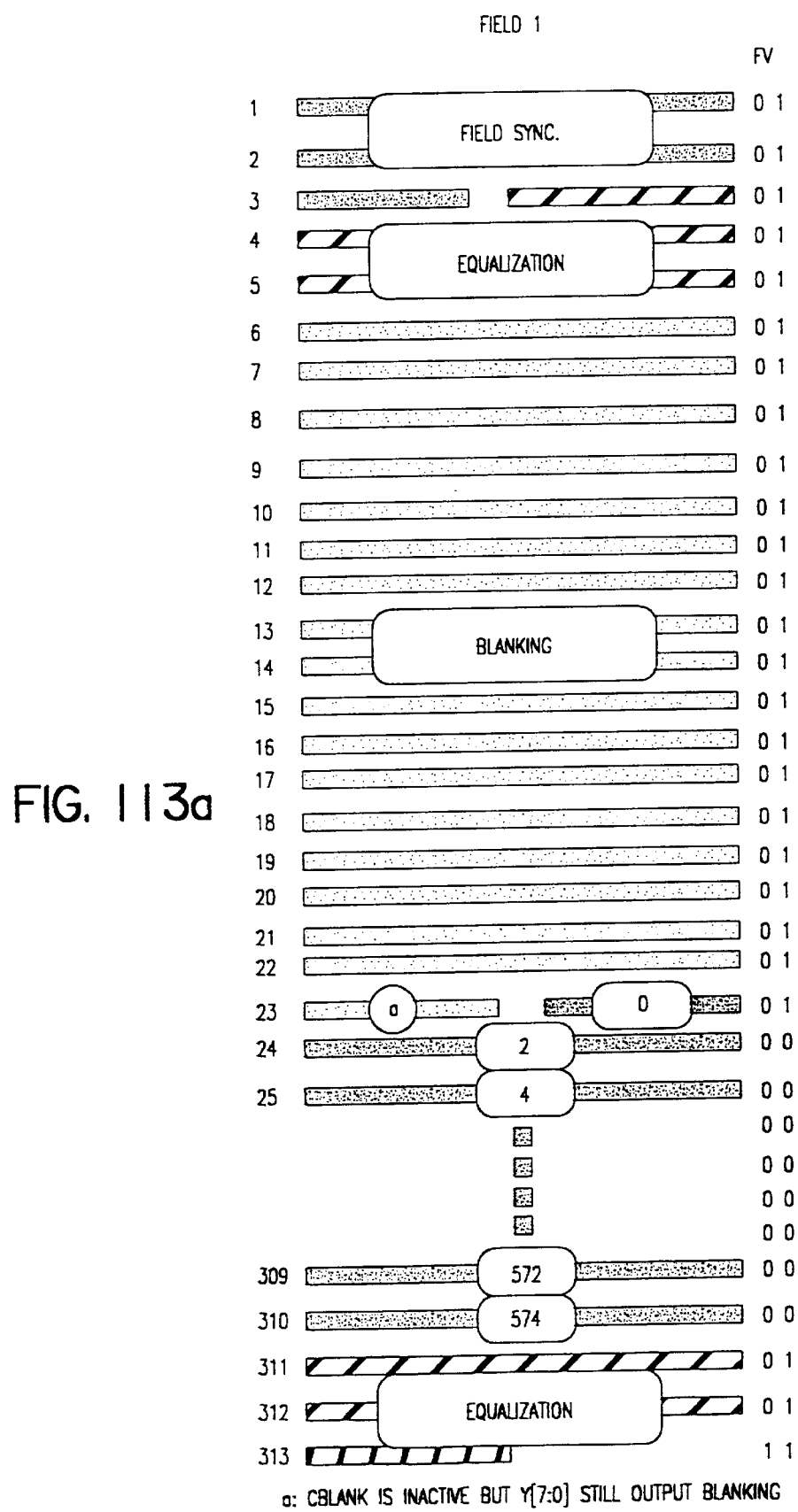
FIG. 113 depicts the vertical timing for a 625 line system.
Figure 113B:
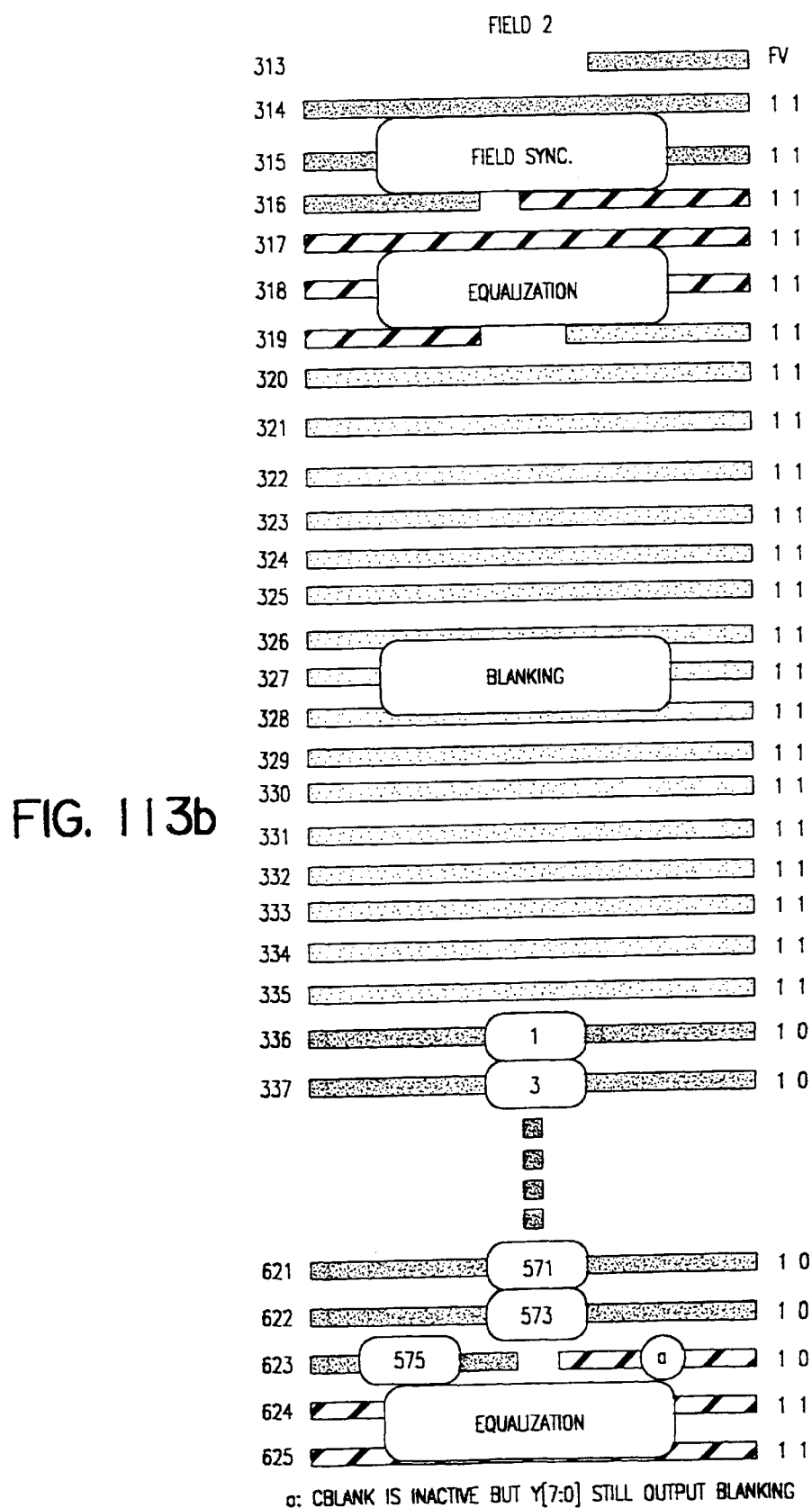

The vertical timing is illustrated in FIG. 112 for the 525 line (NTSC) system and FIG. 113 for the 625 line (PAL) system. In these drawings the numbers down the left hand side provide the line number as per CCIR Rec. 656. The two columns at the right provide the "F" and "V" bits to be found in the SAV and EAV codes (see CCIR Rec. 601).

The smaller numbers in the center of the thick, solid, black lines provide the logical line numbers of the decoded MPEG picture. These are, therefore, numbered 0 to 479 for the 480 line used in the 525 line (NTSC) system and 90 to 575 for the 576 lines used in the 625 line (PAL) system.

Figure 114:
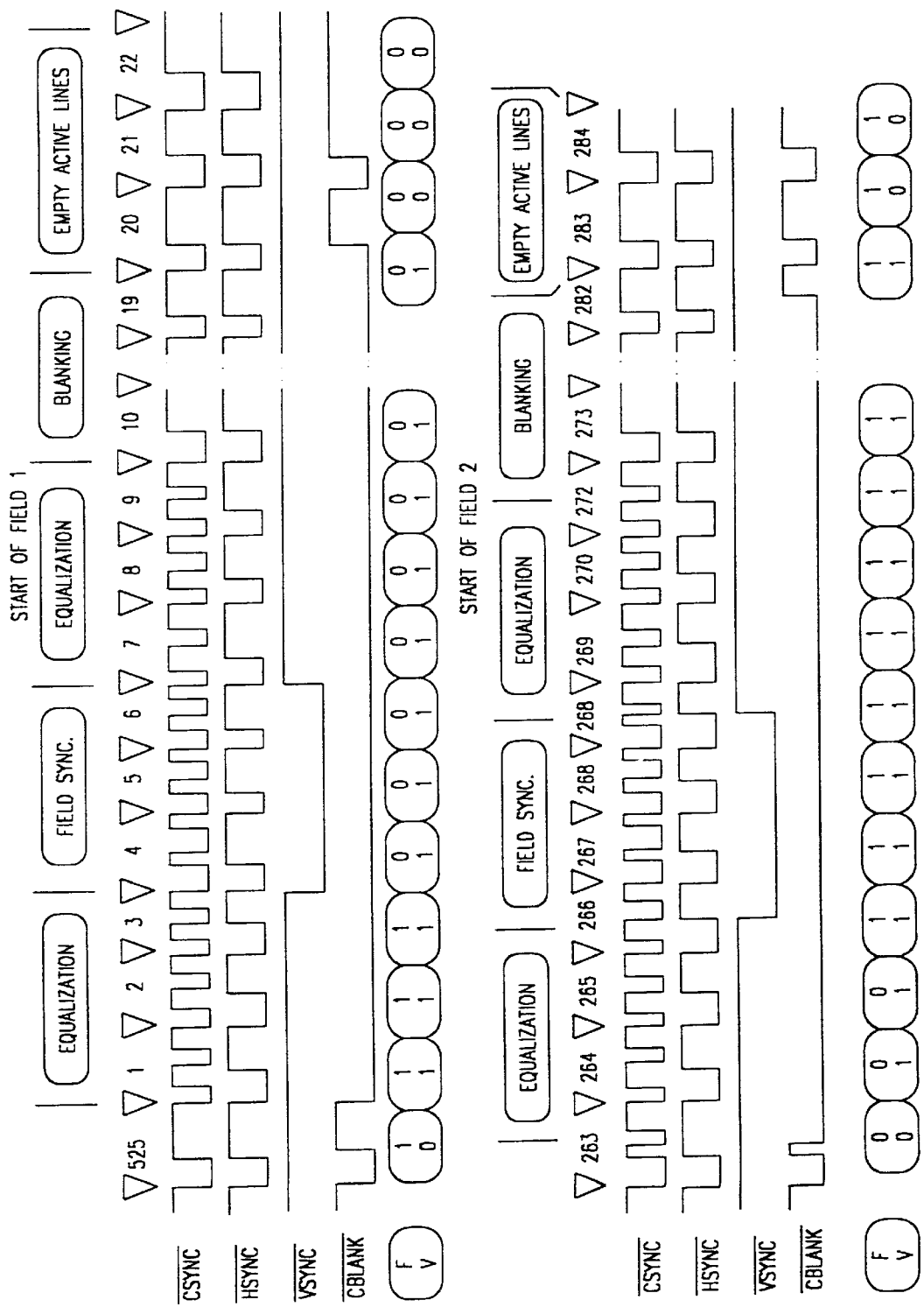
FIG. 114 illustrates the sync and blanking signals for a 525 line system, in accordance with the present invention.
Figure 115:
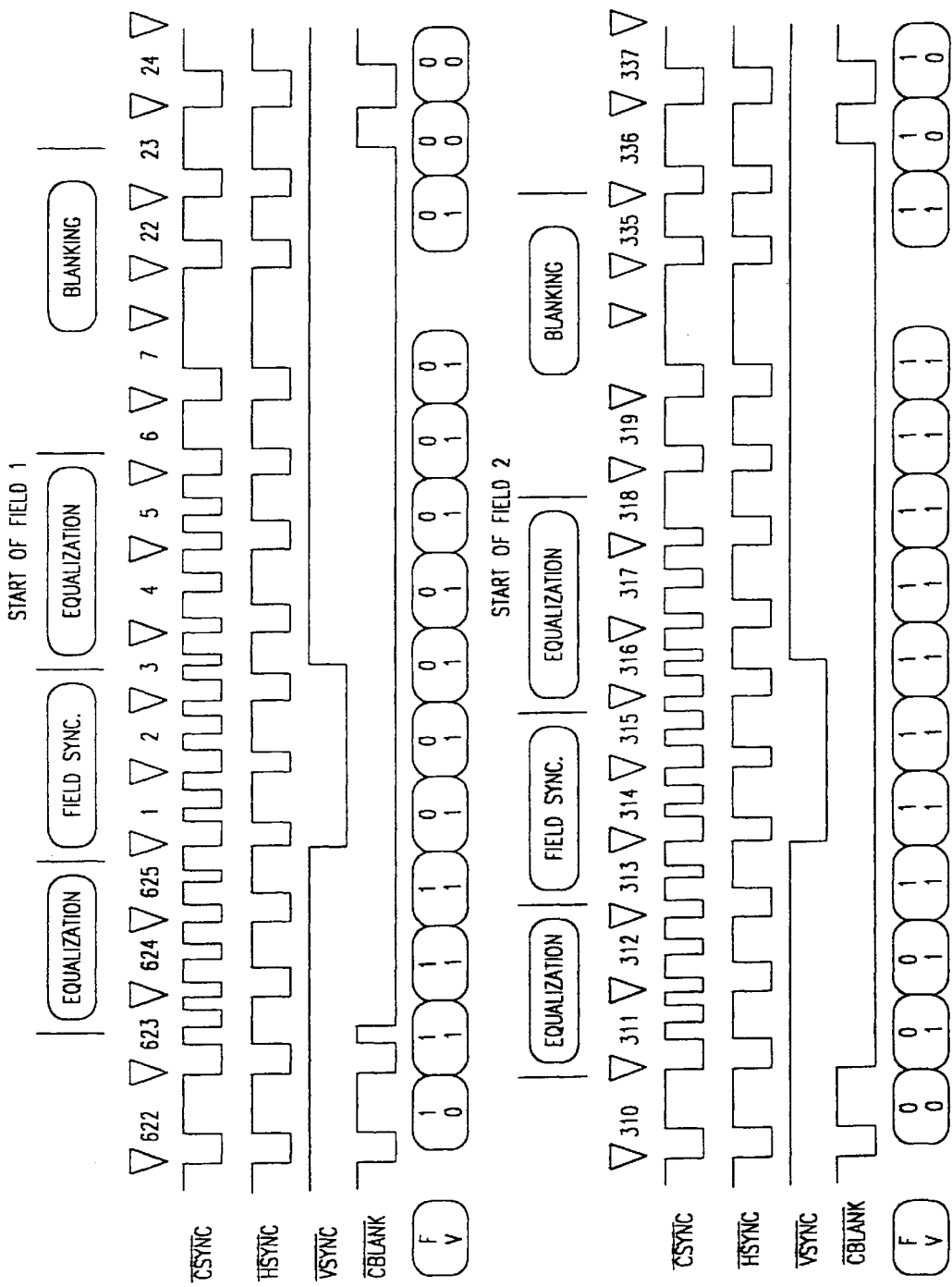
FIG. 115 shows the sync and blanking signals for a 625 line system, in accordance with the present invention.

FIG. 114 shows the timing of the sync and blanking pins for the 525 line system and FIG. 115 for the 625 line system. Note that only one of $\overline{HSYNC}$ or $\overline{CSYNC}$ may be output (see hs_not_cs) and that the polarity of each of these signals may be inverted (see cblank_ah, etc.).

VTG Reset State

In the invention, the VTG resets to the start of line 4 for the 525 line (NTSC) system and to the start of line 1 for the 625 line (PAL) system.

Introduction

A standard byte wide microprocessor interface (MPI) is used in accordance with the present invention. The MPI operates synchronously to the various decoder chip clocks.

MPI Signals

Table 84 depicts the MPI interface signals.

TABLE 84

MPI Interface Signals

| Signal Name | Type | Description |
|---|---|---|
| $\overline{ME}$[1:0] | Input | Two active low chip enables. Both must be low to enable accesses via the MPI. |
| MR/$\overline{W}$ | Input | HIGH indicates a read from a register on the system. LOW indicates a write to a register |

TABLE 84-continued

MPI Interface Signals

| Signal Name | Type | Description |
|---|---|---|
| | | on the system. This signal should be stable while the chip is enabled. |
| MA[5:0] | Input | Address specifies one of the locations in the chip's register map. This signal should be stable while the chip is enabled. |
| MD[7:0] | Output | 8 bit wide data I/O port. These pins are high impedance if either enable signal is HIGH. |
| $\overline{IRQ}$ | Output | An active low, open collector, interrupt request signal. |

Figure 123:
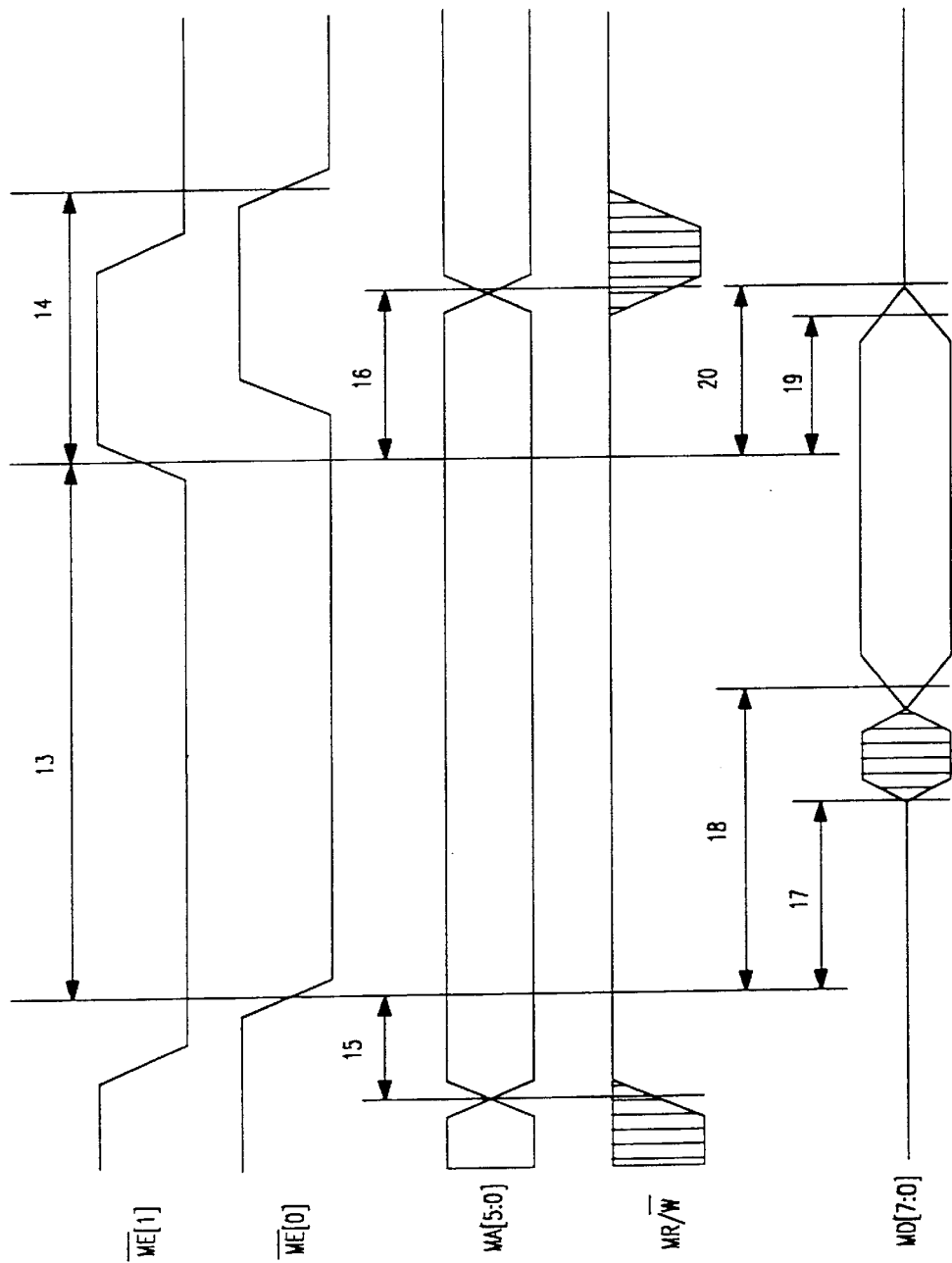
Figure 124:
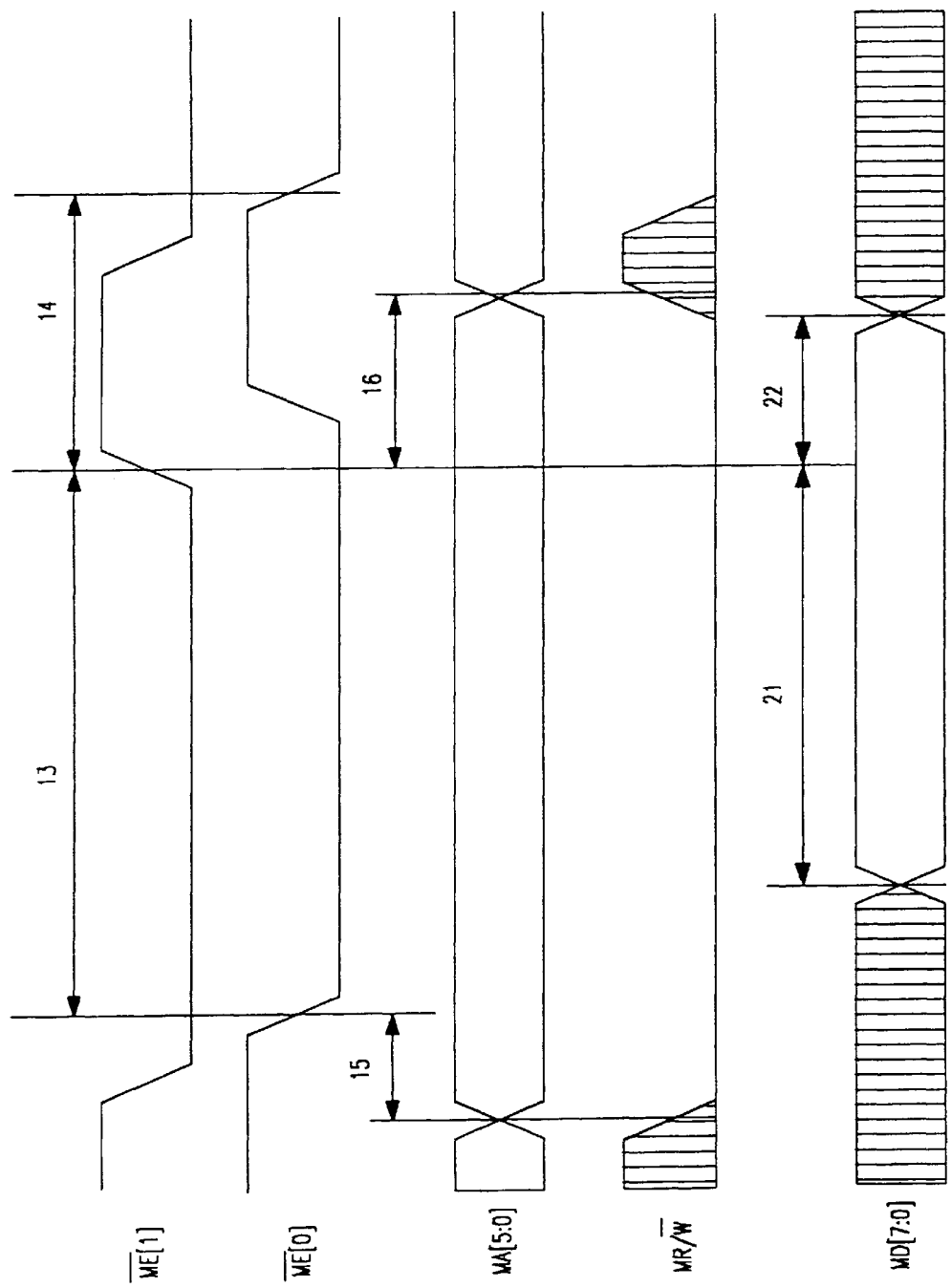

MPI Electrical Specifications
DC Characteristics
See 2.2.1, "TTL (5 V) levels."
FIGS. 123 and 124 illustrate the read and write timing of the MPI, respectively.
AC Characteristics
Table 85 shows the Read Timing for the MPI.

TABLE 85

Microprocessor Interface Read Timing

| Num. | Characteristic | Min. | Max. | Unit | Notes[a] |
|---|---|---|---|---|---|
| 13 | Enable low period | 100 | | ns | |
| 14 | Enable high period | 50 | | ns | |
| 15 | Address or $\overline{rw}$ set-up to chip enable | 0 | | ns | |
| 16 | Address or $\overline{rw}$ hold from chip disable | 0 | | ns | |
| 17 | Output turn-on time | 20 | | ns | |
| 18 | Read data access time | | 70 | ns | b |
| 19 | Read data hold time | 5 | | ns | |
| 20 | Read data turn-ff time | | 20 | | |

[a]The choice, in this example, of $\overline{ME}$[0] to start the cycle and $\overline{ME}$[1] to end it is arbitrary. These signals are of equal status.
[b]The access time is specified for a maximum load of 50 pF on each of MD[7:0]. Larger loads may increase the access time.

Likewise, Table 86 shows the write timing for the MPI.

TABLE 86

Microprocessor Interface Write Timing

| Num. | Characteristic | Min. | Max. | Unit | Notes |
|---|---|---|---|---|---|
| 21 | Write data set-up time | 15 | | ns | a |
| 22 | Write data hole time | 0 | | ns | |

[a]The coice, in this example, of $\overline{enable}$[0] to start the cycle and $\overline{enable}$[1] to end it is arbitrary. These signals are of equal status.

Interrupts

"event" is the term used to describe an on-chip condition that a user might want to observe. An event could indicate an error condition or it could be informative to user software.

There are two single bit registers associated with each interrupt or "event". These are the condition event register and the condition mask register.

Condition Event Register

The condition event register is a one bit read/write register whose value is set to one by a condition occurring within the circuit. The register is set to one even if the condition only existed transiently. The register is then guaranteed to remain set to one until the user's software resets it or the entire chip is reset.

The register is set to zero by writing the value one

Writing zero to the register leaves the register unaltered.

The register must be set to zero by user software before another occurrence of this condition can be observed.

The register will be reset to zero up on reset.

Condition Mask Register

The condition mask register is a one bit read/write register which enables the generation of an interrupt request if the corresponding condition event register(s) is (are) set. If the condition event is already set when 1 is written to the condition mask register, an interrupt request will be issued immediately.

The value 1 enables interrupts.

The register clears to zero upon reset.

Unless stated otherwise, a block will stop operation after generating an interrupt request and will re-start soon after either the condition event or the condition mask register are cleared.

Event and Mask Bits

In the present invention, event bits and mask bits are always grouped into corresponding bit positions in consecutive bytes in the register map (see Table 55). This allows interrupt service software to use the value read from the mask registers as a mask for the value in the event registers to identify which event generated the interrupt.

The Chip Event and Mask

The present invention has a single "global" event bit that summarizes the event activity on the chip. The chip event register presents the OR of all the on-chip events that have 1 in their mask bit.

A 1 in the chip mask bit allows the chip to generate interrupts. A 0 in the chip mask bit presents any on-chip events generating interrupt requests.

Writing 1 or 0 to the chip event has no effect. It will only clear when all the events (enabled by a 1 in their mask bit) have been cleared.

The $\overline{IRQ}$ Signal

The $\overline{IRQ}$ signal in the invention is asserted if both the chip event bit and the chip event mask are set. The $\overline{IRQ}$ signal is an active low, "open collector" output which requires an off-chip pull-up resistor. When active the $\overline{IRQ}$ output is pulled down by an impedance of 100 Ω or less. A pull-up resistor of approximately 4 kΩ should be suitable for most applications.

Page Register

In order to reduce the number of register address signals required by the present invention, a page register is employed to enable more than 64 registers to be addressed. This page register is at location 0x1f. Register locations 0x00 to 0x1f are not affected by the contents of the page register and are always present in the register map. Registers in locations 0x20 to 0x3f depend on the page register.

There are no paged registers that are required for normal device operation. The paged registers are, finally, only used for test purposes.

In the invention, the page register is reset to the value zero. The user should ensure that no other value is written to this register.

Introduction

SDRAM Interface Signals

Table 87 illustrates the SDRAM Interface Signals.

TABLE 87

SDRAM Interface Signals

| Signal Name | Type | Description |
| --- | --- | --- |
| DD[15:0] | I/O | Data pins |
| DA[10.0] | O | Address pins |
| BS | O | Bank select. Often this is labeled as A[11] on 16 Mbit SDRAM parts |
| DCKE | I | Clock enable |
| DCLKOUT | O | SDRAM clock output. |
| DCLKIN | I | Connect to DCLKOUT |
| $\overline{DWE}$ | O | Write enable |
| $\overline{DCAS}$ | O | Column address |
| $\overline{DRAS}$ | O | Row address |
| $\overline{DCS[1:0]}$ | O | Chip select. $\overline{DCS}$[0] selects the first "bank" of SDRAM. If a second "bank" is used (see SDRAM configurations 1 and 2) then $\overline{DCS}$[1] is also used. |

SDRAM Configurations

Table 88 illustrates SDRAM configurations.

TABLE 88

SDRAM Configurations

| Configuration | SDRAM Packages | Total DRAM | Organization |
| --- | --- | --- | --- |
| 0 | 1 | 16 Mbit | 16 Mbit, 1 M by 16 bits |
| 1 | 2 | 20 Mbit | 16 Mbit, 1 M by 16 bits |
|  |  |  | 4 Mbit, 256 k by 16 bits |
| 2 | 2 | 32 Mbit | 16 Mbit, 1 M by 16 bits |
|  |  |  | 16 Mbit, 1 M by 16 bits |
| 3 | 2 | 32 Mbit | 16 Mbit, 2 M by 8 bits |
|  |  |  | 16 Mbit, 2 M by 8 bits |

Configuration Zero

Figure 116:
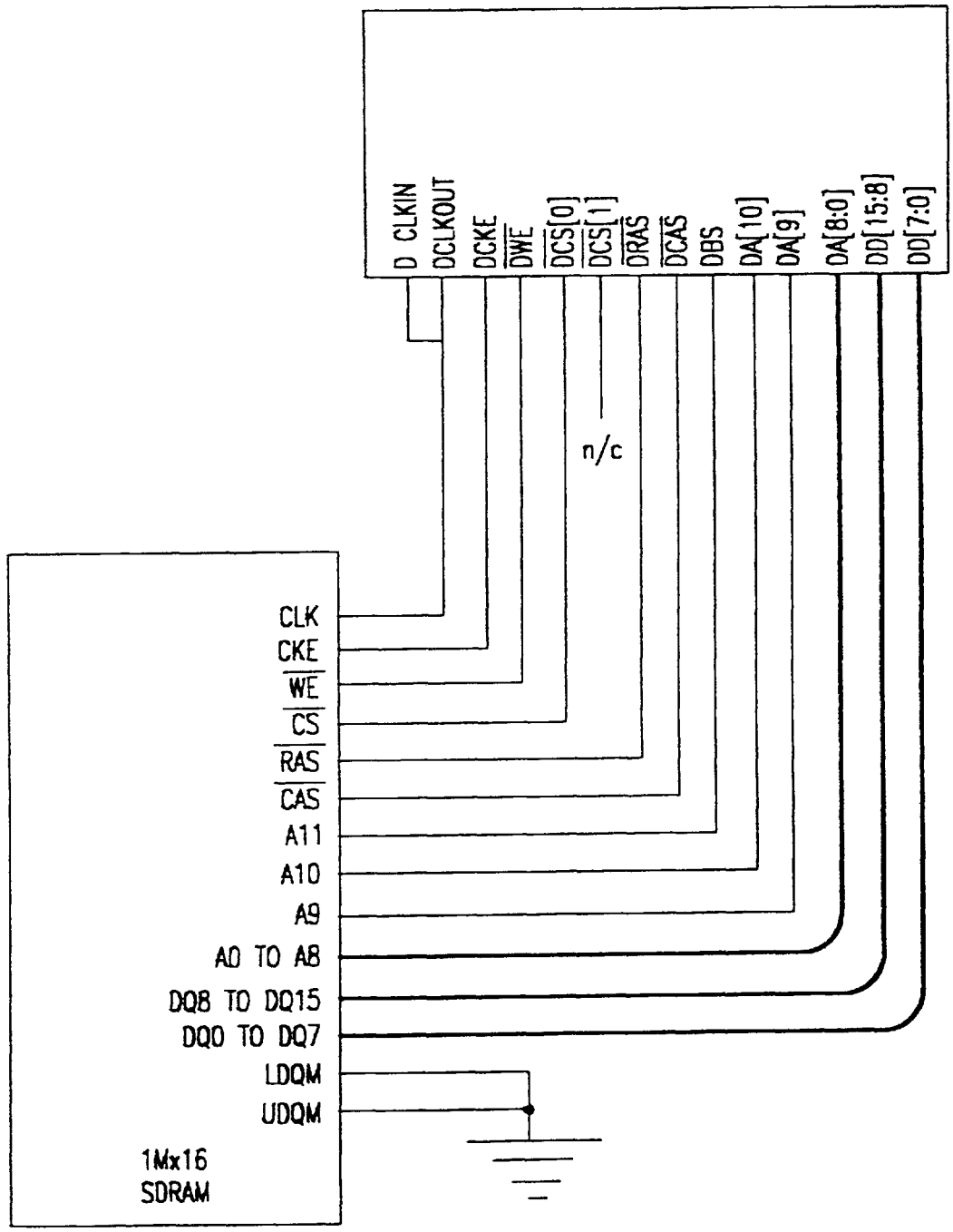
FIG. 116 illustrates a zero SDRAM connection configuration in the present invention.

See FIG. 116 for the Configuration Zero SDRAM Connection.

Figure 117:
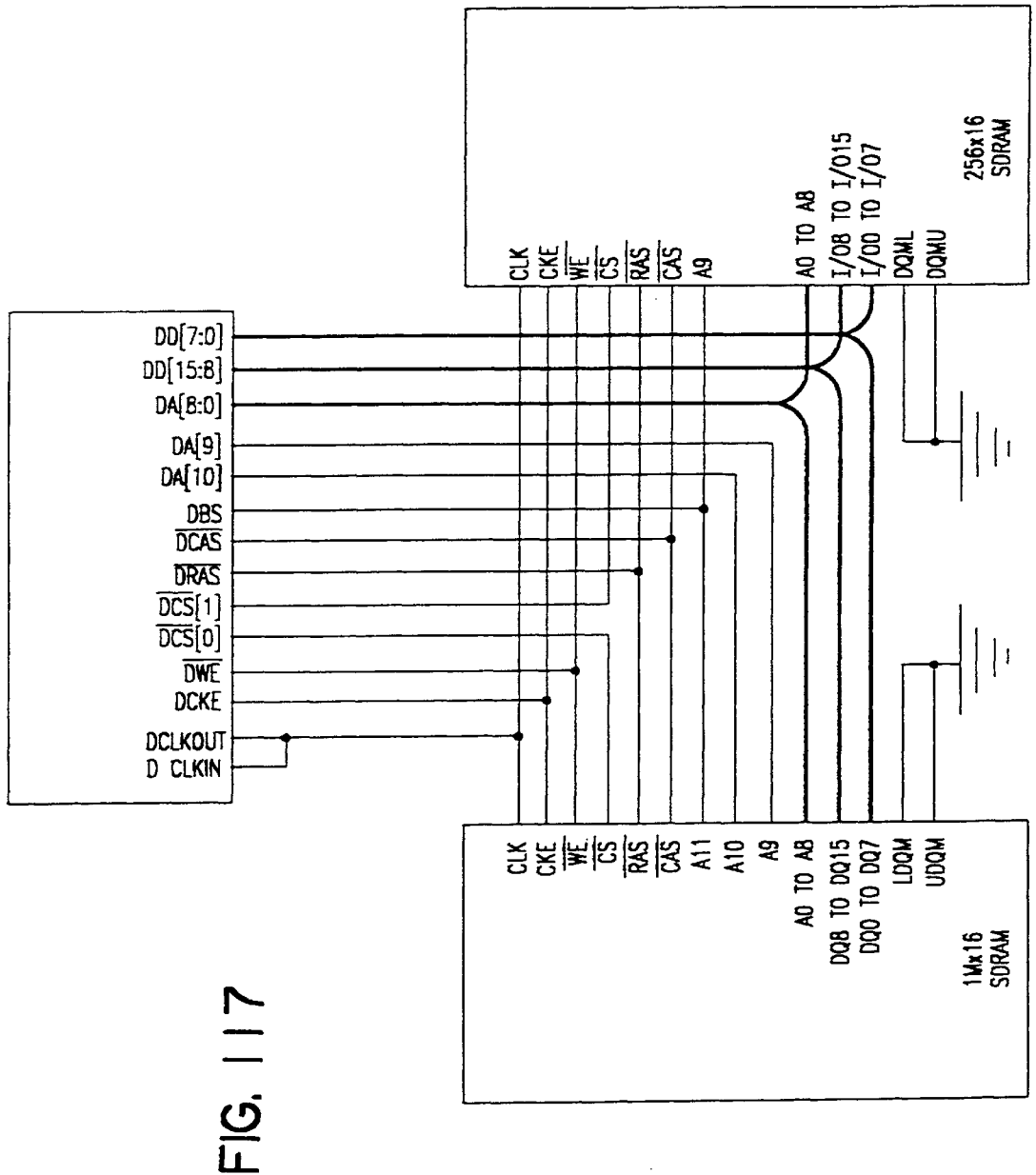
FIG. 117 shows one SDRAM connection configuration in the present invention.
Figure 118:
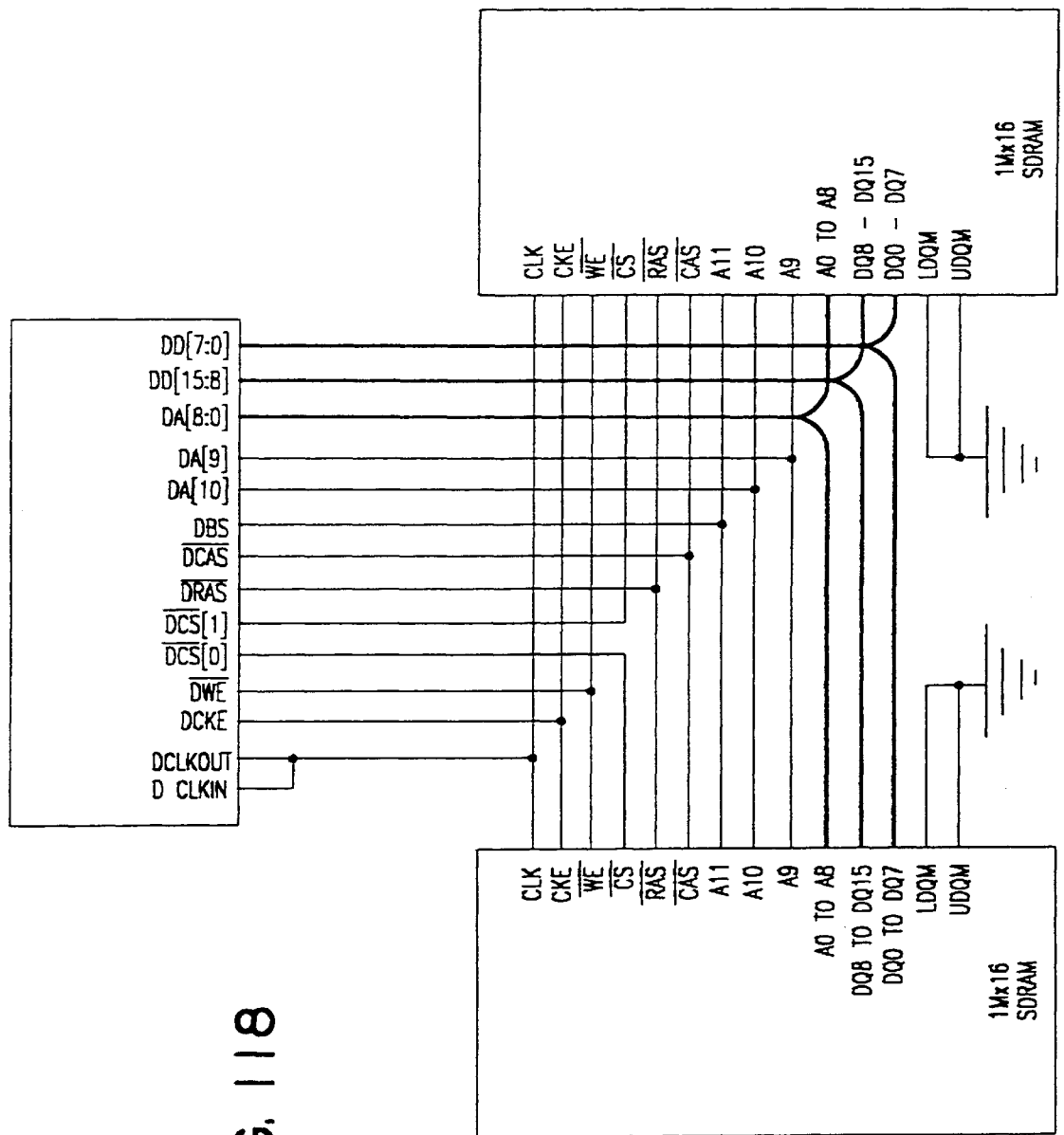
FIG. 118 depicts a two SDRAM connection configuration, in accordance with the present invention.
Figure 119:
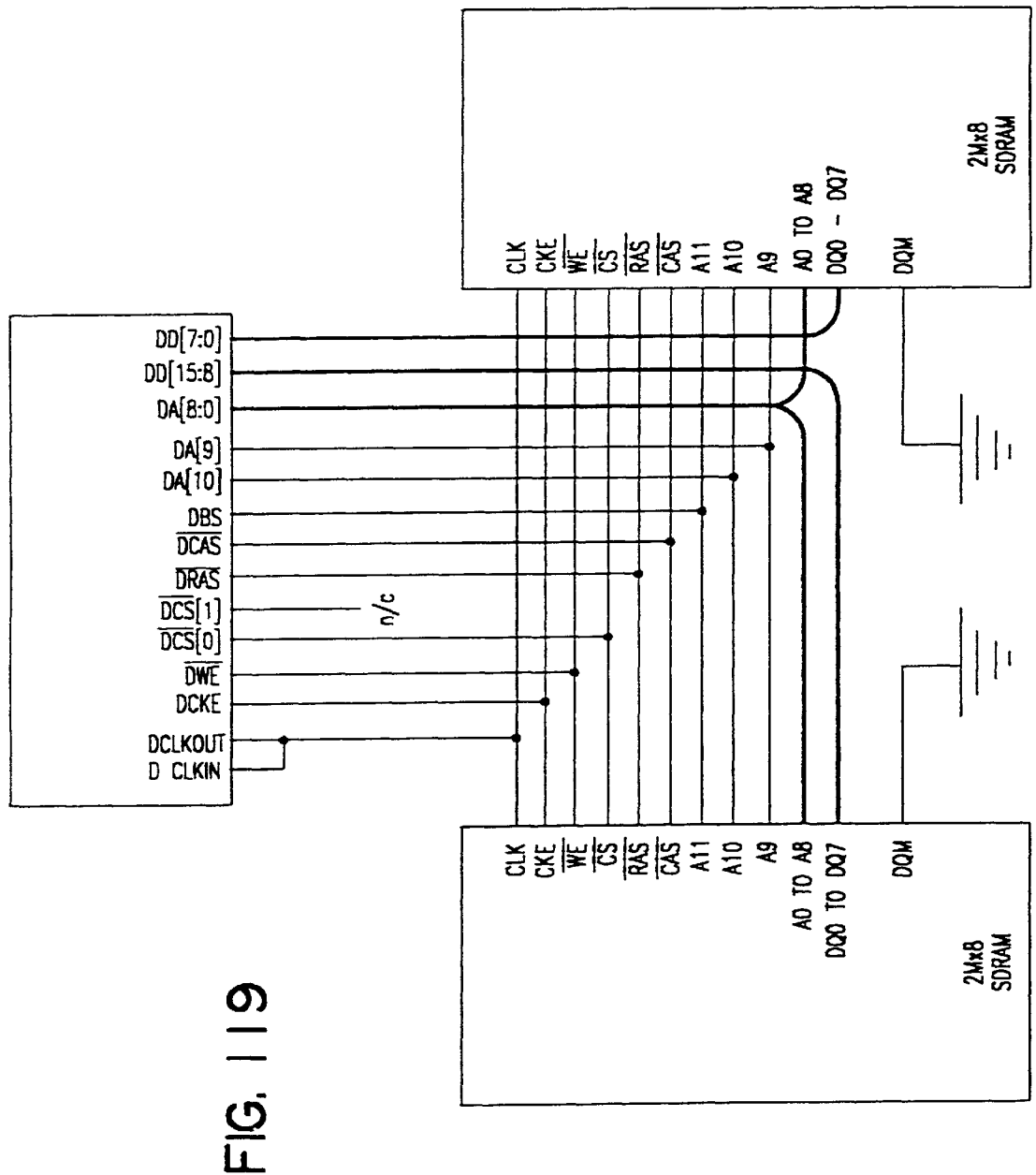
FIG. 119 illustrates a three SDRAM connection configuration

FIG. 117 illustrates the configuration for one SDRAM connection. Similarly, FIGS. 118 and 119 depict a configuration of two and three SDRAM connections, respectively.

Introduction

The system, in accordance with the present invention, fully supports the Joint Test Action Group (JTAG) "Standard Test Access Port and Boundary Scan Architecture", now adopted by the IEEE as standard 1149.1.

All JTAG operations are performed via the Test Access Port (TAP), which consists of five pins. The TREST (Test Reset) pin resets the JTAG circuitry to ensure that the device doesn't power-up in test mode. The TCK (Test Clock) pin is used to clock serial test patterns into the TDI (Test Data Input) pin, and out of the TDO (Test Data Output) pin. Furthermore, the operational mode of the JTAG circuitry is set by clocking the appropriate sequence of bits into the TMS (Test Mode Select) pin.

The JTAG standard is extensible to provide for additional features at the discretion of the chip manufacturer. In accordance with the present invention, there are 9 user instructions, including three JTAG mandatory instructions. The extra instructions allow a degree of internal device testing to be performed, and provide additional external test flexibility. For example, all device outputs may be made to float by a simple JTAG sequence. See Table 89.

Connection of JTAG Pins in Non-JTAG Systems

TABLE 89

How to Connect JTAG Inputs

| Signal | Direction | Description |
|---|---|---|
| TRST | Input | This pin has an internal pull-up, but must be taken low at power-up even if the JTAG features are not being used. This may be achieved by connecting $\overline{\text{TRST}}$ in common with the chip reset pin $\overline{\text{RESET}}$. |
| TDI | Input | These pins have internal pull-ups, and may be left disconnected if the JTAG circuitry is not being used. |
| TMS | | |
| TCK | Input | This pin does not have a pull-up, and should be tied to ground if the JTAG circuitry is not used. |
| TDO | Output | High impedance except during JTAG scan operations. If JTAG is not being used, this pin may be left disconnected. |

Supported Instructions

This section describes the instructions supported in this implementation of the present invention. See Tables 90, 91, and 92.

TABLE 90

Mandatory Instructions

| Instruction | Description |
|---|---|
| EXTEST | This is the most basic instruction. It applies data from the boundary scan chain to the PCB, and captures the response. It has a pre-defined instruction code, which is all-O's in the instruction register. |
| SAMPLE/PRE-LOAD | This instruction allows the boundary-scan chain to be parallel-loaded from the device's pins, and shifted, without the boundary-scan chain being switched in, i.e. transparently to system operation. By this means, a "snapshot" of the state of the device's pins may be taken (external clock control required to avoid mestastability), or the boundary-scan chain may be pre-loaded before switching over into EXTEST mode. The instruction code for SAMPLE/PRELOAD may be chosen by the manufacturer. |
| BYPASS | This instruction selects the 1-bit bypass register, to by-pass the boundary scan chain. and thus reduce the length of bit-stream required to access other devices on the PCB. The instruction code is pre-defined as all-1's. |

TABLE 91

Optional Instructions That Are Supported

| Instruction | Description |
|---|---|
| INTEST | This does the reverse of EXTEST[a], i.e. applies data from the boundary-scan chain to the chip core, and captures the response. The instruction code may be chosen by us. It is up to the user to devise suitable tests to make use of this capability. |

The following optional JTAG instructions are not supported:

1) IDCODE
2) RUNBIST

TABLE 92

Additional Public Instructions

| Instruction | Description |
|---|---|
| FLOATBS | This instruction pre-sets the Boundary-scan register to contain '1' in all open-drain cells and '0' in all others. The system operation is not affected. Since a '0' in an output cell causes the output to float, this a quick way of disabling all outputs (a common requirement for PCB testing). The outputs will not float until an instruction is loaded which switches in the Boundary-scan chain, e.g. EXTEST. (If FLOATBS were to switch in the boundary-scan chain itself, unknown data would be driven out of the pins until the UPDATE_DR state.) |
| INEXTEST | Does the combination of INTEST and EXTEST. Perhaps not very useful as we have individual versions anyway. It may allow some users to devise a faster combined PCB/chip test. Many JTAG devices use this combined mode rather than separate versions. |
| SETBYP | Selects the Bypass register between TDI & TDO, but switches the Boundary-scan chain in. This allows the PCB test to set up a constant pattern on one device's pins, but still access other device's pins without having to reload the first device. The name is consistent with the same function in Texas Instrument's "Scope" JTAG devices. |
| SHIFTBN | Like SAMPLE/PRELOAD, but without the SAMPLE operation. Allows the current Boundary-scan contents to be shifted some more without being overwritten. T.I. have this instruction in their Scope devices, but variously call it READBN or RBRNM, neither of which is very intuitive. |
| SHIFTBT | Like SHIFTBN, except that the Boundary-scan chain is switched in. Potentially more useful than SHIFTBN, in that it could be used for optimizing PCB test patterns for small bits of logic externally connected between JTAG devices. E.g. for a 2-input gate near the far-end of the chain, several test patterns could be queued-up in the Boundary-scan chain and applied in turn. EXTEST, in contrast, overwrites the Boundary-scan contents on each scan cycle. |

Allocation of Instruction Codes

There are 14 defined instructions altogether. Hence there is a 4-bit long instruction register, with 2 unassigned instructions. Unassigned instructions are aliases of the BYPASS instruction, in accordance with IEEE1149.1.

The full list of instructions and their codes is shown in Table 93.

TABLE 93

JTAG Instruction Codes

| Code | Instruction | Register shifted | Signals capture | B/SCAN register | Class |
|---|---|---|---|---|---|
| 0000 | EXTEST | B/Scan | InputPads/0's | switched in | MANDATORY |
| 0001 | SAMPLE/PRELOAD | B/Scan | All Pads | transparent | MANDATORY |
| 0010 | INTEST | B/Scan | 0's / OutputPads | switched in | RECOMMENDED |
| 0011 | FLOATBS | B/Scan | 0's | transparent | PUBLIC |
| 0100 | SHIFTBT | B/Scan | No change | switched in | PUBLIC |
| 0101 | SHIFTBN | B/Scan | No Change | transparent | PUBLIC |
| 0110 | INEXTEST | B/Scan | All Pads | switched in | PUBLIC |
| 0111 | unassigned | Bypass | 0 | trans- | RESERVED |

TABLE 93-continued

JTAG Instruction Codes

| Code | Instruction | Register shifted | Signals capture | B/SCAN register | Class |
|------|-------------|------------------|-----------------|-----------------|-------|
| 1000 | PRIVATE | | | parent | |
| 1001 | PRIVATE | | | | |
| 1010 | SPDATAT | ScanData | Internal sigs | switched in | PRIVATE |
| 1011 | SPDATAN | ScanData | Internal sigs | trans-parent | PRIVATE |
| 1100 | SETBYP | Bypass | 0 | switched in | PUBLIC |
| 1101 | unassigned | Bypass | 0 | trans-parent | RESERVED |
| 1110 | BYPASS | Bypass | 0 | trans-parent | PUBLIC |
| 1111 | BYPASS | Bypass | 0 | trans-parent | MAN-DATORY |

Level of Conformance to IEEE 1149.1 Rules

All rules are adhered to, although the following should be noted:

TABLE 94

JTAG Rules

| Rules | Description |
|-------|-------------|
| 3.1.1(b) | The TRST pin is provided. |
| 3.5.1(b) | Guaranteed for all public instructions (see IEEE 1149.15.2.1(c)). |
| 5.2.1(c) | Guaranteed for all public instructions. For some private instructions, the TDO pin may be active during any of the states Capture-DR. Exit1-DR & Pause-DR. |
| 5.3.1(a) | Power on-reset is achieved by use of the TRST pin. |
| 6.2.1(e,f) | A code for the BYPASS instruction is loaded in the Test-Logic-Reset state. |
| 7.1.1(d) | Un-allocated instruction codes are equivalent to BYPASS. |
| 7.2.1(c) | There is no device ID register. |
| 7.8.1(b) | Single-step operation requires external control of the system clock. |
| 7.9.1(...) | There is no RUNBIST facility. |
| 7.11.1(...) | There is no IDCODE instruction. |
| 7.12.1(...) | There is no USERCODE instruction |
| 8.1.1(b) | There is no device identification register. |
| 8.2.1(c) | Guaranteed for all public instructions. The apparent length of the path from TDI to TDO may change under certain circumstances while private instruction codes are loaded. |
| 8.3.1(d-i) | Guaranteed for all pubic instructions. Data may be loaded at times other than an the rising edge of TCK while private instructions codes are loaded. |
| 10.4.1(e) | During INTEST, the system clock pin must be controlled externally. |
| 10.6.1(c) | During INTEST, output pins are controlled by data shifted in via TDI. |

Recommendations

TABLE 95

Recommendations Met

| Rec-ommendations | Description |
|------------------|-------------|
| 3.2.1(b) | TCK is a high-impedance CMOS input. |
| 3.3.1(c) | TMS has a high impedance pull-up. |
| 3.6.1(d) | (Applies to use of chip). |
| 3.7.1(a) | (Applies to use of chip). |
| 6.1.1(e) | The SAMPLE/PRELOAD instruction code is loaded during Capture-IR. |
| 7.2.1(f) | The INTEST instruction is supported. |

TABLE 95-continued

Recommendations Met

| Rec-ommendations | Description |
|------------------|-------------|
| 7.7.1(g) | Zeros are loaded at system output pins during EXTEST. |
| 7.7.2(h) | All system outputs may be set high-impedance. |
| 7.8.1(f) | Zeros are loaded at system input pins during INTEST. |
| 8.1.1(d,e) | Design-specific test data registers are not publicly accessible. |

TABLE 96

Recommendations Not Implemented

| Rec-ommendation | Description |
|-----------------|-------------|
| 10.4.1(f) | During EXTEST. the signal driven into the on-chip logic from the system clock pin is that supplied externally. |

Permissions

TABLE 97

Permissions Met

| Per-missions | Description |
|--------------|-------------|
| 3.2.1(c) | Guaranteed for all public instructions. |
| 6.1.1(f) | The instruction register is not used to capture design-specific information. |
| 7.2.1(g) | Several additional public instructions are provided. |
| 7.3.1(a) | Several private instruction codes are allocated. |
| 7.3.1(c) | (Rule?) Such instructions codes are documented. |
| 7.4.1(f) | Additional codes perform identically to BYPASS |
| 10.1.1(i) | Each output pin has its own 3-state control. |
| 10.3.1(h) | A parallel latch is provided. |
| 10.3.1(i,j) | During EXTEST input pins are controlled by data shifted in via TDI |
| 10.6.1 (d,e) | 3-state cells are not forced inactive in the Test-Logic-Reset state. |

Introduction

The start code detector (SCD), in accordance with the present invention, has the task of detecting start codes in the coded data stream. It converts these to Tokens for further internal processing by the system.

In addition to this task there are a series of features that support, for example, channel change.

Start Code Detector Registers

Table 98 illustrates the registers for the start code detector of the present invention.

TABLE 98

Start code detector registers

| Addr (Hex) | Bit no. | Dir/reset | Register Name | Description |
|---|---|---|---|---|
| 06 | 7 | RW/0 | scdp_access | This bit must be set to one before the values in register location 0x07 may be written to reliably. This causes the SCD to stop processing data so that there is never any contention between the microprocessor access and any attempt by the SCD to modify the registers itself. Once the value one has been written to scdp_access, the microprocessor must poll scdp_access and wait until it reads back 1. Once the required accesses have been made to location 0x07, the value 0 should be written to scdp_access to enable the SCD to continue processing data. |
| | 6 | | (not used) | |
| | 5 | RW/1 | discard_extension | When discard_extension is 1, any extension data that is not recognized as MPEG-2 MP@ML is discarded at the start code detector. When it is 0, such extension data is passed through the coded data buffer to the parser. With the standard microcode, there is no point in setting discard_extension to 0. |
| | 4 | RW/1 | discard_user | When discard_user is 1, any user data is discarded at the start code detector. When it is 0, used data is passed through the coded data buffer to the parser. Whilst facilities exist to handle small amounts of user data at the parser care must be exercised if discard_user is set to 0. Note that the system cannot deal with arbitrary amounts of user data. |
| | 3 | RW/0 | after_search_stop | Used in conjunction with the start_code_search facility. |
| | 2 | RW/0 | flag_picture_end | This is set to 1 to enable the flag_picture_end facility. |
| | 1 | RW/0 | after_picture_stop | Used in conjunction with the flag_picture_end facility. |
| | 0 | RW/0 | after_picture_discard | Used in conjunction with the flag_picture_end facility. |
| 07 | 7:3 | — | (not used) | |
| | 2 | RW/0 | discard_all | This is set to 1 to enable the discard_all facility. |
| | 1:0 | RW/0 | start_code_search | A non-zero value in this register enables the start_code_search facility. See 8.5 on page 84. |
| 00 | 7 | — | (not associated with the start code detector) | |
| | 6 | RW[a]/0 | end_search_event | This bit is set whenever a start_code_search is satisfied. if end_search_mask is also set to 1 then an interrupt will be generated.[b] |
| | 5 | RW/0 | unrecognized_start_event | This bit is set whenever an unrecognized start code is detected. If unrecognized_start_mask is also set to 1, then an interrupt will be generated. |
| | 4 | RW/0 | flag_picture_end_event | This bit is set whenever the end of a picture is detected and flag_picture_end=1. If flag_picture_end_mask is also set to 1 then an interrupt will be generated. See 8.4 on page 82. |
| | 3:0 | — | (not associated with the start code detector) | |

TABLE 98-continued

Start code detector registers

| Addr (Hex) | Bit no. | Dir/reset | Register Name | Description |
|---|---|---|---|---|
| 01 | 7 | — | (not associated with the start code detector) | |
| | 6 | RW/0 | end_search_mask | See end_search_event above. |
| | 5 | RW/0 | unrecognized_start_mask | See unrecognized_start_event above. |
| | 4 | RW/0 | flag_picture_end_mask | See flag_picture_end_event above. |
| | 3:0 | — | (not associated with the start code detector) | |

[a]event bits are not simple R/W register bits
[b]all interrupts are conditional on chip_mask being set to 1

Detection of Start Codes

The start code detector of the present invention will only detect start codes that are correctly byte aligned.

The present invention deals only with video start codes. Unrecognized start codes are detected and cause an unrecognized_start_code event. The unrecognized start codes are the system start codes (with values 0xb9 through 0xff) the reserved start codes (0xb0, 0xb1, and 0xb6) and the sequence_error_code (0xb4).

discard_all Facility

The discard_all facility may be used to discard all data that enters the system. It is possible to select the discard_all facility "manually" by setting the register discard_all to 1. However, it is necessary that scdp_access must first be set to 1 and then polled until it reads-back 1. Generally, it is typical to enter this mode automatically as part of the flag-picture_end facility.

The present invention will continue to discard all data until either the value 0 is written to discard_all or a FLUSH Token is encountered. Note that FLUSH Token that the resets discard_all is deleted from the stream of tokens and does not affect the parser or any subsequent blocks of circuitry.

flag_picture_end Facility

The flag_picture_end facility, in accordance with the present invention, is intended to allow a clean termination of decoding by waiting until the end of a picture before stopping the flow of data into the system. The parser, therefore, will see no incomplete pictures.

Figure 120:
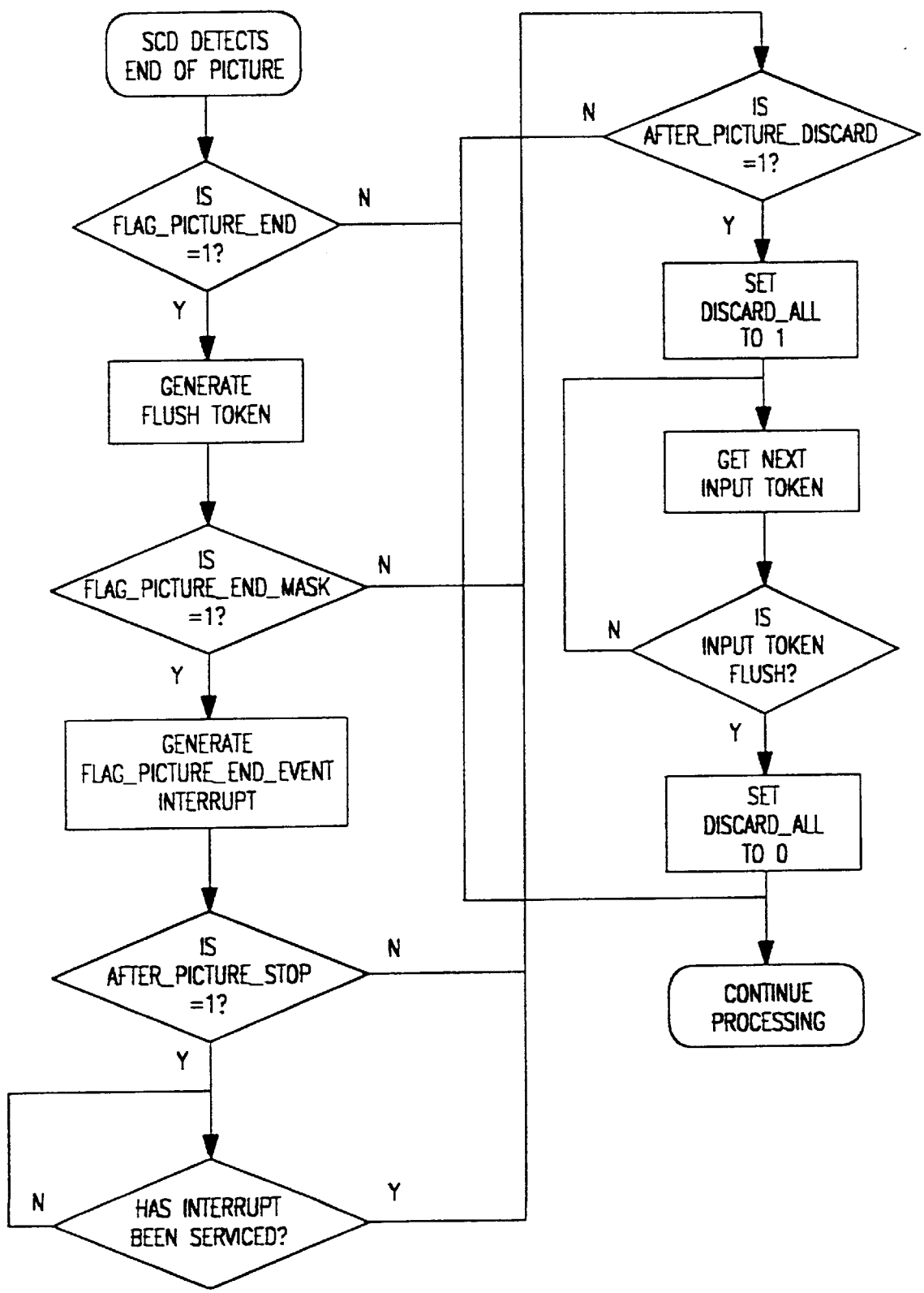
FIG. 120 is a flow chart depicting the flag_picture_end operation, in accordance with the present invention.

FIG. 120 illustrates as a flow chart the flag_picture_end facility. As shown, it is possible to generate an interrupt (flag_picture_end_event) when the end of the picture is detected. This may cause the SCD to stop processing data until the interrupt is serviced. Alternatively, the SCD may be allowed to proceed.

If after-picture_discard is set to 1, then after the end of the picture is detected, all subsequent data will be discarded. This is most useful for discarding the trailing data from one channel that is "in flight" in the system demultiplexor prior to a channel change.

Note that the start_code_search facility in this embodiment takes priority over flag_picture_end facility. In this way, the data that is being discarded due to the start_code_search is not examined to determine whether the end of a picture has been reached.

start_code_search Facility

In the invention, the SCD can be set to search for specific types of start codes. This may be used, for instance, after a channel change to search for a sequence start code before decoding commences.

TABLE 99 start_code_search Modes

| start_code_search | Start codes that end the search |
|---|---|
| 0 | (none - normal operation) |
| 1 | picture_start_code, group_start_code and sequence_start_code |
| 2 | group_start_code and sequence_start_code |
| 3 | sequence_start_code |

The search mode is entered by writing a non-zero value into start_code_search. The start code detector will then search for the appropriate start codes as indicated by Table 99. All data and Tokens are discarded while the search continues. When one of the appropriate start codes is encountered, the search ends. start_code_search is set to zero and an interrupt may optionally be generated.

Note also that a FLUSH Token will terminate the search as if one of the indicated start codes had been encountered. However, in the special case that the FLUSH Token is terminating the discard_all function, the search is not terminated. Further, this allows a direct transition between the discard_all and a previously selected search mode when the FLUSH Token is encountered.

Figure 121:
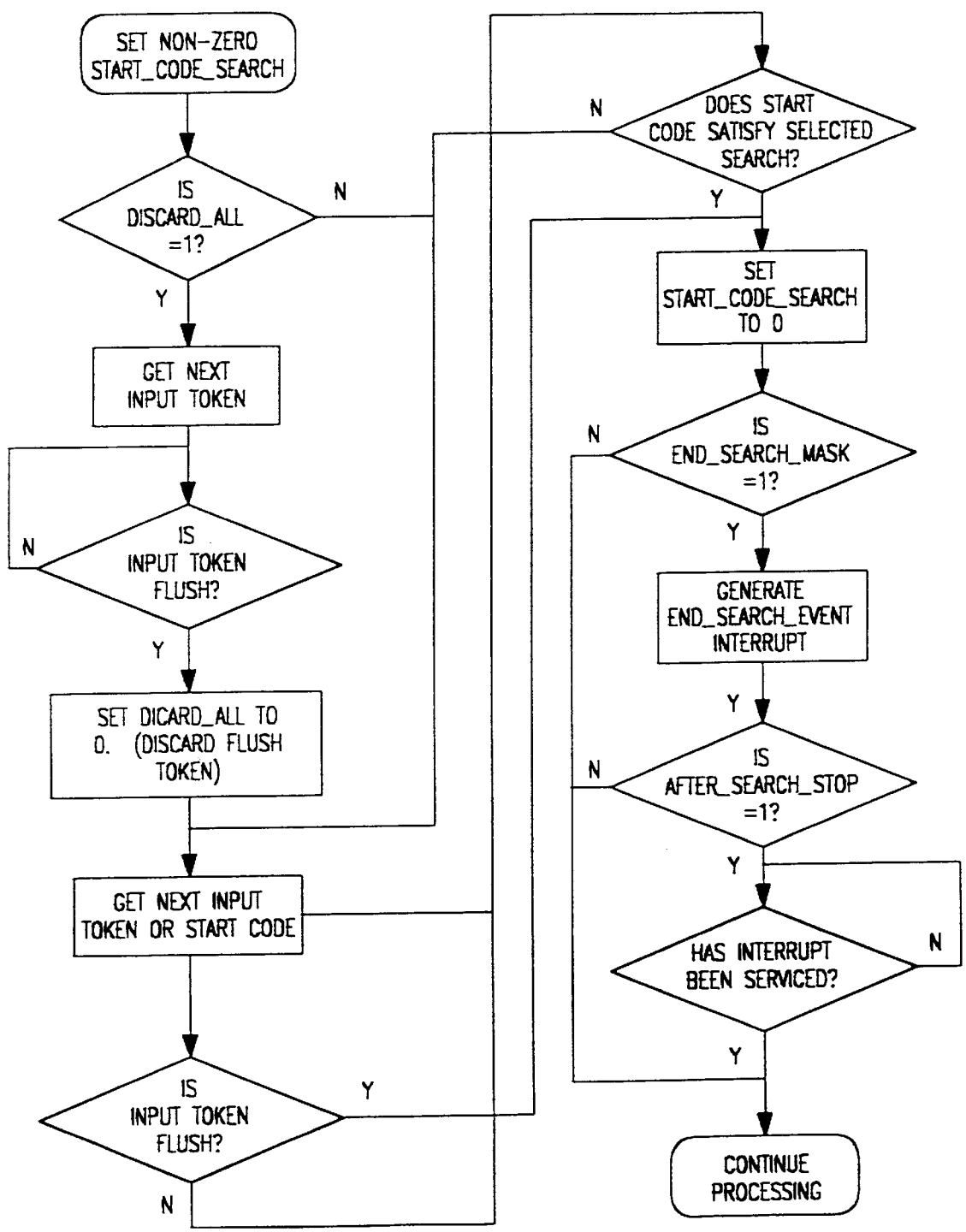

FIG. 121 illustrates as a flow chart the start_code_search facility, in accordance with the present invention.

SCD Example—Channel Change

An example of the SCD facilities in the invention is shown in the following sequence of actions which effect a channel change operation.

1) The controlling microprocessor recognizes the need for a channel change (perhaps responding to a signal from a remote control unit). The microprocessor will use the flag_picture_end facility of the SCD by writing;

1 in to flag_picture_end
1 in to after_picture_discard
1 in to flag_picture_end_mask 2) When the start code detector detects the end of the current picture, it immediately starts to discard all subsequent data. The microprocessor is interrupted and determines that the cause of the interrupt was flag_picture_end_event. The microprocessor first prepares the start code detector for the new channel by writing, 3 (search for sequence_start) into start_code_search.
1 to flag_picture_end_event (to clear the event)

3) Then the microprocessor retunes the tuner to select the new channel.

4) After the last data from the old channel is transferred into the system (and before the first data from the new channel) a FLUSH Token is inserted. (Alternatively, the value 0 is written to discard_all.) The start code detector, therefore, stops discarding the data (from the old channel) and starts searching (the data from the new channel) for a sequence start code.

5) Once the sequence start code is detected, the start code detector ceases discarding data and resumes normal decoding.

Introduction

The video parser, in accordance with the present intention, is responsible for decoding the video data stream. It is implemented as a microprogrammed processor.

In the normal course of events, there is little need to interact with the video parser and many simple applications may simply let it get on with its job of decoding video.

However, the video parser is able to notify the controlling microprocessor when it detects unusual or unexpected events, such as bitstream errors. In all cases, the microcode includes code to recover from (and conceal) errors so that it is safe to ignore bitstream errors. However, the knowledge that bitstream errors are occurring may be useful for diagnostic purposes.

Furthermore, some aspects of Timestamp management are dealt with in the parser's microcode processor. These are documented in Chapter 10.

Parser Registers

The registers used by the parser as shown in Table 100.

TABLE 100

Parser Registers

| Address (Hex) | Bit no. | Dir/reset | Register Name | Description |
|---|---|---|---|---|
| 10 | 7:1 | RW | (parser_ctrl) | No function allocated |
|  | 0 | RW | parser_continue | Used in certain situations to indicate to the parser whether it should continue with its current activity or return to normal decoding |
| 11 | 7:0 | RW | parser_status | Used to indicate the status of the parser in certain conditions |
| 12 | 7:0 | RO | parser_error_code | This location contains an error code when the parser has interrupted and is waiting to be serviced. This indicates the reason for the interrupt. |
| 13 | 7 | RW/0 | parser_access | The value 1 must be written to this register to enable access to the other parser registers. The controlling microprocessor must then poll this bit until it reads back the value 1 indicating that the parser has stopped processing data and can be accessed. Note that as a special case, if the parser is stopped waiting for it interrupt to be serviced parser_error_code may be read without first writing 1 to parser_access. |
|  | 6:0 | RW | reg_keyhole_addr | This register is used to address the location in the parser's internal register file that may be written to or read from via reg_keyhole_data Note that each access (read or write) to reg_keyhole_data increments reg_keyhole_addr by one. |
| 14 | 7:0 | RW | reg_keyhole_data | A read from this location actually reads data from the parser's register file at the location indicated by reg_keyhole_addr Similarly a write to this location actually writes to the parser's register file at the location indicated by reg_keyhole_addr |
| 15 | 7:0 | (not used) |  |  |
| 16 | 7:0 | RW | user_keyhole_addr | This register is used to address the location in the user data RAM that may be written to or read from via user_keyhole_data. Note that each access (read or write) to user_keyhole_data increments user_keyhole_addr by one. |
| 17 | 7:0 | RW | user_keyhole_data | A read from this location actually reads data from the user data RAM at the location indicated by reg_keyhole_addr. Similarly a write to this location actually writes to the user data RAM at the location indicated by reg_keyhole_addr. |
| 00 | 7.4 | — | (not associated with the parser) |  |
|  | 3 | RW[3]/0 | parser_event | This bit is set whenever the parser detects an error condition. If parser_mask is also set to 1 then an interrupt will be generated.[b] |

TABLE 100-continued

Parser Registers

| Address (Hex) | Bit no. | Dir/reset | Register Name | Description |
|---|---|---|---|---|
| | 2:0 | — | | (not associated with the parser) |
| 01 | 7:4 | — | | (not associated with the parser) |
| | 6 | RW/0 | parser_mask | See parser_event above. |
| | 3:0 | — | | (not associated with the parser) |

[a]event bits are not simple R/W register bits.
[b]all interrupts are conditional on chip_mask being set to 1.

Error Codes

Whenever the parser detects an event condition, it sets parser_event. If parser_mask is set to 1 (indicating that the user system is interested in servicing parser events) the parser stops processing and (assuming that chip_mask is set to 1) an interrupt is generated.

On responding to the interrupt the controlling microprocessor should read parser_error_code to determine the cause of the event. Table 101 provides the complete list of defined error codes in this regard.

After the controlling microprocessor has responded to the event in the appropriate manner it must allow the parser of the present invention to resume processing. This is done by clearing the event by writing the value 1 to parser_event.

TABLE 101

Parser Error Codes

| Code | Name | Description |
|---|---|---|
| | ERR_USER_DATA | Indicates that user data has been encountered and is present in the user data RAM. |

Dealing with User Data

Small amounts of user data may be read out from the parser. By default, all user data is discarded by the start code detector. This is to protect the system from the inappropriate use of large amounts of user data which would be beyond its capabilities.

In order to allow user data to reach the parser the register discard_user must be set 0. Whenever user data is encountered in the bitstream the bytes of data are buffered up in an on-chip user data RAM. The RAM has space for 192 bytes of data to be buffered. When all of the bytes of user data have been read (or the RAM is full) the parser will generate an event (ERR_USER_DATA) which allows the controlling microprocessor to read the data from the RAM.

Before the user data RAM is read, the microprocessor must first obtain access to the parser's internal registers by setting parser_access to 1 and then polling this bit until it reads back 1. The number of bytes in the user data RAM is indicated by parser_status. The user-data RAM cannot be accessed directly. Instead, it is necessary to write the address that is to be read into user_keyhole_addr (usually zero) then data is read from user_keyhold_data. Since user_keyhole_addr is automatically incremented each time that a read is performed from user-keyhole_data, the appropriate number of bytes of user data can be read very quickly.

If there are less than 192 bytes of user data, then all of the data is dealt with by a single event. If there are more than 192 bytes, then parser_status will contain 192 bytes the first time that ERR_USER_DATA is generated. After the event has been cleared (by writing zero to parser_access and then 1 to parser_event) the microcode will interrogate parser_continue to determine what to do next.

If parser_continue is 1 the parser continues dealing with user data. The remaining bytes of user data (or the next 192 bytes) are parsed from the stream and the process repeats. However, if parser_continue is 0 then the parser discards the remaining user data and proceeds with normal video decoding. Note that even if parser_continue is zero, the first ERR_USER_DATA event will always be generated.

Limiting the Amount of User Data

If it is intended that user data should be used. it is important that this is limited in order that the real-time decoding of video data can be Guaranteed in accordance with the present invention. It is very difficult to specify the acceptable limit on user data since it depends on many external constraints such as the interrupt response time of the controlling microprocessor and the time taken to read a byte of data from the system. As a guide, the amount of user data should be limited to the amount that can be guaranteed to be read from the system in about 50 $\mu$s (including interrupt response time etc.)

User Data RAM

During the decoding of picture data, the user RAM is used by the microcode processor for other purposes (storage of concealment motion vectors, for instance). For this reason, it is not possible to leave data in the RAM and expect it to be preserved for later use.

Introduction

The present invention includes circuitry to assist in the management of video time stamps. It is assumed that the external circuitry associated with the MPEG system stream parser has recovered a stable 27 MHz clock by using the clock references (Programmed Clock Reference or System Clock Reference as appropriate).

The circuitry, in accordance with the present invention, is, therefore, concerned with starting video decoding at the appropriate time to ensure synchronization with audio and, thereafter, monitoring video timestamps to ensure continued synchronization. In the absence of errors, no subsequent correction will be required.

It is desirable to avoid the need to transfer clock reference information into the video decoder. Hardware is divided into two areas; a circuit associated with the input stages of the system for loading video time stamps and a real-time counter that is associated with the video parser circuitry.

System Organization

The present invention includes a counter that is incremented at regular intervals derived from the 27 MHz SYSCLOCK. The system for timestamp management depends (conceptually) on a second copy of this counter being maintained outside of the system. These two counters are initialized to the same value by being reset by the same signal Thereafter, the two counters free-run.

The present invention performs its timestamp management with respect to its internal time counter denoted "videotime". To assure that the correct comparisons are made, the video timestamps are modified by the system decoder. It is not necessary to know the absolute time—simply the difference between the actual time that a picture is decoded and the nominal time it should have been decoded.

Equation 1 below denotes this by setting the difference between the video time counter and the modified time stamp equal to the difference between the actual "time" (derived from the clock references) and the timestamp Equation 2 is merely a reorganization of the variables to derive the modified time stamp.

$$\text{videotime} - \text{modifiedtimestamp} = \text{timestamp} - \text{time} \qquad \text{EQ 1}$$

$$\text{modifiedtimestamp} = \text{videotime} + (\text{timestamp} - \text{time}) \qquad \text{EQ 2}$$

Figure 122:
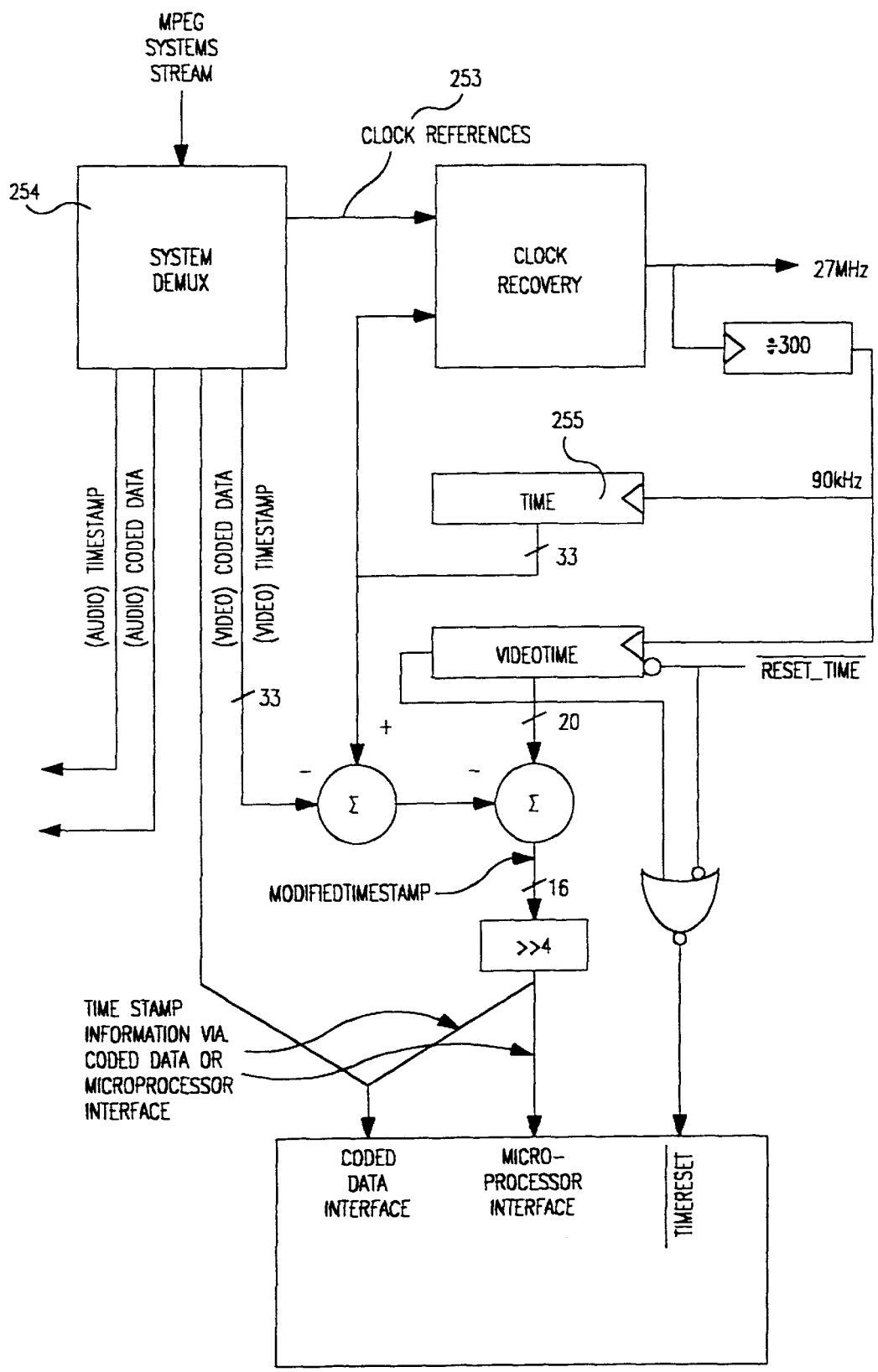

FIG. 122 shows one possible organization of the arithmetic to derive the modified time stamp. In reality, it is most likely that the actual additions (and the shift) will be performed on a processor rather than in dedicated hardware. There are, of course, many other ways to derive the same numeric value of the modified time stamp. For instance, rather than having a copy of the videotime counter, it may be better to simply record the value of "time", when the RESET_TIME pin of the invention was last asserted. From this information and the current value of "time" it is always possible to deduce the current contents of video time within the system.

It will be appreciated that any suitable rearrangement of arithmetic operations that yields a suitable value of the modified time stamp may be used.

As shown in FIG. 122, the modified timestamps used by the invention use only sixteen bits. This is achieved in two ways. First, since the difference between time and the timestamp (used to derive the modified timestamp—see Equation 2) should always be small, the more significant bits can be discarded. Second, since the invention only controls the presentation of video to the nearest frame-time, the less significant bits are also not required and are discarded by shifting right by four bits.

Thus, the sixteen bits of time information maintained are able to deal with timing errors of up to about 11.5 seconds with an accuracy of about 180 $\mu$s (about 1% of a field time).

Note that additional Figures, which are self explanatory to those of ordinary skill in the art, are included with this application for providing further insight into the detailed structure and operation of the environment in which the present invention is intended to function.

The aforedescribed pipeline system of the present invention satisfies a long existing need for further improvements in various aspects of video decoding systems, including an MPEG video decompression method and apparatus utilizing a plurality of stages interconnected by a two-wire interface arranged as a pipeline processing machine. Control tokens and DATA Tokens pass over the single two-wire interface for carrying both control and data in token format. A token decode circuit is positioned in certain of the stages for recognizing certain of the tokens as control tokens pertinent to that stage and for passing unrecognized control tokens along the pipeline. Reconfiguration processing circuits are positioned in selected stages and are responsive to a recognized control token for reconfiguring such stage to handle an identified DATA Token. A wide variety of unique supporting subsystem circuitry and processing techniques are disclosed for implementing the system, including memory addressing, transforming data using a common processing block, time synchronization, asynchronous swing buffering, storing of video information, a parallel Huffman decoder, and the like.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A system for transforming digital signals in which the digital signals are arranged in groups of N data input words, comprising:

a pre-common processing circuit (PREC) arranged to perform predetermined pairing operations on odd-numbered ones of the input words and to transmit even-numbered ones of the input words to pre-common outputs;

a common processing circuit (CBLK) receiving both odd-numbered and even-numbered data from said pre-common processing circuit (PREC) for forming odd and even common processing output values respectively; and a post-common processing circuit (POSTC) arranged to perform predetermined output scaling operations on the odd common processing output values to form post-processed odd values and to arithmetically combine the post-processed odd values with the even common processing output values to generate high- and low-order output words, the system being arranged such that the output words contain transformation values corresponding to the input data words, wherein said post-common processing circuit comprises:

a first latch defining a first data stream source and a second latch defining a second data stream source;

said first and said second latches being in communication with an arithmetic unit;

said arithmetic unit communicating data to a transposer;

said transposer transposing and communicating said data to said second latch;

said second latch being arranged to absorb data; and said second latch and said first latch communicating said first and second data streams in an interleaved manner to said arithmetic unit, further defined that in said communication in the interleaved manner said second latch does not interrupt communication from said first latch;

whereby a common arithmetic unit is used for said first and said second data streams.

2. The system according to claim 1 wherein said second latch comprises a series of interconnected latches to form a buffer, said buffer being configurable in size to accommodate variable rates of data reception and transmission.

3. The system according to claim 1, wherein said second latch communicates said second data stream to said arithmetic unit only when said second latch is filled with a predetermined amount of data.

4. A system for transforming digital signals from a frequency to a time domain in which the digital signals are arranged in groups of N data input words, comprising:

a pre-common processing circuit (PREC) arranged to perform predetermined pairing operations on odd-numbered ones of the input words and to transmit even-numbered ones of the input words to pre-common outputs;

a common processing circuit (CBLK) receiving both odd-numbered and even-numbered data from said precommon processing circuit (PREC) for forming odd and even common processing output values respectively; and a post-common processing circuit (POSTC) arranged to perform predetermined output scaling operations on the odd common processing output values to form post-processed odd values and to arithmetically combine the post-processed odd values with the even common processing output values to generate high- and low-order output words, the system being arranged such that the output words contain transformation values corresponding to the input data words, the system being arranged such that the output words contain inverse discrete cosine transformation values corresponding to the input data words, wherein said post-common processing circuit comprises:

a first latch defining a first data stream source and a second latch defining a second data stream source;

said first and said second latches being in communication with an arithmetic unit;

said arithmetic unit communicating data to a transposer;

said transposer transposing and communicating said data to said second latch;

said second latch being arranged to absorb data; and said second latch and said first latch communicating said first and second data streams in an interleaved manner to said arithmetic unit, further defined that in said communication in the interleaved manner said second latch does not interrupt communication from said first latch;

whereby a common arithmetic unit is used for said first and said second data streams.

5. The system according to claim 4, wherein said second latch comprises a series of interconnected latches to form a buffer, said buffer being configurable in size to accommodate variable rates of data reception and transmission.

6. The system according to claim 5, wherein said second latch communicates said second data stream to said arithmetic unit only when said second latch is filled with a predetermined amount of data.

* * * * *